US005195125A

United States Patent [19]

Bliven et al.

[11] Patent Number: 5,195,125

[45] Date of Patent: Mar. 16, 1993

[54] GEL FILLED RJ11 CONNECTOR

[75] Inventors: David C. Bliven, San Jose; Anthony Vranicar, Santa Clara; Philip B. Vail, San Leandro; Gerald L. Shimirak, Danville, all of Calif.; Julian S. Mullaney, Raleigh, N.C.

[73] Assignee: Raychem Corporation, Menlo Park, Calif.

[21] Appl. No.: 791,749

[22] Filed: Nov. 12, 1991

Related U.S. Application Data

[63] Continuation of Ser. No. 584,325, Sep. 17, 1990, Pat. No. 5,111,497.

[51] Int. Cl.[5] .......... H04M 1/24

[52] U.S. Cl. .......... 379/29; 379/451; 439/271; 439/587; 439/936

[58] Field of Search .......... 379/29, 437, 451; 439/271, 577, 587, 936

[56] References Cited

U.S. PATENT DOCUMENTS 3,020,260 2/1962 Nelson .......... 260/46.5
3,522,576 8/1970 Cairns .......... 339/91
4,662,692 5/1987 Uken et al. .......... 439/587 X
4,741,709 5/1988 Jervis .......... 439/521
4,748,651 5/1988 Collins et al. .......... 379/27 X
4,824,390 4/1989 Crane et al. .......... 439/271
4,846,721 7/1989 Debruycker et al. .......... 439/411
4,924,489 5/1990 Lawrence et al. .......... 379/29 X
4,979,209 12/1990 Collins et al. .......... 379/442 X
5,085,597 2/1992 Story et al. .......... 439/521

FOREIGN PATENT DOCUMENTS 0213874 11/1987 European Pat. Off. .
0319306 6/1989 European Pat. Off. .......... 439/936
9115038 10/1991 PCT Int'l Appl. .

OTHER PUBLICATIONS

"The Complete Catalog of Voice/Data Connecting Devices and Telecom Apparatus," Copyright 1990, Suttle Apparatus, Minn.

*Primary Examiner*—Stafford D. Schreyer
*Attorney, Agent, or Firm*—Townsend and Townsend

[57] ABSTRACT

A test system directed to apparatus for transmitting and receiving multiple telephone transmission signals over a single twisted pair. The system converts an analog signal from a local switching station to an 80 ksymbols/sec signal for transmission over a twisted pair by a line card. A remote terminal converts the 80 ksymbols/sec signal back into a conventional analog signal for use in conventional telephone, facsimile or other related equipment. The test equipment separately tests the entire system, the line card portion of the system, the remote terminal portion of the system, and the twisted pair.

13 Claims, 32 Drawing Sheets

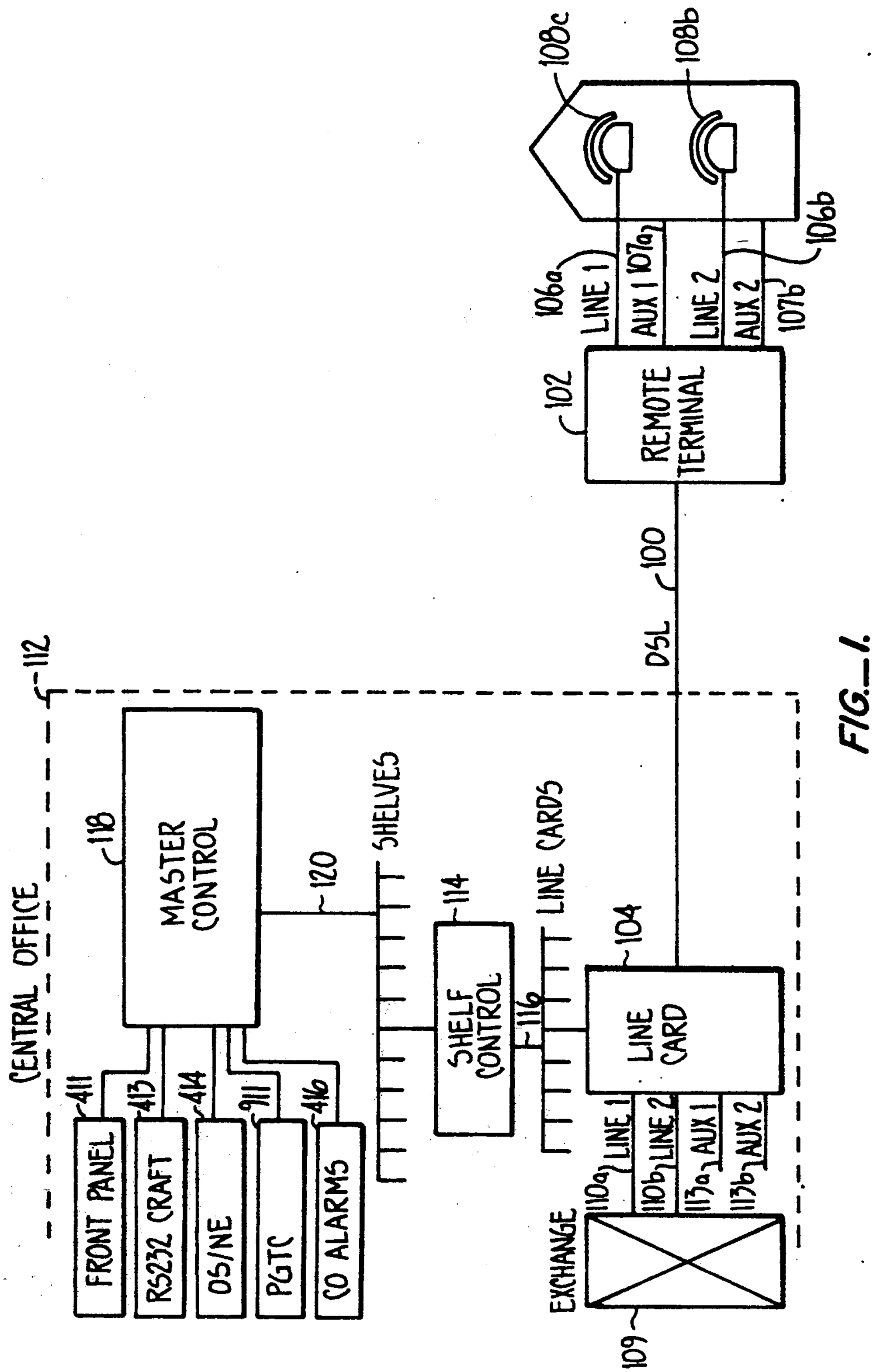
FIG._1.

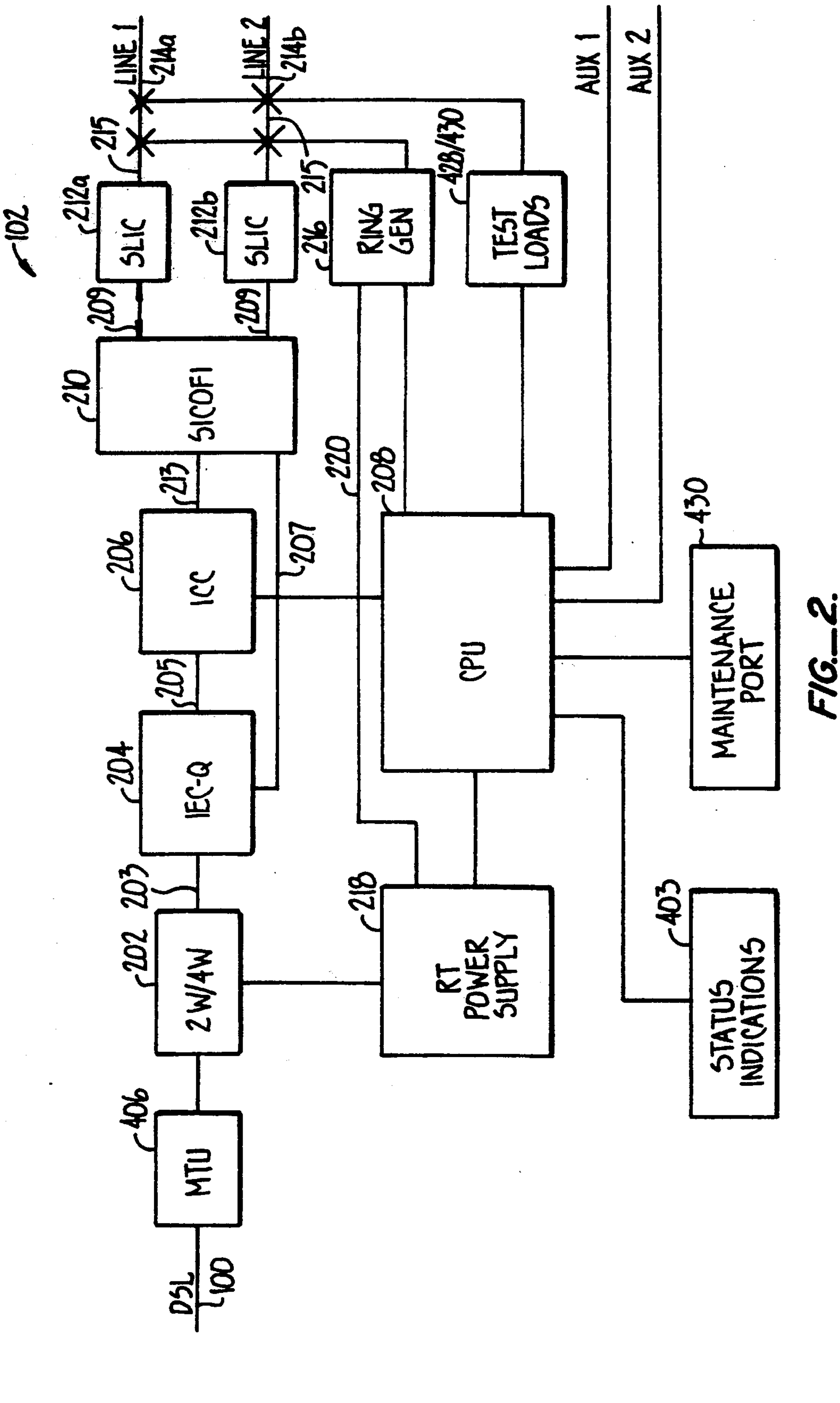
FIG._2.

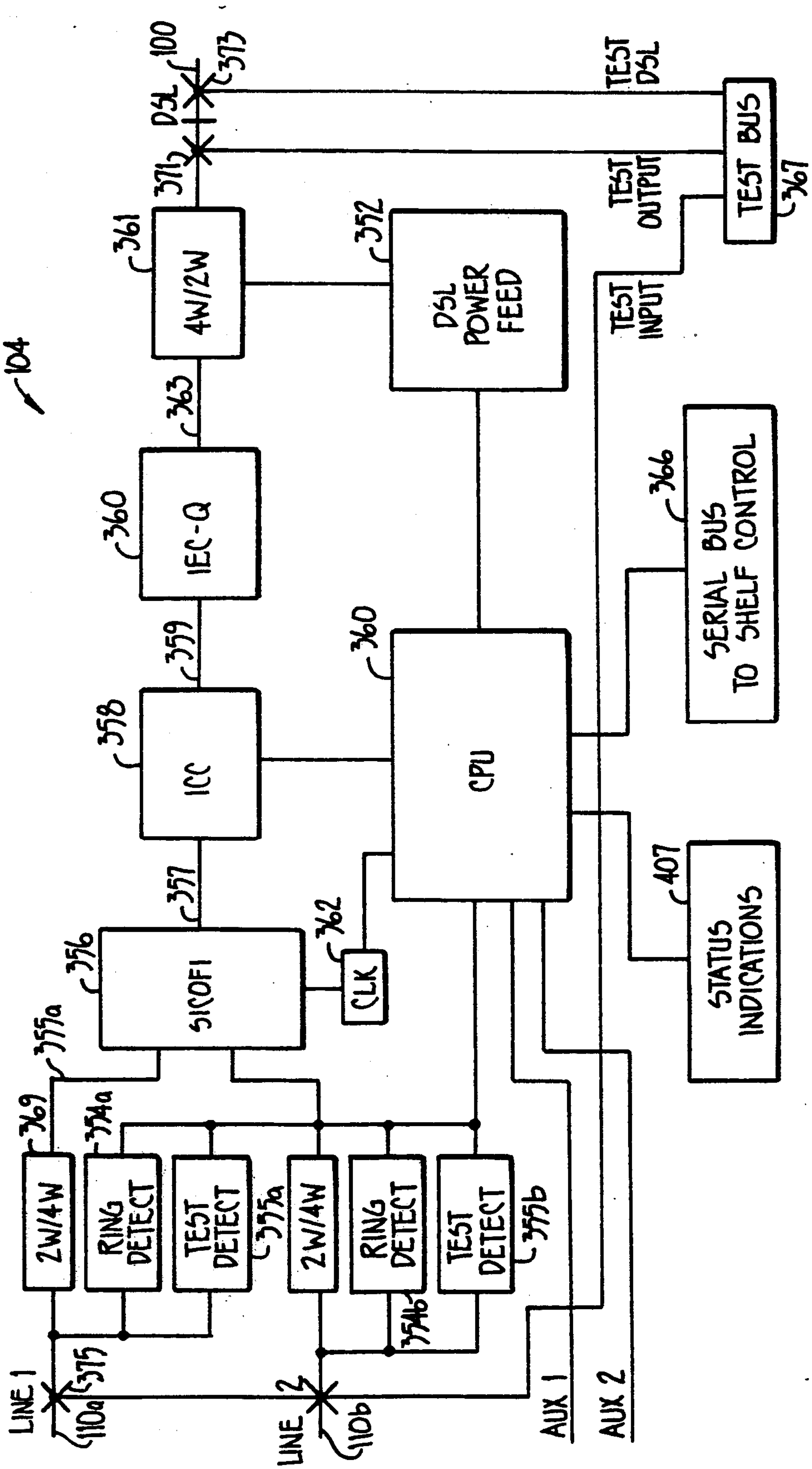
FIG._3.

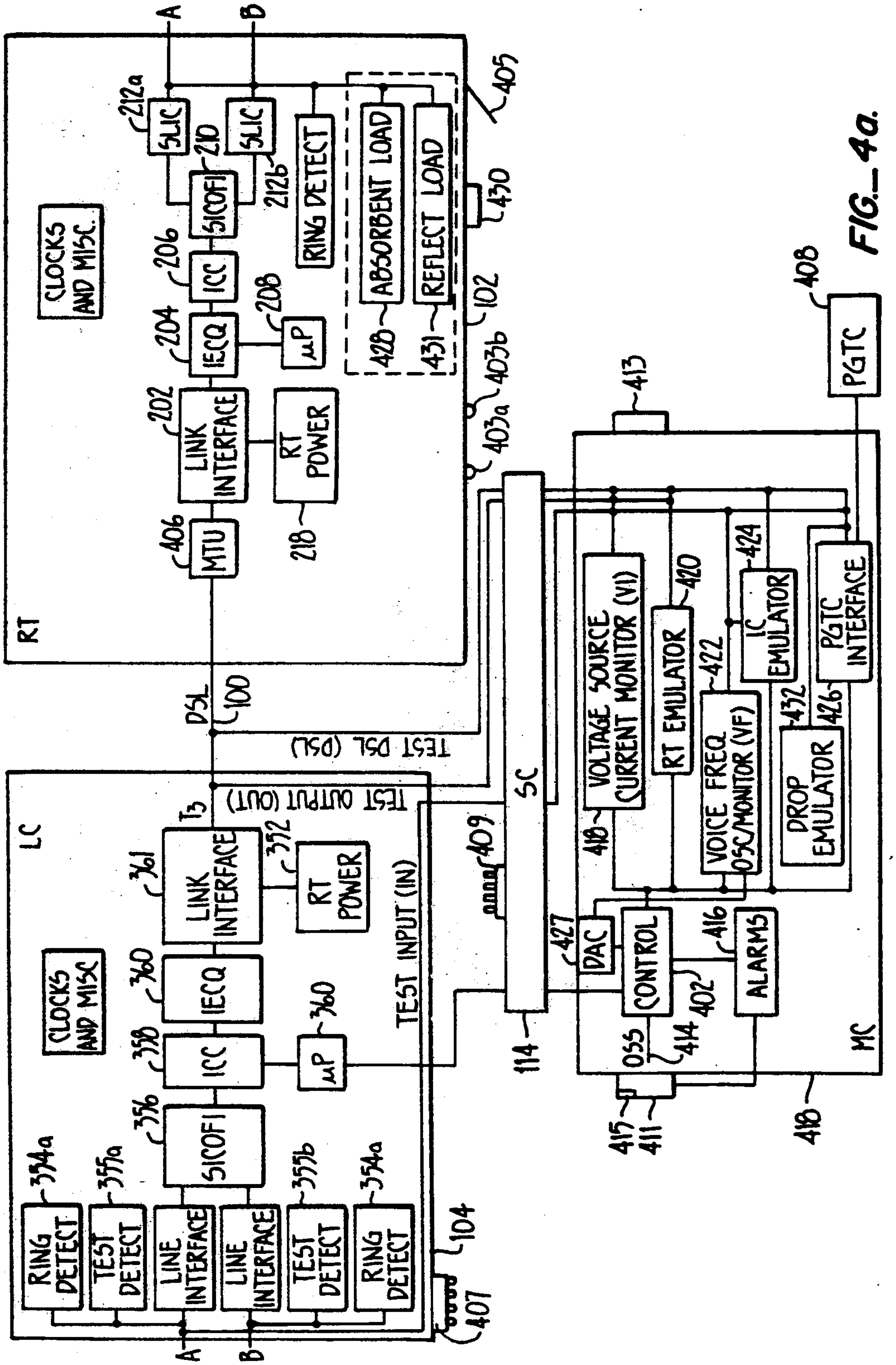
FIG._4a.

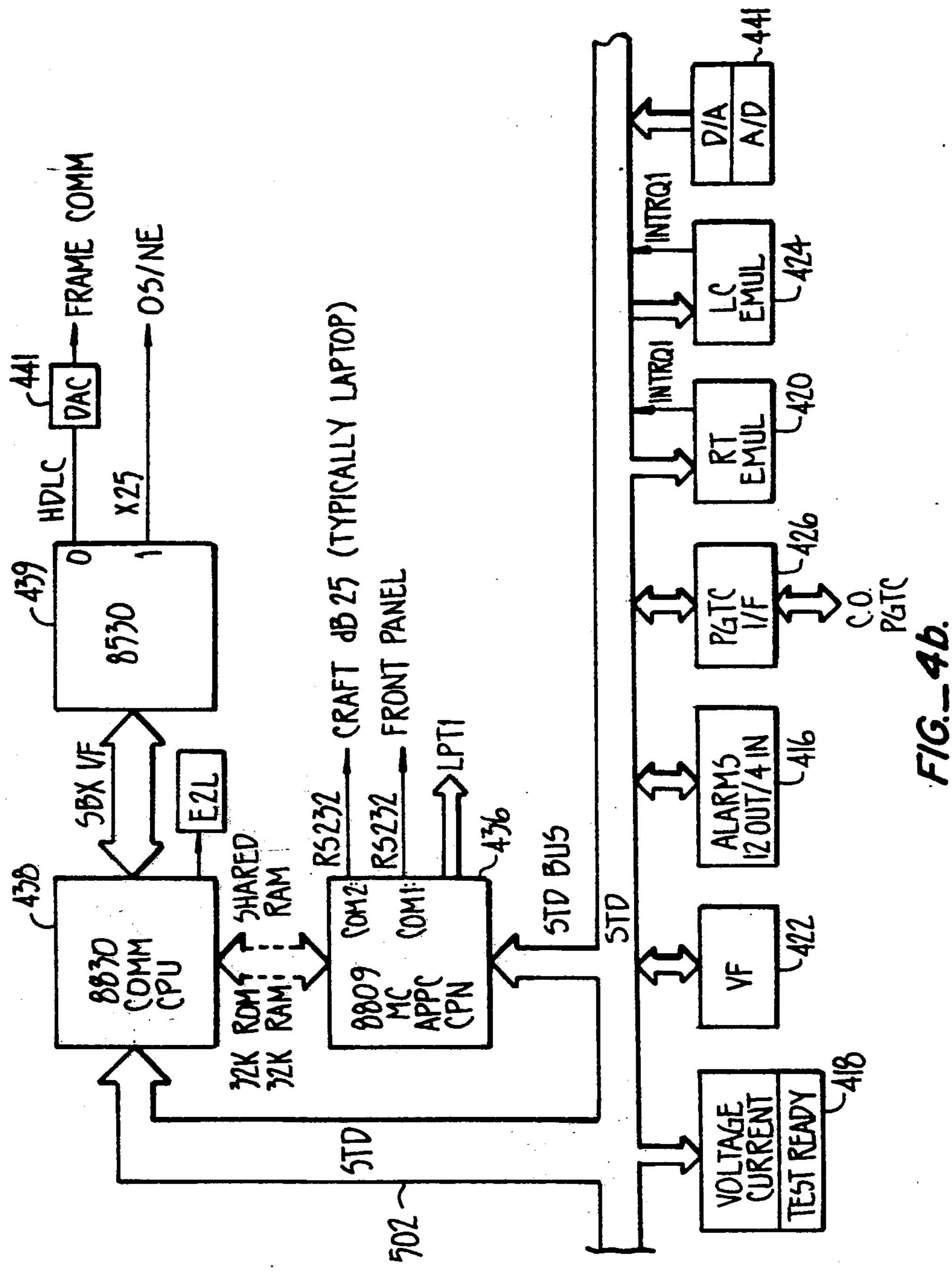
FIG._4b.

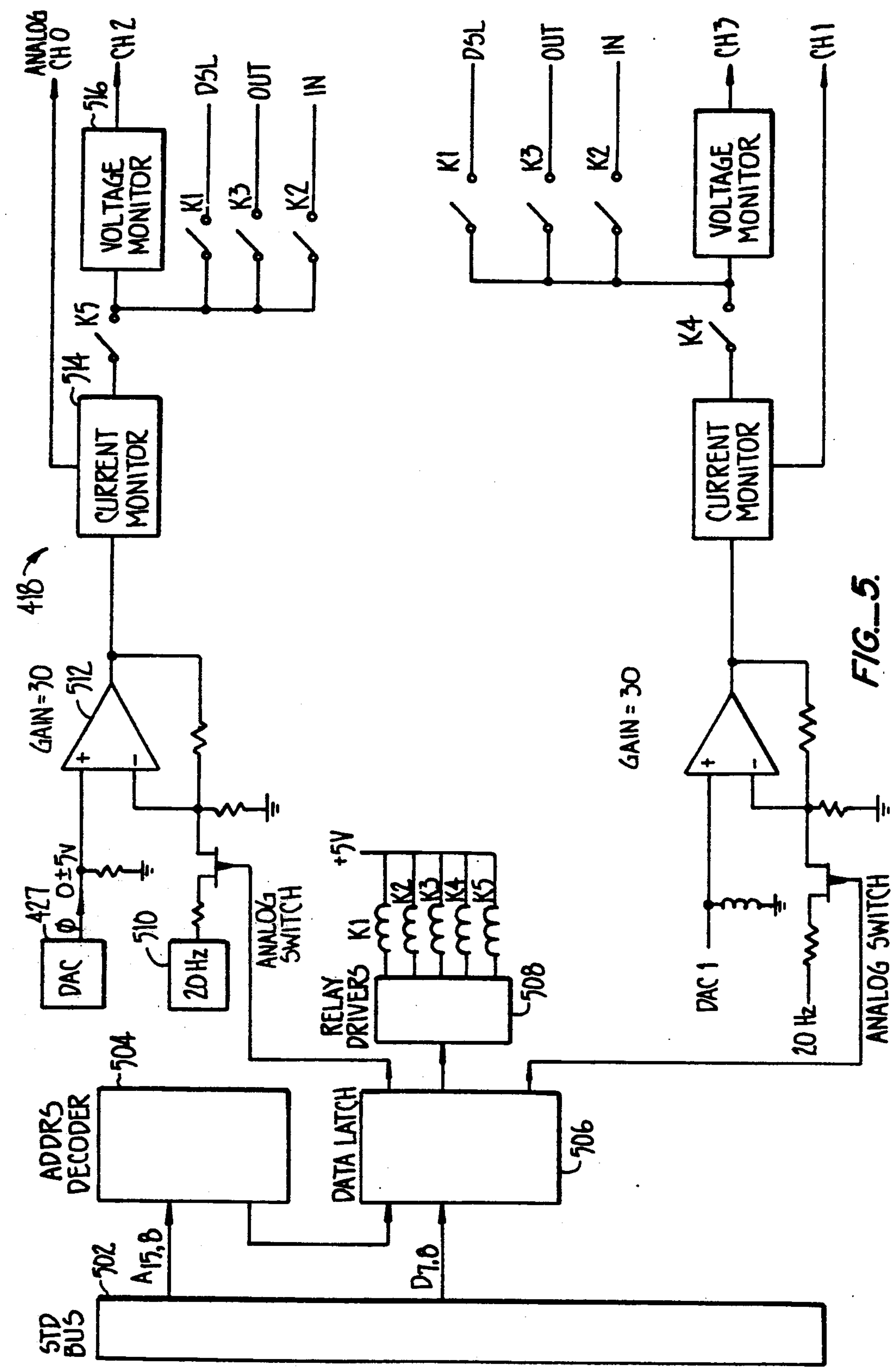
FIG._5.

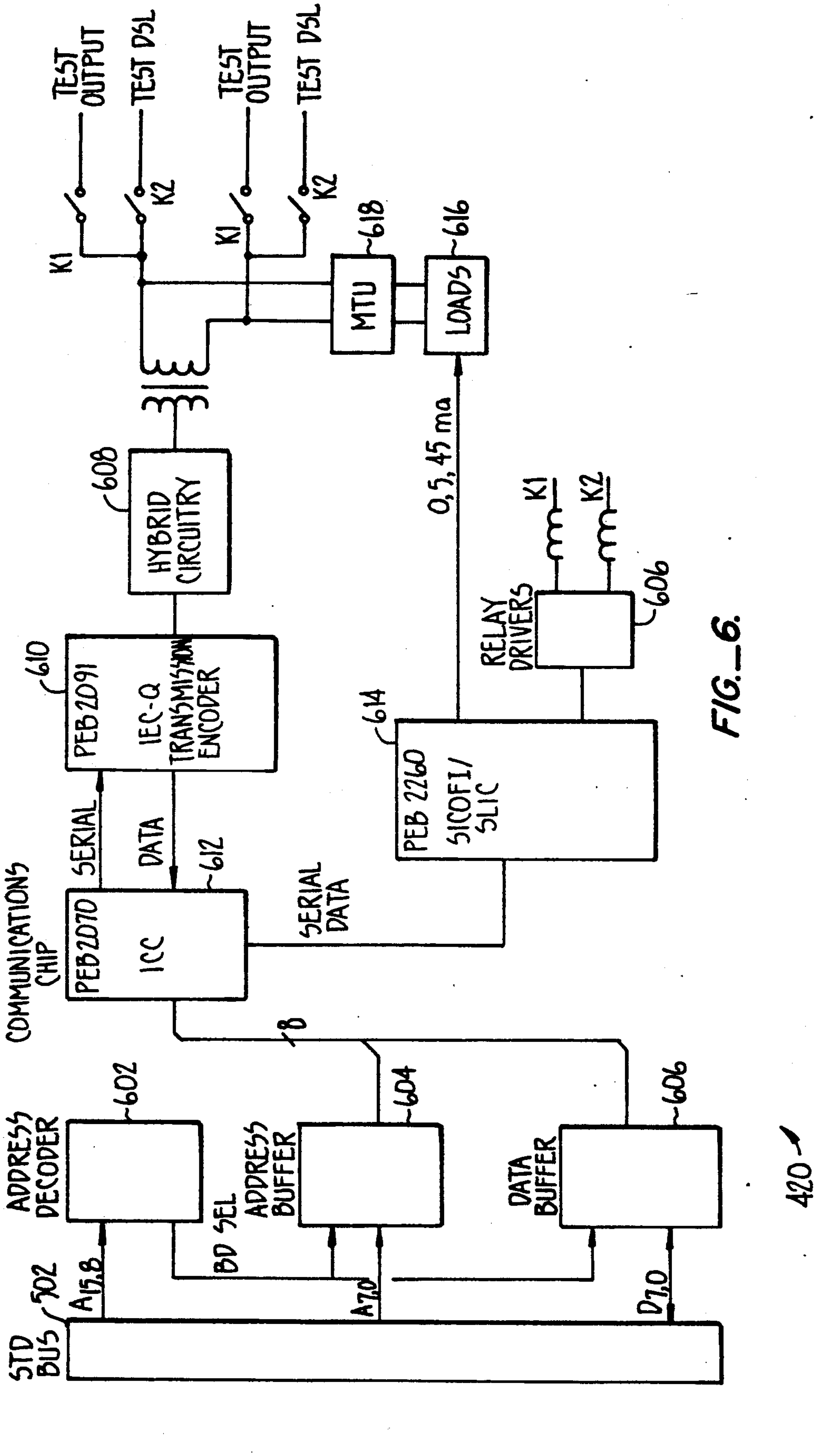
FIG._6.

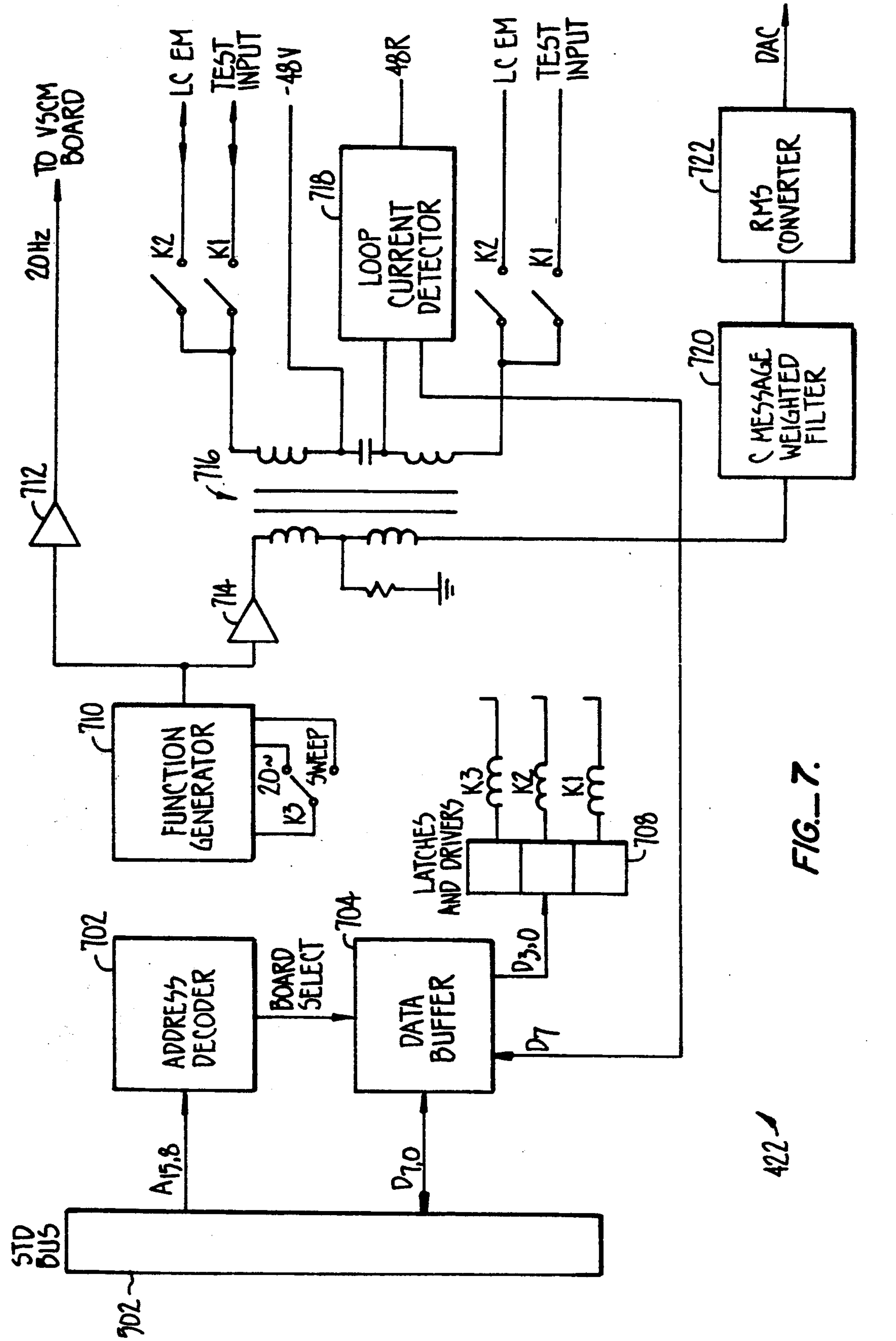
FIG._7.

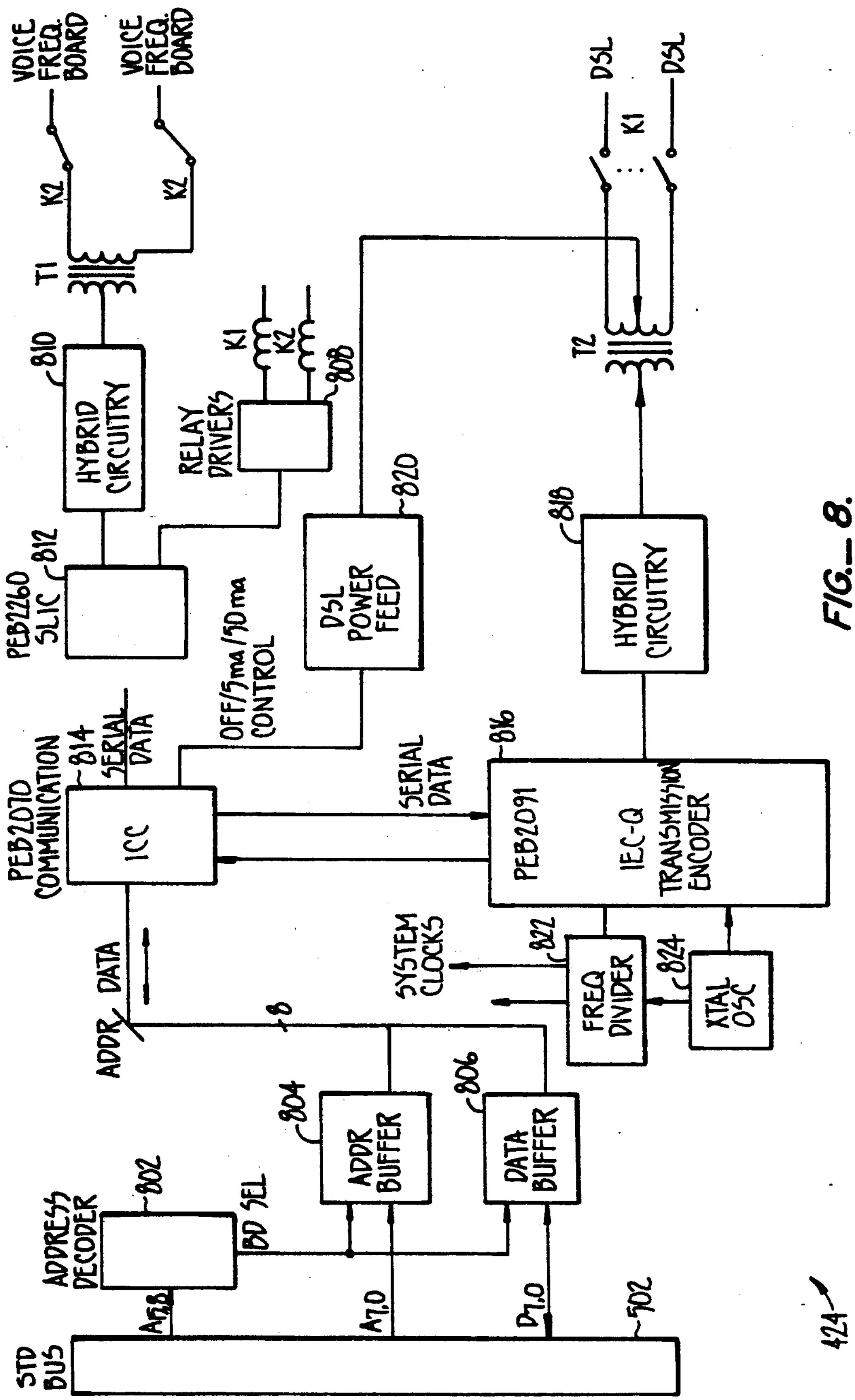
FIG._8.

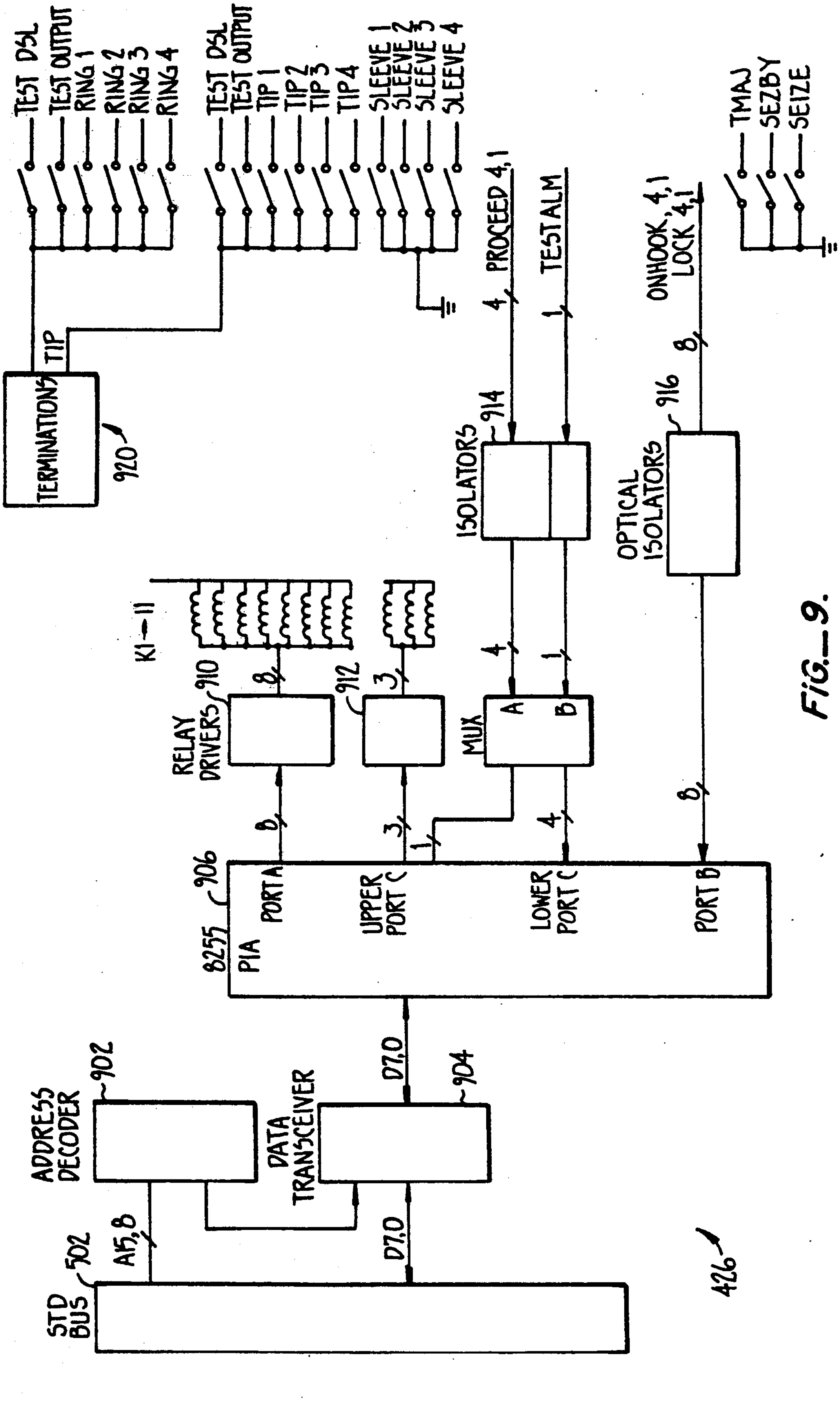
FIG._9.

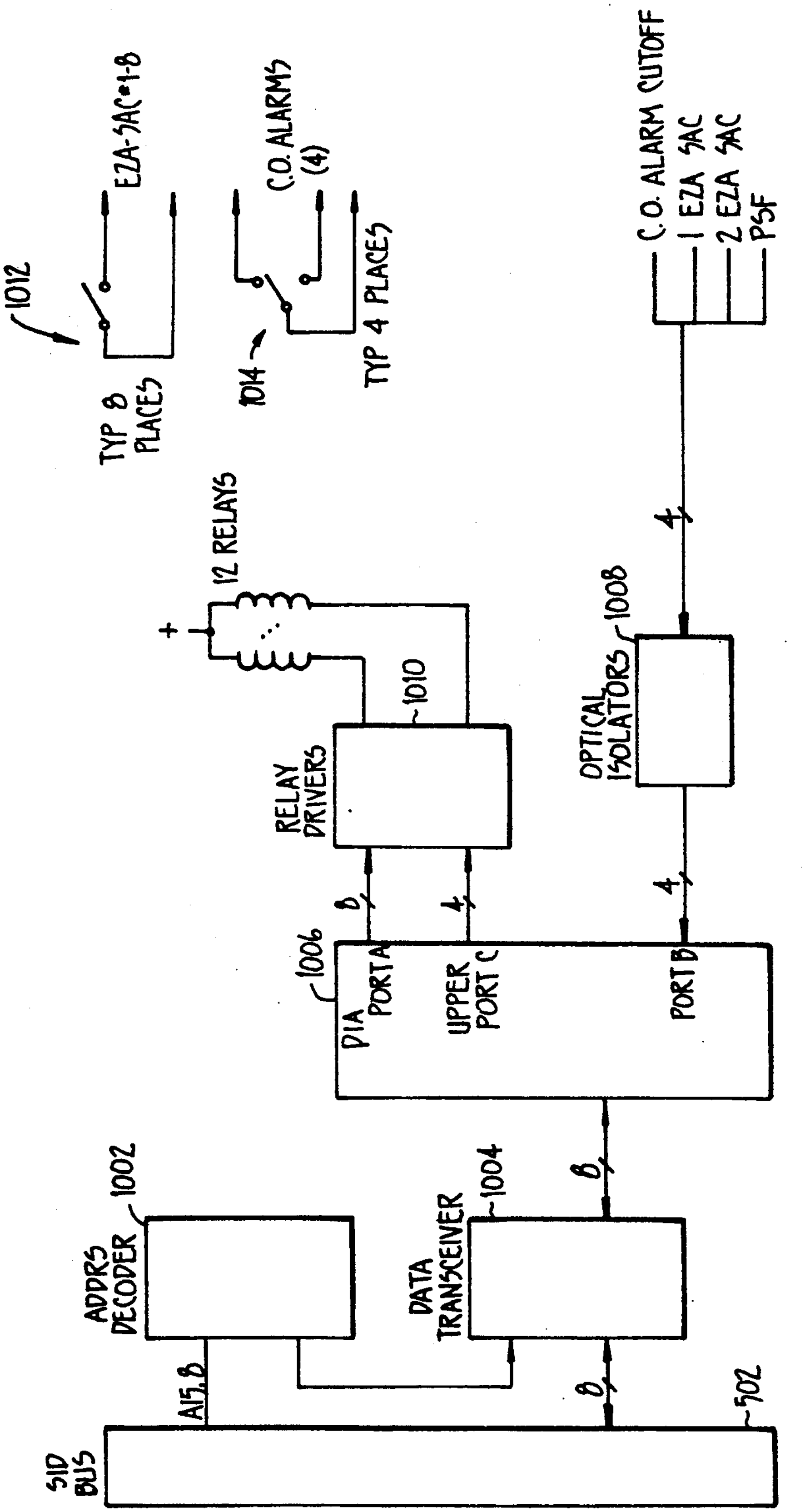
FIG._10.

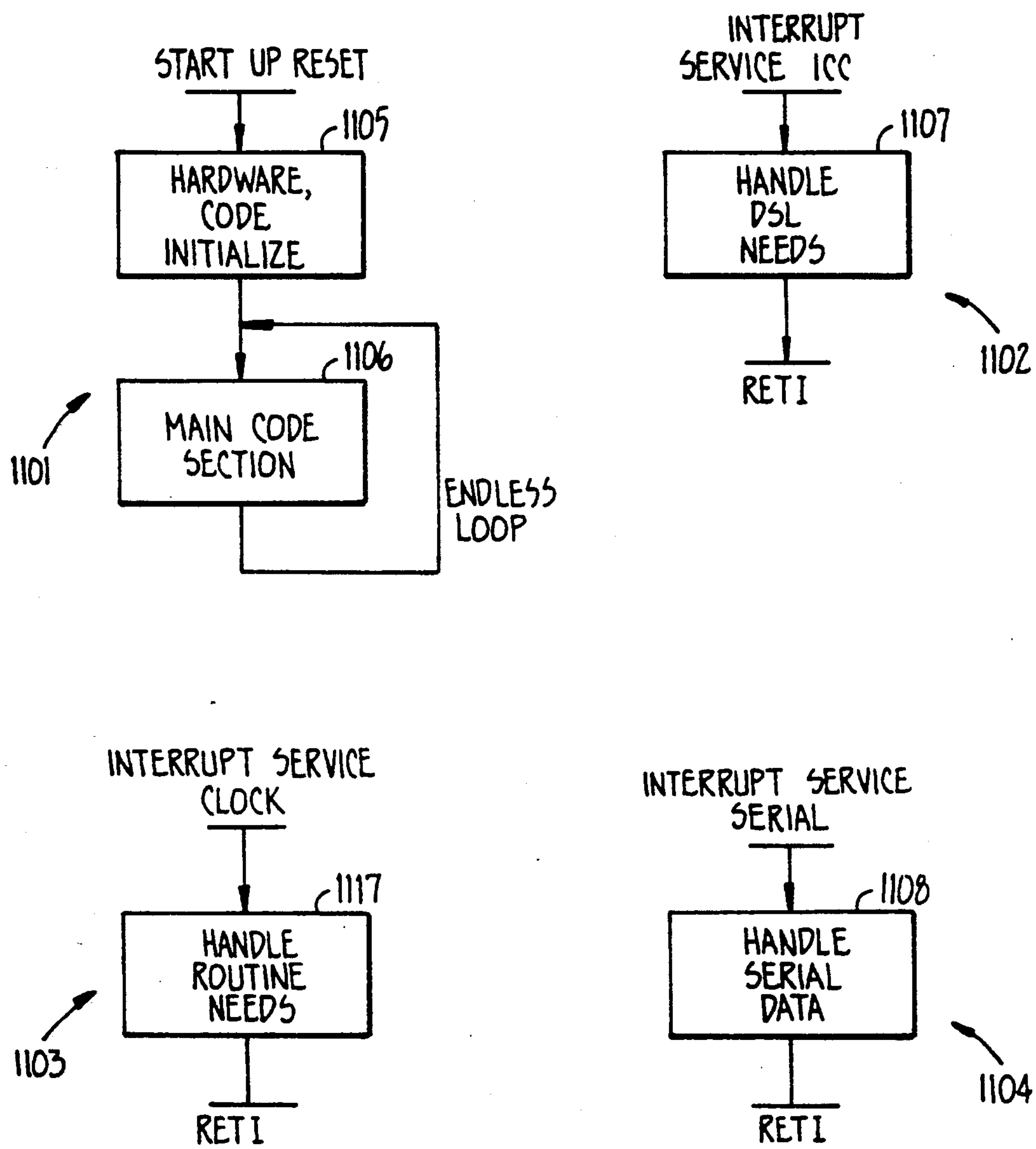
FIG._11a.

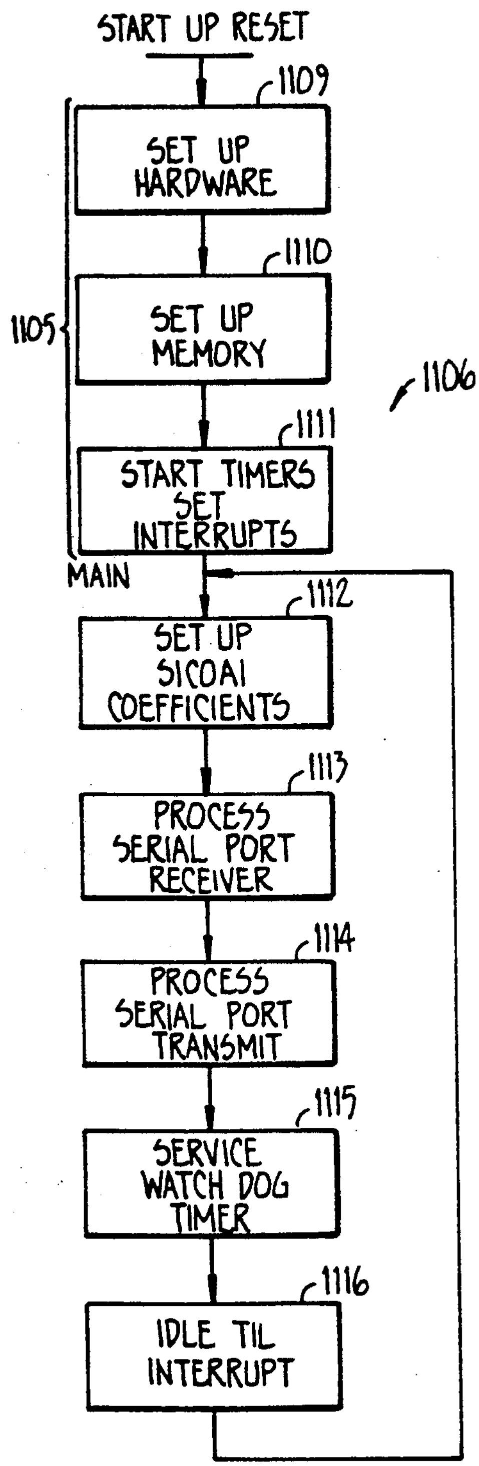
FIG._11b.
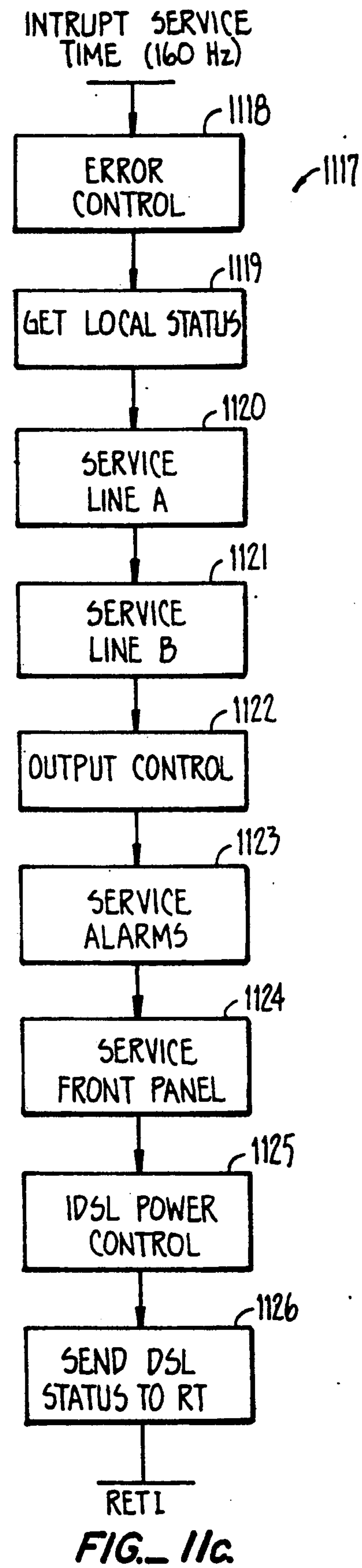
FIG._11c.

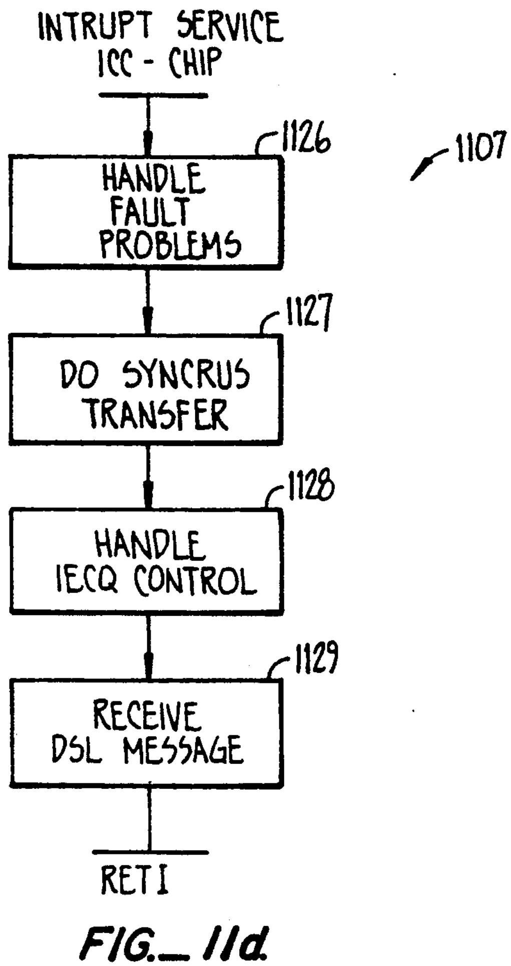
FIG._11d.
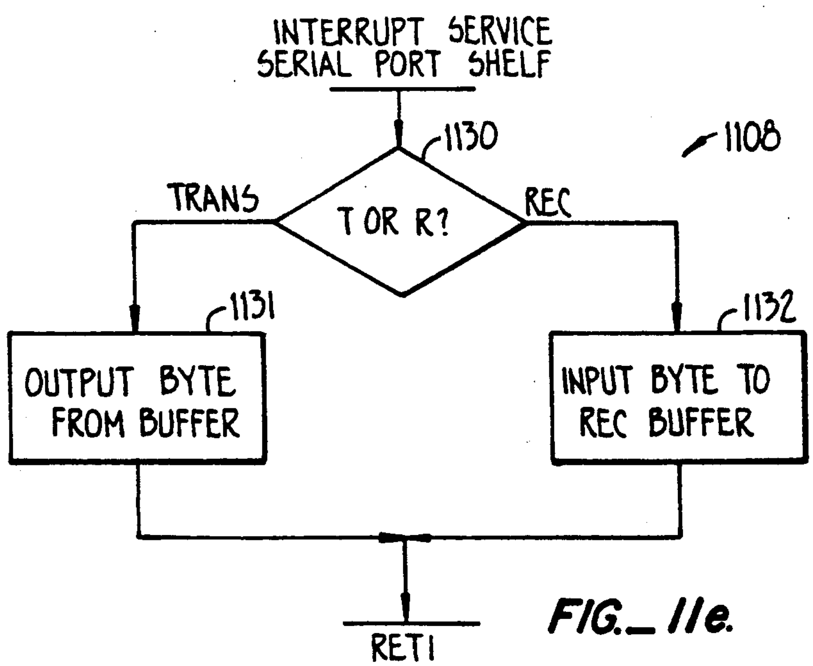
FIG._11e.

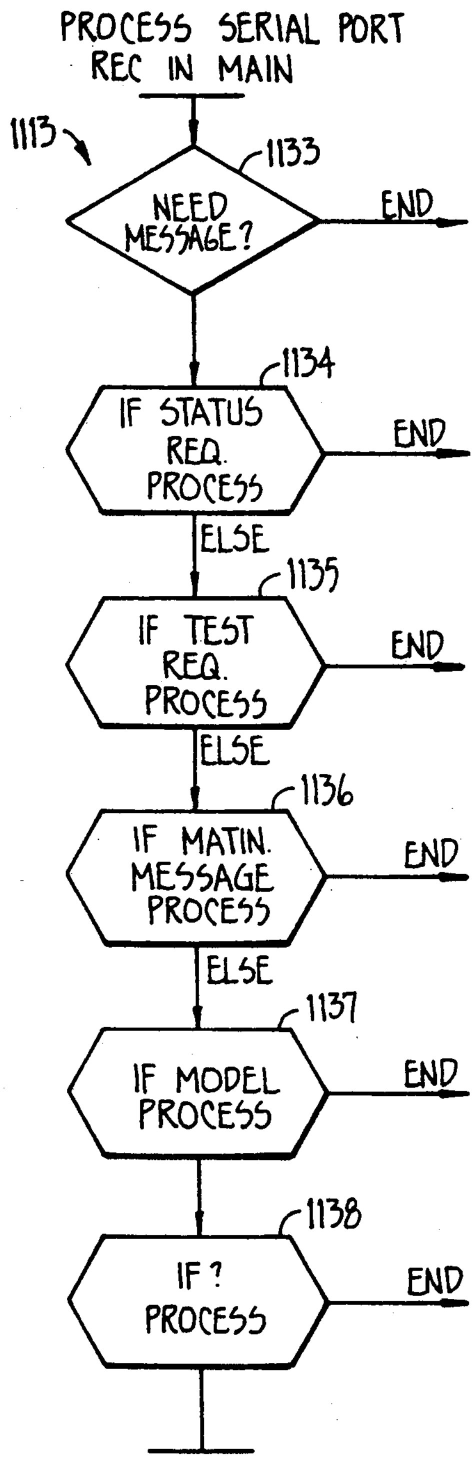
FIG._11f.
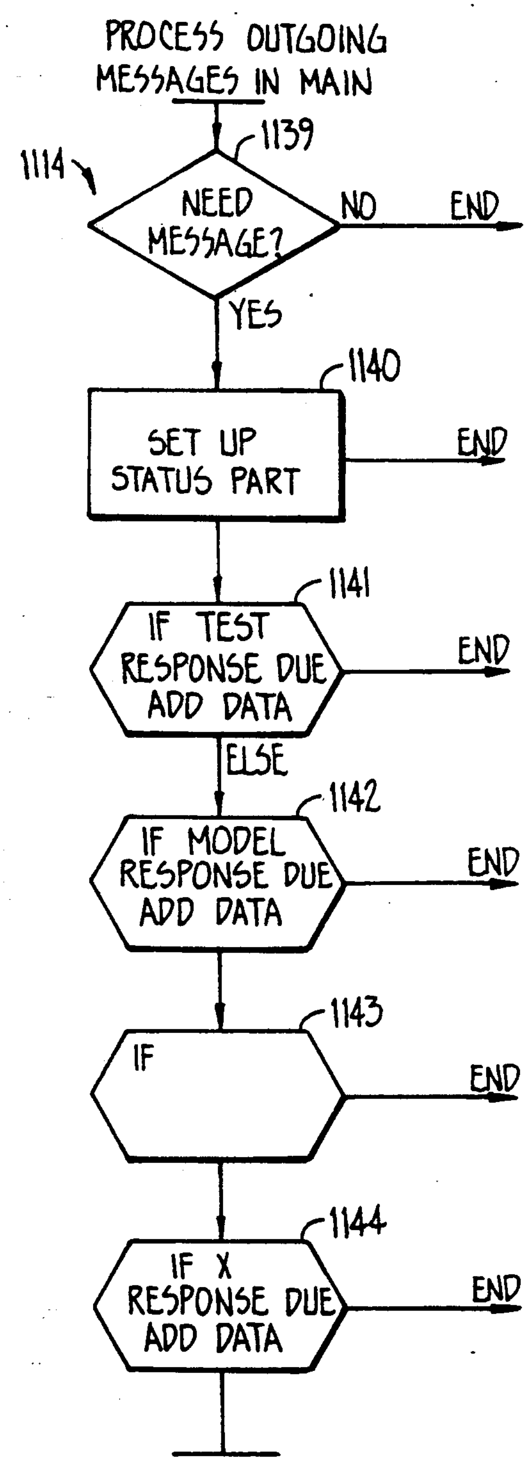
FIG._11g.

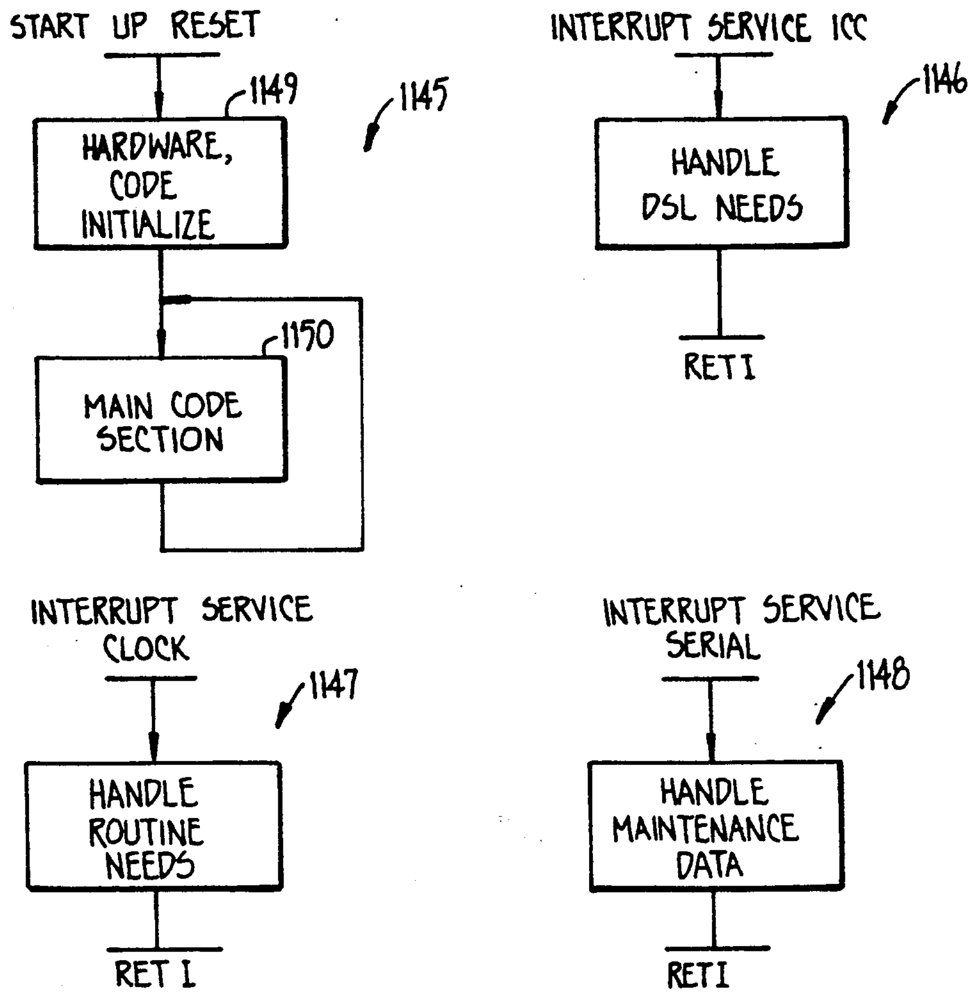
FIG._11h.
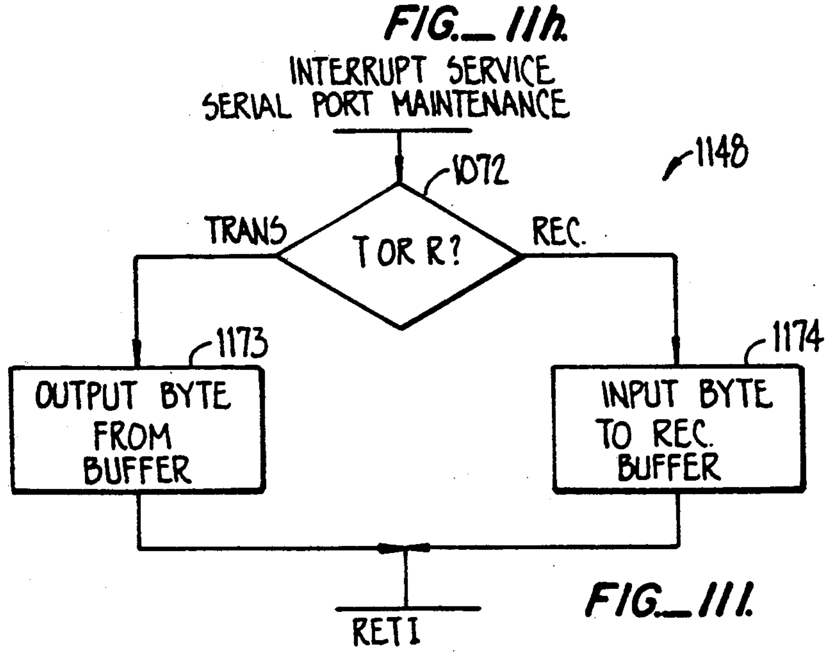
FIG._11I.

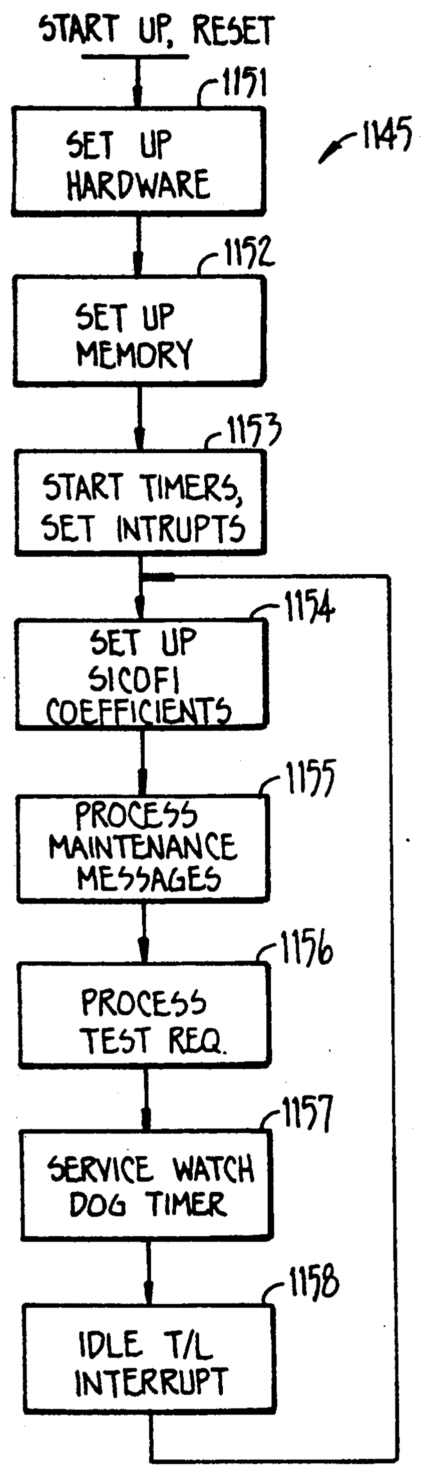
FIG._11i.
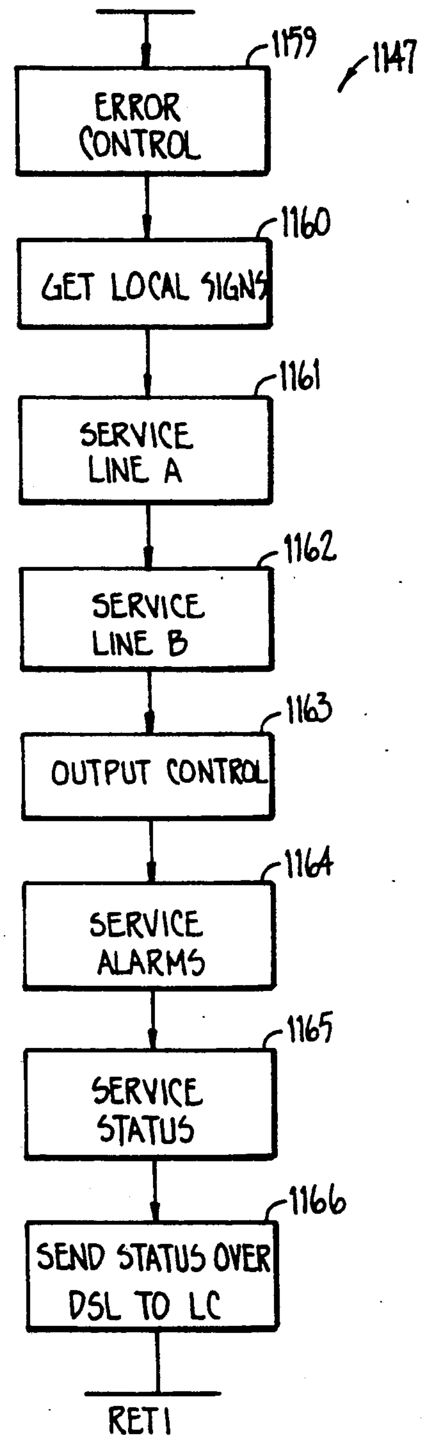
FIG._11j.

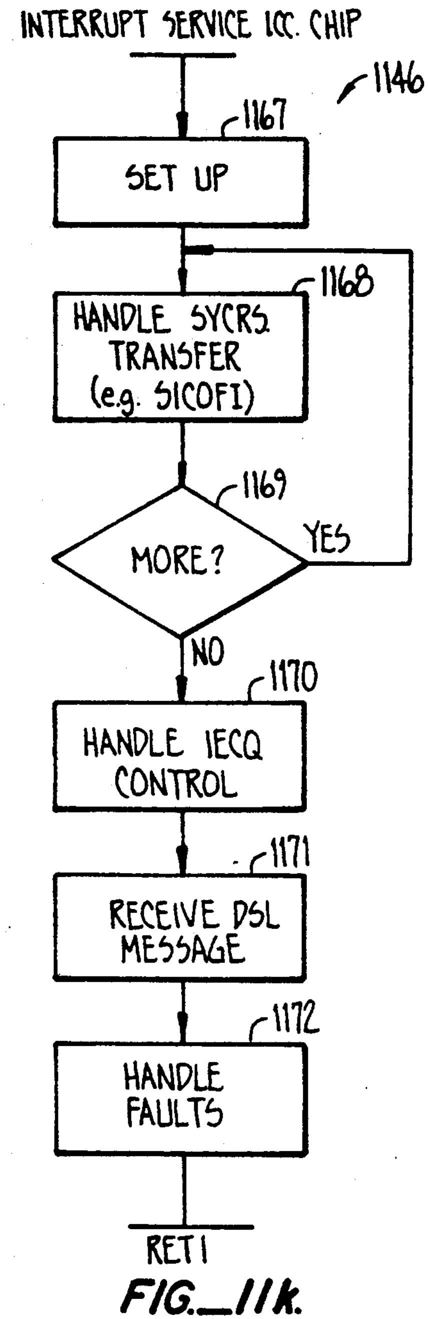
FIG._11k.
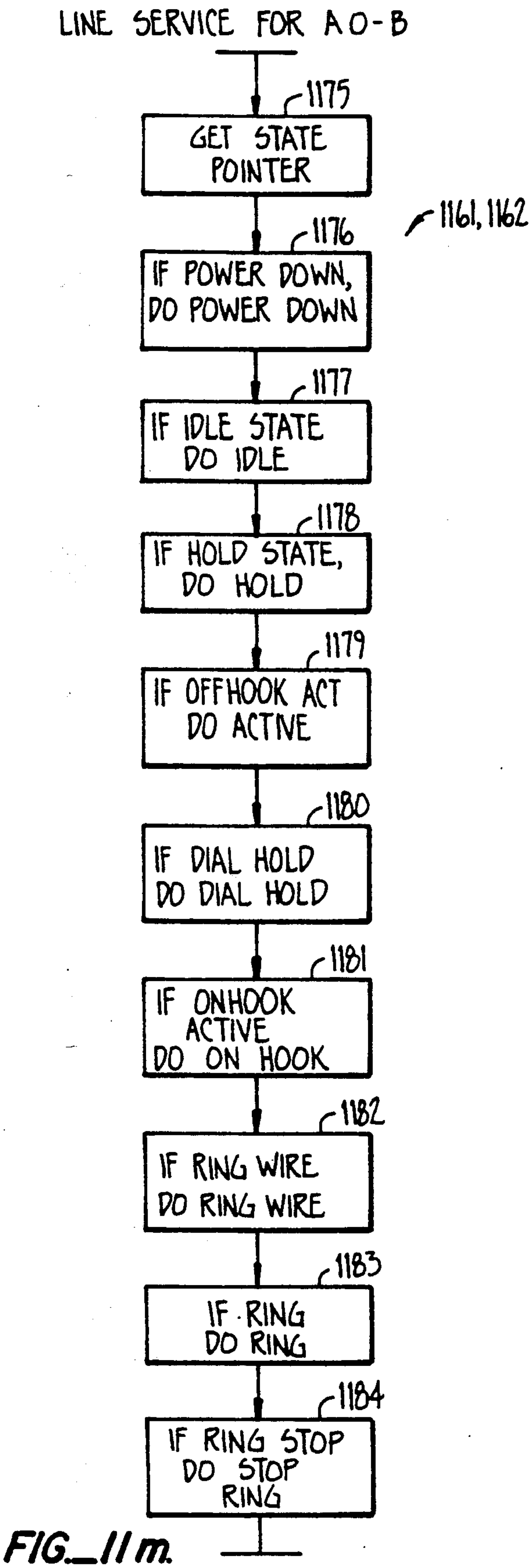
FIG._11m.

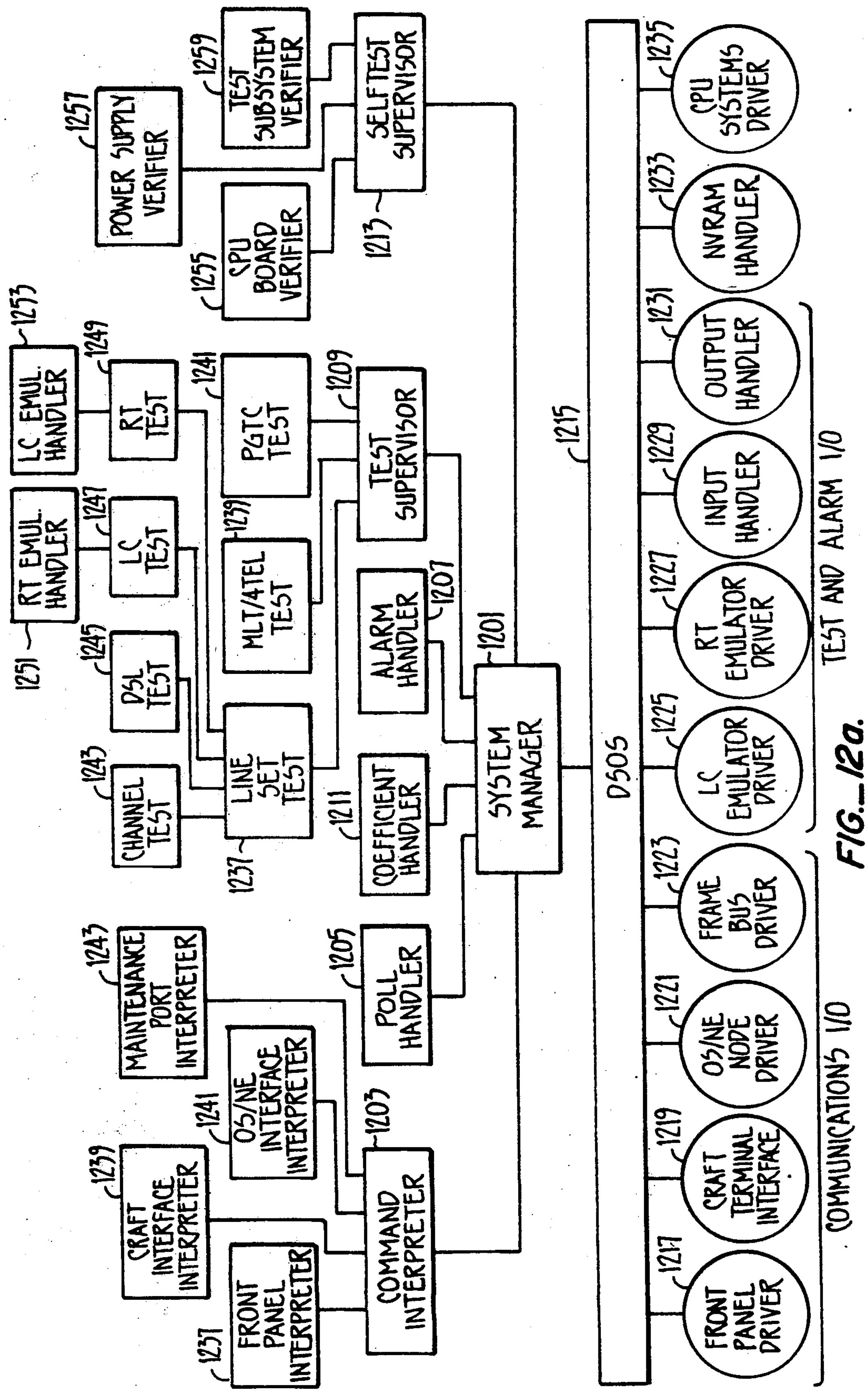
FIG._12a.

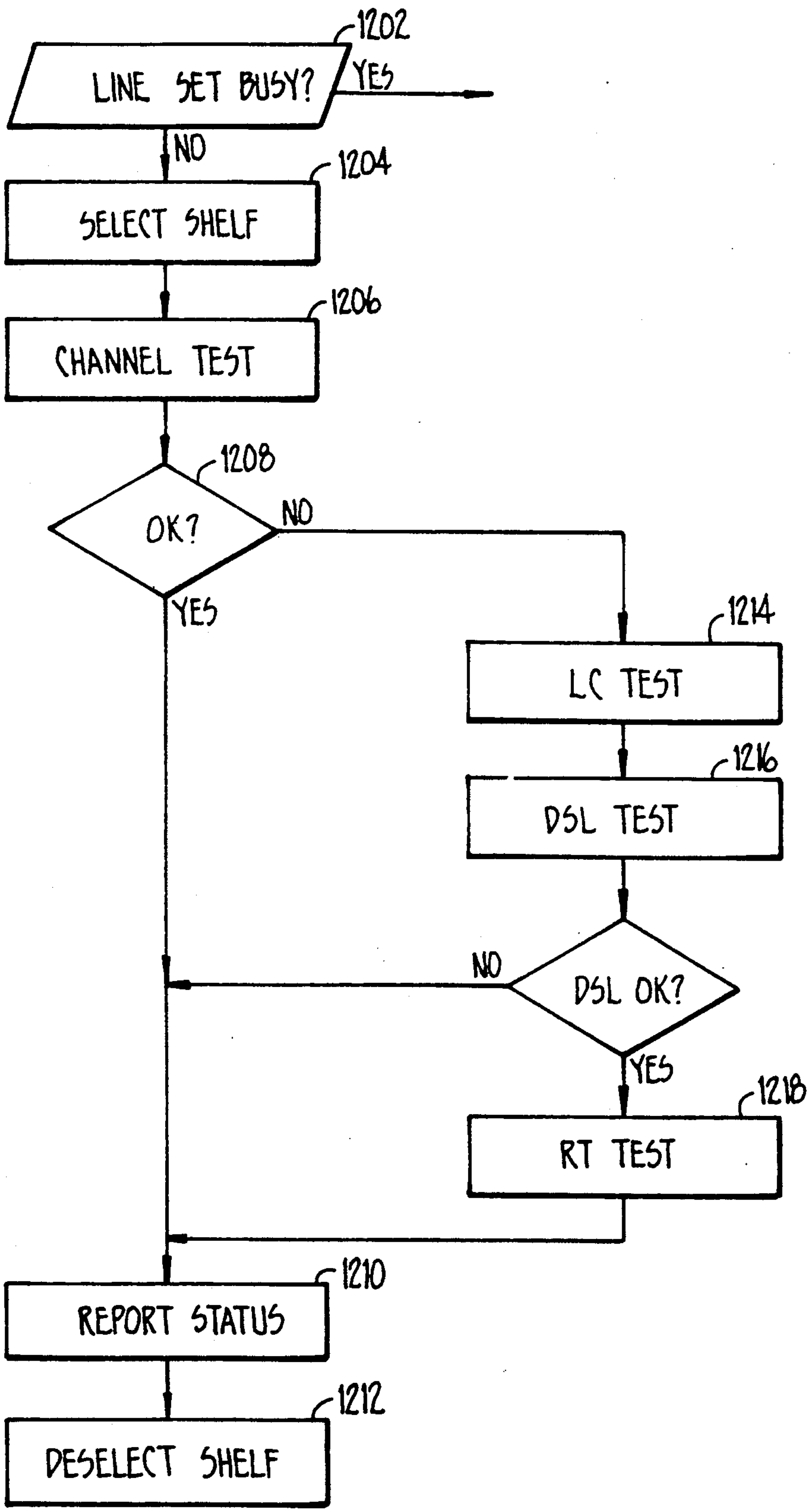
FIG._12b.

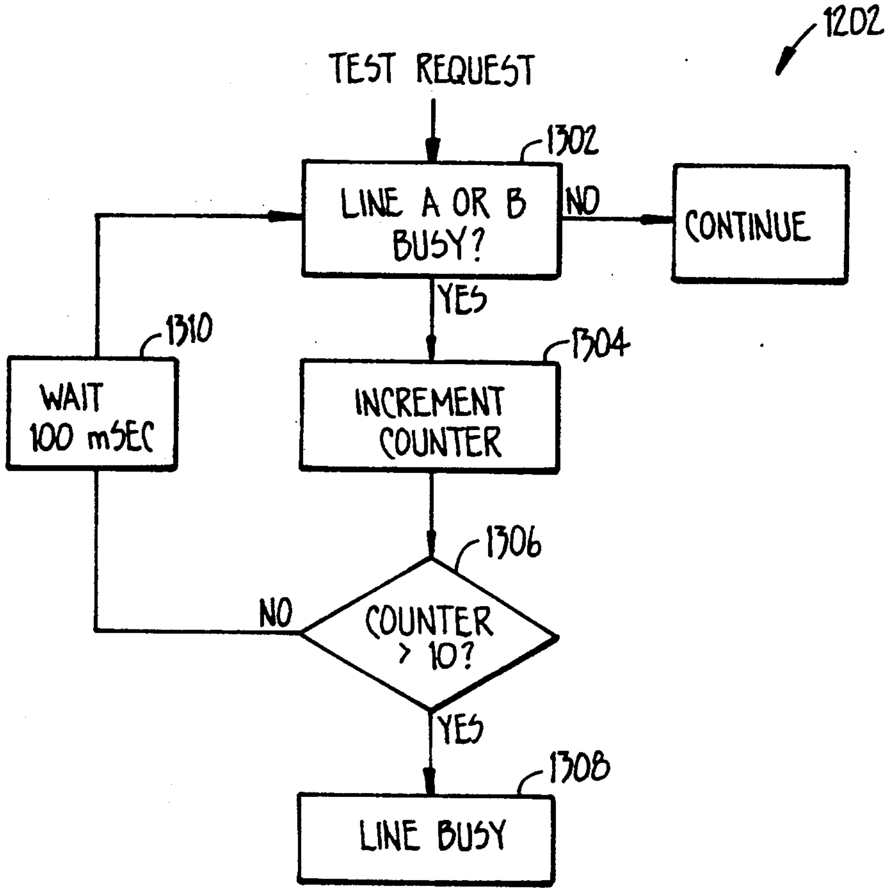
FIG_13a.
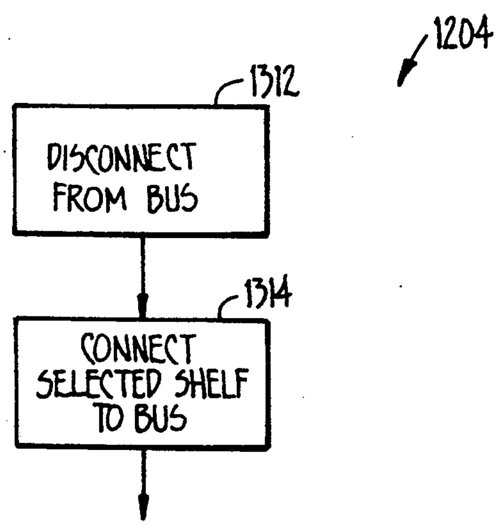
FIG_13b.

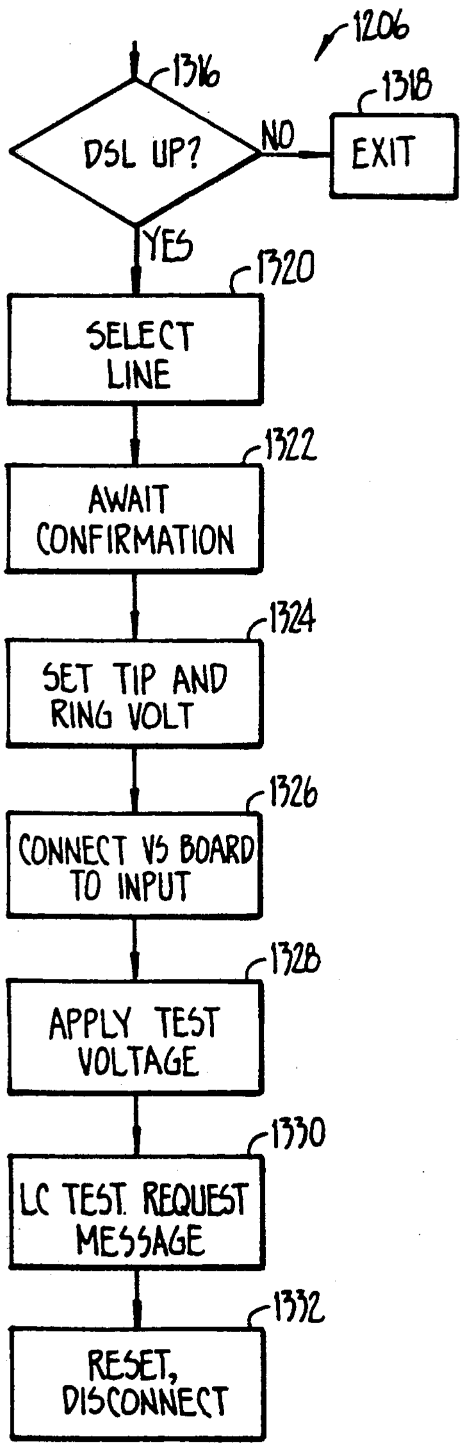
FIG._13c.
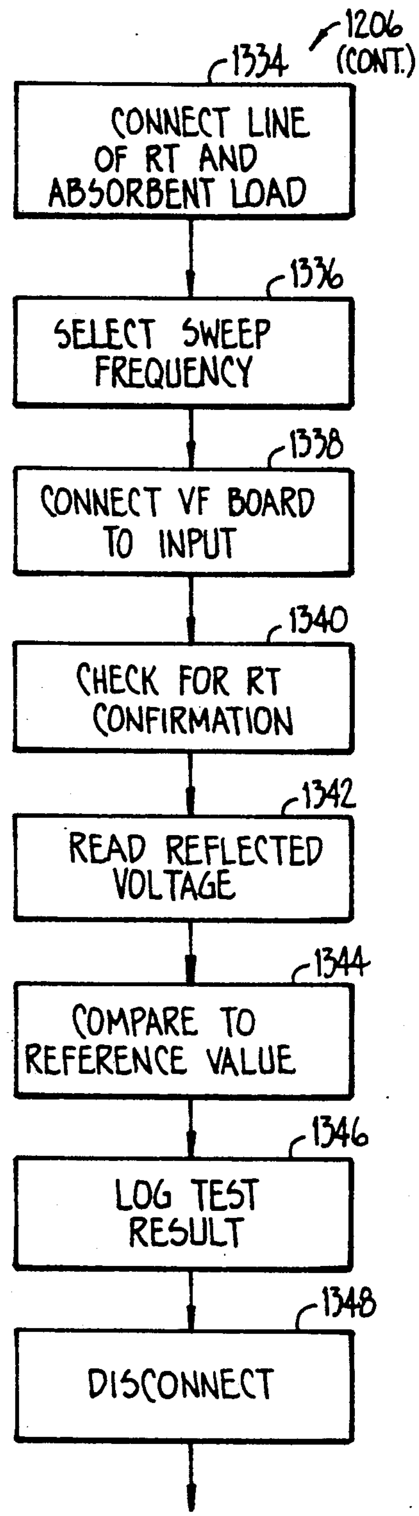
FIG._13d.

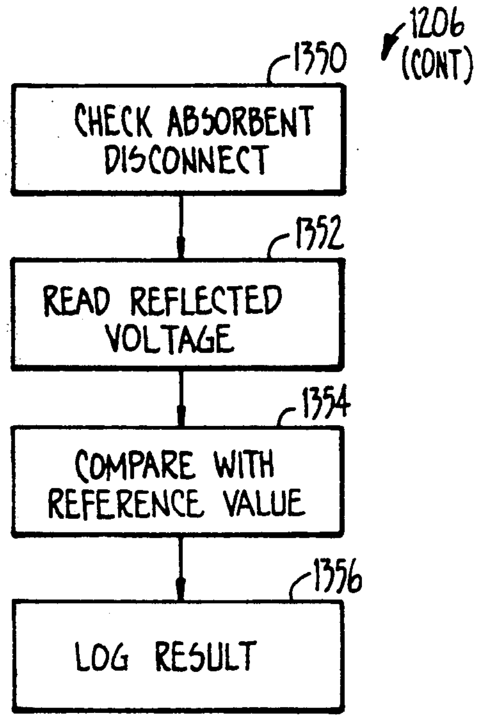
FIG._13e.
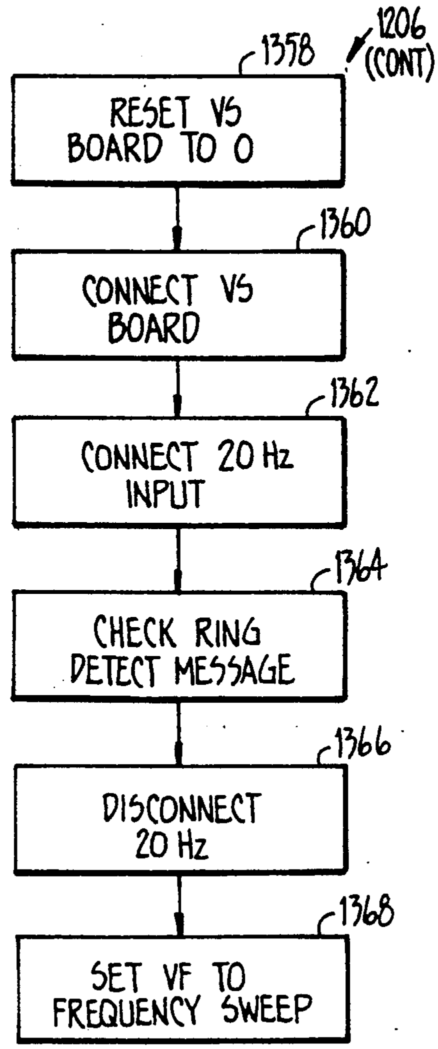
FIG._13f.
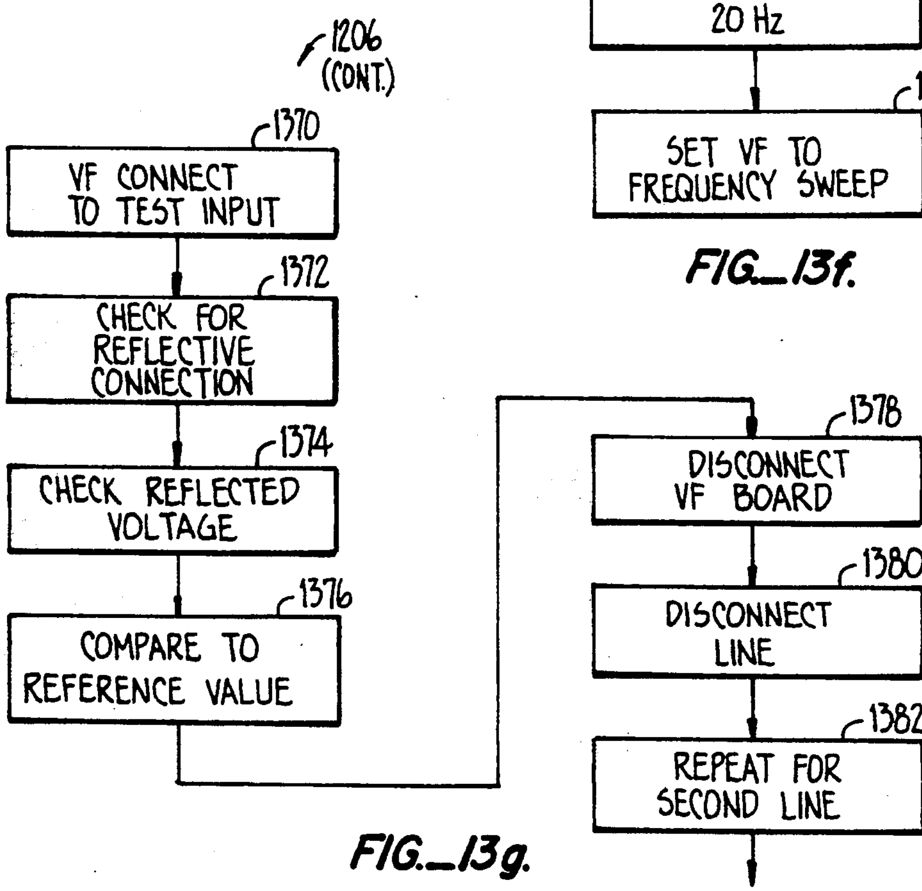
FIG._13g.

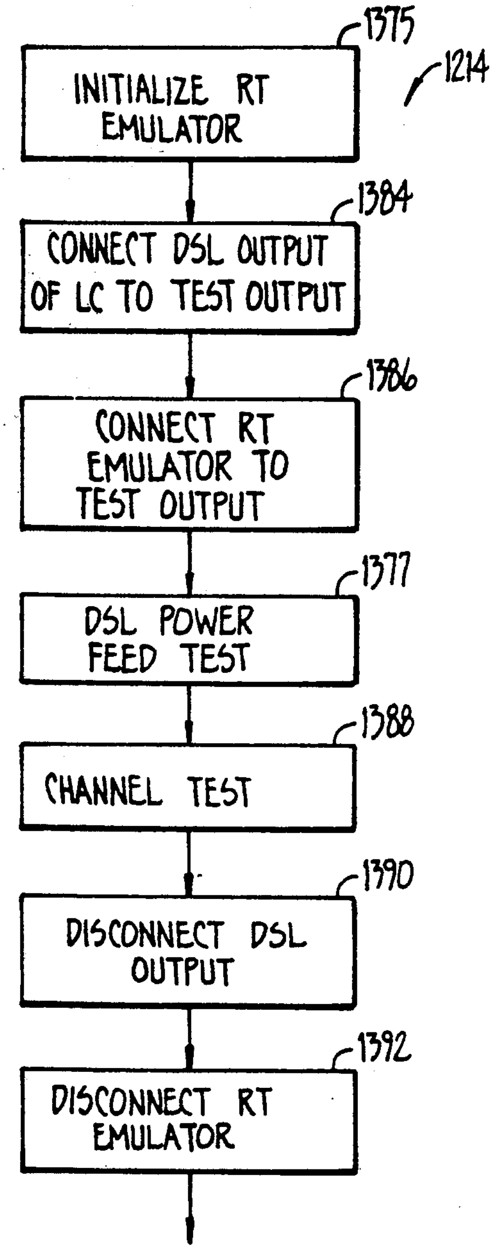
FIG._13h.
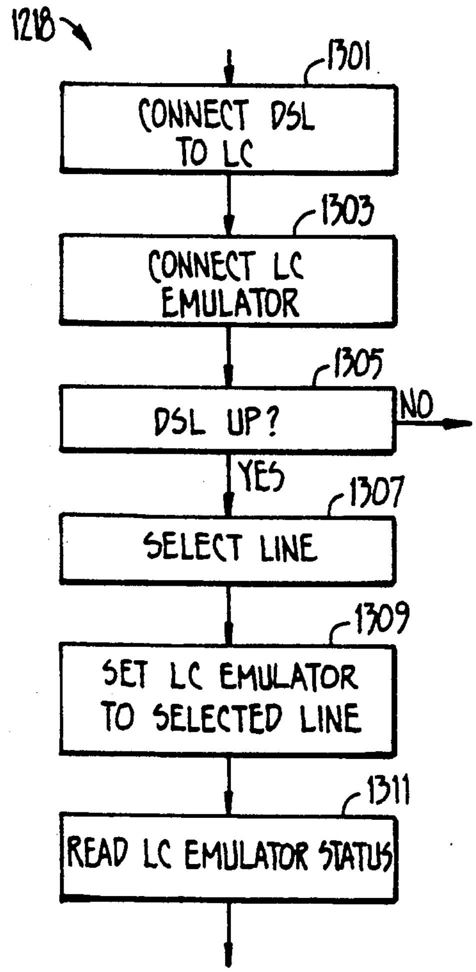
FIG._13j.
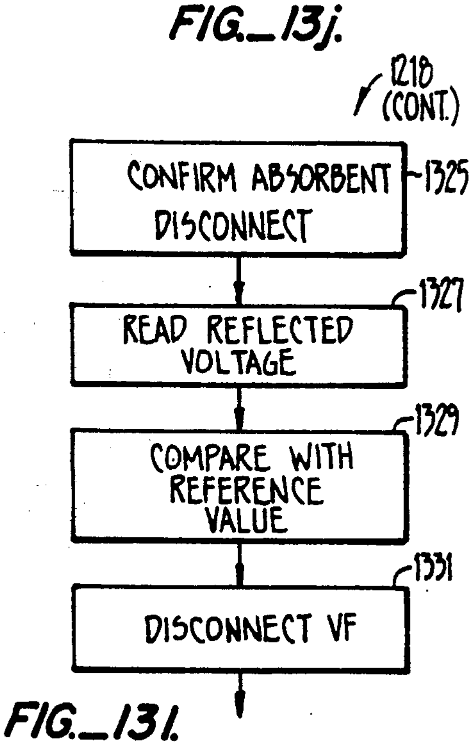
FIG._13l.

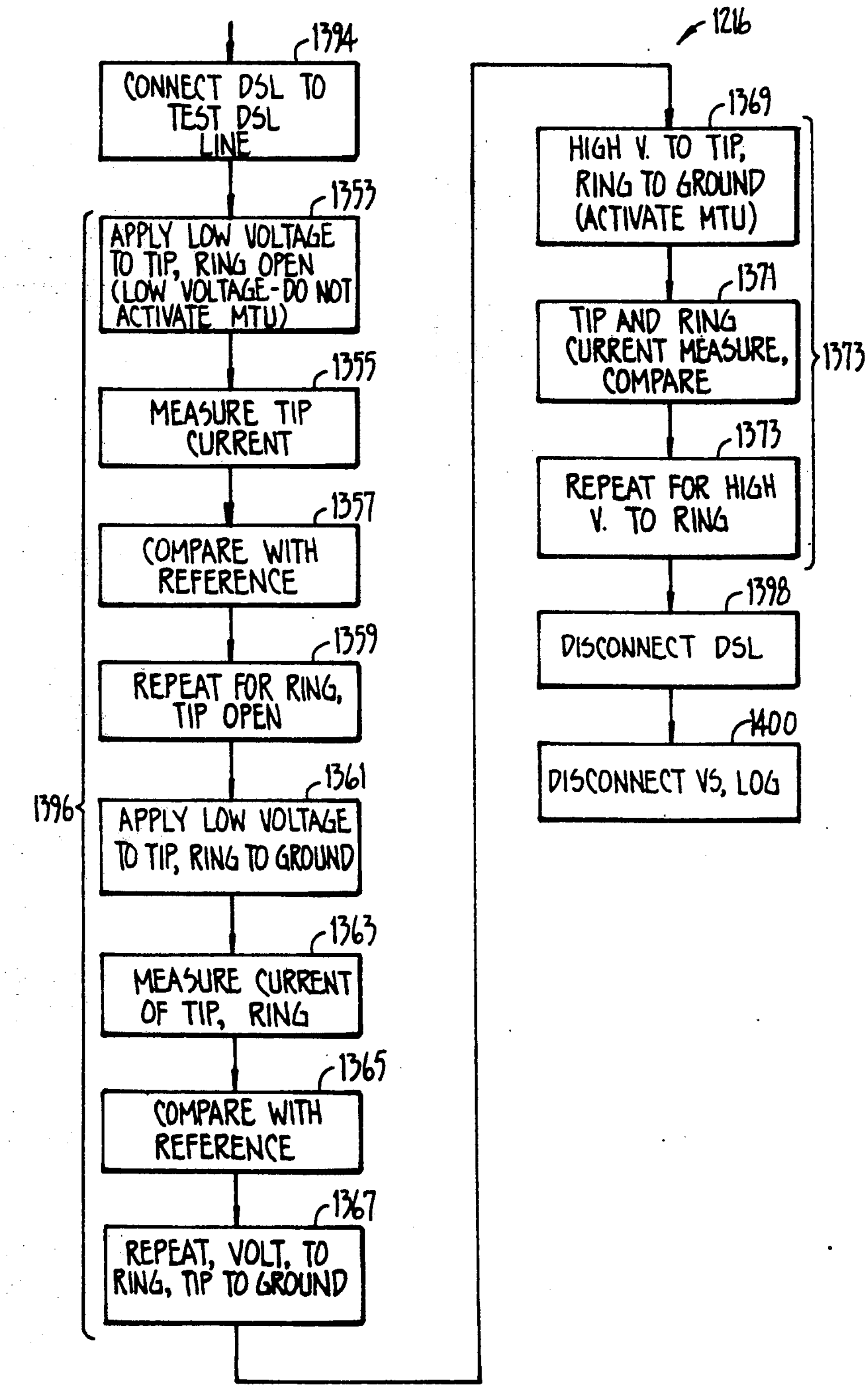
FIG._13i.

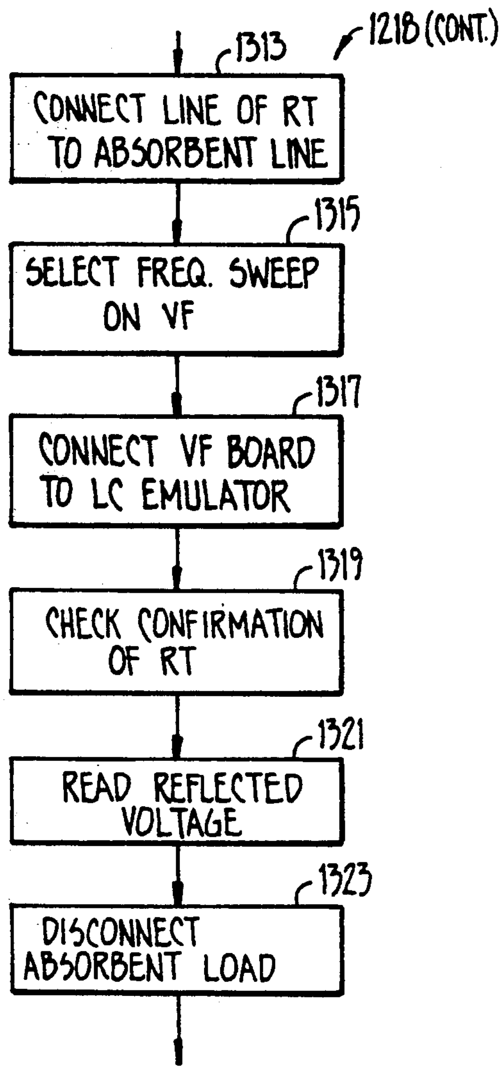
FIG._13k.
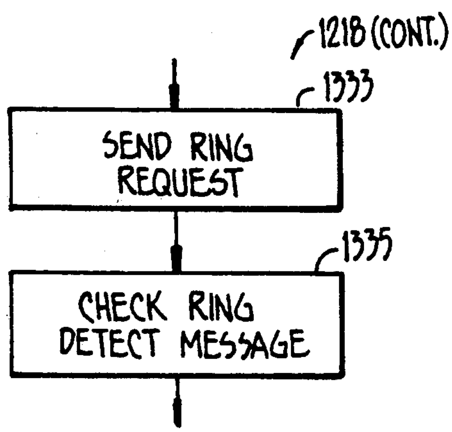
FIG._13m.
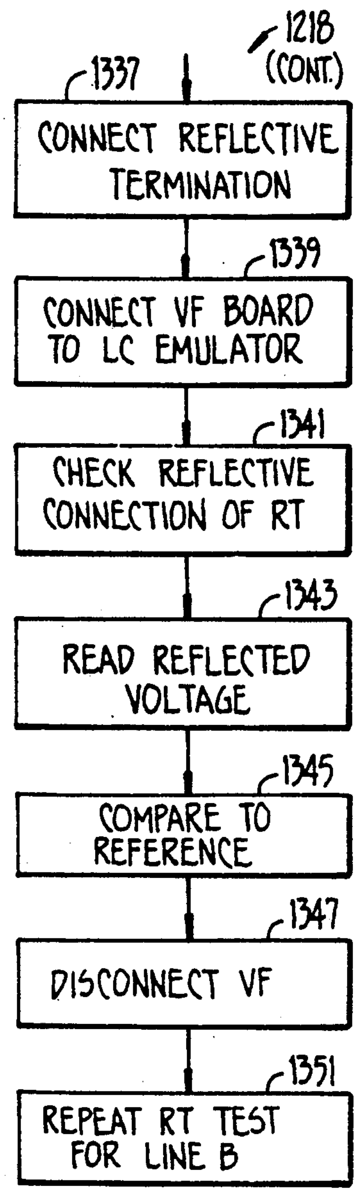
FIG._13n.

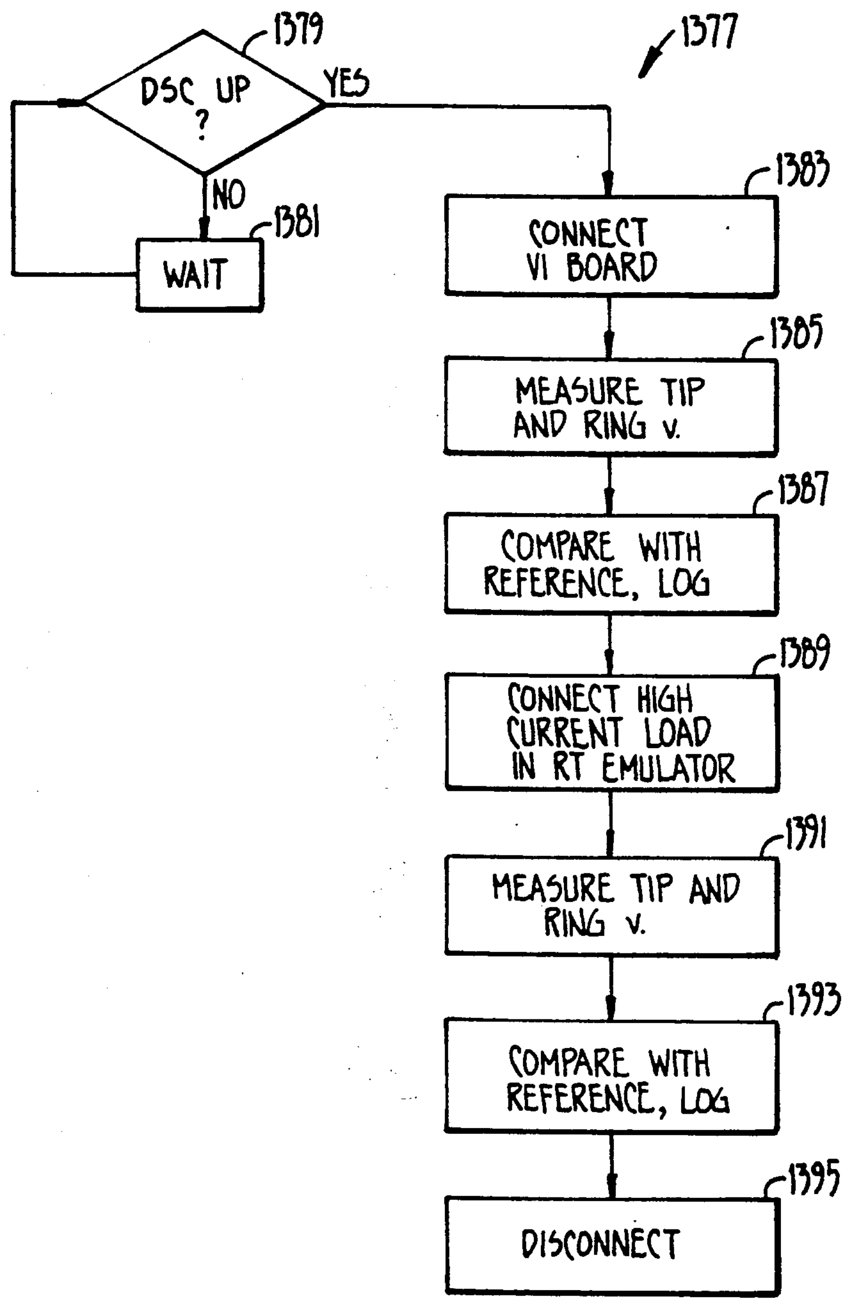
FIG._13o.

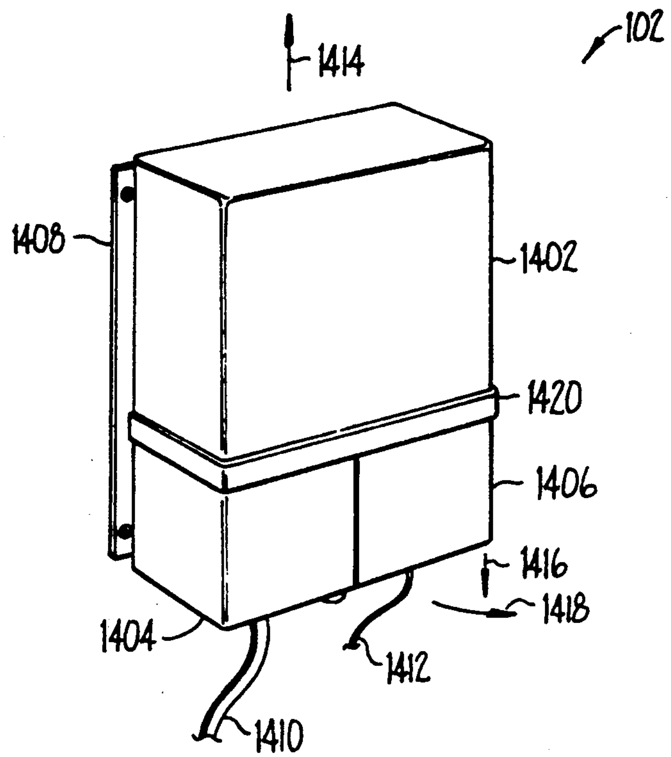
FIG._14.

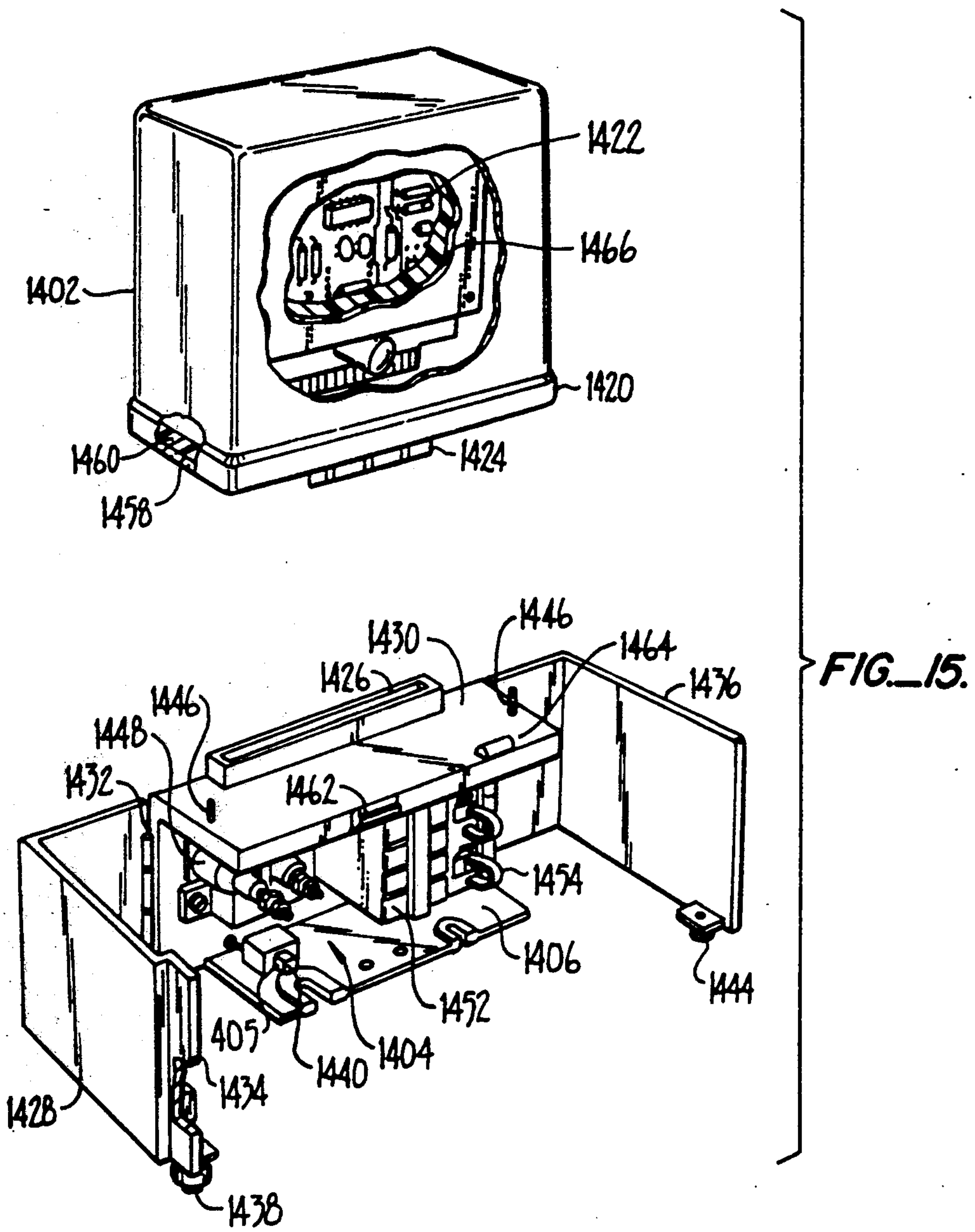
FIG_15.

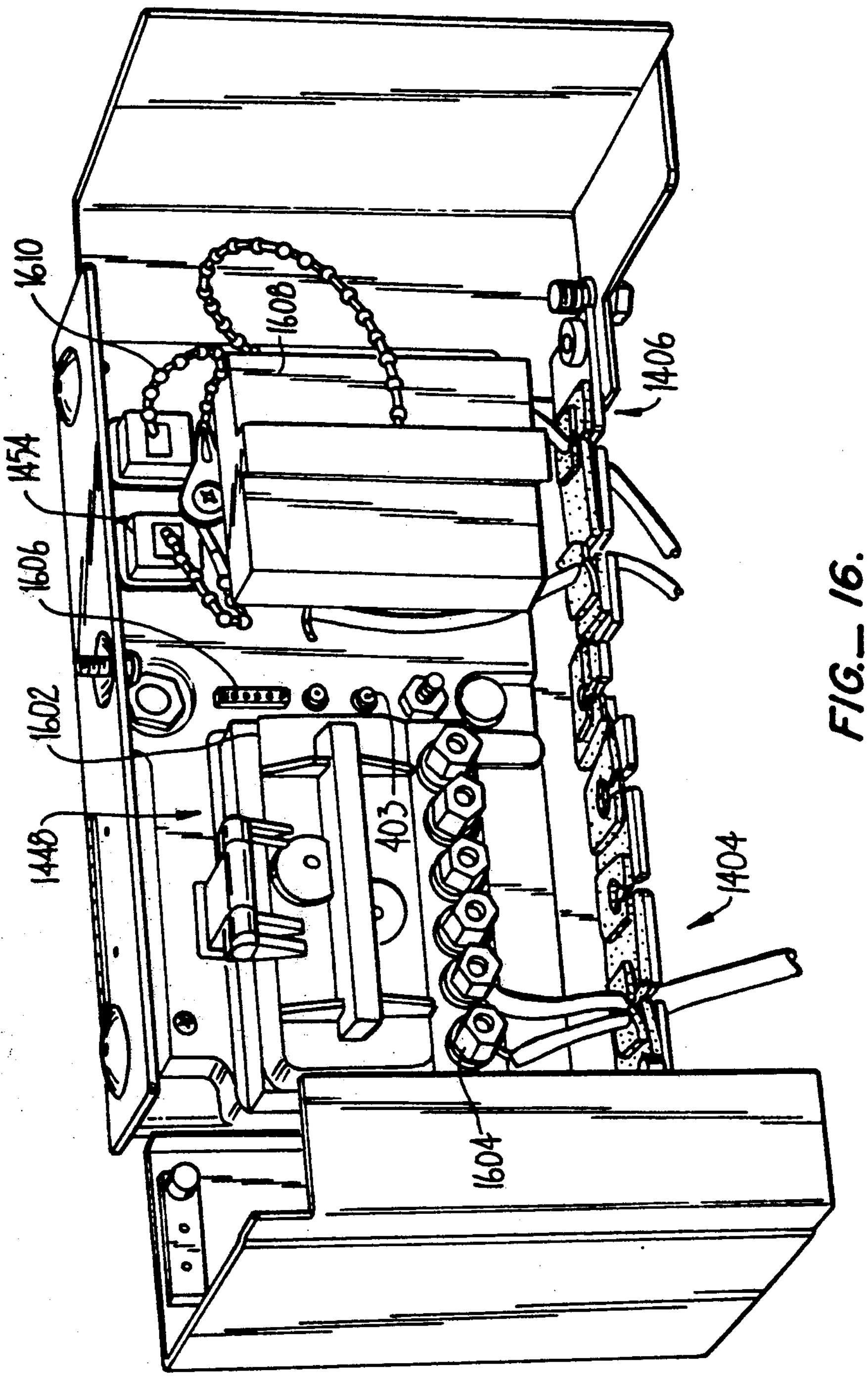
FIG._16.

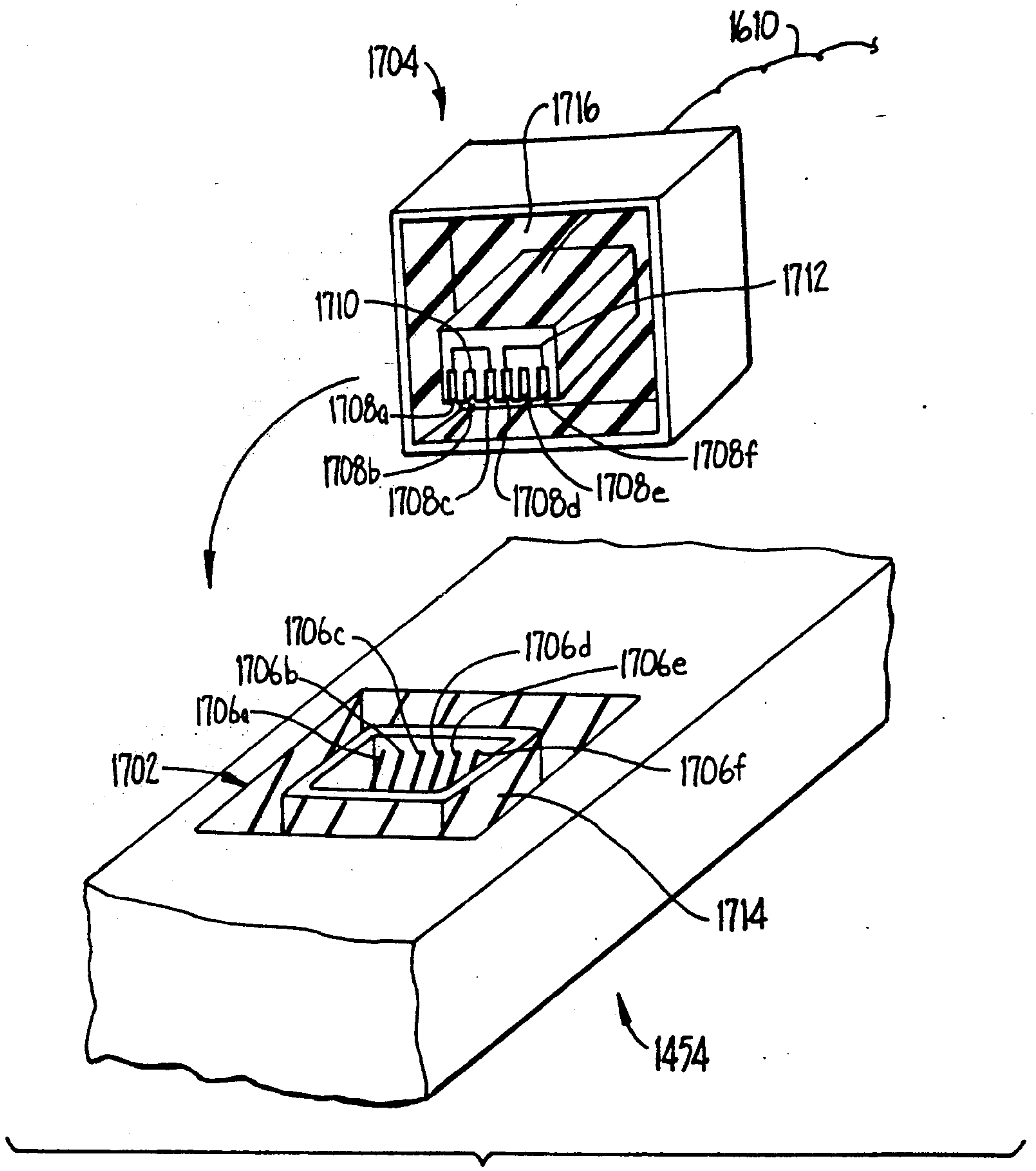
FIG._17.

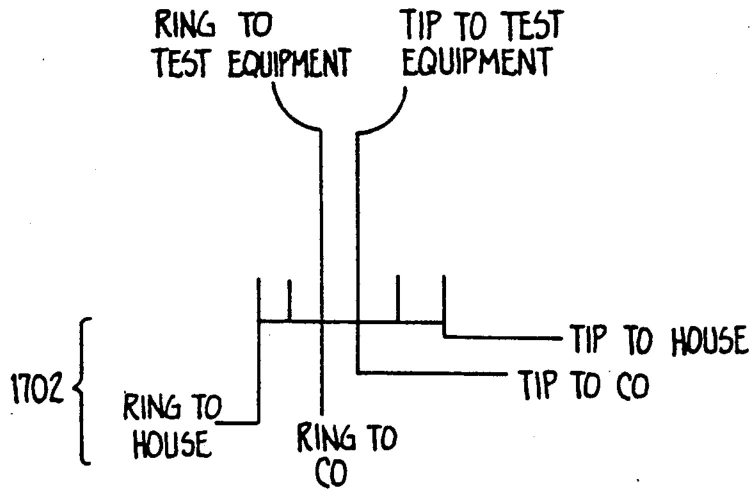
FIG._18a.
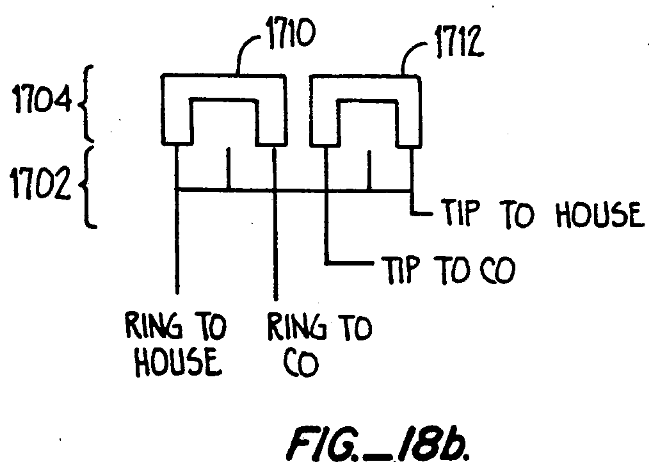
FIG._18b.

GEL FILLED RJ11 CONNECTOR

This is a Rule 60 continuation of U.S. application Ser. No. 584,325, filed Sep. 17, 1990, now U.S. Pat. No. 5,111,497.

CROSS REFERENCE TO RELATED APPLICATIONS

This application is related to application Ser. No. 07/385,610, filed Jul. 25, 1989, which is completely incorporated herein by reference for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates to the field of telephone communication. More particularly, in one embodiment the present invention provides a method and apparatus for simultaneously transmitting information from multiple phone connections over a single twisted pair line.

Techniques for transmission of multiple voice or data signals over a single phone line are well known in the telecommunications industry and are commonly referred to as concentration techniques. In the past, frequency division multiplexing was the most commonly used technique for simultaneous transmission of multiple voice or data signals over a single line. Frequency multiplexing techniques are still commonly used in, for example, wideband transmission media.

Digital time division multiplexing techniques have been used since the 1960's and have become the most common concentration technique in, for example, interoffice circuits. An entire family of T-carrier (Trunk carrier) systems such as T1, T1C, T1D, T2, and T4, have been developed for concentration of multiple voice and data signals over a common line. Digital concentration techniques are described in, for example, Bellamy, *Digital Telephony,* Wiley and Sons, 1982, which is incorporated herein by reference for all purposes.

Digital communication has become relatively standard in, for example, intraoffice trunks. One example of a method for transmitting multiple voice or data signals over a single two- or four-wire transmission line is disclosed in Kaiser et al., "Digital Two Wire Local Connection Providing Office Subscribers With Speech, Data, and New Teleinformation Services," ISSLS, March 20–24 (1978). In Kaiser et al., telephone data, viewdata, telecopier information and the like are transmitted in a digital fashion over a two- or four-wire line to a local exchange. Digital data are transmitted in data bursts which are later expanded and recovered using, e.g., time division multiplexing techniques.

Despite advances in the multiplexing techniques a variety of problems remain. For example, some multiplexing techniques continue to require complex and, therefore, uneconomical equipment. This equipment is particularly unsuitable for individual or small office users. Further, when applied to residential users, small office users, and the like, some systems require that the user provide a power source such as a transformer connection to a 120 v. power source, a battery power source or the like. Some systems require that the user replace existing two-wire connections with less conventional connections and/or are limited in the distance of twisted pair line over which information may be transmitted. In spite of certain advances in the ability to transmit multiple voice and data signals over single twisted pairs, most local switching units continue to provide a single analog signal over a single twisted pair to a typical home or office.

Prior techniques for providing service to home or office users have also provided limited capability for detection of failures in the system. Testing equipment has previously included, for example, the so-called MLT or 4TEL mechanical line testers and the SLIC 96. While meeting with some success, prior failure detection systems have met with certain limitations, particularly when applied to digital systems over twisted pairs between telephone company equipment and a subscriber. For example, some prior systems have been able to detect that a failure has occurred, but have been unable to identify the location of the failure. Other systems have been incompatible with existing telephone company facilities, or with digital twisted pair systems. Other equipment has required the installation of a test line between the central office terminal and a remote terminal at a customer facility. Still other systems have been exceedingly complex and/or costly.

Limitations with the mechanical enclosures for telephone equipment at customer facilities have also been encountered. Some enclosures have provided insufficient weather protection. Some enclosures have provided only limited access to frequently used components, have been excessively complex, utilize expensive components or fabrication techniques, or combinations of the above.

Problems have also arisen in connection with test ports for customer telecommunictions equipment such as remote terminals at customer facilities. It is often desirable to provide an RJ11 connector of the type well known to those of skill in the art, or other such connector, at an external loction at subscriber facilities such as a junction box leading to a house or a remote terminal of the type described above. Previously, such access is provided by installing a female RJ11 socket at such locations which is normally connected to a male RJ11 plug. The tip and ring wires (among others in some cases) lead from the female RJ11 socket, and connect to tip and ring connections in the male RJ11 plug, thereafter leading into the subscriber facility. When it is desired to connect test equipment to the RJ11 female socket, the plug is removed, and another male RJ11 is inserted into the female socket, thereby providing tip and ring connections for the test equipment.

Problems have arisen with such arrangements, however. For example, it is sometimes difficult to establish and maintain an adequate environmental seal in a removable male RJ11 plug, particularly when wires lead from the male RJ11 plug. Accordingly, moisture and other environmental contaminants are allowed to enter such plugs, sometimes resulting in corrosion and/or failure of the connection of the tip and ring connections in the socket/plug combination.

It is desirable to provide an improved and more economical method and associated apparatus for multiplexing multiple phone line connections over a single twisted pair connection especially for use in providing multiple phone lines over a single twisted pair into a home or office from a local telephone exchange. It would further be desireable to provide a system which provides useful alarm and failure detection systems which are also compatible with conventional telephone company service facilities. It is also desirable to provide an improved protection system for such equipment, as well as test access to customer equipment.

SUMMARY OF THE INVENTION

An improved method and apparatus for transmission of multiple signals over a single twisted pair is disclosed which provides in its various embodiments for the previously recited desirable features among others. In a preferred embodiment the invention provides for transmission of multiple voice and/or data signals over a single twisted pair from a local telephone exchange to a subscriber.

An improved test and alarm system for the digital transmission system is also disclosed. The alarm system provides for both automatic and self test. The system provides identification of the location of any failures in the system and is compatible with current telephone company repair and service facilities such as MLT/2 manufactured by AT&T, the Pair Gain Test Control (PGTC) system manufactured by AT&T, and 4TEL by Teradyne.

In one embodiment the test and alarm system comprises a test system for a digital main line system, the digital main line system including a line card (LC) at central office facilities and a remote terminal (RT) at a subscriber location. The digital added main line (DAML) system is adapted to transmit multiple signals in digital form from the line card to the remote terminal location over a twisted pair wire. The line card converts conventional analog signals to 2B1Q signals for transmission and the remote terminal converts the 2B1Q signals back to analog for use with conventional subscriber equipment. In a preferred embodiment, the system includes a remote terminal emulator at the central office facilities, the remote terminal emulator emulating output of the remote terminal with a predefined data pattern; and means for comparing a response of the line card to the emulated output so as to detect failures in the line card. The test system may further include a voltage source current monitor attached to the twisted pair, the voltage source current monitor adapted to detect failures in the twisted pair and generate ring and test request voltage for checking parts of the line card; a line card emulator, the line card emulator emulating output of the line card for transmission over the twisted pair; and means for detecting terminations, so as to detect failures in the remote terminal.

The test system may also include a voice frequency emulator, the voice frequency emulator connected to the line card or line card emulator for conversion to a digital signal for transmission over the twisted pair to the remote terminal, and means for evaluating a returned amount of noise or reflected signal so as to evaluate the function of the line card, the twisted pair and/or the remote terminal.

The test system includes testing of the digital-to-analog conversion equipment at the remote terminal, i.e., the RT is tested to a point after a subscriber line interface circuit. Furthermore, tests of a ring signal at the RT are conducted. Operation of test requests from telephone company equipment are tested by removing the analog input lines from service and reproducing various MLT voltage signals.

An improved enclosure for a remote terminal is disclosed. The enclosure includes a modular, sealed case for electronic components mounted on one or more circuit boards. The sealed case is preferably downwardly facing and mounted on a second enclosure. The second enclosure includes a first, user-accessible section and a second, restricted-access section. The user-accessible section is covered by a first door and the restricted access section is covered by a door having a limited access closure device such as a protected fastener, lock, one-way screw, or the like.

An improved test access port is also disclosed, especially for use in conjunction with the remote terminal in one embodiment. In a preferred embodiment the test access port includes, for example, a male plug and female RJ11 socket. Such connectors include tip and ring connections on, for example, the third and fourth terminals of the socket and plug.

In one preferred embodiment a male, dummy plug is provided for installation in the female test socket when the socket is not being used for attachment of test equipment. The male plug shorts or shunts the tip connection of the female RJ11 to, for example, the first terminal of the female RJ11 socket. The male dummy plug also shorts the ring connection of the female RJ11 socket to, for example, the sixth terminal of the RJ11 socket. The first and sixth terminals of the female socket are then connected electrically via, for example, a terminal block, to the wires leading into a home, office, or other subscriber location. The arrangement allows access to the female test socket for maintenance operations while allowing the system to be more effectively sealed from environmental contaminants during normal operations. In preferred embodiments, the female plug, a region surrounding the perimeter of the female plug, and/or a cap structure around the male plug are filled with gel sealant for further environmental protection.

A further understanding of the nature and advantages of the invention may be had with reference to the following figures and description.

BRIEF DESCRIPTION OF THE FIGURES

FIG. 1 is an overal block diagram of the system;

FIG. 2 is an overall block diagram of a remote terminal (RT) according to one embodiment of the invention;

FIG. 3 is an overall block diagram of a line card (LC) according to one embodiment of the invention;

FIG. 4*a* is a block diagram illustrating portions of the system used for test and alarm functions and FIG. 4*b* illustrates the master architecture in greater detail;

FIG. 5 illustrates the voltage source current monitor;

FIG. 6 illustrates the RT emulator in greater detail;

FIG. 7 illustrates the voice frequency OSC/monitor in greater detail;

FIG. 8 illustrates the LC emulator in greater detail;

FIG. 9 illustrates the PGTC interface and drop emulator in greater detail;

FIG. 10 illustrates the alarm status interface in greater detail;

FIGS. 11*a* to 11*m* are flow charts illustrating the LC/RT microprocessor code;

FIG. 12*a* and 12*b* are an overall block diagram illustrating the master control software architecture;

FIGS. 13*a* to 13*o* illustrate the master control operation and software in greater detail;

FIG. 14 is an isometric drawing illustrating the RT housing in a closed position;

FIG. 15 is an isometric view of the RT housing with open access doors;

FIG. 16 is a detailed fron view of one embodiment of the customer and telephone company equipment compartments;

FIG. 17 is a mechanical illustration of the test access port at the RT or other subscriber equipment; and FIGS. 18*a* and 18*b* are simplified wiring diagrams schematically illustrating operation of the test access port.

DETAILED DESCRIPTION OF THE PREFERRED EMBODIMENTS

CONTENTS

I. Definitions
II. General
III. Data Transmission Hardware
A. RT Hardware
B. LC Hardware
C. Shelf Control Hardware
IV. Master Control Hardware
A. General
B. Overall Hardware Description
C. Test Hardware
1. VSCM Board (VI)
2. RT Emulator
3. Voice Frequency/OSC Monitor (VF)
4. LC Emulator
5. PGTC/Drop Emulator Interface
D. Alarm Hardware
V. Software/Microprocessor Functionality
A. RT/LC
B. Master
1. Software Architecture
2. Test Software Operation
VI. RT Enclosure
VII. Test Access Port
VIII. Power Management
IX. Conclusion I. Definitions Certain terms and abbreviations are intended to have the following general definitions:

ACO—alarm cutoff
CID—craft interface device
COE—central office equipment
COT—central office terminal
COAS—central office alarm system
DAML—digital added main line
DSL—digital subscriber line
E2A (SAC)—Telemetry Standard for Alarms: status and command
E2A (APR)—Telemetry Standard for Alarms: alarm processing remote
IECQ—ISDN echo cancellation circuit,
ISDN—integrated services digital network
LC—line card
ICC—ISDN communications controller
MC—master controller
MTS—message telephone service (otherwise known as POTS lines)
OS/NE—Operation System/Network Element (An X.25 connection to central office equipment for monitoring and control of master controller)
OSC/OSI—Operating System Interface
PGTC—Pair Gain Test Control
POTS—plain old telephone service
RT—remote terminal
SC—shelf controller
SICOFI—dual channel signalling codec filter
SLIC—subscriber line interface circuits
X.25—CCITT standard for interface to packet switched networks
2B1Q—Two Binary, One Quatenary, ANSI standard ISDN line transmission method for encoding 2 data bits onto a single 4-level symbol
4B3T—four binary, three ternary line transmission method II. General An improved method and apparatus for transmitting and receiving data over a single twisted pair wire are disclosed herein. The method and apparatus will find particular utility and is illustrated herein as it is applied in the transmission of multiple voice, data, and alarm signals over existing twisted pair lines which are used to connect homes, offices, and the like to local switching facilities, or central offices, but the invention is not so limited. The invention will find use in a wide variety of applications where it is desired to transmit multiple voice and/or data signals over a single twisted pair including, for example, facsimile, computer data, alarms, and/or low-speed video signals.

The Digital Added Main Line (DAML) described herein is a pair gain system. Parts of the system are drawn from and compatible with the Bellcore Universal Digital Channel. The system provides two Message Telephone Services (MTS) (a/k/a POTS lines), and two Auxiliary lines over a single copper twisted pair. The system uses ISDN 2B1Q line format to transport the signal, is line powered, and includes various self-test capabilities. The ISDN 2B1Q line format supports two 64 kbps voice channels and a single 16 kbps data channel, as well as additional signalling overhead over a single twisted pair. The data channel is partially used for system overhead functions and to support maintenance and alarm capabilities of the system.

As shown in FIG. 1, the system includes a digital subscriber line (DSL) 100, connected at the subscriber end to a Remote Terminal (RT) 102, and at the central office end 112 to a Line Card (LC) 104. Each RT-LC pair and it's associated DSL constitute a line set (LS).

The remote terminal supports the connection of up to two analog POTS lines 106*a* and 106*b* connected to subscriber equipment 108, and two auxiliary lines 107*a*, 107*b* for continuity lines (used in, for example, burglar alarms). Each of several line cards 104 are connected to the exchange 109 in the central office by two analog subscriber lines 110*a*, 110*b*. Each line card also has two additional auxiliary ports 113*a*, 113*b*.

Up to, for example, 17 line cards are plugged into a powered backplane containing a single Shelf Controller (SC) 114. The shelf controller communicates with the line cards via a single serial line through a backplane with a 4.8 kbps asynchronous RS-232, also referred to as the shelf bus (SB) 116. The shelf controller serves to monitor and communicate with the line cards.

Up to, for example, 30 shelf controllers communicate with one master controller (MC) 118, over an RS-485, synchronous serial line running at, for example, 48 kbps, also referred to as the frame bus 120. The purpose of the master controller is to allow local or remote control and alarm and test functions for the line sets. The master controller can be controlled from a front panel 411 or a central office interface (OS/NE) 414, via an X.25 connection. The master controller also has an additional synchronous serial port RS-232 known as the craft interface 413 for maintenance purposes and has various central office alarms 416.

III. Data Transmission Hardware

A. RT Hardware

FIG. 2 is a block diagram of a remote terminal (RT) 102 according to one embodiment of the invention. The RT would be placed in, for example, a home, office or other subscriber facility for transmission and/or reception of voice or data signals over the single twisted pair line 100. A plurality of phones or other subscriber equipment would utilize analog signals produced by the RT and provide analog signals to the RT for transmission over the twisted pair.

A conventional two-wire DSL 100, which may be the type commonly leading into households, offices, or the like provides input/output to the RT. As will be readily apparent to those of skill in the art, the signals transmitted over the DSL could either be a telephonic voice or data signal from the LC. The invention will be illustrated herein as it applies to the RT primarily with regard to an incoming signal, but the process is similarly applied in reverse to provide voice and data signals from the RT to the LC.

The DSL signal, representing in digital form a voice or data signal, enters a two-wire to four-wire line transformer 202 for isolation and for impedance matching via a maintenance termination unit 406. The voice or data signal entering the line transformer 202 is an 80 ksymbols/sec (i.e., kbaud/sec) signal having one of four voltage levels (2B1Q). While the invention is illustrated herein with regard to the preferred 80 ksymbols/sec signal, it is believed that the invention herein would find utility using signals of between about 50 and 100, and preferably between 70 and 90 ksymbols/sec. Using other standards, such as 4B3T (a ternary symbol), other rates may be desirable such as 120 ksymbols/sec. The data rates and standards and rates used herein are of course only illustrative and will of course vary from one system to the next and as the underlying technologies evolve. The use of an 80 ksymbols/sec 2B1Q ANSI line protocol signal permits the transmission and reception of voice and data signals over extended lengths of twisted pair wires, e.g., 1,000, 15,000, 20,000, 60,000 feet or more, without substantial smearing, i.e., signal quality over large distances is improved because the lower frequency 80 ksymbols/sec signal may be more readily separated. These results are achieved over conventional line sizes such as 19, 22, 24 or 26 awg.

Preferred two- to four-wire conversion circuits are disclosed in U.S. application Ser. No. 07,579,006, "Improved Coupling Circuit for Two-Wire Transmission Systems", incorporated completely herein by reference for all purposes.

The signal from the line 2w/4w transformer 202 enters an ISDN Echo Cancellation-Quaternary (IECQ) chip 204 via line 203. The 80 ksymbols/sec 2B1Q ANSI line protocol signal contains 160 kbits/sec of information and the IECQ chip 204 converts the 80 ksymbols/sec signal into a 160 kbits/sec binary signal. The 160 kbits includes 16 kbits of control information and 144 kbits of user data. The ICC operates on a clock signal (CLK) at, for example, about 520 kHz and a frame control signal (FSC) at, for example, about 8 kHz.

Over a one-wire serial bus 213, the ICC chip 206 sends 8 bits of data on one channel, 8 bits of data on the other channel, 8 bits of control, and 8 bits of signal data to Codec Filter (SICOFI) 210, and then repeats, permitting substantially simultaneous transmission/reception of two or more voice or data signals. Monitor data, ring data, and other data which the microprocessor polls are also made available to the microprocessor.

SICOFI 210 converts the binary bits for each channel into analog voice or data signals in which frequency and amplitude are modulated. The analog signals are then transmitted over lines 209 to Subscriber Line Interface Circuits (SLIC's) 212*a* and 212*b*. SLIC's 212*a* and 212*b* are four-wire to two-wire converters and control the power available for utilization by the subscriber's phone or other communication device by superimposing the analog AC signal on DC such as 48 or 24 v. DC. Conventional analog information is provided to subscriber phones from the SLIC's over lines 214*a* and 214*b*.

Ring generator 216 is connected to a line via relays when it is desired for a phone to ring, under the direction of the microprocessor. The ring generator is not active under normal states, and is activated and connected to the line via a relay only when a ring signal is transmitted (in digital form) over the twisted pair in preferred embodiments. Power supply 218, using a process more fully described below, provides general power and ring power to the phones at appropriate times via a ring bus 220. Test loads 428/430 are used for imposing loads selectively on the lines under the direction of the microprocessor during testing operations. Auxiliary lines 1 and 2 are used for alarms and the like. Relays selectively connect the ring generator and test loads. A maintenance port 430 and status indicators 403 may also be provided in some embodiments.

Outgoing signals from the subscriber are processed in a similar but reverse method from incoming signals. In particular, analog signals enter SLIC's 212*a* and 212*b* for two-wire to four-wire conversion via lines 215. Signals from SLIC's 212*a* and 212*b* enter SICOFI 210 via lines 209 for analog-to-binary 8-bit word conversion. These 8-bit words are, thereafter, converted in ICC 206 into a binary stream containing 160 kbits/sec of user information (144 kbits of user data plus 16 bits of line control) for input to IECQ 204 via line 205. IECQ 204 converts the 160 kbits/sec signal to an 80 ksymbols/sec quaternary signal for transmission to telephone company equipment over the twisted pair 100.

B. LC Hardware 1. FIG. 3 is a block diagram of a line card (LC) 104 which would be placed in a local switching unit, central office, or other telephone company equipment at the terminus of a twisted pair wire 100 from a home, office or the like. The function of the LC is similar to that of the RT, but reversed, i.e., the LC converts conventional analog signals from local exchange lines 110*a* and 110*b* to appropriate digital signals for transmission over the twisted pair and converts digital signals from the twisted pair to analog for transmission over local exchange lines. Of course, the LC is not generally power constrained (due to its location and lack of need to provide ring capability) and may function using a conventional 48-volt power supply. A DSL power feed 352 is used to power the Rt from the local switching unit.

Ring detects 354*a* and 354*b* detect an incoming ring signal from switch lines 350*a* and 350*b* from the two analog switch lines by AC coupling. When a ring is detected the microprocessor sends an appropriate digital ring signal in the line control data so as to ring a line at the RT. Test detects 355*a* and 355*b* detect a voltage indicative of a test request from the local phone company.

Incoming analog signals enter SICOFI 356 from the switch lines via two-wire to four-wire converters 369 and lines 355*a* where they are converted to digital, 8-bit words similar to those in the RT described above. SICOFI 356 transmits to the ICC via bus 357. ICC 358 serves a multiplexing and data handling function similar to that of the ICC in the RT and transmits 160 kbits/sec of user information (144 kbits of user data plus 16 bits of lien control) to IECQ 360 via line 359 for conversion to 80 ksymbols/sec quaternary signals for transmission over twisted pair 100 via four-wire to two-wire converter 361 preferably using circuitry disclosed in the above reference and incorporated application. The LC similarly processes incoming digital information from the RT in a reverse order.

The functionality of the LC is overseen by a microprocessor 360, similar to the RT. A clock (not shown) provides timing information for the microprocessor and the other components in the LC. Bus 366 serves to provide an office system interface from system alarms. Status indications 407 are provide via, for example, lights, alarms, or the like. Test bus 367 operates relays and provides connections via relays 371, 373, and 375 to the test lines TEST INPUT, TEST OUTPUT, and TEST DSL, the function of which is described in greater detail below.

Without in any way limiting the scope of the invention, Tables 1 and 2 provide a list of commercially available components which are useful in operation of the RT and LC, respectively, according to the above embodiments. It will be apparent to those of skill in the art that the components listed in Tables 1 and 2 are merely representative of those which may be used in associated with the invention herein and are provided for the purpose of facilitating assembly of a device in accordance with one particular embodiment of the invention. A wide variety of components readily known to those of skill in the art could readily be substituted or functionality could be combined or separated. It should be noted that CMOS-based devices are preferred (e.g., the microprocessor) so as to reduce power consumption of the RT in particular.

TABLE 1

| RT Components | |
|---|---|
| Line Transformer 2 | 13 mh, 1:1.32 |
| IECQ 4 | Siemens 2091 |
| ICC 6 | Siemens 2070 |
| Microprocessor 8 | Intel 80C49, 80C51 or 87C51 |
| SICOFI 10 | Siemens 2260, or 2060 |
| SLIC 12 | Erickson PBL 3764, or Harris equipment |
| Buffer 22 | 74HC244 |

TABLE 2

| LC Components | |
|---|---|
| Ring Detect 54 | Siemens PSB 6620 |
| SICOFI 56 | Siemens 2260 or 2060 |
| ICC 58 | Siemens 2070 |
| IECQ 60 | Siemens 2091 |
| Clock 62 | 74HC4060 |
| Microprocessor 60 | Intel 80C51, 87C51 or 80C49 |

C. Shelf Control Hardware

The shelf control 114 is comprised of a microprocessor such as those listed in the table above in conjunction with, e.g., a Siemens 82520 HDLC communication controller. The SC concentrates data from the various LC's in accordance with well known techniques.

IV. Master Control Hardware

A. General

FIGS. 4*a* and 4*b* illustrate test and alarm equipment for the digital added main line system in conjunction with abbreviated versions of the master control (MC), RT, and LC. Test and alarm services are provided to both the central office line card 104 and the remote terminal 102 by master test and alarm system 118. The system is compatible with metallic line testers such as the MLT, 4TEL and conventional pair gain test controllers (PGTC) 408.

The remote terminal 102 has two LEDs 403*a* and 403*b* for interfacing with the user/service personnel. The first indicates whether the link is up and the other indicates power-on, no link. The LEDs are preferably only active when the RT's limited access enclosure door is open. There is also a tamper sensor 405 which is activated when the limited access enclosure is opened, providing an indication to the MC that the device has been tampered with. A maintenance port 430 may optionally be provided on the RT for testing by service personnel from the subscriber facilities.

The line card has a single button on the front panel for lamp test. The line card 104 has a variety of LED's 407 to indicate the system states. In one embodiment they include the following:

minor: indicates minor alarm condition
DSL: lit if DSL is connected and active
test: used to indicate test request received and under test
tamper: used to indicate that tamper signal received from RT
line1: used to indicate status on line 1
line2: used to indicate status of line 2
aux1: used to indicate status of auxiliary 1
aux2: used to indicate status of auxiliary 2

The shelf controller has two buttons for input by a user, i.e., alarm cutoff (used to silence alarm); and lamp test (used to test lamps). Depressing both buttons simultaneously clears any outstanding alarms. The shelf controller has four LEDs 409 to indicate the system status. They include:

major: indicates, for example, 13 or more LCs reporting faults
minor: indicates, for example, 1-12 LCs reporting faults
test: indicates that shelf is connected to test bus
test OK: 0 LCs are down The master controller has two user interfaces: the front panel 411 and the craft interface 413. The front panel 411 of the master controller allows the operator to:

Set a channel into test
Query status of a channel, including test status, block error counts
Silence alarms The front panel includes an alphanumeric display element and a keypad 415, with keys for 0-9, up cursor, down cursor, left cursor, right cursor, alarm cutoff, test, status, special function, enter, and escape (level up).

The craft interface 413 includes a DB-25, RS-232 connection which allows the system operator to perform operations by connecting either an asynchronous terminal or a computer. Specifically, from this interface, the operator is able to perform the following:

Set a channel into test

Query status of a channel, including test status
Silence alarms

In general, the test and alarm system tests the functionality of the entire system as well as various subsets of the entire system and alerts a user or craftsman of any problems. This enables detection of not only a failure in the digital added main line, but also definition of the source of the failure. Definition of the location of any failure enables the dispatch of a craftsman specific to the problem at hand. For example, if the problem is in the twisted pair between the COT and the RT, a line repairman may be dispatched, while a craftsman skilled in the repair of electronic components may be dispatched if the problem is located in the COT or the RT.

B. Overall Hardware Description

The DAML Master Control monitors and controls all other DAML subsystems including SC and LC subsystems. By polling all active SC's, abnormal conditions can be detected by the MC and reported to a Central Office Alarm System (COAS). In addition to monitoring functions, PGTC and MLT test requests are detected and test procedures are initiated by the MC on the selected subscriber line. The tests are performed by the MC test and a DAML flexible test bus (DAML FT bus). A Remote Maintenance Terminal (RMT) can, in preferred embodiments, be connected to any Remote Terminal end module for the purpose of performing maintenance. A limited number of simultaneously active remote maintenance terminals (RMT's) can communicate from the RT via the SC to the MC and access pertinent information about the LC.

The test and alarm hardware is illustrated in conjunction with the LC 104, the RT 102, and master control 118 in FIG. 4*a*. In the particular embodiment in FIG. 4*a*, the RT is provided with a maintenance termination unit (MTU) 406 between the twisted pair 100 and the link interface 202. MTU 406 may be, for example, two voltage-sensitive switches which close when the voltage reaches a given level (manufactured by, for example, Tycor). Within the RT 102, RT test termination equipment 412 is provided, including, for example, absorbent and reflective loads. Data concentrator/shelf control 114 is provided for management of message transmission.

The functions of the various pieces of test equipment are carried out under the control of one or more test microprocessors 402. The test microprocessor(s) communicate with phone company operating system interface via OSS (Operating Support System Interface) line 414. Line 414 may, for example, provide an indication of a failure of a channel to the telephone company directly.

Test microprocessor(s) 402 also provide output to alarm/alarm relay 416 for a physical indication of failure (or non-failure) of any particular component or components. Alarm 416 may, for example, be appropriately illuminated lights such as described above, audible signals, physical connections to phone company facilities or, in preferred embodiments, interactive operator facilities. Microprocessor(s) 402 also controls the operation of voltage source current monitor 418 (the VI) board), RT emulator 420, voice frequency OSC (oscillator/monitor) 422 (the VF board), central office terminal LC (COTLC) emulator 424, and PGTC interface 426. A digital-to-analog converter (DAC) 427 serves to convert various analog signals to digital (and the reverse) to service microprocessor(s) 402, voltage source current monitor 418 and VF board 422.

Three test lines are connectable via the SC to various portions of the MC. They are test input (IN), test output (OUT), and test DSL (DSL). The VI board is connectable to all three, while the RT emulator is connectable to OUT and IN, the VF board is connectable to IN, the LC emulator is connectable to DSL, and the PGTC interface is connectable to all three.

FIG. 4*b* illustrates aspects of the MC in greater detail. The MC, in one embodiment, is mounted in a rack-mount chassis with an industry standard STD-Bus. According to one specific implementation of the invention, each MC chassis contains the following STD board components:

- a ZT8809 V20 board 436
- a ZT8830 8088 board 438 with Zendex ZBX 354 Communication unit
- an RS485 Driver PCB 439
- a VersaLogic VL-1225 Analog/Digital Conversion PCB 441
- a VI Test PCB 418
- a VF Test PCB 422
- an LC Emulator PCB 424
- an RT Emulator PCB 420
- a Central Office Alarm Interface PCB 416
- a PGTC Interface PCB 426

As shown in FIG. 4*b*, the MC, in one embodiment, utilizes two Central Processing Units (CPU) located in each of two the boards 436 and 438. Board 436 in one embodiment is a single board computer based on the Intel 8088 CPU and modeled against the IBM PC/XT. Its peripheral devices are mapped according to the IBM PC I/O map except for two additional timer/counters (Timer 1 and Timer 2). The actual CPU on board, in one embodiment is an NEC V20 or Intel 8088 operating at e.g., 8 MHz. Its maximum on-board memory is 512 kbytes of combined ROM and RAM. Board 436 is configured as a master processor in the STD-Bus. The STD-Bus allows for a multi-processor environment with one master and many slave processors. Of course, the particular devices discussed above are merely illustrative of those which could be utilized in conjunction with the invention and strike a balance of cost and operating performance. Naturally a wide array of more or less sophisticated devices could be utilized without departing from the scope of the invention herein.

Board 438 is an Intelligent I/O Control Processor based on the Intel 8088. Board 438 is configured as a slave processor sharing the STD-Bus with board 436. It contains the 8088 CPU operating at, for example, 8 MHz, memory capacity of 32-kbit ROM and 32-kbit RAM, and a MULTIMODULE ZBX adapter. In one embodiment, this SBX adapter is furnished with a Zendex communication module based on the Zilog 8530 communication controller 439 which offers the HDLC synchronous formats.

In the MC, board 436, hereafter referred to as the MC Application Processor, is used to handle all application tasks such as status monitoring, alarm handling, test request handling, and LC coefficient supervision. In addition, it handles low throughput RS232C communications to the MC Front Panel and the Craft terminal. Board 438, hereafter referred to as the MC Communications Processor, is used to handle the communication requirements of the Frame communication (MC to SC), the OS/NE, and the E2A.

The RS485 Driver PCB 441 is used in conjunction with the Communications Processor 438 to provide RS485 drive interface.

C. Test Hardware

The major boards of the MC are discussed in greater detail below, along with a brief description of their functionality.

1. VSCM Board (VI)

In general, the purpose of the voltage source current monitor 418 is to detect failures in the twisted pair between the LC and the RT. In addition, the VSCM generates ring voltages to test the ring detector in the LC and generates test voltages to perform checks of the test detect module in the LC.

Generally, the DSL is tested for shorts between lines and to ground by disconnecting the DSL from the LC and connecting the DSL to the VSCM board via the Test DSL line of a test bus. The system then applies various voltages to the DSL and checks for shorts between tip and ring conductors (the two wires of the DSL) and between either of the conductors and ground.

FIG. 5 illustrates the VSCM board in greater detail. The board is selected by applying an appropriate address to the STD bus 502 and detected in address decoder 504. When the VSCM board is selected, data latch 506 pulls needed data off the STD bus according to means well known to those of skill in the art.

According to the data on the bus the board drives appropriate relays with relay drivers 508 for application of a selected voltage to a selected line. Relay K1 applies the selected voltage to the line labeled Test DSL in FIG. 4*a* (DSL), relay K3 applies the selected voltage to the line labeled Test Out (Out) in FIG. 4*a*, and relay K3 applies the selected voltage to the line labeled Test In (In) in FIG. 4*a*.

Using relay K5, the VSCM board can apply a voltage to the tip wire. The applied voltage may be selected from either of a constant voltage from a DAC 427 or a 20 Hz signal 510 from the VF board. The selected voltage is amplified in amplifier 512 having a gain of, for example, 30.

Current monitor 514 and voltage monitor 516 monitor the response of the system when these voltages are applied, reporting an analog signal to the DAC for ultimate determination of whether, for example, a short is present in the DSL to ground or between the two wires of the DSL.

As shown in the bottom portion of FIG. 5, a duplicate set of devices is provided for the ring wire of the DSL, operated under the direction of relay K4.

2. RT Emulator

As shown in FIG. 4*a*, the RT emulator 420 is used to generate signals similar to that which would be produced by the RT. The RT emulator is used for testing of the LC, for testing of the LC emulator, and the like, using signals from the voice frequency board. During testing, a test signal is injected by the VF board to the LC while the RT emulator is commanded to connect absorbent and reflective loads. The resultant reflected signals from the line under test are then evaluated to identify any failures in operation of the LC.

FIG. 6 illustrates the RT emulator in greater detail. As with the VSCM board, the RT emulator is selected by applying an appropriate address to the STD bus 502. The card is addressed via address decoder 602. The address for a desired register in the ICC 612 is then decoded and stored in buffer 604. Data from the STD bus are held in buffer 606 for the ICC 612.

Based on data provided from the bus, one of relays K1 or K2 is closed with relay driver 606 to apply or receive data from the Test DSL or Test Output lines. The emulator functions similarly to the RT except that it operates under the direction of the test microprocessor rather than a dedicated microprocessor. DSL signals are input to the system via hybrid (two- to 4-wire conversion) circuit 608 such as the one described in connection with the above incorporated patent application. These signals are then converted from 2B1Q to binary in IECQ 610, after which ICC 612 provides serial data to SICOFI/SLIC 614. These signals are then subjected to loads 616 and the signals are then reversed through the system for transmission back to, for example, an LC in test. Alternatively, if the ring generation of the LC is to be tested, a ring voltage is applied to the LC and, if the LC is functioning properly, a digital ring signal is received by the RT emulator, decoded, and the information transmitted back to the MC for confirmation of correct operation. MTU 618 acts in an analogous manner to the MTU of the RT.

By enabling selection of connecting the RT to either the Test DSL or Test Output lines, it is possible for the test system to perform a self test. Self test of the MC is accomplished by connecting the RT emulator to the Test DSL line while the LC emulator is similarly connected. Accordingly, tests of the test system may be performed in the same manner as tests of the actual LC and RT.

The RT emulator requires no separate power supply such as with the actual RT since it is located at the CO. The RT offers a load equivalent to the real RT with load circuit 616. Preferably, load 616 offers selection between one of several loads such as 5 and 33 mA to simulate real loads in the RT power supply for testing of the power feed and/or current limiters in the LC. In the RT emulator absorbent and reflective loads may be emulated by the SICOFI under control of the MC.

3. Voice Frequency/OSC Monitor (VF)

As shown in FIG. 4*a*, the voice frequency OSC/monitor 422 produces, for example, a simulated voice signal which is transmitted to the RT. From an evaluation of the amount of the reflected signal returned to the LC by absorbent loads 428 and reflective loads 431 in the RT it is possible to determine the overall function of the system. By "absorbent load" it is intended to mean herein, for example, a 600 ohm load. By reflective load it is intended to mean, for example, a short circuit. FIG. 7 illustrates the voice frequency OSC/monitor in greater detail.

As with the other boards in the MC, the address decoder 702 and the data buffer 704 of the VF board are obtained from the bus, the board operates relays K1, K2, and K3 via latches and drivers 708.

Function generator 710 is a waveform generator capable of generating a constant 20 Hz signal or generating a sweeping signal which alternates between various frequencies typically encountered in voice transmission. The specific output of the function generator is selected by way of relay K3. When the 20 Hz output is selected, it is passed through driver 712 and, thereafter, to the test input line for the ring test function of the MC. When the sweep function is selected, the signal passes through driver 714, transformer 716, and, thereafter, to either the Test Input line or the LC Emulator, depending upon the selection of either the K1 or K2 relays.

Loop current detector 718 is used for detection of loop current and is used to detect a condition in which the LC has seized because the phone is off the hook. For evaluation of returned signals, the reflected voltage is passed through a filter 720, RMS converter 722 and, thereafter, to the DAC on the MC.

4. LC Emulator

As shown in FIG. 4*a*, the LC emulator 424 produces a test signal or signals which emulate the actual LC from the voice frequency OSC/monitor 422, and transmits the signal to the actual RT or RT emulator. At least one of these test signals is in the voice frequency bandwidth. The system then measures the reflective signals at various terminations for a determination of whether the RT is functioning properly.

As with the other boards, address and data are read from the STD bus. The address is decoded in decoder 802 and data and address information are latched into address buffer 804 and data buffer 806. Based on data input to the data buffer, relay driver 808 operates relays K1 and K2. When relays K1 are engaged the LC emulator is connected to the DSL. Relay K2 connects the LC emulator to the voice frequency board. When connected, input from, for example, the VF board is input to transformer T1, processed through hybrid circuit 810 for two-wire to four-wire conversion, and thereafter is processed through SLIC 812, ICC 814, IECQ 816, and hybrid circuit 818 and transformer T2 for output to the DSL in a manner analogous to the LC described above, using the improved two wire to four wire conversion described in the above incorporated patent. DSL power feed 820 supplies the RT with power in a similar fashion as the actual LC during testing operations. Necessary clock signals are generated by XTAL OSC 824 and frequency divider 822.

5. PGTC/Drop Emulator Interface

As shown in FIG. 4*a*, the emulator 432 serves to convert the various digital signals obtained from the various tests in the system to voltage signals compatible with conventional pair gain test controller 408. PGTC interface 426 serves as an interface between the 28-wire PGTC 408 and the digital test system 118. Conventional pair gain test controllers and their interfaces are disclosed in, for example, "Interface Between Loop Carrier Systems and Loop Testing Systems," *Bell. Comm. Res. Tech. Ref. TR-TSY*-000465 (Issue 2, April 1987) which is incorporated herein by reference for all purposes. FIG. 9 illustrates the PGTC interface 426 and the drop emulator 432 herein in greater detail.

The PGTC is connected to the standard bus and inputs an address-to-address decoder 902 and data transceiver are transmitted to PIA 906 such as a model no. 8255 made by Intel. PIA 8255 drives relay drivers 910 and 912 which control the interface with relays. The optical isolators 914 and 916 are for connecting/disconnecting loads. Responses are built into the line set code if, e.g., a reflective load must be connected when a ring is detected. The load portion 920 of the device serves as a dummy load in view of the so-called "golden pair" wire which is used in conventional MLT systems.

If the MLT system detects a pair gain circuit "signature," the system will apply a positive voltage to the tip conductor of the DSL with the ring conductor open. When this condition is detected the line card will apply a 333.3 Hz tone between tip and ring towards the PGTC. In the line card hardware this tone is generated by the SICOFI under control from the CPU and the CPU sends an appropriate message to the MC. The PGTC then waits for acknowledgement from the master control which will ground the SEIZE lead with the appropriate relay. When this SEIZE signal is present together with the 333.3 Hz tone, the PGTC will return a PROCEED signal to the master control. The conventional PGTC system has four test pairs, designated 1 through 4 in FIG. 9. Upon receipt of the PROCEED signal on one of the leads PROCEED 1 thru 4, the master control will close the relays of the tip and ring conductor 1, 2, 3 or 4, depending on the test channel indicated by the PROCEED lead.

There are two exception conditions which will prevent the PGTC test from proceeding. They are a) when the MC is a major alarm state it will ground the TMAJ lead and the PGTC system will remove the test request signal; and b) when the test bus is already in use, i.e., one of the four pairs is used, and a test request for another line is received, the SEZBY lead will be grounded. With a standard carrier system this signal is used to indicate that the "golden pair" is already in use.

Two options are available upon receipt of the PROCEED signal:

1) The tip and ring of the test pair are connected to one of the terminations 920 and the drop emulators and the PGTC system performs a channel test; or 2) The tip and ring of the DC test pair are connected to the DSL and the line card is connected to the RT emulator. The test system can do a metallic test of the real pair and the PGTC does a channel test of the line card connected to the RT emulator. In this case the MC connects the DC test pair to the DSL by closing the appropriate relay and connects the line card to the RT emulator by disconnecting the line card from the DSL and connecting the RT emulator to the TEST OUTPUT line.

When these connections are made the MC will ground the appropriate SLEEVE lead to signal that the necessary connections are made. Upon receipt of the SLEEVE signal the PGTC sends a LOCK signal and removes the PROCEED signal to the carrier system, indicating that all connections have been completed. When the loop testing system removes the positive voltage from the tip of the test trunk the PGTC completes the connection of the test trunk from the MC to the DC test pair (otherwise referred to as a "golden pair"). Removal of the LOCK signal indicates to the MC that testing has been completed and that all test connections are to be restored to normal. If a second test request is received for the same line, the "other" procedure is applied. Note the INHIBIT lead is not used in a DAML system as there is no real test pair or golden pair.

When an MLT test is detected by the LC, the MC will connect to the test pair of the MLT system. There are then two options:

1) The MLT system gets a resistive termination from which it can derive the status of the line: OK, LC fault, RT fault or DSL fault. In case of a DSL fault, access is given to the pair; or 2) The MLT system can get immediate access to the pair.

Either of these options can be chosen as default. When a second test request for the same line is received the other option will execute.

The PGTC interface allows a full testing by the Maintenance Center: the PGTC can do the channel test and the MLT or equivalent can do a test of the twisted pair. The system offers appropriate resistive signatures to indicate where the problem is based on the results of the test.

D. Alarm Hardware

FIG. 10 illustrates the alarm status board 416 in greater detail. An address decoder and data transceiver input address and data information from the STD bus via decoder 1002 and data transceiver 1004, respectively. Data are input to PIA 1006 such as a model no. 8255 made by Intel. PIA 1006 also receives input from optical isolators 1008. Optical isolators 1008 interface for input with four signals, i.e., CO Alarm Cutoff, which is a signal which shuts off the alarms at the direction of an operator, PSF, which is a power system fault alarm from each power supply, and 1,2 E2ASAC which are relay-activated telemetry systems. The output of PIA 1006 activates relay drivers 1010, which selectively drive 12 relays for activation of lights, buzzers, or the like, or for activation of the telephone company alarm system. In one embodiment, 8 alarms are output to the telephone company, as shown in a typical relay 1012 and 4 alarms are output at the CO, as shown with a typical relay 1014.

V. Software/Microprocessor Functionality

Appendices I to IV provide the major pieces of software used in operation of the digital added main line system disclosed herein. A description of each piece of code is provided below.

A. RT/LC

Appendix I provides an assembly language program listing (®Copyright 1990, Raychem Corporation, All Rights Reserved) for the RT microprocessor 208 discussed above. The code is adapted for and has been used on an Intel 80C51 microprocessor, although it will be apparent that the invention could be applied to a wide variety of such processors. Appendix II (®Copyright 1990, Raychem Corporation, All Rights Reserved) provides a similar listing for the code used in the microprocessor 360 in the line card. This code has been used in the Intel 80C51. Again, however, a wide variety of microprocessors could be used herein without departing from the scope of the invention.

FIGS. 11*a* to 11*m* illustrate overall operation of the LC and RT software. In particular FIG. 11*a* illustrates overall operation and architecture of the LC software. The software includes a main section 1101, an interrupt service routine for the ICC 1102, an interrupt service routing for clocks 1103, and an interrupt service routing for handling serial data 1104.

In the main section 1101 the system first initializes the various pieces of hardware and software at step 1105. The system then begins a main loop 1106 through which the system repeatedly cycles until the system is disconnected from power. The interrupt service clock initiates a section of code 1117 which performs routine operations needed during operation of the LC. The interrupt service for the ICC 1102 contains a section of code 1107 which handles DSL needs, and the interrupt service for serial data 1104 contains a section of code 1108 which handles various serial data requirements.

FIG. 11*b* illustrates the LC initialization and main loop 1105 and 1106 in greater detail. The initialization includes steps of hardware initialization 1109, memory initialization 1110, and timer/interrupt initialization 1111. The main loop then begins.

At step 1112, the SICOFI coefficients are set up and since this step occurs in the main loop may be varied over time. At step 1113 the system processes the serial port receiver. At step 1114 the system processes the serial port transmissions, and at step 1115 the system services watch dog timers. The system then idles at step 1116 until an interrupt is received.

FIG. 11*c* illustrates the interrupt service 1117 (isr.clk) in greater detail which is initiated based on a clock at, for example, 160 Hz. At step 1118 the system executes error control code and at step 1119 retrieves local status information. The system then services the first line (line "A") at step 1120 and the second line (line "B") at step 1121. At step 1122 a section of code provides output control and at step 1123 alarms are serviced. At step 1124 the system services the front panel display and at step 1125 the system provides DSL power control. At step 1126 the system sends DSL status information to the RT.

FIG. 11*d* illustrates the ICC chip service routine 1107 in greater detail. At step 1126 the system handles various fault problems and at step 1127 does synchronous transfer of data. At step 1128 the system handles various aspects of IECQ control and at step 1129 receives a message from the DSL.

FIG. 11*e* illustrates the serial interrupt service routine for the port shelf 1108 in greater detail. At step 1130 the system determines if a message is transmitted or received. At step 1131 the system outputs a byte for a buffer or, if a message is to be received, inputs a byte to a buffer at step 1132.

FIG. 11*f* illustrates the procedure 1113 used for receiving data on a serial port in the main loop. At step 1133 the system determines if a message has been transmitted and, if not returns to the main loop. If a message has been received, at step 1134 the system determines if it is a status request and, if so, processes the request. If not, at step 1135 the system determines if the message is a test request and, if so, processes it. If not, at step 1136 the system determines if a maintenance message is present and, if so, processes it. As shown in step 1138 the system may also be implemented to test for and process other types of messages.

FIG. 11*g* illustrates the process 1114 for transmitting outgoing messages in the main loop. At step 1139 the system determines if a message needs to be sent and, if not exits back to the main loop. If a message needs to be transmitted at step 1140 the system sets up for transmitting the message and at step 1141 tests to see if a test response is due. If so, the system adds the data and returns to the main loop. If not, the system tests at step 1142 to determine if a model response is due and, if so, adds the data. If not, the system proceeds to test for other responses due at steps 1143 and 1144 and, thereafter, returns to the main loop.

FIG. 11*h* illustrates the architecture and overall operation of the RT program. As with the LC code, the RT code includes a main section 1145, an interrupt section for the ICC service 1146, an interrupt section for clock-based routine service 1147, and a section for handling interrupts for serial data service for maintenance operations 1148. The main section 1145 initializes the hardware and software at step 1149 and then recursively iterates through a main code section 1150.

FIG. 11*i* illustrates the main section of code 1145 of the RT in greater detail. At step 1151 the various pieces of hardware in the RT are set up and the various memory locations are set up at step 1152. Timers and interrupts are started/set at step 1153. Thereafter, the system enters the main loop. As with the LC, the RT SICOFI coefficients are set up within the main loop at step 1154. Maintenance messages are then processed at step 1155 and a test request (if present) is processed at step 1156. Watch dog timers are set at step 1157 and the system then idles until an interrupt is received at step 1158.

FIG. 11*j* illustrates the clock interrupt service routine 1147 in greater detail. At step 1159 the system executes an error control sequence and, thereafter, at step 1160 obtains local status information. At step 1161 the system services line A and, thereafter, at step 1162 services line B. The system then executes an output control sequence at step 1163 and, at step 1164 services various alarms. At step 1165 the system reports service status and at step 1166 the status information is sent over the DSL to the LC.

FIG. 11*k* illustrates the ICC interrupt service routine 1146 in greater detail. At step 1167 various set up steps are conducted and at step 1168 the system does synchronous transfer of data to, e.g., the SICOFI. At step 1169 the system determines if additional data are to be transferred and, if so, returns to step 1168. If not, the system then handles IECQ control at step 1170 and, thereafter, receives a DSL message at step 1171. At step 1172 the system then handles any faults.

FIG. 11*l* illustrates the interrupt service routine for serial port maintenance 1148. At step 1172 the system determines if it is to transmit or receive. If it is to transmit, at step 1173 the system outputs a byte from a buffer. If it is to receive, it inputs a byte to a receive buffer at step 1174.

FIG. 11*m* illustrates the line service routine used at steps 1161 and 1162 in the RT. At step 1175 the system gets a state pointer and, if there is an indication to power down, the system does so at step 1176. If not, the system determines if an idle state is desired and, if so enters the idle state at step 1177, or if not checks for and, if necessary, enters a hold state at step 1178. At step 1179 the system determines if there is an on-hook condition and, if so, enters an active state. At step 1180 the system determines if there is a dial hold state and, if so, does a dial hold. If the system determines there is an on-hook active situation at step 1181 the system does an on-hook routine. If the system determines there is a ring wire condition at step 1182, it performs a ring wire routine, and, if there is a ring condition, performs a ring routine at step 1183. At step 1184 the system determines if a ring stop is to be executed and if so does a ring stop routine.

B. Master

The MC software is primarily resident with the ®Application Processor (Appendix III, ®Copyright 1990, Raychem Corporation, All Rights Reserved) and Communication Processor (Appendix IV, ®Copyright 1990, Raychem Corporation, All Rights Reserved), and operates the various hardware peripherals which perform the test and alarm functions herein.

The software is developed in a structured methodology using top-down design and bottom-up implementation practices. All code in the MC in the particular example shown herein is programmed in the "C" high-level language or 8088 Macro-assembly. Of course, the programming language and microprocessor environment will vary widely from one application to the next.

The software includes application modules interacting with lower-level hardware drivers architectured in a structured manner. The glue logic of all application modules and driver is a priority-based, multi-tasking, real-time, non-preemptive datagram operating kernel.

A datagram kernel provides the capability to application modules to be distinctly separated by function and still be able to intercommunicate and perform the combined functions of master controller. Generally speaking, MC application modules activate other modules by initiation of a datagram.

1. Software Architecture

FIG. 12*a* illustrates the overall architecture of the MC software in the Application Processor, the major portions of which are included in Appenxdix III. At the top of the MC Application Processor (MCAP) hierarchy is a MC System Manager module 1201 which oversees the functions of the MC including status monitoring, alarm reporting, line testing, coefficient management, and others. The MC System Manager initiates and manages subservient modules. The modules are: Command Interpreter 1203, Poll Handler 1205, Alarm Handler 1207, Test Supervisor 1209, Coefficient Handler 1211, and the Self-Test Supervisor 1213. The System Manager 1201, via a DSOS operating kernel 1215, provides communications input/output to front panel driver 1217, craft terminal interface 1219, OS/NE node driver 1221, and frame bus driver 1223. The system manager also provides test and alarm input/output to LC emulator driver 1225, RT emulator driver 1227, input handler 1229, and output handler 1231.

The Command Interpreter 1203 provides an interface to various external portions of the system and includes a front panel interpreter 1237, a craft interface interpreter 1239, an OS/NE interface interpreter 1241, and a maintenance port interpreter 1243.

The Poll Handler 1205 is primarily responsible for requesting information from the shelf controls. Any abnormalities detected by the Poll Handler will be reported to the pertinent application module. The Alarm Handler 1207 is responsible for reporting, recording, and handling of alarm conditions created by LC's or SC's.

The Test Supervisor 1209 is responsible for supervising the various test modules including the line set test module 1237, MLT/4TEL test module 1239, and PGTC test module 1241. Within the line set test module 1237, the system includes channel test module 1243, DSL test module 1245, LC test module 1247, and RT test module 1249. The LC test module and RT test module include RT emulator handler 1251 and LC emulator driver 1253. These subservient modules, under the general supervision of the Test Supervisor, interact with the MC test hardware and DAML test bus to execute the required tests.

The Coefficient Handler 1211 handles the support to special line coefficients, coefficient loading, and coefficient reports. The Self-Test Supervisor 1213 is responsible for performing integrity tests to the MC hardware subsystem. Tests can be performed on an on-demand basis, or on a scheduled basis. Subservient modules to the self-test supervisor include a CPU board verifier 1255, a power supply verifier 1257, and a test subsystem verifier 1259. The CPU board verifier is a normal PC board test. A test of the power supply is conducted in the power supply verifier.

The MC applications processor (MCAP) communicates with the MC Communication Processor by means of a full-duplex mailbox process which operates in the background and independent of the application tasks. Datagrams containing SC status information and other types of messages are passed back and forth between the MCAP and the Communication Processor using the command interpreter 1203. At the MCAP end, the messages are ultimately delivered to the corresponding module. At the Communication processor end, the destination would be a communication port such as the Frame Bus to the SC's or the X.25 connection to the OS/NE. All of the top level modules have available a number of drivers, specialized utilities, and general purpose operating system utilities such as queue handling, and timers to perform their assigned tasks.

From power-up, the MC System Manager directs an organized start-up of all other modules depending on whether the MCAP is starting from a cold start reset or a warm start. A cold start occurs when the system is powered-up for the first time from factory parameters. A warm start occurs if for some unforeseen reason the system is reset during operation, or as part of a software error recovery procedure.

During a cold start, the System Manager 1201 instructs the Self-Test Handler 1213 to begin a one-time test. If all tests pass, the System Manager begins operation. If any test fails, the System Manager issues a failure report via the designated system console. If the failure corresponds to a critical hardware component such as RAM memory failure, the start-up process is halted. Otherwise, the system is started in a degraded mode. The self-test may also be started on a periodic basis. This periodic self-test can be programmed after cold start using the system console. The self test is conducted by connecting the RT emulator and the LC emulator and performing the normal test sequences in the test subsystem verifier.

After the one-time self-test is completed, the System Manager continues the cold start procedure. Part of this procedure may be prompting the system operator to enter configuration data via the system console. For example, PGTC selected test procedure.

During a warm start, the System Manager retains all its data, and it reports the cause for warm start to the system console. Finally, after completing the start-up procedure, regardless of whether cold or warm start, it activates all subservient modules.

After the System Manager activates the Poll Handler, the LC and SC status information is gathered one at a time. When the Poll Handler is activated initially, it polls each SC from numbers 1-30 and gathers information. From this activity, the Poll Handler is able to record the status of SC's and LC's that respond to the poll.

The Poll Handler begins by issuing a STATUS REQUEST message to each SC starting from SC number 1 to the maximum number of 30. The STATUS REQUEST messages are automatically routed via the Communication Processor and then to the Frame Bus. Those SC's that do not respond after a predetermined timeout will be considered inactive or not connected. Those which respond to the call and send their status information are further analyzed.

SC's which respond to the STATUS REQUEST are analyzed to determine the status of their LC's. The information for all active LC's and SC's is recorded. If during the process of acquiring SC/LC status abnormal conditions such as minor alarms are detected, a message is issued to the Alarm Supervisor. For every LC which is down, a message DOWN LC REPORT is sent to the Alarm Supervisor. From time-to-time, other application modules or even modules which are external to the MCAP (for example, the RT maintenance terminal) may desire to request status information about a particular SC or LC.

When the Poll Handler begins polling all SC's, it does so at a rate of, for example, one SC every 100 msec. This polling cycle, which can be modified using the system console, is optimal for detecting LC ring conditions which are the most rapidly changing of the LC-related information.

The Alarm Handler 1207 is responsible for reporting, recording, and handling alarm conditions created by LC's or SC's. The following conditions are evaluated for possible alarms:

a) LC's are monitored for link down. This is a minor alarm 1216.

b) SC's are monitored for having from 1 to 11 LC's down. This is a minor alarm 1214.

c) SC's with 12 or more LC's down are considered major alarms 1218.

d) The system with 1 to 25 LC's down, or up to a maximum of 11 LC's down in one SC is considered to be in a minor alarm state. Similarly, 26 or more LC's reported down, or 12 or more LC's on one SC is considered a major alarm.

The Test Supervisor 1209 is responsible for the specialized task of testing and servicing the CO test request. The Test Supervisor has several subservient modules which handle each special test procedure, including the line set test module, the MLT/4TEL test module, and the pair gaing test control module. The specialized test modules are: LC Emulator Handler, RT Emulator Handler, Line Set Handler, LC Test Handler, and RT Test Handler.

Each test module is given the START TEST command. Upon test completion, the corresponding modules respond with a message further qualifying the test outcome, whether passed or failed, and a test report.

The Coefficient Supervisor 1212 handles the support to special line coefficients, coefficient loading, and coefficient reports.

When an LC becomes operational, a message will be sent by the LC to the Coefficient Manager. The Coefficient Manager will verify if there are special coefficients for the specified LC which may require loading.

If the newly logged LC is listed as requiring special coeffcients, a message is sent to the remote LC unit via the corresponding SC. After a predetermined time, the Coefficient Manager will compare the loaded coefficients with the one sent. If both transmitted and received versions match, the loading is considered successfull. Otherwise, the process is started again.

The Coefficient Supervisor will retry coefficient loading several times. If after this time it is still unsuccessfull, a warning message is sent to the system console indicating the problem condition.

The Self-Test Handler 1206 is responsible for performing hardware integrity tests to the MC subsystem. Tests can be performed on an on-demand basis or on a regular basis. The IECQ handler and SICOFI handlers manage operation of the MC SICOFI and IECQ.

The MC Communication Processor (MCCP) software includes communication link control modules which transmit/receive data in a format specific to the channel being serviced. These modules perform the link control functions in an ISO layered architecture. The link control modules are: Frame Link module, OS/NE Link module, E2A Link module, and Mailbox Link module.

Link modules are supported by their respective communication drivers which are normally Interrupt Service Routines (ISR). These drivers correspond to their link control counterpart of the same name: Frame Driver, OS/NE Driver, E2A Driver, and Mailbox Driver.

The channel formats that will be provided for the DAML MCCP are: Frame for the MC-SC Frame bus, X.25 for OS/NE, Serial Asynchronous for E2A, and the Mailbox format.

A Router module which provides the network layer functions interfaces with all communication drivers and is capable of routing message packets from channel to channel. The routing is dependent on a routing table which matches destination module name with channel number. Thereby, messages need only be coded with a destination and the Router module would identify and route the message to the proper channel. At the end of expected to reside.

2. Test Software Operation

FIG. 12*b* is an overall flow chart illustrating the functionality of the test and alarm system. It will be recognized that the master provides test capability to a number of RT/LC users (e.g., 100 or more) and that this process is rapidly repeated for each of the RT/LC pairs.

The system initially performs a test at step 1202 to determine if a line set is busy and, if not, a shelf is selected at step 1204. The system then performs an entire system test or channel test 1206 which tests the efficacy of the entire system from telephone company lines to and including the RT equipment. If the test is O.K. (step 1208), a report is made at step 1210 and the shelf is deselected at step 1212. If the channel test is not O.K., an RT emulator is then utilized to perform a test of the LC at step 1214. The voltage source current monitor is then utilized at step 1216 to determine if a failure such as a short between wires or to ground has occurred in the twisted pair between the master and the RT. If a failure is detected in the twisted pair, reports are made at step 1210 such that, for example, a line repairman may be dispatched to repair the twisted pair. If the DSL test is passed, a LC emulator is utilized to test the functionality of the RT at step 1218, followed by status reporting at step 1210.

FIG. 13*a* is a more detailed flowchart 1 illustrating the optional line set test 1202. This portion of the test is skipped if a request to this effect is made. At step 1302, upon a provisional test request, the MC will check whether line A or B of the selected LS is busy. If one of the two lines is busy, the system increments a counter at step 1304 and, if the counter is greater than a selected number (step 1306), returns a line busy message at step 1308. If the counter is not greater than 10, the system waits a selected time at step 1310 and repeats busy-check. If none of the lines is busy, the test system continues.

The system then selects the appropriate shelf. FIG. 13*b* illustrates the select shelf step 1204 in greater detail. At step 1312 the system broadcasts a message to all shelves to disconnect from the test bus. Then, at step 1314, the system connects the selected shelf to the test bus by transmitting an appropriate message to the SC.

The system then performs a channel test; this checks the performance of both voice channels. In general, the channel test includes the steps of selecting the line, issuing a test request, performing an absorbent test, performing an on-hook test, testing the ringer, performing a reflective test, and deselecting the line. FIG. 13*c* illustrates the channel test 1206 in greater detail. At step 1316 the system checks whether the DSL of the selected line set is up (i.e., if the IECQ's are linking). If the DSL is not up the system waits for a short time and trys again for a selected number of times. If the DSL is still not up, the system logs the status in the test status database for the specific SC/LC, time stamps it, and exits the channel test at step 1318. This procedure is necessary because the Line Set may be trying to link. Especially when the LC Emulator or RT Emulator are used, it will take some time before they are linking. If the DSL link is up, the system continues.

The system then performs a test of line A. The system initially selects the desired line at step 1320 by transmitting a message to the selected LC. This also disconnects the line card from the exchange. A delay of, for example, 250 ms, may be allowed at step 1322 to allow for the LC to get the message and for confirmation to get back to the MC that the line is selected. The confirmation of the LC is checked and the result is logged.

The system then proceeds to test the selected line. At step 1324, the VSCM board Tip and Ring voltages are set to 0 volts. A delay of, for example, 15 ms may be allowed for the lines to settle. At step 1326 the system connects the VS board 418 to the input of the LC. A delay of, for example, 25 ms is then allowed for settling of the relays. At step 1328, the system applies a test request voltage of, for example, 113 volts to the tip of the VS board. The ring wire or line is left open. A delay of, for example, 250 ms is then allowed for settling of voltages and for the LC relay to get to the MC. At step 1330, the system checks for an LC test request message and logs the result. The system then resets the voltages of the VS board to 0 volts at step 1332. A delay of, for example, 100 ms is allowed for settling of voltages and the VS board is disconnected from the LC input.

The system then performs an absorbent test of the selected line. As shown in FIG. 13*d*, at step 1334 the selected line of the RT and the absorbent load of the RT are connected to the RT test bus by transmitting a message to the LC. This will close the seize relays as it simulates an off-hook condition and disconnect the subscriber from the line. At step 1336 the system selects the frequency sweep on the VF board. At step 1338 the VF board is connected to the test input line. A delay of, for example, 275 ms is then permitted to allow for MC to RT transmission, for settling of relays at the RT, and for RT to MC transmission. At step 1340 the system checks the confirmation of the RT and logs the result. At step 1342 the system reads the reflected voltage from the DAC input, allowing for delay of, for example, 100 ms for settling of A/D conversion.

At step 1344 the system compares the reflected voltage with a reference value(s) and, at step 1346, logs the result. At step 1348 the absorbent load is disconnected from the RT test bus by transmitting a message to the LC. This creates the on-hook condition. The seize relays will open as the RT will see on-hook.

FIG. 13*e* illustrates the on-hook portion of the channel test. The VF board is still connected to the test input line and the line at the RT is connected to the open RT test bus. After a delay of, for example, 275 ms to allow for MC to LC delay plus relay delay, LC to MC delay, and RT to MC transmission, at step 1350 the system checks for confirmation of the absorbent disconnect from the RT. The system then reads the reflected voltage from the DAC input at step 1352. After another delay of, for example, 100 ms for settling of A/D, the system compares the reflected voltage with reference value(s) and at step 1356 logs the result. The system then disconnects the VF board from the test input line.

FIG. 13*f* illustrates the ring test portion of the channel test. At step 1358 the system resets the VS board to 0 volts on Tip and Ring. At step 1360 the 20 Hz output on the VF board is selected and a delay of, for example, 25 ms is allowed for settling of the system. At step 1360 the VS board is connected to the test input line. At step 1362 the 20 Hz input on the VS board is connected to the ring and the tip remains at zero volts. After a delay of, e.g., 350 ms, the system checks the ring detect message from the RT and logs the result at step 1364. The 20 Hz signal from the VF board to the VS board is then disconnected at step 1366.

At step 1368 the VF frequency board is reset to frequency sweep. After a delay of, e.g., 25 ms for settling of relays and output voltage, the VS board is disconnected from the test input line. After an additional delay of, e.g., 25 ms for settling of relays, a reflective test is performed. The reflective test is illustrated in FIG. 13*g*.

Upon ringing the RT will connect the reflective short termination to the test bus. This connection will close the seize relays at the LC because the RT sees an off-hook state. At step 1370 the VF board is connected to the test input line after a delay of 150 ms. At step 1372 the system checks for the confirmation of reflective connection of the RT. The reflected voltage from the DAC input is tested at step 1374. After a delay of, e.g., 100 ms for settling of A/D, the system compares the reflected voltage with a reference value(s) at step 1376 and logs the result. At step 1378 the system disconnects the VF board from the test input line, and at step 1380 disconnects the reflective short termination from the RT test bus, disconnects the line in test from the RT test bus, and disconnects the line in test from the test input line by transmitting a return to normal message to the LC. The system then delays for, e.g., 125 ms and repeats the test for the other line at step 1382.

In preferred embodiments the system logs the status in a test status database for the specific SC/LC and time stamps it.

FIG. 13*h* illustrates the LC test procedure 1214 in greater detail. It is assumed below that the Shelf is already selected. At step 1375 the system initializes the RT emulator with a low current load. At step 1384 the system connects the DSL output of the selected LC to the TEST OUTPUT line by transmitting a message to the selected LC. At step 1386 the system connects the RT Emulator to the TEST OUTPUT line. The system then performs a DSL power feed test at step 1377. At step 1388 the system performs a channel test, which has been described in greater detail in relation to FIGS. 13*c* to 13*g*. At step 1390 the system disconnects the DSL output of the selected LC from TEST OUTPUT by transmitting a message to the selected LC. At step 1392 the system disconnects the RT-Emulator from the TEST OUTPUT line.

FIG. 13*i* illustrates the DSL test 1216 in greater detail. At step 1394 the DSL of the selected LC is connected to TEST DSL by transmitting a message to the selected LC. This disconnects the DSL from the LC. The DSL test is then performed at step 1396 and the system checks to see if the RT is connected at step 1373.

At step 1353 the system connects the tip line of the VSCM board to the TEST DSL and does not connect the ring line. The VSCM then applies a low voltage to the tip line, with the ring open. This test is conducted with a sufficiently low voltage such that the MTU in the RT is not effected and the voltage-sensitive switches therein do not close. At step 1355 the system measures the tip current and, at step 1357 the system compares with a reference value. At step 1359 a similar sequence of steps is conducted for the ring line with the tip line open. A high current at either step is indicative of the line in question being grounded.

Thereafter, at step 1361 the system connects both tip and ring to Test DSL and applies a low voltage to the tip line, with the ring to zero volts, and the current is measured at step 1363. The system then compares the measured current to a reference, and repeats at step 1367 with a low voltage at ring and tip at zero volts. A high current in either of these steps is indicative the tip and ground line shorted to each other.

The system then performs a test to ensure that the RT is connected. At step 1369 the system applies a high voltage to the tip line, this time sufficiently high to activate the MTU in the RT, i.e., to close the voltage-sensitive switches therein. The current to each of the tip and ring lines is then measured at step 1371, and compared to a reference value. At step 1373 this process is repeated with a high voltage to the ring line. A low current in either of these tests indicates that the RT is not connected. Optionally, a step may be performed to check for tip and ring reversal. For this test, the applied voltage must be high enough so that the voltage-sensitive switches in the MTU close, so as to connect the RT power supply electrically to the DSL. Just in front of a diode bridge of the RT power supply a load resistor such as a 200K resistor in series with the diode is supplied. When tip and ring are connected correctly, the diode is blocking. By reversing the tip and ring voltage, a small increase of current will be detected.

Thereafter, at step 1398 the system disconnects the DSL and, at step 1400, disconnects the VS board and logs the results.

At step 1398 the DSL of the selected LC is disconnected from TEST DSL by transmitting a message to the selected LC. Thereafter, the VS board is disconnected from TEST DSL at step 1399. At this time the status in the test status is logged in a database for the specific SC/LC and time stamped at step 1400.

FIG. 13*j* illustrates the RT test 1218 in greater detail. At step 1301 the system connects the DSL of the selected LC to TEST DSL by transmitting a message to the selected LC. At step 1303 the system connects the LC-Emulator to TEST DSL.

At step 1305 the system checks whether the DSL of the selected line set is up by checking whether the IECQ chips are linking. If the DSL is not up, the system still not up, the status is logged in the test status database for the specific SC/LC, time stamped, and the test is exited. These steps are necessary because the Line Set may be trying to link. Especially when the LC Emulator or RT Emulator are used, it will take some time before they are linking. If the DSL link is up, the system continues.

At step 1307 the system selects one of the lines for test. The LC Emulator is set to the selected line. At step 1311 the system reads the line status of the LC Emulator. It is not relevant to issue a test request for the LC Emulator.

An absorbent test is then performed, as illustrated in FIG. 13*k*. At step 1313 the system connects the selected line of the RT and the absorbent load to the RT test bus by sending a message to the RT. The system then selects the frequency sweep on the VF board at step 1315. At step 1317 the system connects the VF board to the LC Emulator. After a delay (e.g., 50 ms) the system checks the confirmation of the RT and logs the result at step 1319. The system then reads the reflected voltage from the DAC input. After another delay (100 ms) for settling of A/D the system compares the reflected voltage with a reference value(s) at step 1321 and the results are logged.

At step 1323 the absorbent load is disconnected from the RT test bus by sending a message to the RT. This creates the on-hook condition. FIG. 13*l* illustrates the on-hook test.

The VF board is still connected to the LC emulator and the line at the RT is connected to the open RT test bus at this stage. After a delay (e.g., 50 ms), the system checks confirmation of the absorbent disconnect from the RT at step 1325. At step 1327 the system reads the reflected voltage from the DAC input and, after a delay (100 ms) for settling of A/D, compares the reflected voltage with reference value(s) at step 1329. The results accordingly are logged and the VF board is disconnected from LC emulator at step 1331.

The system then performs a ring test, which is illustrated in FIG. 13*m*. A ring request is sent to the RT at step 1333. After a delay of e.g., 200 ms the system checks the ring detect message from the RT and logs the result at step 1335.

The system then performs a reflective test, as illustrated in FIG. 13*n*. Upon ringing the RT will connect a reflective short termination to the test bus at step 1337. At step 1339, the system connects the VF board to the LC Emulator. After a delay (25 ms) a check at step 1341 confirms reflective connection of the RT. At step 1343 the system reads the reflected voltage from the DAC input and, after a delay (100 ms) for settling of A/D, compares the reflected voltage with reference value(s) at step 1345. The results are logged and the system disconnects the VF board from the LC Emulator at step 1347.

Thereafter, the system disconnects the reflective short termination from the RT test bus, and disconnects the selected line from the RT test bus by sending a return to normal message to the RT. The RT test is then repeated for the other line at step 1351.

Following testing of both lines at the RT, the system disconnects the DSL of the selected LC from the TEST DSL by transmitting a message to the selected LC and disconnects the LC-Emulator from the TEST DSL line. The status of the RT is then logged for the specific SC/LC and time stamped.

FIG. 13*o* illustrates the DSL power feed test 1377 in greater detail. At step 1379 the system checks to make sure the selected DSL is up. If not, the system waits for a selected time at step 1381 and retries for a selected number of times. If the DSL is up, the system connects the voltage source board to the Test Output line at step 1383. At step 1385 the system measures the tip and ring voltage, and at step 1387 compares to a reference value, and logs the result. At step 1389 the system then connects a high current load in the RT emulator, and again measures the tip and ring voltages at step 1391. At step 1393 the system compares the values with a reference value and logs the result. At step 1395 the system disconnects the high load in the RT emulator and disconnects the RT emulator from the test output line.

By performing a test of the RT, followed by the DSL and LC tests, it is possible not only to identify that a failure has occurred in a LS, but also to identify the location of the failure within the LS. This has a variety of benefits. For example, if the failure is in the RT, a repairman can be dispatched to the user facilities and a modular RT electronics box readily replaced. If, on the other hand, the failure is in the DSL, a line repairman can be dispatched. If the failure occurs in the LC, an appropriately skilled person may be dispatched to the central office facilities containing the LC's.

VI. RT Enclosure

The RT electronics will often be located in an unprotected environment at a user location. Access to various portions of the RT is desirably limited. FIGS. 14 and 15 illustrate an enclosure which will find particular application with the RT disclosed herein.

As shown in FIG. 14, the enclosure includes an RT electronics case 1402, a telephone company equipment compartment 1404, and a customer line compartment 1406. The three portions of the enclosure are mounted to, for example, a wall, pole, or any other convenient location via a mounting plate 1408.

The electronics case houses the PCB containing the various electronic components used in D/A and A/D conversion and generally illustrated in FIG. 2. The telephone company equipment compartment contains one or more terminal blocks connected to a drop wire 1410 containing one or more DSL's. The customer line compartment houses one or more customer blocks for connection of subscriber equipment lines 1412.

The electronics case is preferably a modular plug-in unit which lifts directly off of and away from the lower portions of the enclosure, as indicated by the arrow 1414. A door over the customer line enclosure is hinged to drop down in the direction of arrow 1416 and then out in the direction of arrow 1418. A door over the telephone company equipment enclosure 1404 is similarly hinged. A skirt 1420 extends outward and downward from the electronics case and over the telephone company so as to prevent the influx of rainfall and the like in one embodiment. In a preferred embodiment, the entire case is sized to fit over the doors, rendering the skirt unnecessary. Downward movement of the doors to the two compartments 1404 and 1406 allows overhang of the skirt 1420 while also allowing access to the two Compartments without removal of the case 1402.

FIG. 15 illustrates the enclosure in greater detail with the case 1402 lifted from its base and with the two compartment doors open. The case 1402 is shown partially cut away. As shown, the case 1402 encloses PCB 1422 which contains the various components shown in FIG. 2 along with their interconnections. Interconnections to the terminal blocks in the telephone company compartment 1404 and customer compartment 1406 are made via a multiple conductor plug 1424 and socket 1426 of the type well known to those of skill in the art.

In one preferred embodiment, the PCB is mechanically connected to the case 1402 and lifts away from the connector 1426 when the case is lifted away therefrom. In most preferred embodiments, the multiple conductor socket is at least partially filled with an environmental sealant. A wide variety of sealants are available for this use, including, for example, hot melts, but preferably including epoxies and dielectric gels such as urethanes, silicones, and styrene-ethylene-butylene-styrenes, including those disclosed in U.S. Pat. Nos. 4,634,207, 4,600,261, 4,643,924, 4,865,905, 4,662,692, and 4,942,270, which are incorporated herein by reference for all purposes. Preferred gels used in conjunction with the present invention include those having a cone penetration value of 50 to $350\times10^{-1}$ mm, preferably 100 to $300\times10^{-1}$ mm, and most preferably 100 to $250\times10^{-1}$ mm. Preferred gels also have an ultimate elongation of at least 50%, preferably at least 100%, and most preferably at least 200%. Such gels may be utilized by forming the gel directly in the socket or in other forms such as with tape such as those sold under the name Gel-Tek TM by Raychem Corporation.

In preferred embodiments, the bottom portion of the case 1402 is sealed with a plate 1458, as shown in the cut-away portion of FIG. 15. Above the plate 1458, the case is further sealed with hot melt 1460. Preferably, the case is filled with between 1/64" and ⅛" hot melt or mastic, preferably having good adhesion to metal properties at low temperatures (e.g., 0° C.) and not becoming brittle at low temperatures. Hot melt suitable for this purpose is preferably type number S1149 made by Raychem Corporation. In preferred embodiments the bottom of the case is sealed with hot melt although gels such as those described in the above incorporated patents may be used in some embodiments.

The door of the telephone company compartment 1428 is mounted to a frame 1430 with drop hinges 1432. Drop hinges allow the door to move both upward and downward, as well as allowing the door to swing open and shut. The door 1438 includes a lip 1434 which extends under a customer equipment door 1436 when the doors are in the closed position. This prevents encroachment of water from rain, as well as other environmental encroachments.

Door 1428 is provided with a protected fastener 1438 which engages the frame 1430 at a mounting point 1440. The protected fastener is designed to limit customer access to the telephone company compartment 1404. Protected fasteners that will find use in conjunction with the invention include one-way screws, twisted wires with seals which are destroyed when the door 1428 is opened, key locks, screws with heads accessible only with specialized tools, and the like. By contrast, customer compartment door 1436 is fastened to the frame 1430 with a conventional and readily utilized fastener 1444, such as a conventional screw, bolt, wing nut, friction fitting, or the like. Accordingly, a customer is provided ready access to compartment 1406, while only the telephone company has ready access to compartment 1404.

In some embodiments case 1402 is held to the frame 1430 by only the socket 1426, although in some embodiments one or more bolts or other fasteners 1446 extend through the frame and into the case. As shown, one of the bolts is connected to the frame in the telephone company compartment 1404 and, accordingly, removal of the case is limited to only those having access to the compartment 1404.

Inside the telephone company compartment 1404, terminal blocks 1448 are mounted to frame 1430. Terminal block 1448 serves as an interface between socket 1426 and a twisted pair wire entering the customer facility. According to one preferred embodiment, the terminal block 1448 is a Raychem DTerminator TM, Protected DTerminator TM, or the like.

Inside the customer compartment 1406 a customer terminal block 1450 is mounted to frame 1430. Customer terminal block 1450 preferably includes both screwed terminal connections 1452 and modular, plug-in connections 1454. Customer terminal block 1450 serves as an interface between socket 1426 and wires leading to subscriber equipment in the customer's facility. In most preferred embodiments, both of terminal blocks 1448 and 1450 are protected with terminal block caps filled with a gel such as the gels used in the socket 1426.

In the particular embodiment shown in FIG. 15, the modular plug in connections 1454 such as RJ11 connections include a male and female side. In normal operation, the male and female portions are connected and telephone signals to the subscriber equipment are transmitted over two or more wire conductors therein. When it is desirable to perform maintenance or check the subscriber equipment at the RT, the male side is disconnected and the test equipment, such as a phone used for testing, is plugged into the female side of the plug. Upon completion of the testing activities, the male plug in the RT is reinserted into the female side, reestablishing a connection with the subscribers equipment.

The enclosure provides a customer ready access to portions of the RT which require customer service. At the same time, the enclosure provides reliable environmental protection to the electronics of the RT, as well as the interfaces to the DSL and subscriber lines. The RT electronics are compartmentalized in the case 1402 such that when a failure of the RT electronics is detected, the entire case is simply removed and replaced with a new unit. A switch 405 detects opening of the telephone company compartment and reports such conditions via the test system.

The case, the customer compartment and/or the telephone compartment may be provided with additional environmental sealing using, for example, the gels mentioned in conjunction with the socket 1426.

For example, according to one embodiment a strip of environmental sealant (a section of which is illustrated by reference numeral 1462) is provided around the edges of the frame where the frame meets the doors 1428 and 1436. According to further embodiments, a strip of environmental sealant is provided along the top perimeter of the frame where the frame will meet the case (as illustrated by the section of sealant 1464). Sealant 1466 may optionally be provided in the case 1402 against the PCB 1422 to provide shock resistance and corrosion resistance for the components therein.

In normal operation, the enclosure is utilized in the configuration shown in FIG. 14. If the subscriber needs access to the customer compartment, the fastener 1444 is disengaged, the door is dropped to the lower limits of the hinges, and the door is swung open. The subscriber removes terminal covers (if any) from the terminal block and performs any required operations to the customer compartment. Access to the telephone company compartment is restricted due to the fastener 1438. Similarly, removal of the case 1402 and attendant electronics is restricted because the subscriber cannot access the fastener 1446 in the compartment 1404.

If the telephone company requires access to the terminal blocks 1448, the restricted fastener 1438 is released, the door is dropped to the bottom limits of its hinges (to clear the skirt 1420) and the door is swung open. If a failure of the RT electronics is detected by the test system, the case is released from the frame 1430 by releasing the fasteners 1446. According to preferred embodiments, rather than attempting service of any individual electronic component of the RT the entire case, including the enclosed electronics and gel sealant, is removed from the frame and replaced with a new case and electronics. According to alternative embodiments, the case is sealed to the frame with a gasket or seal, and lifts away from the frame without the internal electronics. In such embodiments the gels described in the above-incorporated patents are used for sealing and are placed in a trough which is engaged by the bottom of the case. The RT PCB or any particular component thereon is then appropriately replaced or serviced.

In preferred embodiments, each of the internal electronics and interconnections in the customer accessible compartment and telephone company accessible compartment are sealed individually, rendering sealing of the doors unnecessary. The frame is preferably self draining to weep holes or the like, preventing accumulation of moisture in the enclosure.

The enclosure and its various components may be made from any one of a wide variety of materials. Preferred among such materials are sheet metal, plastic, and the like.

FIG. 16 illustrates one embodiment of the bottom portion of the RT enclosure in greater detail. As shown the telephone company compartment encloses terminal block 1448. The terminal block 1448 is preferably formed with an upper portion 1602 and a lower portion 1604. The upper portion is shown in FIG. 16 with a cover thereon which encloses one or more of the above-described gels. The lower portion 1604 provides a connection to the drop wires.

The telephone company compartment further includes a maintenance interface 1606 such as a five-pin plug, as well as indicator lights 403.

In the customer compartment 1406, terminal block 1452 is shown with a gel-filled cover 1608 thereon. In the preferred embodiment shown in FIG. 16, wires need not extend from the male side of the RJ11 connector, using the "dummy" male connector described below. Optionally, a grasping means, such as a stiff plastic string 1610, is connected to the male side of the "dummy" RJ11 test connection, allowing it to be easily removed from the female side.

VII. Test Access Port

FIG. 17 illustrates the test port 1454 in greater detail according to one embodiment of the invention. In the particular embodiment shown in FIG. 17 the port includes a female, preferably RJ11, socket or jack 1702 and a male plug 1704. The male plug is inserted into the female socket for normal operation of the system by a subscriber. During testing operations, such as when service personnel desire to connect a phone at the RT for monitoring operations at the RT, the male dummy plug is removed and a conventional RB11 connector is inserted into the female side 1702.

In the embodiment shown in FIG. 17 a RJ11 plug is used which contains six connectors such as 1706*a*, 1706*b*, 1706*c*, 1706*d*, 1706*e*, and 1706*f*. In the embodiment shown in FIG. 17 the third contact 1706*c* is the ring wire which provides signals which ultimately are generated at the CO. Similarly, the fourth contact 1706*d* is the tip contact which provides signals which are ultimately generated at the CO. In the particular embodiment shown in FIG. 17 the first contact 1706*a* is connected to the ring line which leads into the home, office, or other subscriber facility. The sixth contact 1706*f* is connected to the tip line which leads into the home, office, or other subscriber facility.

The male RJ11 plug 1704 is referred to herein as a "dummy" connection because it does not contain wires that extend from the male connection to subscriber equipment or elsewhere. The dummy male connector preferebly includes slots 1708*a-f* for receiving the contacts 1706*a-f*. A first conductor 1710 such as a copper or aluminum strip or wire 1710 inside the male RJ11 electrically connects the first pin 1706*a* and the third pin 1706*c* of the female RJ11 when the male plug is inserted into the female plug. Similarly a second conductor 1712 in the male RB11 electrically connects the fourth pin 1706*d* and the sixth pin 1706*f* of the female RB11 when the male plug is inserted. It will be recognized that the conductors 1712 and 1710 could take on any one of a number of forms such as wires, deposited metal, separate metal strips, or the like. Accordingly, when the dummy male RJ11 is inserted into the female RJ11, a tip connection and ring connection between the subscriber facility and the CO (via the RT in the particular embodiment herein) is established.

Since wires need not extend from the body of the male RB11 to an external location, environmental sealing is greatly simplified. Accordingly, in preferred embodiments gels such as those described in the above incorporated patents are provided in one or more of the inside of the female RJ11 1702, the inside portion of the male RJ11 1704, a trench 1714 around the perimeter of the female RJ11, and/or a trench formed by a cap 1716 around the male RJ11. The gel preferably has a cohesive strength greater than its adhesive strength. Upon a disengagement of male RJ11 1704 from female RJ11 1701, any gel provided inside of the female RJ11 1701 remains substantially within the female RJ11 1701 and is cleanly as well as immediately removed from the male RJ11 1704. For merely the purpose of illustration herein, the gel is shown only in the trench 1714 and in the cap 1716. In most preferred embodiments, the gel is provided only in the trench surrounding the female socket, while the cap around the male plug forms an edge lip which engages the gel in the female trench when the two are mated. In this most preferred embodiment the user has minimal contact with gel in the test plug. Alternatively, sealing means as taught in EPO Publication No. 0 213 874, Mar. 11, 1987 ("Corrosion Protection Apparatus") may be utilized, which is incorporated herein by reference (EP Application 86306401.0, Aug. 19, 1986, priority from U.S. Ser. No. 767,555, filed Aug. 20,1985).

FIGS. 18*a* and 18*b* illustrate the electrical connections made during test and normal operations modes, respectively, with the RB11 arrangement herein. As shown in FIG. 18*a* during test operations a conventional RJ11 plug is used to connect test equipment to the tip and ring lines ultimately leading to the CO. The tip and ring lines leading to the home or office are disconnected. As shown in FIG. 18*b* when the male dummy plug 1704 is installed, the ring line leading to the CO is directly connected to the ring line leading into the house, and the tip line leading to the CO is directly connected to the tip line leading to the house.

VIII. Power Management

The system described above provides multiple-line telephone services to a user over a single twisted pair without the need to provide a battery or other current source at the RT. At the same time, the system maintains the line power within the limits proscribed by TR-TSY-000057 standard AII in a standby mode and AIII during active line use. In preferred embodiments the RT microprocessor is operated at a relatively slow speed (e.g., 4 MHz or less) as compared to the LC processor, which may be operated at relatively higher speeds (e.g., 11 MHz or more) for power conservation at the RT, particularly during "idle" periods.

Table 3 illustrates the power usage of the various components in the system according to one embodiment in a standby mode, an active mode, a 1-ring mode, and a 1-active, 1-ring mode. The data illustrated in Table 3 are based on a 16500-foot twisted pair using 26-gauge wire plus 1500 feet of 24-gauge wire. Table 3 illustrates that by use of the method/apparatus disclosed herein, in the standby mode the system is well within AII limits. Specifically, about 430 milliwatts may readily be provided in a typical system while remaining in AII limits, while only 373 milliwatts are needed during standby. Similarly, the 2302 milliwatts needed for 1-ring and 1-active signals are well within the amount of power which may be provided while staying within the time-dependent AIII limits.

TABLE 3

| | System Power Use (milliwatts) | | | |
|---|---|---|---|---|
| | Mode | | | |
| Component | Standby | 2-Active | 1-Ring | 1-Active, 1-Ring |
| Microprocessor | 25 | 25 | 25 | 25 |
| ICC | 3 | 3 | 3 | 3 |
| IECQ | 300 | 300 | 300 | 300 |
| SICOFI | 3 | 120 | 120 | 120 |
| SLIC | 42 | 90 | 42 | 66 |
| Loop | 0 | 1176 | 0 | 588 |
| Ring | 0 | 0 | 1200 | 1200 |
| TOTAL: | 373 | 1714 | 1690 | 2302 |

IX. Conclusion

The inventions claimed herein provide a substantially improved method and device for transmitting voice and data signals over a single twisted pair. It is to be understood that the above description is intended to be illustrative and not restrictive. Many embodiments will be apparent to those of skill in the art upon reviewing the above description. By way of example the inventions herein have been illustrated primarily with regard to transmission of voice and data signals (POTS), but they are not so limited. For example, the inventions could be applied in the transmission and reception of other types of signals such as radio and TV signals, telephoto, teletype, facsimile, and other electromagnetic and/or optical signals. By way of further example, the inventions have been illustrated above with reference to the simultaneous transmission of two signals over a single twisted pair, but the inventions could be extended single twisted pair. By way of still further example, the invention has been illustrated in conjunction with specific integrated circuits and operating speeds, but the invention is not so limited. By way of still further example, the specific connectors and the roles of the male and female connectors disclosed herein could readily be reversed or altered. The scope of the inventions should, therefore, be determined not with reference to the above description, but should instead be determined with reference to the appended claims, along with the full scope of equivalents to which such claims are entitled by the ordinary skilled artisan.

APPENDIX I

RT Code

```
DOS 3.30 (038-N) MCS-51 MACRO ASSEMBLER, V2.3
OBJECT MODULE PLACED IN MUXRT.OBJ
ASSEMBLER INVOKED BY:  C:\MCS51\ASM51.EXE MUXRT.ASM

LOC  OBJ              LINE     SOURCE

                         1     $TITLE(     Subscriber Line Multiplexer Program for RT     )
                         2     $MACRO(75)
                         3     $ERRORPRINT
                         4     $DEBUG
                         5     $NOREGISTERBANK
                         6     $XREF
                         7     $PAGELENGTH(59)
                         8     $PAGEWIDTH(110)
                         9     ;**************************************************************************
                        10     ;                           SUBSCRIBER LINE MULTIPLEXER SYSTEM
                        11     ;
                        12     ;                                  ****  MARK V  ****
                        13     ;
                        14     ;
                        15     ; This is the assembly listing for the subscriber line multiplexer system.
                        16     ; This code is for the MARK V  Remote Terminal (RT).
                        17     ; The code is configured by using common includ files that may have
                        18     ; conditional assembly switch for this file.  We use MODEL=RT fot this
                        19     ; section.
                        20     ;
                        21     ; This code will go into a LD80C51BH in the end, Temp LD87C51
                        22     ; This chip has 4K ROM, 128 RAM
                        23     ;
                        24     ;       (C) Copyright 1990  RAYCHEM Corporation,  Menlo Park, CA
                        25     ;**************************************************************************
                        26     ;
----                    27             CSEG    AT 0F80h           ; Absolute Code Segment
                        28                                        ; Top of on-chip 4K ROM to contain
                        29                                        ; ID, version number and date strings
                        30
0F80 50726F6A           31             DB      'Project Manager:'
0F84 65637420
0F88 4D616E61
0F8C 6765723A
0F90 44617669           32             DB      'David C. Bliven '
0F94 6420432E
0F98 20426C69
0F9C 76656E20
                        33
0FA0 53797374           34             DB      'System Software:'
0FA4 656D2053
0FA8 6F667477
0FAC 6172653A
0FB0 44617669           35             DB      'David C. Bliven '
0FB4 6420432E
0FB8 20426C69
0FBC 76656E20
                        36
0FC0 4D555852           37             DB      'MUXRT           '        ; Model ID
0FC4 54202020
0FC8 20202020
0FCC 20202020
```

```
0FD0 56232030              DB      'V# 0.5C 09/08/90'      ; Version and date
0FD4 2E354320
0FD8 30392F30
0FDC 382F3930



                   ;------------------------------------------------------------
                   ; MACROS
              +1   $INCLUDE(MACRO.INC)
          =1       ;-----------------------------------------------------------
          =1       ; MACROs for the system
          =1
          =1       ;-----------------------------------------------------------
          =1       ; SLIC MACRO used to set SSCP for SLIC control, Pass (<LINE-A/B->,<STATE>)
          =1
          =1
          =1       ;-----------------------------------------------------------
          =1       ; BANK MACRO used to select the register bank, Pass (<bank NO>)
          =1
          =1
          =1       ;------------------------------------------------------------
          =1       ; SETX MACRO used to set XDATA at DEST with DATA, Pass (<DEST>,<DATA>)
          =1
          =1
          =1       ;------------------------------------------------------------
          =1       ; SETX2 MACRO used to set XDATA at Point=R1 with DATA, Pass (<DATA>)
          =1
          =1
          =1       ;------------------------------------------------------------
          =1       ; SETA MACRO used to set XDATA at DEST with ACC, Pass (<DEST>)
          =1
          =1
          =1       ;------------------------------------------------------------
          =1       ; GETX MACRO used to read XDATA at SOURCE to DATA, Pass (<DATA>,<SOURCE>)
          =1
          =1
          =1       ;------------------------------------------------------------
          =1       ; GETX2 MACRO used to read XDATA at point R1, to DATA, Pass (<DATA>)
          =1
          =1
          =1       ;------------------------------------------------------------
          =1       ; GETA MACRO used to read XDATA at SOURCE to ACC, Pass (<SOURCE>)
          =1
          =1
          =1       ;------------------------------------------------------------
          =1  +1   $eject

              +1   $eject

                   ;------------------------------------------------------------
                   ;
                   ;        Intel MCS-51 (8051) I/O PORT USAGE: Ports 0-3
                   ;------------------------------------------------------------

                   ;         Port 0 used as byte-wide address/data bus.

                   ; The bus is used to work with the 2070 ICC control and multiplexer.
                   ; It is accessed for this function through the MOVX instructions.
```

```
00FF        P0_INIT          EQU     011111111B      ; Set up for port 0

            ;------------------------------------------------------------------

            ;       Port 1 used for input and output

0090        CS_ICC           BIT     P1.0     ; /Chip select ICC   PEB 2070
0091        RESET_ICC        BIT     P1.1     ;  Reset ICC  PEB 2070
0092        RESET_IECQ       BIT     P1.2     ; /Reset IECQ  PEB 2091
0093        RESET_SICOFI     BIT     P1.3     ;  Reset IECQ  PEB 2260
0094        ABS_TERM         BIT     P1.4     ; Switches in/out 600 ohms test terminus
0095        REF_TERM         BIT     P1.5     ; Switches in/out  a short test terminus
0096        RINGOSC_A        BIT     P1.6     ; Ring oscillator control A, rest=0
0097        RINGOSC_B        BIT     P1.7     ; Ring oscillator control B, rest=1

008B        P1_INIT          EQU     010001011B      ; Set up for port 1

            ;       Port 2 used for input and output
            ;       Bits 7-4 used for I/O, Bits 3-0 drive LEDs & LCD panel

00A0        LED_LINK_UP      BIT     P2.0     ; Link line up LCD & Link Up < 5 Min. LED
00A1        LED_POWER_ON     BIT     P2.1     ; Power On LCD & Link Down < 5 Min. LED
00A2        LINE_A_LCD       BIT     P2.2     ; phone line A in use LCD (RT)
00A3        LINE_B_LCD       BIT     P2.3     ; phone line B in use LCD
00A4        ALARM_DR         BIT     P2.4     ; 80hz Drive for LCDs and AUX sense
00A5        TAMPER_ALM       BIT     P2.5     ; TAMPER (Door open) = 1
00A6        AUX_2_IN         BIT     P2.6     ; AUX 2 (house sensor)
00A7        AUX_1_IN         BIT     P2.7     ; AUX 1 (house sensor)

00FF        P2_INIT          EQU     011111111B      ; Set up for Port 2

            ;       Port 3 is used for MCS-51 special function control,
            ;       such as timer, interrupt and serial I/O

00B3        RING_DET         BIT     P3.3     ; 0=ring detect during test
00B5        BOARD_TEST       BIT     P3.5     ; is Board test pin

00FF        P3_INIT          EQU     011111111B      ; Set up for Port 3

            ;-----------------------------------------------------------------
            ; Timing control values

            ; Time for on hook wate,  10 sec
0040        TIME_ACT_LO      EQU     64
0006        TIME_ACT_HI      EQU     6

            ; Time for off hook delay,  50ms
0008        TIME_DELAY_LO    EQU     8

            ; Time for ring wate,  1sec
00A0        TIME_RING_WT     EQU     160

            ; Time for on hook wate,  100ms
0010        TIME_RING_ST     EQU     16

            ; Time for on hook Dile,  200ms
0020        TIME_DILE_WT     EQU     32
```

```
                      ; Time for flash,  1.2 sec
00BC                  TIME_FLASH        EQU     188
                      ;---=-----------------------------------------------------------
                      ; Controler setup values

                      ;T1LOAD            EQU     -1              ; RT Baud rate 19.2k w/3.6864mhz xtal
                      ;PCOND             EQU     10000001b       ; High Speed Comm Link SMOD = 1
FFF8                  T1LOAD            EQU     -8              ; RT Baud rate 1200 w/3.6864mhz xtal
0001                  PCOND             EQU     00000001b       ; Low Speed Comm Link SMOD = 0
0070                  SCOND             EQU     01110000b       ; Serial I/O port mode 1 for RT
FFCE                  T0LOAD            EQU     -(8000/160)     ; For 160hz interrupts with 8khz T0 i
0087                  PCON              EQU     87h             ; Used to set idle mode in MAIN
0002                  P_OFF             EQU     00000010b       ; Power down 87C51 processor
0078                  RESET_TOL         EQU     120             ; The missed Link messages that will
                      t
000A                  RX_TOL            EQU     10              ; The missed RX for Reciver reset
000A                  TX_TOL            EQU     10              ; The missed TX for Transmit reset

                      ;---------------------------------------------------------------
                      ; Control codes for ICC 2070

                  +1  $INCLUDE(ICCDATA.INC)
             =1       ;-----------------------------------------------------------------
             =1
             =1       ; Register Definitions for
             =1       ; ICC  PEB 2070 ISDN Communications Controller
             =1
             =1       ; Interrupt/Status registers
             =1
0020         =1       ISTA     XDATA   020h            ;interrupt status reg read, at reset = 00h
             =1
0020         =1       MASK     XDATA   020h            ;interrupt mask reg write, at reset = 00h
             =1       ; The ISTA and MASK bits have the following meaning
             =1                ;       *--------RME receive message end
             =1                ;       |*-------RPF receive pool full
             =1                ;       ||*------RSC receive status change
             =1                ;       |||*-----XPR transmit pool ready
             =1                ;       ||||*----TIM timer interrupt
             =1                ;       |||||*---CIC C/I code change
             =1                ;       ||||||*--SIN synchronous transfer
             =1                ;       |||||||*-EXI extended interrupt
             =1                ;       ||||||||
0079         =1       MASKD    EQU     01111001b       ; =1 to mask off corresponding interrupt
             =1
0024         =1       EXIR     XDATA   024h            ;extended interrupt reg read, at reset = 00h
             =1       ; The EXIR has the following meaning
             =1                ;       *--------XMR transmit message repeat
             =1                ;       |*-------XUD transmit data underrun
             =1                ;       ||*------PCE protocol error
             =1                ;       |||*-----RFO receive frame oveflow
             =1                ;       ||||*----SOV synchronous transfer overflow
             =1                ;       |||||*---MOS monitor status
             =1                ;       ||||||*--SAW subscriber awake
             =1                ;       |||||||*-WOV watchdog timer overflow
             =1                ;       ||||||||
             =1                ;       XXXXXXXXb
             =1
0021         =1       STAR     XDATA   021h            ;status reg read, reset = 48h
             =1       ;the STAR has the following meaning
```

```
      =1          ;         *---------XDOV transmit data overflow
      =1          ;         |*--------XFW transmit FIFO write enable
      =1          ;         ||*-------XRNR transmit RNR
      =1          ;         |||*------RRNR receive RNR
      =1          ;         ||||*-----MBR message buffer ready
      =1          ;         |||||*----MAC1 monitor ch 1 active
      =1          ;         ||||||*---BVS B ch valid on sip
      =1          ;         |||||||*--MAC0 monitor ch 0 active
      =1          ;         ||||||||
      =1          ;         XXXXXXXXb
      =1  +1  $eject
      =1          ;HDLC/LAPD operation control
      =1
0021  =1      CMDR     XDATA   021h          ;command reg write, reset = 00h
      =1      ;the CMDR has the following meaning
      =1          ;         *---------RMC receive message complete
      =1          ;         |*--------RRES recevier reset
      =1          ;         ||*-------RNR receive not ready
      =1          ;         |||*------STI start timer
      =1          ;         ||||*-----XTF transmit transparent frame
      =1          ;         |||||*----XIF transmit I-frame
      =1          ;         ||||||*---XME transmit message end
      =1          ;         |||||||*--XRES transmit reset
      =1          ;         ||||||||
0080  =1      CMDRMC   EQU     10000000b
0040  =1      CMDRRES  EQU     01000000b
0001  =1      CMDXRES  EQU     00000001b
000A  =1      CMDXTF   EQU     00001010b
0041  =1      CMDRCL   EQU     01000001b
      =1
0022  =1      MODE     XDATA   022h          ;mode reg read/write, reset 00h
      =1      ;the MODE has the following meaning
      =1          ;         ***------MDS HDLC mode select, 110=Transparent Mode 2
      =1          ;         |||*-----TMD timer mode
      =1          ;         ||||*----RAC receiver active
      =1          ;         |||||***-DIM digital interface mode
      =1          ;         ||||||||
00CA  =1      MODED    EQU     11001010b
      =1
0023  =1      TIMR     XDATA   023h          ;timer reg read/write, reset undefined
      =1      ;the TIMR has the following meaning
      =1          ;         ***------cnt timer count
      =1          ;         |||*****-value setting of timer
      =1          ;         ||||||||
00CC  =1      TIMRD    EQU     11001100b
      =1
0025  =1      RBCL     XDATA   025h          ;receive frame buffer count read. reset 00h
      =1      ;the RFBC has the length of the receive message
      =1
002A  =1      RBCH     XDATA   02Ah          ;receive frame count high read, reset 00h
      =1      ;the RBCH has the following meaning
      =1          ;         ***------VN2-0 version number of chip
      =1          ;         |||*-----OV overflow
      =1          ;         ||||****-RBCH high part of receive count
      =1          ;         ||||||||
      =1      ;        EQU     00000000b
      =1
0027  =1      RSTA     XDATA   027h          ;receive status reg read, reset undefined
      =1      ;the RSTA has the following meaning
```

```
        =1                 ;       *--------RDA receive data
        =1                 ;       |*-------RDO receyie data overflow
        =1                 ;       ||*------CRC Cyclic Redundancy Count check
        =1                 ;       |||*-----RAB receive message aborted
        =1                 ;       ||||**---SA1-0 SAPI address id
        =1                 ;       ||||||*--C/R command/response
        =1                 ;       |||||||*-TA TEI address id
        =1                 ;       ||||||||
        =1         ;       EQU     00000000b
        =1
        =1                 ;HDLC address variables
        =1
0024    =1         XAD1    XDATA   024h            ;transmit address 1 reg write
        =1         ;use in auto mode
        =1
0025    =1         XAD2    XDATA   025h            ;transmit address 2 reg write
        =1         ;use in auto mode
        =1
0026    =1         SAP1    XDATA   026h            ;sapi reg write
        =1         ;used in auto mode has the following meaning
        =1                 ;       ******---SAPI1 first service access point identifier
        =1                 ;       ||||||*--CRI command/response ind
        =1                 ;       |||||||*-0
        =1                 ;       ||||||||
        =1
0027    =1         SAP2    XDATA   027h            ;sapi reg write
        =1         ;used in auto mode has the following meaning
        =1                 ;       ******---SAPI2 second service access point identifier
        =1                 ;       ||||||*--MCS modulo count selsct
        =1                 ;       |||||||*-0
        =1                 ;       ||||||||
        =1
0028    =1         TEI1    XDATA   028h            ;tei reg write
        =1         ;used in auto mode has the following meaning
        =1                 ;       *******--TEI1
        =1                 ;       |||||||*-EA adress field extension
        =1                 ;       ||||||||
00FF    =1         TEI1D   EQU     0FFh
        =1
0029    =1         TEI2    XDATA   029h            ;tei reg write
        =1         ;used in auto mode has the following meaning
        =1                 ;       *******--TEI2
        =1                 ;       |||||||*-EA adress field extension
        =1                 ;       ||||||||
00FF    =1         TEI2D   EQU     0FFh
        =1
0026    =1         SAPR    XDATA   026h            ;SAPI reg read
        =1         ;used in transparent mode
        =1
        =1                 ; HDLC control data
        =1
0029    =1         RHCR    XDATA   029h            ;receive HDLC control read
        =1         ;the data depends on mode, see manual
        =1
        =1                 ; HDLC information data
        =1
0000    =1         RFIFO   XDATA   000h            ;receive  data 32 bytes read
0000    =1         XFIFO   XDATA   000h            ;transmit data 32 byte write
        =1
0030    =1         SPCR    XDATA   030h            ;serial port control reg read/write, reset =
```

```
            =1   ;the SPCR has the following meaning
            =1             ;       *---------SPU software power up
            =1             ;       |*--------SAC SIP port active
            =1             ;       ||*-------SPM serial port timing
            =1             ;       |||*------TLP test loop
            =1             ;       ||||**---C1C1-0 channel 2 connect
            =1             ;       ||||||**-C2C1-0 channel 2 connect
            =1             ;       ||||||||
0080        =1   SPCRD1    EQU     10000000b
0045        =1   SPCRD2    EQU     01000101b
            =1
            =1
0031        =1   CIR0      XDATA   031h            ;command/indication receive 0 reg
            =1                                     ;read, reset 7Ch
            =1   ;the CIR0 has the following meaning
            =1             ;       *---------0
            =1             ;       |*--------BAS bus access status
            =1             ;       ||****---CODR0 receive C/I channel 0
            =1             ;       ||||||*--CIC0 C/I code change channel 0
            =1             ;       |||||||*-CIC1 C/I code change channel 1
            =1             ;       ||||||||
            =1   ;         EQU     00000000b
            =1
00C3        =1   CIR0_MASK         EQU     011000011b      ; To mask off the C/I data
            =1
0031        =1   CIX0      XDATA   031h            ;command/indication transmit 0 reg
            =1                                     ;write, reset BFh
            =1   ;the CIX0 has the following meaning
            =1             ;       *---------RSS reset source select
            =1             ;       |*--------BAC bus access control
            =1             ;       ||****---CODX0 C/I transmit channel 0
            =1             ;       ||||||*--TCX T channel output
            =1             ;       |||||||*-ECX E channel output
            =1             ;       ||||||||
0047        =1   CIX0D     EQU     01000111b       ;RESet request
            =1
0032        =1   MOR0      XDATA   032h            ;monitor receive channel 0 read
            =1   ;the MOR0 has no specific data to set
            =1
0032        =1   MOX0      XDATA   032h            ;monitor transmit channel 0 write
0000        =1   MOX0D     EQU     00000000b
            =1
            =1
0033        =1   SSCR      XDATA   033h            ;SIP signalling code receiveed 1 reg
            =1                                     ;read register, at reset = FFh
            =1
0033        =1   SSCX      XDATA   033h            ;SIP signalling code transmit 1 reg
            =1                                     ;write register, at reset = FFh
            =1
0034        =1   MOR1      XDATA   034h            ;MOnitor Receive channel 1 read
            =1
0034        =1   MOX1      XDATA   034h            ;MOnitor transmit channel 1 write
            =1
0035        =1   C1R       XDATA   035h            ;channel 1 reg read/write
            =1
0036        =1   C2R       XDATA   036h            ;channel 2 reg read/write
            =1
0037        =1   B1CR      XDATA   037h            ;channel B1 reg read
            =1
0038        =1   B2CR      XDATA   038h            ;channel B2 reg read
```

```
0037    =1      STCR     XDATA   037h          ;synchronous transfer control reg write
        =1      ;the STCR has the following use
        =1               ;       *---------TSF terminal specific function
        =1               ;       |***------SBA2-0 tic bus address
        =1               ;       ||||*-----ST1 synchronous transfer 1
        =1               ;       |||||*----ST0 synchronous transfer 0
        =1               ;       ||||||*---SC1 synchronous transfer 1 completed
        =1               ;       |||||||*--SC0 synchronous transfer 0 completed
        =1               ;       ||||||||
0070    =1      ST_NOR   EQU     01110000b
0078    =1      ST_ST1   EQU     01111000b
0074    =1      ST_ST0   EQU     01110100b
007A    =1      ST_SC1   EQU     01111010b
0075    =1      ST_SC0   EQU     01110101b
        =1
        =1
0038    =1      ADF1     XDATA   038h          ;additional feature reg write, reset 00h
        =1      ;the ADF1 has the following use
        =1               ;       **--------WTC2-1 watchdog timer control
        =1               ;       ||*-------CI1E C/I channel interrupt enable
        =1               ;       |||*------IDC iom direction control
        =1               ;       ||||***---CSEL2-0 channel select
        =1               ;       |||||||*--ITF inter-frame time fill
        =1               ;       ||||||||
0000    =1      ADF1D    EQU     00000000b
        =1
0039    =1      ADF2     XDATA   039h          ;additional feature reg read/write, reset 00h
        =1      ;the ADF2 has the following use
        =1               ;       *---------IMS IOM mode selection
        =1               ;       |***------D2C0-2 data strobe polarity
        =1               ;       ||||*-----ODS output drive selection
        =1               ;       |||||***--D1C0-2 data strobe polarity
        =1               ;       ||||||||
0000    =1      ADF2D    EQU     00000000b
        =1
003A    =1      MOSR     XDATA   03Ah          ;monitor status reg read, reset 00h
        =1      ;the MOSR has the following use
        =1               ;       ********--this reg for IOM rev2 only
        =1               ;       ||||||||
0000    =1      MOSRD    EQU     00000000b
        =1
003A    =1      MOCR     XDATA   03Ah          ;monitor status reg wite, reset 00h
        =1      ;the MOCR has the following use
        =1               ;       ********--this reg for IOM rev2 only
        =1               ;       ||||||||
0000    =1      MOCRD    EQU     00000000b


                ;----------------------------------------------------------------------
                ; Command/Indication (C/I) codes for
                ; IEC-Q  PEB 2091 ISDN Echocancellation Transceiver Circuit


                         ;Commands
0043            IECQ_TIM          EQU     01000011b      ;TIMIDLE
0043            IECQ_DRC          EQU     01000011b      ;Deactivation Request (deactivate lin
0047            IECQ_RES          EQU     01000111b      ;RESet request
0053            IECQ_RES1         EQU 01010011b   ;Secandery reset
0057            IECQ_SSP          EQU     01010111b      ;Send Single Pulses
```

```
0063              IECQ_ARC       EQU     01100011b        ;Activation Request no loop
006B              IECQ_ARL       EQU     01101011b        ;Activation Request Local loop
0073              IECQ_AIC       EQU     01110011b        ;Activation Indication Command
007F              IECQ_DCC       EQU     01111111b        ;Deactivation Confirmation
007C              IECQ_DIC       EQU     01111100b        ;Deactivation Indication Command

                        ;Responses
00C3              IECQ_DR        EQU     11000011b        ;Deactivation Request
00C7              IECQ_DEAC      EQU     11000111b        ;DEactivation ACcepted
00CB              IECQ_FJ        EQU     11001011b        ;Frame Jump
00D3              IECQ_RSY       EQU     11010011b        ;ReSYnchronisation indication
00D7              IECQ_EI2       EQU     11010111b        ;Error indication on the s/t
00D3              IECQ_EI1       EQU     11010011b        ;Error Indication on the U interface
00DF              IECQ_UAI       EQU     11011111b        ;U Activation Indication
00E3              IECQ_AR        EQU     11100011b        ;Activation Request indication
00E7              IECQ_ARM       EQU     11100111b        ;Activation Request Monitor bits
00EF              IECQ_EI3       EQU     11101111b        ;Error Indication 3
00F3              IECQ_AI        EQU     11110011b        ;Activation Indication
00F7              IECQ_LSL       EQU     11110111b        ;Activation Indication
00FB              IECQ_AIL       EQU     11111011b        ;Activation Indication Loop
00FF              IECQ_DI        EQU     11111111b        ;Deactivation Indication
00FF              IECQ_DC        EQU     11111111b        ;Deactivation Confirmation
00DF              IECQ_PU        EQU     11011111b        ;Power up Indication



                  ;-----------------------------------------------------------------------
                  ; Control codes for SICOFI  2260

                  ; SICOFI PEB 2260 Signal OProcessing Codec Filter

----                      CSEG    AT 0E00h        ; Tables and constants located here

                  SICOFI_OPS:

                          ;COPs - Coefficient OPerations for Line A

0E00 FF                   DB      0FFh,0FFh,0FFh,0FFh,0FFh,0FFh,0FFh,0FFh
0E01 FF
0E02 FF
0E03 FF
0E04 FF
0E05 FF
0E06 FF
0E07 FF

0E08 13                   DB      013h            ; Coefficients for Z filter
0E09 70                   DB      070h,029h,03Eh,0F1h,0B1h,0C6h,042h,02Ch
0E0A 29
0E0B 3E
0E0C F1
0E0D B1
0E0E C6
0E0F 42
0E10 2C

0E11 2B                   DB      02Bh            ; Coefficients for R filter
0E12 F0                   DB      0F0h,0B8h,09Fh,0F2h,02Ah,026h,004h,03Eh
```

```
0E13 B8
0E14 9F
0E15 F2
0E16 2A
0E17 26
0E18 04
0E19 3E
                496
0E1A 23         497        DB      023h                  ; Coefficients for X filter
0E1B F0         498        DB      0F0h,0C8h,09Fh,0F1h,029h,026h,002h,026h
0E1C C8
0E1D 9F
0E1E F1
0E1F 29
0E20 26
0E21 02
0E22 26
                499
0E23 30         500        DB      030h                  ; Gain for GX
0E24 10         501        DB      010h,044h,080h,080h
0E25 44
0E26 80
0E27 80
                502
0E28 3A         503        DB      03Ah                  ; Gain for GR
0E29 A1         504        DB      0A1h,0DCh
0E2A DC
                505
0E2B 0B         506        DB      00Bh                  ; Coefficients for B2 filter
0E2C 00         507        DB      000h,0B3h,0A3h,0D4h,022h,0CBh,0B4h,0BAh
0E2D B3
0E2E A3
0E2F D4
0E30 22
0E31 CB
0E32 B4
0E33 BA
                508
0E34 03         509        DB      003h                  ; Coefficients for B1 fliter
0E35 31         510        DB      031h,042h,0B2h,09Bh,0FBh,049h,0A2h,0BCh
0E36 42
0E37 B2
0E38 9B
0E39 FB
0E3A 49
0E3B A2
0E3C BC
                511
0E3D 18         512        DB      018h                  ; Coefficients for B filter delay
0E3E 19         513        DB      019h,019h,011h,019h
0E3F 19
0E40 11
0E41 19
                514
                515        ;COPs - Coefficient OPerations for Slave (RT end Line B)
                516
0E42 93         517        DB      093h                  ; Coefficients for Z filter
0E43 70         518        DB      070h,029h,03Eh,0F1h,0B1h,0C6h,042h,02Ch
0E44 29
```

```
0E45 3E
0E46 F1
0E47 B1
0E48 C6
0E49 42
0E4A 2C

0E4B AB      DB     0ABh                                ; Coefficients for R filter
0E4C F0      DB     0F0h,0B8h,09Fh,0F2h,02Ah,026h,004h,03Eh
0E4D B8
0E4E 9F
0E4F F2
0E50 2A
0E51 26
0E52 04
0E53 3E

0E54 A3      DB     0A3h                                ; Coefficients for X filter
0E55 F0      DB     0F0h,0C8h,09Fh,0F1h,029h,026h,002h,026h
0E56 C8
0E57 9F
0E58 F1
0E59 29
0E5A 26
0E5B 02
0E5C 26

0E5D B0      DB     0B0h                                ; Gain for GX
0E5E 10      DB     010h,044h,080h,080h
0E5F 44
0E60 80
0E61 80

0E62 BA      DB     0BAh                                ; Gain for GR
0E63 A1      DB     0A1h,0DCh
0E64 DC

0E65 8B      DB     08Bh                                ; Coefficients for B2 filter
0E66 00      DB     000h,0B3h,0A3h,0D4h,022h,0CBh,0B4h,0BAh
0E67 B3
0E68 A3
0E69 D4
0E6A 22
0E6B CB
0E6C B4
0E6D BA

0E6E 83      DB     083h                                ; Coefficients for B1 fliter
0E6F 31      DB     031h,042h,0B2h,09Bh,0FBh,049h,0A2h,0BCh
0E70 42
0E71 B2
0E72 9B
0E73 FB
0E74 49
0E75 A2
0E76 BC

0E77 98      DB     098h                                ; Coefficients for B filter delay
0E78 19      DB     019h,019h,011h,019h
0E79 19
```

```
0E7A 11
0E7B 19
                       ;SOPs - Status OPerations (RT)
                                                ; Setup for SICOFI for Line A
0E7C 05                DB      00000101b        ; SOP set up
0E7D 00                DB      00000000b        ; CR3 set up, No swap, Hipass on, Analog on,
                                                ; Signaling on, No analog or digital loopback
0E7E 00                DB      00000000b        ; CR2 set up, No amplification, No tones
0E7F FF                DB      11111111b        ; CR1 set up, All filters on, SB output, u-La
                                                ; Setup for SICOFI for Line B
0E80 85                DB      10000101b        ; SOP set up
0E81 00                DB      00000000b        ; CR3 set up, No swap, Hipass on, Analog on,
                                                ; Signaling on, No analog or digital loopback
0E82 00                DB      00000000b        ; CR2 set up, No amplification, No tones
0E83 FF                DB      11111111b        ; CR1 set up, All filters on, SB output, u-La

0084            SICOFI_OPS_LEN  EQU $-SICOFI_OPS

                       ; The MOX1 puts Coefficient and Status OPs for the SICOFI itself on t
                       ; 3rd (Feature Control) byte in the Serial Interface Port (SIP) strea
                                ;       *--------- 0=Line A, 1=Line B
                                ;       ||*------- 0=Power Down (Standby), 1=Power up line
                                ;       ||||||||
0004            SICOFIA_DN      EQU     00000100b       ; Power down SICOFI A
0024            SICOFIA_UP      EQU     00100100b       ; Power up SICOFI A
0084            SICOFIB_DN      EQU     10000100b       ; Power down SICOFI B
00A4            SICOFIB_UP      EQU     10100100b       ; Power up SICOFI B

                ;------------------------------------------------------------------
                ; Definition of system messages

                ;------------------------------------------------------------------
                ; Definition of memery system

----                            DSEG    AT 000h ; Data Memory Absolute segment

                ; DATA MEMORY (SCRATCHPAD RAM) USE

                ;  Register Bank 0 overlays Memory Locations 00h-07h (0-7)
                ;  Register Bank 0 used for non-interrupt space

REG             PTR00           EQU     R0      ; Not used
REG             PTR01           EQU     R1      ; Used in init
                ;               EQU     R2      ; Not used
REG             RLOOP03_CNT     EQU     R3      ; Loop conter in init
                ;               EQU     R4      ; Not used
                ;               EQU     R5      ; Not used
                ;               EQU     R6      ; Not used
REG             RLOOP07_CNT     EQU     R7      ; General Loop Counter

0000            PT00:           DS      1       ; Not used
0001            PT01:           DS      1       ; Not used
0002                            DS      1       ; Not used
```

```
0003                 DS      1       ; Loop conter in init
0004                 DS      1       ; Not used
0005                 DS      1       ; Not used
0006                 DS      1       ; Not used
0007                 DS      1       ; General Loop Counter (R7)

       ;  Register Bank 1 overlays Memory Locations 08h-0Fh (8-15)
       ;  Register Bank 1 used for Serial Receive interrupt space

0008            ORG     08h
 REG   RRX_HEAD        EQU     R0      ; Used for writing during Receive routines
 REG   RRX_TAIL        EQU     R1      ; Used for reading during Receive routines
 REG   RRX_COUNT       EQU     R2      ; Receive Counter
 REG   RRX_OVERFLOW    EQU     R3      ; Received Characters Lost
 REG   RRX_BYTE        EQU     R4      ; Value read from RX buffer
       ;               EQU     R5      ; Not used
       ;               EQU     R6      ; Not used
       ;               EQU     R7      ; Not used

0008   RX_HEAD:        DS      1       ; Circular buffer pointer for receive (R0)
0009   RX_TAIL:        DS      1       ; Circular buffer pointer for receive (R1)
000A   RX_COUNT:       DS      1       ; Receive Counter
000B   RX_OVERFLOW:    DS      1       ; Received Characters Lost
000C   RX_BYTE:        DS      1       ; Value read from RX buffer
000D                   DS      1       ; Not used
000E                   DS      1       ; Not used
000F                   DS      1       ; Not used

       ;  Register Bank 2 overlays Memory Locations 10H-17H (16-23)
       ;  Register Bank 2 used for Serial Transmit interrupt space

0010            ORG     10h
 REG   RTX_HEAD        EQU     R0      ; Used for writing during Receive routines
 REG   RTX_TAIL        EQU     R1      ; Used for reading during Transmit routines
 REG   RTX_COUNT       EQU     R2      ; Transmitter Count
 REG   RTX_OVERFLOW    EQU     R3      ; Transmitted Characters Lost
       ;               EQU     R4      ; Not used
       ;               EQU     R5      ; Not used
       ;               EQU     R6      ; Not used
       ;               EQU     R7      ; Not used

0010   TX_HEAD:        DS      1       ; Circular buffer pointer for transmit (R0)
0011   TX_TAIL:        DS      1       ; Circular buffer pointer for transmit (R1)
0012   TX_COUNT:       DS      1       ; Transmitter Count
0013                   DS      1       ; Transmitted Characters Lost
0014                   DS      1       ; Not used
0015                   DS      1       ; Not used
0016                   DS      1       ; Not used
0017                   DS      1       ; Not used

       ;  Register Bank 3 overlays Memory Locations 18H-1FH (24-31)
       ;  Register Bank 3 used for ISR_CK and ISR_ICC interrupt space

0018            ORG     18h
 REG   PTR30           EQU     R0      ; Used for IRC pointer
 REG   PTR31           EQU     R1      ; Used for all MOVX operations & all MACROS
 REG   REC_CNT         EQU     R2      ; Used in Reciver to count
 REG   RST_CONT        EQU     R3      ; Used in syn to count data
 REG   ALARM_LAST      EQU     R4      ; Used in alarm service to hold last
```

```
REG                FLASH_CNT         EQU     R5             ; Used in status for lamp flash
REG                STATUS_TIME       EQU     R6             ; Used to time door open
                   ;                 EQU     R7             ;

0018               PT30:             DS      1              ; R0, Used for IRC pointer
0019               PT31:             DS      1              ; R1, Used for all MOVX operations & all MACR
001A                                 DS      1              ; R2, Used in reciver to count bytes
001B               ST_CONT:          DS      1              ; R3, Used in syn to count data
001C                                 DS      1              ; R4, Used in alarm service to hold last
001D                                 DS      1              ; R5
001E                                 DS      1              ; R6
001F                                 DS      1              ; R7

                   ;------------------------------------------------------------------------
                   ; Bit addressable memory overlays data memory locations 20H-2FH (32-47)

                   ;------------------------------------------------------------------------
                   ; This BIT area is for BIT'S that do not need to fit in Bytes

----                                 BSEG

0000               LINK_UP:          DBIT    1              ; Shows the Link up  1=up
0001               ST_INPROG:        DBIT    1              ; Shows Syn tranisfor in progress
0002               ST_REC:           DBIT    1              ; Shows Syn tranisfor in recive mode
0003               ST_WT_RD:         DBIT    1              ; Shows Syn in Wright then Read
0004               ST_DPTR:          DBIT    1              ; Shows Syn Using DPRT
0005               INIT_SICOFI:      DBIT    1              ; Shows that the sicofi needs init at main
0006               LINE_A_RINGING:   DBIT    1              ; Show line A is using ring
0007               LINE_B_RINGING:   DBIT    1              ; Show line B is using ring
0008               FIRST_RING:       DBIT    1              ; Show first ring clyle


  0002             BIT_SIZE          EQU     ($/8)+1


                   ;------------------------------------------------------------------------
                   ; This part of the BIT MAP is used for Byte orentated BIT,s

----                                 DSEG
0020                                 DS      BIT_SIZE       ; Leave room for free bits

0022               ISTA_COPY:        DS      1              ; Copy of ICC ISTA destructive read register
                                     ; Usage of bits in ISTA_COPY
  0017             RME               BIT     ISTA_COPY.7 ; Reciver message end
  0016             RPF               BIT     ISTA_COPY.6 ; Reciver pool full
  0015             RSC               BIT     ISTA_COPY.5 ; Reciver status change
  0014             XPR               BIT     ISTA_COPY.4 ; Transmiter pool ready
  0013             TIM               BIT     ISTA_COPY.3 ; Timer Interrupt
  0012             CIC               BIT     ISTA_COPY.2 ; C/I Channel change
  0011             SIN               BIT     ISTA_COPY.1 ; Synchrous Transion Interrupt
  0010             EXI               BIT     ISTA_COPY.0 ; Extended Interrupt


0023               EXIR_COPY:        DS      1              ; Copy of ICC EXI reg
                                     ; Usage of bits in EXIR_COPY
  001F             XMR               BIT     EXIR_COPY.7 ; Transmiter repeat
  001E             XDU               BIT     EXIR_COPY.6 ; Transmiter data underrun
  001D             PCE               BIT     EXIR_COPY.5 ; Protocal error
  001C             RFO               BIT     EXIR_COPY.4 ; Reciver fram overflow
```

```
001B      SOV            BIT     EXIR_COPY.3 ; Synchrorous overflow
001A      MOS            BIT     EXIR_COPY.2 ; Moniter status change
0019      SAW            BIT     EXIR_COPY.1 ; Subcriber awake
0018      WOV            BIT     EXIR_COPY.0 ; Watchdog timer overflow


0024      SSCR_COPY:             DS      1
          ; The SSCR gets information on SICOFI peripherals (e.g. the SLIC)
          ; from the 4th (Signaling) byte in the Serial Interface Port (SIP) stream

                    ;    *---------     Line B, Not Used, always set to 0
                    ;    |*--------- SI3 Line B, Not Used, always set to 0
                    ;    ||*-------- SI2 Line B, Not Used, always set to 0
                    ;    |||*------- SI1 Line B, Hook Status: 0=Off Hook, 1=On Hook
                    ;    ||||*-----     Line A, Not Used, always set to 0
                    ;    |||||*---- SI3 Line A, Not Used, always set to 0
                    ;    ||||||*--- SI2 Line A, Not Used, always set to 0
                    ;    |||||||*-- SI1 Line A, Hook Status: 0=Off Hook, 1=On Hook
                    ;    ||||||||
                         XXXXXXXXb
0020      LINE_A_HOOK    BIT     SSCR_COPY.0      ; Line A Hook Status: 0=Off Hook, 1=
          ook
0024      LINE_B_HOOK    BIT     SSCR_COPY.4      ; Line B Hook Status: 0=Off Hook, 1=
          ook


0025      SSCX_DATA:     DS      1      ; Copy of ICC SSCX write-only register
          ; The SSCX puts commands for SICOFI peripherals (e.g. the SLIC)
          ; on the 4th (Signaling) byte in the Serial Interface Port (SIP) stream

                    ;    *---------- SD  Line B, Connect to test termination = 1
                    ;    |*--------- SO3 Line B, SLIC E1 input, always set to 1
                    ;    ||**------- SO2,SO1=C1,C2 Line B SLIC inputs decoded as:
                    ;    ||||        00=Off, 01=Ringing, 10=Talking, 11=Standby
                    ;    ||||*------ SD  Line A, Connect to test termination = 1
                    ;    |||||*----- SO3 Line A, SLIC E1 input, always set to 1
                    ;    ||||||**--- SO2,SO1=C1,C2 Line A SLIC inputs decoded as:
                    ;    ||||||||    00=Off, 01=Ringing, 10=Talking, 11=Standby
                    ;    ||||||||
0044      SSCX_INIT      EQU     01000100b        ; Initial value

                         ; Usage of bits in SSCX_DATA
002F      LINE_TEST_B    BIT     SSCX_DATA.7      ; test line B = 1
002E      SLIC_E1_B      BIT     SSCX_DATA.6      ; Control Line B SLIC
002D      SLIC_C1_B      BIT     SSCX_DATA.5      ; Control Line B SLIC
002C      SLIC_C2_B      BIT     SSCX_DATA.4      ; Control Line B SLIC
002B      LINE_TEST_A    BIT     SSCX_DATA.3      ; Test Line A = 1
002A      SLIC_E1_A      BIT     SSCX_DATA.2      ; Control Line A SLIC
0029      SLIC_C1_A      BIT     SSCX_DATA.1      ; Control Line A SLIC
0028      SLIC_C2_A      BIT     SSCX_DATA.0      ; Control Line A SLIC


0026      STAT_IN:       DS      1      ; Status from LC, full byte from link
                         ; Usage of bits in STAT_IN
0030      LINE_A_RING_REQ BIT    STAT_IN.0 ; Phone Line A    : 0=Ring,   1=Not in Use
0031      LINE_B_RING_REQ BIT    STAT_IN.1 ; Phone Line B    : 0=Ring,   1=Not in Use

00FF      STAT_IN_INIT   EQU             011111111B
```

```
0027   TEST_IN:          DS    1          ; Test request from LC, full byte from link
                         ; Usage of bits in TEST_IN
  0038 TEST_REQ_A        BIT   TEST_IN.0          ; Test req from LC        : 1=Test
  0039 TEST_REQ_B        BIT   TEST_IN.1          ; Test req from LC        : 1=Test
  003A ABS_TERM_REQ      BIT   TEST_IN.2          ; Request to set 600 ohm term
  003B REF_TERM_REQ      BIT   TEST_IN.3          ; Request to set reflect term
  003C ON_HOOK_REQ       BIT   TEST_IN.4          ; Request to go on hook in test

0028   MESG_IN:          DS    1          ; Mesage content of next two bytes
                         ; Usage of bits in MESG_IN
  0040 MESG_IN_B1        BIT   MESG_IN.0          ; Message data in added byte 1
  0041 COEF_IN_B1        BIT   MESG_IN.1          ; Coefenetent data in added byte 1
  0042 MODL_IN_B1        BIT   MESG_IN.2          ; Model data in added byte 1
  0043 MESG_IN_B2        BIT   MESG_IN.3          ; Message data in added byte 2
  0044 COEF_IN_B2        BIT   MESG_IN.4          ; Coefenetent data in added byte 2
  0045 MODL_IN_B2        BIT   MESG_IN.5          ; Model data in added byte 2

0029   STAT_OUT:         DS    1          ; Status to LC, full byte to link
                         ; Usage of bits in STAT_OUT
  0048 LINE_A_ON         BIT   STAT_OUT.0 ; Phone Line A     : 1=on hook,       0=off
  0049 LINE_B_ON         BIT   STAT_OUT.1 ; Phone Line B     : 1=on hook,       0=off
  004A AUX_A_IDLE        BIT   STAT_OUT.2 ; Auxarily A       : 1=idel,          0=act
  004B AUX_B_IDLE        BIT   STAT_OUT.3 ; Auxarily B       : 1=idel,          0=act
  004C TAMPER_IDLE       BIT   STAT_OUT.4 ; Door closed      : 1=closed,        0=ope

  00FF STAT_OUT_INIT     EQU   011111111B         ; To set at start

002A   TEST_OUT:         DS    1          ; Test state to LC, full byte to link
                         ; Usage of bits in TEST_OUT
  0050 TEST_SET_A        BIT   TEST_OUT.0         ; Test state to LC        : 1=Test
  0051 TEST_SET_B        BIT   TEST_OUT.1         ; Test state to LC        : 1=Test
  0052 ABS_TERM_SET      BIT   TEST_OUT.2         ; 600 ohm term to LC      : 1=set
  0053 REF_TERM_SET      BIT   TEST_OUT.3         ; Reflect term to LC      : 1=set
  0054 RING_DET_OUT      BIT   TEST_OUT.4         ; RING DET ON to LC       : 1=ON

  0000 TEST_OUT_INIT     EQU   000000000b         ; To set at start

002B   MESG_OUT:         DS    1          ; Mesage content of next two bytes to link
                         ; Usage of bits in MESG_OUT
  0058 MESG_OUT_B1       BIT   MESG_OUT.0         ; Message data out added byte 1
  0059 COEF_OUT_B1       BIT   MESG_OUT.1         ; Coefenetent data out added byte 1
  005A MODL_OUT_B1       BIT   MESG_OUT.2         ; Model data out added byte 1
  005B MESG_OUT_B2       BIT   MESG_OUT.3         ; Message data out added byte 2
  005C COEF_OUT_B2       BIT   MESG_OUT.4         ; Coefenetent data out added byte 2
  005D MODL_OUT_B2       BIT   MESG_OUT.5         ; Model data out added byte 2

  0000 MESG_OUT_INIT     EQU   000000000b
                         ;------------------------------------------------------------------
                         ; Start of general data memery

002C   PASS_LOW:         DS    1          ; Conter for ISR_CK passes
002D   PASS_HIGH:        DS    1
002E   RX_MISED:         DS    1          ; Conter for missed reciver message on link
002F   TX_MISED:         DS    1          ; conter for missed transmite message on link
0030   ERROR_CNT:        DS    1          ; All error count

0031   LINE_A_CKLOW:     DS    1          ; Clock for Line A control
0032   LINE_A_CKHIGH:    DS    1
```

```
0033                LINE_A_STATE:    DS      1        ; State control for Line A

0034                LINE_B_CKLOW:    DS      1        ; Clock for Line B control
0035                LINE_B_CKHIGH:   DS      1
0036                LINE_B_STATE:    DS      1        ; State control for Line B

0037                TEST_IN_COPY:    DS      1        ; Used as a test in Compator
0038                ST_PTR:          DS      1        ; Used in SYN to hold data Pointer
0039                DATA_1:          DS      1        ; temp* DATA store
003A                DATA_2:          DS      1
003B                RX_ERROR:        DS      1        ; temp*
003C                MORO_copy:       DS      1        ; ?TEMP*
                    ;-----------------------------------------------------------------------
                    ; Stack and Buffer Space

                    ;  Remainder of data memory, 30h-7Fh (48-127), for general use and stack

003D                STACK:           DS      63-$     ; Stack grows upward from here

0040                                 ORG     40h
0040                TX_BUFF:         DS      20h      ; 32 Byte Transmit Buffer
0060                RX_BUFF:         DS      20h      ; 32 Byte Receive Buffer


               +1   $eject
                    ;-----------------------------------------------------------------------
                    ; RESET and INTERRUPT vector area

----                         CSEG     AT    00H
0000                         ORG      RESET           ; Power Up - Reset vector
0000 020075                  JMP      INIT            ; jumps to initialization routine

0003                         ORG      EXTI0           ; IE0 - External Interrupt 0 vector
0003 020144                  JMP      ISR_ICC         ; For use by ICC  PEB 2070

000B                         ORG      TIMER0          ; TF0 - Timer/Counter 0 overflow vector
000B 02022A                  JMP      ISR_CLK

0013                         ORG      EXTI1           ; IE1 - External Interrupt 1 vector
0013 020026                  JMP      TRAP

001B                         ORG      TIMER1          ; TF1 - Timer/Counter 1 overflow vector
001B 020026                  JMP      TRAP

0023                         ORG      SINT            ; TI/RI - Serial Port Transmit/Receive vector
0023 020550                  JMP      ISR_SERIAL

                    TRAP:    ;Trap unwanted interrupt
0026 0530                    INC      ERROR_CNT       ; Show error
0028 32                      RETI

                    ;-----------------------------------------------------------------------
                    ; Main rutine for the system we come hear after INIT

                    ; This is the main loop where back ground work is done

                    MAIN:
0029 300517                  JNB      INIT_SICOFI,TEST_PROC
002C D204                    SETB     ST_DPTR
```

```
002E D201             SETB    ST_INPROG
0030 C202             CLR     ST_REC
0032 C203             CLR     ST_WT_RD
0034 900E00           MOV     DPTR,#SICOFI_OPS         ; Point to sicofi data
0037 751B84           MOV     ST_CONT,#SICOFI_OPS_LEN
003A C2B5             CLR     BOARD_TEST               ;TEMP*
003C 7937        +2   MOV     R1,#STCR
003E 7478        +2   MOV     A,#ST_ST1
0040 F3          +1   MOVX    @R1,A            ; Start SYN interrupt
0041 C205             CLR     INIT_SICOFI

                 ;-----------------------------------------------------------------
                 ; Test control section of main

                 TEST_PROC:

0043 A2B3             MOV     C,RING_DET
0045 B3               CPL     C
0046 9254             MOV     RING_DET_OUT,C
0048 E527             MOV     A,TEST_IN
004A 6537             XRL     A,TEST_IN_COPY
004C 6022             JZ      TEST_PROC_END            ; There is no test change
004E A238             MOV     C,TEST_REQ_A             ; Set the line A test
0050 922B             MOV     LINE_TEST_A,C
0052 9250             MOV     TEST_SET_A,C
0054 A239             MOV     C,TEST_REQ_B             ; Set the line B test
0056 922F             MOV     LINE_TEST_B,C
0058 9251             MOV     TEST_SET_B,C
005A A23A             MOV     C,ABS_TERM_REQ           ; Set the absent termanation
005C 9294             MOV     ABS_TERM,C
005E 9252             MOV     ABS_TERM_SET,C
0060 A23B             MOV     C,REF_TERM_REQ           ; Set the reflective term
0062 7254             ORL     C,RING_DET_OUT
0064 9295             MOV     REF_TERM,C
0066 9253             MOV     REF_TERM_SET,C
0068 E527             MOV     A,TEST_IN
006A F537             MOV     TEST_IN_COPY,A
006C 7002             JNZ     TEST_PROC_END
006E F52A             MOV     TEST_OUT,A               ; Assure that all test is clear

                 TEST_PROC_END:
                 ;-----------------------------------------------------------------
                 ; The rest state of main

                 M10:
0070 438701           ORL     PCON,#PCOND      ; Go into idle mode and wait for an interrupt
0073 80B4             JMP     MAIN             ; Main program is just an idle loop



                 ;-----------------------------------------------------------------
                 ; Initialization sequence - transferred here by power up reset

                 ; Set base processor functions, leave clocks and interupt till latter

                 INIT:
0075 7580FF           MOV     P0,#P0_INIT              ; Set all Port pins to init state
0078 75908B           MOV     P1,#P1_INIT              ; using Port init value
007B 75A0FF           MOV     P2,#P2_INIT
```

```
007E 75B0FF            MOV     P3,#P3_INIT
0081 75813C            MOV     SP,#STACK-1
0084 E4                CLR     A                  ; In event of emulator or software restart
0085 F5A8              MOV     IE,A               ; ensure that processor special function
0087 F5B8              MOV     IP,A               ; registers are in their power-up states
0089 F5D0              MOV     PSW,A
008B F588              MOV     TCON,A
008D F589              MOV     TMOD,A
008F F598              MOV     SCON,A

0091 787F              MOV     R0,#127            ; Clear all 128 bytes of Data Memory
               INIT20:
0093 F6                MOV     @R0,A              ; Clear memory loop works only because
0094 D8FD              DJNZ    R0,INIT20          ; R0 is also data memory at address 0

               ; Look at buttons for start up spechels

               INIT30:

               ; Set up the perifal chips

               INIT33:
0096 D292              SETB    RESET_IECQ         ; Release the reset of the 2091 IECQ chip
0098 C291              CLR     RESET_ICC          ; Release the reset of the 2070 ICC chip
009A C293              CLR     RESET_SICOFI       ; Release the reset of the 2260 SICOFI
009C 7F05              MOV     RLOOP07_CNT,#5     ; Wait 5ms for chips to settle
009E 7B32              MOV     RLOOP03_CNT,#50    ; Set LSB

00A0 C290              CLR     CS_ICC             ; Select the 2070 ICC chip

               INIT35:
00A2 DBFE              DJNZ    RLOOP03_CNT,INIT35         ; 512cyc max
00A4 DFFC              DJNZ    RLOOP07_CNT,INIT35         ; Count MSB

               ; Init the PEB 2070 ICC chip by loading registers with config values

               INIT40:
00A6 7920       +2     MOV     R1,#MASK
00A8 7479       +2     MOV     A,#MASKD
00AA F3         +1     MOVX    @R1,A    ;set interrupt mask
00AB 7928       +2     MOV     R1,#TEI1
00AD 74FF       +2     MOV     A,#TEI1D
00AF F3         +1     MOVX    @R1,A    ;set tei to auto mode
00B0 7929       +2     MOV     R1,#TEI2
00B2 74FF       +2     MOV     A,#TEI2D
00B4 F3         +1     MOVX    @R1,A
00B5 7930       +2     MOV     R1,#SPCR
00B7 7480       +2     MOV     A,#SPCRD1
00B9 F3         +1     MOVX    @R1,A    ;set serial control
00BA 7930       +2     MOV     R1,#SPCR
00BC 7445       +2     MOV     A,#SPCRD2
00BE F3         +1     MOVX    @R1,A
00BF 7931       +2     MOV     R1,#CIX0
00C1 7447       +2     MOV     A,#IECQ_RES
00C3 F3         +1     MOVX    @R1,A    ;set 2091 command reg
00C4 7937       +2     MOV     R1,#STCR
00C6 7470       +2     MOV     A,#ST_NOR
00C8 F3         +1     MOVX    @R1,A    ;set synchronous transfer
00C9 7938       +2     MOV     R1,#ADF1
```

```
00CB 7400      +2         MOV     A,#ADF1D
00CD F3        +1         MOVX    @R1,A    ;set additional features
00CE 7939      +2         MOV     R1,#ADF2
00D0 7400      +2         MOV     A,#ADF2D
00D2 F3        +1         MOVX    @R1,A
00D3 7922      +2         MOV     R1,#MODE
00D5 74CA      +2         MOV     A,#MODED
00D7 F3        +1         MOVX    @R1,A    ; then set transmission modes,
00D8 7921      +2         MOV     R1,#CMDR
00DA 7441      +2         MOV     A,#CMDRCL
00DC F3        +1         MOVX    @R1,A    ; reset link transmitter and receiver

                  ; Init the PEB 2260 SICOFI by writing string of COP & SOP bytes to it

                  INIT50:
00DD D205                 SETB    INIT_SICOFI          ; To allow init after INTERRUPT are u


                          ; Initialize the PBL 3764 SLICs to Off

                  INIT60:
00DF 7933      +2         MOV     R1,#SSCX
00E1 7444      +2         MOV     A,#SSCX_INIT
00E3 F3        +1         MOVX    @R1,A


                  INIT70:
00E4 20B50A               JB      BOARD_TEST,INIT80
00E7 7931      +2         MOV     R1,#CTX0
00E9 7457      +2         MOV     A,#IECQ_SSP
00EB F3        +1         MOVX    @R1,A    ; Send Single Pulses

                  INIT79:
00EC 438702               ORL     PCON,#P_OFF      ; Power down 87C51 processor
00EF 80FB                 JMP     INIT79

                  ; Initialize program registers and variables

                  INIT80:
00F1 752544               MOV     SSCX_DATA,#SSCX_INIT
00F4 751040               MOV     TX_HEAD,#TX_BUFF
00F7 751140               MOV     TX_TAIL,#TX_BUFF
00FA 75087F               MOV     RX_HEAD,#RX_BUFF+31
00FD 75097F               MOV     RX_TAIL,#RX_BUFF+31
0100 7526FF               MOV     STAT_IN,#STAT_IN_INIT
0103 7529FF               MOV     STAT_OUT,#STAT_OUT_INIT
0106 752A00               MOV     TEST_OUT,#TEST_OUT_INIT
0109 752B00               MOV     MESG_OUT,#MESG_OUT_INIT

                  ; Initialize hardware timers and interrupts

                  INIT90:
010C 7920      +2         MOV     R1,#ISTA
010E E3        +1         MOVX    A,@R1          ; Clear ICC Interrupt STAtus register
010F 7927      +2         MOV     R1,#RSTA
0111 E3        +1         MOVX    A,@R1          ; Clear ICC Receiver STAtus register
0112 7924      +2         MOV     R1,#EXIR
0114 E3        +1         MOVX    A,@R1          ; Clear ICC EXtended Interrupt Register
0115 7931      +2         MOV     R1,#CIR0
0117 E3        +1         MOVX    A,@R1          ; Clear C/I change indication
```

```
0118 758926          MOV     TMOD,#00100110b ; Set Timer 0 to 8 bit auto-reload count mode
                                             ; Set Timer 1 to 8 bit auto-reload timer mode
011B 758DF8          MOV     TH1,#T1LOAD     ; Load counter for RT baud rate
011E D28E            SETB    TR1             ; Start Timer 1
0120 759870          MOV     SCON,#SCOND     ; Set Serial Port Mode
0123 D2AC            SETB    ES              ; Enable Serial Port Interrupts
0125 758CCE          MOV     TH0,#T0LOAD     ; Load counter for 160hz interrupt period
0128 D2A9            SETB    ET0             ; Enable Timer 0 interrupts
012A D28C            SETB    TR0             ; Start Timer 0
012C D2A8            SETB    EX0             ; Enable the ICC interrupt
012E D2AF            SETB    EA              ; Master enable all enabled interrupts

                ; We need to jump start the IECQ from reset

                INIT95:
0130 7931       +2   MOV     R1,#CIX0
0132 7447       +2   MOV     A,#IECQ_RES
0134 F3         +1   MOVX    @R1,A   ;set 2091 command reg
0135 7931       +2   MOV     R1,#CIR0
0137 E3         +1   MOVX    A,@R1                   ; Get the control code
0138 44C3            ORL     A,#CIR0_MASK            ; Mask off C/I data
013A B4C3F3          CJNE    A,#IECQ_DR,INIT95
013D 7931       +2   MOV     R1,#CIX0
013F 747C       +2   MOV     A,#IECQ_DIC
0141 F3         +1   MOVX    @R1,A
0142 0129            JMP     MAIN                    ; Goto Main

                ;------------------------------------------------------------------
                ; This is the routine for the ICC service interrupt

                ; FUNCTION:
                ; 1. The first part is to alow Syncration to the 8 KHz FSC
                ; 2. It is to control the IECQ link function
                ; 3. To recive messages from the LC end of the link.

                ISR_ICC:
0144 C0E0            PUSH    ACC
0146 C0D0            PUSH    PSW
                +5
0148 D2D3       +5   SETB    RS0     ; Select Bank 3 Registers
014A D2D4       +5   SETB    RS1
                +5
014C 7920       +2   MOV     R1,#ISTA
014E E3         +1   MOVX    A,@R1
014F F522       +2   MOV     ISTA_COPY,A             ;get the interupt status reg
                ICC10:
                     ; Rutine to handel SYNCHROUS Interrupt
0151 301137          JNB     SIN,ICC40               ;There is no Synchous Interrupt
0154 300134          JNB     ST_INPROG,ICC40         ; Go make sher we are down
                     ; Transmit data to SICOFI though ICC
0157 7937       +2   MOV     R1,#STCR
0159 747A       +2   MOV     A,#ST_SC1
015B F3         +1   MOVX    @R1,A           ;Clear intr recet
015C 7834            MOV     PTR30,#MOX1
                ICC20:
015E E4              CLR     A                       ;Data from ROM
015F 93              MOVC    A,@A+DPTR
0160 D2B5            SETB    Board_test              ;temp*
```

```
0162 F2                 MOVX   @PTR30,A              ;output data
0163 A3                 INC    DPTR
                ICC35:
0164 DB0E               DJNZ   RST_CONT,ICC38        ;we have no more to do
0166 7937     +2        MOV    R1,#STCR
0168 7470     +2        MOV    A,#ST_NOR
016A F3       +1        MOVX   @R1,A        ;set normal run
016B C204               CLR    ST_DPTR               ;clear all flags
016D C202               CLR    ST_REC
016F C201               CLR    ST_INPROG
0171 02018B             JMP    ICC40
                ICC38:
                        ; Lets look for more

0174 7920               MOV    PTR31,#ISTA
                ICC39:
0176 E3                 MOVX   A,@PTR31
0177 30E1FC             JNB    ACC.1,ICC39
017A C2B5               CLR    board test            ;temp*
017C 7937     +2        MOV    R1,#STCR
017E 747A     +2        MOV    A,#ST_SC1
0180 F3       +1        MOVX   @R1,A        ;Clear intr recet
0181 00                 NOP
0182 00                 NOP
0183 00                 NOP
0184 00                 NOP
0185 00                 NOP
0186 00                 NOP
0187 00                 NOP
0188 00                 NOP
0189 80D3               JMP    ICC20

                ICC40:
                        ; Rutine to handel IECQ control
018B 30123F             JNB    CIC,ICC60             ; No C/I change go to rec
018E 7931     +2        MOV    R1,#CIR0
0190 E3       +1        MOVX   A,@R1
0191 44C3               ORL    A,#CIR0_MASK          ; Mask off C/I data
                ICC41:
0193 B4F305             CJNE   A,#IECQ_AI,ICC42      ; Equ activation req
0196 D200               SETB   LINK_UP               ; Set link up
0198 0201CD             JMP    ICC59
                ICC42:
019B B4C305             CJNE   A,#IECQ_DR,ICC43      ; Equ deacarivation ind
019E 747C               MOV    A,#IECQ_DIC
01A0 0201C8             JMP    ICC57
                ICC43:
01A3 B4E305             CJNE   A,#IECQ_AR,ICC44      ; Equ activation req
01A6 7473               MOV    A,#IECQ_AIC
01A8 0201C8             JMP    ICC57
                ICC44:
01AB B4FF05             CJNE   A,#IECQ_DC,ICC45      ; Equ deactivation req
01AE 7443               MOV    A,#IECQ_TIM           ; Set deactivation
01B0 0201C8             JMP    ICC57
                ICC45:
01B3 B4D303             CJNE   A,#IECQ_EI1,ICC46
01B6 0201CB             JMP    ICC58
                ICC46:
01B9 B4DF03             CJNE   A,#IECQ_PU,ICC48
01BC 0201CB             JMP    ICC58
```

```
                    ICC48:
01BF B4CB03                 CJNE    A,#IECQ_FJ,ICC50
01C2 0201CB                 JMP     ICC58
                    ICC50:
01C5 0201CB                 JMP     ICC58

                    ICC57:          ; Output the command
01C8 7931      +2           MOV     R1,#CIX0
01CA F3        +1           MOVX    @R1,A                   ; set output

                    ICC58:          ; Show link down
01CB C200                   CLR     LINK_UP                 ; Set loop down
                    ICC59:


                    ICC60:
                            ; Rutine to handel message recet from the link
01CD 301733                 JNB     RME,ICC80               ; There is no message
01D0 7927      +2           MOV     R1,#RSTA
01D2 E3        +1           MOVX    A,@R1                   ; Get Receive Status Register
01D3 440F                   ORL     A,#00Fh                 ; mask to errors
01D5 64AF                   XRL     A,#0AFh                 ; mask to errors
01D7 6005                   JZ      ICC65
01D9 0530                   INC     ERROR_CNT
01DB 0201FE                 JMP     ICC79
                    ICC65:
01DE 7925      +2           MOV     R1,#RBCL
01E0 E3        +1           MOVX    A,@R1                   ; Get the length
01E1 C3                     CLR     C
01E2 9403                   SUBB    A,#3
01E4 4018                   JC      ICC79                   ; we do not have 3 bytes
01E6 FA                     MOV     REC_CNT,A               ; Save for data
01E7 E4                     CLR     A                       ; Show message recet
01E8 F52E                   MOV     RX_MISED,A
01EA 7900                   MOV     PTR31,#RFIFO            ; Point to RECIVER
01EC E3                     MOVX    A,@PTR31
01ED F526                   MOV     STAT_IN,A               ; Save Status
01EF E3                     MOVX    A,@PTR31
01F0 F527                   MOV     TEST_IN,A               ; Save test
01F2 E3                     MOVX    A,@PTR31
01F3 F528                   MOV     MESG_IN,A               ; Save Message
01F5 0201FE                 Jmp     ICC79                   ; No message
01F8 E3                     MOVX    A,@PTR31
01F9 F539                   MOV     DATA_1,A                ; Save DATA 1
01FB E3                     MOVX    A,@PTR31
01FC F53A                   MOV     DATA_2,A                ; Save DATA 2
                    ICC79:
01FE 7921      +2           MOV     R1,#CMDR
0200 7480      +2           MOV     A,#CMDRMC
0202 F3        +1           MOVX    @R1,A
                    ICC80:
0203 30101F                 JNB     EXI,ICC99
0206 7924      +2           MOV     R1,#EXIR
0208 E3        +1           MOVX    A,@R1
0209 F523      +2           MOV     EXIR_COPY,A             ;get the Extended interrupt reg
                                                                    ;there could be truble
020B 301C02                 JNB     RFO,ICC02
                            ;Handel reciver error hear
020E 0530                   INC     ERROR_CNT       ; Show error
                    ICC02:
```

```
0210 301B0A          JNB     SOV,ICC04
                     ;Handel Synchous transfer over flow hear
0213 0530            INC     ERROR_CNT        ; Show error
              ICC03:
0215 7937     +2     MOV     R1,#STCR
0217 7470     +2     MOV     A,#ST_NOR
0219 F3       +1     MOVX    @R1,A            ;we have an overflow
021A 020225          JMP     ICC99
              ICC04:
021D 301A05          JNB     MOS,ICC99
                     ; Handel the moniter chanel hear
0220 7932     +2     MOV     R1,#MOR0
0222 E3       +1     MOVX    A,@R1
0223 F53C     +2     MOV     MOR0_copy,A



              ICC99:
0225 D0D0            POP     PSW
0227 D0E0            POP     ACC
0229 32              RETI

              ;-------------------------------------------------------------------
              ; This is the routine for the time clock interrupt

              ISR_CLK:
022A C0E0            PUSH    ACC
022C C0D0            PUSH    PSW
              +5
022E D2D3     +5     SETB    RS0      ; Select Bank 3 Registers
0230 D2D4     +5     SETB    RS1
              +5
0232 C019            PUSH    PT31
                     ; Error control for the Link, TRANS, and RECV
              ERR10:
0234 D52C06          DJNZ    PASS_LOW,ERR40         ; Adjest the pass count
0237 D52D03          DJNZ    PASS_HIGH,ERR40
023A 300024          JNB     LINK_UP,ERR80          ; Link down, pass 0
              ERR40:
023D 300037          JNB     LINK_UP,ERR99          ; Link down not zero
0240 E52E            MOV     A,RX_MISED
              ;temp* CJNE    A,#RESET_TOL,ERR50     ; Do we have to many RX passes
              ;temp* JMP     ERR80
              ERR50:
0242 052E            INC     RX_MISED
0244 540A            ANL     A,#RX_TOL              ; Test the low bits
0246 B40A07          CJNE    A,#RX_TOL,ERR60
0249 053B            INC     RX_ERROR
024B 7921     +2     MOV     R1,#CMDR
024D 7440     +2     MOV     A,#CMDRRES
024F F3       +1     MOVX    @R1,A            ; Reset the reciver
              ERR60:
0250 E52F            MOV     A,TX_MISED
              ;temp* CJNE    A,#RESET_TOL,ERR70     ; Do we have to many TX passes
              ;temp* JMP     ERR80
              ERR70:
0252 052F            INC     TX_MISED
0254 540A            ANL     A,#TX_TOL
0256 B40A1E          CJNE    A,#TX_TOL,ERR99
```

```
0259 7921          +2          MOV     R1,#CMDR
025B 7401          +2          MOV     A,#CMDXRES
025D F3            +1          MOVX    @R1,A               ; Reset the transmiter
025E 020277                    JMP     ERR99
                         ERR80:
                               ; RESET the whol IECQ and TX,RX
0261 7931          +2          MOV     R1,#CIX0
0263 7447          +2          MOV     A,#IECQ_RES
0265 F3            +1          MOVX    @R1,A    ; Reset IECQ
0266 7921          +2          MOV     R1,#CMDR
0268 7401          +2          MOV     A,#CMDXRES
026A F3            +1          MOVX    @R1,A               ; Reset the transmiter
026B 7921          +2          MOV     R1,#CMDR
026D 7440          +2          MOV     A,#CMDRRES
026F F3            +1          MOVX    @R1,A               ; Reset the reciver
0270 E4                        CLR     A
0271 F526                      MOV     STAT_IN,A
0273 F527                      MOV     TEST_IN,A
0275 F528                      MOV     MESG_IN,A
                         ERR99:
                         ;-----------------------------------------------------------------
                         ; Get the status from the Sicofi for Line Service

                         CLK10:

                               ;Get the local status
0277 7933          +2          MOV     R1,#SSCR
0279 E3            +1          MOVX    A,@R1
027A F524          +2          MOV     SSCR_COPY,A         ; Get the local hook status
027C 02027F                    JMP     LINE_A_SERVICE
                         ;-----------------------------------------------------------------
                         ; This is the LINE service Section it has 7 State for each line.
                         ; We may use a jump table in the future but have to watch the
                         ; DPRT use.  The following are good for LINE_A_ and LINE_B_.

  0000                   L_INIT  EQU     0                   ; The system is Link down
  0001                   L_IDLE  EQU     1                   ; The idle STATE
  0002                   L_OFHA  EQU     2                   ; The OFF HOOK ACTIVE state
  0003                   L_ONHA  EQU     3                   ; The ON HOOK ACTIVE state
  0004                   L_HOLD  EQU     4                   ; The HOLD OFF HOOK, 50ms
  0005                   L_WAIT  EQU     5                   ; The ring WAIT for ring state
  0006                   L_RING  EQU     6                   ; The RING state for output
  0007                   L_STOP  EQU     7                   ; The ring STOP state
  0008                   L_DILE  EQU     8                   ; The ON HOOK DILE state

                         ;*****************************************************************
                         ; Line A service

                         LINE_A_SERVICE:

027F E533                      MOV     A,LINE_A_STATE           ; get the state
0281 200003                    JB      LINK_UP,LINE_A_IDLE      ; There is a link
0284 020395                    JMP     LINE_A_INIT

                         ;-----------------------------------------------------------------
                         ; Look for idle state

                         LINE_A_IDLE:
0287 B40?27                    CJNE    A,#L_IDLE,LINE_A_OFHA
```

```
                   LINE_A_IDLE_N00:            ; Run Idle service
028A 302003               JNB     LINE_A_HOOK,LINE_A_IDLE_N10       ; we are off hook
028D 203064               JB      LINE_A_RING_REQ,LINE_A_ENDO       ; we are normal go end
                   LINE_A_IDLE_N10:            ; Set power up the line
0290 7934       +2        MOV     R1,#MOX1
0292 7424       +2        MOV     A,#SICOFIA_UP
0294 F3         +1        MOVX    @R1,A    ; Power up SICOFI
                +3
0295 D22A       +3        SETB    SLIC_E1_A          ; Select LINE POWERED ACTIVE
0297 C229       +3        CLR     SLIC_C1_A
0299 D228       +3        SETB    SLIC_C2_A
                +3                         ; Activate SLIC
029B 203064               JB      LINE_A_RING_REQ,LINE_A_HOLD_ST  ; Go start HOLD state
029E 02031E               JMP     LINE_A_WAIT_ST                  ; Go start ring WAIT

                   LINE_A_IDLE_ST:             ; Start Idle state
02A1 753301               MOV     LINE_A_STATE,#L_IDLE
02A4 7934       +2        MOV     R1,#MOX1
02A6 7404       +2        MOV     A,#SICOFIA_DN
02A8 F3         +1        MOVX    @R1,A    ; Power down SICOFI
                +5
02A9 D22A       +5        SETB    SLIC_E1_A          ; Select LINE MONITERING HOOK STATUS
02AB D229       +5        SETB    SLIC_C1_A
02AD D228       +5        SETB    SLIC_C2_A
                +5                                    ; Idle the SLIC
02AF 80D9                 JMP     LINE_A_IDLE_N00

                   ;--------------------------------------------------------------------
                   ; Look for OFF HOOK ACTIVE

                   LINE_A_OFHA:
02B1 B4020D               CJNE    A,#L_OFHA,LINE_A_ONHA
                   LINE_A_OFHA_N00:                   ; Run OFF HOOK ACTIVE
02B4 30203D               JNB     LINE_A_HOOK,LINE_A_ENDO ;we are normal go end
02B7 0202EA               JMP     LINE_A_DILE_ST          ; Go start ON HOOK DILE

                   LINE_A_OFHA_ST:             ; Start OFF HOOK ACTIVE
02BA 753302               MOV     LINE_A_STATE,#L_OFHA
02BD C248                 CLR     LINE_A_ON                ; Show OFF HOOK to LC
02BF 80F3                 JMP     LINE_A_OFHA_N00

                   ;--------------------------------------------------------------------
                   ; Look for ON HOOK ACTIVE

                   LINE_A_ONHA:
02C1 B4031B               CJNE    A,#L_ONHA,LINE_A_DILE
                   LINE_A_ONHA_N00:                   ; Run ON HOOK ACTIVE
02C4 30203B               JNB     LINE_A_HOOK,LINE_A_HOLD_ST      ; go to OFF HOOK HOLD
02C7 303054               JNB     LINE_A_RING_REQ,LINE_A_WAIT_ST  ; Go to ring WAIT
02CA D53127               DJNZ    LINE_A_CKLOW,LINE_A_ENDO        ; Normal exit
02CD D53224               DJNZ    LINE_A_CKHIGH,LINE_A_ENDO
02D0 80CF                 JMP     LINE_A_IDLE_ST           ; Go to IDLE state

                   LINE_A_ONHA_ST:             ; Start ON HOOK ACTIVE
02D2 753303               MOV     LINE_A_STATE,#L_ONHA
02D5 D248                 SETB    LINE_A_ON                ; Show state to LC
                                           ; Set ON HOOK ACTIVE hold time
02D7 753140               MOV     LINE_A_CKLOW,#TIME_ACT_LO
02DA 753206               MOV     LINE_A_CKHIGH,#TIME_ACT_HI
```

```
02DD 80E5               JMP     LINE_A_ONHA_N00

                ;-----------------------------------------------------------------
                ; Look for ON HOOK DILE

                LINE_A_DILE:
02DF B40815             CJNE    A,#L_DILE,LINE_A_HOLD
                LINE_A_DILE_N00:                    ; Run ON HOOK DILE
02E2 3020D5             JNB     LINE_A_HOOK,LINE_A_OFHA_ST      ; go to OFF HOOK ACTIVE
02E5 D5310C             DJNZ    LINE_A_CKLOW,LINE_A_ENDU        ; Normal exit
02E8 80E8               JMP     LINE_A_ONHA_ST          ; Go to ON HOOK ACT state

                LINE_A_DILE_ST:             ; Start ON HOOK DILE
02EA 753308             MOV     LINE_A_STATE,#L_DILE
02ED D248               SETB    LINE_A_ON               ; Show state to LC
                                            ; Set ON HOOK DILE hold time
02EF 753120             MOV     LINE_A_CKLOW,#TIME_DILE_WT
02F2 80EE               JMP     LINE_A_DILE_N00

                LINE_A_ENDO:
02F4 0203B1             JMP     LINE_A_END              ; Go to IDLE state

                ;-----------------------------------------------------------------
                LINE_A_HOLD:
                        ; Look for ring HOLD state
02F7 B40410             CJNE    A,#L_HOLD,LINE_A_WATE
                LINE_A_HOLD_N00:                    ; Run OFF HOOK HOLD
02FA D531F7             DJNZ    LINE_A_CKLOW,LINE_A_ENDO        ; Normal exit
02FD 3020BA             JNB     LINE_A_HOOK,LINE_A_OFHA_ST      ; Go to OFF HOOK ACTIVE
0300 809F               JMP     LINE_A_IDLE_ST          ; Go to IDLE

                LINE_A_HOLD_ST:             ; Start OFF HOOK HOLD
0302 753304             MOV     LINE_A_STATE,#L_HOLD
                                            ; Set OFF HOOK hold time
0305 753108             MOV     LINE_A_CKLOW,#TIME_DELAY_LO
0308 80F0               JMP     LINE_A_HOLD_N00

                ;-----------------------------------------------------------------
                LINE_A_WATE:
                        ; Look for ring WAIT state
030A B40519             CJNE    A,#L_WAIT,LINE_A_STOP
                LINE_A_WAIT_N00:                    ; Run ring WAIT while other is using
030D 30076D             JNB     LINE_B_RINGING,LINE_A_RING_ST   ; Go to RING start
0310 2030BF             JB      LINE_A_RING_REQ,LINE_A_ONHA_ST  ; Go to ON HOOK ACTIVE
0313 3020EC             JNB     LINE_A_HOOK,LINE_A_HOLD_ST      ; Go to HOLD
0316 D531DB             DJNZ    LINE_A_CKLOW,LINE_A_ENDU        ; Normal exit
0319 D206               SETB    LINE_A_RINGING          ; This will force B to stop
031B 0203B1             JMP     LINE_A_END              ; Go to IDLE state

                LINE_A_WAIT_ST:             ; Start Ring WAIT
031E 753305             MOV     LINE_A_STATE,#L_WAIT
                                            ; Set ring WAIT time
0321 7531A0             MOV     LINE_A_CKLOW,#TIME_RING_WT
0324 80E7               JMP     LINE_A_WAIT_N00

                ;-----------------------------------------------------------------
                ; Look for ring STOP state

                LINE_A_STOP:
```

```
0326 B4071B                CJNE    A,#L_STOP,LINE_A_RING
                    LINE_A_STOP_N00:                    ; Run RING STOP
0329 D53115                DJNZ    LINE_A_CKLOW,LINE_A_STOP_END
032C C206                  CLR     LINE_A_RINGING          ; clear the ring
                  +3
032E D22A         +3       SETB    SLIC_E1_A       ; Select LINE POWERED ACTIVE
0330 C229         +3       CLR     SLIC_C1_A
0332 D228         +3       SETB    SLIC_C2_A
                  +3                       ; Set SLIC A active
0334 3020CB                JNB     LINE_A_HOOK,LINE_A_HOLD_ST
0337 8099                  JMP     LINE_A_ONHA_ST

                    LINE_A_STOP_ST:
0339 753307                MOV     LINE_A_STATE,#L_STOP
033C 753110                MOV     LINE_A_CKLOW,#TIME_RING_ST
033F 80E8                  JMP     LINE_A_STOP_N00

                    LINE_A_STOP_END:
0341 0203B1                JMP     LINE_A_END
                    ;-------------------------------------------------------------------
                    ; Look for RING state

                    LINE_A_RING:
0344 B4064E                CJNE    A,#L_RING,LINE_A_INIT
                    LINE_A_RING_N00:                    ; Run RING SYSTEM
0347 D5310B                DJNZ    LINE_A_CKLOW,LINE_A_RING_N10    ; Not time to togel
034A C208                  CLR     FIRST_RING
                    LINE_A_RING_N05:                    ; Togel the ring
034C 753104                MOV     LINE_A_CKLOW,#4 ; Reset the count
034F B296                  CPL     RINGOSC_A
0351 A296                  MOV     C,RINGOSC_A
0353 9297                  MOV     RINGOSC_B,C
                    LINE_A_RING_N10:
0355 30200E                JNB     LINE_A_HOOK,LINE_A_RING_N25     ; Go stop now
0358 200856                JB      FIRST_RING,LINE_A_END
035B 200703                JB      LINE_B_RINGING,LINE_A_RING_N20
035E 303050                JNB     LINE_A_RING_REQ,LINE_A_END
                    LINE_A_RING_N20:                    ; We need to stop the ring
0361 E531                  MOV     A,LINE_A_CKLOW
0363 B40311                CJNE    A,#3,LINE_A_RING_N30    ; We need to get this right
                    LINE_A_RING_N25:
0366 C296                  CLR     RINGOSC_A               ; Idel the ring system
0368 D297                  SETB    RINGOSC_B
036A 2020CC                JB      LINE_A_HOOK,LINE_A_STOP_ST
036D C206                  CLR     LINE_A_RINGING          ; clear the ring
                  +3
036F D22A         +3       SETB    SLIC_E1_A       ; Select LINE POWERED ACTIVE
0371 C229         +3       CLR     SLIC_C1_A
0373 D228         +3       SETB    SLIC_C2_A
                  +3                       ; Set SLIC active
0375 808B                  JMP     LINE_A_HOLD_ST
                    LINE_A_RING_N30:                    ; Do we need to tern the ring
0377 B404D2                CJNE    A,#4,LINE_A_RING_N05
037A 0203B1                JMP     LINE_A_END

                    LINE_A_RING_ST:                 ; Start the ring
037D 753306                MOV     LINE_A_STATE,#L_RING
0380 D206                  SETB    LINE_A_RINGING          ; Show that we are ring
0382 D208                  SETB    FIRST_RING              ; Mark first ring
```

```
                +4
0384 D22A       +4          SETB    SLIC_E1_A           ; Select LINE RINGING
0386 D229       +4          SETB    SLIC_C1_A
0388 C228       +4          CLR     SLIC_C2_A
                +4                                      ; Set SLIC to ring
                                            ; Set ring count time
038A 753104                 MOV     LINE_A_CKLOW,#4     ; Set count
038D B296                   CPL     RINGOSC_A
038F A296                   MOV     C,RINGOSC_A
0391 9297                   MOV     RINGOSC_B,C
0393 80B2                   JMP     LINE_A_RING_N00

                    ;-----------------------------------------------------------------
                    ; Look for INIT state

                    LINE_A_INIT:
0395 B40005                 CJNE    A,#L_INIT,LINE_A_INIT_ST

                    LINE_A_INIT_N00:                    ; Run INIT
0398 300016                 JNB     LINK_UP,LINE_A_END
039B 41A1                   JMP     LINE_A_IDLE_ST

                    LINE_A_INIT_ST:             ; the Link is down place all in power down
039D 753300                 MOV     LINE_A_STATE,#L_INIT
03A0 C296                   CLR     RINGOSC_A                   ; Idel the ring system
03A2 D297                   SETB    RINGOSC_B
03A4 7934       +2          MOV     R1,#MOXI
03A6 7404       +2          MOV     A,#SICOFIA_DN
03A8 F3         +1          MOVX    @R1,A       ; Power down SICOFI
                +2
03A9 D22A       +2          SETB    SLIC_E1_A           ; Select NO POWER TO LINE
03AB C229       +2          CLR     SLIC_C1_A
03AD C228       +2          CLR     SLIC_C2_A
                +2                          ; Power down the SLIC
03AF 80E7                   JMP     LINE_A_INIT_N00

                    ;-----------------------------------------------------------------

                    LINE_A_END:                 ; END of LINE_A_SERVICE


                    ;*****************************************************************
                    ; Line B service

                    LINE_B_SERVICE:

03B1 E536                   MOV     A,LINE_B_STATE          ; get the state
03B3 200003                 JB      LINK_UP,LINE_B_IDLE     ; There is a link
03B6 0204C7                 JMP     LINE_B_INIT

                    ;-----------------------------------------------------------------
                    ; Look for idle state

                    LINE_B_IDLE:
03B9 B40127                 CJNE    A,#L_IDLE,LINE_B_OFHA
                    LINE_B_IDLE_N00:            ; Run Idle service
03BC 302403                 JNB     LINE_B_HOOK,LINE_B_IDLE_N10     ; we are off hook
03BF 203164                 JB      LINE_B_RING_REQ,LINE_B_END0     ; we are normal go end
                    LINE_B_IDLE_N10:            ; Set power up the line
03C2 7934       +2          MOV     R1,#MOX1
```

```
03C4 74A4        +2        MOV     A,#SICOFIB_UP
03C6 F3          +1        MOVX    @R1,A    ; Power up SICOFI
                 +3
03C7 D22E        +3        SETB    SLIC_E1_B        ; Select LINE POWERED ACTIVE
03C9 C22D        +3        CLR     SLIC_C1_B
03CB D22C        +3        SETB    SLIC_C2_B
                 +3                        ; Activate SLIC
03CD 203164                JB      LINE_B_RING_REQ,LINE_B_HOLD_ST  ; Go start HOLD state
03D0 020450                JMP     LINE_B_WAIT_ST              ; Go start ring WAIT

                     LINE_B_IDLE_ST:           ; Start Idle state
)3D3 753601                MOV     LINE_B_STATE,#L_IDLE
)3D6 7934        +2        MOV     R1,#MOX1
)3D8 7484        +2        MOV     A,#SICOFIB_DN
)3DA F3          +1        MOVX    @R1,A    ; Power down SICOFI
                 +5
)3DB D22E        +5        SETB    SLIC_E1_B        ; Select LINE MONITERING HOOK STATUS
)3DD D22D        +5        SETB    SLIC_C1_B
)3DF D22C        +5        SETB    SLIC_C2_B
                 +5                                 ; Idle the SLIC
)3E1 80D9                  JMP     LINE_B_IDLE_N00

                     ;-----------------------------------------------------------------
                     ; Look for OFF HOOK ACTIVE

                     LINE_B_OFHA:
03E3 B4020D                CJNE    A,#L_OFHA,LINE_B_ONHA
                     LINE_B_OFHA_N00:                 ; Run OFF HOOK ACTIVE
03E6 30243D                JNB     LINE_B_HOOK,LINE_B_ENDO ;we are normal go end
03E9 02041C                JMP     LINE_B_DILE_ST          ; Go start ON HOOK DILE

                     LINE_B_OFHA_ST:            ; Start OFF HOOK ACTIVE
03EC 753602                MOV     LINE_B_STATE,#L_OFHA
03EF C249                  CLR     LINE_B_ON               ; Show OFF HOOK to LC
03F1 80F3                  JMP     LINE_B_OFHA_N00

                     ;-----------------------------------------------------------------
                     ; Look for ON HOOK ACTIVE

                     LINE_B_ONHA:
03F3 B4031B                CJNE    A,#L_ONHA,LINE_B_DILE
                     LINE_B_ONHA_N00:                 ; Run ON HOOK ACTIVE
03F6 30243B                JNB     LINE_B_HOOK,LINE_B_HOLD_ST     ; go to OFF HOOK HOLD
03F9 303154                JNB     LINE_B_RING_REQ,LINE_B_WAIT_ST ; Go to ring WAIT
03FC D53427                DJNZ    LINE_B_CKLOW,LINE_B_ENDO       ; Normal exit
03FF D53524                DJNZ    LINE_B_CKHIGH,LINE_B_ENDO
0402 80CF                  JMP     LINE_B_IDLE_ST          ; Go to IDLE state

                     LINE_B_ONHA_ST:            ; Start ON HOOK ACTIVE
0404 753603                MOV     LINE_B_STATE,#L_ONHA
0407 D249                  SETB    LINE_B_ON               ; Show state to LC
                                           ; Set ON HOOK ACTIVE hold time
0409 753440                MOV     LINE_B_CKLOW,#TIME_ACT_LO
040C 753506                MOV     LINE_B_CKHIGH,#TIME_ACT_HI
040F 80E5                  JMP     LINE_B_ONHA_N00

                     ;-----------------------------------------------------------------
                     ; Look for ON HOOK DILE
```

```
                   LINE_B_DILE:
0411 B40815                CJNE    A,#L_DILE,LINE_B_HOLD
                   LINE_B_DILE_N00:                    ; Run ON HOOK DILE
0414 3024D5                JNB     LINE_B_HOOK,LINE_B_OFHA_ST         ; go to OFF HOOK ACTIVE
0417 D5340C                DJNZ    LINE_B_CKLOW,LINE_B_ENDO           ; Normal exit
041A 80E8                  JMP     LINE_B_ONHA_ST            ; Go to ON HOOK ACT state

                   LINE_B_DILE_ST:             ; Start ON HOOK DILE
041C 753608                MOV     LINE_B_STATE,#L_DILE
041F D249                  SETB    LINE_B_ON                     ; Show state to LC
                                               ; Set ON HOOK DILE hold time
0421 753420                MOV     LINE_B_CKLOW,#TIME_DILE_WT
0424 80EE                  JMP     LINE_B_DILE_N00

                   LINE_B_ENDO:
0426 0204E3                JMP     LINE_B_END                ; Go to IDLE state
                   ;-------------------------------------------------------------
                   LINE_B_HOLD:
                           ; Look for ring HOLD state
0429 B40410                CJNE    A,#L_HOLD,LINE_B_WATE
                   LINE_B_HOLD_N00:                    ; Run OFF HOOK HOLD
042C D534F7                DJNZ    LINE_B_CKLOW,LINE_B_ENDO          ; Normal exit
042F 3024BA                JNB     LINE_B_HOOK,LINE_B_OFHA_ST        ; Go to OFF HOOK ACTIVE
0432 809F                  JMP     LINE_B_IDLE_ST            ; Go to IDLE

                   LINE_B_HOLD_ST:             ; Start OFF HOOK HOLD
0434 753604                MOV     LINE_B_STATE,#L_HOLD
                                               ; Set OFF HOOK hold time
0437 753408                MOV     LINE_B_CKLOW,#TIME_DELAY_LO
043A 80F0                  JMP     LINE_B_HOLD_N00

                   ;-------------------------------------------------------------
                   LINE_B_WATE:
                           ; Look for ring WAIT state
043C B40519                CJNE    A,#L_WAIT,LINE_B_STOP
                   LINE_B_WAIT_N00:                    ; Run ring WAIT while other is using
043F 30066D                JNB     LINE_A_RINGING,LINE_B_RING_ST     ; Go to RING start
0442 2031BF                JB      LINE_B_RING_REQ,LINE_B_ONHA_ST    ; Go to ON HOOK ACTIVE
0445 3024EC                JNB     LINE_B_HOOK,LINE_B_HOLD_ST        ; Go to HOLD
0448 D534DB                DJNZ    LINE_B_CKLOW,LINE_B_ENDO          ; Normal exit
044B D207                  SETB    LINE_B_RINGING            ; This will force B to stop
044D 0204E3                JMP     LINE_B_END                ; Go to IDLE state

                   LINE_B_WAIT_ST:             ; Start Ring WAIT
0450 753605                MOV     LINE_B_STATE,#L_WAIT
                                               ; Set ring WAIT time
0453 7534A0                MOV     LINE_B_CKLOW,#TIME_RING_WT
0456 80E7                  JMP     LINE_B_WAIT_N00

                   ;-------------------------------------------------------------
                   ; Look for ring STOP state

                   LINE_B_STOP:
0458 B4071B                CJNE    A,#L_STOP,LINE_B_RING
                   LINE_B_STOP_N00:                    ; Run RING STOP
045B D53415                DJNZ    LINE_B_CKLOW,LINE_B_STOP_END
045E C207                  CLR     LINE_B_RINGING            ; clear the ring
             +3
0460 D22E    +3            SETB    SLIC_E1_B         ; Select LINE POWERED ACTIVE
0462 C22D    +3            CLR     SLIC_C1_B
```

```
0464 D22C         +3          SETB    SLIC_C2_B
                  +3                          ; Set SLIC A active
0466 3024CB                   JNB     LINE_B_HOOK,LINE_B_HOLD_ST
0469 8099                     JMP     LINE_B_ONHA_ST

                        LINE_B_STOP_ST:
046B 753607                   MOV     LINE_B_STATE,#L_STOP
046E 753410                   MOV     LINE_B_CKLOW,#TIME_RING_ST
0471 80E8                     JMP     LINE_B_STOP_N00

                        LINE_B_STOP_END:
0473 0204E3                   JMP LINE_B_END
                        ;--------------------------------------------------------------
                        ; Look for RING state

                        LINE_B_RING:
0476 B4064E                   CJNE    A,#L_RING,LINE_B_INIT
                        LINE_B_RING_N00:                      ; Run RING SYSTEM
0479 D5340B                   DJNZ    LINE_B_CKLOW,LINE_B_RING_N10     ; Not time to togel
047C C208                     CLR     FIRST_RING
                        LINE_B_RING_N05:                 ; Togel the ring
047E 753404                   MOV     LINE_B_CKLOW,#4  ; Reset the count
0481 B296                     CPL     RINGOSC_A
0483 A296                     MOV     C,RINGOSC_A
0485 9297                     MOV     RINGOSC_B,C
                        LINE_B_RING_N10:
0487 30240E                   JNB     LINE_B_HOOK,LINE_B_RING_N25      ; Go stop now
048A 200856                   JB      FIRST_RING,LINE_B_END
048D 200603                   JB      LINE_A_RINGING,LINE_B_RING_N20
0490 303150                   JNB     LINE_B_RING_REQ,LINE_B_END
                        LINE_B_RING_N20:                 ; We need to stop the ring
0493 E534                     MOV     A,LINE_B_CKLOW
0495 B40311                   CJNE    A,#3,LINE_B_RING_N30      ; We need to get this right
                        LINE_B_RING_N25:
0498 C296                     CLR     RINGOSC_A                 ; Idel the ring system
049A D297                     SETB    RINGOSC_B
049C 2024CC                   JB      LINE_B_HOOK,LINE_B_STOP_ST
049F C207                     CLR     LINE_B_RINGING            ; clear the ring
                  +3
04A1 D22E         +3          SETB    SLIC_E1_B        ; Select LINE POWERED ACTIVE
04A3 C22D         +3          CLR     SLIC_C1_B
04A5 D22C         +3          SETB    SLIC_C2_B
                  +3                          ; Set SLIC active
04A7 808B                     JMP     LINE_B_HOLD_ST
                        LINE_B_RING_N30:                 ; Do we need to tern the ring
04A9 B404D2                   CJNE    A,#4,LINE_B_RING_N05
04AC 0204E3                   JMP     LINE_B_END

                        LINE_B_RING_ST:               ; Start the ring
04AF 753606                   MOV     LINE_B_STATE,#L_RING
04B2 D207                     SETB    LINE_B_RINGING            ; Show that we are ring
04B4 D208                     SETB    FIRST_RING                ; Mark first ring
                  +4
04B6 D22E         +4          SETB    SLIC_E1_B        ; Select LINE RINGING
04B8 D22D         +4          SETB    SLIC_C1_B
04BA C22C         +4          CLR     SLIC_C2_B
                  +4                               ; Set SLIC to ring
                                              ; Set ring count time
04BC 753404                   MOV     LINE_B_CKLOW,#4 ; Set count
```

```
04BF B296                CPL     RINGOSC_A
04C1 A296                MOV     C,RINGOSC_A
04C3 9297                MOV     RINGOSC_B,C
04C5 80B2                JMP     LINE_B_RING_N00

                 ;-------------------------------------------------------------
                 ; Look for INIT state

                 LINE_B_INIT:
04C7 B40005              CJNE    A,#L_INIT,LINE_B_INIT_ST

                 LINE_B_INIT_N00:                  ; Run INIT
04CA 300016              JNB     LINK_UP,LINE_B_END
04CD 61D3                JMP     LINE_B_IDLE_ST

                 LINE_B_INIT_ST:         ; the Link is down place all in power down
04CF 753600              MOV     LINE_B_STATE,#L_INIT
04D2 C296                CLR     RINGOSC_A                   ; Idel the ring system
04D4 D297                SETB    RINGOSC_B
04D6 7934         +2     MOV     R1,#MOXI
04D8 7484         +2     MOV     A,#SICOFIB_DN
04DA F3           +1     MOVX    @R1,A    ; Power down SICOFI
                  +2
04DB D22E         +2     SETB    SLIC_E1_B          ; Select NO POWER TO LINE
04DD C22D         +2     CLR     SLIC_C1_B
04DF C22C         +2     CLR     SLIC_C2_B
                  +2                     ; Power down the SLIC
04E1 80E7                JMP     LINE_B_INIT_N00

                 ;-------------------------------------------------------------

                 LINE_B_END:             ; END of LINE_B_SERVICE


                 ;-------------------------------------------------------------
                 ; Output the SSCX to the sicofi

                 CLK20:
04E3 7933         +2     MOV     R1,#SSCX
04E5 E525         +2     MOV     A,SSCX_DATA
04E7 F3           +1     MOVX    @R1,A

                 ;-------------------------------------------------------------
                 ; Service the Alarm system

                 ALARM_SERVICE:
04E8 E5A0                MOV     A,P2               ; get the inputs
04EA 20A401              JB      ALARM_DR,ALARM10
04ED F4                  CPL     A

                 ALARM10:
04EE B2A4                CPL     ALARM_DR           ; togel the drive of alarms
04F0 CC                  XCH     A,ALARM_LAST
04F1 5C                  ANL     A,ALARM_LAST
04F2 33                  RLC     A
04F3 924B                MOV     AUX_B_IDLE,C       ; Set output
04F5 33                  RLC     A
04F6 924A                MOV     AUX_A_IDLE,C       ; Set output
04F8 0204FB              JMP     STATUS_RT
```

```
                    ;--------------------------------------------------------------------
                    ; This is the general status for the RT

                    STATUS_RT:
04FB 304C0C                 JNB     TAMPER_IDLE,STAT10          ; Go to tamper active
04FE 30A529                 JNB     TAMPER_ALM,STATUS_RT_END
0501 C24C                   CLR     TAMPER_IDLE                 ; Set tamper on
0503 7DBC                   MOV     FLASH_CNT,#TIME_FLASH
0505 7EFF                   MOV     STATUS_TIME,#0FFh
0507 020513                 JMP     STAT20
                    STAT10:
050A 30A517                 JNB     TAMPER_ALM,STAT40           ; Door is closed shut down
050D EE                     MOV     A,STATUS_TIME
050E 6016                   JZ      STAT50                      ; Time up by pass
0510 DD18                   DJNZ    FLASH_CNT,STATUS_RT_END     ; not flash time
0512 1E                     DEC     STATUS_TIME
                    STAT20:
0513 300007                 JNB     LINK_UP,STAT30              ; Link is down
0516 B2A0                   CPL     LED_LINK_UP
0518 C2A1                   CLR     LED_POWER_ON                ; power off
051A 02052A                 JMP     STATUS_RT_END
                    STAT30:
051D B2A1                   CPL     LED_POWER_ON                ; Togel the power led
051F C2A0                   CLR     LED_LINK_UP
0521 02052A                 JMP     STATUS_RT_END
                    STAT40:
0524 D24C                   SETB    TAMPER_IDLE
                    STAT50:
0526 C2A1                   CLR     LED_POWER_ON                ; power off
0528 C2A0                   CLR     LED_LINK_UP
                    STATUS_RT_END:              ;END OF STATUS

                    ;--------------------------------------------------------------------
                    ; Transmit the repley to the LC

                    TRAN_START:
052A 7921       +2          MOV     R1,#STAR
052C E3         +1          MOVX    A,@R1               ; Get the status reg
052D 30E619                 JNB     ACC.6,TRAN_END      ; No space to send
0530 7900                   MOV     PTR31,#XFIFO        ; Set pointer
0532 E529                   MOV     A,STAT_OUT          ; Output the status
0534 F3                     MOVX    @PTR31,A
0535 E52A                   MOV     A,TEST_OUT          ; Output the test
0537 F3                     MOVX    @PTR31,A
0538 E52B                   MOV     A,MESG_OUT          ; Output the message
053A F3                     MOVX    @PTR31,A
053B E539                   MOV     A,DATA_1            ; Output the message
053D F3                     MOVX    @PTR31,A
053E E53A                   MOV     A,DATA_2            ; Output the message
0540 F3                     MOVX    @PTR31,A
                            ; Added the data part hear
0541 E4                     CLR     A
0542 F52F                   MOV     TX_MISED,A          ; Show transmision
0544 7921       +2          MOV     R1,#CMDR
0546 740A       +2          MOV     A,#CMDXTF
0548 F3         +1          MOVX    @R1,A
                    TRAN_END:

                    CLK99:
```

```
0549 D019        1897          POP     PT31
054B D0D0        1898          POP     PSW
054D D0E0        1899          POP     ACC
054F 32          1900          RETI
                 1901
                 1902     ;------------------------------------------------------------------
                 1903     ; This is the service routine for the Serial port interrupt
                 1904
                 1905     ISR_SERIAL:
0550 0530        1906          INC     ERROR_CNT
0552 32          1907          RETI
                 1908
                 1909
                 1910
                 1911          END
```

```
XREF SYMBOL TABLE LISTING
---- ------ ----- -------

N A M E            T Y P E   V A L U E      ATTRIBUTES AND REFERENCES

ABS_TERM_REQ. .    B ADDR    0027H.2 A        777# 918
ABS_TERM_SET. .    B ADDR    002AH.2 A        804# 920
ABS_TERM. . . .    B ADDR    0090H.4 A        105# 919
ACC_. . . . . .    D ADDR    00E0H   A        1104 1143 1265 1272 1876 1899
ADF1. . . . . .    X ADDR    0038H   A        407# 1007
ADF1D . . . . .      NUMB    0000H   A        415# 1008
ADF2. . . . . .    X ADDR    0039H   A        417# 1010
ADF2D . . . . .      NUMB    0000H   A        424# 1011
ALARM_DR. . . .    B ADDR    00A0H.4 A        119# 1826 1829
ALARM_LAST. . .      REG     R4               656# 1830 1831
ALARM_SERVICE .    C ADDR    04E8H   A        1824#
ALARMIO . . . .    C ADDR    04EEH   A        1826 1828#
AUX_1_IN. . . .    B ADDR    00A0H.7 A        122#
AUX_2_IN. . . .    B ADDR    00A0H.6 A        121#
AUX_A_IDLE. . .    B ADDR    0029H.2 A        794# 1835
AUX_B_IDLE. . .    B ADDR    0029H.3 A        795# 1833
B1CR. . . . . .    X ADDR    0037H   A        387#
B2CR. . . . . .    X ADDR    0038H   A        389#
BIT_SIZE. . . .      NUMB    0002H   A        689# 696
BOARD_TEST. . .    B ADDR    00B0H.5 A        130# 895 1035 1125 1144
C1R . . . . . .    X ADDR    0035H   A        383#
C2R . . . . . .    X ADDR    0036H   A        385#
CIC . . . . . .    B ADDR    0022H.2 A        705# 1160
CIR0_MASK . . .      NUMB    00C3H   A        353# 1088 1163
CIR0. . . . . .    X ADDR    0031H   A        342# 1066 1086 1161
CIX0. . . . . .    X ADDR    0031H   A        355# 1001 1036 1083 1090 1193 1311
CIX0D . . . . .      NUMB    0047H   A        364#
CLK10 . . . . .    C ADDR    0277H   A        1328#
CLK20 . . . . .    C ADDR    04E3H   A        1816#
CLK99 . . . . .    C ADDR    0549H   A        1896#
CMDR. . . . . .    X ADDR    0021H   A        224# 1016 1233 1294 1305 1314 1317 1891
CMDRCL. . . . .      NUMB    0041H   A        239# 1017
CMDRMC. . . . .      NUMB    0080H   A        235# 1234
CMDRRES . . . .      NUMB    0040H   A        236# 1295 1318
CMDXRES . . . .      NUMB    0001H   A        237# 1306 1315
CMDXTF. . . . .      NUMB    000AH   A        238# 1892
```

```
COEF_IN_B1. . .  B ADDR   0028H.1 A        784#
COEF_IN_B2. . .  B ADDR   0028H.4 A        787#
COEF_OUT_B1 . .  B ADDR   002BH.1 A        813#
COEF_OUT_B2 . .  B ADDR   002BH.4 A        816#
CS_ICC. . . . .  B ADDR   0090H.0 A        101# 977
DATA_1. . . . .  D ADDR   0039H   A        839# 1229 1884
DATA_2. . . . .  D ADDR   003AH   A        840# 1231 1886
EA. . . . . . .  B ADDR   00A8H.7 A        1078
ERR10 . . . . .  C ADDR   0234H   A        1280#
ERR40 . . . . .  C ADDR   023DH   A        1281 1282 1284#
ERR50 . . . . .  C ADDR   0242H   A        1289#
ERR60 . . . . .  C ADDR   0250H   A        1292 1297#
ERR70 . . . . .  C ADDR   0252H   A        1301#
ERR80 . . . . .  C ADDR   0261H   A        1283 1309#
ERR99 . . . . .  C ADDR   0277H   A        1285 1304 1308 1324#
ERROR_CNT . . .  D ADDR   0030H   A        827# 879 1209 1244 1248 1906
ES. . . . . . .  B ADDR   00A8H.4 A        1073
ET0 . . . . . .  B ADDR   00A8H.1 A        1075
EX0 . . . . . .  B ADDR   00A8H.0 A        1077
EXI . . . . . .  B ADDR   0022H.0 A        707# 1237
EXIR_COPY . . .  D ADDR   0023H   A        710# 712 713 714 715 716 717 718 719 1240
EXIR. . . . . .  X ADDR   0024H   A        196# 1064 1238
EXTI0 . . . . .  C ADDR   0003H   A        863
EXTI1 . . . . .  C ADDR   0013H   A        869
FIRST_RING. . .  B ADDR   0021H.0 A        686# 1508 1516 1540 1739 1747 1771
FLASH_CNT . . .    REG    R5               657# 1845 1852
ICC02 . . . . .  C ADDR   0210H   A        1242 1245#
ICC03 . . . . .  C ADDR   0215H   A        1249#
ICC04 . . . . .  C ADDR   021DH   A        1246 1254#
ICC10 . . . . .  C ADDR   0151H   A        1113#
ICC20 . . . . .  C ADDR   015EH   A        1122# 1156
ICC35 . . . . .  C ADDR   0164H   A        1128#
ICC38 . . . . .  C ADDR   0174H   A        1129 1137#
ICC39 . . . . .  C ADDR   0176H   A        1141# 1143
ICC40 . . . . .  C ADDR   018BH   A        1115 1116 1136 1158#
ICC41 . . . . .  C ADDR   0193H   A        1164#
ICC42 . . . . .  C ADDR   019BH   A        1165 1168#
ICC43 . . . . .  C ADDR   01A3H   A        1169 1172#
ICC44 . . . . .  C ADDR   01ABH   A        1173 1176#
ICC45 . . . . .  C ADDR   01B3H   A        1177 1180#
ICC46 . . . . .  C ADDR   01B9H   A        1181 1183#
ICC48 . . . . .  C ADDR   01BFH   A        1184 1186#
ICC50 . . . . .  C ADDR   01C5H   A        1187 1189#
ICC57 . . . . .  C ADDR   01C8H   A        1171 1175 1179 1192#
ICC58 . . . . .  C ADDR   01CBH   A        1182 1185 1188 1190 1196#
ICC59 . . . . .  C ADDR   01CDH   A        1167 1198#
ICC60 . . . . .  C ADDR   01CDH   A        1160 1201#
ICC65 . . . . .  C ADDR   01DEH   A        1208 1211#
ICC79 . . . . .  C ADDR   01FEH   A        1210 1216 1227 1232#
ICC80 . . . . .  C ADDR   0203H   A        1203 1236#
ICC99 . . . . .  C ADDR   0225H   A        1237 1253 1255 1263#
IE. . . . . . .  D ADDR   00A8H   A        952
IECQ_AI . . . .    NUMB   00F3H   A        467# 1165
IECQ_AIC. . . .    NUMB   0073H   A        452# 1174
IECQ_AIL. . . .    NUMB   00FBH   A        469#
IECQ_AR . . . .    NUMB   00E3H   A        464# 1173
IECQ_ARC. . . .    NUMB   0063H   A        450#
IECQ_ARL. . . .    NUMB   006BH   A        451#
IECQ_ARM. . . .    NUMB   00E7H   A        465#
IECQ_DC . . . .    NUMB   00FFH   A        471# 1177
```

```
IECQ_DCC. . . .      NUMB    007FH     A      453#
IECQ_DEAC . . .      NUMB    00C7H     A      458#
IECQ_DI . . . .      NUMB    00FFH     A      470#
IECQ_DIC. . . .      NUMB    007CH     A      454# 1091 1170
IECQ_DR . . . .      NUMB    00C3H     A      457# 1089 1169
IECQ_DRC. . . .      NUMB    0043H     A      446#
IECQ_EI1. . . .      NUMB    00D3H     A      462# 1181
IECQ_EI2. . . .      NUMB    00D7H     A      461#

IECQ_EI3. . . .      NUMB    00EFH     A      466#
IECQ_FJ . . . .      NUMB    00CBH     A      459# 1187
IECQ_LSL. . . .      NUMB    00F7H     A      468#
IECQ_PU . . . .      NUMB    00DFH     A      472# 1184
IECQ_RES. . . .      NUMB    0047H     A      447# 1002 1084 1312
IECQ_RES1 . . .      NUMB    0053H     A      448#
IECQ_RSY. . . .      NUMB    00D3H     A      460#
IECQ_SSP. . . .      NUMB    0057H     A      449# 1037
IECQ_TIM. . . .      NUMB    0043H     A      445# 1178
IECQ_UAI. . . .      NUMB    00DFH     A      463#
INIT_SICOFI . .    B ADDR    0020H.5   A      683# 888 899 1023
INIT_ . . . . .    C ADDR    0075H     A      861 945#
INIT20. . . . .    C ADDR    0093H     A      960# 962
INIT30. . . . .    C ADDR    0096H     A      966#
INIT33. . . . .    C ADDR    0096H     A      970#
INIT35. . . . .    C ADDR    00A2H     A      979# 980 981
INIT40. . . . .    C ADDR    00A6H     A      985#
INIT50. . . . .    C ADDR    00DDH     A      1022#
INIT60. . . . .    C ADDR    00DFH     A      1028#
INIT70. . . . .    C ADDR    00E4H     A      1034#
INIT79. . . . .    C ADDR    00ECH     A      1040# 1042
INIT80. . . . .    C ADDR    00F1H     A      1035 1046#
INIT90. . . . .    C ADDR    010CH     A      1059#
INIT95. . . . .    C ADDR    0130H     A      1082# 1089
IP. . . . . . .    D ADDR    00B8H     A      953
ISR_CLK . . . .    C ADDR    022AH     A      867 1271#
ISR_ICC . . . .    C ADDR    0144H     A      864 1103#
ISR_SERIAL. . .    C ADDR    0550H     A      876 1905#
ISTA_COPY . . .    D ADDR    0022H     A      698# 700 701 702 703 704 705 706 707 1112
ISTA_ . . . . .    X ADDR    0020H     A      181# 1060 1110 1140
L_DILE. . . . .      NUMB    0008H     A      1348# 1429 1436 1661 1668
L_HOLD. . . . .      NUMB    0004H     A      1344# 1448 1455 1679 1686
L_IDLE. . . . .      NUMB    0001H     A      1341# 1363 1380 1595 1612
L_INIT. . . . .      NUMB    0000H     A      1340# 1557 1564 1788 1795
L_OFHA. . . . .      NUMB    0002H     A      1342# 1395 1401 1627 1633
L_ONHA. . . . .      NUMB    0003H     A      1343# 1409 1418 1641 1650
L_RING. . . . .      NUMB    0006H     A      1346# 1505 1538 1736 1769
L_STOP. . . . .      NUMB    0007H     A      1347# 1482 1495 1713 1726
L_WAIT. . . . .      NUMB    0005H     A      1345# 1463 1473 1694 1704
LED_LINK_UP . .    B ADDR    00A0H.0   A      115# 1856 1861 1867
LED_POWER_ON. .    B ADDR    00A0H.1   A      116# 1857 1860 1866
LINE_A_CKHIGH .    D ADDR    0032H     A      830# 1414 1422
LINE_A_CKLOW. .    D ADDR    0031H     A      829# 1413 1421 1432 1439 1450 1457 1468 1475 1484 1496 1507 1
                                              1520 1547

LINE_A_DILE_NOO    C ADDR    02E2H     A      1430# 1440
LINE_A_DILE_ST.    C ADDR    02EAH     A      1398 1435#
LINE_A_DILE_ .     C ADDR    02DFH     A      1409 1428#
LINE_A_END. . .    C ADDR    03B1H     A      1443 1470 1500 1516 1518 1535 1560 1579#
LINE_A_ENDO . .    C ADDR    02F4H     A      1366 1397 1413 1414 1432 1442# 1450 1468
LINE_A_HOLD_NOO    C ADDR    02FAH     A      1449# 1458
LINE_A_HOLD_ST.    C ADDR    0302H     A      1376 1411 1454# 1467 1491 1532
```

```
LINE_A_HOLD_. .   C ADDR   02F7H     A   1429 1446#
LINE_A_HOOK . .   B ADDR   0024H.0   A   736# 1365 1397 1411 1431 1451 1467 1491 1515 1525
LINE_A_IDLE_N00   C ADDR   028AH     A   1364# 1389
LINE_A_IDLE_N10   C ADDR   0290H     A   1365 1367#
LINE_A_IDLE_ST.   C ADDR   02A1H     A   1379# 1415 1452 1561
LINE_A_IDLE_. .   C ADDR   0287H     A   1356 1362#
LINE_A_INIT_N00   C ADDR   0398H     A   1559# 1575
LINE_A_INIT_ST.   C ADDR   039DH     A   1557 1563#
LINE_A_INIT_. .   C ADDR   0395H     A   1357 1505 1556#
LINE_A_LCD. . .   B ADDR   00A0H.2   A   117#
LINE_A_OFHA_N00   C ADDR   02B4H     A   1396# 1403
LINE_A_OFHA_ST.   C ADDR   02BAH     A   1400# 1431 1451
LINE_A_OFHA_. .   C ADDR   02B1H     A   1363 1394#
LINE_A_ON . . .   B ADDR   0029H.0   A   792# 1402 1419 1437
LINE_A_ONHA_N00   C ADDR   02C4H     A   1410# 1423
LINE_A_ONHA_ST.   C ADDR   02D2H     A   1417# 1433 1466 1492
LINE_A_ONHA_. .   C ADDR   02C1H     A   1395 1408#
LINE_A_RING_N00   C ADDR   0347H     A   1506# 1551
LINE_A_RING_N05   C ADDR   034CH     A   1509# 1534
LINE_A_RING_N10   C ADDR   0355H     A   1507 1514#
LINE_A_RING_N20   C ADDR   0361H     A   1517 1519#
LINE_A_RING_N25   C ADDR   0366H     A   1515 1522#
LINE_A_RING_N30   C ADDR   0377H     A   1521 1533#
LINE_A_RING_REQ   B ADDR   0026H.0   A   768# 1366 1376 1412 1466 1518
LINE_A_RING_ST.   C ADDR   037DH     A   1465 1537#
LINE_A_RING_. .   C ADDR   0344H     A   1482 1504#
LINE_A_RINGING.   B ADDR   0020H.6   A   684# 1469 1485 1526 1539 1696 1748
LINE_A_SERVICE.   C ADDR   027FH     A   1334 1353#
LINE_A_STATE. .   D ADDR   0033H     A   831# 1355 1380 1401 1418 1436 1455 1473 1495 1538 1564
LINE_A_STOP_END   C ADDR   0341H     A   1484 1499#
LINE_A_STOP_N00   C ADDR   0329H     A   1483# 1497
LINE_A_STOP_ST.   C ADDR   0339H     A   1494# 1525
LINE_A_STOP_. .   C ADDR   0326H     A   1463 1481#
LINE_A_WAIT_N00   C ADDR   030DH     A   1464# 1476
LINE_A_WAIT_ST.   C ADDR   031EH     A   1377 1412 1472#
LINE_A_WATE_. .   C ADDR   030AH     A   1448 1461#
LINE_B_CKHIGH .   D ADDR   0035H     A   834# 1646 1654
LINE_B_CKLOW. .   D ADDR   0034H     A   833# 1645 1653 1664 1671 1681 1688 1699 1706 1715 1727 1738 1
                                         1751 1778
LINE_B_DILE_N00   C ADDR   0414H     A   1662# 1672
LINE_B_DILE_ST.   C ADDR   041CH     A   1630 1667#
LINE_B_DILE_. .   C ADDR   0411H     A   1641 1660#
LINE_B_END. . .   C ADDR   04E3H     A   1675 1701 1731 1747 1749 1766 1791 1810#
LINE_B_ENDO . .   C ADDR   0426H     A   1598 1629 1645 1646 1664 1674# 1681 1699
LINE_B_HOLD_N00   C ADDR   042CH     A   1680# 1689
LINE_B_HOLD_ST.   C ADDR   0434H     A   1608 1643 1685# 1698 1722 1763
LINE_B_HOLD_. .   C ADDR   0429H     A   1661 1677#
LINE_B_HOOK . .   B ADDR   0024H.4   A   737# 1597 1629 1643 1663 1682 1698 1722 1746 1756
LINE_B_IDLE_N00   C ADDR   03BCH     A   1596# 1621
LINE_B_IDLE_N10   C ADDR   03C2H     A   1597 1599#
LINE_B_IDLE_ST.   C ADDR   03D3H     A   1611# 1647 1683 1792
LINE_B_IDLE_. .   C ADDR   03B9H     A   1588 1594#
LINE_B_INIT_N00   C ADDR   04CAH     A   1790# 1806
LINE_B_INIT_ST.   C ADDR   04CFH     A   1788 1794#
LINE_B_INIT_. .   C ADDR   04C7H     A   1589 1736 1787#
LINE_B_LCD. . .   B ADDR   00A0H.3   A   118#
LINE_B_OFHA_N00   C ADDR   03E6H     A   1628# 1635
LINE_B_OFHA_ST.   C ADDR   03ECH     A   1632# 1663 1682
LINE_B_OFHA_. .   C ADDR   03E3H     A   1595 1626#
```

```
LINE_B_ON . . .     B ADDR   0029H.1 A     793# 1634 1651 1669
LINE_B_ONHA_N00     C ADDR   03F6H   A     1642# 1655
LINE_B_ONHA_ST.     C ADDR   0404H   A     1649# 1665 1697 1723
LINE_B_ONHA_. .     C ADDR   03F3H   A     1627 1640#
LINE_B_RING_N00     C ADDR   0479H   A     1737# 1782
LINE_B_RING_N05     C ADDR   047EH   A     1740# 1765
LINE_B_RING_N10     C ADDR   0487H   A     1738 1745#
LINE_B_RING_N20     C ADDR   0493H   A     1748 1750#
LINE_B_RING_N25     C ADDR   0498H   A     1746 1753#
LINE_B_RING_N30     C ADDR   04A9H   A     1752 1764#
LINE_B_RING_REQ     B ADDR   0026H.1 A     769# 1598 1608 1644 1697 1749
LINE_B_RING_ST.     C ADDR   04AFH   A     1696 1768#
LINE_B_RING_. .     C ADDR   0476H   A     1713 1735#
LINE_B_RINGING.     B ADDR   0020H.7 A     685# 1465 1517 1700 1716 1757 1770
LINE_B_SERVICE.     C ADDR   03B1H   A     1585#
LINE_B_STATE. .     D ADDR   0036H   A     835# 1587 1612 1633 1650 1668 1686 1704 1726 1769 1795
LINE_B_STOP_END     C ADDR   0473H   A     1715 1730#
LINE_B_STOP_N00     C ADDR   045BH   A     1714# 1728
LINE_B_STOP_ST.     C ADDR   046BH   A     1725# 1756
LINE_B_STOP_. .     C ADDR   0458H   A     1694 1712#
LINE_B_WAIT_N00     C ADDR   043FH   A     1695# 1707
LINE_B_WAIT_ST.     C ADDR   0450H   A     1609 1644 1703#
LINE_B_WATE_. .     C ADDR   043CH   A     1679 1692#
LINE_TEST_A . .     B ADDR   0025H.3 A     760# 913
LINE_TEST_B . .     B ADDR   0025H.7 A     756# 916
LINK_UP . . . .     B ADDR   0020H.0 A     678# 1166 1197 1283 1285 1356 1560 1588 1791 1855
M10 . . . . . .     C ADDR   0070H   A     934#
MAIN. . . . . .     C ADDR   0029H   A     887# 936 1093
MASK. . . . . .     X ADDR   0020H   A     183# 986
MASKD . . . . .       NUMB   0079H   A     194# 987
MESG_IN_B1. . .     B ADDR   0028H.0 A     783#
MESG_IN_B2. . .     B ADDR   0028H.3 A     786#
MESG_IN_. . . .     D ADDR   0028H   A     781# 783 784 785 786 787 788 1226 1323
MESG_OUT_B1 . .     B ADDR   002BH.0 A     812#
MESG_OUT_B2 . .     B ADDR   002BH.3 A     815#
MESG_OUT_INIT .       NUMB   0000H   A     819# 1055
MESG_OUT_ . . .     D ADDR   002BH   A     810# 812 813 814 815 816 817 1055 1882
MOCR_ . . . . .     X ADDR   003AH   A     432#
MOCRD . . . . .       NUMB   0000H   A     436#
MODE. . . . . .     X ADDR   0022H   A     241# 1013
MODED . . . . .       NUMB   00CAH   A     248# 1014
MODL_IN_B1. . .     B ADDR   0028H.2 A     785#
MODL_IN_B2. . .     B ADDR   0028H.5 A     788#
MODL_OUT_B1 . .     B ADDR   002BH.2 A     814#
MODL_OUT_B2 . .     B ADDR   002BH.5 A     817#
MOR0_COPY . . .     D ADDR   003CH   A     842# 1259
MOR0_ . . . . .     X ADDR   0032H   A     366# 1257
MOR1. . . . . .     X ADDR   0034H   A     379#
MOS . . . . . .     B ADDR   0023H.2 A     717# 1255
MOSR. . . . . .     X ADDR   003AH   A     426#
MOSRD . . . . .       NUMB   0000H   A     430#
MOX0. . . . . .     X ADDR   0032H   A     369#
MOX0D . . . . .       NUMB   0000H   A     370#
MOX1. . . . . .     X ADDR   0034H   A     381# 1121 1368 1381 1567 1600 1613 1798
ON_HOOK_REQ . .     B ADDR   0027H.4 A     779#
P_OFF . . . . .       NUMB   0002H   A     165# 1041
P0_INIT . . . .       NUMB   00FFH   A     95# 946
P0_ . . . . . .     D ADDR   0080H   A     946
P1_INIT . . . .       NUMB   008BH   A     110# 947
P1_ . . . . . .     D ADDR   0090H   A     101 102 103 104 105 106 107 108 947
```

```
P2_INIT . . . . .    NUMB   00FFH    A     124# 948
P2_ . . . . . . .  D ADDR   00A0H    A     115 116 117 118 119 120 121 122 948 1825
P3_INIT . . . . .    NUMB   00FFH    A     132# 949
P3_ . . . . . . .  D ADDR   00B0H    A     129 130 949
PASS_HIGH . . . .  D ADDR   002DH    A     824# 1282
PASS_LOW. . . . .  D ADDR   002CH    A     823# 1281
PCE_ . . . . . . . B ADDR   0023H.5  A     714#
PCON. . . . . . .    NUMB   0087H    A     164# 935 1041
PCOND . . . . . .    NUMB   0001H    A     161# 935
PSW . . . . . . .  D ADDR   00D0H    A     954 1105 1264 1273 1898
PT00. . . . . . .  D ADDR   0000H    A     595#
PT01. . . . . . .  D ADDR   0001H    A     596#
PT30. . . . . . .  D ADDR   0018H    A     661#
PT31. . . . . . .  D ADDR   0019H    A     662# 1278 1897
PTR00 . . . . . .    REG    R0             586#
PTR01 . . . . . .    REG    R1             587#
PTR30 . . . . . .    REG    R0             652# 1121 1126
PTR31 . . . . . .    REG    R1             653# 1140 1142 1220 1221 1223 1225 1228 1230 1877 1879 1881 1
                                           1885 1887

RBCH. . . . . . .  X ADDR   002AH    A     260#
RBCL. . . . . . .  X ADDR   0025H    A     257# 1212
REC_CNT . . . . .    REG    R2             654# 1217
REF_TERM_REQ. . .  B ADDR   0027H.3  A     778# 921
REF_TERM_SET. . .  B ADDR   002AH.3  A     805# 924
REF_TERM. . . . .  B ADDR   0090H.5  A     106# 923
RESET_ICC . . . .  B ADDR   0090H.1  A     102# 972
RESET_IECQ. . . .  B ADDR   0090H.2  A     103# 971
RESET_SICOFI. . .  B ADDR   0090H.3  A     104# 973
RESET_TOL . . . .    NUMB   0078H    A     166#
RESET . . . . . .  C ADDR   0000H    A     860
RFIFO . . . . . .  X ADDR   0000H    A     326# 1220
RFO . . . . . . .  B ADDR   0023H.4  A     715# 1242
RHCR. . . . . . .  X ADDR   0029H    A     321#
RING_DET_OUT. . .  B ADDR   002AH.4  A     806# 908 922
RING_DET. . . . .  B ADDR   00B0H.3  A     129# 906
RINGOSC_A . . . .  B ADDR   0090H.6  A     107# 1511 1512 1523 1548 1549 1565 1742 1743 1754 1779 1780 1
RINGOSC_B . . . .  B ADDR   0090H.7  A     108# 1513 1524 1550 1566 1744 1755 1781 1797
RLOOP03_CNT . . .    REG    R3             589# 975 980
RLOOP07_CNT . . .    REG    R7             593# 974 981
RME . . . . . . .  B ADDR   0022H.7  A     700# 1203
RPF . . . . . . .  B ADDR   0022H.6  A     701#
RRX_BYTE. . . . .    REG    R4             612#
RRX_COUNT . . . .    REG    R2             610#
RRX_HEAD. . . . .    REG    R0             608#
RRX_OVERFLOW. . .    REG    R3             611#
RRX_TAIL. . . . .    REG    R1             609#
RS0 . . . . . . .  B ADDR   00D0H.3  A     1107 1275
RS1 . . . . . . .  B ADDR   00D0H.4  A     1108 1276
RSC . . . . . . .  B ADDR   0022H.5  A     702#
RST_CONT. . . . .    REG    R3             655# 1129
RSTA. . . . . . .  X ADDR   0027H    A     268# 1062 1204
RTX_COUNT . . . .    REG    R2             632#
RTX_HEAD. . . . .    REG    R0             630#
RTX_OVERFLOW. . .    REG    R3             633#
RTX_TAIL. . . . .    REG    R1             631#
RX_BUFF . . . . .  D ADDR   0060H    A     852# 1050 1051
RX_BYTE . . . . .  D ADDR   000CH    A     621#
RX_COUNT. . . . .  D ADDR   000AH    A     619#
RX_ERROR. . . . .  D ADDR   003BH    A     841# 1293
```

```
RX_HEAD . . . .      D ADDR   0008H     A    617# 1050
RX_MISED. . . .      D ADDR   002EH     A    825# 1219 1286 1290
RX_OVERFLOW . .      D ADDR   000BH     A    620#
RX_TAIL . . . .      D ADDR   0009H     A    618# 1051
RX_TOL. . . . .        NUMB   000AH     A    167# 1291 1292
SAP1. . . . . .      X ADDR   0026H     A    288#
SAP2. . . . . .      X ADDR   0027H     A    295#
SAPR. . . . . .      X ADDR   0026H     A    316#
SAW . . . . . .      B ADDR   0023H.1   A    718#
SCON. . . . . .      D ADDR   0098H     A    957 1072
SCOND . . . . .        NUMB   0070H     A    162# 1072
SICOFI_OPS_LEN.        NUMB   0084H     A    556# 894
SICOFI_OPS. . .      C ADDR   0E00H     A    484# 556 893
SICOFIA_DN. . .        NUMB   0004H     A    565# 1382 1568
SICOFIA_UP. . .        NUMB   0024H     A    566# 1369
SICOFIB_DN. . .        NUMB   0084H     A    567# 1614 1799
SICOFIB_UP. . .        NUMB   00A4H     A    568# 1601
SIN . . . . . .      B ADDR   0022H.1   A    706# 1115
SINT. . . . . .      C ADDR   0023H     A    875
SLIC_C1_A . . .      B ADDR   0025H.1   A    762# 1373 1386 1488 1529 1543 1572
SLIC_C1_B . . .      B ADDR   0025H.5   A    758# 1605 1618 1719 1760 1774 1803
SLIC_C2_A . . .      B ADDR   0025H.0   A    763# 1374 1387 1489 1530 1544 1573
SLIC_C2_B . . .      B ADDR   0025H.4   A    759# 1606 1619 1720 1761 1775 1804
SLIC_E1_A . . .      B ADDR   0025H.2   A    761# 1372 1385 1487 1528 1542 1571
SLIC_E1_B . . .      B ADDR   0025H.6   A    757# 1604 1617 1718 1759 1773 1802
SOV . . . . . .      B ADDR   0023H.3   A    716# 1246
SP. . . . . . .      D ADDR   0081H     A    950
SPCR. . . . . .      X ADDR   0030H     A    329# 995 998
SPCRD1. . . . .        NUMB   0080H     A    338# 996
SPCRD2. . . . .        NUMB   0045H     A    339# 999
SSCR_COPY . . .      D ADDR   0024H     A    722# 736 737 1333
SSCR. . . . . .      X ADDR   0033H     A    373# 1331
SSCX_DATA . . .      D ADDR   0025H     A    740# 756 757 758 759 760 761 762 763 1047 1818
SSCX_INIT . . .        NUMB   0044H     A    753# 1030 1047
SSCX. . . . . .      X ADDR   0033H     A    376# 1029 1817
ST_CONT . . . .      D ADDR   001BH     A    664# 894
ST_DPTR . . . .      B ADDR   0020H.4   A    682# 889 1133
ST_INPROG . . .      B ADDR   0020H.1   A    679# 890 1116 1135
ST_NOR. . . . .        NUMB   0070H     A    400# 1005 1131 1251
ST_PTR. . . . .      D ADDR   0038H     A    838#
ST_REC. . . . .      B ADDR   0020H.2   A    680# 891 1134

ST_SC0. . . . .        NUMB   0075H     A    404#
ST_SC1. . . . .        NUMB   007AH     A    403# 1119 1146
ST_ST0. . . . .        NUMB   0074H     A    402#
ST_ST1. . . . .        NUMB   0078H     A    401# 897
ST_WT_RD. . . .      B ADDR   0020H.3   A    681# 892
STACK . . . . .      D ADDR   003DH     A    848# 950
STAR. . . . . .      X ADDR   0021H     A    209# 1874
STAT_IN_INIT. .        NUMB   00FFH     A    771# 1052
STAT_IN . . . .      D ADDR   0026H     A    766# 768 769 1052 1222 1321
STAT_OUT_INIT .        NUMB   00FFH     A    798# 1053
STAT_OUT. . . .      D ADDR   0029H     A    790# 792 793 794 795 796 1053 1878
STAT10. . . . .      C ADDR   050AH     A    1842 1848#
STAT20. . . . .      C ADDR   0513H     A    1847 1854#
STAT30. . . . .      C ADDR   051DH     A    1855 1859#
STAT40. . . . .      C ADDR   0524H     A    1849 1863#
STAT50. . . . .      C ADDR   0526H     A    1851 1865#
STATUS_RT_END .      C ADDR   052AH     A    1843 1852 1858 1862 1868#
STATUS_RT . . .      C ADDR   04FBH     A    1836 1841#
```

```
STATUS_TIME . .      REG      R6                  658# 1846 1850 1853
STCR. . . . . . .  X ADDR     0037H    A          391# 896 1004 1118 1130 1145 1250
T0LOAD. . . . . .    NUMB     FFCEH    A          163# 1074
T1LOAD. . . . . .    NUMB     FFF8H    A          160# 1070
TAMPER_ALM. . . .  B ADDR     00A0H.5  A          120# 1843 1849
TAMPER_IDLE . . .  B ADDR     0029H.4  A          796# 1842 1844 1864
TCON. . . . . . .  D ADDR     0088H    A          955
TEI1. . . . . . .  X ADDR     0028H    A          302# 989
TEI1D . . . . . .    NUMB     00FFH    A          307# 990
TEI2. . . . . . .  X ADDR     0029H    A          309# 992
TEI2D . . . . . .    NUMB     00FFH    A          314# 993
TEST_IN_COPY. . .  D ADDR     0037H    A          837# 910 926
TEST_IN . . . . .  D ADDR     0027H    A          773# 775 776 777 778 779 909 925 1224 1322
TEST_OUT_INIT . .    NUMB     0000H    A          808# 1054
TEST_OUT. . . . .  D ADDR     002AH    A          800# 802 803 804 805 806 928 1054 1880
TEST_PROC_END . .  C ADDR     0070H    A          911 927 930#
TEST_PROC . . . .  C ADDR     0043H    A          888 904#
TEST_REQ_A. . . .  B ADDR     0027H.0  A          775# 912
TEST_REQ_B. . . .  B ADDR     0027H.1  A          776# 915
TEST_SET_A. . . .  B ADDR     002AH.0  A          802# 914
TEST_SET_B. . . .  B ADDR     002AH.1  A          803# 917
TH0 . . . . . . .  D ADDR     008CH    A          1074
TH1 . . . . . . .  D ADDR     008DH    A          1070
TIM . . . . . . .  B ADDR     0022H.3  A          704#
TIME_ACT_HI . . .    NUMB     0006H    A          139# 1422 1654
TIME_ACT_LO . . .    NUMB     0040H    A          138# 1421 1653
TIME_DELAY_LO . .    NUMB     0008H    A          142# 1457 1688
TIME_DILE_WT. . .    NUMB     0020H    A          151# 1439 1671
TIME_FLASH. . . .    NUMB     00BCH    A          154# 1845
TIME_RING_ST. . .    NUMB     0010H    A          148# 1496 1727
TIME_RING_WT. . .    NUMB     00A0H    A          145# 1475 1706
TIMER0. . . . . .  C ADDR     000BH    A          866
TIMER1. . . . . .  C ADDR     001BH    A          872
TIMR. . . . . . .  X ADDR     0023H    A          250#
TIMRD . . . . . .    NUMB     00CCH    A          255#
TMOD. . . . . . .  D ADDR     0089H    A          956 1068
TR0 . . . . . . .  B ADDR     0088H.4  A          1076
TR1 . . . . . . .  B ADDR     0088H.6  A          1071
TRAN_END. . . . .  C ADDR     0549H    A          1876 1894#
TRAN_START. . . .  C ADDR     052AH    A          1873#
TRAP. . . . . . .  C ADDR     0026H    A          870 873 878#
TX_BUFF . . . . .  D ADDR     0040H    A          851# 1048 1049
TX_COUNT. . . . .  D ADDR     0012H    A          641#
TX_HEAD . . . . .  D ADDR     0010H    A          639# 1048
TX_MISED. . . . .  D ADDR     002FH    A          826# 1298 1302 1890
TX_TAIL . . . . .  D ADDR     0011H    A          640# 1049
TX_TOL. . . . . .    NUMB     000AH    A          168# 1303 1304
WOV . . . . . . .  B ADDR     0023H.0  A          719#
XAD1. . . . . . .  X ADDR     0024H    A          282#
XAD2. . . . . . .  X ADDR     0025H    A          285#
XDU . . . . . . .  B ADDR     0023H.6  A          713#
XFIFO . . . . . .  X ADDR     0000H    A          327# 1877
XMR . . . . . . .  B ADDR     0023H.7  A          712#
XPR . . . . . . .  B ADDR     0022H.4  A          703#

NO REGISTER BANK(S) USED

ASSEMBLY COMPLETE, NO ERRORS FOUND
```

APPENDIX II

LC Code

```
DOS 3.30 (038-N) MCS-51 MACRO ASSEMBLER, V2.3
OBJECT MODULE PLACED IN MUXLC.OBJ
ASSEMBLER INVOKED BY:  C:\MCS51\ASM51.EXE MUXLC.ASM

LOC  OBJ            LINE     SOURCE

                       1     $TITLE(    Subscriber Line Multiplexer Program for LC      )
                       2     $MACRO(75)
                       3     $ERRORPRINT
                       4     $DEBUG
                       5     $NOREGISTERBANK
                       6     $XREF
                       7     $PAGELENGTH(59)
                       8     $PAGEWIDTH(110)
                       9     ;************************************************************************
                      10     ;                          SUBSCRIBER LINE MULTIPLEXER SYSTEM
                      11     ;
                      12     ;                                 ****  MARK V  ****
                      13     ;
                      14     ;
                      15     ; This is the assembly listing for the subscriber line multiplexer system.
                      16     ; This code is for the MARK V  Line Card (LC).
                      17     ; The code is configured by using common includ files that may have
                      18     ; conditional assembly switch for this file.  We use MODEL=LC fot this
                      19     ; section.
                      20     ;
                      21     ; This code will go into a D83C51FA in the end, Temp D87C51FA
                      22     ; This chip has 8K ROM, 256 RAM
                      23     ;
                      24     ;        (C) Copyright 1990  RAYCHEM Corporation,  Menlo Park, CA
                      25     ;************************************************************************
                      26
----                  27             CSEG    AT      01F80h  ; Absolute Code Segment
                      28
                      29                                     ; Top of on-chip 8k ROM to contain
                      30     CHIP_ID:                        ; ID, version number and date strings
                      31
1F80 50726F6A         32             DB      'Project Manager:'
1F84 65637420
1F88 4D616E61
1F8C 6765723A
1F90 44617669         33             DB      'David C. Bliven '
1F94 6420432E
1F98 20426C69
1F9C 76656E20
                      34
1FA0 53797374         35             DB      'System Software:'
1FA4 656D2053
1FA8 6F667477
1FAC 6172653A
1FB0 44617669         36             DB      'David C. Bliven '
1FB4 6420432E
1FB8 20426C69
1FBC 76656E20
                      37
1FC0 4D55584C         38             DB      'MUXLC           '       ; Model ID
1FC4 43202020
1FC8 20202020
1FCC 2C202020
```

```
1FD0 56232030                 DB      'V# 0.5C 09/08/90'      ; Version and date
1FD4 2E354320
1FD8 30392F30
1FDC 382F3930




                    ;-----------------------------------------------------------------
                    ; MACROs
                 +1 $INCLUDE(MACRO.INC)
           =1       ;-------------------------------------------------------------
           =1       ; MACROs for the system
           =1
           =1       ;-------------------------------------------------------------
           =1       ; SLIC MACRO used to set SSCP for SLIC control, Pass (<LINE-A/B->,<STATE>)
           =1
           =1
           =1       ;-------------------------------------------------------------
           =1       ; BANK MACRO used to select the register bank, Pass (<bank NO>)
           =1
           =1
           =1       ;-----------------------------------------------------------------
           =1       ; SETX MACRO used to set XDATA at DEST with DATA, Pass (<DEST>,<DATA>)
           =1
           =1
           =1       ;-----------------------------------------------------------------
           =1       ; SETX2 MACRO used to set XDATA at Point=R1 with DATA, Pass (<DATA>)
           =1
           =1
           =1       ;-----------------------------------------------------------------
           =1       ; SETA MACRO used to set XDATA at DEST with ACC, Pass (<DEST>)
           =1
           =1
           =1       ;-----------------------------------------------------------------
           =1       ; GETX MACRO used to read XDATA at SOURCE to DATA, Pass (<DATA>,<SOURCE>)
           =1
           =1
           =1       ;-----------------------------------------------------------------
           =1       ; GETX2 MACRO used to read XDATA at point R1, to DATA, Pass (<DATA>)
           =1
           =1
           =1       ;-----------------------------------------------------------------
           =1       ; GETA MACRO used to read XDATA at SOURCE to ACC, Pass (<SOURCE>)
           =1
           =1
           =1       ;-----------------------------------------------------------------
           =1    +1 $eject

                    ;-----------------------------------------------------------------

                    ;       Intel MCS-51 (8051) I/O PORT USAGE: Ports 0-3

                    ;-----------------------------------------------------------------

                    ;       Port 0 used as byte-wide address/data bus.

                    ; The bus is used to work with the 2070 ICC control and multiplexer.
                    ; It is accessed for this function through the MOVX instructions.
```

```
00FF    P0_INIT          EQU     0FFH     ; Set up for port 0

        ; .     Port 1 used for input and output

0090    CS_ICC           BIT     P1.0     ; /Chip select ICC  PEB 2070
0091    TA_SET           BIT     P1.1     ; /TA Outrput for Rack Controller Serial bus
0092    TA_STAT          BIT     P1.2     ;  TA STAT 1 = active, 0 = free
0093    RESET_ALL        BIT     P1.3     ; Reset SICOFI PEB 2260, IECQ 2091, & ICC 207
0094    OVERRIDE         BIT     P1.4     ; /bypass P.S. undervoltage protection
0095    HIGH_I           BIT     P1.5     ; /Hi current drive - apply when Link is up
0096    LOW_I            BIT     P1.6     ; /Low current drive
0097    LAMP_TEST        BIT     P1.7     ; LED lamp test pushbutton input

00FF    P1_INIT          EQU     011111111B       ; Set up for port 1


        ;       Port 2 used output
        ;       Port 2 drives LEDs
        ;       The port is updated from a copy word in main see P2_COPY

        ; LED_MINOR      BIT     P2.0     ; /MINOR LED
        ; LED_DSL                BIT     P2.1     ; /DSL LED
        ; LED_TEST       BIT     P2.2     ; /TEST LED
        ; LED_TAMPER     BIT     P2.3     ; /TAMPER LED
        ; LED_LINE_A     BIT     P2.4     ; /LINE A LED
        ; LED_LINE_B     BIT     P2.5     ; /LINE B LED
        ; LED_AUX_A      BIT     P2.6     ; /AUX A LED
        ; LED_AUX_B      BIT     P2.7     ; /AUX B LED

00FF    P2_INIT          EQU     011111111B       ; Set sup for Port 2

        ;       Port 3 is used for MCS-51 special function control,
        ;       such as timer, interrupt and serial I/O

00B3    LINE_FAULT       BIT     P3.3     ; 0=serial line driver overload detect
00B5    BOARD_TEST       BIT     P3.5

00FF    P3_INIT          EQU     011111111b

        ;-------------------------------------------------------------------------

        ; Timing control values

        ; Base input rate from FSC for timing
1F40    TIME_FSC                 EQU     8000 ;Hz

        ; Base Clock rate for ISR CLK time service rutine
00A0    TIME_BASE                EQU     160 ;Hz

        ; Time for fast flash, MINOR Alarm in power up
0001    FLASH_SPEED_F            EQU     1 ;sec ,1 Hz,  MAX 3 sec

        ; Time for slow flash, AUX relays
0002    FLASH_SPEED_S            EQU     2 ;sec ,1/2 Hz,  MAX 3 sec

        ; Time for power OFF in power control
000A    TIME_POWER_OFF           EQU     10 ;sec, MAX 400 sec
```

```
                ; Time for power to LINK in power control
0028            TIME_POWER_LINK          EQU      40 ;sec, MAX 400 sec

                ; Time for power WATE (bypass short control) in power control
0001            TIME_POWER_WATE          EQU      1 ;sec, MAX 400 sec

                ; Time for power START (hold 50 ma with no short) in power control
0004            TIME_POWER_START         EQU      4 ;sec, MAX 400 sec

                ; Time for power OVERride in power control
0001            TIME_POWER_OVER          EQU      1 ;sec, MAX 400 sec

                ; Time for test responce
001E            TIME_TEST_RESP           EQU      30 ;ms

                ;-----------------------------------------------------------------
                ; Controler setup values

                ; Timer 0 is used to count ISR_CK from FSC input
                ; timer 1 is used for baud rate gen

00FF            T1LOAD          EQU     0FFh            ; LC Baud rate 57k w/11.06mhz xtal
0080            PCOND           EQU     10000000b       ; High Speed Comm Link SMOD = 1
0001            IDLE_MOD        EQU     00000001b       ; Idle mode control
0002            P_OFF           EQU     00000010b       ; Power down 87C51 processor
00F0            SCOND           EQU     11110000b       ; Serial I/O port mode 3 for LC
0078            RESET_TOL       EQU     120             ; The missed Link messages that will
                t
000A            RX_TOL          EQU     10              ; The missed RX for Reciver reset
000A            TX_TOL          EQU     10              ; The missed TX for Transmit reset
0004            T2_CONT         EQU     00000100b       ; The control for timer 2
                ;-----------------------------------------------------------------
                ; SFR regester in FA that need address defination

0087            PCON            DATA    087h     ; Power control reg
00A9            SADDR           DATA    0A9h     ; Serial port address reg
00B9            SADEN           DATA    0B9h     ; Serial port address mask reg
00D8            CCON            DATA    0D8h     ; Counter CONtrol
00D9            CMOD            DATA    0D9h     ; PCA Mode
00E9            CL              DATA    0E9h     ; LSB of PCA counter/timer
00F9            CH              DATA    0F9h     ; MSB of PCA counter/timer
00DE            CCAPM4          DATA    0DEh     ; Compare/Capture Module 4 Mode Register
00EE            CCAP4L          DATA    0EEh     ; Compare/Capture Module 4 Low  count Registe
00FE            CCAP4H          DATA    0FEh     ; Compare/Capture Module 4 High count Registe
00DE            CRUN            BIT     CCON.6   ; Counter Run
00CD            TH2             DATA    0CDh     ; Counter 2 high data
00C8            T2CON           DATA    0C8h     ; Timer 2 Control
00CF            TF2             BIT     T2CON.7  ; Timet 2 over flow flag

                ;-----------------------------------------------------------------
                ; Definition of RAM memery system

----                            DSEG    AT 000h ; Data Memory Absolute segment

                ; DATA MEMORY (SCRATCHPAD RAM) USE

                ;  Register Bank 0 overlays Memory Locations 00h-07h (0-7)
                ;  Register Bank 0 used for non-interrupt space
```

```
                    ; (RB0)

REG                 PTR00           EQU     R0      ; Not used
REG                 PTR01           EQU     R1      ; Used in init
                    ;               EQU     R2      ; Not used
REG                 RLOOP03_CNT     EQU     R3      ; Loop conter in init
REG                 RTX_TYPE        EQU     R4      ; For out going message type
REG                 RTX_LENT        EQU     R5      ; For out going message length
REG                 MISSED_REC      EQU     R6      ; For missed reciver
REG                 RLOOP07_CNT     EQU     R7      ; General Loop Counter

0000                PT00:           DS      1       ; R0, Not used
0001                PT01:           DS      1       ; R1, Not used
0002                                DS      1       ; R2, Not used
0003                                DS      1       ; R3, Loop conter in init
0004                TX_TYPE:        DS      1       ; R4, Used
0005                TX_LENT:        DS      1       ; R5, Used
0006                                DS      1       ; R6, Used
0007                                DS      1       ; R7, General Loop Counter (R7)

                    ;  Register Bank 1 overlays Memory Locations 08h-0Fh (8-15)
                    ;  Register Bank 1 used for Serial interrupt space
                    ; (RB1)

0008                        ORG     08h
REG                 RRX_POINT       EQU     R0      ; Buffer pointer for receive
REG                 RTX_POINT       EQU     R1      ; Buffer pointer for transmit
REG                 RRX_COUNT       EQU     R2      ; Receive Counter
REG                 RTX_COUNT       EQU     R3      ; Transmit counter
                    ;               EQU     R4      ; Not used
                    ;               EQU     R5      ; Not used
                    ;               EQU     R6      ; Not used
                    ;               EQU     R7      ; Not used

0008                                DS      1       ; R0, Buffer pointer for receive
0009                TX_POINT:       DS      1       ; R1, Buffer pointer for transmit
000A                                DS      1       ; R2, Receive Counter
000B                TX_COUNT:       DS      1       ; R3, Transmit Counter
000C                                DS      1       ; R4, Not used
000D                                DS      1       ; R5, Not used
000E                                DS      1       ; R6, Not used
000F                                DS      1       ; R7, Not used

                    ;  Register Bank 2 overlays Memory Locations 10H-17H (16-23)
                    ;  Register Bank 2 used for ISR_CLK interrupt space
                    ; (RB2)

0010                        ORG     10h
                    ;               EQU     R0      ; Not used
REG                 PTR21           EQU     R1      ; Used for all MOVX operations & all MACROS
                    ;               EQU     R2      ; Not used
                    ;               EQU     R3      ; Not used
                    ;               EQU     R4      ; Not used
                    ;               EQU     R5      ; Not used
                    ;               EQU     R6      ; Not used
                    ;               EQU     R7      ; Not used

0010                                DS      1       ; R0, Not used
0011                                DS      1       ; R1, Used for all MOVX operations & all MACR
```

```
0012                 DS      1        ; R2, Not used
0013                 DS      1        ; R3, Not used
0014                 DS      1        ; R4, Not used
0015                 DS      1        ; R5, Not used
0016                 DS      1        ; R6, Not used
0017                 DS      1        ; R7, Not used

      ;  Register Bank 3 overlays Memory Locations 18H-1FH (24-31)
      ;  Register Bank 3 used for ISR_ICC interrupt space
      ; (RB3)

0018          ORG    18h
  REG PTR30          EQU     R0       ; Used for IRC pointer
  REG PTR31          EQU     R1       ; Used for all MOVX operations & all MACROS
  REG REC_CONT       EQU     R2       ; Used in Reciver to count
  REG RST_CONT       EQU     R3       ; Used in syn to count data
      ;              EQU     R4       ; Not used
      ;              EQU     R5       ; Not used
      ;              EQU     R6       ; Not used
      ;              EQU     R7       ; Not used

0018  PT30:          DS      1        ; R0, Used for IRC pointer
0019  PT31:          DS      1        ; R1, Used for all MOVX operations & all MACR
001A                 DS      1        ; R2, Used in reciver to count bytes
001B  ST_CONT:       DS      1        ; R3, Used in syn to count data
001C  ST_PTR:        DS      1        ; R4, Used in SYN to hold data Pointer
001D                 DS      1        ; R5 Not used
001E                 DS      1        ; R6 Not used
001F                 DS      1        ; R7 Not used

      ;---------------------------------------------------------------------
      ; Bit addressable memory overlays data memory locations 20H-2FH (32-47)
      ;---------------------------------------------------------------------
      ; This BIT area is for BIT'S that do not need to fit in Bytes

----                 BSEG

0000  ST_INPROG:     DBIT    1        ; Shows Syn tranisfor in progress
0001  ST_REC:        DBIT    1        ; Shows Syn tranisfor in recive mode
0002  ST_WT_RD:      DBIT    1        ; Shows Syn in Wright then Read
0003  ST_DPTR:       DBIT    1        ; Shows Syn Using DPRT
0004  INIT_SICOFI:   DBIT    1        ; Shows that the sicofi needs init at main
0005  POWER_UP:      DBIT    1        ; Shows the power state
0006  SHORT_OFF:     DBIT    1        ; Shows the power state
0007  IECQ_HOLD:     DBIT    1        ; Shows the IECQ in reset hold
0008  RX_READY:      DBIT    1        ; Showes that data is reaDY IN THE RECIVER BU
0009  STATUS_DUE:    DBIT    1        ; Shows that we need to send status
000A  POWER_UP_DUE:  DBIT    1        ; Shows that a power up repley is needed
000B  MODEL_DUE:     DBIT    1        ; Shows that model data is to be sent
000C  COEF_DUE:      DBIT    1        ; Shows that when ready coefficent repley is
ired
000D  TEST_DUE:      DBIT    1        ; Shows that test data is ready to send
000E  TX_BUF_ACTIV:  DBIT    1        ; Shows that the tx buffer can be used

0002  BIT_SIZE       EQU     ($/8)+1


      ;---------------------------------------------------------------------
```

```
                  ; This part of the BIT MAP is used for Byte orentated BIT,s

                                     DSEG
----                                 DS      BIT_SIZE        ; Leave room for free bits
0020
0022              ISTA_COPY:         DS      1          ; Copy of ICC ISTA destructive read register
                                     ; Usage of bits in ISTA_COPY
  0017            RME                BIT     ISTA_COPY.7 ; Reciver message end
  0016            RPF                BIT     ISTA_COPY.6 ; Reciver pool full
  0015            RSC                BIT     ISTA_COPY.5 ; Reciver status change
  0014            XPR                BIT     ISTA_COPY.4 ; Transmiter pool ready
  0013            TIM                BIT     ISTA_COPY.3 ; Timer Interrupt
  0012            CIC                BIT     ISTA_COPY.2 ; C/I Channel change
  0011            SIN                BIT     ISTA_COPY.1 ; Synchrous Transion Interrupt
  0010            EXI                BIT     ISTA_COPY.0 ; Extended Interrupt


0023              EXIR_COPY:         DS      1          ; Copy of ICC EXI reg
                                     ; Usage of bits in EXIR_COPY
  001F            XMR                BIT     EXIR_COPY.7 ; Transmiter repeat
  001E            XDU                BIT     EXIR_COPY.6 ; Transmiter data underrun
  001D            PCE                BIT     EXIR_COPY.5 ; Protocal error
  001C            RFO                BIT     EXIR_COPY.4 ; Reciver fram overflow
  001B            SOV                BIT     EXIR_COPY.3 ; Synchrorous overflow
  001A            MOS                BIT     EXIR_COPY.2 ; Moniter status change
  0019            SAW                BIT     EXIR_COPY.1 ; Subcriber awake
  0018            WOV                BIT     EXIR_COPY.0 ; Watchdog timer overflow


0024              SSCR_COPY:                 DS      1
                  ; The SSCR gets information on SICOFI peripherals (e.g. the SLIC)
                  ; from the 4th (Signaling) byte in the Serial Interface Port (SIP) stream

                          ; Usage of SSCR_COPY
                          ;                     bit 7 ;     Line B, Not Used, always set to 0
                          ;                         6 ; SI3 Line B, Not Used, always set to 1
  0025            LINE_TEST_REQ_B BIT  SSCR_COPY.5 ; SI2 Line B Pair Gain Test: 1=Test requeste
  0024            LINE_B_RING_REQ BIT  SSCR_COPY.4 ; SI1 Line B Ring Detect: 0=Ring request
                          ;                         3 ;     Line A, Not Used, always set to 0
                          ;                         2 ; S13 Line A, Not Used, always set to 1
  0021            LINE_TEST_REQ_A BIT  SSCR_COPY.1 ; SI2 Line A Pair Gain Test: 1=Test requeste
  0020            LINE_A_RING_REQ BIT  SSCR_COPY.0 ; SI1 Line A Ring Detect: 0=Ring request


0025              SSCX_DATA:         DS      1          ; Copy of ICC SSCX write-only register
                  ; The SSCX puts commands for SICOFI peripherals (e.g. the SLIC)
                  ; on the 4th (Signaling) byte in the Serial Interface Port (SIP) stream

                                     ; Usage of bits in SSCX_DATA
  002F            TEST_DSL           BIT   SSCX_DATA.7  ; SBB Reroute U link to SC:  0=Test Relay
  002E            TEST_LINE_B        BIT   SSCX_DATA.6  ; SO3 Test Line B:  0 = line input from SC
  002D            ALARM_RELAY_B      BIT   SSCX_DATA.5  ; SO2 AUX relay B:  1 = Sound alarm
  002C            SEIZE_LINE_B       BIT   SSCX_DATA.4  ; SO1 Line B Hold:  0 = Seize Line
                  ;                  BIT   SSCX_DATA.3  ; SBA Not Connected
  002A            TEST_LINE_A        BIT   SSCX_DATA.2  ; SO3 Test Line A:  0 = line input from SC
  0029            ALARM_RELAY_A      BIT   SSCX_DATA.1  ; SO2 AUX relay A:  1 = Sound alarm
  0028            SEIZE_LINE_A       BIT   SSCX_DATA.0  ; SO1 Line A Hold:  0 = Seize Line
```

```
00FF         SSCX_INIT       EQU    11111111b       ; Initial value

0026         STAT_IN:        DS     1       ; Status from RT, full byte from link

                             ; Usage of bits in STAT_IN
0030         LINE_A_ON       BIT    STAT_IN.0 ; Phone Line A    : 1=on hook,       0=off
0031         LINE_B_ON       BIT    STAT_IN.1 ; Phone Line B    : 1=on hook,       0=off
0032         AUX_A_IDLE      BIT    STAT_IN.2 ; Auxarily A      : 1=idel,          0=act
0033         AUX_B_IDLE      BIT    STAT_IN.3 ; Auxarily B      : 1=idel,          0=act
0034         TAMPER_IDLE     BIT    STAT_IN.4 ; Door closed     : 1=closed, 0=open

00FF         STAT_IN_INIT    EQU    011111111b

0027         TEST_IN:        DS     1       ; Test state from RT, full byte from link

                             ; Usage of bits in TEST_IN
0038         TEST_SET_A      BIT    TEST_IN.0       ; Test state from RT    : 1=Test
0039         TEST_SET_B      BIT    TEST_IN.1       ; Test state from RT    : 1=Test
003A         ABS_TERM_SET    BIT    TEST_IN.2       ; 600 ohm term from RT  : 1=set
003B         REF_TERM_SET    BIT    TEST_IN.3       ; Reflect term from RT  : 1=set
003C         RING_DET_SET    BIT    TEST_IN.4       ; Test ON HOOK from RT  : 1=ON


0028         MESG_IN:        DS     1       ; Mesage content of next two bytes from link

                             ; Usage of bits in MESG_IN
0040         MESG_IN_B1      BIT    MESG_IN.0       ; Message data out added byte 1
0041         COEF_IN_B1      BIT    MESG_IN.1       ; Coefenetent data out added byte 1
0042         MODL_IN_B1      BIT    MESG_IN.2       ; Model data out added byte 1
0043         MESG_IN_B2      BIT    MESG_IN.3       ; Message data out added byte 2
0044         COEF_IN_B2      BIT    MESG_IN.4       ; Coefenetent data out added byte 2
0045         MODL_IN_B2      BIT    MESG_IN.5       ; Model data out added byte 2

0029         STAT_OUT:       DS     1       ; Status to RT, full byte to link

                             ; Usage of bits in STAT_OUT
0048         RING_REQ_A      BIT    STAT_OUT.0 ; Phone Line A    : 0=Ring,   1=Not in Use
0049         RING_REQ_B      BIT    STAT_OUT.1 ; Phone Line B    : 0=Ring,   1=Not in Use

00FF         STAT_OUT_INIT   EQU    011111111B      ; To set at start

002A         TEST_OUT:       DS     1       ; Test request to RT, full byte to link

                             ; Usage of bits in TEST_OUT
0050         RT_TEST_REQ_A   BIT    TEST_OUT.0      ; Test req from LC      : 1=Test
0051         RT_TEST_REQ_B   BIT    TEST_OUT.1      ; Test req from LC      : 1=Test
0052         ABS_TERM_REQ    BIT    TEST_OUT.2      ; Request to set 600 ohm term
0053         REF_TERM_REQ    BIT    TEST_OUT.3      ; Request to set reflect term
0054         ON_HOOK_REQ     BIT    TEST_OUT.4      ; Request to go on hook in test
0055         LC_TEST_REQ_A   BIT    TEST_OUT.5      ; Request to test line A at LC
0056         LC_TEST_REQ_B   BIT    TEST_OUT.6      ; Request to test line B at LC
0057         LC_DSL_TEST_REQ BIT    TEST_OUT.7      ; Request to test the DSL

0000         TEST_OUT_INIT   EQU    000000000b      ; To set at start
```

```
002B        MESG_OUT:          DS      1          ; Mesage content of next two bytes

                               ; Usage of bits in MESG_OUT
 0058       MESG_OUT_B1        BIT     MESG_OUT.0         ; Message data in added byte 1
 0059       COEF_OUT_B1        BIT     MESG_OUT.1         ; Coefenetent data in added byte 1
 005A       MODL_OUT_B1        BIT     MESG_OUT.2         ; Model data in added byte 1
 005B       MESG_OUT_B2        BIT     MESG_OUT.3         ; Message data in added byte 2
 005C       COEF_OUT_B2        BIT     MESG_OUT.4         ; Coefenetent data in added byte 2
 005D       MODL_OUT_B2        BIT     MESG_OUT.5         ; Model data in added byte 2

 0000       MESG_OUT_INIT      EQU     000000000b

002C        SC_STAT:           DS      1          ; Status from RT, full byte from link

                               ; Usage of bits in SC_STAT
 0060       LINE_A_ACT         BIT     SC_STAT.0 ; Phone Line A    : 1=on hook,       0=off
 0061       LINE_B_ACT         BIT     SC_STAT.1 ; Phone Line B    : 1=on hook,       0=off
 0062       AUX_A_ACT          BIT     SC_STAT.2 ; Auxarily A      : 1=idel,          0=act
 0063       AUX_B_ACT          BIT     SC_STAT.3 ; Auxarily B      : 1=idel,          0=act
 0064       TAMPER_ACT         BIT     SC_STAT.4 ; Door closed     : 1=closed, 0=open
 0065       LINK_UP            BIT     SC_STAT.5 ; Shows the Link up  1=up
 0066       TEST_IN_PROG       BIT     SC_STAT.6 ; Shows the test in progress  0= act

 00DF       SC_STAT_INIT       EQU     011011111b

002D        P2_COPY:           DS      1          ; Data for port two

 0068       LED_MINOR          BIT     P2_copy.0          ; /MINOR LED
 0069       LED_DSL            BIT     P2_copy.1          ; /DSL LED
 006A       LED_TEST           BIT     P2_copy.2          ; /TEST LED
 006B       LED_TAMPER         BIT     P2_copy.3          ; /TAMPER LED
 006C       LED_LINE_A         BIT     P2_copy.4          ; /LINE A LED
 006D       LED_LINE_B         BIT     P2_copy.5          ; /LINE B LED
 006E       LED_AUX_A          BIT     P2_copy.6          ; /AUX A LED
 006F       LED_AUX_B          BIT     P2_copy.7          ; /AUX B LED

 00FF       P2_COPY_INIT       EQU     11111111B

            ;-----------------------------------------------------------------------
            ; Start of general data memery

002E        PASS_LOW:          DS      1          ; Conter for ISR_CK passes
002F        PASS_HIGH:         DS      1
0030        RX_MISED:          DS      1          ; Conter for missed reciver message on link
0031        TX_MISED:          DS      1          ; conter for missed transmite message on link
0032        ERROR_CNT:         DS      1          ; All error count

0033        ALARM_CKLOW:       DS      1          ; Clock for ALARM flash control
0034        POW_LED_CKLOW:     DS      1          ; Clock for power flash control

0035        POWER_STATE:       DS      1
0036        POWER_CKLOW:       DS      1          ; Clock for power control
0037        POWER_CKHIGH:      DS      1

0038        MREC_ERROR:        DS      1          ; RECIVED MESSAGES THAT I CAN NOT HANDEL
0039        BOARD_ID:          DS      1          ; Boadr slot address
003A        TEST_REQ_COPY:     DS      1          ; Used to see test req changes
```

```
003B              TEST_IN_COPY:   DS       1        ; Used to see test in changes

                  ; ds_end

003C              DATA_1:         DS       1        ; Temp* DATA store
003D              DATA_2:         DS       1

003E              MORO_copy5:     DS       1
003F              MORO_copy4:     DS       1
0040              MORO_copy3:     DS       1
0041              MORO_copy2:     DS       1
0042              MORO_copy1:     DS       1
0043              MORO_copy0:     DS       1
0044              RX_ERROR:       DS       1        ; TEMP* ERROR
                  ;------------------------------------------------------------------
                  ; Stack and Buffer Space

                  ;  Remainder of data memory, 30h-7Fh (48-127), for general use and stack

0045              STACK:          DS       127-$    ; Stack grows upward from here

----                              ISEG     AT       80h
0080              TX_BUFF:        DS       20h      ; 32 Byte Transmit Buffer
00A0              RX_BUFF:        DS       20h      ; 32 Byte Receive Buffer


                  ;------------------------------------------------------------------

                  ; ICC  PBE 2070 regester definations

              +1  $INCLUDE(ICCDATA.INC)
           =1     ;------------------------------------------------------------------
           =1
           =1     ; Register Definitions for
           =1     ; ICC  PEB 2070 ISDN Communications Controller
           =1
           =1     ; Interrupt/Status registers
           =1
 0020      =1     ISTA    XDATA   020h            ;interrupt status reg read, at reset = 00h
           =1
 0020      =1     MASK    XDATA   020h            ;interrupt mask reg write, at reset = 00h
           =1     ; The ISTA and MASK bits have the following meaning
           =1             ;       *--------RME receive message end
           =1             ;       |*-------RPF receive pool full
           =1             ;       ||*------RSC receive status change
           =1             ;       |||*-----XPR transmit pool ready
           =1             ;       ||||*----TIM timer interrupt
           =1             ;       |||||*---CIC C/I code change
           =1             ;       ||||||*--SIN synchronous transfer
           =1             ;       |||||||*-EXI extended interrupt
           =1             ;       ||||||||
 0078      =1     MASKD   EQU     01111000b       ; =1 to mask off corresponding interrupt
           =1
 0024      =1     EXIR    XDATA   024h            ;extended interrupt reg read, at reset = 00h
           =1     ; The EXIR has the following meaning
           =1             ;       *--------XMR transmit message repeat
           =1             ;       |*-------XUD transmit data underrun
           =1             ;       ||*------PCE protocol error
           =1             ;       |||*-----RFO receive frame oveflow
```

```
            =1   566             ;      |||||*----SOV synchronous transfer overflow
            =1   567             ;      ||||||*---MOS monitor status
            =1   568             ;      |||||||*--SAW subscriber awake
            =1   569             ;      ||||||||*-WOV watchdog timer overflow
            =1   570             ;      |||||||||
            =1   571             ;      XXXXXXXXb
            =1   572
0021        =1   573     STAR     XDATA    021h            ;status reg read, reset = 48h
            =1   574     ;the STAR has the following meaning
            =1   575             ;      *--------XDOV transmit data overflow
            =1   576             ;      |*-------XFW transmit FIFO write enable
            =1   577             ;      ||*------XRNR transmit RNR
            =1   578             ;      |||*-----RRNR receive RNR
            =1   579             ;      ||||*----MBR message buffer ready
            =1   580             ;      |||||*---MAC1 monitor ch 1 active
            =1   581             ;      ||||||*--BVS B ch valid on sip
            =1   582             ;      |||||||*-MAC0 monitor ch 0 active
            =1   583             ;      ||||||||
            =1   584             ;      XXXXXXXXb
            =1   585 +1  $eject
            =1   586             ;HDLC/LAPD operation control
            =1   587
0021        =1   588     CMDR     XDATA    021h            ;command reg write, reset = 00h
            =1   589     ;the CMDR has the following meaning
            =1   590             ;      *--------RMC receive message complete
            =1   591             ;      |*-------RRES recevier reset
            =1   592             ;      ||*------RNR receive not ready
            =1   593             ;      |||*-----STI start timer
            =1   594             ;      ||||*----XTF transmit transparent frame
            =1   595             ;      |||||*---XIF transmit I-frame
            =1   596             ;      ||||||*--XME transmit message end
            =1   597             ;      |||||||*-XRES transmit reset
            =1   598             ;      ||||||||
0080        =1   599     CMDRMC   EQU      10000000b
0040        =1   600     CMDRRES  EQU      01000000b
0001        =1   601     CMDXRES  EQU      00000001b
000A        =1   602     CMDXTF   EQU      00001010b
0041        =1   603     CMDRCL   EQU      01000001b
            =1   604
0022        =1   605     MODE     XDATA    022h            ;mode reg read/write, reset 00h
            =1   606     ;the MODE has the following meaning
            =1   607             ;      ***------MDS HDLC mode select, 110=Transparent Mode 2
            =1   608             ;      |||*-----TMD timer mode
            =1   609             ;      ||||*----RAC receiver active
            =1   610             ;      |||||***-DIM digital interface mode
            =1   611             ;      ||||||||
00CA        =1   612     MODED    EQU      11001010b
            =1   613
0023        =1   614     TIMR     XDATA    023h            ;timer reg read/write, reset undefined
            =1   615     ;the TIMR has the following meaning
            =1   616             ;      ***------cnt timer count
            =1   617             ;      |||*****-value setting of timer
            =1   618             ;      ||||||||
00CC        =1   619     TIMRD    EQU      11001100b
            =1   620
0025        =1   621     RBCL     XDATA    025h            ;receive frame buffer count read. reset 00h
            =1   622     ;the RFBC has the length of the receive message
            =1   623
002A        =1   624     RBCH     XDATA    02Ah            ;receive frame count high read, reset 00h
```

```
         =1   ;the RBCH has the following meaning
         =1            ;        ***------VN2-0 version number of chip
         =1            ;        |||*-----OV overflow
         =1            ;        ||||****-RBCH high part of receive count
         =1            ;        ||||||||
         =1   ;        EQU      00000000b
         =1
0027     =1   RSTA     XDATA    027h            ;receive status reg read, reset undefined
         =1   ;the RSTA has the following meaning
         =1            ;        *--------RDA receive data
         =1            ;        |*-------RDO recevie data overflow
         =1            ;        ||*------CRC Cyclic Redundancy Count check
         =1            ;        |||*-----RAB receive message aborted
         =1            ;        ||||**---SA1-0 SAPI address id
         =1            ;        ||||||*--C/R command/response
         =1            ;        |||||||*-TA TEI address id
         =1            ;        ||||||||
         =1   ;        EQU      00000000b
         =1
         =1            ;HDLC address variables
         =1
0024     =1   XAD1     XDATA    024h            ;transmit address 1 reg write
         =1   ;use in auto mode
         =1
0025     =1   XAD2     XDATA    025h            ;transmit address 2 reg write
         =1   ;use in auto mode
         =1
0026     =1   SAP1     XDATA    026h            ;sapi reg write
         =1   ;used in auto mode has the following meaning
         =1            ;        ******---SAPI1 first service access point identifier
         =1            ;        ||||||*--CRI command/response ind
         =1            ;        |||||||*-0
         =1            ;        ||||||||
         =1
0027     =1   SAP2     XDATA    027h            ;sapi reg write
         =1   ;used in auto mode has the following meaning
         =1            ;        ******---SAPI2 second service access point identifier
         =1            ;        ||||||*--MCS modulo count selsct
         =1            ;        |||||||*-0
         =1            ;        ||||||||
         =1
0028     =1   TEI1     XDATA    028h            ;tei reg write
         =1   ;used in auto mode has the following meaning
         =1            ;        *******--TEI1
         =1            ;        |||||||*-EA adress field extension
         =1            ;        ||||||||
00FF     =1   TEI1D    EQU      0FFh
         =1
0029     =1   TEI2     XDATA    029h            ;tei reg write
         =1   ;used in auto mode has the following meaning
         =1            ;        *******--TEI2
         =1            ;        |||||||*-EA adress field extension
         =1            ;        ||||||||
00FF     =1   TEI2D    EQU      0FFh
         =1
0026     =1   SAPR     XDATA    026h            ;SAPI reg read
         =1   ;used in transparent mode
         =1
         =1            ; HDLC control data
```

```
0029    =1   RHCR    XDATA   029h            ;receive HDLC control read
        =1   ;the data depends on mode, see manual
        =1
        =1           ; HDLC information data
        =1
0000    =1   RFIFO   XDATA   000h            ;receive  data 32 bytes read
0000    =1   XFIFO   XDATA   000h            ;transmit data 32 byte write
        =1
0030    =1   SPCR    XDATA   030h            ;serial port control reg read/write, reset =
        =1   ;the SPCR has the following meaning
        =1           ;       *--------SPU software power up
        =1           ;       |*-------SAC SIP port active
        =1           ;       ||*------SPM serial port timing
        =1           ;       |||*-----TLP test loop
        =1           ;       ||||**---C1C1-0 channel 2 connect
        =1           ;       ||||||**-C2C1-0 channel 2 connect
        =1           ;       ||||||||
0080    =1   SPCRD1  EQU     10000000b
0045    =1   SPCRD2  EQU     01000101b
        =1
        =1
0031    =1   CIR0    XDATA   031h            ;command/indication receive 0 reg
        =1                                   ;read, reset 7Ch
        =1   ;the CIR0 has the following meaning
        =1           ;       *--------0
        =1           ;       |*-------BAS bus access status
        =1           ;       ||****---CODR0 receive C/I channel 0
        =1           ;       ||||||*--CIC0 C/I code change channel 0
        =1           ;       |||||||*-CIC1 C/I code change channel 1
        =1           ;       ||||||||
        =1   ;       EQU     00000000b
        =1
00C3    =1   CIR0_MASK       EQU     011000011b      ; To mask off the C/I data
        =1
0031    =1   CIX0    XDATA   031h            ;command/indication transmit 0 reg
        =1                                   ;write, reset BFh
        =1   ;the CIX0 has the following meaning
        =1           ;       *--------RSS reset source select
        =1           ;       |*-------BAC bus access control
        =1           ;       ||****---CODX0 C/I transmit channel 0
        =1           ;       ||||||*--TCX T channel output
        =1           ;       |||||||*-ECX E channel output
        =1           ;       ||||||||
0047    =1   CIX0D   EQU     01000111b       ;RESet request
        =1
0032    =1   MOR0    XDATA   032h            ;monitor receive channel 0 read
        =1   ;the MOR0 has no specific data to set
        =1
0032    =1   MOX0    XDATA   032h            ;monitor transmit channel 0 write
0000    =1   MOX0D   EQU     00000000b
        =1
        =1
0033    =1   SSCR    XDATA   033h            ;SIP signalling code receiveed 1 reg
        =1                                   ;read register, at reset = FFh
        =1
0033    =1   SSCX    XDATA   033h            ;SIP signalling code transmit 1 reg
        =1                                   ;write register, at reset = FFh
        =1
0034    =1   MOR1    XDATA   034h            ;MOnitor Receive channel 1 read
```

```
0034  =1   MOX1    XDATA  034h           ;MOnitor transmit channel 1 write
      =1
0035  =1   C1R     XDATA  035h           ;channel 1 reg read/write
      =1
0036  =1   C2R     XDATA  036h           ;channel 2 reg read/write
      =1
0037  =1   B1CR    XDATA  037h           ;channel B1 reg read
      =1
0038  =1   B2CR    XDATA  038h           ;channel B2 reg read
      =1
0037  =1   STCR    XDATA  037h           ;synchronous transfer control reg write
      =1   ;the STCR has the following use
      =1           ;      *---------TSF terminal specific function
      =1           ;      |***------SBA2-0 tic bus address
      =1           ;      ||||*-----ST1 synchronous transfer 1
      =1           ;      |||||*----ST0 synchronous transfer 0
      =1           ;      ||||||*---SC1 synchronous transfer 1 completed
      =1           ;      |||||||*--SC0 synchronous transfer 0 completed
      =1           ;      ||||||||
0070  =1   ST_NOR  EQU    01110000b
0078  =1   ST_ST1  EQU    01111000b
0074  =1   ST_ST0  EQU    01110100b
007A  =1   ST_SC1  EQU    01111010b
0075  =1   ST_SC0  EQU    01110101b
      =1
      =1
0038  =1   ADF1    XDATA  038h           ;additional feature reg write, reset 00h
      =1   ;the ADF1 has the following use
      =1           ;      **--------WTC2-1 watchdog timer control
      =1           ;      ||*-------CI1E C/I channel interrupt enable
      =1           ;      |||*------IDC iom direction control
      =1           ;      ||||***---CSEL2-0 channel select
      =1           ;      |||||||*--ITF inter-frame time fill
      =1           ;      ||||||||
0000  =1   ADF1D   EQU    00000000b
      =1
0039  =1   ADF2    XDATA  039h           ;additional feature reg read/write, reset 00h
      =1   ;the ADF2 has the following use
      =1           ;      *---------IMS IOM mode selection
      =1           ;      |***------D2C0-2 data strobe polarity
      =1           ;      ||||*-----ODS output drive selection
      =1           ;      |||||***--D1C0-2 data strobe polarity
      =1           ;      ||||||||
0000  =1   ADF2D   EQU    00000000b
      =1
003A  =1   MOSR    XDATA  03Ah           ;monitor status reg read, reset 00h
      =1   ;the MOSR has the following use
      =1           ;      ********--this reg for IOM rev2 only
      =1           ;      ||||||||
0000  =1   MOSRD   EQU    00000000b
      =1
003A  =1   MOCR    XDATA  03Ah           ;monitor status reg wite, reset 00h
      =1   ;the MOCR has the following use
      =1           ;      ********--this reg for IOM rev2 only
      =1           ;      ||||||||
0000  =1   MOCRD   EQU    00000000b

           ;------------------------------------------------------------------
           ; Command/Indication (C/I) codes for
```

```
                ; IEC-Q  PEB 2091 ISDN Echocancellation Transceiver Circuit


                         ;Commands
0043            IECQ_TIM          EQU      01000011b        ;TIMIDLE
0043            IECQ_DRC          EQU      01000011b        ;Deactivation Request (deactivate lin
0047            IECQ_RES          EQU      01000111b        ;RESet request
0053            IECQ_RES1         EQU      01010011b        ;Secandery reset
0057            IECQ_SSP          EQU      01010111b        ;Send Single Pulses
0063            IECQ_ARC          EQU      01100011b        ;Activation Request no loop
006B            IECQ_ARL          EQU      01101011b        ;Activation Request Local loop
0073            IECQ_AIC          EQU      01110011b        ;Activation Indication Command
007F            IECQ_DCC          EQU      01111111b        ;Deactivation Confirmation
007C            IECQ_DIC          EQU      01111100b        ;Deactivation Indication Command

                         ;Responses
00C3            IECQ_DR           EQU      11000011b        ;Deactivation Request
00C7            IECQ_DEAC         EQU      11000111b        ;DEactivation ACcepted
00CB            IECQ_FJ           EQU      11001011b        ;Frame Jump
00D3            IECQ_RSY          EQU      11010011b        ;ReSYnchronisation indication
00D7            IECQ_EI2          EQU      11010111b        ;Error indication on the s/t
00D3            IECQ_EI1          EQU      11010011b        ;Error Indication on the U interface
00DF            IECQ_UAI          EQU      11011111b        ;U Activation Indication
00E3            IECQ_AR           EQU      11100011b        ;Activation Request indication
00E7            IECQ_ARM          EQU      11100111b        ;Activation Request Monitor bits
00EF            IECQ_EI3          EQU      11101111b        ;Error Indication 3
00F3            IECQ_AI           EQU      11110011b        ;Activation Indication
00F7            IECQ_LSL          EQU      11110111b        ;Activation Indication
00FB            IECQ_AIL          EQU      11111011b        ;Activation Indication Loop
00FF            IECQ_DI           EQU      11111111b        ;Deactivation Indication
00FF            IECQ_DC           EQU      11111111b        ;Deactivation Confirmation



                ;-----------------------------------------------------------------------
                ; Control codes for SICOFI  2260

                ; SICOFI PEB 2260 Signal OProcessing Codec Filter


----                      CSEG    AT 01E00h        ; Tables and constants located here

                SICOFI_OPS:
                          ;COPs - Coefficient Perations for LC  Line A
1E00 FF                   DB      0FFh,0FFh,0FFh,0FFh
1E01 FF
1E02 FF
1E03 FF
1E04 13                   DB      013h              ; Coefficients for Z filter
1E05 D0                   DB      0D0h,02Ch,09Fh,07Eh,0BAh,0A7h,0E1h,0BAh
1E06 2C
1E07 9F
1E08 7E
1E09 BA
1E0A A7
1E0B E1
1E0C BA
1E0D 23                   DB      023h              ; Coefficients for X filter
1E0E F0                   DB      0F0h,049h,097h,071h,012h,0B5h,001h,056h
1E0F 49
```

```
1E10 97
1E11 71
1E12 12
1E13 B5
1E14 01
1E15 56
1E16 30                 DB      030h            ; Gain for GX (2nd Pair of GR,GX)
1E17 20                 DB      020h,02Bh,080h,081h
1E18 2B
1E19 80
1E1A 81
1E1B 3A                 DB      03Ah            ; Gain for GR
1E1C B0                 DB      0B0h,0CAh
1E1D CA
1E1E 0B                 DB      00Bh            ; Coefficients for B2 filter
1E1F 00                 DB      000h,0A8h,00Bh,0B0h,008h,002h,014h,0C1h
1E20 A8
1E21 0B
1E22 B0
1E23 08
1E24 02
1E25 14
1E26 C1
1E27 03                 DB      003h            ; Coefficients for B1 fliter
1E28 81                 DB      081h,06Eh,052h,021h,0B1h,0B9h,032h,02Bh
1E29 6E
1E2A 52
1E2B 21
1E2C B1
1E2D B9
1E2E 32
1E2F 2B
1E30 18                 DB      018h            ; Coefficients for B filter delay
1E31 19                 DB      019h,019h,011h,019h
1E32 19
1E33 11
1E34 19
             NO_TONE_A:         ;Reset the R filter after the test tone 333.3hz
1E35 FF                 DB      0FFh,0FFh,0FFh,0FFh
1E36 FF
1E37 FF
1E38 FF
1E39 2B                 DB      02Bh            ; Coefficients for R filter
1E3A 60                 DB      060h,0BBh,0A7h,05Fh,03Bh,0D5h,00Bh,03Ch
1E3B BB
1E3C A7
1E3D 5F
1E3E 3B
1E3F D5
1E40 0B
1E41 3C

                ;SOPs - Status OPerations (LC)
                                        ; Setup for SICOFI for Line A
1E42 25                 DB      00100101b       ; SOP set up
1E43 00                 DB      00000000b       ; CR3 set up, No swap, Hipass on, Analog on,
                                                ; Signaling on, No analog or digital loopback
1E44 00                 DB      00000000b       ; CR2 set up, No amplification, No tones
1E45 FF                 DB      11111111b       ; CR1 set up, All filters on, SB output, u-La
```

```
                    ;COPs - Coefficient OPerations for Master (LC end Line B)
1E46 FF             DB      0FFh,0FFh,0FFh,0FFh
1E47 FF
1E48 FF
1E49 FF
1E4A 93             DB      093h            ; Coefficients for Z filter
1E4B D0             DB      0D0h,02Ch,09Fh,07Eh,0BAh,0A7h,0E1h,0BAh
1E4C 2C
1E4D 9F
1E4E 7E
1E4F BA
1E50 A7
1E51 E1
1E52 BA
1E53 A3             DB      0A3h            ; Coefficients for X filter
1E54 F0             DB      0F0h,049h,097h,071h,012h,0B5h,001h,056h
1E55 49
1E56 97
1E57 71
1E58 12
1E59 B5
1E5A 01
1E5B 56
1E5C B0             DB      0B0h            ; Gain for GX (2nd Pair of GR,GX)
1E5D 20             DB      020h,02Bh,080h,081h
1E5E 2B
1E5F 80
1E60 81
1E61 BA             DB      0BAh            ; Gain for GR
1E62 B0             DB      0B0h,0CAh
1E63 CA
1E64 8B             DB      08Bh            ; Coefficients for B2 filter
1E65 00             DB      000h,0A8h,00Bh,0B0h,008h,002h,014h,0C1h
1E66 A8
1E67 0B
1E68 B0
1E69 08
1E6A 02
1E6B 14
1E6C C1
1E6D 83             DB      083h            ; Coefficients for B1 fliter
1E6E 81             DB      081h,06Eh,052h,021h,0B1h,0B9h,032h,02Bh
1E6F 6E
1E70 52
1E71 21
1E72 B1
1E73 B9
1E74 32
1E75 2B
1E76 98             DB      098h            ; Coefficients for B filter delay
1E77 19             DB      019h,019h,011h,019h
1E78 19
1E79 11
1E7A 19
          NO_TONE_B:        ;Reset the R filter after the test tone 333.3hz
1E7B FF             DB      0FFh,0FFh,0FFh,0FFh
1E7C FF
1E7D FF
1E7E FF
```

```
1E7F AB                          DB      0ABh              ; Coefficients for R filter
1E80 60                          DB      060h,0BBh,0A7h,05Fh,03Bh,0D5h,00Bh,03Ch
1E81 BB
1E82 A7
1E83 5F
1E84 3B
1E85 D5
1E86 0B
1E87 3C

                                 ;SOPs - Status OPerations (LC)
                                                           ; Setup for SICOFI for Line B
1E88 A5                          DB      10100101b         ; SOP set up
1E89 00                          DB      00000000b         ; CR3 set up, No swap, Hipass on, Analog on,
                                                           ; Signaling on, No analog or digital loopback
1E8A 00                          DB      00000000b         ; CR2 set up, No amplification, No tones
1E8B FF                          DB      11111111b         ; CR1 set up, All filters on, SB output, u-La

  008C            SICOFI_OPS_LEN EQU $-SICOFI_OPS

                  DO_TONE_A:             ;Reset the R filter after the test tone 333.3hz
1E8C FF                          DB      0FFh,0FFh,0FFh,0FFh
1E8D FF
1E8E FF
1E8F FF
1E90 2B                          DB      02Bh              ; Coefficients for R filter
1E91 F2                          DB      0F2h,022h,023h,0F0h,0F8h,0F8h,0F1h,032h
1E92 22
1E93 23
1E94 F0
1E95 F8
1E96 F8
1E97 F1
1E98 32

                                 ;SOPs - Status OPerations (LC)
                                                           ; Setup for SICOFI for Line A
1E99 25                          DB      00100101b         ; SOP set up
1E9A 00                          DB      00000000b         ; CR3 set up, No swap, Hipass on, Analog on,
                                                           ; Signaling on, No analog or digital loopback
1E9B 04                          DB      00000100b         ; CR2 set up, No amplification, Tone Gen. 1 O
1E9C FF                          DB      11111111b         ; CR1 set up, All filters on, SB output, u-La

                  DO_TONE_B:             ;Reset the R filter after the test tone 333.3hz
1E9D FF                          DB      0FFh,0FFh,0FFh,0FFh
1E9E FF
1E9F FF
1EA0 FF
1EA1 AB                          DB      0ABh              ; Coefficients for R filter
1EA2 F2                          DB      0F2h,022h,023h,0F0h,0F8h,0F8h,0F1h,032h
1EA3 22
1EA4 23
1EA5 F0
1EA6 F8
1EA7 F8
1EA8 F1
1EA9 32

                                 ;SOPs - Status OPerations (LC)
```

```
                                             ; Setup for SICOFI for Line B
1EAA A5                  DB     10100101b    ; SOP set up
1EAB 00                  DB     00000000b    ; CR3 set up, No swap, Hipass on, Analog on,
                                             ; Signaling on, No analog or digital loopback
1EAC 04                  DB     00000100b    ; CR2 set up, No amplification, Tone Gen. 1 O
1EAD FF                  DB     11111111b    ; CR1 set up, All filters on, SB output, u-La

 0011            TONE_LEN       EQU $-DO_TONE_B

                 ;----------------------------------------------------------------
                 ; Definition of system messages
            +1   $INCLUDE       (MESSAGES.h)
          =1     ;Messages.h
          =1     ; NOTE: If this file is modified the JUMP_TABLE in MUX.ASM must be reconfigur
          =1
          =1     ; All SC & RT types (Messages, Requests, & Commands) must be >= 80h (Bit 7=1)
          =1     ; All incoming types MC to SC, SC to LC, LC to RT (Requests & Commands)
          =1     ; must be odd (Bit 0=1).  This is followed by the matching response message
          =1     ; type, if any, which would be even (Bit 0=0).
          =1
 0081     =1     SC_STAT_REQ    EQU    81h    ; Shelf Status Request
 0082     =1     SC_STAT_MSG    EQU    82h    ; Shelf Status Message
 0083     =1     SC_MODEL_REQ   EQU    83h    ; Shelf Model Request
 0084     =1     SC_MODEL_MSG   EQU    84h    ; Shelf Model Message
 0085     =1     SC_TEST_REQ    EQU    85h    ; Shelf Test Request
 0086     =1     SC_TEST_MSG    EQU    86h    ; Shelf Test Message
          =1
 0001     =1     LC_STAT_REQ    EQU    1      ; LC Status Request
 0002     =1     LC_STAT_MSG    EQU    2      ; LC Status Message
 0003     =1     LC_POWER_ACK   EQU    3      ; LC Power Acknowledgement
 0004     =1     LC_POWER_UP    EQU    4      ; LC Power Up Message
 0005     =1     LC_MODEL_REQ   EQU    5      ; LC Model Request
 0006     =1     LC_MODEL_MSG   EQU    6      ; LC Model Message
 0007     =1     LC_ERROR_REQ   EQU    7      ; LC Error Request
 0008     =1     LC_ERROR_MSG   EQU    8      ; LC Error Message
 0009     =1     LC_COEF_REQ    EQU    9      ; LC 2260 Coefficient Request
 000A     =1     LC_COEF_MSG    EQU    10     ; LC 2260 Coefficient Message
 000B     =1     LC_TEST_REQ    EQU    11     ; LC Test Request
 000C     =1     LC_TEST_MSG    EQU    12     ; LC Test Message
 000D     =1     MC_TEST_REQ    EQU    13     ; LC test req to MC
          =1
 0081     =1     MC_MESSAGE     EQU    81h    ; Maintenance Message from MC
 0082     =1     RT_MESSAGE     EQU    82h    ; Maintenance Message from RT
 0083     =1     RT_MODEL_REQ   EQU    83h    ; RT Model Request
 0084     =1     RT_MODEL_MSG   EQU    84h    ; RT Model Message
 0085     =1     RT_COEF_REQ    EQU    85h    ; RT 2260 Coefficient Request
 0086     =1     RT_COEF_MSG    EQU    86h    ; RT 2260 Coefficient Message

            +1   $eject
                 ;----------------------------------------------------------------------
                 ; RESET and INTERRUPT vector area

----                      CSEG     AT    00H

0000                      ORG      RESET             ; Power Up - Reset vector
0000 020199               JMP      INIT              ; jumps to initialization routine

0003                      ORG      EXTI0             ; IE0 - External Interrupt 0 vector
0003 02028A               JMP      ISR_ICC           ; For use by ICC  PEB 2070
```

```
000B                          ORG     TIMER0             ; TF0 - Timer/Counter 0 overflow vector
000B 0203B6                   JMP     ISR_CLK

0013                          ORG     EXTI1              ; IE1 - External Interrupt 1 vector
0013 020026                   JMP     TRAP

001B                          ORG     TIMER1             ; TF1 - Timer/Counter 1 overflow vector
001B 020026                   JMP     TRAP

0023                          ORG     SINT               ; TI/RI - Serial Port Transmit/Receive vector
0023 020576                   JMP     ISR_SERIAL

                     TRAP:    ;Trap unwanted interrupt
0026 0532                     INC     ERROR_CNT          ; Show error
0028 32                       RETI

                     ;---------------------------------------------------------------------
                     ; Main rutine for the system we come hear after INIT

                     ; This is the main loop where back ground work is done
                     ;---------------------------------------------------------------------
                     ; Rutine to load sicofi

                     MAIN:
0029 300415                   JNB     INIT_SICOFI,INIT_SI_END
002C D203                     SETB    ST_DPTR
002E D200                     SETB    ST_INPROG
0030 C201                     CLR     ST_REC
0032 C202                     CLR     ST_WT_RD
0034 901E00                   MOV     DPTR,#SICOFI_OPS         ; Point to sicofi data
0037 751B8C                   MOV     ST_CONT,#SICOFI_OPS_LEN
003A 7937          +2         MOV     R1,#STCR
003C 7474          +2         MOV     A,#ST_STO
003E F3            +1         MOVX    @R1,A              ; Start SYN interrupt
003F C204                     CLR     INIT_SICOFI
                     INIT_SI_END:
                              ; Go to next task

                     ;---------------------------------------------------------------------
                     ; The reciver section of main for messages from the shelf

                     MAIN_REC:
0041 200809                   JB      RX_READY,MREC_10         ; we hve a message go process
0044 0E                       INC     MISSED_REC
0045 EE                       MOV     A,MISSED_REC
0046 24C4                     ADD     A,#-60                   ; Have missed to many
0048 5057                     JNC     MREC_END
                              ; Add reset hear
004A 0200A1                   JMP     MREC_END

                     MREC_10:
004D 7E00                     MOV     MISSED_REC,#0H           ; Clear the recet
                              ;CALL   CRC_CHECK
                              ;JZ     MREC_END                 ; The CRC was bad
004F 78A2                     MOV     PTR0O,#RX_BUFF+2                ; Point to
0051 E6                       MOV     A,@PTR0O

                                      ; Do we have a status req
```

```
0052 B40105          CJNE    A,#LC_STAT_REQ,MREC_20
0055 D209            SETB    STATUS_DUE
0057 0200A1          JMP     MREC_END

             MREC_20:        ; Do we have a power up ack
005A B40305          CJNE    A,#LC_POWER_ACK,MREC_30
005D C20A            CLR     POWER_UP_DUE
005F 0200A1          JMP     MREC_END

             MREC_30:        ; Do we have a model req
0062 B40505          CJNE    A,#LC_MODEL_REQ,MREC_40
0065 D20B            SETB    MODEL_DUE
0067 0200A1          JMP     MREC_END

             MREC_40:        ; Do we have coefficent data
006A B40903          CJNE    A,#LC_COEF_REQ,MREC_50
                     ; due move coffent to holding

006D 0200A1          JMP     MREC_END

             MREC_50:        ; Do we have a test req
0070 B40B2C          CJNE    A,#LC_TEST_REQ,MREC_60
                     ; We have a test req message in the buffer
0073 78A3            MOV     PTR00,#RX_BUFF+3                  ; Point to data
0075 E6              MOV     A,@PTR00
0076 F52A            MOV     TEST_OUT,A
0078 6007            JZ      MREC_52
007A C26A            CLR     LED_TEST
007C C266            CLR     TEST_IN_PROG
007E 020085          JMP     MREC_54
             MREC_52:
0081 D26A            SETB    LED_TEST
0083 D266            SETB    TEST_IN_PROG
             MREC_54:
0085 A255            MOV     C,LC_TEST_REQ_A         ; Set line A
0087 B3              CPL     C
0088 922A            MOV     TEST_LINE_A,C
008A A256            MOV     C,LC_TEST_REQ_B         ; Set line B
008C B3              CPL     C
008D 922E            MOV     TEST_LINE_B,C
008F A257            MOV     C,LC_DSL_TEST_REQ       ; Set DSL up for test
0091 B3              CPL     C
0092 922F            MOV     TEST_DSL,C
0094 D20D            SETB    TEST_DUE
0096 75CD75          MOV     TH2,#TIME_TEST_RESP*1000d/256d
0099 75C804          MOV     T2CON,#T2_CONT          ; start timer 2
009C 0200A1          JMP     MREC_END

             MREC_60:
009F 0538            INC     MREC_ERROR
             MREC_END:
00A1 C208            CLR     RX_READY                ; the buffer is free
                     ; Go to next task

             ;------------------------------------------------------------------
             ; The Transmit section of main

             MAIN_TRANS:
00A3 300E03          JNB     TX_BUF_ACTIV,MTRAN_10
                     ; add missed tx hear
```

```
                 MTRAN_END1:
00A6 020188             JMP     MTRAN_END

                 MTRAN_10:
00A9 3009FA             JNB     STATUS_DUE,MTRAN_END1   ;we can not send
00AC C209               CLR     STATUS_DUE
00AE D20E               SETB    TX_BUF_ACTIV
00B0 7883               MOV     PTR00,#TX_BUFF+3
00B2 7D02               MOV     RTX_LENT,#2             ; Set length 2
00B4 7C02               MOV     RTX_TYPE,#LC_STAT_MSG   ; Set type
00B6 A62C               MOV     @PTR00,SC_STAT          ; Set STATUS
00B8 08                 INC     PTR00

                 MTRAN_20:
00B9 300A05             JNB     POWER_UP_DUE,MTRAN_30   ;we do not need power up
00BC 7C04               MOV     RTX_TYPE,#LC_POWER_UP   ; Set type
00BE 02016C             JMP     MTRAN_EXIT

                 MTRAN_30:
00C1 300B07             JNB     MODEL_DUE,MTRAN_40      ;we can not send
00C4 7D02               MOV     RTX_LENT,#2             ; Set length 2
00C6 7C06               MOV     RTX_TYPE,#LC_MODEL_MSG  ; Set type
                        ; ADD MODEL_DATA
00C8 02016C             JMP     MTRAN_EXIT

                 MTRAN_40:
00CB 300C07             JNB     COEF_DUE,MTRAN_50       ;we can not send
00CE 7D02               MOV     RTX_LENT,#2             ; Set length 2
00D0 7C0A               MOV     RTX_TYPE,#LC_COEF_MSG   ; Set type
                        ; ADD COEF_DATA
00D2 02016C             JMP     MTRAN_EXIT

                 MTRAN_50:
00D5 300D1E             JNB     TEST_DUE,MTRAN_60
00D8 30CF1B             JNB     TF2,MTRAN_60
00DB C20D               CLR     TEST_DUE
00DD 7D03               MOV     RTX_LENT,#3             ; Set length 2
00DF 7C0C               MOV     RTX_TYPE,#LC_TEST_MSG   ; Set type
00E1 E527               MOV     A,TEST_IN               ; Place the data
00E3 A22A               MOV     C,TEST_LINE_A
00E5 B3                 CPL     C
00E6 92E5               MOV     ACC.5,C
00E8 A22E               MOV     C,TEST_LINE_B
00EA B3                 CPL     C
00EB 92E6               MOV     ACC.6,C
00ED A22F               MOV     C,TEST_DSL
00EF B3                 CPL     C
00F0 92E7               MOV     ACC.7,C
00F2 F6                 MOV     @PTR00,A
00F3 02016C             JMP     MTRAN_EXIT

                 MTRAN_60:      ; Handel the Test req inputs
00F6 E524               MOV     A,SSCR_COPY             ; Test for test req
00F8 5422               ANL     A,#00100010b
00FA C53A               XCH     A,TEST_REQ_COPY
00FC 653A               XRL     A,TEST_REQ_COPY
00FE 606C               JZ      MTRAN_EXIT              ; no test req
                        ; Handel tone for line A
0100 C0E0               PUSH    ACC
0102 30E12C             JNB     ACC.1,MTRAN_65
```

```
0105 302116              JNB    LINE_TEST_REQ_A,MTRAN_64
0108 D203                SETB   ST_DPTR
010A D200                SETB   ST_INPROG
010C C201                CLR    ST_REC
010E C202                CLR    ST_WT_RD
0110 901E8C              MOV    DPTR,#DO_TONE_A         ; Point to sicofi data
0113 751B11              MOV    ST_CONT,#TONE_LEN
0116 7937        +2      MOV    R1,#STCR
0118 7474        +2      MOV    A,#ST_STO
011A F3          +1      MOVX   @R1,A          ; Start SYN interrupt
011B 020131              JMP    MTRAN_65
                 MTRAN_64:
011E D203                SETB   ST_DPTR
0120 D200                SETB   ST_INPROG
0122 C201                CLR    ST_REC
0124 C202                CLR    ST_WT_RD
0126 901E35              MOV    DPTR,#NO_TONE_A         ; Point to sicofi data
0129 751B11              MOV    ST_CONT,#TONE_LEN
012C 7937        +2      MOV    R1,#STCR
012E 7474        +2      MOV    A,#ST_STO
0130 F3          +1      MOVX   @R1,A          ; Start SYN interrupt
                 MTRAN_65:
0131 D0E0                POP    ACC
0133 30E52C              JNB    ACC.5,MTRAN_68
0136 302516              JNB    LINE_TEST_REQ_B,MTRAN_67
0139 D203                SETB   ST_DPTR
013B D200                SETB   ST_INPROG
013D C201                CLR    ST_REC
013F C202                CLR    ST_WT_RD
0141 901E9D              MOV    DPTR,#DO_TONE_B         ; Point to sicofi data
0144 751B11              MOV    ST_CONT,#TONE_LEN
0147 7937        +2      MOV    R1,#STCR
0149 7474        +2      MOV    A,#ST_STO
014B F3          +1      MOVX   @R1,A          ; Start SYN interrupt
014C 020162              JMP    MTRAN_68
                 MTRAN_67:
014F D203                SETB   ST_DPTR
0151 D200                SETB   ST_INPROG
0153 C201                CLR    ST_REC
0155 C202                CLR    ST_WT_RD
0157 901E7B              MOV    DPTR,#NO_TONE_B         ; Point to sicofi data
015A 751B11              MOV    ST_CONT,#TONE_LEN
015D 7937        +2      MOV    R1,#STCR
015F 7474        +2      MOV    A,#ST_STO
0161 F3          +1      MOVX   @R1,A          ; Start SYN interrupt
                 MTRAN_68:
0162 7D03                MOV    RTX_LENT,#3             ; Set length 2
0164 7C0D                MOV    RTX_TYPE,#MC_TEST_REQ   ; Set type
0166 E53A                MOV    A,TEST_REQ_COPY
0168 F6                  MOV    @PTR00,A
0169 02016C              JMP    MTRAN_EXIT

                 MTRAN_EXIT:
                         ; SET UP THE OUT GOING MESSAGE
016C 7880                MOV    PTR00,#TX_BUFF
016E A639                MOV    @PTR00,BOARD_ID
0170 08                  INC    PTR00
0171 A605                MOV    @PTR00,TX_LENT
0173 85050B              MOV    TX_COUNT,TX_LENT
```

```
0176 050B                 INC     TX_COUNT
0178 08                   INC     PTR00
0179 A604                 MOV     @PTR00,TX_TYPE
                          ; CALL  SET_CRC
                          ; WE CAN KOW START THE TRANS
                  MTRAN_E1:
017B 2092FD               JB      TA_STAT,MTRAN_E1
017E C291                 CLR     TA_SET
0180 D29B                 SETB    TB8
0182 750981               MOV     TX_POINT,#TX_BUFF+1
0185 853999               MOV     SBUF,BOARD_ID
                  MTRAN_END:
                          ; Go to next task

                  ;----------------------------------------------------------------
                  ; Handel the lamp test button

0188 852DA0               MOV     P2,P2_COPY
018B 209703               JB      LAMP_TEST,LAMP_END
018E 75A000               MOV     P2,#0             ; Set all lamps on
                  LAMP_END:
                          ; Go to next task

                  ;----------------------------------------------------------------
                  ; The end of main reset watch dog, go to sleep if possable

                  MAIN_END:
0191 75F900               MOV     CH,#0             ; Reset watch dog timer

0194 438701               ORL     PCON,#IDLE_MOD    ; Go into idle mode and wait for an interrupt
0197 0129                 JMP     MAIN              ; Main program is just an idle loop

                  ;----------------------------------------------------------------
                  ; Initialization sequence - transferred here by power up reset

                  ; Set base processor functions, leave clocks and interupt till latter

                  INIT:
0199 7580FF               MOV     P0,#P0_INIT               ; Set all Port pins to init state
019C 7590FF               MOV     P1,#P1_INIT               ; using Port init value
019F 75A0FF               MOV     P2,#P2_INIT
01A2 75B0FF               MOV     P3,#P3_INIT
01A5 E4                   CLR     A                 ; In event of emulator or software restart
01A6 F5A8                 MOV     IE,A              ; ensure that processor special function
01A8 F5B8                 MOV     IP,A              ; registers are in their power-up states
01AA F5D0                 MOV     PSW,A
01AC F588                 MOV     TCON,A
01AE F589                 MOV     TMOD,A
01B0 F598                 MOV     SCON,A

01B2 78FF                 MOV     R0,#0FFh          ; Clear all 256 bytes of Data Memory
                  INIT20:
01B4 F6                   MOV     @R0,A             ; Clear memory loop works only because
01B5 D8FD                 DJNZ    R0,INIT20         ; R0 is also data memory at address 0


                  ; Set up the perifal chips

                  INIT30:
01B7 C293                 CLR     RESET_ALL         ; Release the reset of the perifal chips
```

```
                        ; Wait for chips to settle AND get BORD_ID
                INIT34:
01B9 7F64               MOV     RLOOP07_CNT,#100D       ; requir 100 matches, TIME
                INIT35:
01BB DBFE               DJNZ    RLOOP03_CNT,INIT35      ; 512 usec debonce

                        ; get the board address befor selecting ICC
01BD E580               MOV     A,P0
01BF C539               XCH     A,BOARD_ID      ; Save DATA
01C1 B539F5             CJNE    A,BOARD_ID,INIT34
01C4 DFF5               DJNZ    RLOOP07_CNT,INIT35
01C6 60F1               JZ      INIT34
01C8 24EE               ADD     A,#(255-17)
01CA 40ED               JC      INIT34
01CC C290               CLR     CS_ICC          ; Select the 2070 ICC chip

                ; Init the PEB 2070 ICC chip by loading registers with config values
                INIT40:
01CE 7920       +2      MOV     R1,#ISTA
01D0 E3         +1      MOVX    A,@R1           ; Clear ICC Interrupt STAtus register
01D1 7927       +2      MOV     R1,#RSTA
01D3 E3         +1      MOVX    A,@R1           ; Clear ICC Receiver STAtus register
01D4 7924       +2      MOV     R1,#EXIR
01D6 E3         +1      MOVX    A,@R1           ; Clear ICC EXtended Interrupt Register
01D7 7931       +2      MOV     R1,#CIRO
01D9 E3         +1      MOVX    A,@R1           ; Clear C/I change indication

01DA 7928       +2      MOV     R1,#TEI1
01DC 74FF       +2      MOV     A,#TEI1D
01DE F3         +1      MOVX    @R1,A   ;set tei to auto mode
01DF 7929       +2      MOV     R1,#TEI2
01E1 74FF       +2      MOV     A,#TEI2D
01E3 F3         +1      MOVX    @R1,A
01E4 7930       +2      MOV     R1,#SPCR
01E6 7480       +2      MOV     A,#SPCRD1
01E8 F3         +1      MOVX    @R1,A   ;set serial control
01E9 7930       +2      MOV     R1,#SPCR
01EB 7445       +2      MOV     A,#SPCRD2
01ED F3         +1      MOVX    @R1,A
01EE 7931       +2      MOV     R1,#CIXO
01F0 7447       +2      MOV     A,#CIXOD
01F2 F3         +1      MOVX    @R1,A   ;set 2091 command reg
01F3 7937       +2      MOV     R1,#STCR
01F5 7470       +2      MOV     A,#ST_NOR
01F7 F3         +1      MOVX    @R1,A   ;set synchronous transfer
01F8 7938       +2      MOV     R1,#ADF1
01FA 7400       +2      MOV     A,#ADF1D
01FC F3         +1      MOVX    @R1,A   ;set additional features
01FD 7939       +2      MOV     R1,#ADF2
01FF 7400       +2      MOV     A,#ADF2D
0201 F3         +1      MOVX    @R1,A
0202 7922       +2      MOV     R1,#MODE
0204 74CA       +2      MOV     A,#MODED
0206 F3         +1      MOVX    @R1,A   ; then set transmission modes,
0207 7921       +2      MOV     R1,#CMDR
0209 7441       +2      MOV     A,#CMDRCL
```

```
020B F3        +1           MOVX    @R1,A    ; reset link transmitter and receiver
020C 7920      +2           MOV     R1,#MASK
020E 7478      +2           MOV     A,#MASKD
0210 F3        +1           MOVX    @R1,A    ;set interrupt mask

                   ; Init the PEB 2260 SICOFI by writing string of COP & SOP bytes to it

                   INIT50:
0211 D204                   SETB    INIT_SICOFI              ; To allow init after INTERRUPT are u


                            ; Initialize the PBL 3764 SLICs to Off

                   INIT60:
0213 7933      +2           MOV     R1,#SSCX
0215 74FF      +2           MOV     A,#SSCX_INIT
0217 F3        +1           MOVX    @R1,A


                   INIT70:
0218 20B50A                 JB      BOARD_TEST,INIT80
021B 7931      +2           MOV     R1,#CTX0
021D 7457      +2           MOV     A,#IECQ_SSP
021F F3        +1           MOVX    @R1,A    ; Send Single Pulses

                   INIT79:
0220 438702                 ORL     PCON,#P_OFF      ; Power down 87C51 processor
0223 80FB                   JMP     INIT79

                   ; Initialize program registers and variables

                   INIT80:
0225 758144                 MOV     SP,#STACK-1
0228 752DFF                 MOV     P2_COPY,#P2_COPY_INIT
022B 7525FF                 MOV     SSCX_DATA,#SSCX_INIT
022E 7526FF                 MOV     STAT_IN,#STAT_IN_INIT
0231 7529FF                 MOV     STAT_OUT,#STAT_OUT_INIT
0234 752A00                 MOV     TEST_OUT,#TEST_OUT_INIT
0237 752B00                 MOV     MESG_OUT,#MESG_OUT_INIT
023A 752CDF                 MOV     SC_STAT,#SC_STAT_INIT
023D 7533A0                 MOV     ALARM_CKLOW,#FLASH_SPEED_S*TIME_BASE/2
0240 753450                 MOV     POW_LED_CKLOW,#FLASH_SPEED_F*TIME_BASE/2
0243 753641                 MOV     POWER_CKLOW,#1+(TIME_POWER_OFF*TIME_BASE) MOD 256
0246 753707                 MOV     POWER_CKHIGH,#1+(TIME_POWER_OFF*TIME_BASE) / 256


                   ; Initialize hardware timers and interrupts

                   INIT90:
0249 7598F0                 MOV     SCON,#SCOND      ; Set Serial Port Mode

024C E539                   MOV     A,BOARD_ID       ; Get address
024E F5A9                   MOV     SADDR,A          ; Set chip addres at reciver
0250 75B9FF                 MOV     SADEN,#0FFh      ; Set broadcast addres = FFh

0253 758926                 MOV     TMOD,#00100110b  ; Set Timer 0 to 8 bit auto-reload count mode
                                                     ; Set Timer 1 to 8 bit auto-reload timer mode
0256 438780                 ORL     PCON,#PCOND      ; Set to high speed mode

0259 758DFF                 MOV     TH1,#T1LOAD      ; Load counter for LC baud rate
```

```
025C D28E                      SETB    TR1                ; Start Timer 1

025E 758CCE                    MOV     TH0,#-(TIME_FSC/TIME_BASE)     ; Load counter for 160hz inte
                        t period
0261 D28C                      SETB    TR0                ; Start Timer 0

                               ; Setup the watch dog timer

             +1
0263 75DE48  +1                MOV     CCAPM4,#48h        ; Module 4 in timer compare mode
0266 75EEFF  +1                MOV     CCAP4L,#-1         ; Write to low byte first
0269 75FEFF  +1                MOV     CCAP4H,#-1         ; Before PCA timer overflows,
             +1                                           ; this compare value or CH must be changed
026C 43D940  +1                ORL     CMOD,#40h          ; Set the WDTE bit, OSC/12 = ~1/14 seconds
026F D2DE    +1                SETB    CRUN               ; Enable Counter Run mode
             +1

0271 D2A9                      SETB    ET0                ; Enable Timer 0 interrupts
0273 D2A8                      SETB    EX0                ; Enable the ICC interrupt
0275 D2AC                      SETB    ES                 ; Enable Serial Port Interrupts
0277 D2AF                      SETB    EA                 ; Master enable all enabled interrupts

                        ; We need to jump start the IECQ from reset

                        INIT95:
0279 7931    +2                MOV     R1,#CIX0
027B 7447    +2                MOV     A,#IECQ_RES
027D F3      +1                MOVX    @R1,A   ;set 2091 command reset
027E 7931    +2                MOV     R1,#CIR0
0280 E3      +1                MOVX    A,@R1                      ; Get the control code
0281 44C3                      ORL     A,#CIR0_MASK               ; Mask off C/I data
0283 B4C7F3                    CJNE    A,#IECQ_DEAC,INIT95
0286 D207                      SETB    IECQ_HOLD                  ; show we are in reset
0288 0129                      JMP     MAIN                       ; Goto Main



                        ;-------------------------------------------------------------------
                        ; This is the routine for the ICC service interrupt

                        ; FUNCTION:
                        ; 1. The first part is to alow Syncration to the 8 KHz FSC
                        ; 2. It is to control the IECQ link function
                        ; 3. To recive messages from the LC end of the link.

                        ISR_ICC:
028A C0E0                      PUSH    ACC
028C C0D0                      PUSH    PSW
             +5
028E D2D3    +5                SETB    RS0      ; Select Bank 3 Registers
0290 D2D4    +5                SETB    RS1
             +5                                                              ; Set Regeste
                        nk 3 on

0292 7920    +2                MOV     R1,#ISTA
0294 E3      +1                MOVX    A,@R1
0295 F522    +2                MOV     ISTA_COPY,A                ;get the interupt status reg
0297 301035                    JNB     EXI,ICC10
```

```
029A 7924     +2          MOV     R1,#EXIR
029C E3       +1          MOVX    A,@R1
029D F523     +2          MOV     EXIR_COPY,A             ;get the Extended interrupt reg
                                                                     ;there could be truble
029F 301C02               JNB     RFO,ICC02
                          ;Handel reciver error hear
02A2 0532                 INC     ERROR_CNT        ; Show error
                  ICC02:
02A4 301B0A               JNB     SOV,ICC04
                          ;Handel Synchous transfer over flow hear
02A7 0532                 INC     ERROR_CNT        ; Show error
                  ICC03:
02A9 7937     +2          MOV     R1,#STCR
02AB 7470     +2          MOV     A,#ST_NOR
02AD F3       +1          MOVX    @R1,A            ;we have an overflow
02AE 020313               JMP     ICC40
                  ICC04:

02B1 301A1B               JNB     MOS,ICC10
02B4 7932     +2          MOV     R1,#mor0
02B6 E3       +1          MOVX    A,@R1
02B7 B4FF03               CJNE    a,#0FFH,icc05
02BA 0202CF               JMP     ICC10
                  icc05:
02BD B40F03               CJNE    a,#00FH,icc06
02C0 0202CF               JMP     ICC10
                  ICC06:
02C3 C543                 XCH     A,MOR0_copy0
02C5 C542                 XCH     A,MOR0_copy1
02C7 C541                 XCH     A,MOR0_copy2
02C9 C540                 XCH     A,MOR0_copy3
02CB C53F                 XCH     A,MOR0_copy4
02CD C53E                 XCH     A,MOR0_copy5

                          ; Handel the moniter chanel hear
                  ICC10:
                          ; Rutine to handel SYNCHROUS Interrupt
02CF 301141               JNB     SIN,ICC40               ;There is no Synchous Interrupt
02D2 3000D4               JNB     ST_INPROG,ICC03         ; Go make shure we are down
02D5 A81C                 MOV     PTR30,ST_PTR
02D7 200121               JB      ST_REC,ICC30            ;We are reciveing data
                  ICC15:
                          ; Transmit data to SICOFI though ICC
02DA 7937     +2          MOV     R1,#STCR
02DC 7475     +2          MOV     A,#ST_SC0
02DE F3       +1          MOVX    @R1,A            ;Clear intr recet
02DF 200304               JB      ST_DPTR,ICC20           ;Use Data Pointer
02E2 E7                   MOV     A,@PTR31                ;Data from RAM
02E3 0202E9               JMP     ICC25
                  ICC20:                                  ;Data from ROM
02E6 E4                   CLR     A
02E7 93                   MOVC    A,@A+DPTR
02E8 A3                   INC     DPTR
                  ICC25:
02E9 7934     +2          MOV     R1,#MOX1                ;output data
02EB F3       +1          MOVX    @R1,A                   ;is this a motable time TX
02EC 300215               JNB     ST_WT_RD,ICC35          ;clear write read
02EF C202                 CLR     ST_WT_RD                ;set to recive
02F1 D201                 SETB    ST_REC
```

```
02F3 7937      +2            MOV    R1,#STCR
02F5 7478      +2            MOV    A,#ST_ST1
02F7 F3        +1            MOVX   @R1,A          ;Set the syn trans control
02F8 020311                  JMP    ICC39
                     ICC30:
                             ;Recive from SICOFI
02FB 7937      +2            MOV    R1,#STCR
02FD 747A      +2            MOV    A,#ST_SC1
02FF F3        +1            MOVX   @R1,A          ;clear Intr recet
0300 7934      +2            MOV    R1,#MOR1
0302 E3        +1            MOVX   A,@R1                     ;get data from Moniter 1
0303 F6                      MOV    @PTR30,A                  ;stor data
                     ICC35:
0304 DB0B                    DJNZ   RST_CONT,ICC39            ;we have more to do
0306 7937      +2            MOV    R1,#STCR
0308 7470      +2            MOV    A,#ST_NOR
030A F3        +1            MOVX   @R1,A          ;set normal run
030B C203                    CLR    ST_DPTR                   ;clear all flags
030D C201                    CLR    ST_REC
030F C200                    CLR    ST_INPROG
                     ICC39:
0311 051C                    INC    ST_PTR                    ;inc the data pointer
                     ICC40:
                             ; Rutine to handel IECQ control
0313 301265                  JNB    CIC,ICC60                 ; No C/I change go to rec
0316 7931      +2            MOV    R1,#CIRO
0318 E3        +1            MOVX   A,@R1
0319 44C3                    ORL    A,#CIRO_MASK              ; Mask off C/I data
                     ICC41:
031B B4F305                  CJNE   A,#IECQ_AI,ICC42          ; Equ activation req
031E D265                    SETB   LINK_UP                   ; Set link up
0320 02037B                  JMP    ICC59
                     ICC42:
0323 B4E305                  CJNE   A,#IECQ_AR,ICC43          ; Equ deacarivation ind
0326 7463                    MOV    A,#IECQ_ARC
0328 020376                  JMP    ICC57
                     ICC43:
032B B4C708                  CJNE   A,#IECQ_DEAC,ICC44        ; Equ activation req
032E 300540                  JNB    POWER_UP,ICC56            ; Go set hold
0331 7443                    MOV    A,#IECQ_DRC
0333 020376                  JMP    ICC57
                     ICC44:
0336 B4FF05                  CJNE   A,#IECQ_DI,ICC45          ; Equ deactivation req
0339 7463                    MOV    A,#IECQ_ARC               ; Set deactivation
033B 020376                  JMP    ICC57
                     ICC45:
033E B4D703                  CJNE   A,#IECQ_EI2,ICC46
0341 020379                  JMP    ICC58
                     ICC46:
0344 B4EF05                  CJNE   A,#IECQ_EI3,ICC47
0347 7453                    MOV    A,#IECQ_RES1
0349 020376                  JMP    ICC57
                     ICC47:
034C B4F705                  CJNE   A,#IECQ_LSL,ICC48
034F 7453                    MOV    A,#IECQ_RES1
0351 020376                  JMP    ICC57
                     ICC48:
0354 B4D305                  CJNE   A,#IECQ_RSY,ICC49
0357 7453                    MOV    A,#IECQ_RES1
0359 020376                  JMP    ICC57
```

```
                  ICC49:
035C B4CB03              CJNE    A,#IECQ_FJ,ICC50
035F 020379              JMP     ICC58
                  ICC50:
0362 B4DF03              CJNE    A,#IECQ_UAI,ICC51
0365 020379              JMP     ICC58
                  ICC51:
0368 B4E703              CJNE    A,#IECQ_ARM,ICC52
036B 020379              JMP     ICC58
                  ICC52:
036E 020379              JMP     ICC58

                  ICC56:         ; set IECQ holding
0371 D207                SETB    IECQ_HOLD
0373 020379              JMP     ICC58

                  ICC57:         ; Output the command
0376 7931          +2    MOV     R1,#CIX0
0378 F3            +1    MOVX    @R1,A                     ; set output

                  ICC58:         ; Show link down
0379 C265                CLR     LINK_UP                   ; Set loop down
                  ICC59:

                  ICC60:
                         ; Rutine to handel message recet from the link
037B 301733              JNB     RME,ICC99                 ; There is no message
037E 7927          +2    MOV     R1,#RSTA
0380 E3            +1    MOVX    A,@R1                     ; Get Receive Status Register
0381 440F                ORL     A,#00Fh                   ; mask to errors
0383 64AF                XRL     A,#0AFh                   ; mask to errors
0385 6005                JZ      ICC65
0387 0532                INC     ERROR_CNT
0389 0203AC              JMP     ICC79
                  ICC65:
038C 7925          +2    MOV     R1,#RBCL
038E E3            +1    MOVX    A,@R1                     ; Get the length
038F C3                  CLR     C
0390 9403                SUBB    A,#3
0392 4018                JC      ICC79                     ; we do not have 3 bytes
0394 FA                  MOV     REC_CONT,A                ; Save for data
0395 E4                  CLR     A                         ; Show message recet
0396 F530                MOV     RX_MISED,A

0398 7900                MOV     PTR31,#RFIFO              ; Point to RECIVER
039A E3                  MOVX    A,@PTR31
039B F526                MOV     STAT_IN,A                 ; Save Status
039D E3                  MOVX    A,@PTR31
039E F527                MOV     TEST_IN,A                 ; Save test
03A0 E3                  MOVX    A,@PTR31
03A1 F528                MOV     MESG_IN,A                 ; Save Message
03A3 0203AC              JMP     ICC79                     ; No message
03A6 E3                  MOVX    A,@PTR31
03A7 F53C                MOV     DATA_1,A                  ; Save DATA 1
03A9 E3                  MOVX    A,@PTR31
03AA F53D                MOV     DATA_2,A                  ; Save DATA 2
                  ICC79:
03AC 7921          +2    MOV     R1,#CMDR
03AE 7480          +2    MOV     A,#CMDRMC
03B0 F3            +1    MOVX    @R1,A               ; Show message recet
```

```
                 ICC99:
03B1 D0D0                    POP      PSW
03B3 D0E0                    POP      ACC
03B5 32                      RETI

                 ;-------------------------------------------------------------------
                 ; This is the routine for the time clock interrupt

                 ISR_CLK:
03B6 C0E0                    PUSH     ACC
03B8 C0D0                    PUSH     PSW
           +5
03BA D2D3  +5                SETB     RS0      ; Select Bank 3 Registers
03BC D2D4  +5                SETB     RS1
           +5                                                         ; Set reg bank 2
                             ; Error control for the Link, TRANS, and RECV
                 ERR10:
03BE D52E06                  DJNZ     PASS_LOW,ERR40             ; Adjest the pass count
03C1 D52F03                  DJNZ     PASS_HIGH,ERR40
03C4 306524                  JNB      LINK_UP,ERR80              ; Link down, pass 0
                 ERR40:
03C7 306538                  JNB      LINK_UP,ERR99              ; Link down not zero
03CA E530                    MOV      A,RX_MISED
                 ;temp*      CJNE     A,#RESET_TOL,ERR50         ; Do we have to many RX passes
                 ;temp*      JMP      ERR80
                 ERR50:
03CC 0530                    INC      RX_MISED
03CE 540A                    ANL      A,#RX_TOL
03D0 B40A07                  CJNE     A,#RX_TOL,ERR60
03D3 0544                    INC      RX_ERROR
03D5 7921  +2                MOV      R1,#CMDR
03D7 7440  +2                MOV      A,#CMDRRES
03D9 F3    +1                MOVX     @R1,A            ; Reset the reciver

                 ERR60:
03DA E531                    MOV      A,TX_MISED
                 ;temp*      CJNE     A,#RESET_TOL,ERR70         ; Do we have to many TX passes
                 ;temp*      JMP      ERR80
                 ERR70:
03DC 0531                    INC      TX_MISED
03DE 540A                    ANL      A,#TX_TOL
03E0 B40A1F                  CJNE     A,#TX_TOL,ERR99
03E3 7921  +2                MOV      R1,#CMDR
03E5 7401  +2                MOV      A,#CMDXRES
03E7 F3    +1                MOVX     @R1,A            ; Reset the transmiter
03E8 020402                  JMP      ERR99
                 ERR80:
                             ; RESET the whol IECQ and TX,RX
03EB 7931  +2                MOV      R1,#CIX0
03ED 7447  +2                MOV      A,#IECQ_RES
03EF F3    +1                MOVX     @R1,A   ; Reset IECQ
03F0 7921  +2                MOV      R1,#CMDR
03F2 7401  +2                MOV      A,#CMDXRES
03F4 F3    +1                MOVX     @R1,A            ; Reset the transmiter
03F5 7921  +2                MOV      R1,#CMDR
03F7 7440  +2                MOV      A,#CMDRRES
03F9 F3    +1                MOVX     @R1,A            ; Reset the reciver
03FA E4                      CLR      A
03FB 7526FF                  MOV      STAT_IN,#STAT_IN_INIT
```

```
03FE F527                MOV     TEST_IN,A
0400 F528                MOV     MESG_IN,A
                 ERR99:
                 ;-----------------------------------------------------------------
                 ; Link down normal set

0402 206503              JB      LINK_UP,LINK_TEST_END
0405 7526FF              MOV     STAT_IN,#STAT_IN_INIT   ; This will set lamps off
                 LINK_TEST_END:
                 ;-----------------------------------------------------------------
                 ; Get the status from the Sicofi for Line Service

                 CLK10:

                         ;Get the local status
0408 7933        +2      MOV     R1,#SSCR
040A E3          +1      MOVX    A,@R1
040B F524        +2      MOV     SSCR_COPY,A     ; Get the local hook status
040D 020410              JMP     LINE_A_SERVICE
                 ;-----------------------------------------------------------------
                 ; This is the LINE A service Section.


                 LINE_A_SERVICE:

0410 A220                MOV     C,LINE_A_RING_REQ       ; Get the ring reqest
0412 9248                MOV     RING_REQ_A,C            ; place at RT ourput
0414 A230                MOV     C,LINE_A_ON             ; Get the hook status
0416 9228                MOV     SEIZE_LINE_A,C          ; out put hook
0418 8220                ANL     C,LINE_A_RING_REQ       ; Combine ring and hook
041A 926C                MOV     LED_LINE_A,C            ; Set led
041C 9260                MOV     LINE_A_ACT,C            ;set states

                 LINE_A_END:             ; END of LINE_A_SERVICE

                 ;-----------------------------------------------------------------
                 ; This is the LINE B service Section.


                 LINE_B_SERVICE:

041E A224                MOV     C,LINE_B_RING_REQ       ; Get the ring reqest
0420 9249                MOV     RING_REQ_B,C            ; place at RT ourput
0422 A231                MOV     C,LINE_B_ON             ; Get the hook status
0424 922C                MOV     SEIZE_LINE_B,C          ; out put hook
0426 8224                ANL     C,LINE_B_RING_REQ       ; Combine ring and hook
0428 926D                MOV     LED_LINE_B,C            ; Set led
042A 9261                MOV     LINE_B_ACT,C            ;set states

                 LINE_B_END:             ; END of LINE_B_SERVICE

                 ;-----------------------------------------------------------------
                 ; Output the SSCX to the sicofi

                 CLK20:
042C 7933        +2      MOV     R1,#SSCX
042E E525        +2      MOV     A,SSCX_DATA
0430 F3          +1      MOVX    @R1,A
```

```
                 ;------------------------------------------------------------------------
                 ; Service the Alarm system

                 ALARM_SERVICE:
0431 20650F              JB      LINK_UP,ALARM10         ; link up service the alarm
0434 D229                SETB    ALARM_RELAY_A
0436 D22D                SETB    ALARM_RELAY_B
0438 D26E                SETB    LED_AUX_A
043A D26F                SETB    LED_AUX_B
043C D262                SETB    AUX_A_ACT
043E D263                SETB    AUX_B_ACT
0440 02046D              JMP     ALARM_END
                 ALARM10:
0443 303206              JNB     AUX_A_IDLE,ALARM20      ; Alarm is on togel
0446 C229                CLR     ALARM_RELAY_A
0448 D26E                SETB    LED_AUX_A
044A D262                SETB    AUX_A_ACT
                 ALARM20:
044C 303306              JNB     AUX_B_IDLE,ALARM30      ; Alarm is on togel
044F C22D                CLR     ALARM_RELAY_B
0451 D26F                SETB    LED_AUX_B
0453 D263                SETB    AUX_B_ACT
                 ALARM30:
0455 D53315              DJNZ    ALARM_CKLOW,ALARM_END
0458 7533A0              MOV     ALARM_CKLOW,#FLASH_SPEED_S*TIME_BASE/2
045B 203206              JB      AUX_A_IDLE,ALARM40      ; Alarm is on togel
045E B229                CPL     ALARM_RELAY_A
0460 C26E                CLR     LED_AUX_A
0462 C262                CLR     AUX_A_ACT
                 ALARM40:
0464 203306              JB      AUX_B_IDLE,ALARM_END    ; Alarm is on togel
0467 B22D                CPL     ALARM_RELAY_B
0469 C26F                CLR     LED_AUX_B
046B C263                CLR     AUX_B_ACT
                 ALARM_END:
046D 020470              JMP     STATUS_LC

                 ;------------------------------------------------------------------------
                 ; This is the general status for the RT

                 STATUS_LC:
0470 306507              JNB     LINK_UP,STAT10          ; The link is down go service
0473 D268                SETB    LED_MINOR               ; Off minor
0475 C269                CLR     LED_DSL                 ; On the DSL
0477 02048F              JMP     STAT50
                 STAT10:
047A D269                SETB    LED_DSL                 ; Off DSL lead
047C 300505              JNB     POWER_UP,STAT20         ; the Power is down go service
047F C268                CLR     LED_MINOR               ; On the minor Lead
0481 02048F              JMP     STAT50
                 STAT20:
0484 D53408              DJNZ    POW_LED_CKLOW,STAT50
0487 753450              MOV     POW_LED_CKLOW,#FLASH_SPEED_F*TIME_BASE/2
048A B268                CPL     LED_MINOR
048C 02048F              JMP     STAT50
                 STAT50:
048F A234                MOV     C,TAMPER_IDLE     ; Get the tamper status
0491 926B                MOV     LED_TAMPER,C      ; Set lead
0493 9264                MOV     TAMPER_ACT,C      ; Set status
```

```
                 STATUS_LC_END:            ;END OF STATUS

                 ;-----------------------------------------------------------------
                 ; Power Service of the link:
                 ; This runs on 5 States as follows:

0000             POWST_INIT        EQU    0       ; Total restart
0001             POWST_OFF         EQU    1       ; The power is off to reset the RT
0002             POWST_OVER_RIDE   EQU    2       ; The power is in over ride to start
0003             POWST_START       EQU    3       ; The powerd is at 50ma to start
0004             POWST_PASS        EQU    4       ; The Link is Starting to Link at 5ma
0005             POWST_LINKING     EQU    5       ; The Link is trying to link at 5ma
0006             POWST_LINKED      EQU    6       ; The link is up and powered at 50ma

                 POWER_SERVICE:
0495 E535                MOV     A,POWER_STATE    ; Get power state
0497 B40606              CJNE    A,#POWST_LINKED,POWER_UPC
049A 30654D              JNB     LINK_UP,PASS_ST ; Go start pass state
049D 020552              JMP     POWER_END

                 POWER_UPC:
04A0 30650E              JNB     LINK_UP,POWER_INIT
                         ; We have a new link start LINKED
04A3 753506              MOV     POWER_STATE,#POWST_LINKED
04A6 D206                SETB    SHORT_OFF        ; to allow fast repower
04A8 C295                CLR     HIGH_I           ; set 50 ma power
04AA C296                CLR     LOW_I            ; set 5 ma
04AC D294                SETB    OVERRIDE         ; Clear the over ride
04AE 020552              JMP     POWER_END

                 POWER_INIT:
04B1 B40003              CJNE    A,#POWST_INIT,POWER_TIME
04B4 0204C0              JMP     OVER_ST          ; Go start power over ride state

                 POWER_TIME:
04B7 D5367C              DJNZ    POWER_CKLOW,POWER_SHORT ; is this a time up pass
04BA D53779              DJNZ    POWER_CKHIGH,POWER_SHORT

                         ; Time is up: Wher to next after current state
                 POWER_OFF:
04BD B40112              CJNE    A,#POWST_OFF,POWER_OVER
                 OVER_ST:
                         ; Start the 50ma over ride state
04C0 753502              MOV     POWER_STATE,#POWST_OVER_RIDE
04C3 7536A1              MOV     POWER_CKLOW,#1+(TIME_POWER_OVER*TIME_BASE) mod 256       ; Set
                 ck
04C6 753701              MOV     POWER_CKHIGH,#1+(TIME_POWER_OVER*TIME_BASE) / 256
04C9 C296                CLR     LOW_I            ; Set 5 ma power
04CB C295                CLR     HIGH_I           ; Set 50 ma power
04CD C294                CLR     OVERRIDE         ; set over ride of short
04CF 020552              JMP     POWER_END

                 POWER_OVER:
04D2 B40212              CJNE    A,#POWST_OVER_RIDE,POWER_START
                         ; Start the 50ma power up state
04D5 753503              MOV     POWER_STATE,#POWST_START
04D8 753681              MOV     POWER_CKLOW,#1+(TIME_POWER_START*TIME_BASE) mod 256      ; Set
                 ck
```

```
04DB 753703          MOV    POWER_CKHIGH,#1+(TIME_POWER_START*TIME_BASE) / 256
04DE C296            CLR    LOW_I              ; Set 5 ma power
04E0 C295            CLR    HIGH_I             ; Set 50 ma power
04E2 D294            SETB   OVERRIDE           ; Clear the over ride of short
04E4 020552          JMP    POWER_END

               POWER_START:
04E7 B40312          CJNE   A,#POWST_START,POWER_PASS
               PASS_ST:
                     ; Start the pass short time in 5ma state
04EA 753504          MOV    POWER_STATE,#POWST_PASS
04ED 7536A1          MOV    POWER_CKLOW,#1+(TIME_POWER_WATE*TIME_BASE) MOD 256      ; Set
ck
04F0 753701          MOV    POWER_CKHIGH,#1+(TIME_POWER_WATE*TIME_BASE) / 256
04F3 C296            CLR    LOW_I              ; Set 5 ma power
04F5 D295       +1   SETB   HIGH_I             ; Clear 50 ma power
04F7 D294            SETB   OVERRIDE           ; clear over ride of short
04F9 020552          JMP    POWER_END

               POWER_PASS:
04FC B4041E          CJNE   A,#POWST_PASS,POWER_LINKING
                     ; Start the linking time, and boot the IECQ if needed
04FF 753505          MOV    POWER_STATE,#POWST_LINKING
0502 753601          MOV    POWER_CKLOW,#1+(TIME_POWER_LINK*TIME_BASE) MOD 256      ; Set
ck
0505 75371A          MOV    POWER_CKHIGH,#1+(TIME_POWER_LINK*TIME_BASE) / 256
0508 C296            CLR    LOW_I              ; Set 5 ma power
050A D295       +1   SETB   HIGH_I             ; Clear 50 ma power
050C D294            SETB   OVERRIDE           ; clear over ride of short
050E D205            SETB   POWER_UP           ; Show power up
0510 30071B          JNB    IECQ_HOLD,OFF_ST3          ; Go reset the IECQ
                     ; start the IECQ from reset
0513 C207            CLR    IECQ_HOLD
0515 7931       +2   MOV    R1,#CIX0
0517 7443       +2   MOV    A,#IECQ_DRC
0519 F3         +1   MOVX   @R1,A    ; start the IECQ
051A 020552          JMP    POWER_END

               POWER_LINKING:
               OFF_ST1:
                     ; Set the off state short time
051D 753641          MOV    POWER_CKLOW,#1+(TIME_POWER_OFF*TIME_BASE) MOD 256      ; Set
ck
0520 753707          MOV    POWER_CKHIGH,#1+(TIME_POWER_OFF*TIME_BASE) / 256
               OFF_ST2:
                     ; Start the off state, and reset IECQ
0523 753501          MOV    POWER_STATE,#POWST_OFF
0526 D296       +1   SETB   LOW_I              ; Clear 5 ma power
0528 D295       +1   SETB   HIGH_I             ; Clear 50 ma power
052A D294            SETB   OVERRIDE           ; clear over ride of short
052C C205            CLR    POWER_UP           ; Show power off
               OFF_ST3:
052E 7931       +2   MOV    R1,#CIX0
```

```
0530 7447          +2          MOV     A,#IECQ_RES
0532 F3            +1          MOVX    @R1,A      ; Reset the IECQ
0533 020552                    JMP     POWER_END

                         POWER_SHORT:
                               ; We will look for shorts in two cases
0536 309419                    JNB     OVERRIDE,POWER_END        ; No short

0539 B40302                    CJNE    A,#POWST_START,SHORT_10
                               ; We are in start and need to go to pass
053C 80AC                      JMP     PASS_ST
                         SHORT 10:
053E B40511                    CJNE    A,#POWST_LINKING,POWER_END       ;no more
                               ; we are linking and need to set off time
0541 1006D9                    JBC     SHORT_OFF,OFF_ST1         ; fast off
                               ; Set a long off time by adding to time on clock
0544 E536                      MOV     A,POWER_CKLOW             ; set clock
0546 2541                      ADD     A,1+(TIME_POWER_OFF*TIME_BASE) MOD 256
0548 F536                      MOV     POWER_CKLOW,A
054A E537                      MOV     A,POWER_CKHIGH
054C 3507                      ADDC    A,1+(TIME_POWER_OFF*TIME_BASE) / 256
054E F537                      MOV     POWER_CKHIGH,A
0550 80D1                      JMP     OFF_ST2                   ; go finsh the set up


                         POWER_END:

                         ;------------------------------------------------------------
                         ; Transmit the repley to the LC

                         TRAN_START:
0552 7921          +2          MOV     R1,#STAR
0554 E3            +1          MOVX    A,@R1             ; Get the status reg
0555 30E619                    JNB     ACC.6,TRAN_END    ; No space to send
0558 7900                      MOV     PTR21,#XFIFO      ; Set pointer
055A E529                      MOV     A,STAT_OUT        ; Output the status
055C F3                        MOVX    @PTR21,A
055D E52A                      MOV     A,TEST_OUT        ; Output the test
055F F3                        MOVX    @PTR21,A
0560 E52B                      MOV     A,MESG_OUT        ; Output the message
0562 F3                        MOVX    @PTR21,A
0563 E53C                      MOV     A,DATA_1          ; Output the message
0565 F3                        MOVX    @PTR21,A
0566 E53D                      MOV     A,DATA_2          ; Output the message
0568 F3                        MOVX    @PTR21,A
                               ; Added the data part hear
0569 E4                        CLR     A
056A F531                      MOV     TX_MISED,A        ; Show transmision
056C 7921          +2          MOV     R1,#CMDR
056E 740A          +2          MOV     A,#CMDXTF
0570 F3            +1          MOVX    @R1,A
                         TRAN_END:

                         CLK99:
0571 D0D0                      POP     PSW
0573 D0E0                      POP     ACC
0575 32                        RETI

                         ;------------------------------------------------------------
                         ; This is the service routine for the Serial port interrupt
```

```
                      ISR_SERIAL:
0576 C0D0                     PUSH    PSW                ; Save the Program Status Word
0578 C0E0                     PUSH    ACC                ; and the accumulator
                 +3
057A D2D3        +3           SETB    RS0       ; Select Bank 1 Registers
057C C2D4        +3           CLR     RS1
                 +3                                      ; Select RB1 for Serial Interrupt Service

057E 109819                   JBC     RI,RECEIVE         ; Handle Receive Register Full interrupts
0581 109905                   JBC     TI,TRANSMIT        ; Handle Transmitter Register Empty interrupt

                      EGRESS:
0584 D0E0                     POP     ACC                ; Restore the accumulator
0586 D0D0                     POP     PSW                ; and the Program Status Word
0588 32                       RETI                       ; Return from serial interrupt service routin

                      ;-------------------------------------------------------------
                      ; Transmit section for serial port

                      TRANSMIT:
0589 EB                       MOV     A,RTX_COUNT
058A 7006                     JNZ     ACCESS
058C C20E                     CLR     TX_BUF_ACTIV              ; Make a note that the buffer is free
058E D291                     SETB    TA_SET                    ; Release the bus backplane pin
0590 80F2                     JMP     EGRESS

                      ACCESS:
0592 C29B                     CLR     TB8                       ; Clear serial bit 9 for data
0594 8799                     MOV     SBUF,@RTX_POINT
0596 09                       INC     RTX_POINT
0597 1B                       DEC     RTX_COUNT
0598 80EA                     JMP     EGRESS


                      ;-------------------------------------------------------------
                      ; The receiver section of serial port

                      RECEIVE:
059A 209A12                   JB      RB8,GET_ID                ; This is a Board ID Byte
059D A699                     MOV     @RRX_POINT,SBUF           ; Store the Character in the buffer
059F B8A104                   CJNE    RRX_POINT,#RX_BUFF+1,RX_DATA
05A2 E6                       MOV     A,@RRX_POINT              ;set data length
05A3 2401                     ADD     A,#1                      ; to cover length and crc
05A5 FA                       MOV     RRX_COUNT,A

                      RX_DATA:
05A6 08                       INC     RRX_POINT
05A7 DADB                     DJNZ    RRX_COUNT,EGRESS
05A9 D29D                     SETB    SM2                       ; Set to address mode
05AB D208                     SETB    RX_READY
05AD 80D5                     JMP     EGRESS

                      GET_ID:
05AF 78A0                     MOV     RRX_POINT,#RX_BUFF
05B1 A699                     MOV     @RRX_POINT,SBUF ; Store the Character in the buffer
05B3 08                       INC     RRX_POINT
05B4 C29D                     CLR     SM2                       ; Set data recet mode
05B6 80CC                     JMP     EGRESS
```

```
                    2048    ;-------------------------------------------------------------------
                    2049    ; Some end of code marks
                    2050
05B8 454E4420       2051            DB      'END OF CODE'
05BC 4F462043
05C0 4F4445
                    2052    CODE_END:
                    2053
                    2054            END


MCS-51 MACRO ASSEMBLER      Subscriber Line Multiplexer Program for LC

XREF SYMBOL TABLE LISTING
---- ------ ----- -------

N A M E              T Y P E   V A L U E    ATTRIBUTES AND REFERENCES

ABS_TERM_REQ . .     B ADDR    002AH.2 A      439#
ABS_TERM_SET . .     B ADDR    0027H.2 A      408#
ACC. . . . . . .     D ADDR    00E0H   A      1145 1148 1151 1162 1163 1186 1187 1448 1640 1647 1961 1983
                                              1991 2001
ACCESS . . . . .     C ADDR    0592H   A      2010 2015#
ADF1 . . . . . .     X ADDR    0038H   A      771# 1332
ADF1D. . . . . .       NUMB    0000H   A      779# 1333
ADF2 . . . . . .     X ADDR    0039H   A      781# 1335
ADF2D. . . . . .       NUMB    0000H   A      788# 1336
ALARM_CKLOW. . .     D ADDR    0033H   A      497# 1383 1779 1780
ALARM_END. . . .     C ADDR    046DH   A      1767 1779 1786 1790#
ALARM_RELAY_A. .     B ADDR    0025H.1 A      385# 1761 1770 1782
ALARM_RELAY_B. .     B ADDR    0025H.5 A      381# 1762 1775 1787
ALARM_SERVICE. .     C ADDR    0431H   A      1759#
ALARM10. . . . .     C ADDR    0443H   A      1760 1768#
ALARM20. . . . .     C ADDR    044CH   A      1769 1773#
ALARM30. . . . .     C ADDR    0455H   A      1774 1778#
ALARM40. . . . .     C ADDR    0464H   A      1781 1785#
AUX_A_ACT. . . .     B ADDR    002CH.2 A      467# 1765 1772 1784
AUX_A_IDLE . . .     B ADDR    0026H.2 A      396# 1769 1781
AUX_B_ACT. . . .     B ADDR    002CH.3 A      468# 1766 1777 1789
AUX_B_IDLE . . .     B ADDR    0026H.3 A      397# 1774 1786
B1CR . . . . . .     X ADDR    0037H   A      751#
B2CR . . . . . .     X ADDR    0038H   A      753#
BIT_SIZE . . . .       NUMB    0002H   A      325# 332
BOARD_ID . . . .     D ADDR    0039H   A      505# 1219 1233 1293 1294 1394
BOARD_TEST . . .     B ADDR    00B0H.5 A      132# 1363
C1R. . . . . . .     X ADDR    0035H   A      747#
C2R. . . . . . .     X ADDR    0036H   A      749#
CCAP4H . . . . .     D ADDR    00FEH   A      197# 1413
CCAP4L . . . . .     D ADDR    00EEH   A      196# 1412
CCAPM4 . . . . .     D ADDR    00DEH   A      195# 1411
CCON . . . . . .     D ADDR    00D8H   A      191# 198
CH . . . . . . .     D ADDR    00F9H   A      194# 1250
CHIP_ID. . . . .     C ADDR    1F80H   A      30#
CIC. . . . . . .     B ADDR    0022H.2 A      341# 1542
CIRO_MASK. . . .       NUMB    00C3H   A      717# 1432 1545
CIRO . . . . . .     X ADDR    0031H   A      706# 1311 1430 1543
```

```
CIXO . . . . . . .   X ADDR   0031H    A       719# 1326 1364 1427 1595 1686 1907 1927
CIXOD. . . . . . .     NUMB   0047H    A       728# 1327
CL . . . . . . . .   D ADDR   00E9H    A       193#
CLK10. . . . . . .   C ADDR   0408H    A       1709#
CLK20. . . . . . .   C ADDR   042CH    A       1751#
CLK99. . . . . . .   C ADDR   0571H    A       1981#
CMDR . . . . . . .   X ADDR   0021H    A       588# 1341 1635 1668 1680 1689 1692 1976
CMDRCL . . . . . .     NUMB   0041H    A       603# 1342
CMDRMC . . . . . .     NUMB   0080H    A       599# 1636
CMDRRES. . . . . .     NUMB   0040H    A       600# 1669 1693
CMDXRES. . . . . .     NUMB   0001H    A       601# 1681 1690
CMDXTF . . . . . .     NUMB   000AH    A       602# 1977
CMOD . . . . . . .   D ADDR   00D9H    A       192# 1415
CODE_END . . . . .   C ADDR   05C3H    A       2052#
COEF_DUE . . . . .   B ADDR   0021H.4  A       321# 1130
COEF_IN_B1 . . . .   B ADDR   0028H.1  A       418#
COEF_IN_B2 . . . .   B ADDR   0028H.4  A       421#
COEF_OUT_B1. . . .   B ADDR   002BH.1  A       453#
COEF_OUT_B2. . . .   B ADDR   002BH.4  A       456#
CRUN_. . . . . . .   B ADDR   00D8H.6  A       198# 1416
CS_ICC . . . . . .   B ADDR   0090H.0  A       101# 1300
DATA_1 . . . . . .   D ADDR   003CH    A       511# 1631 1969
DATA_2 . . . . . .   D ADDR   003DH    A       512# 1633 1971
DO_TONE_A. . . . .   C ADDR   1E8CH    A       907# 1169
DO_TONE_B. . . . .   C ADDR   1E9DH    A       920# 933 1193
EA_. . . . . . . .   B ADDR   00A8H.7  A       1422
EGRESS . . . . . .   C ADDR   0584H    A       2000# 2013 2020 2036 2039 2046
ERR10. . . . . . .   C ADDR   03BEH    A       1654#
ERR40. . . . . . .   C ADDR   03C7H    A       1655 1656 1658#
ERR50. . . . . . .   C ADDR   03CCH    A       1663#
ERR60. . . . . . .   C ADDR   03DAH    A       1666 1672#
ERR70. . . . . . .   C ADDR   03DCH    A       1676#
ERR80. . . . . . .   C ADDR   03EBH    A       1657 1684#
ERR99. . . . . . .   C ADDR   0402H    A       1659 1679 1683 1699#
ERROR_CNT. . . . .   D ADDR   0032H    A       495# 999 1465 1469 1610
ES . . . . . . . .   B ADDR   00A8H.4  A       1421
ET0. . . . . . . .   B ADDR   00A8H.1  A       1419
EX0. . . . . . . .   B ADDR   00A8H.0  A       1420
EXI. . . . . . . .   B ADDR   0022H.0  A       343# 1458
EXIR_COPY. . . . .   D ADDR   0023H    A       346# 348 349 350 351 352 353 354 355 1461
EXIR_. . . . . . .   X ADDR   0024H    A       560# 1309 1459
EXTI0. . . . . . .   C ADDR   0003H    A       983
EXTI1. . . . . . .   C ADDR   0013H    A       989
FLASH_SPEED_F. . .     NUMB   0001H    A       147# 1384 1808
FLASH_SPEED_S. . .     NUMB   0002H    A       150# 1383 1780
GET_ID . . . . . .   C ADDR   05AFH    A       2027 2041#
HIGH_I . . . . . .   B ADDR   0090H.5  A       106# 1841 1863 1874 1887 1900 1922
ICC02. . . . . . .   C ADDR   02A4H    A       1463 1466#
ICC03. . . . . . .   C ADDR   02A9H    A       1470# 1497
ICC04. . . . . . .   C ADDR   02B1H    A       1467 1475#
ICC05. . . . . . .   C ADDR   02BDH    A       1480 1482#
ICC06. . . . . . .   C ADDR   02C3H    A       1483 1485#
ICC10. . . . . . .   C ADDR   02CFH    A       1458 1477 1481 1484 1494#
ICC15. . . . . . .   C ADDR   02DAH    A       1500#
ICC20. . . . . . .   C ADDR   02E6H    A       1505 1508#
ICC25. . . . . . .   C ADDR   02E9H    A       1507 1512#
ICC30. . . . . . .   C ADDR   02FBH    A       1499 1522#
ICC35. . . . . . .   C ADDR   0304H    A       1515 1530#
ICC39. . . . . . .   C ADDR   0311H    A       1521 1531 1538#
ICC40. . . . . . .   C ADDR   0313H    A       1474 1496 1540#
```

```
ICC41. . . . . . C ADDR  031BH   A    1546#
ICC42. . . . . . C ADDR  0323H   A    1547 1550#
ICC43. . . . . . C ADDR  032BH   A    1551 1554#
ICC44. . . . . . C ADDR  0336H   A    1555 1559#
ICC45. . . . . . C ADDR  033EH   A    1560 1563#
ICC46. . . . . . C ADDR  0344H   A    1564 1566#
ICC47. . . . . . C ADDR  034CH   A    1567 1570#
ICC48. . . . . . C ADDR  0354H   A    1571 1574#
ICC49. . . . . . C ADDR  035CH   A    1575 1578#
ICC50. . . . . . C ADDR  0362H   A    1579 1581#
ICC51. . . . . . C ADDR  0368H   A    1582 1584#
ICC52. . . . . . C ADDR  036EH   A    1585 1587#
ICC56. . . . . . C ADDR  0371H   A    1556 1590#
ICC57. . . . . . C ADDR  0376H   A    1553 1558 1562 1569 1573 1577 1594#
ICC58. . . . . . C ADDR  0379H   A    1565 1580 1583 1586 1588 1592 1598#
ICC59. . . . . . C ADDR  037BH   A    1549 1600#
ICC60. . . . . . C ADDR  037BH   A    1542 1602#
ICC65. . . . . . C ADDR  038CH   A    1609 1612#
ICC79. . . . . . C ADDR  03ACH   A    1611 1617 1629 1634#
ICC99. . . . . . C ADDR  03B1H   A    1604 1638#
IDLE_MOD . . . .   NUMB  0001H   A    178# 1252
IE . . . . . . . D ADDR  00A8H   A    1266
IECQ_AI. . . . .   NUMB  00F3H   A    830# 1547
IECQ_AIC . . . .   NUMB  0073H   A    815#
IECQ_AIL . . . .   NUMB  00FBH   A    832#
IECQ_AR. . . . .   NUMB  00E3H   A    827# 1551
IECQ_ARC . . . .   NUMB  0063H   A    813# 1552 1561
IECQ_ARL . . . .   NUMB  006BH   A    814#
IECQ_ARM . . . .   NUMB  00E7H   A    828# 1585
IECQ_DC. . . . .   NUMB  00FFH   A    834#
IECQ_DCC . . . .   NUMB  007FH   A    816#
IECQ_DEAC. . . .   NUMB  00C7H   A    821# 1433 1555
IECQ_DI. . . . .   NUMB  00FFH   A    833# 1560
IECQ_DIC . . . .   NUMB  007CH   A    817#
IECQ_DR. . . . .   NUMB  00C3H   A    820#
IECQ_DRC . . . .   NUMB  0043H   A    809# 1557 1908
IECQ_EI1 . . . .   NUMB  00D3H   A    825#
IECQ_EI2 . . . .   NUMB  00D7H   A    824# 1564
IECQ_EI3 . . . .   NUMB  00EFH   A    829# 1567
IECQ_FJ. . . . .   NUMB  00CBH   A    822# 1579
IECQ_HOLD. . . . B ADDR  0020H.7 A    316# 1434 1591 1904 1906
IECQ_LSL . . . .   NUMB  00F7H   A    831# 1571
IECQ_RES . . . .   NUMB  0047H   A    810# 1428 1687 1928
IECQ_RES1. . . .   NUMB  0053H   A    811# 1568 1572 1576
IECQ_RSY . . . .   NUMB  00D3H   A    823# 1575
IECQ_SSP . . . .   NUMB  0057H   A    812# 1365
IECQ_TIM . . . .   NUMB  0043H   A    808#
IECQ_UAI . . . .   NUMB  00DFH   A    826# 1582
INIT_SI_END. . . C ADDR  0041H   A    1010 1021#
INIT_SICOFI. . . B ADDR  0020H.4 A    313# 1010 1020 1351
INIT_. . . . . . C ADDR  0199H   A    981 1260#
INIT20 . . . . . C ADDR  01B4H   A    1274# 1276
INIT30 . . . . . C ADDR  01B7H   A    1281#
INIT34 . . . . . C ADDR  01B9H   A    1285# 1294 1296 1298
INIT35 . . . . . C ADDR  01BBH   A    1288# 1289 1295
INIT40 . . . . . C ADDR  01CEH   A    1304#
INIT50 . . . . . C ADDR  0211H   A    1350#
INIT60 . . . . . C ADDR  0213H   A    1356#
INIT70 . . . . . C ADDR  0218H   A    1362#
INIT79 . . . . . C ADDR  0220H   A    1368# 1370
```

```
INIT80 . . . . . .    C ADDR   0225H     A       1363 1374#
INIT90 . . . . . .    C ADDR   0249H     A       1391#
INIT95 . . . . . .    C ADDR   0279H     A       1426# 1433
IP . . . . . . . .    D ADDR   00B8H     A       1267
ISR_CLK. . . . . .    C ADDR   03B6H     A       987 1646#
ISR_ICC. . . . . .    C ADDR   028AH     A       984 1447#
ISR_SERIAL . . . .    C ADDR   0576H     A       996 1989#
ISTA_COPY. . . . .    D ADDR   0022H     A       334# 336 337 338 339 340 341 342 343 1457
ISTA . . . . . . .    X ADDR   0020H     A       545# 1305 1455
LAMP_END . . . . .    C ADDR   0191H     A       1241 1243#
LAMP_TEST. . . . .    B ADDR   0090H.7   A       108# 1241
LC_COEF_MSG. . . .      NUMB   000AH     A       962# 1132
LC_COEF_REQ. . . .      NUMB   0009H     A       961# 1059
LC_DSL_TEST_REQ. .    B ADDR   002AH.7   A       444# 1084
LC_ERROR_MSG . . .      NUMB   0008H     A       960#
LC_ERROR_REQ . . .      NUMB   0007H     A       959#
LC_MODEL_MSG . . .      NUMB   0006H     A       958# 1125
LC_MODEL_REQ . . .      NUMB   0005H     A       957# 1054
LC_POWER_ACK . . .      NUMB   0003H     A       955# 1049
LC_POWER_UP. . . .      NUMB   0004H     A       956# 1119
LC_STAT_MSG. . . .      NUMB   0002H     A       954# 1113
LC_STAT_REQ. . . .      NUMB   0001H     A       953# 1044
LC_TEST_MSG. . . .      NUMB   000CH     A       964# 1141
LC_TEST_REQ_A. . .    B ADDR   002AH.5   A       442# 1078
LC_TEST_REQ_B. . .    B ADDR   002AH.6   A       443# 1081
LC_TEST_REQ_ . . .      NUMB   000BH     A       963# 1065
LED_AUX_A. . . . .    B ADDR   002DH.6   A       483# 1763 1771 1783
LED_AUX_B. . . . .    B ADDR   002DH.7   A       484# 1764 1776 1788
LED_DSL_ . . . . .    B ADDR   002DH.1   A       478# 1799 1802
LED_LINE_A . . . .    B ADDR   002DH.4   A       481# 1727
LED_LINE_B . . . .    B ADDR   002DH.5   A       482# 1743
LED_MINOR. . . . .    B ADDR   002DH.0   A       477# 1798 1804 1809
LED_TAMPER . . . .    B ADDR   002DH.3   A       480# 1813
LED_TEST . . . . .    B ADDR   002DH.2   A       479# 1071 1075
LINE_A_ACT . . . .    B ADDR   002CH.0   A       465# 1728
LINE_A_END . . . .    C ADDR   041EH     A       1730#
LINE_A_ON. . . . .    B ADDR   0026H.0   A       394# 1724
LINE_A_RING_REQ. .    B ADDR   0024H.0   A       370# 1722 1726
LINE_A_SERVICE . .    C ADDR   0410H     A       1715 1720#
LINE_B_ACT . . . .    B ADDR   002CH.1   A       466# 1744
LINE_B_END . . . .    C ADDR   042CH     A       1746#
LINE_B_ON. . . . .    B ADDR   0026H.1   A       395# 1740
LINE_B_RING_REQ. .    B ADDR   0024H.4   A       366# 1738 1742
LINE_B_SERVICE . .    C ADDR   041EH     A       1736#
LINE_FAULT . . . .    B ADDR   00B0H.3   A       131#
LINE_TEST_REQ_A. .    B ADDR   0024H.1   A       369# 1164
LINE_TEST_REQ_B. .    B ADDR   0024H.5   A       365# 1188
LINK_TEST_END_ . .    C ADDR   0408H     A       1703 1705#
LINK_UP. . . . . .    B ADDR   002CH.5   A       470# 1548 1599 1657 1659 1703 1760 1797 1833 1837
LOW_I. . . . . . .    B ADDR   0090H.6   A       107# 1842 1862 1873 1885 1898 1921
MAIN_END . . . . .    C ADDR   0191H     A       1249#
MAIN_REC . . . . .    C ADDR   0041H     A       1027#
MAIN_TRANS . . . .    C ADDR   00A3H     A       1101#
MAIN_. . . . . . .    C ADDR   0029H     A       1009# 1253 1435
MASK . . . . . . .    X ADDR   0020H     A       547# 1344
MASKD. . . . . . .      NUMB   0078H     A       558# 1345
MC_MESSAGE . . . .      NUMB   0081H     A       967#
MC_TEST_REQ. . . .      NUMB   000DH     A       965# 1211
MESG_IN_B1 . . . .    B ADDR   0028H.0   A       417#
```

```
MESG_IN_B2 . . .  B ADDR   0028H.3 A   420#
MESG_IN. . . . .  D ADDR   0028H   A   414# 417 418 419 420 421 422 1628 1698
MESG_OUT_B1. . .  B ADDR   002BH.0 A   452#
MESG_OUT_B2. . .  B ADDR   002BH.3 A   455#
MESG_OUT_INIT. .    NUMB   0000H   A   459# 1381
MESG_OUT . . . .  D ADDR   002BH   A   449# 452 453 454 455 456 457 1381 1967
MISSED_REC . . .    REG    R6          220# 1029 1030 1037
MOCR . . . . . .  X ADDR   003AH   A   796#
MOCRD. . . . . .    NUMB   0000H   A   800#
MODE . . . . . .  X ADDR   0022H   A   605# 1338
MODED. . . . . .    NUMB   00CAH   A   612# 1339
MODEL_DUE. . . .  B ADDR   0021H.3 A   320# 1055 1123
MODL_IN_B1 . . .  B ADDR   0028H.2 A   419#
MODL_IN_B2 . . .  B ADDR   0028H.5 A   422#
MODL_OUT_B1. . .  B ADDR   002BH.2 A   454#
MODL_OUT_B2. . .  B ADDR   002BH.5 A   457#
MOR0_COPY0 . . .  D ADDR   0043H   A   519# 1486
MOR0_COPY1 . . .  D ADDR   0042H   A   518# 1487
MOR0_COPY2 . . .  D ADDR   0041H   A   517# 1488
MOR0_COPY3 . . .  D ADDR   0040H   A   516# 1489
MOR0_COPY4 . . .  D ADDR   003FH   A   515# 1490
MOR0_COPY5 . . .  D ADDR   003EH   A   514# 1491
MOR0 . . . . . .  X ADDR   0032H   A   730# 1478
MOR1 . . . . . .  X ADDR   0034H   A   743# 1527
MOS. . . . . . .  B ADDR   0023H.2 A   353# 1477
MOSR . . . . . .  X ADDR   003AH   A   790#
MOSRD. . . . . .    NUMB   0000H   A   794#
MOX0 . . . . . .  X ADDR   0032H   A   733#
MOX0D. . . . . .    NUMB   0000H   A   734#
MOX1 . . . . . .  X ADDR   0034H   A   745# 1513
MREC_10. . . . .  C ADDR   004DH   A   1028 1036#
MREC_20. . . . .  C ADDR   005AH   A   1044 1048#
MREC_30. . . . .  C ADDR   0062H   A   1049 1053#
MREC_40. . . . .  C ADDR   006AH   A   1054 1058#
MREC_50. . . . .  C ADDR   0070H   A   1059 1064#
MREC_52. . . . .  C ADDR   0081H   A   1070 1074#
MREC_54. . . . .  C ADDR   0085H   A   1073 1077#
MREC_60. . . . .  C ADDR   009FH   A   1065 1092#
MREC_END . . . .  C ADDR   00A1H   A   1032 1034 1046 1051 1056 1062 1090 1094#
MREC_ERROR . . .  D ADDR   0038H   A   504# 1093
MTRAN_10 . . . .  C ADDR   00A9H   A   1102 1107#
MTRAN_20 . . . .  C ADDR   00B9H   A   1117#
MTRAN_30 . . . .  C ADDR   00C1H   A   1118 1122#
MTRAN_40 . . . .  C ADDR   00CBH   A   1123 1129#
MTRAN_50 . . . .  C ADDR   00D5H   A   1130 1136#
MTRAN_60 . . . .  C ADDR   00F6H   A   1137 1138 1155#
MTRAN_64 . . . .  C ADDR   011EH   A   1164 1175#
MTRAN_65 . . . .  C ADDR   0131H   A   1163 1174 1185#
MTRAN_67 . . . .  C ADDR   014FH   A   1188 1199#
MTRAN_68 . . . .  C ADDR   0162H   A   1187 1198 1209#
MTRAN_E1 . . . .  C ADDR   017BH   A   1228# 1229
MTRAN_END. . . .  C ADDR   0188H   A   1105 1234#
MTRAN_END1 . . .  C ADDR   00A6H   A   1104# 1108
MTRAN_EXIT . . .  C ADDR   016CH   A   1120 1127 1134 1153 1160 1214 1216#
NO_TONE_A. . . .  C ADDR   1E35H   A   863# 1180
NO_TONE_B. . . .  C ADDR   1E7BH   A   892# 1204
OFF_ST1. . . . .  C ADDR   051DH   A   1913# 1942
OFF_ST2. . . . .  C ADDR   0523H   A   1917# 1950
OFF_ST3. . . . .  C ADDR   052EH   A   1904 1926#
```

```
ON_HOOK_REQ. . .    B ADDR   002AH.4 A    441# 
OVER_ST. . . . .    C ADDR   04C0H   A    1848 1857#
OVERRIDE . . . .    B ADDR   0090H.4 A    105# 1843 1864 1875 1889 1902 1924 1934
P_OFF. . . . . .      NUMB   0002H   A    179# 1369
PU_INIT. . . . .      NUMB   00FFH   A    96# 1261
P0_. . . . . . .    D ADDR   0080H   A    1261 1292
P1_INIT. . . . .      NUMB   00FFH   A    110# 1262
P1_. . . . . . .    D ADDR   0090H   A    101 102 103 104 105 106 107 108 1262
P2_COPY_INIT . .      NUMB   00FFH   A    486# 1376
P2_COPY_ . . . .    D ADDR   002DH   A    475# 477 478 479 480 481 482 483 484 1240 1376
P2_INIT. . . . .      NUMB   00FFH   A    126# 1263
P2_. . . . . . .    D ADDR   00A0H   A    1240 1242 1263
P3_INIT. . . . .      NUMB   00FFH   A    134# 1264
P3_. . . . . . .    D ADDR   00B0H   A    131 132 1264
PASS_HIGH. . . .    D ADDR   002FH   A    492# 1656
PASS_LOW . . . .    D ADDR   002EH   A    491# 1655
PASS_ST. . . . .    C ADDR   04EAH   A    1833 1880# 1938
PCE._. . . . . .    B ADDR   0023H.5 A    350#
PCON . . . . . .    D ADDR   0087H   A    188# 1252 1369 1400
PCOND. . . . . .      NUMB   0080H   A    177# 1400
POW_LED_CKLOW. .    D ADDR   0034H   A    498# 1384 1807 1808
POWER_CKHIGH . .    D ADDR   0037H   A    502# 1386 1852 1861 1872 1884 1897 1916 1947 1949
POWER_CKLOW. . .    D ADDR   0036H   A    501# 1385 1851 1860 1871 1883 1896 1915 1944 1946
POWER_END. . . .    C ADDR   0552H   A    1834 1844 1865 1876 1890 1910 1930 1934 1940 1953#
POWER_INIT . . .    C ADDR   04B1H   A    1837 1846#
POWER_LINKING. .    C ADDR   051DH   A    1893 1912#
POWER_OFF. . . .    C ADDR   04BDH   A    1855#
POWER_OVER . . .    C ADDR   04D2H   A    1856 1867#
POWER_PASS . . .    C ADDR   04FCH   A    1879 1892#
POWER_SERVICE. .    C ADDR   0495H   A    1830#
POWER_SHORT. . .    C ADDR   0536H   A    1851 1852 1932#
POWER_START. . .    C ADDR   04E7H   A    1868 1878#
POWER_STATE. . .    D ADDR   0035H   A    500# 1831 1839 1859 1870 1882 1895 1919
POWER_TIME . . .    C ADDR   04B7H   A    1847 1850#
POWER_UP_DUE . .    B ADDR   0021H.2 A    319# 1050 1118
POWER_UP_. . . .    B ADDR   0020H.5 A    314# 1556 1803 1903 1925
POWER_UPC. . . .    C ADDR   04A0H   A    1832 1836#
POWST_INIT . . .      NUMB   0000H   A    1822# 1847
POWST_LINKED . .      NUMB   0006H   A    1828# 1832 1839
POWST_LINKING. .      NUMB   0005H   A    1827# 1895 1940
POWST_OFF. . . .      NUMB   0001H   A    1823# 1856 1919
POWST_OVER_RIDE.      NUMB   0002H   A    1824# 1859 1868
POWST_PASS_. . .      NUMB   0004H   A    1826# 1882 1893
POWST_START. . .      NUMB   0003H   A    1825# 1870 1879 1936
PSW. . . . . . .    D ADDR   00D0H   A    1268 1449 1639 1648 1982 1990 2002
PT00 . . . . . .    D ADDR   0000H   A    223#
PT01 . . . . . .    D ADDR   0001H   A    224#
PT30 . . . . . .    D ADDR   0018H   A    292#
PT31 . . . . . .    D ADDR   0019H   A    293#
PTR00. . . . . .      REG    R0           214# 1040 1041 1067 1068 1111 1114 1115 1152 1213 1218 1219
                                          1220 1221 1224 1225
PTR01. . . . . .      REG    R1           215#
PTR21. . . . . .      REG    R1           261# 1962 1964 1966 1968 1970 1972
PTR30. . . . . .      REG    R0           283# 1498 1529
PTR31. . . . . .      REG    R1           284# 1506 1622 1623 1625 1627 1630 1632
RB8. . . . . . .    B ADDR   0098H.2 A    2027
RBCH . . . . . .    X ADDR   002AH   A    624#
RBCL . . . . . .    X ADDR   0025H   A    621# 1613
REC_CONT . . . .      REG    R2           285# 1618
```

```
RECEIVE. . . . .  C ADDR   059AH    A          1997 2026#
REF_TERM_REQ . .  B ADDR   002AH.3  A          440#
REF_TERM_SET . .  B ADDR   0027H.3  A          409#
RESET_ALL. . . .  B ADDR   0090H.3  A          104# 1282
RESET_TOL. . . .    NUMB   0078H    A          181#
RESET_ . . . . .  C ADDR   0000H    A          980
RFIFO. . . . . .  X ADDR   0000H    A          690# 1622
RFO. . . . . . .  B ADDR   0023H.4  A          351# 1463
RHCR . . . . . .  X ADDR   0029H    A          685#
RI . . . . . . .  B ADDR   0098H.0  A          1997
RING_DET_SET . .  B ADDR   0027H.4  A          410#
RING_REQ_A . . .  B ADDR   0029H.0  A          428# 1723
RING_REQ_B . . .  B ADDR   0029H.1  A          429# 1739
RLOOP03_CNT. . .    REG    R3                  217# 1289
RLOOP07_CNT. . .    REG    R7                  221# 1286 1295
RME. . . . . . .  B ADDR   0022H.7  A          336# 1604
RPF. . . . . . .  B ADDR   0022H.6  A          337#
RRX_COUNT. . . .    REG    R2                  239# 2032 2036
RRX_POINT. . . .    REG    R0                  237# 2028 2029 2030 2035 2042 2043 2044
RS0. . . . . . .  B ADDR   00D0H.3  A          1451 1650 1993
RS1. . . . . . .  B ADDR   00D0H.4  A          1452 1651 1994
RSC. . . . . . .  B ADDR   0022H.5  A          338#
RST_CONT . . . .    REG    R3                  286# 1531
RSTA . . . . . .  X ADDR   0027H    A          632# 1307 1605
RT_COEF_MSG. . .    NUMB   0086H    A          972#
RT_COEF_REQ. . .    NUMB   0085H    A          971#
RT_MESSAGE . . .    NUMB   0082H    A          968#
RT_MODEL_MSG . .    NUMB   0084H    A          970#
RT_MODEL_REQ . .    NUMB   0083H    A          969#
RT_TEST_REQ_A. .  B ADDR   002AH.0  A          437#
RT_TEST_REQ_B. .  B ADDR   002AH.1  A          438#
RTX_COUNT. . . .    REG    R3                  240# 2009 2019
RTX_LENT . . . .    REG    R5                  219# 1112 1124 1131 1140 1210
RTX_POINT. . . .    REG    R1                  238# 2017 2018
RTX_TYPE . . . .    REG    R4                  218# 1113 1119 1125 1132 1141 1211
RX_BUFF. . . . .  I ADDR   00A0H    A          530# 1040 1067 2029 2042
RX_DATA. . . . .  C ADDR   05A6H    A          2029 2034#
RX_ERROR . . . .  D ADDR   0044H    A          520# 1667
RX_MISED . . . .  D ADDR   0030H    A          493# 1620 1660 1664
RX_READY . . . .  B ADDR   0021H.0  A          317# 1028 1095 2038
RX_TOL . . . . .    NUMB   000AH    A          182# 1665 1666
SADDR. . . . . .  D ADDR   00A9H    A          189# 1395
SADEN. . . . . .  D ADDR   00B9H    A          190# 1396
SAP1 . . . . . .  X ADDR   0026H    A          652#
SAP2 . . . . . .  X ADDR   0027H    A          659#
SAPR . . . . . .  X ADDR   0026H    A          680#
SAW. . . . . . .  B ADDR   0023H.1  A          354#
SBUF . . . . . .  D ADDR   0099H    A          1233 2017 2028 2043
SC_MODEL_MSG . .    NUMB   0084H    A          949#
SC_MODEL_REQ . .    NUMB   0083H    A          948#
SC_STAT_INIT . .    NUMB   00DFH    A          473# 1382
SC_STAT_MSG. . .    NUMB   0082H    A          947#
SC_STAT_REQ. . .    NUMB   0081H    A          946#
SC_STAT. . . . .  D ADDR   002CH    A          462# 465 466 467 468 469 470 471 1114 1382
SC_TEST_MSG. . .    NUMB   0086H    A          951#
SC_TEST_REQ. . .    NUMB   0085H    A          950#
SCON . . . . . .  D ADDR   0098H    A          1271 1392
SCOND. . . . . .    NUMB   00F0H    A          180# 1392
SEIZE_LINE_A . .  B ADDR   0025H.0  A          386# 1725
```

```
SEIZE_LINE_B . .  B ADDR   0025H.4 A        382# 1741
SHORT_10 . . . .  C ADDR   053EH   A        1936 1939#
SHORT_OFF. . . .  B ADDR   0020H.6 A        315# 1840 1942
SICOFI_OPS_LEN .    NUMB   008CH   A        905# 1016
SICOFI_OPS . . .  C ADDR   1E00H   A        846# 905 1015
SIN. . . . . . .  B ADDR   0022H.1 A        342# 1496
SINT . . . . . .  C ADDR   0023H   A        995
SM2. . . . . . .  B ADDR   0098H.5 A        2037 2045
SOV. . . . . . .  B ADDR   0023H.3 A        352# 1467
SP . . . . . . .  D ADDR   0081H   A        1375
SPCR . . . . . .  X ADDR   0030H   A        693# 1320 1323
SPCRD1 . . . . .    NUMB   0080H   A        702# 1321
SPCRD2 . . . . .    NUMB   0045H   A        703# 1324
SSCR_COPY. . . .  D ADDR   0024H   A        358# 365 366 369 370 1156 1714
SSCR . . . . . .  X ADDR   0033H   A        737# 1712
SSCX_DATA. . . .  D ADDR   0025H   A        374# 379 380 381 382 384 385 386 1377 1753
SSCX_INIT. . . .    NUMB   00FFH   A        388# 1358 1377
SSCX . . . . . .  X ADDR   0033H   A        740# 1357 1752
ST_CONT. . . . .  D ADDR   001BH   A        295# 1016 1170 1181 1194 1205
ST_DPTR. . . . .  B ADDR   0020H.3 A        312# 1011 1165 1176 1189 1200 1505 1535
ST_INPROG. . . .  B ADDR   0020H.0 A        309# 1012 1166 1177 1190 1201 1497 1537
ST_NOR . . . . .    NUMB   0070H   A        764# 1330 1472 1533
ST_PTR . . . . .  D ADDR   001CH   A        296# 1498 1539
ST_REC . . . . .  B ADDR   0020H.1 A        310# 1013 1167 1178 1191 1202 1499 1517 1536
ST_SC0 . . . . .    NUMB   0075H   A        768# 1503
ST_SC1 . . . . .    NUMB   007AH   A        767# 1525
ST_ST0 . . . . .    NUMB   0074H   A        766# 1018 1172 1183 1196 1207
ST_ST1 . . . . .    NUMB   0078H   A        765# 1519
ST_WT_RD . . . .  B ADDR   0020H.2 A        311# 1014 1168 1179 1192 1203 1515 1516
STACK. . . . . .  D ADDR   0045H   A        526# 1375
STAR . . . . . .  X ADDR   0021H   A        573# 1959
STAT_IN_INIT . .    NUMB   00FFH   A        400# 1378 1696 1704
STAT_IN. . . . .  D ADDR   0026H   A        391# 394 395 396 397 398 1378 1624 1696 1704
STAT_OUT_INIT. .    NUMB   00FFH   A        431# 1379
STAT_OUT . . . .  D ADDR   0029H   A        425# 428 429 1379 1963
STAT10 . . . . .  C ADDR   047AH   A        1797 1801#
STAT20 . . . . .  C ADDR   0484H   A        1803 1806#
STAT50 . . . . .  C ADDR   048FH   A        1800 1805 1807 1810 1811#
STATUS_DUE . . .  B ADDR   0021H.1 A        318# 1045 1108 1109
STATUS_LC_END. .  C ADDR   0495H   A        1816#
STATUS_LC. . . .  C ADDR   0470H   A        1791 1796#
STCR . . . . . .  X ADDR   0037H   A        755# 1017 1171 1182 1195 1206 1329 1471 1502 1518 1524 1532
T1LOAD . . . . .    NUMB   00FFH   A        176# 1402
T2_CONT. . . . .    NUMB   0004H   A        184# 1089
T2CON. . . . . .  D ADDR   00C8H   A        200# 201 1089
TA_SET . . . . .  B ADDR   0090H.1 A        102# 1230 2012
TA_STAT. . . . .  B ADDR   0090H.2 A        103# 1229
TAMPER_ACT . . .  B ADDR   002CH.4 A        469# 1814
TAMPER_IDLE. . .  B ADDR   0026H.4 A        398# 1812
TB8. . . . . . .  B ADDR   0098H.3 A        1231 2016
TCON . . . . . .  D ADDR   0088H   A        1269
TEI1 . . . . . .  X ADDR   0028H   A        666# 1314
TEI1D. . . . . .    NUMB   00FFH   A        671# 1315
TEI2 . . . . . .  X ADDR   0029H   A        673# 1317
TEI2D. . . . . .    NUMB   00FFH   A        678# 1318
TEST_DSL . . . .  B ADDR   0025H.7 A        379# 1086 1149
TEST_DUE . . . .  B ADDR   0021H.5 A        322# 1087 1137 1139
TEST_IN_COPY . .  D ADDR   003BH   A        507#
TEST_IN_PROG . .  B ADDR   002CH.6 A        471# 1072 1076
```

```
TEST_IN. . . . .  D ADDR   0027H    A      403# 406 407 408 409 410 1142 1626 1697
TEST_LINE_A. . .  B ADDR   0025H.2  A      384# 1080 1143
TEST_LINE_B. . .  B ADDR   0025H.6  A      380# 1083 1146
TEST_OUT_INIT. .    NUMB   0000H    A      446# 1380
TEST_OUT . . . .  D ADDR   002AH    A      434# 437 438 439 440 441 442 443 444 1069 1380 1965
TEST_REQ_COPY. .  D ADDR   003AH    A      506# 1158 1159 1212
TEST_SET_A . . .  B ADDR   0027H.0  A      406#
TEST_SET_B . . .  B ADDR   0027H.1  A      407#
TF2. . . . . . .  B ADDR   00C8H.7  A      201# 1138
TH0. . . . . . .  D ADDR   008CH    A      1405
TH1. . . . . . .  D ADDR   008DH    A      1402
TH2. . . . . . .  D ADDR   00CDH    A      199# 1088
TI . . . . . . .  B ADDR   0098H.1  A      1998
TIM. . . . . . .  B ADDR   0022H.3  A      340#
TIME_BASE. . . .    NUMB   00A0H    A      144# 1383 1384 1385 1386 1405 1780 1808 1860 1861 1871 1872
                                           1883 1884 1896 1897 1915 1916 1945 1948
TIME_FSC . . . .    NUMB   1F40H    A      141# 1405
TIME_POWER_LINK.    NUMB   0028H    A      156# 1896 1897
TIME_POWER_OFF .    NUMB   000AH    A      153# 1385 1386 1915 1916 1945 1948
TIME_POWER_OVER.    NUMB   0001H    A      165# 1860 1861
TIME_POWER_START    NUMB   0004H    A      162# 1871 1872
TIME_POWER_WATE.    NUMB   0001H    A      159# 1883 1884
TIME_TEST_RESP .    NUMB   001EH    A      168# 1088
TIMER0 . . . . .  C ADDR   000BH    A      986
TIMER1 . . . . .  C ADDR   001BH    A      992
TIMR . . . . . .  X ADDR   0023H    A      614#
TIMRD. . . . . .    NUMB   00CCH    A      619#
TMOD . . . . . .  D ADDR   0089H    A      1270 1398
TONE_LEN . . . .    NUMB   0011H    A      933# 1170 1181 1194 1205
TR0. . . . . . .  B ADDR   0088H.4  A      1406
TR1. . . . . . .  B ADDR   0088H.6  A      1403
TRAN_END . . . .  C ADDR   0571H    A      1961 1979#
TRAN_START . . .  C ADDR   0552H    A      1958#
TRANSMIT . . . .  C ADDR   0589H    A      1998 2008#
TRAP . . . . . .  C ADDR   0026H    A      990 993 998#
TX_BUF_ACTIV . .  B ADDR   0021H.6  A      323# 1102 1110 2011
TX_BUFF. . . . .  I ADDR   0080H    A      529# 1111 1218 1232
TX_COUNT . . . .  D ADDR   000BH    A      249# 1222 1223
TX_LENT. . . . .  D ADDR   0005H    A      228# 1221 1222
TX_MISED . . . .  D ADDR   0031H    A      494# 1673 1677 1975
TX_POINT . . . .  D ADDR   0009H    A      247# 1232
TX_TOL . . . . .    NUMB   000AH    A      183# 1678 1679
TX_TYPE. . . . .  D ADDR   0004H    A      227# 1225
WOV. . . . . . .  B ADDR   0023H.0  A      355#
XAD1 . . . . . .  X ADDR   0024H    A      646#
XAD2 . . . . . .  X ADDR   0025H    A      649#
XDU. . . . . . .  B ADDR   0023H.6  A      349#
XFIFO. . . . . .  X ADDR   0000H    A      691# 1962
XMR. . . . . . .  B ADDR   0023H.7  A      348#
XPR. . . . . . .  B ADDR   0022H.4  A      339#

NO REGISTER BANK(S) USED
ASSEMBLY COMPLETE, NO ERRORS FOUND
```

APPENDIX III

Application Processor Code

```
%[

/*

$Workfile:   alm.sm  $
$Revision:   1.2  $
$Date:   07 Sep 1990 21:21:10  $

$Log:   E:/USR/DAML/APPC/ALM/VCS/ALM.SMV  $

      Rev 1.2   07 Sep 1990 21:21:10   bChen
   Commented out showMsg()'s.

      Rev 1.1   31 Aug 1990 17:20:06   bChen
   No changes, just testing pvcs.


      Rev 1.0   31 Aug 1990 17:13:28   bChen
   Initial revision.

*/

static char *vscId="$Header:   E:/USR/DAML/APPC/ALM/VCS/ALM.SMV   1.2   07

#define TEST_DEBUG   1

/*------------------------------------------------------------------------*
 *                    RAYCHEM Corp. / Telecommunications                  *
 *                                                                        *
 *       File: AlmSupv.sm  / AlmSupv.c                                    *
 *    Created: July 23, 1990                                              *
 * Tools used: Microsoft C compiler v. 5.00                               *
 *             Turbo Debugger versions 1.01 and 2.0                       *
 *                                                                        *
 * Description:                                                           *
 *                                                                        *
 * Compilation procedure:                                                 *
 *   AlmSupv.sm  is the control source for AlmSupv.c                      *
 *   The SMC (State Machine Compiler) takes .SM and creates .C            *
 *   example:  smc < PollHnd.SM > PollHnd.C                               *
 *                                                                        *
 * Modification History:                                                  *
 *   8/08/90  BCH: First Version                                          *
 -------------------------------------------------------------------------*/

#       include "rts.h"
#       include "DAMLlit.h"
#       include "DAMLmsg.h"
#       include "DAMLcnf.h"
#       include "inp.h"
#       include "out.h"

extern QUEUE_T *SaveQueue;

]%

stateMachines = {alarmSupervisor};
```

```
smDataTypeDef %[
                    unsigned someData;
                    unsigned moreData;
]%                                              SMX_DATA_T;

states = {          IDLE_STATE
                    };


messages = {         SM_INITIALIZE
                    ,clear_alarms_m
                    ,lc_status_change_m
                    ,sc_comm_change_m
                    ,system_power_failure_m
                    ,system_power_restored_m
                    ,coas_aco_switched_m
                    ,fp_aco_switched_m
                    ,sc_aco_switched_m
                    ,e2a_sac_aco_switched_m
                    ,e2a_apr_aco_switched_m
                    };

transProcs = {      powerOn,
                    functionA,
                    functionB,
                    functionC,
                    functionD,
                    functionE,
                    functionF,
                    functionG,
                    functionH,
                    functionI,
                    functionJ
                    };

transitions = {     IDLE_STATE {
                        SM_INITIALIZE,                  powerOn
                        ,clear_alarms_m,                functionA
                        ,lc_status_change_m,            functionB
                        ,sc_comm_change_m,              functionC
                        ,system_power_failure_m,        functionD
                        ,system_power_restored_m,       functionE
                        ,coas_aco_switched_m,           functionF
                        ,fp_aco_switched_m,             functionG
                        ,e2a_sac_aco_switched_m,        functionH
                        ,e2a_apr_aco_switched_m,        functionI
                        ,sc_aco_switched_m,             functionJ
                    }
                } ;
%[


/*****************************************************************/
/*                    External Declarations                      */
/*****************************************************************/

#define MAX_MINOR_IN_SC     11
#define MAX_MINOR_IN_MC     25


typedef enum {
   CLEAR_ALL,
   MINOR_OFF,
   MAJOR_OFF,
   MINOR_ON,
   MAJOR_ON
} ALARM_COMMAND;
```

```
typedef enum {
   AL_RESET,
   AL_NORMAL,
   AL_MINOR,
   AL_MINOR_MAJOR,
   AL_MAJOR
} ALARM_STATE;

typedef enum {
   LC_NORMAL,
   LC_MINOR,
   LC_MAJOR
} LC_ALARM_STATE;

typedef enum {
   SC_NORMAL,
   SC_MAJOR
} SC_ALARM_STATE;

typedef enum {
   PO_NORMAL,
   PO_MAJOR
} POWER_ALARM_STATE;


/* This is the LC status database */

typedef struct {
   BYTE status [MAX_NUMBER_OF_LC-1/8 + 1];      /* one bit per LC */
   BYTE count;
} LC_STATUS_TABLE [MAX_NUMBER_OF_SC];

typedef SC_STATUS_TABLE [MAX_NUMBER_OF_SC];
typedef struct {
   ALARM_STATE          alarm_state;
   LC_ALARM_STATE       lc_state;
   SC_ALARM_STATE       sc_state;
   POWER_ALARM_STATE    power_state;
   LC_STATUS_TABLE      lcTable;
   WORD                 totalBadLC;          /* total bad LCs */
   SC_STATUS_TABLE      scTable;
   WORD                 totalBadSC;          /* total bad SCs */
} ALARM_DEVICE;


/*****************************************************************/
/*                    Local Variables                            */
/*****************************************************************/

ALARM_DEVICE Fix_Alarms;
ALARM_DEVICE COAS_Alarms;
ALARM_DEVICE FP_Alarms;
ALARM_DEVICE E2A_SAC_Alarms;
ALARM_DEVICE E2A_APR_Alarms;
ALARM_DEVICE SC_Alarms;

/*****************************************************************/
/*                    Local Procedures                           */
/*****************************************************************/
/* ------------------------------------------------------------- */

int countBitsInByte (number, value)
BYTE number;
BYTE value;
{
```

```
BYTE numBitSet;
int i;
int count = 0;

   if (number) {
      for (i = 0;  i < 4;  i++) {
         numBitSet = number & 0x03;
         if (numBitSet == 3) {
            count += 2;
         }
         else if (numBitSet) {
            count += 1;
         }
         number >>= 2;
      }
   }
   if (value == 0) {
      count = 8 - count;
   }
   return (count);

}  /* countBitsinByte */


/* ----------------------------------------------------------------- */

static void clearLC_StatusTable (device)
ALARM_DEVICE *device;
{
int i, j, k;

   k = MAX_NUMBER_OF_LC-1/8 + 1;
   for (i = 0;  i < MAX_NUMBER_OF_SC;  i++) {
      for (j = 0;  j < k;  j++) {
         device->lcTable[i].status[j] = 0;
      }
      device->lcTable[i].count = 0;
   }
   device->totalBadLC = 0;

}  /* clearLC_StatusTable */


/* ----------------------------------------------------------------- */

static void clearSC_StatusTable (device)
ALARM_DEVICE *device;
{
int i;

   for (i = 0;  i < MAX_NUMBER_OF_SC;  i++) {
      device->scTable[i] = GOOD;
   }
   device->totalBadSC = 0;

}  /* clearSC_StatusTable */


/* ----------------------------------------------------------------- */

static void initializeAlarmDevice (device)
ALARM_DEVICE *device;
{
   clearLC_StatusTable (device);
   clearSC_StatusTable (device);
   device->alarm_state = AL_RESET;
   device->lc_state    = LC_NORMAL;
```

```
   device->sc_state    = SC_NORMAL;
   device->power_state = PO_NORMAL;

}


/* -------------------------------------------------------------------- */

static void updateLC_StatusData (device, scNumber, lcNumber, value)
ALARM_DEVICE *device;
BYTE scNumber;
BYTE lcNumber;
BYTE value;
{
BYTE byteNum;
BYTE bitMask;

   byteNum = lcNumber / 8;      /* get byte offset to lc bit */
   bitMask = 0x01 << (lcNumber % 8);      /* get bit offset */;

   if (value == BAD_TO_GOOD) {
      if (device->lcTable[scNumber].status[byteNum] & bitMask) {
         device->lcTable[scNumber].status[byteNum] &= ~bitMask;
         device->lcTable[scNumber].count--;
         device->totalBadLC--;
      }
   }
   else if (value == GOOD_TO_BAD) {
      if (!(device->lcTable[scNumber].status[byteNum] & bitMask)) {
         device->lcTable[scNumber].status[byteNum] |= bitMask;
         device->lcTable[scNumber].count++;
         device->totalBadLC++;
      }
   }

}   /* updateLC_StatusData */


/* -------------------------------------------------------------------- */

static void updateSC_StatusData (device, scNumber, value)
ALARM_DEVICE *device;
BYTE scNumber;
BYTE value;
{

   if (value == BAD_TO_GOOD) {
      if (device->scTable[scNumber] == BAD) {
         device->scTable[scNumber] = GOOD;
         device->totalBadSC--;
      }
   }
   else if (value == GOOD_TO_BAD) {
      if (device->scTable[scNumber] == GOOD) {
         device->scTable[scNumber] = BAD;
         device->totalBadSC++;
      }
   }

}   /* updateSC_StatusData */


/* -------------------------------------------------------------------- */

static void lcMonitor (device, update_alarm, scNumber, lcNumber, value)
```

```
ALARM_DEVICE *device;
void (*update_alarm) ();
BYTE scNumber;
BYTE lcNumber;
BYTE value;
{
int i;

   updateLC_StatusData (device, scNumber, lcNumber, value);

   switch (device->lc_state) {
      case LC_NORMAL:
         if (device->totalBadLC) {
            device->lc_state = LC_MINOR;
            (*update_alarm) (device);
         }
         break;

      case LC_MINOR:
         if (device->totalBadLC) {
            if ((device->totalBadLC > MAX_MINOR_IN_MC) ||
               (device->lcTable[scNumber].count > MAX_MINOR_IN_SC)) {
               device->lc_state = LC_MAJOR;
               (*update_alarm) (device);
            }
         }
         else {
            device->lc_state = LC_NORMAL;
            (*update_alarm) (device);
         }
         break;

      case LC_MAJOR:
         if ((device->totalBadLC <= MAX_MINOR_IN_MC) &&
            (device->lcTable[scNumber].count <= MAX_MINOR_IN_SC)) {
            for (i = 0;  ((device->lcTable[i].count <= MAX_MINOR_IN_SC) &&
                          (i < MAX_NUMBER_OF_SC));  i++);
            if (device->lcTable[i].count <= MAX_MINOR_IN_SC) {
               device->lc_state = LC_MINOR;
               (*update_alarm) (device);
            }
         }
         break;

      default:
         break;
   }  /* switch */

 };  /* lcMonitor */


/* ----------------------------------------------------------------- */

static void scMonitor (device, update_alarm, scNumber, value)
ALARM_DEVICE *device;
void (*update_alarm) ();
BYTE scNumber;
BYTE value;
{

  updateSC_StatusData (device, scNumber, value);

   switch (device->sc_state) {
      case SC_NORMAL:
         if (device->totalBadSC) {
            device->sc_state = SC_MAJOR;
            (*update_alarm) (device);
```

```
         }
         break;

      case SC_MAJOR:
         if (device->totalBadSC <= 0) {
            device->sc_state = SC_NORMAL;
            (*update_alarm) (device);
         }
         break;

      default:
         break;
    } /* switch */
};  /* scMonitor */

/* ---------------------------------------------------------------------- */

static void powerMonitor (device, update_alarm, value)
ALARM_DEVICE *device;
void (*update_alarm) ();
BYTE  value;
{
   switch (device->power_state) {
      case PO_NORMAL:
         if (value == BAD) {
            device->power_state = PO_MAJOR;
            (*update_alarm) (device);
         }
         break;

      case PO_MAJOR:
         if (value == GOOD) {
            device->power_state = PO_NORMAL;
            (*update_alarm) (device);
         }
         break;

      default:
         break;
    } /* switch */
};  /* powerMonitor */

/* ---------------------------------------------------------------------- */

ALARM_COMMAND alarmCommand (device)
ALARM_DEVICE *device;
{
   switch (device->alarm_state) {
      case AL_NORMAL:
         if (device->lc_state == LC_MINOR) {
            device->alarm_state = AL_MINOR;
            return (MINOR_ON);
         }
         else if ((device->sc_state == SC_MAJOR) ||
                  (device->power_state == PO_MAJOR)) {
            device->alarm_state = AL_MAJOR;
            return (MAJOR_ON);
         }
         break;

      case AL_MINOR:
         if (device->lc_state == LC_NORMAL) {
            device->alarm_state = AL_NORMAL;
            return (MINOR_OFF);
         }
```

```
        else if ((device->lc_state == LC_MAJOR) ||
                 (device->sc_state == SC_MAJOR) ||
                 (device->power_state == PO_MAJOR)) {
           device->alarm_state = AL_MINOR_MAJOR;
           return (MAJOR_ON);
        }
        break;

     case AL_MINOR_MAJOR:
        if ((device->sc_state == SC_NORMAL) &&
            (device->power_state == PO_NORMAL)) {
           if (device->lc_state == LC_MINOR) {
              device->alarm_state = AL_MINOR;
              return (MAJOR_OFF);
           }
        }
        else if (device->lc_state == LC_NORMAL) {
           device->alarm_state = AL_MAJOR;
           return (MINOR_OFF);
        }
        break;

     case AL_MAJOR:
        if (device->lc_state == LC_MINOR) {
           device->alarm_state = AL_MINOR_MAJOR;
           return (MINOR_ON);
        }
        else if ((device->sc_state == SC_NORMAL) &&
                 (device->power_state == PO_NORMAL)) {
           device->alarm_state = AL_NORMAL;
           return (MAJOR_OFF);
        }
        break;

     case AL_RESET:
        device->alarm_state = AL_NORMAL;
        return (CLEAR_ALL);
  }

}  /* alarmCommand */


/* ----------------------------------------------------------------- */

static void updateFix_Alarms (device)
ALARM_DEVICE *device;
{
   switch (alarmCommand(&Fix_Alarms)) {
      case MINOR_ON:
         dOutput (COAS_MINOR_WO_ACO, ON);
         dOutput (E2A_SAC_MINOR_WO_ACO, ON);
         break;

      case MINOR_OFF:
         dOutput (COAS_MINOR_WO_ACO, OFF);
         dOutput (E2A_SAC_MINOR_WO_ACO, OFF);
         break;

      case MAJOR_ON:
         dOutput (COAS_MAJOR_WO_ACO, ON);
         dOutput (E2A_SAC_MAJOR_WO_ACO, ON);
         break;

      case MAJOR_OFF:
         dOutput (COAS_MAJOR_WO_ACO, OFF);
         dOutput (E2A_SAC_MAJOR_WO_ACO, OFF);
         break;
```

```
      case CLEAR_ALL:
         dOutput (COAS_MAJOR_WO_ACO, OFF);
         dOutput (E2A_SAC_MAJOR_WO_ACO, OFF);
         dOutput (COAS_MINOR_WO_ACO, OFF);
         dOutput (E2A_SAC_MINOR_WO_ACO, OFF);
         break;

      default:
         break;
   }
}  /* updateFix_Alarms */


/* ------------------------------------------------------------------------ */

static void updateCOAS_Alarms (device)
ALARM_DEVICE *device;
{
   switch (alarmCommand(&COAS_Alarms)) {
      case MINOR_ON:
         dOutput (COAS_MINOR_W_ACO, ON);
/*          cancelInput (COAS_ACO);
         armInput (COAS_ACO, ARM_OFF_ON, coas_aco_switched_m); */
         break;

      case MINOR_OFF:
         dOutput (COAS_MINOR_W_ACO, OFF);
         break;

      case MAJOR_ON:
         dOutput (COAS_MAJOR_W_ACO, ON);
/*          cancelInput (COAS_ACO);
         armInput (COAS_ACO, ARM_OFF_ON, coas_aco_switched_m); */
         break;

      case MAJOR_OFF:
         dOutput (COAS_MAJOR_W_ACO, OFF);
         break;

      case CLEAR_ALL:
         dOutput (COAS_MAJOR_W_ACO, OFF);
         dOutput (COAS_MINOR_W_ACO, OFF);
         break;

      default:
         break;
   }
}  /* updateCOAS_Alarms */


/* ------------------------------------------------------------------------ */

static void updateE2A_SAC_Alarms (device)
ALARM_DEVICE *device;
{
   switch (alarmCommand(&E2A_SAC_Alarms)) {
      case MINOR_ON:
/*          cancelInput (E2A_SAC_ACO);
         armInput (E2A_SAC_ACO, ARM_OFF_ON, e2a_sac_aco_switched_m); */
         dOutput (E2A_SAC_MINOR_W_ACO, ON);
         break;

      case MINOR_OFF:
         dOutput (E2A_SAC_MINOR_W_ACO, OFF);
         break;
```

```
      case MAJOR_ON:
         dOutput (E2A_SAC_MAJOR_W_ACO, ON);
/*          cancelInput (E2A_SAC_ACO);
         armInput (E2A_SAC_ACO, ARM_OFF_ON, e2a_sac_aco_switched_m); */
         break;

      case MAJOR_OFF:
         dOutput (E2A_SAC_MAJOR_W_ACO, OFF);
         break;

      case CLEAR_ALL:
         dOutput (E2A_SAC_MAJOR_W_ACO, OFF);
         dOutput (E2A_SAC_MINOR_W_ACO, OFF);
         break;

      default:
         break;
   }
}  /* updateE2A_SAC_Alarms */

/* ------------------------------------------------------------------ */

static void updateE2A_APR_Alarms (device)
ALARM_DEVICE *device;
{
}


/* ------------------------------------------------------------------ */

static void updateFP_Alarms (device)
ALARM_DEVICE *device;
{
}

/****************************************************************/
/*                    Transition procedures                     */
/****************************************************************/

static SM_STATE_T powerOn (msg, self)
MSG_T *msg;
SM_DESCRIPTOR_T *self;
{

#ifdef TEST_DEBUG
   printf("ALM: Executed Power On\n");
#endif

   initializeAlarmDevice (&Fix_Alarms);
   initializeAlarmDevice (&COAS_Alarms);
   initializeAlarmDevice (&E2A_SAC_Alarms);
   initializeAlarmDevice (&E2A_APR_Alarms);
   initializeAlarmDevice (&FP_Alarms);

   updateFix_Alarms (&Fix_Alarms);
   updateCOAS_Alarms (&COAS_Alarms);
   updateE2A_SAC_Alarms (&E2A_SAC_Alarms);
   updateE2A_APR_Alarms (&E2A_APR_Alarms);
   updateFP_Alarms (&FP_Alarms);

   armInput (SYSTEM_POWER_FAULT, ARM_OFF_ON, system_power_failure_m);
   return(IDLE_STATE);

};  /* powerOn */
```

```
/*****************************************************************/
/*                    Function A                                 */
/*****************************************************************/
static SM_STATE_T functionA(msg, self)  /* clear_alarms_m */
BASIC_MSG_T *msg;
SM_DESCRIPTOR_T *self;
{
#ifdef DEBUG
   printf("ALM A: clear alarms message\n");
   /* showMsg((MSG_T *) msg); */
#endif

   return(self->state);

};  /* functionA */


/*****************************************************************/
/*                    Function B                                 */
/*****************************************************************/

static SM_STATE_T functionB(msg, self)    /* lc_status_change_m */
LC_CHANGE_MSG_T *msg;
SM_DESCRIPTOR_T *self;
{
unsigned scNumber;
unsigned lcNumber;

#ifdef TEST_DEBUG
   printf("ALM B: lc_status_change_m message\n");
   /* showMsg((MSG_T *) msg); */
#endif

   scNumber = msg->scAddr;
   lcNumber = msg->lcAddr;
   lcNumber--;                 /* adjust for array index usage */
   scNumber--;                 /* adjust for array index usage */


   lcMonitor (&Fix_Alarms, updateFix_Alarms,
              scNumber, lcNumber, msg->change);
   lcMonitor (&COAS_Alarms, updateCOAS_Alarms,
              scNumber, lcNumber, msg->change);
   lcMonitor (&E2A_SAC_Alarms, updateE2A_SAC_Alarms,
              scNumber, lcNumber, msg->change);

/*
   lcMonitor (&E2A_APR_Alarms, updateE2A_APR_Alarms,
              scNumber, lcNumber, msg->change);
   lcMonitor (&FP_Alarms, updateFP_Alarms,
              scNumber, lcNumber, msg->change);
*/

   return (self->state);

};  /* function B */


/*****************************************************************/
/*                    Function C                                 */
/*****************************************************************/

static SM_STATE_T functionC(msg, self)  /* sc_comm_status_change_m */
SC_COMM_CHANGE_MSG_T *msg;
SM_DESCRIPTOR_T *self;
{
BYTE scNumber;
```

```
#ifdef TEST_DEBUG
   printf("ALM C: sc_status_change_m message\n");
   /* showMsg((MSG_T*) msg); */
#endif

   scNumber = msg->scAddr;
   scNumber--;                    /* adjust for array index usage */

   scMonitor (&Fix_Alarms, updateFix_Alarms, scNumber, msg->change);
   scMonitor (&COAS_Alarms, updateCOAS_Alarms, scNumber, msg->change);
   scMonitor (&E2A_SAC_Alarms, updateE2A_SAC_Alarms, scNumber, msg->change)
/*
   scMonitor (&E2A_APR_Alarms, updateE2A_APR_Alarms, scNumber, msg->change)
   scMonitor (&FP_Alarms, updateFP_Alarms, scNumber, msg->change);
*/
   return (self->state);

};


/*****************************************************************/
/*                     Function D                                */
/*****************************************************************/

static SM_STATE_T functionD(msg, self)  /* system_power_failure_m */
INP_MSG_T *msg;
SM_DESCRIPTOR_T *self;
{

#ifdef TEST_DEBUG
   printf("ALM D: system_power_failure message\n");
    /* showMsg((MSG_T *) msg); */
#endif

   powerMonitor (&Fix_Alarms, updateFix_Alarms, BAD);
   powerMonitor (&COAS_Alarms, updateCOAS_Alarms, BAD);
   powerMonitor (&E2A_SAC_Alarms, updateE2A_SAC_Alarms, BAD);
   powerMonitor (&E2A_APR_Alarms, updateE2A_APR_Alarms, BAD);
   powerMonitor (&FP_Alarms, updateFP_Alarms, BAD);
   armInput (SYSTEM_POWER_FAULT, ARM_ON_OFF, system_power_restored_m);
   return (self->state);

};   /* functionD */


/*****************************************************************/
/*                     Function E                                */
/*****************************************************************/

static SM_STATE_T functionE(msg, self)  /* system_power_restored_m */
INP_MSG_T *msg;
SM_DESCRIPTOR_T *self;
{

#ifdef TEST_DEBUG
   printf("ALM E: system_power_restored message\n");
   /* showMsg((MSG_T *) msg); */
#endif

   powerMonitor (&Fix_Alarms, updateFix_Alarms, GOOD);
   powerMonitor (&COAS_Alarms, updateCOAS_Alarms, GOOD);
   powerMonitor (&E2A_SAC_Alarms, updateE2A_SAC_Alarms, GOOD);
   powerMonitor (&E2A_APR_Alarms, updateE2A_APR_Alarms, GOOD);
   powerMonitor (&FP_Alarms, updateFP_Alarms, GOOD);
   armInput (SYSTEM_POWER_FAULT, ARM_OFF_ON, system_power_failure_m);
   return (self->state);

};   /* functionE */
```

```
/*********************************************************************/
/*                    Function F                                    */
/*********************************************************************/
static SM_STATE_T functionF(msg, self)  /* coas_aco_switch_m */
INP_MSG_T *msg;
SM_DESCRIPTOR_T *self;
{

#ifdef TEST_DEBUG
   printf("ALM F: coas_aco_switch\n");
   /* showMsg((MSG_T *) msg); */
#endif

    initializeAlarmDevice (&COAS_Alarms);
    return (self->state);

};  /* functionF */


/*********************************************************************/
/*                    Function G                                    */
/*********************************************************************/
static SM_STATE_T functionG(msg, self)  /* fp_aco_switch_m */
INP_MSG_T *msg;
SM_DESCRIPTOR_T *self;
{

#ifdef TEST_DEBUG
   printf("ALM G: fp_aco_switch\n");
   /* showMsg((MSG_T *) msg); */
#endif

    initializeAlarmDevice (&FP_Alarms);
    return (self->state);

};  /* functionG */


/*********************************************************************/
/*                    Function H                                    */
/*********************************************************************/
static SM_STATE_T functionH(msg, self)  /* e2a_sac_aco_switch_m */
INP_MSG_T *msg;
SM_DESCRIPTOR_T *self;
{

#ifdef TEST_DEBUG
   printf("ALM H: e2a_sac_aco_switch\n");
    /* showMsg((MSG_T *) msg); */
#endif

    initializeAlarmDevice (&E2A_SAC_Alarms);
    return (self->state);

};  /* functionH */


/*********************************************************************/
/*                    Function I                                    */
/*********************************************************************/
static SM_STATE_T functionI(msg, self)  /* e2a_apr_aco_switch_m */
INP_MSG_T *msg;
SM_DESCRIPTOR_T *self;
{

#ifdef TEST_DEBUG
   printf("ALM I: e2a_apr_aco_switch\n");
```

```
   /* showMsg((MSG_T *) msg); */
#endif

   initializeAlarmDevice (&E2A_APR_Alarms);
   return (self->state);

};  /* functionI */


/******************************************************************/
/*                    Function J                                  */
/******************************************************************/
static SM_STATE_T functionJ(msg, self)  /* sc_aco_switch_m */
INP_MSG_T *msg;
SM_DESCRIPTOR_T *self;
{

#ifdef TEST_DEBUG
   printf("ALM J: sc_aco_switch\n");
   /* showMsg((MSG_T *) msg); */
#endif

   initializeAlarmDevice (&SC_Alarms);
   return (self->state);

};  /* functionJ */



]%


/*

$Workfile:   inp.h  $
$Revision:   1.0  $
$Date:   31 Aug 1990 17:56:18   $

$Log:   E:/USR/DAML/APPC/INP/VCS/INP.H_V  $
 *
 *    Rev 1.0   31 Aug 1990 17:56:18   bChen
 * Initial revision.

*/


#ifndef HD_INP
#      define HD_INP


#ifdef DO_inp
#  define EXTERN
#else
#  define EXTERN extern
#endif
/*
   your definitions go here
*/


#ifdef DEBUG
#define DEBUG_INP
#endif

/* DIDIGTAL INPUT AND OUTPUT VALUES USE TRUE LOW LOGIC */
```

```
#define ON  0
#define OFF 1


/* Digital ports arm condition codes */

typedef enum {
            ARM_ON,
            ARM_OFF,
            ARM_ON_OFF,
            ARM_OFF_ON,
            ARM_ON_OFF_ON,
            ARM_OFF_ON_OFF } ARM_CONDITION;

/* Logical Port Names, digital ports */

#define PGTC_OH1            0
#define PGTC_OH2            1
#define PGTC_OH3            2
#define PGTC_OH4            3
#define PGTC_LOCK1          4
#define PGTC_LOCK2          5
#define PGTC_LOCK3          6
#define PGTC_LOCK4          7
#define PGTC_PROCEED1               8
#define PGTC_PROCEED2               9
#define PGTC_PROCEED3               10
#define PGTC_PROCEED4               11
#define PGTC_TEST_ALM               12
#define COAS_ACO            13
#define E2A_SAC_STAT1               14
#define E2A_SAC_ACO                 15
#define SYSTEM_POWER_FAULT 16
#define LOOP_CURRENT                17

/* Logical Port Names, analog ports */

#define RING_CURRENT_IN             18
#define TIP_CURRENT_IN              19
#define RING_VOLTAGE_IN             20
#define TIP_VOLTAGE_IN              21
#define REFLECTED_VOLTAGE_IN        22

#define NUM_LOGICAL_PORTS  23


extern void pollInputs();
extern void inputsInit();
extern void armInput(unsigned, ARM_CONDITION, unsigned);
extern int  getInput(unsigned);
extern void cancelInput(unsigned);
/*
   clean up
*/
#undef EXTERN

#endif /* HD_INP */

/*

$Workfile:   inp.man  $
$Revision:   1.0  $
$Date:   31 Aug 1990 17:57:56  $

$Log:   E:/USR/DAML/APPC/INP/VCS/INP.MAV  $
```

```
    Rev 1.0   31 Aug 1990 17:57:56   bChen
  Initial revision.

*/


Input Handler usage:


#include "inp.h"

void inputsInit();

void pollInputs();

void armInput(portName,condition,msgName)
unsigned portName;
ARM_CONDITION condition;
unsigned msgName;

int getInput(portName);
unsigned portName;

void cancelInput(portName);
unsigned portName;


inputsInit must be calledduring system initialization from
environmentInit.  pollInputs mustbe called every clock tick from
synchTasks.  armInput will set the inputHandlerto start looking for
the indicated condition at portName. When the conditionis found a
message with msgName is sent to the requesting state machine. The
supported conditions are:

   ARM_ON
   ARM_OFF
   ARM_ON_OFF
   ARM_OFF_ON
   ARM_ON_OFF_ON
   ARM_OFF_ON_OFF

Only digital type ports may be armed.
getInput returns the port value read in the last clock tick. portName
may be digtal or analog type. getInput returns ON or OFF (inverted
logic ON=0) for digital inputs. For analog inputs it returs an
integer in the followin ranges:

   INPUT                          RANGE      UNITS
   _________________________    ________   ________

   RING_CURRENT_IN               -/+ 100000  uA
   TIP_CURRENT_IN                -/+ 100000  uA
   RING_VOLTAGE_IN               -/+ 15000   Volts/100
   TIP_VOLTAGE_IN                -/+ 15000   Volts/100
   REFLECTED_VOLTAGE_IN          -/+   500   Volts/100


cancelInput will cancel the armed input. If the message has already
been sent, cancelMsg will be used to cancel it. In any case, the
canceled message is NOT guaranteed.

The supported ports are listed in inp.h.
```

ERROR CODES

```
E_INVALID_ARM_INPUT_CONDITION
    Requested arm condition not supported.

E_INVALID_INPUT_NAME
    Logical input port name not valid.

E_ARMING_NON_DIGITAL_INPUT
    Only digital type inputs can be armed.

E_ARMING_PORT_TWICE
    Input ports can be armed only once.

E_A2D_HUNG_ON_BUSY
    The Versalogic A/D converter busy bit is stuck.
```

```
/*

$Workfile:   inparm.c  $
$Revision:   1.0  $
$Date:   31 Aug 1990 17:55:56  $

$Log:   E:/USR/DAML/APPC/INP/VCS/INPARM.C_V  $
 *
 *    Rev 1.0   31 Aug 1990 17:55:56   bChen
 * Initial revision.

*/

static char *vscId="$Header:   E:/USR/DAML/APPC/INP/VCS/INPARM.C_V   1.0


#include "inppriv.h"

void decodeCondition(port,condition)
unsigned port;
ARM_CONDITION condition;
{

   switch(condition) {

            case ARM_ON :
                    lPorts[port].condCount= 1;
                    lPorts[port].nextCond = 0;
                    lPorts[port].condSequence[0] = ON ;
                    break;
            case ARM_OFF :
                    lPorts[port].condCount =1;
                    lPorts[port].nextCond = 0;
                    lPorts[port].condSequence[0] = OFF ;
                    break;
            case ARM_ON_OFF :
                    lPorts[port].condCount =2;
                    lPorts[port].nextCond  =0;
                    lPorts[port].condSequence[0] = ON ;
                    lPorts[port].condSequence[1] = OFF ;
                    break;
            case ARM_OFF_ON :
                    lPorts[port].condCount =2;
                    lPorts[port].nextCond  =0;
                    lPorts[port].condSequence[0] = OFF ;
                    lPorts[port].condSequence[1] = ON ;
                    break;
```

```
        case ARM_ON_OFF_ON :
                lPorts[port].condCount =3;
                lPorts[port].nextCond  =0;
                lPorts[port].condSequence[0] = ON ;
                lPorts[port].condSequence[1] = OFF ;
                lPorts[port].condSequence[2] = ON ;
                break;
        case ARM_OFF_ON_OFF :
                lPorts[port].condCount =3;
                lPorts[port].nextCond  =0;
                lPorts[port].condSequence[0] = OFF;
                lPorts[port].condSequence[1] = ON ;
                lPorts[port].condSequence[2] = OFF ;
                break;
        default :
                setError ( E_INVALID_ARM_INPUT_CONDITION,
                           (unsigned)condition,
                            __FILE__, __LINE__ );
                break;
        }
}

void armInput( port, condition, msgName)
unsigned      port;
ARM_CONDITION condition;
unsigned      msgName;
{

   decodeCondition(port,condition);

   if ( port >= NUM_LOGICAL_PORTS )
        setError( E_INVALID_INPUT_NAME,port, __FILE__, __LINE__ );

   if ( lPorts[port].portType != DIGITAL_INP )
        setError( E_ARMING_NON_DIGITAL_INPUT,lPorts[port].lPortLabel,__

   if ( lPorts[port].state != DISARMED )
        setError( E_ARMING_PORT_TWICE,lPorts[port].lPortLabel,__FILE__,

   lPorts[port].state = ARMED;

   lPorts[port].eventMsg = msgAlloc(0);
   lPorts[port].eventMsg->fields.name = msgName;
   lPorts[port].eventMsg->fields.dest = currentSM;
   lPorts[port].eventMsg->fields.origin = SYSTEM_INPUT_HANDLER;
   lPorts[port].eventMsg->header.status = IN_INPUT;
}

/*

$Workfile:   inpcancl.c  $
$Revision:   1.0  $
$Date:   31 Aug 1990 17:56:04   $

$Log:   E:/USR/DAML/APPC/INP/VCS/INPCANCL.C_V  $
 *
 *    Rev 1.0   31 Aug 1990 17:56:04   bChen
 * Initial revision.

*/

static char *vscId="$Header:   E:/USR/DAML/APPC/INP/VCS/INPCANCL.C_V   1.0
```

```
#include "inppriv.h"

void cancelInput(port)
unsigned port;
{

   if ( port >= NUM_LOGICAL_PORTS )
            setError( E_INVALID_INPUT_NAME,port, __FILE__, __LINE__ );

   if ( lPorts[port].eventMsg == NULL )
            cancelMsg( (MSG_T *)lPorts[port].eventMsg );
   else {
            lPorts[port].eventMsg->header.status = CANCELED;
            msgFree( lPorts[port].eventMsg );
   }
   clearLPort(&lPorts[port]);
}


/*

$Workfile:   inpget.c  $
$Revision:   1.0  $
$Date:   31 Aug 1990 17:56:06   $

$Log:   E:/USR/DAML/APPC/INP/VCS/INPGET.C_V  $
 *
 *    Rev 1.0   31 Aug 1990 17:56:06   bChen
 * Initial revision.

*/


static char *vscId="$Header:   E:/USR/DAML/APPC/INP/VCS/INPGET.C_V   1.0


#include "inppriv.h"


int getPortVal(lPort)
LOGICAL_PORT *lPort;
{
   int val;

   val = pPorts[lPort->pPortName].value & lPort->pPortMask;

   if ( lPort->portType == DIGITAL_INP ) {
            if ( val != 0 )
                    val = OFF ;
   }
   else { /* convert and scale D/A value */
            val = val - 512;

            val = (long)((long)val * (long)lPort->scaleFnum) /
                    lPort->scaleFden;

   }

   return(val);
}


int getInput(port)
unsigned port;
{
```

```
  if ( port >= NUM_LOGICAL_PORTS )
        setError( E_INVALID_INPUT_NAME,port, __FILE__, __LINE__ );

  return(getPortVal(&lPorts[port]));
}

/*

$Workfile:   inpglob.c  $
$Revision:   1.0  $
$Date:   31 Aug 1990 17:55:56  $

$Log:   E:/USR/DAML/APPC/INP/VCS/INPGLOB.C_V  $
 *
 *    Rev 1.0   31 Aug 1990 17:55:56   bChen
 * Initial revision.

*/


static char *vscId="$Header";


#define DO_inp
#include "inppriv.h"


/*

$Workfile:   inpinit.c  $
$Revision:   1.0  $
$Date:   31 Aug 1990 17:56:02  $

$Log:   E:/USR/DAML/APPC/INP/VCS/INPINIT.C_V  $
 *
 *    Rev 1.0   31 Aug 1990 17:56:02   bChen
 * Initial revision.

*/


static char *vscId="$Header:   E:/USR/DAML/APPC/INP/VCS/INPINIT.C_V   1.0

#include "inppriv.h"


void clearLPort(lPort)
LOGICAL_PORT *lPort;
{
            lPort->state      = DISARMED;
            lPort->eventMsg   = NULL;
            lPort->condCount  = 0;
            lPort->nextCond   = 0;
}


void inputsInit()
{

   int port;

   for( port = 0 ; port < NUM_PHYSICAL_PORTS; port++ )
         pPorts[port].value=0;

   for( port = 0 ; port < NUM_LOGICAL_PORTS; port++ )
         clearLPort(&lPorts[port]);
}
```

```
/*

$Workfile:   inppoll.c  $
$Revision:   1.0  $
$Date:   31 Aug 1990 17:56:00  $

$Log:   E:/USR/DAML/APPC/INP/VCS/INPPOLL.C_V  $
 *
 *    Rev 1.0   31 Aug 1990 17:56:00   bChen
 * Initial revision.

*/


static char *vscId="$Header:   E:/USR/DAML/APPC/INP/VCS/INPPOLL.C_V   1.0


#include "inppriv.h"

static void checkPort(lPort)
LOGICAL_PORT *lPort;
{
   unsigned val=OFF;

   if ( (pPorts[lPort->pPortName].value & lPort->pPortMask) == 0 )
           val = ON;

   if ( lPort->condSequence[lPort->nextCond]== val ) {
           lPort->nextCond++;

           if ( lPort->nextCond >= lPort->condCount ){
                   sendMsg(lPort->eventMsg);
                   clearLPort(lPort);
           }
   }
}


void pollInputs()
{

   int port;

   for( port = 0 ; port < NUM_PHYSICAL_PORTS; port++ )
           pPorts[port].value=(pPorts[port].readFunc)();


        for ( port = 0 ; port < NUM_LOGICAL_PORTS; port++ )
           if ( lPorts[port].state == ARMED )
                   checkPort(&lPorts[port]);
}

/*

$Workfile:   inppriv.h  $
$Revision:   1.0  $
$Date:   31 Aug 1990 17:56:16  $

$Log:   E:/USR/DAML/APPC/INP/VCS/INPPRIV.H_V  $
 *
 *    Rev 1.0   31 Aug 1990 17:56:16   bChen
 * Initial revision.

*/
```

```
#ifndef HD_INP_PRIVATE
#     define HD_INP_PRIVATE


/*
   your include files go here
*/
#ifndef HD_STDIO
#  include <stdio.h>
#  define HD_STDIO
#endif
#ifndef HD_QUE
#  include "que.h"
#endif
#ifndef HD_SER
#  include "ser.h"
#endif
#ifndef HD_SCH
#  include "sch.h"
#endif
#ifndef HD_APP_ERR
#  include "appser.h"
#endif
#ifndef HD_DAML
#  include "DAMLlit.h"
#endif



#ifndef HD_OUT
#  include "out.h"
#endif

#ifndef HD_INP
#  include "inp.h"
#endif

#ifdef DO_inp
#  define EXTERN
#else

#  define EXTERN extern
#endif
/*
   your definitions go here
*/


/* Physical Ports Names, Digital ports */

#define PGTC_B              0
#define PGTC_C0             1
#define PGTC_C1             2
#define ALARMS_PORT         3
#define VOICE_FREQ_PORT 4

/* Physical Ports Names, Analog ports */

#define ANALOG_C0   5
#define ANALOG_C1   6
#define ANALOG_C2   7
#define ANALOG_C3   8
#define ANALOG_C4   9

#define NUM_PHYSICAL_PORTS 10

/* Physical ports base adresses */
```

```
#define PGTC_B_ADDRESS              0x0B01
#define PGTC_C_ADDRESS              0x0B02
#define ALARMS_PORT_ADDRESS         0x0C01
#define VOICE_FREQ_PORT_ADDRESS 0x0D00
#define VL1226_ADDRESS              0x0400

#define AD_MAX_LOOPS             20


typedef struct {
   unsigned  pPortName;
   char      *pPortLabel;
   unsigned  value;
   unsigned  (*readFunc)();
} PHYSICAL_PORT;

typedef enum { ANALOG_INP, DIGITAL_INP } LPORT_TYPE;
typedef enum { ARMED , DISARMED } LPORT_STATE;

typedef struct {
   unsigned          lPortName;
   char              *lPortLabel;
   LPORT_TYPE        portType;
   unsigned          pPortName;
   unsigned          pPortMask;
   unsigned          scaleFnum;
   unsigned          scaleFden;
   LPORT_STATE       state;
   MSG_T             *eventMsg;
   unsigned          condCount;
   unsigned          nextCond;
   unsigned          condSequence[3];
}LOGICAL_PORT;


/* Physical Ports read functions */

extern unsigned readPGTC_B();
extern unsigned readPGTC_C0();
extern unsigned readPGTC_C1();
extern unsigned readALARMS_PORT();
extern unsigned readVOICE_FREQ_PORT();

extern unsigned readANALOG_C0();
extern unsigned readANALOG_C1();
extern unsigned readANALOG_C2();
extern unsigned readANALOG_C3();
extern unsigned readANALOG_C4();



#ifdef DO_inp

/* Logical Ports Configuration */

LOGICAL_PORT lPorts[ NUM_LOGICAL_PORTS ]= {

/* PGTC_OH1 */
                  PGTC_OH1,
                  "PGTC_OH1",
                  DIGITAL_INP,
                  PGTC_B,
                  0x0001,
                  0,
                  0,
                  DISARMED, NULL, 0,0, 0,0,0,
```

```
/* PGTC_OH2 */
                    PGTC_OH2,
                    "PGTC_OH2",
                    DIGITAL_INP,
                    PGTC_B,
                    0x0002,
                    0,0,
                    DISARMED, NULL, 0,0, 0,0,0,
/* PGTC_OH3 */
                    PGTC_OH3,
                    "PGTC_OH3",
                    DIGITAL_INP,
                    PGTC_B,
                    0x0004,
                    0,0,
                    DISARMED, NULL, 0,0, 0,0,0,
/* PGTC_OH4 */
                    PGTC_OH3,
                    "PGTC_OH3",
                    DIGITAL_INP,
                    PGTC_B,
                    0x0008,
                    0,0,
                    DISARMED, NULL, 0,0, 0,0,0,
/* PGTC_LOCK1 */
                    PGTC_LOCK1,
                    "PGTC_LOCK1",
                    DIGITAL_INP,
                    PGTC_B,
                    0x0010,
                    0,0,
                    DISARMED, NULL, 0,0, 0,0,0,
/* PGTC_LOCK2 */
                    PGTC_LOCK2,
                    "PGTC_LOCK2",
                    DIGITAL_INP,
                    PGTC_B,
                    0x0020,
                    0,0,
                    DISARMED, NULL, 0,0, 0,0,0,
/* PGTC_LOCK3 */
                    PGTC_LOCK3,
                    "PGTC_LOCK3",
                    DIGITAL_INP,
                    PGTC_B,
                    0x0040,
                    0,0,
                    DISARMED, NULL, 0,0, 0,0,0,
/* PGTC_LOCK4 */
                    PGTC_LOCK3,
                    "PGTC_LOCK3",
                    DIGITAL_INP,
                    PGTC_B,
                    0x0080,
                    0,0,
                    DISARMED, NULL, 0,0, 0,0,0,
/* PGTC_PROCEED1 */
                    PGTC_PROCEED1,
                    "PGTC_PROCEED1",
                    DIGITAL_INP,
                    PGTC_C0,
                    0x0001,
                    0,0,
                    DISARMED, NULL, 0,0, 0,0,0,
/* PGTC_PROCEED2 */
                    PGTC_PROCEED2,
                    "PGTC_PROCEED2",
```

```
                    DIGITAL_INP,
                    PGTC_C0,
                    0x0002,
                    0,0,
                    DISARMED, NULL, 0,0, 0,0,0,
/* PGTC_PROCEED3 */
                    PGTC_PROCEED3,
                    "PGTC_PROCEED3",
                    DIGITAL_INP,
                    PGTC_C0,
                    0x0004,
                    0,0,
                    DISARMED, NULL, 0,0, 0,0,0,
/* PGTC_PROCEED4 */
                    PGTC_PROCEED4,
                    "PGTC_PROCEED4",
                    DIGITAL_INP,
                    PGTC_C0,
                    0x0008,
                    0,0,
                    DISARMED, NULL, 0,0, 0,0,0,
/* PGTC_PGTC_TEST_ALM */
                    PGTC_TEST_ALM,
                    "PGTC_TEST_ALM",
                    DIGITAL_INP,
                    PGTC_C1,
                    0x0001,
                    0,0,
                    DISARMED, NULL, 0,0, 0,0,0,
/* COAS_ACO */
                    COAS_ACO,
                    "COAS_ACO",
                    DIGITAL_INP,
                    ALARMS_PORT,
                    0x0001,
                    0,0,
                    DISARMED, NULL, 0,0, 0,0,0,
/* E2A_SAC_STAT1 */
                    E2A_SAC_STAT1,
                    "E2A_SAC_STAT1",
                    DIGITAL_INP,
                    ALARMS_PORT,
                    0x0002,
                    0,0,
                    DISARMED, NULL, 0,0, 0,0,0,
/* E2A_SAC_ACO*/
                    E2A_SAC_ACO,
                    "E2A_SAC_ACO",
                    DIGITAL_INP,
                    ALARMS_PORT,
                    0x0004,
                    0,0,
                    DISARMED, NULL, 0,0, 0,0,0,
/* SYSTEM_POWER_FAULT */
                    SYSTEM_POWER_FAULT,
                    "SYSTEM_POWER_FAULT",
                    DIGITAL_INP,
                    ALARMS_PORT,
                    0x0008,
                    0,0,
                    DISARMED, NULL, 0,0, 0,0,0,
/* LOOP_CURRENT */
                    LOOP_CURRENT,
                    "LOOP_CURRENT",
                    DIGITAL_INP,
                    VOICE_FREQ_PORT,
                    0x0080,
```

```
                    0,0,
                    DISARMED, NULL, 0,0, 0,0,0,
/* RING_CURRENT_IN */
                    RING_CURRENT_IN,
                    "RING_CURRENT_IN",
                    ANALOG_INP,
                    ANALOG_C0,
                    0x0fff,
                    10000,512,
                    DISARMED, NULL, 0,0, 0,0,0,
/* TIP_CURRENT_IN */
                    TIP_CURRENT_IN,
                    "TIP_CURRENT_IN",
                    ANALOG_INP,
                    ANALOG_C1,
                    0x0fff,
                    10000,512,
                    DISARMED, NULL, 0,0, 0,0,0,
/* RING_VOLTAGE_IN */
                    RING_VOLTAGE_IN,
                    "RING_VOLTAGE_IN",
                    ANALOG_INP,
                    ANALOG_C2,
                    0x0fff,
                    15000,512,
                    DISARMED, NULL, 0,0, 0,0,0,
/* TIP_VOLTAGE_IN */
                    TIP_VOLTAGE_IN,
                    "TIP_VOLTAGE_IN",
                    ANALOG_INP,
                    ANALOG_C3,
                    0x0fff,
                    15000,512,
                    DISARMED, NULL, 0,0, 0,0,0,
/* REFLECTED_VOLTAGE_IN */
                    REFLECTED_VOLTAGE_IN,
                    "REFLECTED_VOLTAGE_IN",
                    ANALOG_INP,
                    ANALOG_C4,
                    0x0fff,
                    500,512,
                    DISARMED, NULL, 0,0, 0,0,0
};


/* Physical Ports Configuration  */
PHYSICAL_PORT  pPorts[ NUM_PHYSICAL_PORTS ] = {

/* PGTC_B */
                    PGTC_B,
                    "PGTC_B",
                    0,
                    readPGTC_B,
/* PGTC_C0 */
                    PGTC_C0,
                    "PGTC_C0",
                    0,
                    readPGTC_C0,
/* PGTC_C1 */
                    PGTC_C1,
                    "PGTC_C1",
                    0,
                    readPGTC_C1,

/* ALARMS_PORT */
                    ALARMS_PORT,
                    "ALARMS_PORT",
```

```
                        0,
                        readALARMS_PORT,

/* VOICE_FREQ_PORT */
                        VOICE_FREQ_PORT,
                        "VOICE_FREQ_PORT",
                        0,
                        readVOICE_FREQ_PORT,
/* ANALOG_C0 */
                        ANALOG_C0,
                        "ANALOG_C0",
                        0,
                        readANALOG_C0,

/* ANALOG_C1 */
                        ANALOG_C1,
                        "ANALOG_C1",
                        0,
                        readANALOG_C1,

/* ANALOG_C2 */
                        ANALOG_C2,
                        "ANALOG_C2",
                        0,
                        readANALOG_C2,

/* ANALOG_C3 */
                        ANALOG_C3,
                        "ANALOG_C3",
                        0,
                        readANALOG_C3,

/* ANALOG_C4 */
                        ANALOG_C4,
                        "ANALOG_C4",
                        0,
                        readANALOG_C4

                        };

#else /* DO_inp */

extern LOGICAL_PORT   lPorts[ NUM_LOGICAL_PORTS ];
extern PHYSICAL_PORT  pPorts[ NUM_PHYSICAL_PORTS ];

#endif


extern void clearLPort( LOGICAL_PORT *);



/*
   clean up
*/
#undef EXTERN

#endif /* HD_INP_PRIVATE */

/*

$Workfile:   inpread.c  $
$Revision:   1.0  $
$Date:   31 Aug 1990 17:55:58  $
```

```
$Log:   E:/USR/DAML/APPC/INP/VCS/INPREAD.C_V  $
 *
 *    Rev 1.0   31 Aug 1990 17:55:58   bChen
 * Initial revision.
* 8/16/90: Modified readANALOG to correct left shift precedence error. BCH
* 8/27/90: Modified readANALOG to correct parenthesis misplacement. BCH
*/

static char *vscId="$Header:   E:/USR/DAML/APPC/INP/VCS/INPREAD.C_V   1.0

#include "inppriv.h"


unsigned readPGTC_B()
{
   return((unsigned)inp(PGTC_B_ADDRESS));
}

unsigned readPGTC_C0()
{


   dOutput(PGTC_MUX_SELECT, 0 );
   return((unsigned)inp(PGTC_C_ADDRESS));
}

unsigned readPGTC_C1()
{


   dOutput(PGTC_MUX_SELECT, 1 );

   return((unsigned)inp(PGTC_C_ADDRESS));
}


unsigned readALARMS_PORT()
{
   return((unsigned)inp(ALARMS_PORT_ADDRESS));
}


unsigned readVOICE_FREQ_PORT()
{
   return((unsigned)inp(VOICE_FREQ_PORT_ADDRESS));
}

static readANALOG(channel)
unsigned channel;
{
   unsigned  highA2D;
   unsigned count=0;

   outp(VL1226_ADDRESS + 3, channel );

   while( (highA2D=(unsigned)inp(VL1226_ADDRESS + 5)) & 0x80 )
            if ( count++ > AD_MAX_LOOPS)
                     setError( E_A2D_HUNG_ON_BUSY, __FILE__, __LINE__ );

   return((highA2D << 8) + (unsigned) inp(VL1226_ADDRESS + 4 ));
}


unsigned readANALOG_C0()
{
```

```
   return(readANALOG(0));
}

unsigned readANALOG_C1()
{
   return(readANALOG(1));
}

unsigned readANALOG_C2()
{
   return(readANALOG(2));
}

unsigned readANALOG_C3()
{
   return(readANALOG(3));
}

unsigned readANALOG_C4()
{
   return(readANALOG(4));
}

/*

$Workfile:   cictst.c  $
$Revision:   1.0  $
$Date:   01 Sep 1990 09:27:24   $

$Log:   E:/USR/DAML/APPC/LCE/VCS/CICTST.C_V  $
 *
 *    Rev 1.0   01 Sep 1990 09:27:24   bChen
 * Initial revision.

*/

static char *vscId="$Header:   E:/USR/DAML/APPC/LCE/VCS/CICTST.C_V   1.0

#define TEST 1

#include "DAMLlit.h"
#include "LCe.h"
#include "lcepriv.h"   /* NEED TO GET ACCESS TO CIC REGISTERS */
#include "out.h"

/*
------------------------------------------------------------------------
                     FILE: CICTST.c  to test lcedvr for CIC operations
------------------------------------------------------------------------
*/

/* ****************************************************************** */
/* ****************************************************************** */

void linkTheLC_IECQ()
{

BYTE state;
BYTE C_I_code;
BYTE CIRO_Image;

   outp(0x931,0x47);
```

```
state = 1;  /* WAIT FOR DEAC */
while (state != 0)
{
CIR0_Image = inp(0x931);   /* ICC C/I READ REGISTER */

C_I_code = (CIR0_Image & 0x3c) >> 2;

    switch(state)
        {
        case 1:  /* CHECK DEAC */
            {
            if (C_I_code == 0x01)
                {
               state =2;  /* WAIT FOR DI */
               outp(0x931,0x43);
                }
           break;
            }
       case 2:  /* WAIT FOR DI */
           {
           if (C_I_code == 0x0f)
               {
               state =3;  /* WAIT FOR DI */
               outp(0x931,0x63);
               }
           break;
           }
        case 3:
           {
           state = 0;
           break;
           }
        default: break;

        }   /* END SWITCH */
} /* END WHILE */

}

/* *******************************************************************
 *                          MAIN PROCEDURE
 *******************************************************************
*/
void main()
{

extern void interrupt far LC_SICOFI_Interrupts ();

BYTE SicofiCommand;
BYTE result;
static BYTE WriteBuf[10];   /* TO CONTAIN CR1,...,CR3 and COP's COEFF's.
static BYTE readBuf[10];
BYTE cr1Value;
BYTE cr2Value;
BYTE cr3Value;
int i;
long int j=0;
long int k=0;
int count;
BYTE cicStat;
BYTE currentShort ;
BYTE flag;

    disableInterrupts();

    outputHandlerInit();
```

```
  init_LC_ICC();
  interruptsInit();
  setHandler(0x01,LC_SICOFI_Interrupts);
  interruptsStart();

  setLCInterrupts(ALL_ICC_INTERRUPTS_OFF);

  clearPendingLCInterrupts();

  setLCInterrupts(SIN_INTERRUPT_MASK);

/* RESET & POWER UP SICOFI - CHANNEL A */
/* ********************************************************************** */
  SicofiCommand = setSOP(SICOFI_CHANNEL_A,
                         SICOFI_WRITE,
                         POWER_UP,
                         RESET_SICOFI,0);

   sendLCSicofiCommand(1 /* ORIGINATOR */
                             ,SicofiCommand
                             ,WriteBuf);

  for (i=0;i<1000;i++) if (getLCSicofiStat() == OKAY) break;


/* RESET & POWER UP SICOFI - CHANNEL B */
/* ********************************************************************** */
  SicofiCommand = setSOP(SICOFI_CHANNEL_B,
                         SICOFI_WRITE,
                         POWER_UP,RESET_SICOFI,0);

   sendLCSicofiCommand(1 /* ORIGINATOR */
                             ,SicofiCommand
                             ,WriteBuf);

  for (i=0;i<1000;i++) if (getLCSicofiStat() == OKAY) break;

/* ********************************************************************** */
 /* WRITE A CR1 COMMAND - TO CHANNEL A*/
/* ???? REMEMBER TO CONFIGURE SICOFI SBx to OUTPUT */

  SicofiCommand = setSOP(SICOFI_CHANNEL_A,
                         SICOFI_WRITE,
                         POWER_UP,NIL,CR1_Len);

  WriteBuf[0] = setCR1(ENABLE_FILTER,
                       ENABLE_FILTER,
                       DISABLE_FILTER,
                       DISABLE_FILTER,
                       DISABLE_FILTER,
                       DISABLE_FILTER,
                       SBX_INPUT_SEL, NIL);

   sendLCSicofiCommand(1 /* ORIGINATOR */
                             ,SicofiCommand
                             ,WriteBuf);

   for (i=0;i<1000;i++) if (getLCSicofiStat() == OKAY) break;


   /* VERIFY SICOFI CR1 */
   SicofiCommand = setSOP(SICOFI_CHANNEL_A,
                          SICOFI_READ,
                          POWER_UP,NIL,CR1_Len);

   while (requestLCSicofiStatus(1, /* ORIGINATOR */
```

```
                              SicofiCommand) == BUSY)
      ;

   for(i=0;i<100;i++) if ( getLCSicofiStatus(1, /* ORIGINATOR */
                              readBuf) == OKAY) break;


   setLCInterrupts(ALL_ICC_INTERRUPTS_OFF);
   clearPendingLCInterrupts();

/* ************************************************************** */
   LCSicofiSignallingOutput(_45mA_GENERATOR,OFF);
   LCSicofiSignallingOutput(_5mA_GENERATOR,OFF);

   LCSicofiSignallingOutput(VOICE_CHANNEL_SELECT,HIGH);
/* LCSicofiSignallingOutput(VOICE_CHANNEL_SELECT,LOW); */

   LCSicofiSignallingOutput(LC_OUTPUT_SELECT,LOW);
   LCSicofiSignallingOutput(LC_OUTPUT_SELECT,HIGH);   /* SELECT DSL */

   /* HAVE AUTOCUTOFF AVAILABLE */
   LcSicofiSignallingOutput(AUTO_CUTOFF_OVRD,OFF);

   /* APPLY 50 mA FOR 3 SECS. */
   LCSicofiSignallingOutput(_45mA_GENERATOR,ON);
   LCSicofiSignallingOutput(_5mA_GENERATOR,ON);

   for(j=0;j<=60000;j++) i=0;

   LCSicofiSignallingOutput(AUTO_CUTOFF_OVRD,ON);


   /* CHECK FOR SHORTS */
   currentShort = LCSicofiSignallingInput( LOW_110V_DETECTOR);

   if (currentShort == 1)
   /* REDUCE TO 5 mA */
      LCSicofiSignallingOutput(_45mA_GENERATOR,OFF);

   if (flag) {
   LCSicofiSignallingOutput(_5mA_GENERATOR,OFF);
   LCSicofiSignallingOutput(_5mA_GENERATOR,ON );
   LCSicofiSignallingOutput(_5mA_GENERATOR,OFF);
   LCSicofiSignallingOutput(_5mA_GENERATOR,ON );
   LCSicofiSignallingOutput(_5mA_GENERATOR,OFF);

   LcSicofiSignallingOutput(AUTO_CUTOFF_OVRD,OFF);

   LCSicofiSignallingOutput(_45mA_GENERATOR,OFF);
   LCSicofiSignallingOutput(_45mA_GENERATOR,ON);
   LCSicofiSignallingOutput(_45mA_GENERATOR,OFF);
   LCSicofiSignallingOutput(_45mA_GENERATOR,ON);
   LCSicofiSignallingOutput(_45mA_GENERATOR,OFF);

   LCSicofiSignallingOutput(_5mA_GENERATOR,OFF);
   LCSicofiSignallingOutput(_5mA_GENERATOR,ON);
   LCSicofiSignallingOutput(_5mA_GENERATOR,OFF);
   LCSicofiSignallingOutput(_5mA_GENERATOR,ON );
   LCSicofiSignallingOutput(_5mA_GENERATOR,OFF);

   LcSicofiSignallingOutput(AUTO_CUTOFF_OVRD,ON);

   LCSicofiSignallingOutput(_45mA_GENERATOR,ON);

   LCSicofiSignallingOutput(_45mA_GENERATOR,OFF);
   LCSicofiSignallingOutput(_5mA_GENERATOR,OFF);
   }
```

```
   dOutput(VF_OSC_SELECT,ON);
   dOutput(VF_LCEM_CONNECT,OFF);

/* ********************************************************************* */
/* ********************************************************************* */

   linkTheLC_IECQ();


   /* BEGIN LINKING PROCESS */
   setLCInterrupts(CIC_INTERRUPT_MASK);

}   /* END MAIN */

/*

$Workfile:   emulutil.c  $
$Revision:   1.0  $
$Date:   01 Sep 1990 09:27:30   $

$Log:   E:/USR/DAML/APPC/LCE/VCS/EMULUTIL.C_V  $
 *
 *    Rev 1.0   01 Sep 1990 09:27:30   bChen
 * Initial revision.

*/

static char *vscId="$Header:   E:/USR/DAML/APPC/LCE/VCS/EMULUTIL.C_V   1.0

#include "DAMLlit.h"
#include "lce.h"

/* *********************************************************************
 *                  setSOP ROUTINE
 **********************************************************************
*/
BYTE setSOP(ad, rw, pu, rst, lsel)
BYTE ad;   /* CHANNEL A OR B */
BYTE rw;   /* READ OR WRITE */
BYTE pu;   /* POWER UP OR DOWN */
BYTE rst;  /* RESET SICOFI YES OR NO */
BYTE lsel; /* LENGTH SELECT INFO 0 to 3 FOR CR1,... CR3 */
{
   /*
   Given the SOP parameters, pack the info into one SOP byte.
   Lsel is masked, interpreted and set correctly. i.e. if lsel input
   value is 3 SOP_value for lsel is bits 01.
   */

BYTE SOP_value;

   SOP_value = 0x04;   /* START WITH BASIC SOP xxxx01xx */

   if (ad== 0)
      SOP_value &= 0x7f;   /* OPERATE ON CHANNEL A */
   else
      SOP_value |= 0x80;

   if (rw== 0)
      SOP_value &= 0xbf;   /* WRITE = 0 */
   else
      SOP_value |= 0x40;

   if (pu== 0)
```

```
      SOP_value &= 0xdf;   /* POWER DOWN */
   else
      SOP_value |= 0x20;
   if (rst== 0)
      SOP_value &= 0xef;   /* DO NOT RESET */
   else
      SOP_value |= 0x10;   /* RESET SICOFI */

   if ((lsel & 0x03) > 0)
      SOP_value |= 4 - ( lsel & 0x03);

   return (SOP_value);

}   /* END  setSOP */


/* ******************************************************************
 *                   setCR1 ROUTINE
 ******************************************************************
*/
BYTE setCR1(B_filter, Z_filter, X_filter, R_filter, GX_filter,
            GR_filter, SB_port, u_A_selection )
BYTE B_filter; /* ALL FILTERS B TO GB FILTERS DISABLE/ENABLE */
BYTE Z_filter;
BYTE X_filter;
BYTE R_filter;
BYTE GX_filter;
BYTE GR_filter;
BYTE SB_port;    /* SBx input/output port selection */
BYTE u_A_selection ;   /* u or A Law selection */
{
   /*
   Give the CR1 parameter, it sets the proper bits and return
   CR1 value.
   */
BYTE CR1_value;

   CR1_value = (0x04);   /* START WITH BASIC SOP xxxx01xx */

   if (B_filter == 0)
      CR1_value &= 0x7f;   /* DISABLE FILTER */
   else
      CR1_value |= 0x80;

   if (Z_filter == 0)
      CR1_value &= 0xbf;   /* DISABLE FILTER */
   else
      CR1_value |= 0x40;

   if (X_filter == 0)
      CR1_value &= 0xdf;   /* DISABLE FILTER */
   else
      CR1_value |= 0x20;

   if (R_filter== 0)
      CR1_value &= 0xef;   /* DISABLE FILTER */
   else
      CR1_value |= 0x10;

   if (GX_filter== 0)
      CR1_value &= 0xf7;   /* DISABLE FILTER */
   else
      CR1_value |= 0x08;

   if (GR_filter== 0)
      CR1_value &= 0xfb;   /* DISABLE FILTER */
```

```
  else
     CR1_value |= 0x04;

  if (SB_port == 0)
     CR1_value &= 0xfd;   /* Signalling SBx port selection is INPUT */
  else
     CR1_value |= 0x02;   /* Signalling SBx port selection is OUTPUT */

  if (u_A_selection == 0)
     CR1_value &= 0xfe;   /* SELECT A-LAW */
  else
     CR1_value |= 0x01;   /* SELECT u-LAW */


  return (CR1_value);

}   /* END  setSOP */

/* *********************************************************************
 *                    setCR2 ROUTINE
 **********************************************************************
 */
BYTE setCR2(Rcv_AGC, Xmt_AGC, Tone2, Tone1)
BYTE Rcv_AGC;   /* 0 to 14 dB Atten */
BYTE Xmt_AGC;
BYTE Tone2;   /* ENABLE OR DISABLE ON-CHIP TONE GENERATOR */
BYTE Tone1;
{
   /*
   Give the CR2 parameter, it sets the proper bits and return
   the CR2 value.
   */

BYTE CR2_value;

   CR2_value = 0;   /* START WITH BASIC CR2 xxxxxx00 */

  CR2_value |= (Rcv_AGC << 6);   /* RCV AGC attenuation value */

  CR2_value |= ((Xmt_AGC & 0x03)<< 4);   /* XMIT AGC attenuation value */


   if (Tone2 == 0)
      CR2_value &= 0xf7;   /* DISABLE TONE 2 */
   else
      CR2_value |= 0x08;

   if (Tone1 == 0)
      CR2_value &= 0xfb;   /* DISABLE TONE 1 */
   else
      CR2_value |= 0x04;

   return (CR2_value);

 }   /* END  setCR2 */

/* *********************************************************************
 *                    setCR3 ROUTINE
 **********************************************************************
 */
BYTE setCR3(swap, dhipass, cutoff_Rcv, dXmits, aloopback, dloopback)
BYTE swap;
BYTE dhipass;
BYTE cutoff_Rcv;
BYTE dXmits;
```

```
BYTE aloopback;
BYTE dloopback;
{
/*
   Prepare the CR3 parameter, it sets the proper bits and return
   CR3 value.
*/
BYTE CR3_value;

   CR3_value = 0;

   if (swap == 0)
      CR3_value &= 0x7f;   /* NO SWAP - GO STRAIGHT */
   else
      CR3_value |= 0x80;  /* CHANNEL A & B ARE SWAPPED */

   if (dhipass == 0)
      CR3_value &= 0xbf;   /* 0 = ENABLE HIGHPASS */
   else
      CR3_value |= 0x40;

   if (cutoff_Rcv == 0)
      CR3_value &= 0xdf;
   else
      CR3_value |= 0x20;   /* NO ANALOG VOICE OUTPUT */

   if (dXmits== 0)
      CR3_value &= 0xef;'  /* SIGNALLING XMIT ENABLED */
   else
      CR3_value |= 0x10;   /* DO NOT XMIT SIGNALLING */

   CR3_value |= ((aloopback & 0x03)<< 2);   /* ANALOG LOOPBACK SELECTION */
   CR3_value |= (dloopback & 0x03);         /* DIGITAL LOOPBACK SELECTION *
   return (CR3_value);

}   /* END  setCR3 */


/* ********************************************************************
 *                  setNOP ROUTINE
 **********************************************************************
*/
BYTE setNOP()
{
   /*
   Prepares NOP command for requesting SICOFI Status info.
   */

   return (0x0c);   /* BASIC NOP */

}   /* END  setSOP */


/* ********************************************************************
 *                  setCOP  ROUTINE
 **********************************************************************
*/
BYTE setCOP(ad, rw, code)
BYTE ad;    /* CHANNEL A OR B */
BYTE rw;    /* READ OR WRITE */
BYTE code; /* FILTER COEFFICIENT CODE */
{
   /*
   Prepares the COP command from the given parameters
   */
```

```
BYTE COP_value;

   if (ad== 0)
      COP_value = 0;    /* OPERATE ON CHANNEL A */
   else
      COP_value = 0x80;

   if (rw== 0)
      COP_value &= 0xbf;    /* WRITE TO SICOFI = 0 */
   else
      COP_value |= 0x40;

   COP_value |= ( code & 0x3f);

   return (COP_value);

}   /* END  setSOP */


#define MAX_COP_FILTERS              8

/* **********************************************************************
 *                    getCOP_Code_length ROUTINE
 ***********************************************************************
*/
BYTE getCOP_Code_length(coef_name)
BYTE coef_name;   /* 1 OF THE 8 FILTER COEFFICIENT NAMES */
{
   /*
   Return the length of the corresponding to the given
   filter coefficient.
   */

int i;
int flag;

   i = 0;
   flag = NOT_FOUND;

   while ((i<= 8 ) && (flag == NOT_FOUND))
     {
     if (SicofiNameToCode[i].name == coef_name)
        flag = FOUND;
     else i++;
     }

   if (flag == FOUND)
      return (SicofiNameToCode[i].length);
   else
      return (NOT_FOUND);   /* NOT_FOUND is not a valid code */

}   /* END get_code */

/* **********************************************************************
 *                    getSICOFICommandLength ROUTINE
 ***********************************************************************
*/
getSICOFICommandLength(command)
BYTE command;
{
/*
   Given the SICOFI command, the procedure returns the number
   of data bytes to follow the SICOFI command.
*/
BYTE len;
BYTE code;
```

```
  code = command & SICOFI_COMMAND_MASK;
  if (code == SOP_COMMAND_CODE)
     {
     /* Lenth of SOP command is determined by LSEL */
     len = command & SOP_LSEL_MASK;
     if (len > 0)
        return( 4 - len);
     else
        return(0);
     }
  else if (command == NOP_COMMAND_CODE)
     {
     return (0);
     }
  else
     /* COP command */
     {
     return(
           getCOP_Code_length( getCOPName(command & COP_CODE_MASK))
           );
     }

}

/*

$Workfile:   lce.h  $
$Revision:   1.0  $
$Date:   01 Sep 1990 09:27:52  $

$Log:   E:/USR/DAML/APPC/LCE/VCS/LCE.H_V  $
 *
 *    Rev 1.0   01 Sep 1990 09:27:52   bChen
 * Initial revision.

*/


/* File: lce.h */
/*
-----------------------------------------------------------------------
                    LC EMULATOR GENERAL DEFINITIONS
-----------------------------------------------------------------------
*/
#define SICOFI_CHANNEL_A            0
#define SICOFI_CHANNEL_B            1

#define SICOFI_WRITE       0
#define SICOFI_READ     1

#define POWER_UP           1
#define POWER_DOWN         0
#define RESET_SICOFI       1

#define CR1_Len                 1
#define CR2_Len            2
#define CR3_Len                 3
#define SBX_INPUT_SEL      0
#define SBX_OUTPUT_SEL     1
#define uLAW            1
#define aLAW            0

#define CHANNEL_STRAIGHT        0
#define CHANNEL_SWAP            1

#define ENABLE_FILTER                     1
#define DISABLE_FILTER                    0
```

```
#define ENABLE_HIGHPASS          0
#define DISABLE_HIGHPASS         1

/* LC Emulator - Filter Coefficient Name Definitions */
#define B_FILTER_1      1
#define B_FILTER_2      2
#define Z_FILTER        3
#define B_FILTER_DELAY  4
#define X_FILTER        5
#define R_FILTER        6
#define GX_FILTER       7
#define GR_FILTER       8

/* LC Sicofi Signalling Logical Output Port Names */
#define VOICE_CHANNEL_SELECT        1
#define LC_OUTPUT_SELECT            2
#define _5mA_GENERATOR                      3
#define _45mA_GENERATOR                     4
#define AUTO_CUTOFF_OVRD            5

/* LC Sicofi Signalling Logical Input Port Names */
#define LOW_110V_DETECTOR                   1


/* */
#define ALL_ICC_INTERRUPTS_OFF       0xff
#define SIN_INTERRUPT_MASK           0xfd   /* 1111 1101 */
#define RME_INTERRUPT_MASK           0x7f   /* 0111 1111 */
#define CIC_INTERRUPT_MASK           0xfb   /* 1111 1011 */
#define EXIR_NTERRUPT_MASK           0xfe   /* 1111 1110 */

#define SICOFI_COMMAND_MASK          0x0c   /* xxxx 11xx */
#define SOP_COMMAND_CODE             0x04   /* xxxx 01xx */
#define NOP_COMMAND_CODE             0x0c   /* xxxx 11xx */
/* COP code is everything except SOP and NOP i.e. 10 and 00 */

#define SOP_LSEL_MASK                0x03   /* xxxx xx11 */
#define COP_CODE_MASK                0x3f   /* xx11 1111 */
#define MAX_SICOFI_COMMAND_LEN       8


/* ICC REGISTER DEFINITIONS */

/* ICC CONFIGURATION - USED DURING INIT */
#define SPCR_POWER_DOWN          0x80  /* PWR DOWN */
#define SPCR_CONFIG              0x45  /* THEN PWR UP, SAC & SIP CONFIG */
#define MODE_CONFIG              0xc2  /* Transparent Mode 2, */
                                       /* Rcv INACTIVE, IOM Rev 1 */
                                       /* w/ DATA TRANSFER */
#define CMDR_CONFIG              0x41  /* Receiver and Xmitter Reset */
#define LC_STCR_CONFIG           0x60  /* 0x60 for LC, 0x70 for RT */
#define CIX0_CONFIG              0x47
/* END ICC CONFIGURATION */

/* IEC-Q CODES */
#define IECQ_AI        0x0c
#define IECQ_AR        0x08
#define IECQ_ARM       0x09
#define IECQ_DC        0x0f
#define IECQ_DEAC      0x01
#define IECQ_DI        0x0f
#define IECQ_DR        0
#define IECQ_EI1       0x04
#define IECQ_EI3       0x0b
#define IECQ_FJ        0x02
#define IECQ_LSL       0x0d
#define IECQ_PU        0x0c
```

```
#define IECQ_RES         0x01
#define IECQ_RES1        0x04
#define IECQ_RSY         0x04
#define IECQ_SSP         0x05
#define IECQ_UAI         0x07


/* END OF LC EMULATOR DEFINITIONS */


/*

$Workfile:   lcecom.c  $
$Revision:   1.1  $
$Date:   05 Sep 1990 15:58:42  $

$Log:   E:/USR/DAML/APPC/LCE/VCS/LCECOM.C_V  $
 *
 *    Rev 1.1   05 Sep 1990 15:58:42   bChen
 * No changes made, module not fully tested yet.  Just testing PVCS.
 *
 *    Rev 1.0   04 Sep 1990 12:50:12   bChen
 * Initial revision.

*/


static char *vscId="$Header:   E:/USR/DAML/APPC/LCE/VCS/LCECOM.C_V   1.1

#include "DAMLlit.h"
#include "lce.h"
#include "lcepriv.h"

/* CMDR REGISTER BITS */
#define RRES_mask          0x40   /* RCV RESET */
#define RMC_mask           0x80   /* RCV MESSAGE ACK */
#define XTF_mask           0x08   /* XMT TRANSPARENT FRAME */
#define XME_mask           0x02   /* XMT MSG END */
#define XRES_mask          0x01   /* XMITTER RESET */

/* RSTA REGISTER BITS */
#define RDA_mask           0x80
#define RDO_mask           0x40
#define CRC_mask           0x20
#define RAB_mask           0x10

/* MODE REGISTER BITS */
#define RAC_mask           0x08

/* EXIR REGISTER BIT DEFINITIONS */
#define XMR_mask           0x80
#define RFO_mask           0x10
#define SOV_mask           0x08

#define ICC_RCV_BUFFER_SIZE   5
#define ICC_XMT_BUFFER_SIZE   5
#define DATA_RCV_STATE        1
#define RCV_IDLE_STATE        0

static BYTE rcvBuf[ICC_RCV_BUFFER_SIZE];
static BYTE xmtBuf[ICC_XMT_BUFFER_SIZE];

static BYTE CMDR_Reg_Image;
static BYTE LC_EXIR_Reg_Image;

BYTE rcvState;
BYTE EXIR_SOV_errCnt;
```

```
BYTE EXIR_XMR_errCnt;
BYTE EXIR_RFO_errCnt;


/* ***********************************************************************
 *          LC_RME_isr()   Interrupt Service Procedure
 ***********************************************************************
*/
LC_RME_isr()
{
int i;
BYTE status;

   status = inp(RSTA);
   if (status == CRC_mask)
      {
      for(i=0;i<ICC_RCV_BUFFER_SIZE;i++) rcvBuf[i]=inp(RFIFO);
      outp(CMDR, CMDR_Reg_Image | RMC_mask);  /* ACK RCV */
      rcvState = DATA_RCV_STATE;
      }
}


BYTE rcvLC_ICC(buffer)
BYTE buffer[];
{
int i;

   if (rcvState == DATA_RCV_STATE)
      {
      for(i=0;i<ICC_RCV_BUFFER_SIZE;i++) buffer[i]= rcvBuf[i];
      rcvState = RCV_IDLE_STATE;
      return OKAY;
      }
   else return NOT_OKAY;
}

sendLC_ICC(buffer)
BYTE buffer[];
{
int i;

   for(i=0;i<ICC_XMT_BUFFER_SIZE;i++) outp(XFIFO,buffer[i]);
   outp(CMDR,CMDR_Reg_Image | XTF_mask | XME_mask);
}

initLCcomm()
{
   CMDR_Reg_Image = CMDR_CONFIG;
   outp(CMDR,CMDR_Reg_Image);
   outp(CMDR,CMDR_Reg_Image | RRES_mask | XRES_mask);
   rcvState = RCV_IDLE_STATE;

   LC_MODE_Reg_Image = MODE_CONFIG | RAC_mask;
   outp(MODE, LC_MODE_Reg_Image);    /* activate HDLC rcv */
}

resetLCcomm()
{

   LC_MODE_Reg_Image = MODE_CONFIG ;
   outp(MODE, LC_MODE_Reg_Image);    /* DE-activate HDLC rcv */
}


/* ***********************************************************************
 *          LC_EXIR_isr()   Interrupt Service Procedure
 ***********************************************************************
```

```
*/
LC_EXIR_isr()
{
   LC_EXIR_Reg_Image = inp(EXIR);

   if (LC_EXIR_Reg_Image & SOV_mask)
      EXIR_SOV_errCnt++;
   else if (LC_EXIR_Reg_Image & XMR_mask)
      EXIR_XMR_errCnt++;
   else if (LC_EXIR_Reg_Image & RFO_mask)
      EXIR_RFO_errCnt++;

}   /* END EXIR_isr */
/*

$Workfile:   lcedvr.c  $
$Revision:   1.4  $
$Date:   06 Sep 1990 14:25:24  $

$Log:   E:/USR/DAML/APPC/LCE/VCS/LCEDVR.C_V  $
 *
 *    Rev 1.4   06 Sep 1990 14:25:24   bChen
 * Renamed SicofiSignalOut to LC_SicofiSignalOut
 *
 *    Rev 1.3   04 Sep 1990 16:11:06   bChen
 * Deleted CIC_isr().
 *
 *    Rev 1.2   01 Sep 1990 14:45:54   bChen
 * modified requestSicofiStatus() to poll ISTA after the read SIN begins.
 *
 *    Rev 1.1   01 Sep 1990 11:53:24   bChen
 * Improve speed problem by: (1) changing send_Sicofi_Command()
 * and requestSicofiStatus() to enableInterrupts() before the outp().
 * (2) Now Sicofi interrupts for COMMAND_STATE is handled in a polling
 * manner once it enters into the interrupt procedure and until all
 * data is written according to Sicofi_Write_Count.
 *
 *
 *    Rev 1.0   01 Sep 1990 09:27:36   bChen
 * Initial revision.

*/


static char *vscId="$Header:   E:/USR/DAML/APPC/LCE/VCS/LCEDVR.C_V   1.4

/* 8/8/90 : Added CIC Handling */
/* 8/9/90 : Changed Sicofi Output FOR SBX TO SO2A */
/* 8/15/90 : Add sendLC_IECQ() */


#include "DAMLlit.h"
#include "lce.h"           /* ALL MODULES USING LCE UTILS SHOULD USE */
#include "lcepriv.h"


/* ************************************************************** */
/* SICOFI Interrupt Service Procedure State Definitions */
/* ************************************************************** */
#define IDLE_STATE             1
#define COMMAND_STATE          2
#define REQUEST_STATUS_STATE   3
#define GET_ARGUMENT_STATE     4
#define GET_STATUS_STATE       5
#define PENDING_STATE          6
#define WAIT_ONE_CYCLE         7
```

```
/* IEC-Q STATES */
#define IECQ_INACTIVE          0
#define IECQ_LINKING           1
#define IECQ_ACTIVE            2
#define DEACTIVATING           3
#define ERROR_INDICATION       4

/* GENERAL ICC MASKS */
#define STCR_SC0_MASK         LC_STCR_CONFIG | 0x01
#define STCR_SC1_MASK         LC_STCR_CONFIG | 0x02
#define STCR_ST0_MASK         LC_STCR_CONFIG | 0x04
#define STCR_ST1_MASK         LC_STCR_CONFIG | 0x08

#define CIC0_mask             0x02
#define CODR0_mask            0x3c
#define CODX0_mask                 0x3c
#define SIN_mask              0x02
#define CIC_mask              0x04
#define EXIR_mask             0x01
#define RME_mask                   0x80

#define getCOX0Code(code) (code<<2)


/*
-----------------------------------------------------------------------
                                   VARIABLE DECLARATIONS
-----------------------------------------------------------------------
*/

BYTE  LC_MODE_Reg_Image;
static BYTE  LC_ISTA_Reg_Image;
static BYTE  LC_MASK_Reg_Image;
static BYTE  LC_STCR_Image;
static BYTE LC_CIX0_Reg_Image;

static int EXIR_Intrt_cnt=0;

static BYTE Sicofi_State;
static BYTE LC_CIC_State;
static char Sicofi_Write_Count;
static BYTE Sicofi_Read_Args;
static char Sicofi_Read_Count;
static WORD Sicofi_Read_Originator;
static WORD Sicofi_Write_Originator;
static BYTE bufferVal;

static BYTE Sicofi_Read_Buffer[MAX_SICOFI_COMMAND_LEN+2];
static BYTE Sicofi_Write_Buffer[MAX_SICOFI_COMMAND_LEN+2];


/* **********************************************************************
 *                       ICC INITIALIZATION ROUTINES
 ***********************************************************************
*/
init_LC_ICC()
{
unsigned char result;

   disableInterrupts();

   setLCInterrupts(ALL_ICC_INTERRUPTS_OFF);

   clearPendingLCInterrupts();

   outp(SPCR,SPCR_POWER_DOWN);/* PWR DOWN */
   outp(SPCR,SPCR_CONFIG);    /* THEN PWR UP, SAC & SIP CONFIG */
```

```
   LC_MODE_Reg_Image = MODE_CONFIG;
   outp(MODE,MODE_CONFIG);     /* Transparent Mode 2, Rcv INACTIVE, IOM Rev
                               /* w/ DATA TRANSFER */
   outp(CMDR,CMDR_CONFIG);  /* Receiver and Xmitter Reset */

   LC_STCR_Image = LC_STCR_CONFIG; /* 0x60 for LC, 0x70 for RT */
   outp(STCR,LC_STCR_Image);

   LC_CIX0_Reg_Image = CIX0_CONFIG;
   outp(CIX0,LC_CIX0_Reg_Image );

   /* NOT USED ON LC EMU BUT USED IN LC */
   outp(XAD1,0);
   outp(TIMR,0xcc);
   outp(XAD2,0x03);
   outp(SAP1,0);
   outp(SAP2,0x04);
   outp(TEI1,0x03);
   outp(TEI2,0xff);
   outp(ADF1,0);
   outp(ADF2,0);

   clearPendingLCInterrupts();

   Sicofi_State = IDLE_STATE;

   enableInterrupts();

}   /* END init_ICC */

/* ***********************************************************************
 *        clearPendingLCInterrupts
 *************************************************************************
*/
clearPendingLCInterrupts()
{
BYTE result;

  /* CLEAR PENDING INTERRUPTS */
  result = inp(ISTA);
  result = inp(EXIR);
  result = inp(CIR1);
  result = inp(CIR0);
  result = inp(RSTA);
}

/* ***********************************************************************
 *        setLCInterrupts
 *************************************************************************
*/
setLCInterrupts(int_mask)
BYTE int_mask;
{
/*
  sets the ICC interrupts masks for the LC ICC.
*/

  LC_MASK_Reg_Image = int_mask;

  disableInterrupts();
  outp(MASK,LC_MASK_Reg_Image);
  enableInterrupts();
}


/* ***********************************************************************
 *        getLCInterrupts
 *************************************************************************
```

```
*/
BYTE getLCInterrupts()
{
/*
   returns the ICC interrupts masks for the LC ICC.
*/
   return(LC_MASK_Reg_Image);
}
/* ********************************************************************
 *                  INTERRUPT SERVICE ROUTINE
 **********************************************************************
*/
void interrupt far LC_SICOFI_Interrupts ()
{

  _disable();
  LC_ISTA_Reg_Image = inp(ISTA);

   if (LC_ISTA_Reg_Image & SIN_mask)
      /* SIN Interrupt */
      {
      /*
      This procedure is inserted directly for conserving service time.
      DO NOT REMOVE FROM HERE UNLESS THE ISR PROCESS TIME CAN BE
      GUARANTEED TO REMAIN THE SAME!!!!!

      This Procedure to service the Sicofi Interrupts.  Services
      three (3) process states: COMMAND_STATE, REQUEST_STATUS_STATE,
      GET_ARGUMENT_STATE.

      COMMAND_STATE is for writing command and data to sicofi. Others
      are for reading from Sicofi.
      */

      if (Sicofi_State == COMMAND_STATE)
         {
         outp(STCR, (STCR_STO_MASK | STCR_SCO_MASK)); /* ACK STO INTRPT */

         /* write command first - command is at bottom of buffer */
         /* buffer is organized as LIFO ex. CR1, CR2, CR3, SOP, End Of Buff
         Sicofi_Write_Count--;          /* decrement for next pass */
         outp(MOX1, Sicofi_Write_Buffer[ Sicofi_Write_Count ]);

         while (Sicofi_Write_Count >= 1)
        {
        /* Poll for SIN */
        if (inp(ISTA) & SIN_mask)
          {
          outp(STCR, (STCR_STO_MASK | STCR_SCO_MASK)); /* ACK STO INTRPT */
          Sicofi_Write_Count--;          /* decrement for next pass */
          outp(MOX1, Sicofi_Write_Buffer[ Sicofi_Write_Count ]);
          }
        }   /* END WHILE */

         if (Sicofi_Write_Count < 1)
            {
            /* there is no more args to write */
            /* done with writing - clean up isr */
        LC_STCR_Image = LC_STCR_CONFIG;  /* Disable SIN Interrupts */
            outp(STCR, LC_STCR_Image);

            Sicofi_State = IDLE_STATE;   /* READY FOR NEXT OPERATION */
            }

            }   /* END if COMMAND STATE */

         else if (Sicofi_State == REQUEST_STATUS_STATE)
            {
```

```
        /* Processing of SICOFI READ's isr */
        outp(STCR,(STCR_ST1_MASK | STCR_SC0_MASK));  /* ACK ST0 Interrupt
                                                   /* and change to ST1 */
        outp(MOX1, Sicofi_Read_Buffer[ 0 ]);    /* send the read command *

        Sicofi_State = WAIT_ONE_CYCLE;

        }   /* END REQUEST STATUS STATE */

    else if (Sicofi_State == WAIT_ONE_CYCLE)
        {
        /* NEEDS 1-1/2 Mid-Frame interrupt before data is available */
        outp(STCR, (STCR_ST1_MASK | STCR_SC1_MASK));   /* ACK ST1 Interrup

        Sicofi_State = GET_ARGUMENT_STATE;
        }   /* END WAIT_ONE_CYCLE STATE */

    else if (Sicofi_State == GET_ARGUMENT_STATE)
        {
        outp(STCR,(STCR_ST1_MASK | STCR_SC1_MASK));  /* ACK ST1 Interrupt

        Sicofi_Read_Buffer [Sicofi_Read_Count] = inp(MOR1);

        Sicofi_Read_Count--;

  while (Sicofi_Read_Count >= 1)
      {
      if (inp(ISTA) & SIN_mask)
         {
         outp(STCR, (STCR_ST1_MASK | STCR_SC1_MASK)); /* ACK ST1 intprt */
              bufferVal = inp(MOR1);  /* Bypass C compiler error */
         Sicofi_Read_Buffer[ Sicofi_Read_Count ] = bufferVal;
         Sicofi_Read_Count--;
         }
      }   /* END WHILE */

        if (Sicofi_Read_Count < 1)
           {
           /* done receiving all needed data - clean up */
     LC_STCR_Image = LC_STCR_CONFIG;  /* Disable SIN Interrupts */
           outp(STCR,LC_STCR_Image);        /* no more interrupts for now

           Sicofi_State = GET_STATUS_STATE; /* done with collection of dat
           }                                 /* wait for application to *
                                     /* get it using Get_Sicofi_Status*/
        }   /* END GET ARGUMENT STATE */
}   /* END SIN interrupts */

else if (LC_ISTA_Reg_Image & RME_mask)
     {
     LC_RME_isr();
       }

  if (LC_ISTA_Reg_Image & EXIR_mask)
       {
       LC_EXIR_isr();
       }

    _enable();
    return;

}   /* END LC_SICOFI_Interrupts */

/* *********************************************************************
 *          Send_Sicofi_Command Procedure
 ***********************************************************************
*/
BYTE sendLCSicofiCommand( Originator, Command, Write_Buffer)
```

```
WORD Originator;
BYTE Command;
BYTE Write_Buffer[];
{
/*
   Procedure used for writing to Sicofi.  It places data into the
   sicofi write interrupt procedure and enables the Sicofi SIN
   interrupt.

ON ENTRY:
   Originator    a VAlid Task name invoking the procedure.
                 Upon completion of sicofi transfer a message is send
                 to this origin.
   Command       can be SOP, COP, NOP
   Write_Buffer is an array with data to be transferred
                 organized in ascending order i.e. Write_buffer[0] = CR1

                 Last byte is transferred first.

ON OUTPUT:
   Sicofi_Write_Buffer is a LIFO such that when the Write ISR
                       transmits to SICOFI data is transferred
                       from the bottom of the buffer.  Data is
                       organized in the order that the SICOFI
                       expects it.  Command, Last data first, ...

   Sicofi_Write_Count is total number of bytes to be written to SICOFI
                      including command.


On RETURN:
      OKAY = command will be processed
      BUSY = another task is using this procedure wait and try later

PROCEDURE:
   If Procedure is not IDLE
   return BUSY
   else Move given buffer data to Sicofi write buffer
        data is stored in reversed order LIFO.
        Insert Command in the last buffer space indexed by Arg_Length
        Enable SIN Interrupt for beginning frame.
        return OKAY

    Note:  Application TAsk should call GetLCSicofiStat()
           to check that the command was sent.
*/

int count;
BYTE Arg_Length;
   if (Sicofi_State != IDLE_STATE)
      return BUSY;
   else /* INSERT THE DATA */
      {
      Sicofi_State = PENDING_STATE;
      Arg_Length = getSICOFICommandLength(Command);
      if (Arg_Length > MAX_SICOFI_COMMAND_LEN )
         setError(E_SICOFI_COMMAND_LEN,Arg_Length);

      for (count = 0; count < Arg_Length; count++)
         Sicofi_Write_Buffer[ count ] = Write_Buffer[count];
                                  /* Set Argument Counts including */
                                  /* buffer content in reverse order */

      Sicofi_Write_Buffer[Arg_Length] = Command;  /* goes at the end */
      Sicofi_Write_Count = Arg_Length + 1; /* total number of transfer byte

      disableInterrupts();
```

```
    Sicofi_Write_Originator = Originator;
    Sicofi_State = COMMAND_STATE;

    clearPendingLCInterrupts();

    LC_STCR_Image &= ~STCR_ST1_MASK;  /* Disable SIN Intpt at Frame Begin
    LC_STCR_Image |= STCR_ST0_MASK;   /* Enable SIN Intpt at Frame Middle

    enableInterrupts();
    outp(STCR,LC_STCR_Image);

    return OKAY;
    }   /* END inserting data */

}   /* END Send_Sicofi_Command */

/* *********************************************************************
 *                         getLCSicofiStat
 **********************************************************************
*/
BYTE getLCSicofiStat()
{
BYTE image;
/*
   returns the state of the Sicofi ISR driver.
*/

   disableInterrupts();
   image = Sicofi_State;
   enableInterrupts();

   if (image == IDLE_STATE)
      return(OKAY);
   else
      return(BUSY);

}   /* END getSicofiStat */

/* *********************************************************************
 *                         requestLCSicofiStatus
 **********************************************************************
*/
BYTE requestLCSicofiStatus( Originator, Command)
WORD Originator;
BYTE Command;
{
/*
ON ENTRY:
   Command       can be SOP, COP, NOP
   ARg_Length    is the number of data bytes expected to be read
                 EXCLUDING the command.
                                (example CR3, CR2, CR1 is 3 bytes)

ON OUTPUT:
   Sicofi_Read_Buffer  contains the command in index location 0.
                       (it is expected that the SICOFI ISR will
                       place data read into the read buffer but
                       leave the command byte in place.)

                       The organization of the Sicof_Read_Buffer
                       is as follows:

                       +--------------------+
                       | Sicofi Command     | Buffer [0]
                       +--------------------+
                       | 1st byte (ex. CR1) | Buffer [1]
                       +--------------------+
                       | 2nd byte (ex. CR2) | Buffer [2]
                       +--------------------+
```

```
          ...                  ...
          +--------------------+
          | 8th byte (ex. DB8) | Buffer [8]
          +--------------------+
          | # of data bytes    | Buffer [9]
          +--------------------+

   Sicofi_Read_Count is total number of bytes to be read from SICOFI

On RETURN:
      OKAY = command will be processed, use the Get_Sicofi_Status()
             to obtain the data.
      BUSY = another task is using this procedure wait and try later

PROCEDURE:
   If Procedure is not IDLE
   return BUSY
   else Move given command to Sicofi read buffer location index 0
        Set the length of data expected
        Enable SIN Interrupt for beginning frame.
        return OKAY
*/
BYTE Arg_Length;

int count;

   if (Sicofi_State != IDLE_STATE)
      return (BUSY);
   else /* INSERT THE DATA */
      {
      Sicofi_State = PENDING_STATE;
      Sicofi_Read_Originator = Originator;
      Sicofi_Read_Buffer[0] = Command;

      Arg_Length = getSICOFICommandLength(Command);
      if (Arg_Length > MAX_SICOFI_COMMAND_LEN )
         setError(E_SICOFI_COMMAND_LEN,Arg_Length);

      Sicofi_Read_Buffer[9] = Arg_Length; /* pass length to user */
      Sicofi_Read_Count = Arg_Length;    /* expected number of read bytes *
      disableInterrupts();

      Sicofi_State = REQUEST_STATUS_STATE;

      clearPendingLCInterrupts();

      LC_STCR_Image &= ~STCR_ST1_MASK;  /* Disable SIN Intpt at Frame Begin
      LC_STCR_Image |= STCR_ST0_MASK;   /* Enable SIN Intpt at Frame Middle

      enableInterrupts();
      outp(STCR,LC_STCR_Image);

      return (OKAY);
      }   /* END inserting data */

}   /* END Request_Sicofi_Status */


/* ***********************************************************************
 *                    getLCSicofiStatus  Procedure
 ***********************************************************************
*/
BYTE getLCSicofiStatus( Originator, Read_Buffer)
WORD Originator;
BYTE Read_Buffer[];
```

```
{
/*
ON ENTRY:
   Originator    Is the module name which requested the status
                 using RequestLCSicofiStatus().
   Read_Buffer   a user provided buffer for Sicofi Status to be
                              copied to.

ON OUTPUT:
   Read_Buffer   will contain the status data as obtained from the
                 the Sicofi_Read_Buffer i.e. Buf[1]=CR3, [2]=CR1...
                 It is assumed that the original requestor should
                 know the length.

On RETURN:
      OKAY = data has been placed in the buffer and is ready for reading.
      BUSY = SICOFI drivers are still busy, keep trying.

PROCEDURE:
   If Procedure is not GET_STATUS_STATE
   return BUSY
   else Move data from Sicofi_Read_Buffer to requestor's Read_Buffer
        Set Sicofi_State to IDLE
        return OKAY
*/

int count;

   if ((Sicofi_State != GET_STATUS_STATE)
        || (Sicofi_Read_Originator != Originator))
      return BUSY;
   else /* MOVE THE DATA */
      {
      Sicofi_State = PENDING_STATE;

      for (count = 0; count <= (Sicofi_Read_Buffer[9]) ; count++)
         Read_Buffer[count] = Sicofi_Read_Buffer[count];

      Sicofi_State = IDLE_STATE;
      return OKAY;
      }   /* END inserting data */

}   /* END Get_Sicofi_Status */


/* *********************************************************************
 *                  CIC UTILITIES ROUTINEs
 **********************************************************************
*/

/* *********************************************************************
 *                  sendLC_IECQ
 **********************************************************************
*/
writeLC_IECQ(code)
 BYTE code;
{
/*
   Utility to output the given IECQ code to the ICC.
*/

   LC_CIX0_Reg_Image = (LC_CIX0_Reg_Image & ~CODX0_mask)
                       | getCOX0Code(code);
   outp(CIX0,LC_CIX0_Reg_Image);

}
```

```
/* **********************************************************************
 *                   readLC_IECQ
 **********************************************************************
*/
BYTE readLC_IECQ ()
{
   /* ICC C/I READ REGISTER */
   return ((inp(CIR0) & CODR0_mask) >> 2);
}


/* **********************************************************************
 *                   LCSicofiSignallingOutput ROUTINE
 **********************************************************************
*/
#define MAX_SICOFI_SIGNAL_OUT_PORTS                              5

struct SicofiOutNameToPos {   /* Sicofi OUTPUT NAME TO BIT POSITION */
              BYTE name;              /* CONVERSION TABLE */
              BYTE pos;          /* BIT POSITION */
              } LC_SicofiSignalOut [MAX_SICOFI_SIGNAL_OUT_PORTS] = {
                            VOICE_CHANNEL_SELECT   ,0   /* SO1A */
                           ,AUTO_CUTOFF_OVRD                  ,1    /* SO2A */
                           ,LC_OUTPUT_SELECT                  ,4    /* SO1B */
                           ,_5mA_GENERATOR                    ,5    /* SO2B */
                           ,_45mA_GENERATOR                   ,6    /* SO3B */
                      };

LCSicofiSignallingOutput( PortName, value)
BYTE PortName;
BYTE value;
{
   /*
   Activates/Deactivate the given Sicofi signalling port

   This procedure assumes that the Ports are single bits.
   */

static BYTE Sicofi_Signal_Output_Image = 0;

int flag;
int i;

   if (PortName > MAX_SICOFI_SIGNAL_OUT_PORTS )
      setError(E_ILLEGAL_SICOFI_SIGNAL_OUT, PortName);
   else
      {
      flag=NOT_FOUND;
      i=0;
      while ((i<= MAX_SICOFI_SIGNAL_OUT_PORTS ) && (flag == NOT_FOUND))
        {
        if (LC_SicofiSignalOut[i].name == PortName)
           flag = FOUND;
        else i++;
        }   /* END WHILE */

      if (flag == FOUND)
         {
         /* OUTPUT VALUE TO SICOFI */
         if (value == 0)
            {
                   Sicofi_Signal_Output_Image &= ~(0x01<< LC_SicofiSignalOu
            }
         else
            {
                   Sicofi_Signal_Output_Image |= 0x01 << LC_SicofiSignalOut
            }
```

```
        /* NOW WRITE THE VALUE TO THE SICOFI */
        outp(CIX1, Sicofi_Signal_Output_Image);

        }  /* END ELSE FOUND */
      } /* END ELSE NO SYSTEM ERROR */

}   /* END SICOFI SIGNALLIN OUTPUT */

/* *********************************************************************

 *********************************************************************
*/

#define MAX_SICOFI_SIGNAL_INPUT_PORTS              1

struct SicofiInNameToPos {   /* Sicofi OUTPUT NAME TO BIT POSITION */
              BYTE name;             /* CONVERSION TABLE */
              BYTE pos;          /* BIT POSITION */
              } SicofiSignalIn [MAX_SICOFI_SIGNAL_INPUT_PORTS] = {
                          LOW_110V_DETECTOR                ,0   /* SI1A */
                      };

/* *********************************************************************
 *                  SicofiLCSignallingInput ROUTINE
 *********************************************************************
*/
BYTE LCSicofiSignallingInput( PortName)
BYTE PortName;
{
   /*
   Reads and returns the status of the given Sicofi signalling port

   This procedure assumes that the Ports are single bits.
   */

int flag;
int i;

   if (PortName > MAX_SICOFI_SIGNAL_INPUT_PORTS )
      setError(E_ILLEGAL_SICOFI_SIGNAL_INP, PortName);
   else
      {
      flag=NOT_FOUND;
      i=0;
      while ((i<= MAX_SICOFI_SIGNAL_INPUT_PORTS ) && (flag == NOT_FOUND))
        {
        if (SicofiSignalIn[i].name == PortName)
           flag = FOUND;
        else i++;
        }   /* END WHILE */

      if (flag == FOUND)
         {
         /* GET VALUE FROM SICOFI */
         return ((inp(CIR1) >> LC_SicofiSignalOut[i].pos) & 0x01);
         }
      else return (0xff);
      }
}   /* END SICOFI SIGNALLIN INPUT */
/*

$Workfile:   lcepriv.h  $
$Revision:   1.1  $
$Date:   04 Sep 1990 16:06:38  $

$Log:   E:/USR/DAML/APPC/LCE/VCS/LCEPRIV.H_V  $
 *
```

```
 *    Rev 1.1   04 Sep 1990 16:06:38   bChen
 * Add extern for LC_MODE_Reg_Image
 *
 *    Rev 1.0   01 Sep 1990 09:27:54   bChen
 * Initial revision.

*/


/*
-----------------------------------------------------------------------
                        LITERAL DEFINITIONS
-----------------------------------------------------------------------
*/

/*   The following is a alphabetically sorted list of all ICC registers
     next to the register name is the address location base+offset.

                ADF1 0x0038
                ADF2 0x0039
                B1CR  0x0037
                B2CR  0x0038
                C1R  0x0035
                C2R  0x0036
                CIR0 0x0031
                CIR1 0x0033
                CIX0 0x0031
                CIX1 0x0033
                CMDR 0x0021
                EXIR 0x0024
                ISTA 0x0020
                MASK 0x0020
                MOCR 0x003A
                MODE 0x0022
                MOR0 0x0032
                MOR1  0x0034
                MOSR 0x003A
                MOX0 0x0032
                MOX1 0x0034
                RBCH 0x002A
                RFBC 0x0025
                RFIFO        0x0000
                RHCR 0x0029
                RSTA 0x0027
                SAP1 0x0026
                SAP2 0x0027
                SAPR 0x0026
                SPCR 0x0030
                STAR 0x0021
                STCR  0x0037
                TEI1 0x0028
                TEI2 0x0029
                TIMR 0x0023
                XAD1 0x0024
                XAD2 0x0025
                XFIFO        0x0000

 */
#define ICC_Base_Addr   0x0900

#define ISTA        0x0920
                    /* interrupt status reg read, at reset = 00h */
#define MASK        0x0920
                    /* interrupt mask reg write, at reset = 00h */
```

```
            /*  The ISTA and MASK bits have the following
                meaning:
               *--------RME receive message end
               |*-------RPF receive pool full
               ||*------RSC receive status change
               |||*-----XPR transmit pool ready
               ||||*----TIM timer interrupt
               |||||*---CIC C/I code change
               ||||||*--SIN synchronous transfer
               |||||||*-EXI extended interrupt
               ||||||||
               00000000b
               */

#define EXIR        0x0924  /* extended interrupt reg read, at reset = 00h
            /* The EXIR has the following meaning
               *--------XMR transmit message repeat
               |*-------XUD transmit data underrun
               ||*------PCE protocol error
               |||*-----RFO receive frame oveflow
               ||||*----SOV synchronous transfer overflow
               |||||*---MOS monitor status
               ||||||*--SAW subscriber awake
               |||||||*-WOV watchdog timer overflow
               ||||||||
               XXXXXXXXb
               */

#define STAR        0x0921  /* status reg read, reset = 48h */
            /* the STAR has the following meaning
               *--------XDOV transmit data overflow
               |*-------XFW transmit FIFO write enable
               ||*------XRNR transmit RNR
               |||*-----RRNR receive RNR
               ||||*----MBR message buffer ready
               |||||*---MAC1 monitor ch 1 active
               ||||||*--BVS B ch valid on sip
               |||||||*-MAC0 monitor ch 0 active
               ||||||||
               XXXXXXXXb
               */

#define CMDR        0x0921  /* command reg write, reset = 00h */
            /*  ;the CMDR has the following meaning
               *--------RMC receive message complete
               |*-------RRES recevier reset
               ||*------RNR receive not ready
               |||*-----STI start timer
               ||||*----XTF transmit transparent frame
               |||||*---XIF transmit I-frame
               ||||||*--XME transmit message end
               |||||||*-XRES transmit reset
               ||||||||
               00000000b
               */

#define MODE        0x0922  /* mode reg read/write, reset 00h */
            /* the MODE has the following meaning
               ***------MDS HDLC mode select,
               |||          110=Transparent Mode 2
               |||*-----TMD timer mode
               ||||*----RAC receiver active
               |||||***-DIM digital interface mode
               ||||||||
               00000000b
               */
```

```
#define TIMR        0x0923   /* timer reg read/write, reset undefined */
                          /* the TIMR has the following meaning
                             ***------cnt timer count
                             |||*****-value setting of timer
                             ||||||||
                             00000000b
                             */

#define RFBC        0x0925   /* receive frame buffer count read. */
                                              /* at reset is 00h */
                          /* the RFBC has the length of the */
                          /* receive message */

#define RBCH        0x092A   /* receive frame count high read, reset 00h */
                          /* the RBCH has the following meaning
                             ***------VN2-0 version number of chip
                             |||*-----OV overflow
                             ||||****-RBCH high part of receive count
                             ||||||||
                             00000000b
                             */

#define RSTA        0x0927   /* receive status reg read, reset undefined */
                          /* the RSTA has the following meaning
                             *--------RDA receive data
                             |*-------RDO recevie data overflow
                             ||*------CRC crc check
                             |||*-----RAB receive message aborted
                             ||||**---SA1-0 SAPI address id
                             ||||||*--C/R command/response
                             |||||||*-TA TEI address id
                             ||||||||
                             00000000b
                             */

/* HDLC address variables */

#define XAD1        0x0924   /* transmit address 1 reg write */
#define XAD2        0x0925   /* transmit address 2 reg write */
#define SAP1        0x0926   /* sapi reg write */
                          /*  used in auto mode has the following meaning
                              ******---SAPI1 first service access
                              ||||||       point identifier
                              ||||||*--CRI command/response ind
                              |||||||*-0
                              ||||||||
                              00000000b
                              */

#define SAP2        0x0927          /* sapi reg write */
                             /*  used in auto mode has the following meaning
                                    ******---SAPI2 second service access
                                    ||||||       point identifier
                                    ||||||*--MCS modulo count selsct
                                    |||||||*-0
                                    ||||||||
                                 00000000b
                               */

#define TEI1        0x0928   /* tei reg write */
                          /*  ;used in auto mode has the following meaning
                             *******--TEI1
                             |||||||*-EA adress field extension
                             ||||||||
                             00000000b
                             */
```

```
#define TEI2        0x0929   /* tei reg write */
                          /*  ;used in auto mode has the following meaning
                              *******--TEI2
                              |||||||*-EA adress field extension
                              ||||||||
                              00000000b
                              */

#define SAPR        0x0926          /* SAPI reg read */

/*  HDLC control data */
#define RHCR        0x0929   /* receive HDLC control read */
/*   HDLC information data */
#define RFIFO       0x0900          /* receive  data 32 bytes read */
#define XFIFO       0x0900          /* transmit data 32 byte write */

#define SPCR        0x0930   /* serial port control reg read/write, */
                          /* reset = 0 */
                          /*  ;the SPCR has the following meaning
                              *--------SPU software power up
                              |*-------SAC SIP port active
                              ||*------SPM serial port timing
                              |||*-----TLP test loop
                              ||||**---C1C1-0 channel 2 connect
                              ||||||**-C2C1-0 channel 2 connect
                              ||||||||
                              00000000b
                              */

#define CIR0        0x0931   /* command/indication receive 0 reg */
                                     /* read, reset 7Ch */
                          /*  ;the CIR0 has the following meaning
                              *--------0
                              |*-------BAS bus access status
                              ||****---CODR0 receive C/I channel 0
                              ||||||*--CIC0 C/I code change channel 0
                              |||||||*-CIC1 C/I code change channel 1
                              ||||||||
                              00000000b
                              */

#define CIX0        0x0931   /* command/indication transmit 0 reg */
                                     /* write, reset 10111111h */
                          /*  ;the CIX0 has the following meaning
                              *--------RSS reset source select
                              |*-------BAC bus access control
                              ||****---CODX0 C/I transmit channel 0
                              ||||||*--TCX T channel output
                              |||||||*-ECX E channel output
                              ||||||||
                              00000000b
                              */

#define MOR0        0x0932   /* monitor receive channel 0 read */
#define MOX0        0x0932   /* monitor transmit channel 0 write */
#define CIR1        0x0933   /* command/indication receive 1 reg */
                                     /* read register, at reset = FFh */
                /* The CIR1 gets information on
                   SICOFI peripherals (e.g. the SLIC)
                  Meaning at LC end
                  *---------     Line B, Not Used, always set to 0
                  |*-------- SI3 Line B, TA from Rack Controller Serial link
                  ||*------- SI2 Line B Pair Gain Test: 0=Test requested
                  |||*------ SI1 Line B Ring Detect: 0=Ring request detected
                  ||||*-----     Line A, Not Used, always set to 0
                  |||||*---- SI3 Line A, Not Used, always set to 1
                  ||||||*--- SI2 Line A Pair Gain Test: 0=Test requested
```

```
            ||||||||*-- SI1 Line A Ring Detect: 0=Ring request detected
            ||||||||
            XXXXXXXXb
          */

#define CIX1        0x0933   /* command/indication transmit 1 reg */
                                              /* write register, at reset = F
          /* The CIX1 puts commands for
             SICOFI peripherals (e.g. the SLIC)
            Meaning at LC end
            *---------- SBB 1=Test Relay, Reroute U link I/O to RC
            |*--------- SO3 Line B, Get Central Office line input from RC
            ||*-------- SO2 Alarm relay, house Alarm 2: 1=Sound alarm
            |||*------- SO1 Line B Hold: 0=Release Line, 1=Seize Line
            ||||*------ SBA 1=TA for Rack Controller Serial link
            |||||*----- SO3 Line A, Get Central Office line input from RC
            ||||||*---- SO2 Alarm relay, house Alarm 1: 1=Sound alarm
            |||||||*--- SO1 Line A Hold: 0=Release Line, 1=Seize Line
            ||||||||
             00000000b   ; Initial value
          */

#define MOR1     0x0934   /* monitor receive channel 1 read */

#define MOX1        0x0934   /* monitor transmit channel 1 write */
                          /*  The MOX1 puts Coefficient and Status Of
                              for the SICOFI
                               *---------- 0=Line A, 1=Line B
                               ||*-------- 0=Power Down (Standby),
                               |||           1=Power up selected line
                               ||||||||
                               X0X00100b     ; When used to write powe
                                               control SOPs
                          */

#define C1R          0x0935   /* channel 1 reg read/write */
#define C2R          0x0936   /* channel 2 reg read/write */
#define B1CR   0x0937   /* channel B1 reg read */
#define B2CR   0x0938   /* channel B2 reg read */
#define STCR   0x0937   /* synchronous transfer control reg write */
                        /*   the STCR has the following use
                          *----------TSF terminal specific function
                          |***-------SBA2-0 tic bus address
                          ||||*------ST1 synchronous transfer 1
                          |||||*-----ST0 synchronous transfer 0
                          ||||||*----SC1 synch  transfer 1 completed
                          |||||||*---SC0 synch  transfer 0 completed
                          ||||||||
                          00000000b
                          */

#define ADF1        0x0938   /* additional feature reg write, reset 00h */
                          /*  ;the ADF1 has the following use
                            **---------WTC2-1 watchdog timer control
                            ||*--------CI1E C/I channel intprt enable
                            |||*-------IDC iom direction control
                            ||||***----CSEL2-0 channel select
                            |||||||*---ITF inter-frame time fill
                            ||||||||
                            00000000b
                            */

#define ADF2        0x0939   /* additional feature reg read/write, reset 00h
                          /*  ;the ADF2 has the following use
                            *----------IMS IOM mode selection
                            |***-------D2C0-2 data strobe polarity
                            ||||*------ODS output drive selection
```

```
                        |||||***--D1C0-2 data strobe polarity
                        ||||||||
                        00000000b
                        */

#define MOSR        0x093A  /* monitor status reg read, reset 00h */
                          /*  ;the MOSR has the following use
                        ********--this reg for IOM rev2 only
                        ||||||||
                        00000000b
                        */

#define MOCR        0x093A  /* monitor status reg wite, reset 00h */
                          /*  ;the MOCR has the following use
                        ********--this reg for IOM rev2 only
                        ||||||||
                        00000000b
                        */

extern BYTE LC_MODE_Reg_Image;

/*

$Workfile:   lcetst.c  $
$Revision:   1.2  $
$Date:   01 Sep 1990 14:43:26  $

$Log:   E:/USR/DAML/APPC/LCE/VCS/LCETST.C_V  $
 *
 *    Rev 1.2   01 Sep 1990 14:43:26   bChen
 * modifications for testing continously.
 *
 *    Rev 1.1   01 Sep 1990 11:50:22   bChen
 * tests SICOFI write/read extensively using initLCemulator()
 * and repeating until 10000 errors are reported by initLCemulator().
 * Ran for 15 minutes without errors.
 *
 *    Rev 1.0   01 Sep 1990 09:27:46   bChen
 * Initial revision.

*/


static char *vscId="$Header:   E:/USR/DAML/APPC/LCE/VCS/LCETST.C_V   1.2

#define TEST 1

#include "DAMLlit.h"
#include "LCe.h"
/*
-----------------------------------------------------------------------
                        MESSAGE DEFINITIONS
-----------------------------------------------------------------------
*/


/* *********************************************************************
 *                          MAIN PROCEDURE
 ***********************************************************************
*/
void main()
{
extern void interrupt far LC_SICOFI_Interrupts();

BYTE SicofiCommand;
BYTE result;
static BYTE WriteBuf[10];   /* TO CONTAIN CR1,...,CR3 and COP's COEFF's. */
```

```
static BYTE readBuf[10];
BYTE cr1Value;
BYTE cr2Value;
BYTE cr3Value;
int i;
long int j=0;
long int k=0;
int count;

   disableInterrupts();

   init_LC_ICC();
   interruptsInit();
   setHandler(0x01,LC_SICOFI_Interrupts);
   interruptsStart();

   setLCInterrupts(SIN_INTERRUPT_MASK);

/* RESET & POWER UP SICOFI - CHANNEL A */
/* ********************************************************************** */
   SicofiCommand = setSOP(SICOFI_CHANNEL_A,
                          SICOFI_WRITE,
                          POWER_UP,
                          RESET_SICOFI,0);

    sendLCSicofiCommand(1 /* ORIGINATOR */
                               ,SicofiCommand
                               ,WriteBuf);

   for (i=0;i<1000;i++) if (getLCSicofiStat() == OKAY) break;



/* RESET & POWER UP SICOFI - CHANNEL B */
/* ********************************************************************** */
   SicofiCommand = setSOP(SICOFI_CHANNEL_B,
                          SICOFI_WRITE,
                          POWER_UP,RESET_SICOFI,0);

    sendLCSicofiCommand(1 /* ORIGINATOR */
                               ,SicofiCommand
                               ,WriteBuf);

   for (i=0;i<1000;i++) if (getLCSicofiStat() == OKAY) break;

/* ********************************************************************** */
 /* WRITE A CR1 COMMAND - TO CHANNEL A*/
/* ???? REMEMBER TO CONFIGURE SICOFI SBx to OUTPUT */

   SicofiCommand = setSOP(SICOFI_CHANNEL_A,
                          SICOFI_WRITE,
                          POWER_UP,NIL,CR1_Len);

   WriteBuf[0] = setCR1(DISABLE_FILTER,
                        DISABLE_FILTER,
                        DISABLE_FILTER,
                        DISABLE_FILTER,
                        DISABLE_FILTER,
                        DISABLE_FILTER,
                        SBX_OUTPUT_SEL, NIL);

    sendLCSicofiCommand(1 /* ORIGINATOR */
                               ,SicofiCommand
                               ,WriteBuf);

   for (i=0;i<1000;i++) if (getLCSicofiStat() == OKAY) break;
```

```
/* ****************************************************************** */
/* WRITE A CR1 COMMAND TO CHANNEL B */

   SicofiCommand = setSOP(SICOFI_CHANNEL_B,
                          SICOFI_WRITE,
                          POWER_UP,NIL,CR1_Len);

   WriteBuf[0] = setCR1(DISABLE_FILTER,
                        DISABLE_FILTER,
                        DISABLE_FILTER,
                        DISABLE_FILTER,
                        DISABLE_FILTER,
                        DISABLE_FILTER,
                        SBX_OUTPUT_SEL, NIL);

    sendLCSicofiCommand(1 /* ORIGINATOR */
                        ,SicofiCommand
                        ,WriteBuf);

   for (i=0;i<1000;i++) if (getLCSicofiStat() == OKAY) break;


/* WRITE SOME CR1 TO CR3 values */
/* ****************************************************************** */
   SicofiCommand = setSOP(SICOFI_CHANNEL_A,
                          SICOFI_WRITE,
                          POWER_UP,
                          NIL,CR3_Len);
   cr1Value = setCR1(ENABLE_FILTER,
                     ENABLE_FILTER,
                     ENABLE_FILTER,
                     DISABLE_FILTER,
                     ENABLE_FILTER,
                     DISABLE_FILTER,
                     SBX_OUTPUT_SEL, uLAW);

   cr2Value = setCR2(0x02,
                     0x03,
                     ENABLE_FILTER,
                     DISABLE_FILTER);

   cr3Value = setCR3(CHANNEL_STRAIGHT,
                     DISABLE_FILTER,
                     ENABLE_FILTER,
                     DISABLE_FILTER,
                     0x01, 0x02);

   WriteBuf[0] = cr1Value;
                              SicofiCommand) == BUSY)
        ;

   for(i=0;i<100;i++) if ( getLCSicofiStatus(1, /* ORIGINATOR */
                              readBuf) == OKAY) break;


    k++;
    for(i=0;i<8;i++)
       if (readBuf[i+1] != WriteBuf[i])
          {
           j++;
           break; }

   j = 0; /* BAD ERROR COUNT */
   k = 0; /* SUCCESSFULL TRIES COUNT */
```

```
while (j < 10000)
      {
      if (initLCemulator() == OKAY )
         k++;
      else j++;
      }

   /* NOW - TEST SIGNALLING PORTS */
/* ********************************************************************* */
   LCSicofiSignallingOutput(VOICE_CHANNEL_SELECT,HIGH);
   LCSicofiSignallingOutput(VOICE_CHANNEL_SELECT,LOW);

   LCSicofiSignallingOutput(LC_OUTPUT_SELECT,HIGH);
   LCSicofiSignallingOutput(LC_OUTPUT_SELECT,LOW);

   LCSicofiSignallingOutput(_5mA_GENERATOR,HIGH);
   LCSicofiSignallingOutput(_5mA_GENERATOR,LOW);

   LCSicofiSignallingOutput(_45mA_GENERATOR,HIGH);
   LCSicofiSignallingOutput(_45mA_GENERATOR,LOW);

   LCSicofiSignallingOutput(AUTO_CUTOFF_OVRD,HIGH);
   LcSicofiSignallingOutput(AUTO_CUTOFF_OVRD,LOW);

}   /* END MAIN */

/*

$Workfile:   lceutil.c  $
$Revision:   1.0  $
$Date:   03 Sep 1990 15:28:00  $

$Log:   E:/USR/DAML/APPC/LCE/VCS/LCEUTIL.C_V  $
 *
 *    Rev 1.0   03 Sep 1990 15:28:00   bChen
 * Initial revision.

*/

static char *vscId="$Header:   E:/USR/DAML/APPC/LCE/VCS/LCEUTIL.C_V   1.0


/****-------------------------------------------------------------------------
 *
 *   File: lceutil.c
 *
 ****-------------------------------------------------------------------------

#include "rts.h"
#ifndef HD_TYPES
#       include <sys/types.h>
#endif
#ifndef HD_TIME
#       include <sys/timeb.h>
#endif

#include "DAMLlit.h"
#include "DAMLcnf.h"
#include "lce.h"


/*********************************************************************/
/*                    setupSICOFI                                    */
/*********************************************************************/

static void initSICOFIchannelA()
{
/*
```

```
   Procedure to initialize the SICOFI to the proper filter COP
   values.
*/

int i;
BYTE SicofiCommand;
BYTE writeBuf[10];

   /* RESET & POWER UP SICOFI - CHANNEL A */
   SicofiCommand = setSOP(SICOFI_CHANNEL_A,
                          SICOFI_WRITE,
                          POWER_UP,
                          RESET_SICOFI,0);

    sendLCSicofiCommand(lceHandler    /* ORIGINATOR */
                       ,SicofiCommand
                       ,writeBuf);

   for (i=0;i<1000;i++) if (getLCSicofiStat() == OKAY) break;

#ifdef TEST_DEBUG
printf("initSICOFI Chan A - done\n");
#endif

}


/****************************************************************/
/****************************************************************/
static void initSICOFIchannelB()
{
int i;
BYTE SicofiCommand;
BYTE writeBuf[10];

   /* RESET & POWER UP SICOFI - CHANNEL B */
   SicofiCommand = setSOP(SICOFI_CHANNEL_B,
                          SICOFI_WRITE,
                          POWER_UP,NIL,0);

    sendLCSicofiCommand(lceHandler
                       ,SicofiCommand
                       ,writeBuf);

   for (i=0;i<1000;i++) if (getLCSicofiStat() == OKAY) break;

#ifdef TEST_DEBUG
printf("initSICOFI Chan B - done\n");
#endif
}

/****************************************************************/
/****************************************************************/
static BYTE enableSICOFI_FiltersChannelA()
{
int i;
BYTE SicofiCommand;
BYTE badLoadFlag;
BYTE readBuf[10];
BYTE writeBuf[10];

   /* WRITE A CR1 COMMAND - TO CHANNEL A*/
   SicofiCommand = setSOP(SICOFI_CHANNEL_A,
                          SICOFI_WRITE,
                          POWER_UP,NIL,CR1_Len);

   writeBuf[0] = setCR1(ENABLE_FILTER,
                        ENABLE_FILTER,
```

```
                    ENABLE_FILTER,
                    ENABLE_FILTER,
                    ENABLE_FILTER,
                    ENABLE_FILTER,
                    SBX_INPUT_SEL, uLAW);

    sendLCSicofiCommand(lceHandler /* ORIGINATOR */
                       ,SicofiCommand
                       ,writeBuf);

   for (i=0;i<1000;i++) if (getLCSicofiStat() == OKAY) break;

   /* VERIFY SICOFI CR1 */
   SicofiCommand = setSOP(SICOFI_CHANNEL_A,
                          SICOFI_READ,
                          POWER_UP,NIL,CR1_Len);

    for (i=0;i<1000;i++) if (requestLCSicofiStatus(lceHandler
                            ,SicofiCommand) != BUSY) break;

    for(i=0;i<100;i++) if ( getLCSicofiStatus(lceHandler, /* ORIGINATOR */
                               readBuf) == OKAY) break;

#ifdef TEST_DEBUG
printf("Enable SICOFI Chan A - done\n");
#endif

    for(badLoadFlag=FALSE,i=0;i<1;i++)
       if (readBuf[i+1] != writeBuf[i])
     {
     badLoadFlag = TRUE;
     break;
     }

    if (badLoadFlag == FALSE)
       return OKAY;
    else return NOT_OKAY;

}

/*****************************************************************/
/*****************************************************************/
static BYTE enableSICOFI_FiltersChannelB()
{
int i;
BYTE SicofiCommand;
BYTE badLoadFlag;
BYTE readBuf[10];
BYTE writeBuf[10];

   /* WRITE A CR1 COMMAND - TO CHANNEL B*/
   SicofiCommand = setSOP(SICOFI_CHANNEL_B,

                          SICOFI_WRITE,
                          POWER_UP,NIL,CR1_Len);

writeBuf[0] = setCR1(ENABLE_FILTER,
                     ENABLE_FILTER,
                     ENABLE_FILTER,
                     ENABLE_FILTER,
                     ENABLE_FILTER,
                     ENABLE_FILTER,
                     SBX_INPUT_SEL, uLAW);

 sendLCSicofiCommand(lceHandler /* ORIGINATOR */
                    ,SicofiCommand
                    ,writeBuf);
```

```
   for (i=0;i<1000;i++) if (getLCSicofiStat() == OKAY) break;

   /* VERIFY SICOFI CR1 */
   SicofiCommand = setSOP(SICOFI_CHANNEL_B,
                          SICOFI_READ,
                          POWER_UP,NIL,CR1_Len);

   for (i=0;i<1000;i++) if (requestLCSicofiStatus(lceHandler
                            ,SicofiCommand) != BUSY) break;

   for(i=0;i<100;i++) if ( getLCSicofiStatus(lceHandler, /* ORIGINATOR */
                                  readBuf) == OKAY) break;
#ifdef TEST_DEBUG
printf("Enable SICOFI Chan B - done\n");
#endif

    for(badLoadFlag=FALSE,i=0;i<1;i++)
       if (readBuf[i+1] != writeBuf[i])
     {
     badLoadFlag = TRUE;
     break;
     }

    if (badLoadFlag == FALSE)
       return OKAY;
    else return NOT_OKAY;
}

/*****************************************************************/
/*****************************************************************/
static BYTE loadSICOFI_CoefFilterB1ChannelA()
{
int i;
BYTE SicofiCommand;
BYTE badLoadFlag;
BYTE readBuf[10];
BYTE writeBuf[10];


    /* WRITE A CR1 COMMAND - TO CHANNEL A */
    SicofiCommand = setCOP(SICOFI_CHANNEL_A,
                           SICOFI_WRITE,
                           getCOP_code(B_FILTER_1));

     writeBuf[0] = 0x02;
     writeBuf[1] = 0xf4;
     writeBuf[2] = 0x22;
     writeBuf[3] = 0x82;
     writeBuf[4] = 0x12;
     writeBuf[5] = 0x30;
     writeBuf[6] = 0x91;
     writeBuf[7] = 0xbd;

     sendLCSicofiCommand(lceHandler /* ORIGINATOR */
                         ,SicofiCommand
                         ,writeBuf);

    for (i=0;i<1000;i++) if (getLCSicofiStat() == OKAY) break;

    /* VERIFY SICOFI COP */
    SicofiCommand = setCOP(SICOFI_CHANNEL_A,
                           SICOFI_READ,
                           getCOP_code(B_FILTER_1));

    for (i=0;i<1000;i++) if (requestLCSicofiStatus(lceHandler
                             ,SicofiCommand) != BUSY) break;

    for(i=0;i<100;i++) if ( getLCSicofiStatus(lceHandler, /* ORIGINATOR */
                                   readBuf) == OKAY) break;
```

```
#ifdef TEST_DEBUG
printf("load SICOFI coef Filter B1 Chan A - done\n");
#endif

     for(badLoadFlag=FALSE,i=0;i<8;i++)
        if (readBuf[i+1] != writeBuf[i])
      {
      badLoadFlag = TRUE;
      break;
      }

     if (badLoadFlag == FALSE)
        return OKAY;
     else return NOT_OKAY;


/******************************************************************/
/******************************************************************/
static BYTE loadSICOFI_CoefFilterB2ChannelA()
{
int i;
BYTE SicofiCommand;
BYTE badLoadFlag;
BYTE readBuf[10];
BYTE writeBuf[10];

   clearPendingLCInterrupts();

   /* WRITE A CR1 COMMAND - TO CHANNEL A */
   SicofiCommand = setCOP(SICOFI_CHANNEL_A,
                          SICOFI_WRITE,
                          getCOP_code(B_FILTER_2));

    writeBuf[0] = 0x00;
    writeBuf[1] = 0x11;
    writeBuf[2] = 0x8b;
    writeBuf[3] = 0x11;
    writeBuf[4] = 0x00;
    writeBuf[5] = 0x84;
    writeBuf[6] = 0xba;
    writeBuf[7] = 0xb8;

    sendLCSicofiCommand(lceHandler /* ORIGINATOR */
                       ,SicofiCommand
                       ,writeBuf);

   for (i=0;i<1000;i++) if (getLCSicofiStat() == OKAY) break;

   /* VERIFY SICOFI COP */
   SicofiCommand = setCOP(SICOFI_CHANNEL_A,
                          SICOFI_READ,
                          getCOP_code(B_FILTER_2));

   for (i=0;i<1000;i++) if (requestLCSicofiStatus(lceHandler
                          ,SicofiCommand) != BUSY) break;

   for(i=0;i<100;i++) if ( getLCSicofiStatus(lceHandler, /* ORIGINATOR */
                               readBuf) == OKAY) break;

#ifdef TEST_DEBUG
printf("load SICOFI coef Filter B2 Chan A - done\n");
#endif

     for(badLoadFlag=FALSE,i=0;i<8;i++)
        if (readBuf[i+1] != writeBuf[i])
      {
      badLoadFlag = TRUE;
      break;
```

```
    }

    if (badLoadFlag == FALSE)
       return OKAY;
    else return NOT_OKAY;
}


/***************************************************************/
/***************************************************************/
static BYTE loadSICOFI_CoefFilterZchannelA()
{
int i;
BYTE SicofiCommand;
BYTE badLoadFlag;
BYTE readBuf[10];
BYTE writeBuf[10];

   clearPendingLCInterrupts();

   /* WRITE A CR1 COMMAND - TO CHANNEL A */
   SicofiCommand = setCOP(SICOFI_CHANNEL_A,
                          SICOFI_WRITE,
                          getCOP_code(Z_FILTER));

    writeBuf[0] = 0xf0;
    writeBuf[1] = 0x24;
    writeBuf[2] = 0x27;
    writeBuf[3] = 0x62;
    writeBuf[4] = 0x3b;
    writeBuf[5] = 0x97;
    writeBuf[6] = 0xd1;
    writeBuf[7] = 0x26;

    sendLCSicofiCommand(lceHandler /* ORIGINATOR */
                       ,SicofiCommand
                       ,writeBuf);

   for (i=0;i<1000;i++) if (getLCSicofiStat() == OKAY) break;

   /* VERIFY SICOFI COP */
   SicofiCommand = setCOP(SICOFI_CHANNEL_A,
                          SICOFI_READ,
                          getCOP_code(Z_FILTER));

   for (i=0;i<1000;i++) if (requestLCSicofiStatus(lceHandler
                            ,SicofiCommand) != BUSY) break;

   for(i=0;i<100;i++) if ( getLCSicofiStatus(lceHandler, /* ORIGINATOR */
                                  readBuf) == OKAY) break;
#ifdef TEST_DEBUG
printf("load SICOFI coef Filter Z Chan A - done\n");
#endif

    for(badLoadFlag=FALSE,i=0;i<8;i++)
       if (readBuf[i+1] != writeBuf[i])
     {
     badLoadFlag = TRUE;
     break;
     }

    if (badLoadFlag == FALSE)
       return OKAY;
       else return NOT_OKAY;
   }
```

```
/*********************************************************************/
/*********************************************************************/
static BYTE loadSICOFI_CoefFilterBdelayChA()
{
int i;
BYTE SicofiCommand;
BYTE badLoadFlag;
BYTE readBuf[10];
BYTE writeBuf[10];

   clearPendingLCInterrupts();

   /* WRITE A CR1 COMMAND - TO CHANNEL A */
   SicofiCommand = setCOP(SICOFI_CHANNEL_A,
                          SICOFI_WRITE,
                          getCOP_code(B_FILTER_DELAY ));

    writeBuf[0] = 0x19;
    writeBuf[1] = 0x19;
    writeBuf[2] = 0x11;
    writeBuf[3] = 0x19;

    sendLCSicofiCommand(lceHandler /* ORIGINATOR */
                       ,SicofiCommand
                       ,writeBuf);

   for (i=0;i<1000;i++) if (getLCSicofiStat() == OKAY) break;

   /* VERIFY SICOFI COP */
   SicofiCommand = setCOP(SICOFI_CHANNEL_A,
                          SICOFI_READ,
                          getCOP_code(B_FILTER_DELAY));
   for (i=0;i<1000;i++) if (requestLCSicofiStatus(lceHandler
                           ,SicofiCommand) != BUSY) break;

   for(i=0;i<100;i++) if ( getLCSicofiStatus(lceHandler, /* ORIGINATOR */
                              readBuf) == OKAY) break;
#ifdef TEST_DEBUG
printf("load SICOFI coef Filter B delay Chan A - done\n");
#endif

    for(badLoadFlag=FALSE,i=0;i<4;i++)
       if (readBuf[i+1] != writeBuf[i])
     {
     badLoadFlag = TRUE;
     break;
     }

    if (badLoadFlag == FALSE)
       return OKAY;
    else return NOT_OKAY;


/*********************************************************************/
/*                 loadSICOFI_CoefFilterXchannelA()                  */
/*********************************************************************/
static BYTE loadSICOFI_CoefFilterXchannelA()
{
int i;
BYTE SicofiCommand;
BYTE badLoadFlag;
BYTE readBuf[10];
BYTE writeBuf[10];

   clearPendingLCInterrupts();

   /* WRITE A CR1 COMMAND - TO CHANNEL A */
```

```
   SicofiCommand = setCOP(SICOFI_CHANNEL_A,
                          SICOFI_WRITE,
                          getCOP_code(X_FILTER));

    writeBuf[0] = 0x40;
    writeBuf[1] = 0x1c;
    writeBuf[2] = 0xa7;
    writeBuf[3] = 0x42;
    writeBuf[4] = 0x1e;
    writeBuf[5] = 0xc5;
    writeBuf[6] = 0x04;
    writeBuf[7] = 0x24;

    sendLCSicofiCommand(lceHandler /* ORIGINATOR */
                       ,SicofiCommand
                       ,writeBuf);

   for (i=0;i<1000;i++) if (getLCSicofiStat() == OKAY) break;

   /* VERIFY SICOFI COP */
   SicofiCommand = setCOP(SICOFI_CHANNEL_A,
                          SICOFI_READ,
                          getCOP_code(X_FILTER));

   for (i=0;i<1000;i++) if (requestLCSicofiStatus(lceHandler
                           ,SicofiCommand) != BUSY) break;

   for(i=0;i<100;i++) if ( getLCSicofiStatus(lceHandler, /* ORIGINATOR */
                                  readBuf) == OKAY) break;
#ifdef TEST_DEBUG
printf("load SICOFI coef Filter X delay Chan A - done\n");
#endif

    for(badLoadFlag=FALSE,i=0;i<8;i++)
       if (readBuf[i+1] != writeBuf[i])
     {
     badLoadFlag = TRUE;
     break;
     }

    if (badLoadFlag == FALSE)

           return OKAY;
        else return NOT_OKAY;
/****************************************************************/
/****************************************************************/
static BYTE loadSICOFI_CoefFilterRchannelA()
{
int i;
BYTE SicofiCommand;
BYTE badLoadFlag;
BYTE readBuf[10];
BYTE writeBuf[10];

    /* WRITE A CR1 COMMAND - TO CHANNEL A */
    SicofiCommand = setCOP(SICOFI_CHANNEL_A,
                           SICOFI_WRITE,
                           getCOP_code(R_FILTER));

     writeBuf[0] = 0x40;
     writeBuf[1] = 0x1b;
     writeBuf[2] = 0x97;
     writeBuf[3] = 0x42;
     writeBuf[4] = 0x7b;
     writeBuf[5] = 0xd6;
     writeBuf[6] = 0x04;
     writeBuf[7] = 0xbb;
```

```
 sendLCSicofiCommand(lceHandler /* ORIGINATOR */
                    ,SicofiCommand
                    ,writeBuf);

 for (i=0;i<1000;i++) if (getLCSicofiStat() == OKAY) break;

 /* VERIFY SICOFI COP */
 SicofiCommand = setCOP(SICOFI_CHANNEL_A,
                        SICOFI_READ,
                        getCOP_code(R_FILTER));

 for (i=0;i<1000;i++) if (requestLCSicofiStatus(lceHandler
                          ,SicofiCommand) != BUSY) break;

 for(i=0;i<100;i++) if ( getLCSicofiStatus(lceHandler, /* ORIGINATOR */
                             readBuf) == OKAY) break;
#ifdef TEST_DEBUG
printf("load SICOFI coef Filter R  Chan A - done\n");
#endif

  for(badLoadFlag=FALSE,i=0;i<8;i++)
     if (readBuf[i+1] != writeBuf[i])
   {
   badLoadFlag = TRUE;
   break;
   }

  if (badLoadFlag == FALSE)
     return OKAY;
  else return NOT_OKAY;

/*****************************************************************/
/*****************************************************************/
static BYTE loadSICOFI_CoefFilterGXchannelA()
{
int i;
BYTE SicofiCommand;
BYTE badLoadFlag;
BYTE readBuf[10];
BYTE writeBuf[10];

 /* WRITE A CR1 COMMAND - TO CHANNEL A */
 SicofiCommand = setCOP(SICOFI_CHANNEL_A,
                        SICOFI_WRITE,
                        getCOP_code(GX_FILTER));

  writeBuf[0] = 0xc0;
  writeBuf[1] = 0x2b;
  writeBuf[2] = 0x20;
  writeBuf[3] = 0x23;

  sendLCSicofiCommand(lceHandler /* ORIGINATOR */
                     ,SicofiCommand
                     ,writeBuf);

 for (i=0;i<1000;i++) if (getLCSicofiStat() == OKAY) break;

 /* VERIFY SICOFI COP */
 SicofiCommand = setCOP(SICOFI_CHANNEL_A,
                        SICOFI_READ,
                        getCOP_code(GX_FILTER));

 for (i=0;i<1000;i++) if (requestLCSicofiStatus(lceHandler
                          ,SicofiCommand) != BUSY) break;

 for(i=0;i<100;i++) if ( getLCSicofiStatus(lceHandler, /* ORIGINATOR */
                             readBuf) == OKAY) break;
```

```
#ifdef TEST_DEBUG
printf("load SICOFI coef Filter GX Chan A - done\n");
#endif

    for(badLoadFlag=FALSE,i=0;i<4;i++)
       if (readBuf[i+1] != writeBuf[i])
      {
      badLoadFlag = TRUE;
      break;
      }

    if (badLoadFlag == FALSE)
       return OKAY;
    else return NOT_OKAY;
}

/***************************************************************/
/*                  init LC Emulator                           */
/***************************************************************/
BYTE initLCemulator()
{
BYTE badLoadFlag;
int badCount;
int i;

   setLCInterrupts(ALL_ICC_INTERRUPTS_OFF);
   clearPendingLCInterrupts();

   setLCInterrupts(SIN_INTERRUPT_MASK);

   badCount=0;
   initSICOFIchannelA();
   initSICOFIchannelB();

   for (i=0,badLoadFlag=TRUE;i<1000;i++) {
      if (enableSICOFI_FiltersChannelA() == OKAY)
    {
    badLoadFlag = FALSE;
    break;
    }
      }
   for (i=0,badLoadFlag=TRUE;i<1000;i++) {
      if (enableSICOFI_FiltersChannelB() == OKAY)
    {
    badLoadFlag = FALSE;
    break;
    }
      }
   for (i=0,badLoadFlag=TRUE;i<1000;i++) {
      if (loadSICOFI_CoefFilterB1ChannelA() == OKAY)
    {
    badLoadFlag = FALSE;
    break;
    }
      }
   for (i=0,badLoadFlag=TRUE;i<1000;i++) {
      if (loadSICOFI_CoefFilterB2ChannelA() == OKAY)
    {
    badLoadFlag = FALSE;
    break;
    }
      }
   for (i=0,badLoadFlag=TRUE;i<1000;i++) {
      if (loadSICOFI_CoefFilterZchannelA() == OKAY)
    {
    badLoadFlag = FALSE;
    break;
    }
```

```
    }
for (i=0,badLoadFlag=TRUE;i<1000;i++) {
   if (loadSICOFI_CoefFilterBdelayChA() == OKAY)

   {
   badLoadFlag = FALSE;
   break;
   }
     }
  for (i=0,badLoadFlag=TRUE;i<1000;i++) {
     if (loadSICOFI_CoefFilterXchannelA() == OKAY)
   {
   badLoadFlag = FALSE;
   break;
   }
     }
  for (i=0,badLoadFlag=TRUE;i<1000;i++) {
     if (loadSICOFI_CoefFilterRchannelA() == OKAY)
   {
   badLoadFlag = FALSE;
   break;
   }
     }
  for (i=0,badLoadFlag=TRUE;i<1000;i++) {
     if (loadSICOFI_CoefFilterGXchannelA() == OKAY)
   {
   badLoadFlag = FALSE;
   break;
   }
     }

  setLCInterrupts(ALL_ICC_INTERRUPTS_OFF);
  clearPendingLCInterrupts();

  if (badLoadFlag == FALSE)
     return OKAY;
  else return NOT_OKAY;
}

#define TEST 1

#include "DAMLlit.h"
#include "LCe.h"
#include "lcepriv.h"   /* NEED TO GET ACCESS TO CIC REGISTERS */
#include "out.h"

/*
------------------------------------------------------------------------
           FILE: COMMTST.c  to test LCE to RT COMM operations
------------------------------------------------------------------------
*/

/* ********************************************************************** */
/* ********************************************************************** */

void linkTheLC_IECQ()
{

BYTE state;
BYTE C_I_code;
BYTE CIR0_Image;

   outp(0x931,0x47);

   state = 1;  /* WAIT FOR DEAC */
   while (state != 0)
   {
   CIR0_Image = inp(0x931);   /* ICC C/I READ REGISTER */

   C_I_code = (CIR0_Image & 0x3c) >> 2;
```

```
switch(state)
   {
   case 1:  /* CHECK DEAC */
      {
      if (C_I_code == 0x01)
         {
         state =2;  /* WAIT FOR DI */
         outp(0x931,0x43);
         }
      break;
      }
   case 2:  /* WAIT FOR DI */
      {
      if (C_I_code == 0x0f)
         {
         state =3;  /* WAIT FOR DI */
         outp(0x931,0x63);
         }
      break;
      }
   case 3:
      {
      if (C_I_code == 0x0c)
               {
               state = 0;
               break;
               }
            }
         default: break;

         }   /* END SWITCH */
   } /* END WHILE */

}

/* ********************************************************************
 *                          MAIN PROCEDURE
 **********************************************************************
*/
void main()
{

extern void interrupt far LC_SICOFI_Interrupts ();

BYTE SicofiCommand;
BYTE result;
static BYTE WriteBuf[10];   /* TO CONTAIN CR1,...,CR3 and COP's COEFF's. */
static BYTE readBuf[10];
BYTE cr1Value;
BYTE cr2Value;
BYTE cr3Value;
int i;
long int j=0;
long int k=0;
int count;
BYTE cicStat;
BYTE currentShort ;
BYTE flag;

typedef struct {
   BYTE stat;
   BYTE test;
   BYTE msg;
   BYTE data1;
   BYTE data2;
   } LC_COMM_MSG_T;
```

```
LC_COMM_MSG_T xmt;
LC_COMM_MSG_T rcv;

   disableInterrupts();

   outputHandlerInit();

   init_LC_ICC();
   interruptsInit();
   setHandler(0x01,LC_SICOFI_Interrupts);

   interruptsStart();

   setLCInterrupts(ALL_ICC_INTERRUPTS_OFF);

   clearPendingLCInterrupts();

   setLCInterrupts(SIN_INTERRUPT_MASK);

/* RESET & POWER UP SICOFI - CHANNEL A */
/* ************************************************************************* */
   SicofiCommand = setSOP(SICOFI_CHANNEL_A,
                          SICOFI_WRITE,
                          POWER_UP,
                          RESET_SICOFI,0);

    sendLCSicofiCommand(1 /* ORIGINATOR */
                              ,SicofiCommand
                              ,WriteBuf);

   for (i=0;i<1000;i++) if (getLCSicofiStat() == OKAY) break;


/* RESET & POWER UP SICOFI - CHANNEL B */
/* ************************************************************************* */
   SicofiCommand = setSOP(SICOFI_CHANNEL_B,
                          SICOFI_WRITE,
                          POWER_UP,RESET_SICOFI,0);

    sendLCSicofiCommand(1 /* ORIGINATOR */
                              ,SicofiCommand
                              ,WriteBuf);

   for (i=0;i<1000;i++) if (getLCSicofiStat() == OKAY) break;

/* ************************************************************************* */
 /* WRITE A CR1 COMMAND - TO CHANNEL A*/
/* ???? REMEMBER TO CONFIGURE SICOFI SBx to OUTPUT */

   SicofiCommand = setSOP(SICOFI_CHANNEL_A,
                          SICOFI_WRITE,
                          POWER_UP,NIL,CR1_Len);

   WriteBuf[0] = setCR1(ENABLE_FILTER,
                        ENABLE_FILTER,
                        DISABLE_FILTER,
                        DISABLE_FILTER,
                        DISABLE_FILTER,
                        DISABLE_FILTER,
                        SBX_INPUT_SEL, NIL);

    sendLCSicofiCommand(1 /* ORIGINATOR */
                              ,SicofiCommand
                              ,WriteBuf);
```

```
for (i=0;i<1000;i++) if (getLCSicofiStat() == OKAY) break;

/* VERIFY SICOFI CR1 */
SicofiCommand = setSOP(SICOFI_CHANNEL_A,
                       SICOFI_READ,
                       POWER_UP,NIL,CR1_Len);

while (requestLCSicofiStatus(1, /* ORIGINATOR */
                             SicofiCommand) == BUSY)
    ;

for(i=0;i<100;i++) if ( getLCSicofiStatus(1, /* ORIGINATOR */
                             readBuf) == OKAY) break;

setLCInterrupts(ALL_ICC_INTERRUPTS_OFF);
clearPendingLCInterrupts();

/* ************************************************************ */
LCSicofiSignallingOutput(_45mA_GENERATOR,OFF);
LCSicofiSignallingOutput(_5mA_GENERATOR,OFF);

LCSicofiSignallingOutput(VOICE_CHANNEL_SELECT,HIGH);
/* LCSicofiSignallingOutput(VOICE_CHANNEL_SELECT,LOW); */

LCSicofiSignallingOutput(LC_OUTPUT_SELECT,LOW);
LCSicofiSignallingOutput(LC_OUTPUT_SELECT,HIGH);    /* SELECT DSL */

/* HAVE AUTOCUTOFF AVAILABLE */
LcSicofiSignallingOutput(AUTO_CUTOFF_OVRD,OFF);

/* APPLY 50 mA FOR 3 SECS. */
LCSicofiSignallingOutput(_45mA_GENERATOR,ON);
LCSicofiSignallingOutput(_5mA_GENERATOR,ON);

for(j=0;j<=60000;j++) i=0;

LCSicofiSignallingOutput(AUTO_CUTOFF_OVRD,ON);


/* CHECK FOR SHORTS */
currentShort = LCSicofiSignallingInput( LOW_110V_DETECTOR);

if (currentShort == 1)
/* REDUCE TO 5 mA */
   LCSicofiSignallingOutput(_45mA_GENERATOR,OFF);

dOutput(VF_OSC_SELECT,ON);
dOutput(VF_LCEM_CONNECT,OFF);

/* ************************************************************ */
/* ************************************************************ */

linkTheLC_IECQ();
initLCcomm();

setLCInterrupts(RME_INTERRUPT_MASK);
xmt.stat = 0x01;    /* RING A */
xmt.test = 0;
xmt.msg = 0;
xmt.data1 = 0;
xmt.data2 = 0;
sendLC_ICC(&xmt);

while (rcvLC_ICC(&rcv) != OKAY) ;

xmt.stat = 0x03;    /* RING A & B*/
sendLC_ICC(&xmt);
```

```
    while (rcvLC_ICC(&rcv) != OKAY) ;

    resetLCcomm();

    setLCInterrupts(ALL_ICC_INTERRUPTS_OFF);
    clearPendingLCInterrupts();

  }   /* END MAIN */

### lch\lchand.sm ###
     Mon Sep 10 09:33:55 1990


    %[
    #define TEST_DEBUG 1

    /*

    $Workfile:   lchand.sm  $
    $Revision:   1.1  $
    $Date:   04 Sep 1990 16:13:46  $

    $Log:   E:/USR/DAML/APPC/LCH/VCS/LCHAND.SMV  $

          Rev 1.1   04 Sep 1990 16:13:46   bChen
       Decrease time delay to link IEC-Q.  Also, disconnect power to RT after
       detecting excessive retries.


          Rev 1.0   03 Sep 1990 16:49:36   bChen
       Initial revision.

    */


    static char *vscId="$Header:   E:/USR/DAML/APPC/LCH/VCS/LCHAND.SMV   1.1

    /*-----------------------------------------------------------------------*
     *                   RAYCHEM Corp. / Telecommunications                  *
     *                                                                       *
     *         File: LChandler.sm                                            *
     *      Created: July 19, 1990                                           *
     * Tools used: Microsoft C compiler v. 5.00                              *
     *             Turbo Debugger versions 1.01 and 2.0                      *
     *                                                                       *
     * Description:                                                          *
     *                                                                       *
     *                                                                       *
     * Compilation procedure:                                                *
     *   sysMgr.SM  is the control source for sysMgr.c                       *
     *   The SMC (State Machine Compiler) takes .SM and creates .C           *
     *   example:  smc < PollHnd.SM > PollHnd.C                              *
     *                                                                       *
     * Modification History:                                                 *
     *  8/15/90  BCH: First Version                                          *
     *  8/27/90 BCH: Added link check during LINKED state.                   *
     ------------------------------------------------------------------------*/

    #       include "rts.h"
    #       include "DAMLlit.h"
    #       include "DAMLmsg.h"
    #       include "DAMLcnf.h"
    #       include "lce.h"

    extern QUEUE_T *SaveQueue;

    ]%
```

```
stateMachines = { lceHandler };

smDataTypeDef %[
                  unsigned someData;
                  unsigned moreData;
]%                                     SMX_DATA_T;

states = {        IDLE_STATE,
                  WAIT_TO_CHARGE_STATE,
                  RETRY_SHORT_STATE,
                  WAIT_LINE_SETTLE_STATE,
                  WAIT_DEAC_STATE,
                  WAIT_DI_STATE,
                  WAIT_AI_STATE,
                  LINKED_STATE,
             WAIT_ABSORBANT_STATE,
             WAIT_ABSORB_DISCONNECT_STATE,
             WAIT_RING_STATE,
             WAIT_REFLECTIVE_STATE,
             WAIT_DISCONNECT_REFLECTIVE_STATE
          };


messages = {SM_INITIALIZE,
            connect_emulator_m,
            disconnect_emulator_m,
       delay_over_m,
       test_delay_m
       };

transProcs = {powerOn,
              functionA,
              functionB,
              functionC,
              functionD,
              functionE,
              functionF,
              functionG,
              functionH,
         functionI,
         ignoreMsg
              };

transitions = {  IDLE_STATE { SM_INITIALIZE  , powerOn
                             ,connect_emulator_m, functionA
                             ,disconnect_emulator_m, functionH
                             ,delay_over_m, ignoreMsg
                        ,test_delay_m, ignoreMsg
                       }
                  WAIT_TO_CHARGE_STATE {  SM_INITIALIZE , powerOn
                             ,connect_emulator_m, ignoreMsg
                             ,disconnect_emulator_m, functionH
                             ,delay_over_m, functionB
                        ,test_delay_m, ignoreMsg
                           }
    RETRY_SHORT_STATE {  SM_INITIALIZE , powerOn
               ,connect_emulator_m, ignoreMsg
               ,disconnect_emulator_m, functionH
               ,delay_over_m, functionC
          ,test_delay_m, ignoreMsg
             }
    WAIT_LINE_SETTLE_STATE {  SM_INITIALIZE , powerOn
               ,connect_emulator_m, ignoreMsg
               ,disconnect_emulator_m, functionH
               ,delay_over_m, functionD
          ,test_delay_m, ignoreMsg
```

```
        }
WAIT_DEAC_STATE {  SM_INITIALIZE , powerOn
            ,connect_emulator_m, ignoreMsg
            ,disconnect_emulator_m, functionH
            ,delay_over_m, functionE
       ,test_delay_m, ignoreMsg
        }
WAIT_DI_STATE {  SM_INITIALIZE , powerOn
            ,connect_emulator_m, ignoreMsg
            ,disconnect_emulator_m, functionH
            ,delay_over_m, functionF
       ,test_delay_m, ignoreMsg
        }
WAIT_AI_STATE {  SM_INITIALIZE , powerOn
            ,connect_emulator_m, ignoreMsg
            ,disconnect_emulator_m, functionH
            ,delay_over_m, functionG
       ,test_delay_m, ignoreMsg
        }
LINKED_STATE {  SM_INITIALIZE , powerOn
            ,connect_emulator_m, ignoreMsg
            ,disconnect_emulator_m, functionH
       ,delay_over_m, functionI
       ,test_delay_m, ignoreMsg
        }
WAIT_ABSORBANT_STATE  {  SM_INITIALIZE , powerOn
            ,connect_emulator_m, ignoreMsg
            ,disconnect_emulator_m, functionH
       ,delay_over_m, functionI
       ,test_delay_m, ignoreMsg
        }
WAIT_ABSORB_DISCONNECT_STATE
      {  SM_INITIALIZE , powerOn
            ,connect_emulator_m, ignoreMsg
            ,disconnect_emulator_m, functionH
       ,delay_over_m, functionI
       ,test_delay_m, ignoreMsg
        }
WAIT_RING_STATE {  SM_INITIALIZE , powerOn
            ,connect_emulator_m, ignoreMsg
            ,disconnect_emulator_m, functionH
       ,delay_over_m, functionI
       ,test_delay_m, ignoreMsg
        }
WAIT_REFLECTIVE_STATE {  SM_INITIALIZE , powerOn
            ,connect_emulator_m, ignoreMsg
            ,disconnect_emulator_m, functionH
       ,delay_over_m, functionI
       ,test_delay_m, ignoreMsg
        }
WAIT_DISCONNECT_REFLECTIVE_STATE
      {  SM_INITIALIZE , powerOn
            ,connect_emulator_m, ignoreMsg
            ,disconnect_emulator_m, functionH
       ,delay_over_m, functionI
       ,test_delay_m, ignoreMsg
        }
   } ;

%[

/*****************************************************************/
/*                External Declarations                          */
/*****************************************************************/

/*****************************************************************/
/*                CONSTANT Declarations                          */
/*****************************************************************/
```

```
/*                      Local Variables                             */
/********************************************************************/

SM_NAME_T actionRequestor;
int retryCounter;
TIMER_MSG_T *lcTimerMsg;
TIMER_MSG_T *lcTimerMsg2;

BYTE writeBuf[10];    /* FOR SICOFI WRITES */
BYTE readBuf[10];     /* FOR SICOFI READS */


/********************************************************************/
/*                      Local Procedures                            */
/********************************************************************/
static void beginTimer(time)
unsigned time;
{
   lcTimerMsg = startTimer(delay_over_m, time);

}   /* END beginPollTimer */


static void beginTimer2(time)
unsigned long time;
{
   lcTimerMsg2 = startTimer(test_delay_m, time);

}   /* END beginTestTimer */


/********************************************************************/
/*                      replyWithMsg                                */
/********************************************************************/
replyWithMsg(result)
unsigned result;
{
RESPONSE_MSG_T *out_msg;

   out_msg = (RESPONSE_MSG_T *) msgAlloc (sizeof(RESPONSE_MSG_T)
                                        - sizeof(MSG_T));

   out_msg->msgHdr.fields.name = done_m;
   out_msg->msgHdr.fields.dest = actionRequestor;
   out_msg->msgHdr.fields.origin = lceHandler;
   out_msg->msgHdr.fields.priority = HARDWARE_PRIORITY;
   out_msg->msgHdr.fields.infoSize = 0;
   out_msg->response = result;

   sendMsg ((MSG_T *) out_msg);
}

/********************************************************************/
/*                      Transition procedures                       */
/********************************************************************/

static SM_STATE_T powerOn  (msg, self)
MSG_T *msg;
SM_DESCRIPTOR_T *self;
{

#ifdef TEST_DEBUG
   printf("lc Handler Executed Power On\n");
#endif

   return(IDLE_STATE);
};
```

```
/*******************************************************************/
/*                      Function A                                 */
/*******************************************************************/

static SM_STATE_T functionA(msg, self)  /* connect_emulator_m */
MSG_T *msg;
SM_DESCRIPTOR_T *self;
{
BYTE badLoadFlag;

#ifdef TEST_DEBUG
   printf("LCH:Function A - connect emulator received\n");
#endif

   actionRequestor = msg->fields.origin;   /* RECORD REQUESTOR */

   if (initLCemulator() == OKAY)
     {
      /* BEGIN POWER UP RT PROCEDURE */
      LCSicofiSignallingOutput(_45mA_GENERATOR,OFF);
      LCSicofiSignallingOutput(_5mA_GENERATOR,OFF);

      LCSicofiSignallingOutput(VOICE_CHANNEL_SELECT,HIGH);

      LCSicofiSignallingOutput(LC_OUTPUT_SELECT,HIGH);   /* SELECT DSL */

      /* DISABLE AUTOCUTOFF WHILE CHARGING LINE */
      LcSicofiSignallingOutput(AUTO_CUTOFF_OVRD,OFF);

      /* APPLY 50 mA */
      LCSicofiSignallingOutput(_45mA_GENERATOR,ON);
      LCSicofiSignallingOutput(_5mA_GENERATOR,ON);

      beginTimer(15000);   /* 15 SCEONDS */
      retryCounter = 0;   /* KEEP COUNT OF UNSUCCESSFULL RETRIES */

      return( WAIT_TO_CHARGE_STATE );
      }
   else
      {
      replyWithMsg(NOT_OKAY);
      return(IDLE_STATE);
      }
};

/*******************************************************************/
/*                      Function B                                 */
/*******************************************************************/

static SM_STATE_T functionB(msg, self)  /* delay_over_m_m */
MSG_T *msg;
SM_DESCRIPTOR_T *self;
{

 BYTE LCsigInpVal;
/*
   Delay over after current applied to DSL. Check for short
   and continue with linking.
*/
#ifdef TEST_DEBUG
   printf("LCH:Fnt B - delay over received\n");
#endif
```

```
   LCsigInpVal = LCSicofiSignallingInput(LOW_110V_DETECTOR);
   if (LCsigInpVal == TRUE)
/*   if (LCSicofiSignallingInput( LOW_110V_DETECTOR) == FALSE) */
      {
      /* POTENTIAL SHORT ON DSL */
      retryCounter++;
      LCSicofiSignallingOutput(_45mA_GENERATOR,OFF);
      LCSicofiSignallingOutput(_5mA_GENERATOR,OFF);

      if (retryCounter > MAX_LC_CONNECTION_RETRIES)
         {
         replyWithMsg(NOT_OKAY);
         return( IDLE_STATE );
         }
      else
         {
         beginTimer(15000);    /* ALLOW FOR LINE TO FULLY DISCHARGE */
                               /* AND COMPONENTS TO COOL */
         return( RETRY_SHORT_STATE );
         }
      }   /* END IF SHORT CIRCUIT */
   else
      {
      /* NO SHORTS DETECTED - POWER UP COMPLETE - BEGIN IECQ LINKING */
      LCSicofiSignallingOutput(AUTO_CUTOFF_OVRD,ON);    /* OVRD PROTECTOR  *
      beginTimer(500);
      return( WAIT_LINE_SETTLE_STATE);
      }

};

/*****************************************************************/
/*                    Function C                                 */
/*****************************************************************/

static SM_STATE_T functionC(msg, self)  /* delay_over_m */
MSG_T *msg;
SM_DESCRIPTOR_T *self;
{
/*
  Delay over after waiting for discharge time as a result of
  a potential line short.  Try to powre up again.
*/
#ifdef TEST_DEBUG
   printf("LCH:Fnt C - delay over received\n");
#endif

   /* APPLY 50 mA */
   LCSicofiSignallingOutput(_45mA_GENERATOR,ON);
   LCSicofiSignallingOutput(_5mA_GENERATOR,ON);

   beginTimer(15000);    /* 15 SECONDS */

   return( WAIT_TO_CHARGE_STATE );
};

/*****************************************************************/
/*                    Function D                                 */
/*****************************************************************/

static SM_STATE_T functionD(msg, self)  /* delay_over_m */
MSG_T *msg;
SM_DESCRIPTOR_T *self;
{
/*
```

```
   Delay over received after wait for powered line to settle.
   begin linking the IECQ.
*/
#ifdef TEST_DEBUG
   printf("LCH:Fnt D - delay over received\n");
#endif

   writeLC_IECQ(IECQ_RES);
   beginTimer(3000);
   return( WAIT_DEAC_STATE);

};


/*****************************************************************/
/*                      Function E                               */
/*****************************************************************/

static SM_STATE_T functionE(msg, self)  /* delay_over_m */
MSG_T *msg;
SM_DESCRIPTOR_T *self;
{

BYTE IECQ_value;
/*
   delay over waiting for DEAC code. Check if arrived,
*/
#ifdef TEST_DEBUG
   printf("LCH:Fnt E - delay over received\n");
#endif

   IECQ_value = readLC_IECQ();

   if (IECQ_value == IECQ_DEAC)
      {
      writeLC_IECQ(IECQ_DR);
      beginTimer(3000);
      return( WAIT_DI_STATE);
      }
   else
      {
      /* DEAC DID NOT RESPOND WITHIN ALLOWED TIME */
      retryCounter++;
      if (retryCounter > MAX_LC_CONNECTION_RETRIES)
         {
         /* GIVE UP */
    LCSicofiSignallingOutput(_45mA_GENERATOR,OFF);
    LCSicofiSignallingOutput(_5mA_GENERATOR,OFF);
         replyWithMsg(NOT_OKAY);
         return( IDLE_STATE );
         }
       else
         {
         /* KEEP TRYING */
         if ((IECQ_value == IECQ_RSY )
             || (IECQ_value == IECQ_EI3)
             || (IECQ_value == IECQ_LSL)
             )   writeLC_IECQ(IECQ_RES1);   /* RESET LINE RECEIVER */
            {
            writeLC_IECQ(IECQ_RES);
            beginTimer(500);
            return( WAIT_DEAC_STATE );
            }
         }   /* END ELSE */
      }   /* END ERROR BROCESSING */
 };
```

```
/****************************************************************/
/*                    Function F                                */
/****************************************************************/

static SM_STATE_T functionF(msg, self)  /* delay_over_m */
MSG_T *msg;
SM_DESCRIPTOR_T *self;
{
BYTE IECQ_value;
/*
   delay over waiting for DI code. Check if arrived,
*/
#ifdef TEST_DEBUG
   printf("LCH:Fnt F - delay over received\n");
#endif

   IECQ_value = readLC_IECQ();

   if (IECQ_value == IECQ_DI)
      {
      writeLC_IECQ(IECQ_AR);
      beginTimer(10000);
      return( WAIT_AI_STATE);
      }
   else
      {
      /* DEAC DID NOT RESPOND WITHIN ALLOWED TIME */
      retryCounter++;
      if (retryCounter > MAX_LC_CONNECTION_RETRIES)
         {
         /* GIVE UP */
    LCSicofiSignallingOutput(_45mA_GENERATOR,OFF);
    LCSicofiSignallingOutput(_5mA_GENERATOR,OFF);
         replyWithMsg(NOT_OKAY);
         return( IDLE_STATE );
         }
      else
         {
         /* KEEP TRYING */
         if ((IECQ_value == IECQ_RSY )
             || (IECQ_value == IECQ_EI3)
             || (IECQ_value == IECQ_LSL)
            )   writeLC_IECQ(IECQ_RES1);   /* RESET LINE RECEIVER */
            {
            writeLC_IECQ(IECQ_RES);
            beginTimer(500);
            return( WAIT_DEAC_STATE );
            }
         }
      }   /* END ERROR PROCESSING */

};

/****************************************************************/
/*                    Function G                                */
/****************************************************************/

static SM_STATE_T functionG(msg, self)  /* connect_emulator_m */
MSG_T *msg;
SM_DESCRIPTOR_T *self;
{

BYTE IECQ_value;
int i;
/*
   delay over waiting for AI code. Check if arrived, and complete
   the link if so.
```

```
*/
#ifdef TEST_DEBUG
   printf("LCH:Fnt G - delay over received\n");
#endif

   IECQ_value = readLC_IECQ();

   for(i=0; i<10000; i++)  i = i;
   IECQ_value = readLC_IECQ();

   if (IECQ_value == IECQ_AI)
      {
      replyWithMsg(OKAY);
      beginTimer(500);   /* Begin timer to continously check for link */
      return( LINKED_STATE);
      }
   else
      {
      /* DEAC DID NOT RESPOND WITHIN ALLOWED TIME */
      retryCounter++;
      if (retryCounter > MAX_LC_CONNECTION_RETRIES)
         {
         /* GIVE UP */
    LCSicofiSignallingOutput(_45mA_GENERATOR,OFF);
    LCSicofiSignallingOutput(_5mA_GENERATOR,OFF);
         replyWithMsg(NOT_OKAY);
         return( IDLE_STATE );
         }
      else
         {
         /* KEEP TRYING */
         if ((IECQ_value == IECQ_RSY )
              || (IECQ_value == IECQ_EI3)
              || (IECQ_value == IECQ_LSL)
             )   writeLC_IECQ(IECQ_RES1);   /* RESET LINE RECEIVER */
            {
             writeLC_IECQ(IECQ_RES);
             beginTimer(500);
             return( WAIT_DEAC_STATE );
             }
         }

      }   /* END ERROR PROCESSING */
};


/*******************************************************************/
/*                    Function H                                   */
/*******************************************************************/

static SM_STATE_T functionH(msg, self)  /* disconnect_emulator_m */
MSG_T *msg;
SM_DESCRIPTOR_T *self;
{
/*
   disconnect the link by powering down the unit.
*/
#ifdef TEST_DEBUG
   printf("LCH:Fnt H - disconnect emulator \n");
#endif

   LCSicofiSignallingOutput(LC_OUTPUT_SELECT,LOW);   /* DESELECT DSL */
   LCSicofiSignallingOutput(_45mA_GENERATOR,OFF);
   LCSicofiSignallingOutput(_5mA_GENERATOR,OFF);
   cancelTimer(lcTimerMsg);

   return(IDLE_STATE);
};
```

```
/****************************************************************/
/*                    Function I                                */
/****************************************************************/

static SM_STATE_T functionI(msg, self)  /* delay_over_m */
MSG_T *msg;
SM_DESCRIPTOR_T *self;
{
/*
   check that link is still good.
*/
BASIC_MSG_T *outMsg; .
BYTE IECQ_value;

#ifdef TEST_DEBUG
   printf("LCH:Fnt I - delay over checking link \n");
#endif

   IECQ_value = readLC_IECQ();

   if (IECQ_value == IECQ_AI)
      {
      beginTimer(500);   /* keep checking link every 500 mSec. */
      return( LINKED_STATE);
      }
   else
      {
      LCSicofiSignallingOutput(LC_OUTPUT_SELECT,LOW);   /* DESELECT DSL */
      LCSicofiSignallingOutput(_45mA_GENERATOR,OFF);
      LCSicofiSignallingOutput(_5mA_GENERATOR,OFF);
      outMsg = (BASIC_MSG_T *) msgAlloc (sizeof(BASIC_MSG_T)
                                   - sizeof(MSG_T));
      outMsg->msgHdr.fields.name = lce_lost_link_m;
      outMsg->msgHdr.fields.dest = actionRequestor;
      outMsg->msgHdr.fields.origin = lceHandler;
      outMsg->msgHdr.fields.priority = HARDWARE_PRIORITY;
      outMsg->msgHdr.fields.infoSize = 0;

      sendMsg ((MSG_T *) outMsg);
      return(IDLE_STATE);
      }
};


]%

/*

$Workfile:   mbx.h  $
$Revision:   1.0  $
$Date:   31 Aug 1990 18:06:54   $

$Log:   E:/USR/DAML/APPC/MBX/VCS/MBX.H_V  $
 *
 *    Rev 1.0   31 Aug 1990 18:06:54   bChen
 * Initial revision.

*/


/****-----------------------------------------------------------------------
*   File: mbx.h
*
*   The header file used by the mailbox driver and modules that uses the
*   the mailbox driver module.
*
```

```
*   Compilation procedure:
*
*   If the mailbox module is to be used on the APPC side:
*     cl /D APP=1 [other switches] mbox.c
*
*   If the mailbox module is to be used on the COM side:
*     cl /D COM=1 [other switches] mbox.c
*
*   If the mailbox program is on the APPC side, the mailboxes and their
*   registers are referenced with far pointers.  If the mailbox program is
*   on the COMM side, the mailboxes, and their registers are referenced
*   as near pointer.
*
*****--------------------------------------------------------------------
#ifndef MBOXH
#define MBOXH

#   define   MAX_POLLING_NUMBER        32768
#   define   MAX_QUEUE_SIZE            255
#   define   MAX_MBOX_SZ               255

    typedef unsigned int   WORD;     /* 16-bit data */

    typedef struct {
       WORD   length;
       BYTE   command;
       BYTE   data;
    } MAILBOX_T;

    typedef MAILBOX_T far *   MAILBOX_PTR;
    typedef WORD far *        LEN_REG_PTR;
    typedef BYTE far *        CMD_REG_PTR;
    typedef BYTE far *        MAIL_PTR;
#   ifndef HD_QUE
#      include "que.h"
#   endif
#   ifndef HD_SCH
#      include "sch.h"
#   endif

#   ifdef APP
       typedef struct {
          MSG_T          message;
          char           data;
       } ZT_Msg;

       typedef ZT_Msg       *ZT_MsgPtr;

       typedef ZT_Msg far   *ZT_MsgFarPtr;
#   endif


    extern QUEUE_T xmitQ;
    extern QUEUE_T msgQueue;

    extern void xmitMail();
    extern void mBoxInitialize();
    extern void mBoxXmit();
    extern void mBoxRcv();
    extern void sim_InitializeQ();
    extern void sim_putInRcvMbox();
    extern void sendMsg();

/*  Error and Warning codes: */
/*
#   define  E_INVALID_STATE     1
#   define  E_RCV_TIMED_OUT     2
```

```
#   define  E_Q_OVFL           3

#   define  W_UA_WAIT          10
#   define  W_INVALID_CODE     11
*/

#endif
/*

$Workfile$
$Revision$
$Date$

$Log$

*/


static char *vscId="$Header$ (c) 1990, Raychem Corp";

/*****------------------------------------------------------------------------
*             Evotech Microenginering Consultants, Inc
*
*       File: MBXDVR.C
*    Created: June 17, 1990
*   Compiler: Microsoft C compiler v. 5.00
*      Tools: Turbo Debugger versions 1.01 and 2.0
*
*   Description:
*
*      This module facilitates the exchange of messages between the
*      Ziatech ZT8809 and the Ziatech ZT8830 boards.  The messages are
*      placed and taken via mailboxes.  Two mailboxes are used in this
*      implementation.  One mailbox is used by the receiver.  The receiver
*      takes the message from the mailbox and sends it to a destination as
*      specified by the message.  The other mailbox is used by the
*      transmitter.  The transmitter takes a message from a queue of
*      messages and puts it into the mailbox.
*
*      The message structure on both sides of the mailbox is different,
*      therefore, for each task, putting and taking a message into a
*      mailbox, requires different implementations.  There are two
*      mailIn() functions in this module which perform the task of
*      putting messages into a mailbox, however, one is for the ZT8809
*      and the other is for the ZT8830.  Likewise, there are two
*      MailOut() functions in this module, which perform the task of
*      taking messages out of a mailbox.
*
*   Compilation procedure:
*
*      If program is to be used for the APPC side:
*         cl /D APPC=1 [other switches] mbox.c
*
*      If the program is to be used for the COMM side:
*         cl /D COM=1 [other switches] mbox.c
*
*   Modification History:
*      06/19/1990:  Added queue overflow checking to the module
*                   Optimized the case statements in the mBoxRcv()
*                   and mBoxXmit().
*      06/20/1990:  Added procedures to aid in running simulations
*                   on the IBM PC.
*      06/28/1990:  Revised the designed of the mailbox data
*                   structure.
*      07/02/1990:  Temporary modification to put simulation code
*                   to test APPC.
*      07/18/1990:  Remove simulation, fixes mailboxes at both APPC
```

```
*                    and COM side using the LOCATE. Uses cpyTo and
*                    cpyFrom for both APPC and COM.
*       07/19/1990:  Added message length check in mBoxRcv().
*       07/23/1990:  Add xmitQueueCnt to limit xmitMail & avoid ovfl.
*                    & change the order of header files inclusions.
*       08/06/1990:  Modified to conform to APPC directory org. -BCH
*                    Renamed SUImask.h to mbxpriv.h etc... Moved error
*                    codes to APPERR.h
*       08/30/1990:  Modified mBoxRcv() and mBoxTrn() functions, to
*                    include the functions mailIn() and mailOut().
*
*****------------------------------------------------------------------*/

#include "rts.h"
#include "DAMLlit.h"
#include "mbx.h"
#include "mbxpriv.h"

#ifdef APP
#include "DAMLmsg.h"
#include "DAMLcnf.h"
MAILBOX_PTR mailbox1 = (MAILBOX_PTR) 0x80007C00L;
MAILBOX_PTR mailbox2 = (MAILBOX_PTR) 0x80007E00L;
#endif

#ifdef COM
#include "zbx.h"
MAILBOX_PTR mailbox1 = (MAILBOX_PTR) 0x00007C00L;
MAILBOX_PTR mailbox2 = (MAILBOX_PTR) 0x00007E00L;
#endif

typedef enum  {
  XMIT_ALL_STATES=1, XMIT_WAIT_FOR_UA, XMIT_READY, XMIT_WAIT_FOR_RR
} XMIT_STATES;

typedef enum  {
  RCV_ALL_STATES=10, RCV_WAIT_FOR_SABM, RCV_WAIT_FOR_MSG
} RCV_STATES;


/* COM sends msg to APP using comMBoxAddr mbox */
/* COM send commands to APP using this reg */
/* APP sends msg to COM using this appMBoxAddr mbox */
/* APP send commands to COM using this reg */


MAIL_PTR rcvFromAddr;   /* Receiver driver gets messages from this MBOX */
MAIL_PTR xmitToAddr;    /* Transmitter driver puts messages into this MBOX
CMD_REG_PTR cmdRegRcv;  /* Receiver mailbox's command register */
CMD_REG_PTR cmdRegXmit; /* Transmitter mailbox's command register */
LEN_REG_PTR lenRegRcv;
LEN_REG_PTR lenRegXmit;


XMIT_STATES currentXmitState;
RCV_STATES currentRcvState;


QUEUE_T xmitQ;               /* The queue used by the transmitter to get  *
                             /* messages.                                 *

QUEUE_T msgQueue;            /***  used on the Rcv side ***/

int xmitQueueCnt;
```

```
/**************************************************************************

/****-----------------------------------------------------------------------
*
*   This function checks for queue overflow.
*
*****-----------------------------------------------------------------------

BYTE checkQueueOvfl(q)
QUEUE_T q;
{
   if (xmitQueueCnt > 50 )
      {
      setWarning (W_Q_OVFL);
      return(NOT_OKAY);
      }
   else
      {
      xmitQueueCnt++;
      return(OKAY);
      }
}
/**************************************************************************

/****-----------------------------------------------------------------------
*
*    Function to copy a block of memory from src (pointer given as a far
*    pointer) to dst (pointer given as a near pointer).  It will only copy
*    copy the first sz bytes of src into dst.
*
*    Upon entry, the dst should be already be pointing to a block of
*    of memory.  Upon exit, dst should contain the first sz bytes
*    of src.
*
*****-----------------------------------------------------------------------

void cpyFromMbox (dst, src, sz)
char* dst;
char far *src;
unsigned sz;
{
   for (; sz>=1; sz--)
      *dst++ = *src++;
}  /* cpyFromMbox */


/****-----------------------------------------------------------------------
*
*    Function to copy a block of memory from src (pointer given as a near
*    pointer) to dst (pointer given as a far pointer).  It will only
*    copy the first sz bytes of src into dst.
*
*    Upon entry, the dst should be already be pointing to a block of
*    of memory.  Upon exit, dst should contain the first sz bytes
*    of src.
*
*****-----------------------------------------------------------------------

void cpyToMbox (dst, src, sz)
char far *dst;
char *src;
unsigned sz;
{
   for (; sz>=1; sz--)
      *dst++ = *src++;
}  /* cpyToMbox */
```

```
/*****************************************************************************

#ifdef COM
/****-----------------------------------------------------------------------
*
*   This function puts a message into the mailbox from the Communication.
*
*****-----------------------------------------------------------------------

void mailIn ()
{
FRAME_MSG_PTR msgPtr;

   msgPtr = getRcvFrameMsg ();
   if (msgPtr != NULL)  {
      *cmdRegXmit = RNR_mask;

      *lenRegXmit = msgPtr->length + sizeof (FRAME_MSG);
      cpyToMbox(xmitToAddr, msgPtr, *lenRegXmit);

      *cmdRegXmit = IFrame_mask;

      freeRcvBuffer (msgPtr);
      currentXmitState = XMIT_WAIT_FOR_RR;
   }

}  /* mailIn */


/****-----------------------------------------------------------------------
*
*   This function takes a message from the mailbox into the Communication.
*
*****-----------------------------------------------------------------------

void mailOut (mBoxLen)
WORD mBoxLen;
{
FRAME_MSG_PTR msgPtr;

   msgPtr = getFreeTrnBuffer ();
   if (msgPtr != NULL) {
      cpyFromMbox (msgPtr, rcvFromAddr, mBoxLen);
      sendTrnFrameMsg (msgPtr);
   }

}  /* mailOut */
#endif
/*****************************************************************************

#ifdef APP
/****-----------------------------------------------------------------------
*
*   This function puts a message into the mailbox from the Application.
*
*****-----------------------------------------------------------------------

void mailIn ()
{
ZT_Msg *msgPtr;

   msgPtr = (ZT_Msg*) getFirstQueue (&xmitQ);
   if (msgPtr != NULL)  {
      *cmdRegXmit = RNR_mask;

      *lenRegXmit = msgPtr->message.fields.infoSize;
```

```
      cpyToMbox(xmitToAddr, &(msgPtr->data), *lenRegXmit);

      *cmdRegXmit = IFrame_mask;
      currentXmitState = XMIT_WAIT_FOR_RR;
      memoryFree((char*) msgPtr);

      if (xmitQueueCnt > 0)
         xmitQueueCnt--;
      else
         setWarning(W_XMT_CNT_UNDERFL);
   }
}  /* mailIn */


/****-----------------------------------------------------------------------
*
*   This function takes a message from the mailbox into the Application.
*
*****----------------------------------------------------------------------

void mailOut (mBoxLen)
WORD mBoxLen;
{
ZT_Msg *msgPtr;

   msgPtr = (ZT_Msg*) msgAlloc (mBoxLen);
   if (msgPtr != NULL) {
      cpyFromMbox (&(msgPtr->data), rcvFromAddr, mBoxLen);
      msgPtr->message.fields.name = ext_frame_rcvd_m;
      msgPtr->message.fields.dest = extFrameDistributor;
      msgPtr->message.fields.origin = shellController;
      msgPtr->message.fields.priority = HARDWARE_PRIORITY;

      sendMsg ((MSG_T*) msgPtr);
   }
}  /* mailOut */


/****-----------------------------------------------------------------------
*
*   This procedure takes takes the message pointed to by ptr and
*   stores it into the queue belonging to the mailbox in
*   channelNum.
*
*****----------------------------------------------------------------------

void xmitMail(channelNum, ptr)
int channelNum;     /* for now, only one destination is assumed */
ZT_Msg* ptr;
{
ZT_Msg *ztMsg;


    ztMsg = ptr;

    if (checkQueueOvfl() == OKAY)
       {
       ztMsg->message.header.status=IN_TRANSIT;
       clearQueueItem((QUEUE_ITEM_T*) ztMsg);
       appendQueue(&xmitQ, (QUEUE_ITEM_T*) ztMsg);
       }
    else /* TOO MANY MSGS UNTRANSMITTED - FLUSH LAST MESSAGE */
       memoryFree((char*) ptr);
}
#endif
```

```
/***************************************************************************

/****---------------------------------------------------------------------
*
*   This procedure initializes the mailboxes, their command registers,
*   and their length register to the right addresses.  The addresses
*   of the receiver and the transmitter mailboxes is dependent upon
*   whether is for the COM side or the APP side.
*
*****---------------------------------------------------------------------

void mBoxInitialize()
{
  currentXmitState = XMIT_ALL_STATES;
  currentRcvState = RCV_ALL_STATES;
  xmitQueueCnt = 0;

#ifdef APP                        /* if this module is used for the APP side,
   rcvFromAddr = (MAIL_PTR) &mailbox1->data;          /* comMBoxAddr */
   xmitToAddr  = (MAIL_PTR) &mailbox2->data;          /* appMBoxAddr */
   cmdRegRcv   = (CMD_REG_PTR) &mailbox1->command;    /* cmdRegComMBox */
   cmdRegXmit  = (CMD_REG_PTR) &mailbox2->command;    /* cmdRegAppMBox */
   lenRegRcv   = (LEN_REG_PTR) &mailbox1->length;
   lenRegXmit  = (LEN_REG_PTR) &mailbox2->length;
#endif

#ifdef COM                        /* if this module is used for the COM side,
   rcvFromAddr = (MAIL_PTR) &mailbox2->data;          /* appMBoxAddr */
   xmitToAddr  = (MAIL_PTR) &mailbox1->data;          /* comMBoxAddr */
   cmdRegRcv   = (CMD_REG_PTR) &mailbox2->command;    /* cmdRegAppMBox */
   cmdRegXmit  = (CMD_REG_PTR) &mailbox1->command;    /* cmdRegComMBox */
   lenRegRcv   = (LEN_REG_PTR) &mailbox2->length;
   lenRegXmit  = (LEN_REG_PTR) &mailbox1->length;
#endif

}  /* mBoxInitialize */

/***************************************************************************

/****---------------------------------------------------------------------
*
*    The mailbox transmit driver:
*
*    This procedure takes the messages delivered by the applications
*    and sends it to the transmitter mailbox.
*
****----------------------------------------------------------------------

void mBoxXmit()
{
static unsigned int RRPollingCnt=0;
static unsigned int UAPollingCnt=0;

switch (currentXmitState) {
   case XMIT_READY:                    /** XMIT_READY state **/
      mailIn ();
      return;

   case XMIT_ALL_STATES:           /** XMIT_ALL_STATES: initial state **/
      *cmdRegXmit = SABM_mask;             /* Send a SABM.              */
      currentXmitState = XMIT_WAIT_FOR_UA;
      return;

   case XMIT_WAIT_FOR_UA:          /** WAIT_FOR_UA state  **/
      if (is_UA(*cmdRegXmit))  {           /* if an UA is received,
```

```
            UAPollingCnt = 0;
            currentXmitState = XMIT_READY;
         }
         else  {
            if (UAPollingCnt++ >= MAX_POLLING_NUMBER){
               UAPollingCnt=0;
               setWarning(W_UA_WAIT);
      }
         }
         return;


   case XMIT_WAIT_FOR_RR:                 /**  WAIT_FOR_RR state **/
      if (is_RR (*cmdRegXmit))  {          /* if a RR is received,           */
         RRPollingCnt = 0;
         currentXmitState = XMIT_READY;
      }
      else  {
            if (RRPollingCnt++ >= MAX_POLLING_NUMBER)  {
       RRPollingCnt=0;
       setWarning(W_RR_WAIT);
            *cmdRegXmit = SABM_mask;      /* send a SABM and change state.  *
            RRPollingCnt = 0;
            currentXmitState = XMIT_WAIT_FOR_UA;
         }
        else  {                           /* Otherwise, wait for RR until   *
                                          /* time is up.                    *
            }
      }
      return;


    default: break;
}  /* switch */
}  /* mBoxXmit */
/****************************************************************************

/****------------------------------------------------------------------------
*
*    The mailbox receive driver:
*
*    This procedure takes the information stored in the mailbox
*    and transfers sends it out to a destination.
*
*****-----------------------------------------------------------------------

void mBoxRcv()
{
static unsigned int SABMPollingCnt=0;
WORD mBoxLen;

switch (currentRcvState) {

   case RCV_WAIT_FOR_MSG:                       /** WAIT_FOR_MSG STATE **/

      if (is_RR(*cmdRegRcv) || is_RNR(*cmdRegRcv) || is_UA(*cmdRegRcv)) {
      }
      else if (is_IFrame(*cmdRegRcv))  {
         *cmdRegRcv = RNR_mask;                  /* let rcv have exclusive */
                                                 /* use of mbox            */

         mBoxLen = *lenRegRcv;
         if (mBoxLen > MAX_MBOX_SZ)  {
            setWarning (W_ILLEGAL_LEN,mBoxLen);
            mBoxLen = MAX_MBOX_SZ;
         }
```

```
         mailOut (mBoxLen);
         *cmdRegRcv = RR_mask;                      /* Now permit other Xmitters
                                                    /* to have access to mBox
      }
      else if(is_SABM(*cmdRegRcv))                  /* if SABM is received,
         *cmdRegRcv = UA_mask;                      /*  reply with UA

      else   {                                      /* Otherwise,
        setWarning(W_INVALID_CODE, *cmdRegRcv); /* issue warning and,
        currentRcvState = RCV_WAIT_FOR_SABM;   /* change state to wait for
                                                    /* for SABM
      }
      break;

   case RCV_WAIT_FOR_SABM:                   /** WAIT_FOR_SABM_STATE  **/
      if (is_SABM(*cmdRegRcv))   {                  /* if a SABM is sent,
         *cmdRegRcv = UA_mask;                      /* reply with a UA
         SABMPollingCnt = 0;                        /* Reset the Number of times
                                                    /* command register is pollec
                                                    /* for UAs
         currentRcvState = RCV_WAIT_FOR_MSG;
      }
      else  {                                       /* if no SABM is received,
         if (SABMPollingCnt++ > MAX_POLLING_NUMBER)   {
           /* Raise system error */
           setWarning(W_RCV_TIMED_OUT);

         }
      }
      return;

   case RCV_ALL_STATES:                    /**  ALL_STATES: initial "state" */
      currentRcvState = RCV_WAIT_FOR_SABM;      /* change state */
      return;

    default: setError(E_INVALID_STATE,currentRcvState);
}  /* switch */
}  /* mBoxRcv */
/*

$Workfile:   mbxpriv.h  $
$Revision:   1.0  $
$Date:   31 Aug 1990 18:06:56  $

$Log:   E:/USR/DAML/APPC/MBX/VCS/MBXPRIV.H_V  $
 *
 *    Rev 1.0   31 Aug 1990 18:06:56   bChen
 * Initial revision.

*/


/****----------------------------------------------------------------
 *
 *   File: SUImask.H
 *
 *   The frame definitions used in the mailbox driver model is defined
 *   in this module.
 ****----------------------------------------------------------------
#ifndef SUIMASKH
#  define SUIMASKH

#  define PF_mask      0x10
#  define RR_mask      0x01
#  define RNR_mask     0x05
#  define REH_mask     0x09
```

```
# define SABM_mask   0x2F
# define UA_mask     0x63

# define IFrame_mask 0x5A

# define is_SFrame(x)      ( ((x) % 4) == 1)
# define is_IFrame(x)      ( ((x) % 2 ) == 0)
# define is_UFrame(x)      ( ((x) % 4) == 3)
# define is_validFrame(x,y)     (( (x) & ~PF_mask) == (y) )

# define is_UA(x)          (is_validFrame((x), UA_mask))
# define is_SABM(x)        ( is_UFrame(x) && is_validFrame((x), SABM_mask))
# define is_RR(x)          ( ((x)&0x0F) == 1)
# define is_RNR(x)         ( ((x)&0x0F) == 5)

#endif

/*

$Workfile:   out.h  $
$Revision:   1.0  $
$Date:   31 Aug 1990 17:52:28   $

$Log:   E:/USR/DAML/APPC/OUT/VCS/OUT.H_V  $
 *
 *    Rev 1.0   31 Aug 1990 17:52:28   bChen
 * Initial revision.

*/

/****-----------------------------------------------------------------------
 *
 *   File out.h
 *
 *   Header file to the output handler module.
 *
 *   Modification History:
 *       7/19/90: Completed testing outhandl.c on IBM PC.
 *       7/25/90: Added the definitions for the Analog output handler
 *                modules.
 *              . Moved the data structure declarations to the outhandl.c.
 *       8/5/90 : Reorganized to out.h and outpriv.h and move to out DIR.
 *                (BCH)
 ****----------------------------------------------------------------------*/

/**********************/
/*  Definition of the */
/*  Table entry.      */
/**********************/

/****-----------------------------------------------------------------
 *
 *   Digital output handler definitions
 *
 ****--------------------------------------------------------------*/

/*****************/
/* VI test board */
/*****************/


#define  VI_20HZ_TIP_SIGNAL        1      /* K7  */
#define  VI_20HZ_RING_SIGNAL       2      /* K6  */
#define  VI_TEST_BUS_TIP           3      /* K5  */
#define  VI_LC_INPUT_TEST          4      /* K2  */
```

```
#define  VI_LC_OUTPUT_TEST          5       /* K3   */
#define  VI_TIP_RING_DSL_TEST       6       /* K1   */
#define  VI_TEST_BUS_RING           7       /* K4   */

/****************/
/* PGTC module */
/****************/

#define  PGTC_48_PWR                8        /* D0 */
#define  PGTC_LOAD                  9        /* D1 */
#define  PGTC_DSL                  10        /* D2 */
#define  PGTC_LC_IN                11        /* D3 */
#define  PGTC_SLEAVE_1             12        /* D4 */
#define  PGTC_SLEAVE_2             13        /* D5 */
#define  PGTC_SLEAVE_3             14        /* D6 */
#define  PGTC_SLEAVE_4             15        /* D7 */

#define  PGTC_MUX_SELECT           16        /* D4 */
#define  PGTC_TMAS_STAT            17        /* D5 */
#define  PGTC_SZB                  18        /* D6 */
#define  PGTC_SZE                  19        /* D7 */


/*****************/
/* ALARM STATUS */
/*****************/

#define  E2A_SAC_SYSTEM_UNDER_PGTC         20     /* K8 */
#define  E2A_SAC_MAJOR_W_ACO               21     /* K7 */
#define  E2A_SAC_MINOR_W_ACO               22     /* K6 */
#define  COAS_MINOR_W_ACO                  23     /* K5 */
#define  ALRM_STAT_E2A_SAC_STATUS_8        24     /* K4 */
#define  E2A_SAC_MAJOR_WO_ACO              25     /* K3 */
#define  E2A_SAC_MINOR_WO_ACO              26     /* K2 */
#define  E2A_SAC_SYSTEM_RUNNING            27     /* K1 */

#define  COAS_MAJOR_WO_ACO                 28     /* K12 */
#define  ALRM_STAT_E2A_SAC_STATUS_7        29     /* K11 */
#define  COAS_MAJOR_W_ACO                  30     /* K10 */
#define  COAS_MINOR_WO_ACO                 31     /* K9  */


/********************/
/* VOICE FREQUENCY */
/********************/

#define  VF_OSC_SELECT              32      /* K3 */
#define  VF_LCEM_CONNECT            33      /* K2 */
#define  VF_COTLC_CONNECT           34      /* K1 */

#define MAX_D_SIGNAL                  34


/****-------------------------------------------------------------
 *
 *   Analog output handler definitions
 *
 ****-------------------------------------------------------------*/

/************************
 * Logical A Port names *
 ************************/

#define RING_VOLTAGE_D2A            1
#define TIP_VOLTAGE_D2A             2
#define MAX_A_SIGNAL                2    /* MAX # OF ANALOG SIGNALS */
```

```
/************************
 *                  External Declarations
 ************************/


/* End of Header File */


/*

$Workfile:   outhandl.c  $
$Revision:   1.0  $
$Date:   31 Aug 1990 17:52:22  $

$Log:   E:/USR/DAML/APPC/OUT/VCS/OUTHANDL.C_V  $
 *
 *    Rev 1.0   31 Aug 1990 17:52:22   bChen
 * Initial revision.

*/


static char *vscId="$Header:   E:/USR/DAML/APPC/OUT/VCS/OUTHANDL.C_V   1.0

/*****---------------------------------------------------------------
 *
 *    File: outhandl.c
 *
 *    Compilation: cl [switches] /Ox [switches] outhandl.c
 *
 *    Modification History:
 *       07/17/1990:  Completed Tests on IBM PC
 *       07/19/1990:  Altered the signal table to reflect changes
 *                    in the documemtation.
 *       07/25/1990:  Added analog output handler module to the
 *                    program.   (SM)
 *
 *                    Changed the initial port values of the digital
 *                    output ports.  All the bits in the digital output
 *                    ports representing the relays used by this program
 *                    are set to 1.  All other bits in the digital output
 *                    ports are set to 0.
 *       08/06/1990:  Reorganized header files to out.h and outpriv.h
 *                    (BCH)
 *                    Changed MAX_A_PORT to MAX_A_SIGNAL in aOuput(). BCH
 *       08/14/1990:  Altered the PGTC Port A's initial value.  (SM)
 *                    Altered the VF Port A's initial value.  (SM)
 *                    Added two constants:
 *                       INIT_PGTC_CNTRL_WORD_VAL and
 *                       INIT_ALRM_STAT_CNTRL_WORD_VAL.  (SM)
 *       08/22/1990:  Changed VI_TEST_BUS_RING to bit position 7.
 *                    Changed VI_TEST_BUS_TIP to bit position 3. (GL)
 *
 *****---------------------------------------------------------------*/


#include "damllit.h"
#include "out.h"
#include "outpriv.h"

#ifndef DEBUGOUTHANDL
#  include <conio.h>
#else
#  define systemError(x)    printf ("%d\n", x)
#  define outp(x,y)         printf ("Port Address: %04X;    Value: %04X\n",x
#endif
```

```
#define INIT_VI_PORTA_VAL              0x00  /* prev value: 0xfe */
#define INIT_PGTC_PORTA_VAL            0x00  /* prev value: 0xff */
#define INIT_PGTC_PORTC_VAL            0x00  /* prev value: 0xf0 */
#define INIT_ALRM_STAT_PORTA_VAL       0x00  /* prev value: 0xff */
#define INIT_ALRM_STAT_PORTC_VAL       0x00  /* prev value: 0xf0 */
#define INIT_VF_PORTA.VAL              0x00  /* prev value: 0x07 */
#define INIT_PGTC_CNTRL_WORD_VAL       0x83  /* Added 08/14/90 */
#define INIT_ALRM_STAT_CNTRL_WORD_VAL  0x83  /* Added 08/14/90 */

/****-------------------------------------------------------------
 *
 *   Data Structure declarations
 *
 ****--------------------------------------------------------------*/

typedef struct {
  BYTE signalName;
  WORD io_address;
  BYTE position;
  BYTE portName;
} PhysToLogicalSignalEntry;

typedef struct {
  BYTE portName;
  BYTE portValue;
  WORD physAddr;
} PhysToLogicalPortEntry;


/****-------------------------------------------------------------
 *
 *   Digital output handler section
 *
 ****--------------------------------------------------------------*/

PhysToLogicalPortEntry   DPortTable[MAX_D_PORT] = {
  VI_PORTA,         INIT_VI_PORTA_VAL        , ADDR_VI_PORTA,
  PGTC_PORTA,       INIT_PGTC_PORTA_VAL      , ADDR_PGTC_PORTA,
  PGTC_PORTC,       INIT_PGTC_PORTC_VAL      , ADDR_PGTC_PORTC,
  ALRM_STAT_PORTA, INIT_ALRM_STAT_PORTA_VAL, ADDR_ALRM_STAT_PORTA,
  ALRM_STAT_PORTC, INIT_ALRM_STAT_PORTC_VAL, ADDR_ALRM_STAT_PORTC,
  VF_PORTA        , INIT_VF_PORTA_VAL        , ADDR_VF_PORTA,
  PGTC_CNTRL_WORD, INIT_PGTC_CNTRL_WORD_VAL, ADDR_PGTC_CNTRL_WORD,
  ALRM_STAT_CNTRL_WORD, INIT_ALRM_STAT_CNTRL_WORD_VAL, ADDR_ALRM_STAT_CNTRL
};


PhysToLogicalSignalEntry DSignalTable[MAX_D_SIGNAL] =
{
 VI_20HZ_TIP_SIGNAL  , ADDR_VI_PORTA, 1, VI_PORTA,    /* K7 */
 VI_20HZ_RING_SIGNAL , ADDR_VI_PORTA, 2, VI_PORTA,    /* K6 */
 VI_TEST_BUS_TIP     , ADDR_VI_PORTA, 3, VI_PORTA,    /* K5 */
 VI_LC_INPUT_TEST    , ADDR_VI_PORTA, 4, VI_PORTA,    /* K2 */
 VI_LC_OUTPUT_TEST   , ADDR_VI_PORTA, 5, VI_PORTA,    /* K3 */
 VI_TIP_RING_DSL_TEST, ADDR_VI_PORTA, 6, VI_PORTA,    /* K1 */
 VI_TEST_BUS_RING    , ADDR_VI_PORTA, 7, VI_PORTA,    /* K4 */

 PGTC_48_PWR         , ADDR_PGTC_PORTA, 0, PGTC_PORTA,    /* D0 */
 PGTC_LOAD           , ADDR_PGTC_PORTA, 1, PGTC_PORTA,    /* D1 */
 PGTC_DSL            , ADDR_PGTC_PORTA, 2, PGTC_PORTA,    /* R2 */
 PGTC_LC_IN          , ADDR_PGTC_PORTA, 3, PGTC_PORTA,    /* D3 */
 PGTC_SLEAVE_1       , ADDR_PGTC_PORTA, 4, PGTC_PORTA,    /* D4 */
 PGTC_SLEAVE_2       , ADDR_PGTC_PORTA, 5, PGTC_PORTA,    /* D5 */
 PGTC_SLEAVE_3       , ADDR_PGTC_PORTA, 6, PGTC_PORTA,    /* D6 */
 PGTC_SLEAVE_4       , ADDR_PGTC_PORTA, 7, PGTC_PORTA,    /* D7 */

 PGTC_MUX_SELECT     , ADDR_PGTC_PORTC, 4, PGTC_PORTC,    /* D4 */
```

```
PGTC_TMAS_STAT       , ADDR_PGTC_PORTC, 5, PGTC_PORTC,   /* D5 */
PGTC_SZB             , ADDR_PGTC_PORTC, 6, PGTC_PORTC,   /* D6 */
PGTC_SZE             , ADDR_PGTC_PORTC, 7, PGTC_PORTC,   /* D7 */

E2A_SAC_SYSTEM_UNDER_PGTC , ADDR_ALRM_STAT_PORTA, 2, ALRM_STAT_PORTA, /*K
E2A_SAC_MAJOR_W_ACO       , ADDR_ALRM_STAT_PORTA, 4, ALRM_STAT_PORTA, /*K
E2A_SAC_MINOR_W_ACO       , ADDR_ALRM_STAT_PORTA, 6, ALRM_STAT_PORTA, /*K
ALRM_STAT_E2A_SAC_STATUS_7, ADDR_ALRM_STAT_PORTA, 1, ALRM_STAT_PORTA, /*K
ALRM_STAT_E2A_SAC_STATUS_8, ADDR_ALRM_STAT_PORTA, 0, ALRM_STAT_PORTA, /*K
E2A_SAC_MAJOR_WO_ACO      , ADDR_ALRM_STAT_PORTA, 3, ALRM_STAT_PORTA, /*K
E2A_SAC_MINOR_WO_ACO      , ADDR_ALRM_STAT_PORTA, 5, ALRM_STAT_PORTA, /*K
E2A_SAC_SYSTEM_RUNNING    , ADDR_ALRM_STAT_PORTA, 7, ALRM_STAT_PORTA, /*K

COAS_MINOR_W_ACO          , ADDR_ALRM_STAT_PORTC, 5, ALRM_STAT_PORTC, /*K
COAS_MAJOR_WO_ACO         , ADDR_ALRM_STAT_PORTC, 6, ALRM_STAT_PORTC, /*K
COAS_MAJOR_W_ACO          , ADDR_ALRM_STAT_PORTC, 4, ALRM_STAT_PORTC, /*K
COAS_MINOR_WO_ACO         , ADDR_ALRM_STAT_PORTC, 7, ALRM_STAT_PORTC, /*K

VF_OSC_SELECT    , ADDR_VF_PORTA, 0, VF_PORTA,          /* K3 */
VF_LCEM_CONNECT  , ADDR_VF_PORTA, 1, VF_PORTA,          /* K2 */
VF_COTLC_CONNECT , ADDR_VF_PORTA, 2, VF_PORTA           /* K1 */
};


void outputHandlerInit()
/*****------------------------------------------------------------
 *    Initializes the control words of those ports which
 *    requires initialization.
 *****------------------------------------------------------------*/
{
  outp (ADDR_PGTC_CNTRL_WORD, INIT_PGTC_  TRL_WORD_VAL);
  outp (ADDR_ALRM_STAT_CNTRL_WORD, INIT_ALRM_STAT_CNTRL_WORD_VAL);
  outp (ADDR_VI_PORTA, INIT_VI_PORTA_VAL);
  outp (ADDR_PGTC_PORTA, INIT_PGTC_PORTA_VAL);
  outp (ADDR_PGTC_PORTC, INIT_PGTC_PORTC_VAL);
  outp (ADDR_ALRM_STAT_PORTA, INIT_ALRM_STAT_PORTA_VAL);
  outp (ADDR_ALRM_STAT_PORTC, INIT_ALRM_STAT_PORTC_VAL);
  outp (ADDR_VF_PORTA, INIT_VF_PORTA_VAL);
}
void dOutput(signalName, value)
/*****------------------------------------------------------------
 *    Sends value to portName.
 *
 *    The procedure first checks the signal table to see whether signalName
 *    is valid.  If signalName is valid, it then checks the port table to s
 *    whether the physical port address stored in the two tables agree. It
 *    also checks to see whether the there is a portName stored in the port
 *    table.  If both conditions are satisfied, then the value is written
 *    to the port.
 *
 *****------------------------------------------------------------*/
 BYTE signalName;
 BYTE value;
{
 int flag;
 WORD physIoAddress;
 WORD logicalIoAddress;
 BYTE bitPosition;
 BYTE image;
 int i,j;

  if (signalName > MAX_D_SIGNAL || signalName < 1)
    setError(E_ILLEGAL_D_OUTPUT_NAME,signalName);
  else
  {
    flag = NOT_FOUND;
    for (i=0; i<MAX_D_SIGNAL && flag == NOT_FOUND; i++)
```

```
    {
      if (DSignalTable[i].signalName == signalName)
      {
        physIoAddress = DSignalTable[i].io_address;
        bitPosition = DSignalTable[i].position;
        logicalIoAddress = DSignalTable[i].portName;
        image = DPortTable[logicalIoAddress].portValue;
        flag = FOUND;
      }  /* if */
    }  /* for i */

    if (flag == FOUND)
    {
      if (value == 0)  {
        image &= ~(1 << bitPosition);
      }  /* if value */
      else   {
        image |= (1 << bitPosition);
      }  /* else */
      DPortTable[logicalIoAddress].portValue = image;
      outp (physIoAddress, image);
    }  /* if flag */
  }  /* else */
}  /* dOutput */
/****------------------------------------------------------------------
 *
 *    Analog output handler section
 *
 ****------------------------------------------------------------------*/

#define A_SLOPE_X_512     435      /* 43520 = (255/300)*512  */
#define A_Y_INTERCEPT     0
#define MIN_INPUT_VOLTAGE (-150)
#define MAX_INPUT_VOLTAGE (150)


PhysToLogicalPortEntry    APortTable[MAX_A_PORT] =
{
  RING_VOLTAGE_D2A,  0,  RING_VOLTAGE_D2A_PORT_ADDR,
  TIP_VOLTAGE_D2A ,  0,  TIP_VOLTAGE_D2A_PORT_ADDR
};


void aOutput(name, AValue)
/****------------------------------------------------------------------
 *
 *   This function converts the voltage AValue into its digital
 *   equivalent.  The the digital signal is sent to the D2A
 *   converter at logical port 'name'.
 *
 *   Side effects: Because no round off of values is implemented,
 *                 there will be a +/- 0.3% error in the output
 *                 voltage generated by this procedure.
 ****------------------------------------------------------------------*/
BYTE name;
int AValue;
{
  char DValue;
  long rawDValue;
  WORD portAddr;
  int i;
  int flag = NOT_FOUND;

  if (AValue < MIN_INPUT_VOLTAGE) AValue = MIN_INPUT_VOLTAGE;
  if (AValue > MAX_INPUT_VOLTAGE) AValue = MAX_INPUT_VOLTAGE;
                                  /* Allow only values between -150
                                  /* and +150 volts.
```

```
/* IGNORE ROUND_OFF ERRORS */

    rawDValue = ((long)AValue*A_SLOPE_X_512) >> 9;

  DValue = (char) (rawDValue & 0xFF);

  for (i=0; i<MAX_A_SIGNAL; i++)  {
     if (APortTable[i].portName == name)  {
        portAddr = APortTable[i].physAddr;
        flag = FOUND;
        break;
     }  /* if */
  }  /* for */

  if (flag == NOT_FOUND)
    setError(E_ILLEGAL_A_OUTPUT_NAME,name);

  outp(portAddr, DValue);

} /* aOutput */

/* End of module */

/*

$Workfile:   outpriv.h  $
$Revision:   1.0  $
$Date:   31 Aug 1990 17:52:28  $

$Log:   E:/USR/DAML/APPC/OUT/VCS/OUTPRIV.H_V  $
 *
 *    Rev 1.0   31 Aug 1990 17:52:28   bChen
 * Initial revision.

*/


/****-----------------------------------------------------------------
 *   File outpriv.h
 ****-----------------------------------------------------------------*/

/**********************/
/*  Definition of the */
/*  Table entry.      */
/**********************/


/*****************************/
/* Port Addresses (Physical) */
/*****************************/

#define        ADDR_VI_PORTA                  0x0800
#define        ADDR_PGTC_PORTA                0x0B00
#define        ADDR_PGTC_PORTC                0x0B02
#define        ADDR_ALRM_STAT_PORTA           0x0C00
#define        ADDR_ALRM_STAT_PORTC           0x0C02
#define        ADDR_VF_PORTA                  0x0D00
#define        ADDR_PGTC_CNTRL_WORD           0x0B03
#define        ADDR_ALRM_STAT_CNTRL_WORD      0x0C03


/****************************/
/* Port Addresses (Logical) */
/****************************/

#define        VI_PORTA                 1
```

```
#define        PGTC_PORTA             2
#define        PGTC_PORTC             3
#define        ALRM_STAT_PORTA        4
#define        ALRM_STAT_PORTC        5
#define        VF_PORTA               6
#define        PGTC_CNTRL_WORD        7
#define        ALRM_STAT_CNTRL_WORD   8

#define        MAX_D_IO_PORT             6
#define        MAX_D_PORT                8

/************************
 * Physical A Addresses *
 ************************/

#define RING_VOLTAGE_D2A_PORT_ADDR  0x406
#define TIP_VOLTAGE_D2A_PORT_ADDR   0x407

#define MAX_A_PORT                  2

/* End of Header File */


/*

$Workfile:   outtst.c  $
$Revision:   1.0  $
$Date:   31 Aug 1990 17:52:20  $

$Log:   E:/USR/DAML/APPC/OUT/VCS/OUTTST.C_V  $
 *
 *    Rev 1.0   31 Aug 1990 17:52:20   bChen
 * Initial revision.

*/


static char *vscId="$Header:   E:/USR/DAML/APPC/OUT/VCS/OUTTST.C_V   1.0

#include "DAMLlit.h"
#include "out.h"

main()
{
/* TEST PROGRAM TO CHECK ALL ALARM OUTPUTS */
int i;
unsigned char j;

   outputHandlerInit();

   for (i=1;i< MAX_D_SIGNAL;i++)
      {
      dOutput(i,OFF);
      }


/****************/
/* ALARM STATUS */
/****************/

   while (0==0){
   /* dOutput(j,ON); */
   dOutput(j,OFF);
   for(i=0;i<20;i++) i=i;
 }

}
```

```
%[
/*

$Workfile:   pnhand.sm  $
$Revision:   1.2  $
$Date:   15 Sep 1990 11:57:40  $

$Log:   E:/USR/DAML/APPC/PNH/VCS/PNHAND.SMV  $

      Rev 1.2   15 Sep 1990 11:57:40   bChen
   Deleted unused doPanel...() function.

      Rev 1.1   15 Sep 1990 11:30:56   sMa
   Added ACO switch support, LED support, test processing, and status repor

      Rev 1.0   31 Aug 1990 18:14:38   bChen
   Initial revision.

*/
/****-----------------------------------------------------------------------*
 *                    RAYCHEM Corp. / Telecommunications                   *
 *                                                                         *
 *        File: PNHand.sm / PNHand.c                                       *
 *     Created: August 17, 1990                                            *
 * Tools used: Microsoft C compiler v. 5.00                                *
 *             Turbo Debugger version 2.0                                  *
 *                                                                         *
 * Description:                                                            *
 *                                                                         *
 * Compilation procedure:                                                  *
 *   PNHand.SM is the control source for PNHand.C                          *
 *   The SMC (State Machine Compiler) takes .SM and creates .C             *
 *   example:  smc < PNHand.SM > PNHand.C                                  *
 *                                                                         *
 * Modification History:                                                   *
 *   8/17/90  BCH: First Version                                           *
 *                                                                           *
 ****-----------------------------------------------------------------------*/
#  include <string.h>
#       include "rts.h"
#  include "DAMLlit.h"
#  include "DAMLcnf.h"
#       include "DAMLmsg.h"
#       include "pnl.h"
#  include "pol.h"

extern QUEUE_T *SaveQueue;


]%

stateMachines = { panelHandler };

smDataTypeDef %[
                  unsigned someData;
                  unsigned moreData;
]%                                          SMX_DATA_T;

states = { TOP_LEVEL_STATE
          ,STATUS_GET_SHELF_STATE
          ,STATUS_GET_SLOT_STATE
          ,STATUS_GET_CHANNEL_STATE
          ,DISPLAY_STATE
          ,SPECIAL_FUNCTION_STATE
          ,TEST_GET_SHELF_STATE
          ,TEST_GET_SLOT_STATE
          ,TEST_GET_CHANNEL_STATE
          ,TEST_WAIT_STATE };
```

```
messages = {     SM_INITIALIZE,
            test_selected,
            escape_selected,
            enter_selected,
            status_selected,
            function_selected,
            alarm_cutoff_selected,
            panel_digit,
                 test_delay_m,
                 fp_alarm_minor_m,
            fp_alarm_major_m,
            test_system_busy_m,
            line_busy_m,
            line_test_done_m,
            arm_fp_aco_switch_m    } ;

transProcs = {   powerOn,
           functionA,
           functionB,
           functionC,
           functionD,
           functionE,
           functionF,
           functionG,
           functionH,
           functionI,
                functiónJ,
           functionK,
           functionL,
           functionM,
           functionN,
           functionO,
           functionP,
           functionQ,
           functionR,
           functionS,
           functionT,
                ignoreMsg };

transitions = {
          TOP_LEVEL_STATE {     SM_INITIALIZE, powerOn,
                   test_selected          , functionA,
                   escape_selected        , functionB,
                   enter_selected         , ignoreMsg,
                   status_selected        , functionC,
                   function_selected      , functionL,
                   alarm_cutoff_selected, functionM,
                   panel_digit            , ignoreMsg,
                   test_delay_m           , ignoreMsg,
                   fp_alarm_major_m       , functionO,
                   fp_alarm_minor_m       , functionP,
                   test_system_busy_m     , ignoreMsg,
                   line_busy_m            , ignoreMsg,
                   line_test_done_m       , ignoreMsg,
                   arm_fp_aco_switch_m    , functionT
                   }
          STATUS_GET_SHELF_STATE {    SM_INITIALIZE, powerOn,
                   test_selected          , ignoreMsg,
                   escape_selected        , functionB,
                   enter_selected         , functionD,
                   status_selected        , ignoreMsg,
                   function_selected      , ignoreMsg,
                   alarm_cutoff_selected, functionM,
                   panel_digit            , functionN,
                   test_delay_m           , ignoreMsg,
                   fp_alarm_major_m       , functionO,
                   fp_alarm_minor_m       , functionP,
```

```
        test_system_busy_m   , ignoreMsg,
        line_busy_m          , ignoreMsg,
        line_test_done_m     , ignoreMsg,
        arm_fp_aco_switch_m  , functionT
            }
    STATUS_GET_SLOT_STATE {   SM_INITIALIZE, powerOn,
        test_selected        , ignoreMsg,
        escape_selected      , functionB,
        enter_selected       , functionE,
        status_selected      , ignoreMsg,
        function_selected    , ignoreMsg,
        alarm_cutoff_selected, functionM,
        panel_digit          , functionN,
                test_delay_m          , ignoreMsg,
        fp_alarm_major_m     , functionO,
        fp_alarm_minor_m     , functionP,
        test_system_busy_m   , ignoreMsg,
        line_busy_m          , ignoreMsg,
        line_test_done_m     , ignoreMsg,
        arm_fp_aco_switch_m  , functionT
        }
STATUS_GET_CHANNEL_STATE {   SM_INITIALIZE, powerOn,
        test_selected        , ignoreMsg,
        escape_selected      , functionB,
        enter_selected       , functionF,
        status_selected      , ignoreMsg,
        function_selected    , ignoreMsg,
        alarm_cutoff_selected, functionM,
        panel_digit          , functionN ,
        test_delay_m         , ignoreMsg,
        fp_alarm_major_m     , functionO,
        fp_alarm_minor_m     , functionP,
        test_system_busy_m   , ignoreMsg,
        line_busy_m          , ignoreMsg,
        line_test_done_m     , ignoreMsg,
        arm_fp_aco_switch_m  , functionT
        }
    DISPLAY_STATE   {    SM_INITIALIZE, powerOn,
        test_selected        , functionA,
        escape_selected      , functionB,
        enter_selected       , ignoreMsg,
        status_selected      , functionC,
        function_selected    , functionL,
        alarm_cutoff_selected, functionM,
        panel_digit          , ignoreMsg,
             test_delay_m          , ignoreMsg,
        fp_alarm_major_m     , functionO,
        fp_alarm_minor_m     , functionP,
        test_system_busy_m   , ignoreMsg,
        line_busy_m          , ignoreMsg,
        line_test_done_m     , ignoreMsg,
        arm_fp_aco_switch_m  , functionT
             }

    SPECIAL_FUNCTION_STATE {      SM_INITIALIZE, powerOn,
        test_selected        , ignoreMsg,
        escape_selected      , functionB,
        enter_selected       , ignoreMsg,
        status_selected      , ignoreMsg,
        function_selected    , functionL,
        alarm_cutoff_selected, functionM,
        panel_digit          , ignoreMsg,
        test_delay_m         , ignoreMsg,
        fp_alarm_major_m     , functionO,
        fp_alarm_minor_m     , functionP,
        test_system_busy_m   , ignoreMsg,
        line_busy_m          , ignoreMsg,
```

```
        line_test_done_m      , ignoreMsg,
        arm_fp_aco_switch_m   , functionT
        }
TEST_GET_SHELF_STATE {      SM_INITIALIZE, powerOn,
        test_selected         , ignoreMsg,
        escape_selected       , functionB,
        enter_selected        , functionG,
        status_selected       , ignoreMsg,
        function_selected     , ignoreMsg,
        alarm_cutoff_selected, functionM,
        panel_digit           , functionN,
        test_delay_m          , ignoreMsg,
        fp_alarm_major_m      , functionO,
        fp_alarm_minor_m      , functionP,
        test_system_busy_m    , ignoreMsg,
        line_busy_m           , ignoreMsg,
        line_test_done_m      , ignoreMsg,
        arm_fp_aco_switch_m   , functionT
        }
TEST_GET_SLOT_STATE {      SM_INITIALIZE, powerOn,
        test_selected         , ignoreMsg,
        escape_selected       , functionB,
        enter_selected        , functionH,
        status_selected       , ignoreMsg,
        function_selected     , ignoreMsg,
        alarm_cutoff_selected, functionM,
        panel_digit           , functionN,
            test_delay_m          , ignoreMsg,
        fp_alarm_major_m      , functionO,
        fp_alarm_minor_m      , functionP,
        test_system_busy_m    , ignoreMsg,
        line_busy_m           , ignoreMsg,
        line_test_done_m      , ignoreMsg,
        arm_fp_aco_switch_m   , functionT
        }
TEST_GET_CHANNEL_STATE {      SM_INITIALIZE, powerOn,
        test_selected         , ignoreMsg,
        escape_selected       , functionB,
        enter_selected        , functionI,
        status_selected       , ignoreMsg,
        function_selected     , ignoreMsg,
        alarm_cutoff_selected, functionM,
        panel_digit           , functionN,
            test_delay_m          , ignoreMsg,
        fp_alarm_major_m      , functionO,
        fp_alarm_minor_m      , functionP,
        test_system_busy_m    , ignoreMsg,
        line_busy_m           , ignoreMsg,
        line_test_done_m      , ignoreMsg,
        arm_fp_aco_switch_m   , functionT
            }
TEST_WAIT_STATE {      SM_INITIALIZE, powerOn,
        test_selected         , ignoreMsg,
        escape_selected       , functionK,
        enter_selected        , ignoreMsg,
        status_selected       , ignoreMsg,
        function_selected     , ignoreMsg,
        alarm_cutoff_selected, functionM,
        panel_digit           , ignoreMsg,
            test_delay_m          , functionJ,
        fp_alarm_major_m      , functionO,
        fp_alarm_minor_m      , functionP,
        test_system_busy_m    , functionQ,
        line_busy_m           , functionR,
        line_test_done_m      , functionS,
        arm_fp_aco_switch_m   , functionT
        }
    } ;
```

```
%{

#define MAX_STRING_LEN          128
#define PNH_INPUT_FIELD_LENGTH   2 /* Max. number of digits allowed for inp
/*
    The next three constants should be deleted upon completion of testing
*/
#define MAX_NUMBER_OF_LC_CHAN   2

/************************/
/*   Constant Strings   */
/************************/

char *FPlogo      =
    "   Raychem Miniplex System (c) 1990\n          Master Control Panel";

char *functionAStr = "Test Request Selected\nEnter Shelf No. ";

char *functionCStr = "Status Request Selected\nEnter Shelf No. ";
char *functionDStr = "\nEnter Slot No. ";
char *functionEStr = "\nEnter Channel No. ";

char *functionGStr = "\nEnter Slot No. ";
char *functionHStr = "\nEnter Channel No. ";
char *functionIStr = "Test Request Processing ...";

char *functionKStr = "Function Aborted - Press ESC to continue ... ";


char stringOnDisplay[MAX_STRING_LEN];


static unsigned digitsEntered;
static unsigned inputValue;
static unsigned channelNum;
static unsigned shelfNum;
static unsigned slotNum;
static SM_STATE_T  inputState;
static char acoActivationFlag = OFF;


TIMER_T_MSG *testTimerMsg;

/****-----------------------------------------------------------------
 *
 *   Local Functions
 *
 ****-----------------------------------------------------------------*/

/****************************************************************/
/*                   issueFieldLengthErrMsg                    */
/****************************************************************/
static void issueFieldLengthErrMsg(stateID)
 SM_STATE_T stateID;
{
   strcpy(stringOnDisplay, "Error - More than 3 digits entered\n");
   switch(stateID)  {
      case STATUS_GET_SHELF_STATE:
      case TEST_GET_SHELF_STATE:
    strcat(stringOnDisplay,"Enter Shelf Num. ");
         break;

      case STATUS_GET_SLOT_STATE:
      case TEST_GET_SLOT_STATE:
    strcat(stringOnDisplay,"Enter Slot Num. ");
         break;
```

```
        case STATUS_GET_CHANNEL_STATE:
        case TEST_GET_CHANNEL_STATE:
    strcat(stringOnDisplay,"Enter Channel Num. ");
          break;

        default:
    strcat(stringOnDisplay, "Executed case default");
          break;
   }  /* switch */
   panelClear();
   panelDisplay(stringOnDisplay);
}  /* issueFieldLengthErrMsg */

static void sendFP_ACO_msg()
{
  BASIC_MSG_T* acoMsg;

   switch(acoActivationFlag)  {
      case  ON:
   acoMsg = (BASIC_MSG_T*) msgAlloc(sizeof(BASIC_MSG_T) - sizeof(MSG_T));

   acoMsg->msgHdr.fields.name = fp_aco_switched_m;
   acoMsg->msgHdr.fields.dest = alarmSupervisor;
   acoMsg->msgHdr.fields.origin = panelHandler;
   acoMsg->msgHdr.fields.priority = NORMAL_PRIORITY;

   sendMsg( (MSG_T*) acoMsg);

   break;

      case OFF: break;
      default:  break;

   }  /* switch */

}  /* sendFP_ACO_msg */

static void sendTestRequestMsg(scAddr, lcAddr, channel)
 char scAddr, lcAddr, channel;
{
  START_TEST_MSG_T *testRequestMsg;

  testRequestMsg = (START_TEST_MSG_T*) msgAlloc(sizeof(START_TEST_MSG_T) -
                    sizeof(MSG_T));

   testRequestMsg->msgHdr.fields.name = fp_test_request_m;
   testRequestMsg->msgHdr.fields.dest = testSystemSupervisor;
   testRequestMsg->msgHdr.fields.origin = panelHandler;
   testRequestMsg->msgHdr.fields.priority = HARDWARE_PRIORITY;

   testRequestMsg->scAddr  = scAddr;
   testRequestMsg->lcAddr  = lcAddr;
   testRequestMsg->channel = channel;

   sendMsg( (MSG_T*) testRequestMsg);
}   /* sendTestRequestMsg */

static void getTestResultStr(item, str)
 char  item;
 char* str;
{
  static char* notTestedStr = "NT";
  static char* passedStr    = "Pass";
  static char* failedStr    = "Fail ";
  static char* inTestStr    = "IT";
  static char* testTimeoutStr = "TO";
```

```
 switch (item)  {
    case TEST_TIMEOUT: strcpy(str, testTimeoutStr); break;
    case IN_TEST     : strcpy(str, inTestStr); break;
    case NOT_TESTED  : strcpy(str, notTestedStr); break;
    case PASSED      : strcpy(str, passedStr); break;
    case FAILED      : strcpy(str, failedStr); break;
    default          : break;
  }  /* switch */

}  /* getTestResultStr */

/*****************************************************************/
/*                  Transition procedures                        */
/*****************************************************************/


static SM_STATE_T powerOn  (msg, self)
MSG_T *msg;
SM_DESCRIPTOR_T *self;
{
   SM_STATE_T nextState;

   panelOpen();
   panelDisplay(FPlogo);

   acoActivationFlag = OFF;

   return(TOP_LEVEL_STATE);
};  /* powerOn */

/*****************************************************************/
/*                  functionA                                    */
/*****************************************************************/

static SM_STATE_T functionA (msg, self)  /* test_selected */
MSG_T *msg;
SM_DESCRIPTOR_T *self;
{
   strcpy(stringOnDisplay, functionAStr);
   panelClear();
   panelDisplay(stringOnDisplay);

   shelfNum = 0;
   inputValue = 0;
   digitsEntered = 0;

   inputState = TEST_GET_SHELF_STATE;
   return(TEST_GET_SHELF_STATE);
};  /* functionA */

/*****************************************************************/
/*                  functionB                                    */
/*****************************************************************/

static SM_STATE_T functionB(msg, self) /* escape selected */
MSG_T *msg;
SM_DESCRIPTOR_T *self;
{
PANEL_FUNC_T_MSG *pnlMsg;

   pnlMsg = (PANEL_FUNC_T_MSG *)msg;

        strcpy(stringOnDisplay, FPlogo);
   panelDisplay(FPlogo);

   return(TOP_LEVEL_STATE);
};  /* functionB */
```

```
/*********************************************************************/
/*                    functionC                                       */
/*********************************************************************/

static SM_STATE_T functionC(msg, self) /* status request selected */
MSG_T *msg;
SM_DESCRIPTOR_T *self;
{
PANEL_FUNC_T_MSG *pnlMsg;

   pnlMsg = (PANEL_FUNC_T_MSG *)msg;
   strcpy(stringOnDisplay, functionCStr);
   panelClear();
   panelDisplay(stringOnDisplay);
   shelfNum = 0;
   inputValue = 0;
   digitsEntered = 0;

   inputState = STATUS_GET_SHELF_STATE;
   return(STATUS_GET_SHELF_STATE);
};  /* functionC */

/*********************************************************************/
/*                        functionD                                   */
/*********************************************************************/

static SM_STATE_T functionD(msg, self)  /* enter_selected */
MSG_T *msg;
SM_DESCRIPTOR_T *self;
{                                     /* user already entered */
                                      /* the shelf number.    */
   PANEL_FUNC_T_MSG *pnlMsg;

   pnlMsg = (PANEL_FUNC_T_MSG *)msg;

   shelfNum = inputValue;

   if (shelfNum<=0 || shelfNum>MAX_NUMBER_OF_SC)  /* value out of range? */
   {                                             /* reenter, if true.  */
      strcpy(stringOnDisplay, "Illegal Shelf Number\nEnter Shelf Num. ");
      panelClear();
      shelfNum = 0;
      inputValue = 0;
      digitsEntered = 0;
      panelDisplay(stringOnDisplay);

      inputState = STATUS_GET_SHELF_STATE;
      return(STATUS_GET_SHELF_STATE);
   }  /* if */
   else  {                                       /* if in range, go on to
      strcpy(stringOnDisplay, functionDStr);     /* get the next number */
      panelDisplay(stringOnDisplay);
      slotNum = 0;
      inputValue = 0;
      digitsEntered = 0;

      inputState = STATUS_GET_SLOT_STATE;
      return(STATUS_GET_SLOT_STATE);
   }
};  /* functionD */

/*********************************************************************/
/*                        functionE                                   */
/*********************************************************************/

static SM_STATE_T functionE(msg, self)  /* enter_selected */
```

```
MSG_T *msg;
SM_DESCRIPTOR_T *self;
{                                       /* User has just completed entering
PANEL_FUNC_T_MSG *pnlMsg;               /* the slot number */

   slotNum = inputValue;

   if (slotNum<=0 || slotNum>MAX_NUMBER_OF_LC)  /* is slotNum in range? */
   {                                            /* If not, reenter.     */
      strcpy(stringOnDisplay, "Illegal Slot Number\nEnter Slot Num. ");
      panelClear();
      slotNum = 0;
      inputValue = 0;
      digitsEntered = 0;
      panelDisplay(stringOnDisplay);

      inputState = STATUS_GET_SLOT_STATE;
      return(STATUS_GET_SLOT_STATE);
   }  /* if */
   else   {                                /* if in range, go on to get */
                                           /* the next channel number   */
      strcpy(stringOnDisplay, functionEStr);
      panelDisplay(stringOnDisplay);
      channelNum = 0;
      inputValue = 0;
      digitsEntered = 0;
      inputState = STATUS_GET_CHANNEL_STATE;
      return(STATUS_GET_CHANNEL_STATE);
  } /* else */
};  /* functionE */

/*****************************************************************/
/*                          functionF                             */
/*****************************************************************/

static SM_STATE_T functionF(msg, self)  /* enter_selected   */
MSG_T *msg;
SM_DESCRIPTOR_T *self;
{
PANEL_FUNC_T_MSG *pnlMsg;
static char *format =
   "Status Shelf= %d  Slot= %d Chan= %d\nCh A=%s Ch B=%s AUX1=%s AUX2=%s\nD
static char* upStr="UP";
static char* downStr = "DN";
static char* onStr = "ON ";
static char* offStr = "OFF";
static char* yesStr = "YES";
static char* noStr = "NO";

char  *lineAStat, *lineBStat;
char  *auxAStat, *auxBStat;
char  *dslStat, *tamperStat, *scToCommStat;

LC_STATUS_T lcStatus;
extern void getLCstatus();


   channelNum = inputValue;

   if (channelNum<=0 || channelNum>MAX_NUMBER_OF_LC_CHAN)
                   /* is channelNum in range? If not, reenter.     */
   {
      strcpy(stringOnDisplay, "Illegal Channel Number\nEnter Channel Num. "
      panelClear();
      channelNum = 0;
      inputValue = 0;
      digitsEntered = 0;
```

```
      panelDisplay(stringOnDisplay);
      inputState = STATUS_GET_CHANNEL_STATE;
      return(STATUS_GET_CHANNEL_STATE);
   }  /* if */
   else  {  /* if within range, get status */
    /* Get the status of the SC */
      getLCstatus(shelfNum, slotNum, &lcStatus);

      if(lcStatus.statusValidity == NOT_OKAY)
          {
    sprintf(stringOnDisplay, "Status data not available");
          }  /* else if */
      else if (lcStatus.LCpresent == NO)
    sprintf(stringOnDisplay, "LC is not present");
      else {
    lineAStat    = (lcStatus.lineAstat==ON)?onStr:offStr;
    lineBStat    = (lcStatus.lineBstat==ON)?onStr:offStr;
    auxAStat     = (lcStatus.auxAstat==ON)?onStr:offStr;
    auxBStat     = (lcStatus.auxBstat==ON)?onStr:offStr;
    dslStat      = (lcStatus.DSLstat==UP)?upStr:downStr;
    scToCommStat = (lcStatus.SC_LC_CommStat==UP)?upStr:downStr;
    tamperStat   = (lcStatus.tamperStat==ON)?onStr:offStr;

    sprintf(stringOnDisplay, format, shelfNum, slotNum, channelNum,
       lineAStat, lineBStat, auxAStat, auxBStat, dslStat, scToCommStat,
          tamperStat);

      }  /* else */
      panelClear();
      panelDisplay(stringOnDisplay);
   }  /* else */

   return(DISPLAY_STATE);
};  /* functionF */


/******************************************************************/
/*                  functionG                                     */
/******************************************************************/

static SM_STATE_T functionG(msg, self)  /* enter_selected */
MSG_T *msg;
SM_DESCRIPTOR_T *self;
{                                    /* user just finished entering shelf *
                                     /* number */

   shelfNum = inputValue;

   if (shelfNum<=0 || shelfNum>MAX_NUMBER_OF_SC)  /* value out of range? */
   {                                              /* reenter, if true.  */
      strcpy(stringOnDisplay, "Illegal Shelf Number\nEnter Shelf Num. ");
      panelClear();
      shelfNum = 0;
      inputValue = 0;
      digitsEntered = 0;
      panelDisplay(stringOnDisplay);

      inputState = TEST_GET_SHELF_STATE;
      return(TEST_GET_SHELF_STATE );
   }  /* if */
   else  {                                        /* if in range, go on to
      strcpy(stringOnDisplay, functionDStr);      /* get the next number */
      panelDisplay(stringOnDisplay);
      slotNum = 0;
      inputValue = 0;
      digitsEntered = 0;
```

```
      inputState = TEST_GET_SLOT_STATE;
      return(TEST_GET_SLOT_STATE );
   }  /* else */

};  /* functionG */

/*****************************************************************/
/*                       functionH                               */
/*****************************************************************/

static SM_STATE_T functionH(msg, self)  /* test_selected */
MSG_T *msg;
SM_DESCRIPTOR_T *self;
{

   slotNum = inputValue;

   if (slotNum<=0 || slotNum>MAX_NUMBER_OF_LC)  /* is slotNum in range? */
   {                                            /* If not, reenter.     */
      strcpy(stringOnDisplay, "Illegal Slot Number\nEnter Slot Num. ");
      panelClear();
      slotNum = 0;
      inputValue = 0;
      digitsEntered = 0;
      panelDisplay(stringOnDisplay);

      inputState = TEST_GET_SLOT_STATE;
      return( TEST_GET_SLOT_STATE );
   }  /* if */
   else   {                                  /* if in range, go on to get */
                                             /* the next channel number   */
      strcpy(stringOnDisplay, functionEStr);
      panelDisplay(stringOnDisplay);
      channelNum = 0;
      inputValue = 0;
      digitsEntered = 0;
      inputState = TEST_GET_CHANNEL_STATE;
      return( TEST_GET_CHANNEL_STATE);
  } /* else */
};  /* functionH */

/*****************************************************************/
/*                       functionI                               */
/*****************************************************************/

static SM_STATE_T functionI(msg, self)  /* test_selected */
MSG_T *msg;
SM_DESCRIPTOR_T *self;
{

   channelNum = inputValue;

   if (channelNum<=0 || channelNum>MAX_NUMBER_OF_LC_CHAN)
                  /* is channelNum in range? If not, reenter.     */
   {
      strcpy(stringOnDisplay, "Illegal Channel Number\nEnter Channel Num. "
      panelClear();
      channelNum = 0;
      inputValue = 0;
      digitsEntered = 0;
      panelDisplay(stringOnDisplay);
      inputState = TEST_GET_CHANNEL_STATE;
      return( TEST_GET_CHANNEL_STATE );
   }  /* if */
   else  {                              /* if within range, TEST THE SC *
      strcpy(stringOnDisplay, functionIStr);
```

```
      panelDisplay(stringOnDisplay);
      digitsEntered = 0;

      sendTestRequestMsg((char) shelfNum, (char) slotNum, (char) channelNum
      testTimerMsg= startTimer(test_delay_m, 50000L);
      return(TEST_WAIT_STATE);
   }
};  /* functionI */

/*****************************************************************/
/*                      functionJ                                */
/*****************************************************************/

static SM_STATE_T functionJ (msg, self)  /* delay_over_m */
MSG_T *msg;
SM_DESCRIPTOR_T *self;
{

   sprintf(stringOnDisplay, "Test System Not Responding\nPlease retry");
   panelDisplay(stringOnDisplay);
   return(DISPLAY_STATE);
};  /* functionJ */

/*****************************************************************/
/*                        functionK                              */
/*****************************************************************/

static SM_STATE_T functionK(msg, self) /* escape selected */
MSG_T *msg;
SM_DESCRIPTOR_T *self;
{
   PANEL_FUNC_T_MSG *pnlMsg;

   pnlMsg = (PANEL_FUNC_T_MSG *)msg;

   panelDisplay(functionKStr);

   return(TOP_LEVEL_STATE);
};  /* functionK */

/*****************************************************************/
/*                      functionL                                */
/*****************************************************************/

static SM_STATE_T functionL(msg, self)  /* function selected */
MSG_T *msg;
SM_DESCRIPTOR_T *self;
{
PANEL_FUNC_T_MSG *pnlMsg;

   pnlMsg = (PANEL_FUNC_T_MSG *)msg;
   panelDisplay("Special Function No.1\nSpecial Function No. 2\nSpecial Fun

   panelDisplay(stringOnDisplay);
   return(SAME_STATE);
};  /* functionL */

/*****************************************************************/
/*                          functionM                            */
/*****************************************************************/

static SM_STATE_T functionM(msg, self) /* ACO selected */
MSG_T *msg;
SM_DESCRIPTOR_T *self;
{
```

```
PANEL_FUNC_T_MSG *pnlMsg;
char *line;
unsigned i, x;

   pnlMsg = (PANEL_FUNC_T_MSG *)msg;
   sendFP_ACO_msg();

   /* line=panelGetCurrentLine(); */
   /* panelDisplay(stringOnDisplay); */

   return(SAME_STATE);
}  /* functionM */


/**************************************************************/
/*                         functionN                          */
/**************************************************************/

static SM_STATE_T functionN(msg, self)  /* panel_digit_m */
PANEL_DIGIT_T_MSG *msg;
SM_DESCRIPTOR_T *self;
{
static char digitDisplayed[16];
int tmp;
int strLength;

   digitsEntered++;
   if (digitsEntered > PNH_INPUT_FIELD_LENGTH)    {
/*
      panelDisplay("Error More Than 2 Digits - Retry");
      strLength = strlen(stringOnDisplay);
      stringOnDisplay[strLength-PNH_INPUT_FIELD_LENGTH] = '\0';
      panelClear();
      panelDisplay(stringOnDisplay);
*/
      issueFieldLengthErrMsg(inputState);
      inputValue = 0;
      digitsEntered = 0;
   }
   else   {
      digitDisplayed[0] = msg->panelDigit + (unsigned) '0';
                                          /* CONVERT TO ASCII */
      digitDisplayed[1] = '\0';

      inputValue = inputValue*10 + msg->panelDigit;

      strcat(stringOnDisplay, digitDisplayed);
      panelClear();
      panelDisplay(stringOnDisplay);
   }
   return(SAME_STATE);
};  /* functionN */


/**************************************************************/
/*                         functionO                          */
/**************************************************************/
static SM_STATE_T functionO(msg, self)  /* fp_alarm_major_m */
 FP_ALARM_MSG_T *msg;
 SM_DESCRIPTOR_T *self;
{
   switch (msg->command)  {
      case ON :
                setPanelAlarm(MAJOR_ALARM_LED);
                break;
      case OFF: resetPanelAlarm(MAJOR_ALARM_LED);
      default : break;
   }  /* switch */
```

```
   return (SAME_STATE);
} /* functionO */

/********************************************************************/
/*                          functionP                               */
/********************************************************************/

static SM_STATE_T functionP(msg, self)  /* fp_alarm_minor_m */
 FP_ALARM_MSG_T *msg;
 SM_DESCRIPTOR_T *self;
{
   switch (msg->command)  {
      case ON :
                 setPanelAlarm(MINOR_ALARM_LED);
                 break;
      case OFF: resetPanelAlarm(MINOR_ALARM_LED);
      default : break;
   }   /* switch */

   return (SAME_STATE);
}  /* functionP */

/********************************************************************/
/*                          functionQ                               */
/********************************************************************/

static SM_STATE_T functionQ(msg, self)  /* test_system_busy_m */
 BASIC_MSG_T  *msg;
 SM_DESCRIPTOR_T *self;
{
   panelClear();
   sprintf(stringOnDisplay, "Test System Busy");
   panelDisplay(stringOnDisplay);

   return (DISPLAY_STATE);
}  /* functionQ */


/********************************************************************/
/*                          functionR                               */
/********************************************************************/

static SM_STATE_T functionR(msg, self)   /* line_busy_m */
 BASIC_MSG_T  *msg;
 SM_DESCRIPTOR_T *self;
{
   panelClear();
   sprintf(stringOnDisplay, "Invalid Line Stat.  Unable to test\nPlease che
   panelDisplay(stringOnDisplay);
   return (DISPLAY_STATE);
}  /* functionR */

/********************************************************************/
/*                          functionS                               */
/********************************************************************/

static SM_STATE_T functionS(msg, self)   /* line_test_done_m */
 TEST_RESULT_MSG_T *msg;
 SM_DESCRIPTOR_T *self;
{
static char *format =
   "Status Shelf= %d  Slot= %d\nCh A=%s     Ch B=%s     Dsl=%s\nLC Test=%s

char ch1Test[8], ch2Test[8];
char dslTest[8], lcTest[8], rtTest[8];
int scAddr = (int) msg->scAddr;
```

```
int lcAddr = (int) msg->lcAddr;

   getTestResultStr(msg->ch1Test, ch1Test);
   getTestResultStr(msg->ch2Test, ch2Test);
   getTestResultStr(msg->dslTest, dslTest);
   getTestResultStr(msg->lcTest, lcTest);
   getTestResultStr(msg->rtTest, rtTest);

   sprintf(stringOnDisplay, format, scAddr, lcAddr,
           ch1Test, ch2Test, dslTest, lcTest, rtTest);

   panelClear();
   panelDisplay(stringOnDisplay);
   return (DISPLAY_STATE);
}  /* functionS */

/*****************************************************************/
/*                       functionT                               */
/*****************************************************************/

static SM_STATE_T functionT(msg, self)   /* arm_fp_aco_switch_m */
 FP_ALARM_MSG_T  *msg;
 SM_DESCRIPTOR_T *self;
{
   switch(msg->command)  {
      case ON: acoActivationFlag = ON; break;
      default: acoActivationFlag = OFF; break;
   }  /* switch */

   return SAME_STATE;
}
]%

/*

$Workfile:   pnlctl.c  $
$Revision:   1.0  $
$Date:   31 Aug 1990 17:59:34  $

$Log:   E:/USR/DAML/APPC/PNL/VCS/PNLCTL.C_V  $
 *
 *    Rev 1.0   31 Aug 1990 17:59:34   bChen
 * Initial revision.
 *
 *    Rev 1.0   09 Aug 1990 15:42:30   JLastra
 * Initial revision.

 */


static char *vscId="$Header:   E:/USR/DAML/APPC/PNL/VCS/PNLCTL.C_V   1.0


#include "pnlpriv.h"


void pnlMoveTo(line,col)
unsigned line ;
unsigned col;
{

   printf("%c%c",(char)27, (char)((line+1) *64)+col+64);
}

void pnlClrs()
{
   printf("%c",CLEAR_SCREEN);
}
```

```
/*

$Workfile:   pnldisp.c  $
$Revision:   1.0  $
$Date:   09 Aug 1990 15:42:34  $

$Log:   D:/USR/KERN/PNL/VCS/PNLDISP.C_V  $
 *
 *    Rev 1.0   09 Aug 1990 15:42:34   JLastra
 * Initial revision.

*/

static char *vscId="$Header:   D:/USR/KERN/PNL/VCS/PNLDISP.C_V   1.0   09 A

#include "pnlpriv.h"

void panelDisplay(string)
char *string;
{
   checkPanelOwner();


   panelClear();

   appendLines(string);

   panelRefresh();
}


void panelInsert(string)
char *string;
{
   PNL_LINE_T* currentLine;

   currentLine=getLine(pane.line+cursor.line);

   checkPanelOwner();

   if ( currentLine == NULL )
           panelDisplay(string);
   else {
           insertLines(string,currentLine);
           panelRefresh();
   }
}

/*

$Workfile:   pnlglob.c  $
$Revision:   1.0  $
$Date:   31 Aug 1990 17:59:38  $

$Log:   E:/USR/DAML/APPC/PNL/VCS/PNLGLOB.C_V  $
 *
 *    Rev 1.0   31 Aug 1990 17:59:38   bChen
 * Initial revision.
 *
 *    Rev 1.0   09 Aug 1990 15:42:40   JLastra
 * Initial revision.

*/

static char *vscId="$Header:   E:/USR/DAML/APPC/PNL/VCS/PNLGLOB.C_V   1.0
```

```
#define DO_pnl

#include "pnlpriv.h"

QUEUE_T    panelLines;

PANEL_POINT cursor;
PANEL_POINT pane;

SM_NAME_T panelOwner;

pnlglob()
{
 ; /* OTHERWISE LIB WILL NOT INCLUDE THIS OBJECT MODULE */
}

/*

$Workfile:   pnlinit.c  $
$Revision:   1.0  $
$Date:   09 Aug 1990 15:42:42   $

$Log:   D:/USR/KERN/PNL/VCS/PNLINIT.C_V  $
 *
 *    Rev 1.0   09 Aug 1990 15:42:42   JLastra
 * Initial revision.

*/


static char *vscId="$Header:   D:/USR/KERN/PNL/VCS/PNLINIT.C_V   1.0   09 A


#include "pnlpriv.h"

void panelClear()
{
   PNL_LINE_T *line;

   while((line=(PNL_LINE_T *)getFirstQueue(&panelLines)) != NULL ){
           memoryFree(line->d);
           memoryFree((char *)line);
   }

   cursor.line=0;
   cursor.col=0;
   pane.line=0;
   pane.col=0;

   panelRefresh();

}

void panelInit()
{
   panelOwner=~0;

   initQueue(&panelLines);

   panelClear();
}

/*

$Workfile:   pnlled.c  $
$Revision:   1.0  $
$Date:   31 Aug 1990 17:59:44   $
```

```
$Log:   E:/USR/DAML/APPC/PNL/VCS/PNLLED.C_V  $
 *
 *    Rev 1.0   31 Aug 1990 17:59:44   bChen
 * Initial revision.
 *
 *    Rev 1.0   09 Aug 1990 15:42:48   JLastra
 * Initial revision.

*/

static char *vscId="$Header:   E:/USR/DAML/APPC/PNL/VCS/PNLLED.C_V   1.0

#include "pnlpriv.h"

void setPanelAlarm(alarmLevel)
PANEL_ALARM alarmLevel;
{

   switch(alarmLevel){
           case MAJOR_ALARM_LED :
                   putch(MAJOR_ALARM_ON);
                   break;
           case MINOR_ALARM_LED :
                   putch(MINOR_ALARM_ON);
                   break;
           case NORMAL_ALARM_LED :
                   putch(NORMAL_ALARM_ON);
                   break;
           default:
                   break;
   }
}

void resetPanelAlarm(alarmLevel)
PANEL_ALARM alarmLevel;
{

   switch(alarmLevel){
           case MAJOR_ALARM_LED :
                   putch(MAJOR_ALARM_OFF);
                   break;
           case MINOR_ALARM_LED :
                   putch(MINOR_ALARM_OFF);
                   break;
           case NORMAL_ALARM_LED :
                   putch(NORMAL_ALARM_OFF);
                   break;
           default:
                   break;
   }
}

/*

$Workfile:   pnllines.c  $
$Revision:   1.0  $
$Date:   09 Aug 1990 15:42:52   $

$Log:   D:/USR/KERN/PNL/VCS/PNLLINES.C_V  $
 *
 *    Rev 1.0   09 Aug 1990 15:42:52   JLastra
 * Initial revision.

*/
```

```
static char *vscId="$Header:   D:/USR/KERN/PNL/VCS/PNLLINES.C_V   1.0   09

#include "pnlpriv.h"

PNL_LINE_T *getLine(lineNo)
unsigned lineNo;
{

   int i;
   PNL_LINE_T *l;

   for ( i = 0,l=(PNL_LINE_T *)findFirstQueue(&panelLines);
           i!=lineNo && l != NULL ;
           i++, l=(PNL_LINE_T *)findNextQueue(&panelLines,(QUEUE_ITEM_T *)

   return(l);
}

void appendLines(string)
char *string;
{
   unsigned eol,sol;
   PNL_LINE_T *line;

   for(eol=0; string[eol] != '\0' && string[eol] != '\n' ; eol++);

   if ( eol == 0 && string[eol] == '\0')
           return;

   sol =eol+1;

   if ( eol > 38 )
           eol=38;

   line = (PNL_LINE_T *)memoryAlloc(sizeof(PNL_LINE_T));

   line->d=memoryAlloc(eol+1);
   memcpy(line->d,string,eol);
   line->d[eol]='\0';

   clearQueueItem(&line->q);

   appendQueue( &panelLines, &line->q);

   if ( string[sol-1] != '\0' )
           appendLines(&string[sol]);
}


void insertLines(string,currentLine)
char *string;
PNL_LINE_T *currentLine;

{
   unsigned eol,sol;
   PNL_LINE_T *line;

   for(eol=0; string[eol] != '\0' && string[eol] != '\n' ; eol++);

   if ( eol == 0 && string[eol] == '\0')
           return;

   line = (PNL_LINE_T *)memoryAlloc(sizeof(PNL_LINE_T));

   sol =eol+1;
```

```
   if ( eol > 38 )
           eol=38;

   line->d=memoryAlloc(eol+1);
   memcpy(line->d,string,eol);
   line->d[eol]='\0';

   clearQueueItem(&line->q);

   insertAfterQueue(&panelLines, &currentLine->q, &line->q);

   if ( string[sol-1] != '\0' )
           insertLines(&string[sol],line);
}

char *panelGetCurrentLine()
{
   PNL_LINE_T *line;

   checkPanelOwner();

   line=getLine(pane.line+cursor.line);

   if (line != NULL )
           return(line->d);
   else
           return(NULL);
}

/*

$Workfile:   pnlopen.c  $
$Revision:   1.0  $
$Date:   09 Aug 1990 15:42:56  $

$Log:   D:/USR/KERN/PNL/VCS/PNLOPEN.C_V  $
 *
 *    Rev 1.0   09 Aug 1990 15:42:56   JLastra
 * Initial revision.

*/

static char *vscId="$Header:   D:/USR/KERN/PNL/VCS/PNLOPEN.C_V   1.0   09 A

#include "pnlpriv.h"
#include "appser.h"

void checkPanelOwner()
{
   if ( panelOwner != currentSM)
           setError(E_PANEL_ACCESSED_NOT_BY_OWNER, currentSM, panelOwner, _
}

void panelOpen()
{

   if ( panelOwner != -0 )
           setError(E_PANEL_ALREADY_OPEN, currentSM, panelOwner, __FILE__,
   panelOwner = currentSM;
   panelClear();
}

void panelClose()
{
```

```
   checkPanelOwner();
   panelOwner=~0;
   panelClear();

}

/*

$Workfile:   pnlpoll.c  $
$Revision:   1.0  $
$Date:   31 Aug 1990 17:59:40   $

$Log:   E:/USR/DAML/APPC/PNL/VCS/PNLPOLL.C_V  $
 *
 *    Rev 1.0   31 Aug 1990 17:59:40   bChen
 * Initial revision.
 *
 *    Rev 1.0   09 Aug 1990 15:43:00   JLastra
 * Initial revision.

*/


static char *vscId="$Header:   E:/USR/DAML/APPC/PNL/VCS/PNLPOLL.C_V   1.0

#define DO_pnl
#include "pnlpriv.h"
#include "DAMLmsg.h"

static void sendPanelMsg(msgName)
unsigned msgName;
{
   PANEL_FUNC_T_MSG *pnlMsg;

   if ( panelOwner != ~0 ) {

           pnlMsg = (PANEL_FUNC_T_MSG *) msgAlloc ( sizeof(PANEL_FUNC_T_MSG
           pnlMsg->msgData.fields.dest=panelOwner;
           pnlMsg->msgData.fields.origin=SYSTEM_SCHEDULER;
           pnlMsg->msgData.fields.priority=NORMAL_PRIORITY;
           pnlMsg->msgData.fields.name = msgName;


           sendMsg((MSG_T*)pnlMsg);
   }

}


static void sendPanelDigit(digitCh)
unsigned char digitCh;
{
   PANEL_DIGIT_T_MSG *pnlMsg;

   if ( panelOwner != ~0 ) {

           pnlMsg = (PANEL_DIGIT_T_MSG *) msgAlloc ( sizeof(PANEL_DIGIT_T_M
           pnlMsg->msgData.fields.dest=panelOwner;
           pnlMsg->msgData.fields.origin=SYSTEM_SCHEDULER;
           pnlMsg->msgData.fields.priority=NORMAL_PRIORITY;
           pnlMsg->msgData.fields.name = panel_digit;

           pnlMsg->panelDigit=(unsigned)digitCh - (unsigned)'0' ;

           sendMsg((MSG_T*)pnlMsg);
   }
```

```
}

void panelPoll()
{
   int c;
   unsigned char ch,ch2;

   while(  (c=consolePeek()) != 0 ){

           ch=_getch();

           switch( ch ){

                   case  ESC_KEY :
                           sendPanelMsg(escape_selected);
                           break;

                   case  ENTER_KEY :
                           sendPanelMsg(enter_selected);
                           break;

                   case  FUNC_LEAD :
                           ch2=_getch();
                           switch(ch2){
                                   case ARROW_UP_KEY:
                                           panelScrollUp();
                                           break;
                                   case ARROW_DOWN_KEY:
                                           panelScrollDown();
                                           break;
                                   case ARROW_RIGHT_KEY:
                                           panelScrollRight();
                                           break;
                                   case ARROW_LEFT_KEY:
                                           panelScrollLeft();
                                           break;
                                   case TEST_KEY:
                                           sendPanelMsg(test_selected);
                                           break;
                                   case STATUS_KEY:
                                           sendPanelMsg(status_selected);
                                           break;
                                   case FUNCTION_KEY:
                                           sendPanelMsg(function_selected);
                                           break;
                                   case ALRM_CUTOFF_KEY:
                                           sendPanelMsg(alarm_cutoff_select
                                           break;
                                   default:
                                           break;
                           };
                           break;
                   default:
                           /* if nothig else, check to seeif it is a digit
                           if ( ch <= '9' || ch >= '0' )
                                   sendPanelDigit(ch);
                           break;

           }
   }
}
/*

$Workfile:   pnlrefsh.c  $
$Revision:   1.0  $
$Date:   31 Aug 1990 17:59:42   $

$Log:   E:/USR/DAML/APPC/PNL/VCS/PNLREFSH.C_V  $
```

```
 *
 *    Rev 1.0   31 Aug 1990 17:59:42   bChen
 * Initial revision.
 *
 *    Rev 1.0   09 Aug 1990 15:43:08   JLastra
 * Initial revision.

*/

static char *vscId="$Header:   E:/USR/DAML/APPC/PNL/VCS/PNLREFSH.C_V   1.0

#include "pnlpriv.h"

void panelRefresh()
{
   PNL_LINE_T *line;

   pnlClrs();

   if ( (line = getLine(pane.line)) != NULL ){
           pnlMoveTo(0,0);
           printf("%s",line->d);
   }

   if ( (line = getLine(pane.line+1)) != NULL  ){
           pnlMoveTo(1,0);
           printf("%s",line->d);
   }

   pnlMoveTo(0,39);
   if ( pane.line != 0 )
           printf("%c",ARROW_UP);
   else
           printf(" ");

   pnlMoveTo(1,39);
   if ( pane.line+2 < getQueueCount(&panelLines))
           printf("%c",ARROW_DOWN);
   else
           printf(" ");

   pnlMoveTo(cursor.line,cursor.col);

}


/*

$Workfile:   pnlscrl.c  $
$Revision:   1.0  $
$Date:   31 Aug 1990 17:59:44   $

$Log:   E:/USR/DAML/APPC/PNL/VCS/PNLSCRL.C_V  $
 *
 *    Rev 1.0   31 Aug 1990 17:59:44   bChen
 * Initial revision.
 *
 *    Rev 1.1   09 Aug 1990 16:55:16   JLastra
 * Fixed bug in scroll left routine.
 *
 *    Rev 1.0   09 Aug 1990 15:43:12   JLastra
 * Initial revision.

*/
```

```
static char *vscId="$Header:   E:/USR/DAML/APPC/PNL/VCS/PNLSCRL.C_V   1.0

#include "pnlpriv.h"

void panelScrollUp()
{
   PNL_LINE_T *l;

   if ( cursor.line == 1 ){
           cursor.line=0;
           pnlMoveTo(cursor.line,cursor.col);
           return;
   }

   if ( pane.line == 0 )
           return;

   l=getLine(pane.line-1);

   pane.line--;
   panelRefresh();
}


void panelscrollDown()
{
   PNL_LINE_T *l;

   if (cursor.line == 0 ){
           if ( getLine(pane.line+1) != NULL ){
                   cursor.line = 1;
                   pnlMoveTo(cursor.line,cursor.col);
           }
           return;
   }

   l=getLine(pane.line+2);

   if ( l != NULL ) {
           pane.line++;
           panelRefresh();
   }
}

void panelScrollRight()
{
   if ( cursor.col < 38 ) {
           cursor.col++;
           pnlMoveTo(cursor.line,cursor.col);
   }

}

void panelScrollLeft()
{
   if ( cursor.col > 0 ) {
           cursor.col--;
           pnlMoveTo(cursor.line,cursor.col);
   }

}
%[


/*
```

```
$Workfile:   pollhnd.sm  $
$Revision:   1.0  $
$Date:   31 Aug 1990 18:22:40  $

$Log:   E:/USR/DAML/APPC/POL/VCS/POLLHND.SMV  $

      Rev 1.0   31 Aug 1990 18:22:40   bChen
   Initial revision.

*/


static char *vscId="$Header:   E:/USR/DAML/APPC/POL/VCS/POLLHND.SMV   1.0

/*---------------------------------------------------------------------*
 *                    RAYCHEM Corp. / Telecommunications               *
 *                                                                     *
 *       File: PollHnd.sm / PollHnd.c                                  *
 *    Created: July 19, 1990                                           *
 * Tools used: Microsoft C compiler v. 5.00                            *
 *             Turbo Debugger versions 2.0                             *
 *                                                                     *
 * Description:                                                        *
 *     DAML Poll Handler state machine task.  Responsible for issuing  *
 *  status request messages to the Shell Controllers at a programable  *
 *  interval given by pollingTimeValue.                                *
 *     Polls that are not answered are tracked by struct variable,     *
 *  numNoAnswerPoll for each SC and are tagged as LATE_POLL's or       *
 *  INACTIVE.  A poll that is answered arrives as a status report msg  *
 *  this response will reset any LATE_POLL's or INACTIVE status to     *
 *  ACTIVE.                                                            *
 *     Query SC and LC status messages are available to gather various *
 *  SC and LC statuses.  However, at the time of this release, these   *
 *  definitions are not available.                                     *
 *                                                                     *
 * Compilation procedure:                                              *
 *   PollHnd.SM is the control source for PollHnd.C                    *
 *   The SMC (State Machine Compiler) takes .SM and creates .C         *
 *   example:  smc < PollHnd.SM > PollHnd.C                            *
 *                                                                     *
 * Modification History:                                               *
 *   7/19/90  BCH: First Version                                       *
 *   8/14/90  SM : Second version.  Made changes to the SM code to     *
 *                 reflect changes in the design of the Poll Handler   *
 *                 state machine.                                      *
 *                                                                     *
 ---------------------------------------------------------------------*/


#       include "rts.h"
#       include "DAMLlit.h"
#       include "DAMLmsg.h"
#       include "DAMLcnf.h"
#       include "pol.h"

extern QUEUE_T *SaveQueue;

]%

stateMachines = { statusPollHandler};

smDataTypeDef %[
                 unsigned someData;
                 unsigned moreData;
]%                                    SMX_DATA_T;

states = {       IDLE_STATE,
                 POLLING_STATE,
```

```
            REPORT_RECEIVED_STATE,
        INITIALIZATION_STATE,
        RPT_RCVD_INIT_STATE  };

messages = {      SM_INITIALIZE
                 ,go_m
                 ,stop_m
                 ,poll_delay_m
                 ,sc_status_report_m
                 ,set_poll_time_m
                 };

transProcs = {   powerOn,
                 functionB,
                 functionC,
                 functionD,
                 functionE,
                 functionF,
                 functionG,
                 functionH,
            functionI,
                 ignoreMsg };

transitions = {  IDLE_STATE {  SM_INITIALIZE   , powerOn
                           ,go_m               , functionB
                           ,stop_m             , ignoreMsg
                           ,poll_delay_m       , ignoreMsg
                           ,sc_status_report_m, ignoreMsg
                           ,set_poll_time_m   , functionG
                           }
                 POLLING_STATE {  SM_INITIALIZE , powerOn
                           ,go_m               , ignoreMsg
                           ,stop_m             , functionC
                           ,poll_delay_m       , functionD
                           ,sc_status_report_m, functionE
                           ,set_poll_time_m   , functionG
                           }
             REPORT_RECEIVED_STATE  { SM_INITIALIZE, powerOn
                           ,go_m               , ignoreMsg
                           ,stop_m             , functionC
                           ,poll_delay_m       , functionH
                           ,sc_status_report_m, functionE
                           ,set_poll_time_m   , functionG
                           }
             INITIALIZATION_STATE  { SM_INITIALIZE,  powerOn
                           ,go_m               , ignoreMsg
                      ,stop_m             , functionC
                           ,poll_delay_m       , functionF
                           ,sc_status_report_m, functionI
                           ,set_poll_time_m   , functionG
                      }
         RPT_RCVD_INIT_STATE  { SM_INITIALIZE, powerOn
                      ,go_m               , ignoreMsg
                      ,stop_m             , functionC
                      ,poll_delay_m       , functionF
                      ,sc_status_report_m, functionI
                      ,set_poll_time_m   , functionG
                      }
};


%[
/*   #define TEST_DEBUG 1  */     /* <- Un-comment for debugging */

/* Polling state error thresholds */
#define LATE_POLL_THRESHOLD          5
#define INACTIVE_POLL_THRESHOLD /* 50 */  10
```

```
#define MAX_UNANSWERED_POLL      /* 250 */  50
#define DEACTIVATE_THRESHOLD     /* 250 */  50

#define SC_IDLE                    0
#define SC_ACTIVE                  1
#define SC_COMM_ERROR              2

#define GET_NEXT_SC(x)          ( ( (x)%MAX_NUMBER_OF_SC) + 1)

#define LINE_A_STAT_POSITION       0x01
#define LINE_B_STAT_POSITION       0x02
#define AUX_A_STAT_POSITION        0x04
#define AUX_B_STAT_POSITION        0x08
#define TAMPER_STAT_POSITION       0x10
#define DSL_STAT_POSITION          0x20
#define SC_LC_COMM_STAT_POSITION   0x40
#define LC_PRESENT_STAT_POSITION   0x80

/*****************************************************************/
/*                  External Declarations                        */
/*****************************************************************/


/*****************************************************************/
/*                  Local Variables                              */
/*****************************************************************/

/* This is the status database */
struct {BYTE   lcStatus[MAX_NUMBER_OF_LC+1];
        BYTE   scStatus;
        BYTE   scCommStatus;   /* SC_ACTIVE, SC_IDLE, SC_COMM_ERROR */
        BYTE   numNoAnswerPoll;
        } scPollStat [MAX_NUMBER_OF_SC+1];  /*INDEX TO ARRAY STRUCT IS SC A

WORD pollingTimeValue;
WORD nextSCtoPoll;
TIMER_MSG_T *pollTimerMsg;
SM_STATE_T  curState;

/*****************************************************************/
/*                  Local Procedures                             */
/*****************************************************************/
static void initSCstat()
{
WORD i;

   for(i=1; i<=MAX_NUMBER_OF_SC; i++)
      scPollStat[i].scStatus = INACTIVE;

}   /* END init */

/*****************************************************************/
/*                  getPollStatus                                */
/*****************************************************************/
BYTE getPollStatus(SCnumber,LCnumber)
BYTE SCnumber;
BYTE LCnumber;
{
int i;

    switch(curState)
    {
        case POLLING_STATE:
        case REPORT_RECEIVED_STATE:
      {
      if (scPollStat[SCnumber].scCommStatus == SC_ACTIVE)
         return OKAY;
```

```
      else return NOT_OKAY;
      }
       default: return NOT_OKAY;
     } /* END SWITCH */
}   /* END */

/*******************************************************************/
/*                    getLineAstat                                 */
/*******************************************************************/
BYTE getLineAstat(SCnumber,LCnumber)
{
   if ((scPollStat[SCnumber].lcStatus[LCnumber]
   & LINE_A_STAT_POSITION) !=0)
      return ON;
   else return OFF;
}


/*******************************************************************/
/*                    getLineBstat                                 */
/*******************************************************************/
BYTE getLineBstat(SCnumber,LCnumber)
{
   if ((scPollStat[SCnumber].lcStatus[LCnumber]
       & LINE_B_STAT_POSITION) !=0)
      return ON;
   else return OFF;
}

/*******************************************************************/
/*                    getAuxAstat                                  */
/*******************************************************************/
BYTE getAuxAstat(SCnumber,LCnumber)
{
   if ((scPollStat[SCnumber].lcStatus[LCnumber]
      & AUX_A_STAT_POSITION) !=0)
      return ON;
   else return OFF;
}

/*******************************************************************/
/*                    getAuxBstat                                  */
/*******************************************************************/
BYTE getAuxBstat(SCnumber,LCnumber)
{
   if ((scPollStat[SCnumber].lcStatus[LCnumber]
       & AUX_B_STAT_POSITION) != 0)
      return ON;
   else return OFF;
}

/*******************************************************************/
/*                    getTamperStat                                */
/*******************************************************************/
BYTE getTamperStat(SCnumber,LCnumber)
{
   if ((scPollStat[SCnumber].lcStatus[LCnumber]
       & TAMPER_STAT_POSITION) != 0)
      return ON;
   else return OFF;
}

/*******************************************************************/
/*                getDSLstat                                       */
/*******************************************************************/
BYTE getDSLstat(SCnumber,LCnumber)
{
```

```
   if ((scPollStat[SCnumber].lcStatus[LCnumber]
   & DSL_STAT_POSITION) != 0)
      return UP;
   else return DOWN;
}

/**************************************************************/
/*               getSC_LC_COMM_stat                           */
/**************************************************************/
BYTE getSC_LC_COMM_stat(SCnumber,LCnumber)
{
   if ((scPollStat[SCnumber].lcStatus[LCnumber]
       & SC_LC_COMM_STAT_POSITION) != 0)
      return UP;
   else return DOWN;
}

/**************************************************************/
/*                   getLCpresent                               */
/**************************************************************/
BYTE getLCpresent(SCnumber,LCnumber)
{
   if ((scPollStat[SCnumber].lcStatus[LCnumber]
       & LC_PRESENT_STAT_POSITION) != 0)
      return YES;
   else return NO;
}

/**************************************************************/
/*                   requestSCstatus                          */
/**************************************************************/
static void requestSCstatus(SCnumber)
WORD SCnumber;
{
  MC_TO_SC_FORMAT_T *out_msg;

        out_msg = (MC_TO_SC_FORMAT_T *) msgAlloc (sizeof(MC_TO_SC_FORMAT_T)
                                          - sizeof(MSG_T));

        out_msg->msgHdr.fields.name = sc_status_request_m;
        out_msg->msgHdr.fields.dest = shellController;
        out_msg->msgHdr.fields.origin = statusPollHandler;
        out_msg->msgHdr.fields.priority = HARDWARE_PRIORITY;

        out_msg->scAddr = SCnumber;

        out_msg->frameMsgType = SC_STAT_REQ;
        out_msg->len = 0;
        sendMsg ((MSG_T *) out_msg);

}   /* END requestStatus */

/**************************************************************/
/*                   beginPollTimer                           */
/**************************************************************/
static void beginPollTimer()
{
   pollTimerMsg = startTimer(poll_delay_m, pollingTimeValue);

}   /* END beginPollTimer */

/**************************************************************/
/*                   detectLCchange                           */
/**************************************************************/
static WORD detectLCchange(prevLCstat, newLCstat)
```

```
BYTE prevLCstat, newLCstat;
{
   BYTE p567 = prevLCstat & 0xE0;
   BYTE n567 = newLCstat & 0xE0;

   if (p567 < 0x80 && n567 < 0x80)
      return NOT_PRESENT;

   if (p567 == 0xE0)
   {
      if (n567 == 0xE0)
         return GOOD_TO_GOOD;
      else
         return GOOD_TO_BAD;
   }
   else
   {
      if (n567 == 0xE0)
         return BAD_TO_GOOD;
      else
         return BAD_TO_BAD;
   }
} /* detectLCchange */

/****************************************************************/
/*                    lcChangeReport                            */
/****************************************************************/
static void lcChangeReport(scIndex, lcIndex, stat)
 WORD scIndex, lcIndex;
 WORD stat;
{
LC_CHANGE_MSG_T  *out_msg;

   out_msg = (LC_CHANGE_MSG_T *) msgAlloc(sizeof(LC_CHANGE_MSG_T)
                                 - sizeof (MSG_T));
   out_msg->msgHdr.fields.name = lc_status_change_m;
   out_msg->msgHdr.fields.dest = alarmSupervisor;
   out_msg->msgHdr.fields.origin = statusPollHandler;
   out_msg->msgHdr.fields.priority = HARDWARE_PRIORITY;

   out_msg->scAddr = scIndex;
   out_msg->lcAddr = lcIndex;
   out_msg->change = stat;

   sendMsg ((MSG_T*) out_msg);

}  /* lcChangeReport */

/****************************************************************/
/*                    scChangeReport                            */
/****************************************************************/
static void scChangeReport(scIndex, stat)
 WORD scIndex;
 WORD stat;
{
SC_COMM_CHANGE_MSG_T  *out_msg;

   out_msg = (SC_COMM_CHANGE_MSG_T*) msgAlloc(sizeof(SC_COMM_CHANGE_MSG_T)
                                      - sizeof (MSG_T));
   out_msg->msgHdr.fields.name = sc_comm_change_m;
   out_msg->msgHdr.fields.dest = alarmSupervisor;
   out_msg->msgHdr.fields.origin = statusPollHandler;
   out_msg->msgHdr.fields.priority = HARDWARE_PRIORITY;

   out_msg->scAddr = scIndex;
   out_msg->change = stat;
```

```
   sendMsg ((MSG_T*) out_msg);

}  /* scChangeReport */

/*****************************************************************/
/*                    deactivateSC                                */
/*****************************************************************/
static void deactivateSC(scIndex)
 int scIndex;
{
  scPollStat[scIndex].scCommStatus = SC_IDLE;
  scChangeReport(scIndex, BAD_TO_GOOD);
}  /* deactivateSC */


/*****************************************************************/
/*                    Public Procedures                           */
/*****************************************************************/

BYTE getSCstatus(byteArray)
BYTE byteArray[];
{
/*
   Utility procedure for other tasks to access the status database
   to gather information on SC status.
*/
WORD i;

   switch (curState)
   {
      case POLLING_STATE:
      case REPORT_RECEIVED_STATE:
         for (i=1; i<=MAX_NUMBER_OF_SC; i++)
            byteArray[i] = scPollStat[i].scStatus;
         return OKAY;
     default: return NOT_OKAY;
   }
}

/*****************************************************************/
/*                    Transition procedures                       */
/*****************************************************************/

static SM_STATE_T powerOn  (msg, self)
MSG_T *msg;
SM_DESCRIPTOR_T *self;
{

#ifdef TEST_DEBUG
   printf("Poll Handler Executed Power On\n");
#endif

   initSCstat();
   pollingTimeValue = 100;   /* TIME IN MSECS */
   curState = IDLE_STATE;    /** **/
   return(IDLE_STATE);
};  /* powerOn */

/*****************************************************************/
/*                    getLCstatus                                 */
/*****************************************************************/
LC_STATUS_T getLCstatus(SCnumber,LCnumber)
BYTE SCnumber;
BYTE LCnumber;
{
/*
```

```
   Utility procedure for other tasks to access the status database
   to gather information on LC status.
*/
LC_STATUS_T  LCstatus;

   LCstatus.statusValidity = getPollStatus(SCnumber,LCnumber);
   LCstatus.lineAstat = getLineAstat(SCnumber,LCnumber);
   LCstatus.lineBstat  = getLineBstat(SCnumber,LCnumber);
   LCstatus.auxAstat = getAuxAstat(SCnumber,LCnumber);
   LCstatus.auxBstat = getAuxBstat(SCnumber,LCnumber);
   LCstatus.tamperStat = getTamperStat(SCnumber,LCnumber);
   LCstatus.DSLstat = getDSLstat(SCnumber,LCnumber);
   LCstatus.SC_TO_COMM_stat = getSC_LC_COMM_stat(SCnumber,LCnumber);
   LCstatus.LCpresent = getLCpresent(SCnumber,LCnumber);

}  /* getLCstatus */

/*****************************************************************/
/*                    Function B                                 */
/*****************************************************************/

static SM_STATE_T functionB(msg, self)  /* go_m */
MSG_T *msg;
SM_DESCRIPTOR_T *self;
{
int i;

#ifdef TEST_DEBUG
   printf("FunctionB: go message received\n");
   /* showMsg(msg); */
#endif

   for (i=1; i<=MAX_NUMBER_OF_SC; i++)
      scPollStat[i].scCommStatus = SC_IDLE;

   nextSCtoPoll = 1;   /* SC numbers are from 1 to MAX_NUMBER_OF_SC */
   requestSCstatus(nextSCtoPoll);
   beginPollTimer();

   curState = INITIALIZATION_STATE;
   return( INITIALIZATION_STATE );
};  /* functionB */

/*****************************************************************/
/*                    Function C                                 */
/*****************************************************************/

static SM_STATE_T functionC(msg, self) /* stop_m */
MSG_T *msg;
SM_DESCRIPTOR_T *self;
{

#ifdef TEST_DEBUG
   printf("FunctionC: stop message received\n");
   /* showMsg(msg); */
#endif

   cancelTimer(pollTimerMsg);

   curState = IDLE_STATE;
   return (IDLE_STATE );
}  /* functionC */
```

```
/******************************************************************/
/*                    Function D                                  */
/******************************************************************/


static SM_STATE_T functionD(msg, self) /* poll_delay_m */
MSG_T *msg;
SM_DESCRIPTOR_T *self;
{

BYTE noAnswerCnt;

#ifdef TEST_DEBUG
   printf("FunctionD: poll delay message received\n");
#endif

   /* FIRST PROCESS COMM ERROR DETECTION */
   if (scPollStat[nextSCtoPoll].scCommStatus != SC_IDLE)
   {
      noAnswerCnt = scPollStat[nextSCtoPoll].numNoAnswerPoll;
      if ((noAnswerCnt > MAX_UNANSWERED_POLL)
         && (scPollStat[nextSCtoPoll].scCommStatus != SC_COMM_ERROR))
         {
         scPollStat[nextSCtoPoll ].scCommStatus = SC_COMM_ERROR;
         scChangeReport(nextSCtoPoll, GOOD_TO_BAD);
         }
      else
         {
         /* COMM ERROR THRESHOLD HAS NOT BEEN REACHED YET */
         if (scPollStat[nextSCtoPoll].scCommStatus == SC_ACTIVE)
            scPollStat[nextSCtoPoll].numNoAnswerPoll = ++noAnswerCnt;
         }
      }   /* END COMM ERROR DETECTION */

      nextSCtoPoll = GET_NEXT_SC(nextSCtoPoll);
      requestSCstatus (nextSCtoPoll);   /* POLL NEXT SC */
      beginPollTimer();

      curState = POLLING_STATE;
      return(POLLING_STATE );
};  /* functionD */

/******************************************************************/
/*                    Function E                                  */
/******************************************************************/

static SM_STATE_T functionE(msg, self) /* sc_status_report_m */
SC_STAT_T *msg;
SM_DESCRIPTOR_T *self;
{

BYTE scIndex;
int i;
SC_STAT_T *scDataPtr;

#ifdef TEST_DEBUG
   printf("FunctionE: status report message received\n");
#endif

   /* INSERT NEW SC-LC DATA INTO DATABASE */
   scIndex = msg->scAddr;   /* INDEX TO SC STATUS GROUP */

   if (scIndex <= MAX_NUMBER_OF_SC)
      {
      for (i=1; i<=MAX_NUMBER_OF_LC; i++)    /* COPY STATUS DATA */
         {
         switch (detectLCchange(scPollStat[scIndex].lcStatus[i]
```

```
                        ,msg->lcStat[i] ))
            {
            case BAD_TO_GOOD:
#                ifdef TEST_DEBUG
                    printf("PH: functionE: bad to good\n");
#                endif
                 lcChangeReport(scIndex, i, BAD_TO_GOOD);
                 break;
            case GOOD_TO_BAD:
#                ifdef TEST_DEBUG
                    printf("PH: functionE: good to bad\n");
#                endif
                 lcChangeReport(scIndex, i, GOOD_TO_BAD);
                 break;
            default:
#                ifdef TEST_DEBUG
                    printf("No change\n");
#                endif
                 break;
            }  /* switch */

         scPollStat[scIndex].lcStatus[i] = msg->lcStat[i];
         }   /* for */

      if (scPollStat[scIndex].scCommStatus == SC_COMM_ERROR)
         {
         scChangeReport(scIndex, BAD_TO_GOOD);
         }
      /* UPDATE POLLING STATUS INFORMATION FOR THIS SC */
      scPollStat[scIndex].scCommStatus = SC_ACTIVE;
      scPollStat[scIndex].numNoAnswerPoll = 0;
      scPollStat[scIndex].scStatus = msg->scStat;

      curState = REPORT_RECEIVED_STATE;
      return(REPORT_RECEIVED_STATE );
      }   /* END IF */
   else
      {
      curState = self->state;
      return (self->state);
      }
};  /* functionE */

/*****************************************************************/
/*                  Function F                                   */
/*****************************************************************/
static SM_STATE_T functionF(msg, self)  /* poll_delay_m */
BASIC_MSG_T *msg;
SM_DESCRIPTOR_T *self;
{
 int i;
#  ifdef TEST_DEBUG
     printf("FunctionF: poll delay message received\n");
#  endif

   nextSCtoPoll++;

   if (nextSCtoPoll > MAX_NUMBER_OF_SC)  {
      curState = POLLING_STATE;
      requestSCstatus(nextSCtoPoll = 1);
      beginPollTimer();
      return POLLING_STATE;
   }
   else  {
      curState = INITIALIZATION_STATE;
      requestSCstatus(nextSCtoPoll );
      beginPollTimer();
      return INITIALIZATION_STATE;
```

```
   }
}   /* functionF */

/****************************************************************/
/*                      Function G                              */
/****************************************************************/

static SM_STATE_T functionG(msg, self) /* set_poll_time */
BASIC_MSG_T *msg;
SM_DESCRIPTOR_T *self;
{
#ifdef TEST_DEBUG
   printf("FunctionG: set poll time received\n");
   /* showMsg(msg); */
#endif

   pollingTimeValue = msg->info1;
   return( self->state );
};  /* functionG */

/****************************************************************/
/*                      Function H                              */
/****************************************************************/

static SM_STATE_T functionH(msg, self) /* poll_delay_m */
BASIC_MSG_T *msg;
SM_DESCRIPTOR_T *self;
{
/*
   Poll delay message received after pertinent SC response.  Time to
   request the  next SC report.
*/

#ifdef TEST_DEBUG
   printf("FunctionH: Poll delay message received\n");
   /* showMsg(msg); */
#endif

  nextSCtoPoll = GET_NEXT_SC(nextSCtoPoll);
  requestSCstatus(nextSCtoPoll);
  beginPollTimer();
  curState = POLLING_STATE;
  return POLLING_STATE;
};  /* functionH */


/****************************************************************/
/*                      Function I                              */
/****************************************************************/

static SM_STATE_T functionI(msg, self) /* sc_status_report_m */
SC_STAT_T *msg;
SM_DESCRIPTOR_T *self;
{
 WORD i;
 WORD scIndex;

#ifdef TEST_DEBUG
   printf("FunctionI: SC status report message received\n");
   /* showMsg(msg); */
#endif

  scIndex = msg->scAddr;
  scPollStat[scIndex].scStatus = msg->scStat;
  scPollStat[scIndex].scCommStatus = SC_ACTIVE;
```

```
  scPollStat[scIndex].scStatus = ACTIVE;

  for(i=1; i<=MAX_NUMBER_OF_LC; i++)
     scPollStat[scIndex].lcStatus[i] = msg->lcStat[i];
  return (RPT_RCVD_INIT_STATE);
}; /* functionI */
]%

/*

$Workfile:   cictst.c  $
$Revision:   1.0  $
$Date:   31 Aug 1990 18:18:26  $

$Log:   E:/USR/DAML/APPC/RTE/VCS/CICTST.C_V  $
 *
 *    Rev 1.0   31 Aug 1990 18:18:26   bChen
 * Initial revision.

*/


static char *vscId="$Header:   E:/USR/DAML/APPC/RTE/VCS/CICTST.C_V   1.0

#define TEST 1

#include "DAMLlit.h"
#include "RTe.h"
#include "rtepriv.h"   /* NEED TO GET ACCESS TO CIC REGISTERS */

/*
-----------------------------------------------------------------------
                   FILE: CICTST.c  to test lcedvr for CIC operations
-----------------------------------------------------------------------
*/

/* ********************************************************************** */
/* ********************************************************************** */

void linkTheRT_IECQ()
{

BYTE state;
BYTE C_I_code;
BYTE CIRO_Image;

   outp(0xa31,0x47);   /* RESET IECQ */

   state = 1;  /* WAIT FOR DR */
   while (state != 0)
   {
   CIRO_Image = inp(0xa31);   /* ICC C/I READ REGISTER */

   C_I_code = (CIRO_Image & 0x3c) >> 2;

      switch(state)
         {
         case 1:  /* CHECK DR */
            {
            if (C_I_code == 0x00)
               {
            state =2;  /* WAIT FOR AR */
            outp(0xa31,0x7f); /* SEND DI */
               }
         break;
         }
```

```
        case 2:  /* WAIT FOR AR */
           {
           if (C_I_code == 0x08)
              {
              state =3;  /* WAIT FOR AI */
              outp(0xa31,0x73);   /* SEND AI */
              }
           break;
           }
        case 3:  /* GOT AI */
           {
           state = 0;
           break;
           }
        default: break;

        }   /* END SWITCH */
   } /* END WHILE */

}


/* ***********************************************************************
 *                          MAIN PROCEDURE
 ***********************************************************************
*/
void main()
{

extern void interrupt far RT_SICOFI_Interrupts ();

BYTE SicofiCommand;
BYTE result;
static BYTE WriteBuf[10];   /* TO CONTAIN CR1,...,CR3 and COP's COEFF's. */
static BYTE readBuf[10];
BYTE cr1Value;
BYTE cr2Value;
BYTE cr3Value;
int i;
long int j=0;
long int k=0;
int count;
BYTE cicStat;
BYTE currentShort ;
BYTE flag;

    disableInterrupts();

    init_RT_ICC();
    interruptsInit();
    setHandler(0x06,RT_SICOFI_Interrupts);   /* CHANGED TO IRQ6 */
    interruptsStart();

    setRTInterrupts(ALL_ICC_INTERRUPTS_OFF);

    clearPendingRTInterrupts();

    setRTInterrupts(SIN_INTERRUPT_MASK);

  /* RESET & POWER UP SICOFI - CHANNEL A */
  /* ******************************************************************* */
    SicofiCommand = setSOP(SICOFI_CHANNEL_A,
                           SICOFI_WRITE,
                           POWER_UP,
                           RESET_SICOFI,0);

     sendRTSicofiCommand(1 /* ORIGINATOR */
```

```
                              ,SicofiCommand
                              ,WriteBuf);

   for (i=0;i<1000;i++) if (getRTSicofiStat() == OKAY) break;



/* RESET & POWER UP SICOFI - CHANNEL B */
/* ********************************************************************** */
   SicofiCommand = setSOP(SICOFI_CHANNEL_B,
                          SICOFI_WRITE,
                          POWER_UP,RESET_SICOFI,0);

    sendRTSicofiCommand(1 /* ORIGINATOR */
                              ,SicofiCommand
                              ,WriteBuf);

   for (i=0;i<1000;i++) if (getRTSicofiStat() == OKAY) break;

/* ********************************************************************** */
 /* WRITE A CR1 COMMAND - TO CHANNEL A*/
/* ???? REMEMBER TO CONFIGURE SICOFI SBx to OUTPUT */

   SicofiCommand = setSOP(SICOFI_CHANNEL_A,
                          SICOFI_WRITE,
                          POWER_UP,NIL,CR1_Len);

   WriteBuf[0] = setCR1(ENABLE_FILTER,
                        ENABLE_FILTER,
                        DISABLE_FILTER,
                        DISABLE_FILTER,
                        DISABLE_FILTER,
                        DISABLE_FILTER,
                        SBX_INPUT_SEL, NIL);

    sendRTSicofiCommand(1 /* ORIGINATOR */
                              ,SicofiCommand
                              ;WriteBuf);
   for (i=0;i<1000;i++) if (getRTSicofiStat() == OKAY) break;


   /* VERIFY SICOFI CR1 */
   SicofiCommand = setSOP(SICOFI_CHANNEL_A,
                          SICOFI_READ,
                          POWER_UP,NIL,CR1_Len);

   while (requestRTSicofiStatus(1, /* ORIGINATOR */
                              SicofiCommand) == BUSY)
        ;

   for(i=0;i<100;i++) if ( getRTSicofiStatus(1, /* ORIGINATOR */
                              readBuf) == OKAY) break;


   setRTInterrupts(ALL_ICC_INTERRUPTS_OFF);
   clearPendingRTInterrupts();

/* ********************************************************************** */
   RTSicofiSignallingOutput(DSL_RELAY,HIGH);
   /* RTSicofiSignallingOutput(DSL_RELAY,LOW); */

   RTSicofiSignallingOutput(OUTPUT_RELAY,HIGH);
   RTSicofiSignallingOutput(OUTPUT_RELAY,LOW);

   RTSicofiSignallingOutput(_5mA_LOAD,HIGH);
   RTSicofiSignallingOutput(_5mA_LOAD,LOW);
```

```
   RTSicofiSignallingOutput(_45mA_LOAD,HIGH);
   RTSicofiSignallingOutput(_45mA_LOAD,LOW);


/* ******************************************************************* */
/* ******************************************************************* */

   linkTheRT_IECQ();

   /* BEGIN LINKING PROCESS */
   setRTInterrupts(CIC_INTERRUPT_MASK);

}   /* END MAIN */
   this version of rtedvr.c replaces the SIN isr from lcedvr.c
   but needs to be tested. 9/4/90 BCH

/*

$Workfile:   rte.h  $
$Revision:   1.0  $
$Date:   31 Aug 1990 18:18:34   $

$Log:   E:/USR/DAML/APPC/RTE/VCS/RTE.H_V  $
 *
 *    Rev 1.0   31 Aug 1990 18:18:34   bChen
 * Initial revision.

*/


/* File: rte.h */
/*
-----------------------------------------------------------------------
                      RT EMULATOR GENERAL DEFINITIONS
-----------------------------------------------------------------------
*/
#define SICOFI_CHANNEL_A           0
#define SICOFI_CHANNEL_B           1

#define SICOFI_WRITE       0
#define SICOFI_READ     1

#define POWER_UP           1
#define POWER_DOWN         0
#define RESET_SICOFI       1

#define CR1_Len                1
#define CR2_Len            2
#define CR3_Len                3
#define SBX_INPUT_SEL      0
#define SBX_OUTPUT_SEL     1
#define uLAW            1
#define aLAW            0

#define CHANNEL_STRAIGHT        0
#define CHANNEL_SWAP            1

#define ENABLE_FILTER                     1
#define DISABLE_FILTER                    0

#define ENABLE_HIGHPASS         0
#define DISABLE_HIGHPASS        1

/* RT Emulator - Filter Coefficient Name Definitions */
#define B_FILTER_1     1
#define B_FILTER_2     2
```

```
#define Z_FILTER        3
#define B_FILTER_DELAY  4
#define X_FILTER        5
#define R_FILTER        6
#define GX_FILTER       7
#define GR_FILTER       8

/* RT Sicofi Signalling Logical Output Port Names */
#define DSL_RELAY                       1
#define OUTPUT_RELAY            2
#define _5mA_LOAD                       3
#define _45mA_LOAD              4

/* ICC MASKS */
#define ALL_ICC_INTERRUPTS_OFF        0xff
#define SIN_INTERRUPT_MASK            0xfd   /* 1111 1101 */
#define RME_INTERRUPT_MASK            0x7f   /* 0111 1111 */
#define CIC_INTERRUPT_MASK            0xfb   /* 1111 1011 */
#define EXIR_NTERRUPT_MASK            0xfe   /* 1111 1110 */

#define SICOFI_COMMAND_MASK           0x0c   /* xxxx 11xx */
#define SOP_COMMAND_CODE              0x04   /* xxxx 01xx */
#define NOP_COMMAND_CODE              0x0c   /* xxxx 11xx */
/* COP code is everything except SOP and NOP i.e. 10 and 00 */

#define SOP_LSEL_MASK                 0x03   /* xxxx xx11 */
#define COP_CODE_MASK                 0x3f   /* xx11 1111 */
#define MAX_SICOFI_COMMAND_LEN        8


/* ICC REGISTER DEFINITIONS */

/* ICC CONFIGURATION - USED DURING INIT */
#define SPCR_POWER_DOWN           0x80  /* PWR DOWN */
#define SPCR_CONFIG               0x45  /* THEN PWR UP, SAC & SIP CONFIG */
#define MODE_CONFIG               0xc2  /* Transparent Mode 2, */
                                        /* Rcv INACTIVE, IOM Rev 1 */
                                        /* w/ DATA TRANSFER */
#define CMDR_CONFIG               0x41  /* Receiver and Xmitter Reset */
#define RT_STCR_CONFIG            0x70  /* 0x60 for LC, 0x70 for RT */
#define CIX0_CONFIG               0x47
/* END ICC CONFIGURATION */


/* IEC-Q CODES */
#define IECQ_AI         0x0c
#define IECQ_AR         0x08
#define IECQ_ARM        0x09
#define IECQ_DC         0x0f
#define IECQ_DEAC       0x01
#define IECQ_DI         0x0f
#define IECQ_DR         0
#define IECQ_EI1        0x04
#define IECQ_EI3        0x0b
#define IECQ_FJ         0x02
#define IECQ_LSL        0x0d
#define IECQ_PU         0x0c
#define IECQ_RES        0x01
#define IECQ_RES1       0x04
#define IECQ_RSY        0x04
#define IECQ_SSP        0x05
#define IECQ_UAI        0x07

#define MAX_RT_CONNECTION_RETRIES  10

/* END OF RT EMULATOR DEFINITIONS */
```

```
/*

$Workfile:   rtecom.c  $
$Revision:   1.0  $
$Date:   06 Sep 1990 12:13:56  $

$Log:   E:/USR/DAML/APPC/RTE/VCS/RTECOM.C_V  $
 *
 *    Rev 1.0   06 Sep 1990 12:13:56   bChen
 * Initial revision.

*/


static char *vscId="$Header:   E:/USR/DAML/APPC/RTE/VCS/RTECOM.C_V   1.0

#include "DAMLlit.h"
#include "rte.h"
#include "rtepriv.h"

/* CMDR REGISTER BITS */
#define RRES_mask           0x40    /* RCV RESET */
#define RMC_mask            0x80    /* RCV MESSAGE ACK */
#define XTF_mask            0x08    /* XMT TRANSPARENT FRAME */
#define XME_mask            0x02    /* XMT MSG END */
#define XRES_mask           0x01    /* XMITTER RESET */

/* RSTA REGISTER BITS */
#define RDA_mask            0x80
#define RDO_mask            0x40
#define CRC_mask            0x20
#define RAB_mask            0x10

/* MODE REGISTER BITS */
#define RAC_mask            0x08

/* EXIR REGISTER BIT DEFINITIONS */
#define XMR_mask            0x80
#define RFO_mask            0x10
#define SOV_mask            0x08

#define ICC_RCV_BUFFER_SIZE   5
#define ICC_XMT_BUFFER_SIZE   5
#define DATA_RCV_STATE        1
#define RCV_IDLE_STATE        0

static BYTE rcvBuf[ICC_RCV_BUFFER_SIZE];
static BYTE xmtBuf[ICC_XMT_BUFFER_SIZE];

static BYTE CMDR_Reg_Image;
static BYTE RT_EXIR_Reg_Image;

BYTE rcvState;
BYTE EXIR_SOV_errCnt;
BYTE EXIR_XMR_errCnt;
BYTE EXIR_RFO_errCnt;


/* ***********************************************************************
 *        RT_RME_isr()   Interrupt Service Procedure
 ***********************************************************************
*/
RT_RME_isr()
{
int i;
BYTE status;
```

```
   status = inp(RSTA);
   if (status == CRC_mask)
      {
      for(i=0;i<ICC_RCV_BUFFER_SIZE;i++) rcvBuf[i]=inp(RFIFO);
      outp(CMDR, CMDR_Reg_Image | RMC_mask);  /* ACK RCV */
      rcvState = DATA_RCV_STATE;
      }
}

/* **********************************************************************
 *                   rcvRT_ICC()
 ************************************************************************
*/
BYTE rcvRT_ICC(buffer)
BYTE buffer[];
{
int i;

   if (rcvState == DATA_RCV_STATE)
      {
      for(i=0;i<ICC_RCV_BUFFER_SIZE;i++) buffer[i]= rcvBuf[i];
      rcvState = RCV_IDLE_STATE;
      return OKAY;
      }
   else return NOT_OKAY;
}

/* **********************************************************************
 *                   sendRT_ICC()
 ************************************************************************
*/
sendRT_ICC(buffer)
BYTE buffer[];
{
int i;

   for(i=0;i<ICC_XMT_BUFFER_SIZE;i++) outp(XFIFO,buffer[i]);
   outp(CMDR,CMDR_Reg_Image | XTF_mask | XME_mask);
}

/* **********************************************************************
 *                   initRTcomm()
 ************************************************************************
*/

initRTcomm()
{
   CMDR_Reg_Image = CMDR_CONFIG;
   outp(CMDR,CMDR_Reg_Image);
   outp(CMDR,CMDR_Reg_Image | RRES_mask | XRES_mask);
   rcvState = RCV_IDLE_STATE;

   RT_MODE_Reg_Image = MODE_CONFIG | RAC_mask;
   outp(MODE, RT_MODE_Reg_Image);    /* activate HDLC rcv */
}

/* **********************************************************************
 *                   resetRTcomm()
 ************************************************************************
*/
resetRTcomm()
{

   RT_MODE_Reg_Image = MODE_CONFIG ;
   outp(MODE, RT_MODE_Reg_Image);    /* DE-activate HDLC rcv */
}
```

```
/* *******************************************************************
 *         RT_EXIR_isr()   Interrupt Service Procedure
 *******************************************************************
*/
RT_EXIR_isr()
{
   RT_EXIR_Reg_Image = inp(EXIR);

   if (RT_EXIR_Reg_Image & SOV_mask)
      EXIR_SOV_errCnt++;
   else if (RT_EXIR_Reg_Image & XMR_mask)
      EXIR_XMR_errCnt++;
   else if (RT_EXIR_Reg_Image & RFO_mask)
      EXIR_RFO_errCnt++;

}   /* END EXIR_isr */

/*

$Workfile:   rtedvr.c  $
$Revision:   1.3  $
$Date:   06 Sep 1990 14:32:06  $

$Log:   E:/USR/DAML/APPC/RTE/VCS/RTEDVR.C_V  $
 *
 *    Rev 1.3   06 Sep 1990 14:32:06   bChen
 * Changed SicofiSignalOut to RT_SIcofiSignalOut
 *
 *    Rev 1.2   06 Sep 1990 13:31:42   bChen
 * Add declaration for MODE_Reg_Image. Also, deleted EXIR_isr() from here.
 *
 *    Rev 1.1   06 Sep 1990 12:00:12   bChen
 * Copied the new SIN isr from lcedvr.c to improve performance.  Deleted CI
 * isr.
 *
 *    Rev 1.0   31 Aug 1990 18:18:22   bChen
 * Initial revision.

*/


static char *vscId="$Header:   E:/USR/DAML/APPC/RTE/VCS/RTEDVR.C_V   1.3

/* File: rtedvr.c August 16, 1990: BCH */
/* 8/8/90 : Added CIC Handling */
/* 8/9/90 : Changed Sicofi Output FOR SBX TO SO2A */
/* 8/15/90 : Add sendLC_IECQ() */
/* 9/6/90  : Copied new SIN_isr from lcedvr.c, deleted RME, CIC isr's */

#include "DAMLlit.h"
#include "rte.h"              /* ALL MODULES USING RTE UTILS SHOULD USE */
#include "rtepriv.h"


/* ***************************************************************** */
/* SICOFI Interrupt Service Procedure State Definitions */
/* ***************************************************************** */
#define IDLE_STATE              1
#define COMMAND_STATE           2
#define REQUEST_STATUS_STATE    3
#define GET_ARGUMENT_STATE      4
#define GET_STATUS_STATE        5
#define PENDING_STATE           6
#define WAIT_ONE_CYCLE          7

/* IEC-Q STATES */
```

```
#define IECQ_INACTIVE          0
#define IECQ_LINKING           1
#define IECQ_ACTIVE            2
#define DEACTIVATING           3
#define ERROR_INDICATION       4

/* GENERAL ICC MASKS */
#define STCR_SC0_MASK       0x01
#define STCR_SC1_MASK       0x02
#define STCR_ST0_MASK       0x04
#define STCR_ST1_MASK       0x08
#define STCR_DISABLE_MASK     0x0c     /* MASK BOTH ST1 & ST0 SIMULTANEOUSLY

#define CIC0_mask           0x02
#define CODR0_mask          0x3c
#define CODX0_mask               0x3c
#define SIN_mask            0x02
#define CIC_mask            0x04
#define EXIR_mask           0x01
#define RME_mask                 0x80

#define MAX_RT_SICOFI_SIGNAL_OUT_PORTS                     5

#define getCOX0Code(code) (code<<2)
/*
-----------------------------------------------------------------------
                                   VARIABLE DECLARATIONS
-----------------------------------------------------------------------
*/
BYTE bufferVal;
BYTE RT_MODE_Reg_Image;

static BYTE  RT_ISTA_Reg_Image;
static BYTE  RT_MASK_Reg_Image;
static BYTE  RT_STCR_Image;
static BYTE  RT_EXIR_Reg_Image;
static BYTE RT_CIX0_Reg_Image;

static int EXIR_Intrt_cnt=0;

static BYTE Sicofi_State;
static BYTE RT_CIC_State;
static char Sicofi_Write_Count;
static BYTE Sicofi_Read_Args;
static char Sicofi_Read_Count;
static WORD Sicofi_Read_Originator;
static WORD Sicofi_Write_Originator;

static BYTE Sicofi_Read_Buffer[MAX_SICOFI_COMMAND_LEN+2];
static BYTE Sicofi_Write_Buffer[MAX_SICOFI_COMMAND_LEN+2];

/* *********************************************************************
 *                 ICC INITIALIZATION ROUTINES
 *********************************************************************
*/
init_RT_ICC()
{
unsigned char result;

   disableInterrupts();

   setRTInterrupts(ALL_ICC_INTERRUPTS_OFF);

   clearPendingRTInterrupts();

   outp(SPCR,SPCR_POWER_DOWN);    /* PWR DOWN */
```

```
  outp(SPCR,SPCR_CONFIG);      /* THEN PWR UP, SAC & SIP CONFIG */
  outp(MODE,MODE_CONFIG); /* Transparent Mode 2, Rcv INACTIVE, IOM Rev 1
                           /* w/ DATA TRANSFER */
  outp(CMDR,CMDR_CONFIG);  /* Receiver and Xmitter Reset */

  RT_STCR_Image = RT_STCR_CONFIG; /* 0x60 for LC, 0x70 for RT */
  outp(STCR,RT_STCR_Image);

  RT_CIX0_Reg_Image = CIX0_CONFIG;
  outp(CIX0,RT_CIX0_Reg_Image );

  /* NOT USED ON RT EMU BUT USED IN RT */
  outp(XAD1,0);
  outp(TIMR,0xcc);
  outp(XAD2,0x03);
  outp(SAP1,0);
  outp(SAP2,0x04);
  outp(TEI1,0x03);
  outp(TEI2,0xff);
  outp(ADF1,0);
  outp(ADF2,0);

  clearPendingRTInterrupts();

  Sicofi_State = IDLE_STATE;

  enableInterrupts();

}   /* END init_ICC */

/* ***********************************************************************
 *         clearPendingRTInterrupts
 ***********************************************************************
*/
clearPendingRTInterrupts()
{
BYTE result;

   /* CLEAR PENDING INTERRUPTS */
  result = inp(ISTA);
  result = inp(EXIR);
  result = inp(CIR1);
  result = inp(CIR0);
  result = inp(RSTA);
}


/* ***********************************************************************
 *         setRTInterrupts
 ***********************************************************************
*/
setRTInterrupts(int_mask)
BYTE int_mask;
{
/*
   sets the ICC interrupts masks for the RT ICC.
*/

   RT_MASK_Reg_Image = int_mask;

   disableInterrupts();
   outp(MASK,RT_MASK_Reg_Image);
   enableInterrupts();
}
```

```
/* ***********************************************************************
 *          getRTInterrupts
 ***********************************************************************
*/
BYTE getRTInterrupts()
{
/*
   returns the ICC interrupts masks for the RT ICC.
*/
   return(RT_MASK_Reg_Image);
}

/* ***********************************************************************
 *                   INTERRUPT SERVICE ROUTINE
 ***********************************************************************
*/
void interrupt far RT_SICOFI_Interrupts ()
{

   _disable();
  RT_ISTA_Reg_Image = inp(ISTA);

   if (RT_ISTA_Reg_Image & SIN_mask)
      /* SIN Interrupt */
      {
      /*
      This procedure is inserted directly for conserving service time.
      DO NOT REMOVE FROM HERE UNLESS THE ISR PROCESS TIME CAN BE
      GUARANTEED TO REMAIN THE SAME!!!!!

      This Procedure to service the Sicofi Interrupts.  Services
      three (3) process states: COMMAND_STATE, REQUEST_STATUS_STATE,
      GET_ARGUMENT_STATE.

      COMMAND_STATE is for writing command and data to sicofi. Others
      are for reading from Sicofi.
      */

      if (Sicofi_State == COMMAND_STATE)
         {
         outp(STCR, (STCR_STO_MASK | STCR_SCO_MASK)); /* ACK STO INTRPT

         /* write command first - command is at bottom of buffer */
         /* buffer is organized as LIFO ex. CR1, CR2, CR3, SOP, End Of E
         Sicofi_Write_Count--;         /* decrement for next pass */
         outp(MOX1, Sicofi_Write_Buffer[ Sicofi_Write_Count ]);

         while (Sicofi_Write_Count >= 1)
        {
        /* Poll for SIN */
        if (inp(ISTA) & SIN_mask)
           {
           outp(STCR, (STCR_STO_MASK | STCR_SCO_MASK)); /* ACK STO INTRF
           Sicofi_Write_Count--;         /* decrement for next pass */
           outp(MOX1, Sicofi_Write_Buffer[ Sicofi_Write_Count ]);
           }
        }   /* END WHILE */

         if (Sicofi_Write_Count < 1)
            {
            /* there is no more args to write */
            /* done with writing - clean up isr */
        RT_STCR_Image = RT_STCR_CONFIG;  /* Disable SIN Interrupts */
            outp(STCR, RT_STCR_Image);

            Sicofi_State = IDLE_STATE;   /* READY FOR NEXT OPERATION *
            }
```

```
        }   /* END if COMMAND STATE */

    else if (Sicofi_State == REQUEST_STATUS_STATE)
        {
        /* Processing of SICOFI READ's isr */
        outp(STCR,(STCR_ST1_MASK | STCR_SC0_MASK));  /* ACK ST0 Interrupt
                                                     /* and change to ST1 */
        outp(MOX1, Sicofi_Read_Buffer[ 0 ]);    /* send the read command *

        Sicofi_State = WAIT_ONE_CYCLE;

        }   /* END REQUEST STATUS STATE */

    else if (Sicofi_State == WAIT_ONE_CYCLE)
        {
        /* NEEDS 1-1/2 Mid-Frame interrupt before data is available */
        outp(STCR, (STCR_ST1_MASK | STCR_SC1_MASK));   /* ACK ST1 Interrup

        Sicofi_State = GET_ARGUMENT_STATE;
        }   /* END WAIT_ONE_CYCLE STATE */

    else if (Sicofi_State == GET_ARGUMENT_STATE)
        {
        outp(STCR,(STCR_ST1_MASK | STCR_SC1_MASK));  /* ACK ST1 Interrupt

        Sicofi_Read_Buffer [Sicofi_Read_Count] = inp(MOR1);

        Sicofi_Read_Count--;

  while (Sicofi_Read_Count >= 1)
      {
      if (inp(ISTA) & SIN_mask)
        {
        outp(STCR, (STCR_ST1_MASK | STCR_SC1_MASK)); /* ACK ST1 intprt */
             bufferVal = inp(MOR1);  /* Bypass C compiler error */
        Sicofi_Read_Buffer[ Sicofi_Read_Count ] = bufferVal;
        Sicofi_Read_Count--;
        }
      }   /* END WHILE */

        if (Sicofi_Read_Count < 1)
            {
            /* done receiving all needed data - clean up */
      RT_STCR_Image = RT_STCR_CONFIG;  /* Disable SIN Interrupts */
            outp(STCR,RT_STCR_Image);        /* no more interrupts for now

            Sicofi_State = GET_STATUS_STATE; /* done with collection of dat
            }                                   /* wait for application to *
                                          /* get it using Get_Sicofi_Status*/
        }   /* END GET ARGUMENT STATE */
}   /* END SIN interrupts */

else if (RT_ISTA_Reg_Image & RME_mask)
    {
    RT_RME_isr();
      }

  if (RT_ISTA_Reg_Image & EXIR_mask)
      {
      RT_EXIR_isr();
      }

    _enable();
    return;

}   /* END RT_SICOFI_Interrupts */
```

```
/* ************************************************************************
 *          Send_Sicofi_Command Procedure
 **************************************************************************
*/
BYTE sendRTSicofiCommand( Originator, Command, Write_Buffer)
WORD Originator;
BYTE Command;
BYTE Write_Buffer[];
{
/*
   Procedure used for writing to Sicofi.  It places data into the
   sicofi write interrupt procedure and enables the Sicofi SIN
   interrupt.

ON ENTRY:
   Originator    a VAlid Task name invoking the procedure.
                 Upon completion of sicofi transfer a message is send
                 to this origin.
   Command       can be SOP, COP, NOP
   Write_Buffer is an array with data to be transferred
                 organized in ascending order i.e. Write_buffer[0] = CR1

                 Last byte is transferred first.

ON OUTPUT:
   Sicofi_Write_Buffer is a LIFO such that when the Write ISR
                       transmits to SICOFI data is transferred
                       from the bottom of the buffer.  Data is
                       organized in the order that the SICOFI
                       expects it.  Command, Last data first, ...

   Sicofi_Write_Count is total number of bytes to be written to SICOFI
                      including command.


On RETURN:
      OKAY = command will be processed
      BUSY = another task is using this procedure wait and try later

PROCEDURE:
   If Procedure is not IDLE
   return BUSY
   else Move given buffer data to Sicofi write buffer
        data is stored in reversed order LIFO.
        Insert Command in the last buffer space indexed by Arg_Length
        Enable SIN Interrupt for beginning frame.
        return OKAY

    Note:  Application TAsk should call GetRTSicofiStat()
           to check that the command was sent.
*/

int count;
BYTE Arg_Length;
   if (Sicofi_State != IDLE_STATE)
      return BUSY;
   else /* INSERT THE DATA */
      {
      Sicofi_State = PENDING_STATE;
      Arg_Length = getSICOFICommandLength(Command);
      if (Arg_Length > MAX_SICOFI_COMMAND_LEN )
         setError(E_SICOFI_COMMAND_LEN,Arg_Length);

      for (count = 0; count < Arg_Length; count++)
         Sicofi_Write_Buffer[ count ] = Write_Buffer[count];
                               /* Set Argument Counts including */
                               /* buffer content in reverse order */
```

```
    Sicofi_Write_Buffer[Arg_Length] = Command;  /* goes at the end */
    Sicofi_Write_Count = Arg_Length + 1; /* total number of transfer byte

    disableInterrupts();
    Sicofi_Write_Originator = Originator;
    Sicofi_State = COMMAND_STATE;

    clearPendingRTInterrupts();

    RT_STCR_Image &= ~STCR_ST1_MASK;  /* Disable SIN Intpt at Frame Begin
    RT_STCR_Image |= STCR_ST0_MASK;   /* Enable SIN Intpt at Frame Middle
    outp(STCR,RT_STCR_Image);
    enableInterrupts();

    return OKAY;
    }   /* END inserting data */

}   /* END Send_Sicofi_Command */

/* *********************************************************************
 *                          getRTSicofiStat
 ***********************************************************************
*/
BYTE getRTSicofiStat()
{
BYTE image;
/*
   returns the state of the Sicofi ISR driver.
*/

   disableInterrupts();
   image = Sicofi_State;
   enableInterrupts();

   if (image == IDLE_STATE)
      return(OKAY);
   else
      return(BUSY);

}   /* END getSicofiStat */


/* *********************************************************************
 *                          requestRTSicofiStatus
 ***********************************************************************
*/
BYTE requestRTSicofiStatus( Originator, Command)
WORD Originator;
BYTE Command;
{
/*
ON ENTRY:
   Command        can be SOP, COP, NOP
   ARg_Length     is the number of data bytes expected to be read
                  EXCLUDING the command.
                                 (example CR3, CR2, CR1 is 3 bytes)

ON OUTPUT:
   Sicofi_Read_Buffer   contains the command in index location 0.
                        (it is expected that the SICOFI ISR will
                        place data read into the read buffer but
                        leave the command byte in place.)

                        The organization of the Sicof_Read_Buffer
                        is as follows:
```

```
+------------------+
| Sicofi Command   | Buffer [0]
+------------------+
| 1st byte (ex. CR1)| Buffer [1]
+------------------+
| 2nd byte (ex. CR2)| Buffer [2]
+------------------+
...              ...
+------------------+
| 8th byte (ex. DB8)| Buffer [8]
+------------------+
| # of data bytes  | Buffer [9]
+------------------+

   Sicofi_Read_Count is total number of bytes to be read from SICOFI

On RETURN:
      OKAY = command will be processed, use the Get_Sicofi_Status()
             to obtain the data.
      BUSY = another task is using this procedure wait and try later

PROCEDURE:
   If Procedure is not IDLE
   return BUSY
   else Move given command to Sicofi read buffer location index 0
        Set the length of data expected
        Enable SIN Interrupt for beginning frame.
        return OKAY
*/
BYTE Arg_Length;
int count;

   if (Sicofi_State != IDLE_STATE)
      return (BUSY);
   else /* INSERT THE DATA */
      {
      Sicofi_State = PENDING_STATE;
      Sicofi_Read_Originator = Originator;
      Sicofi_Read_Buffer[0] = Command;

      Arg_Length = getSICOFICommandLength(Command);
      if (Arg_Length > MAX_SICOFI_COMMAND_LEN )
         setError(E_SICOFI_COMMAND_LEN,Arg_Length);

      Sicofi_Read_Buffer[9] = Arg_Length; /* pass length to user */
      Sicofi_Read_Count = Arg_Length;     /* expected number of read bytes *
      disableInterrupts();

      Sicofi_State = REQUEST_STATUS_STATE;

      clearPendingRTInterrupts();

      RT_STCR_Image &= ~STCR_ST1_MASK;  /* Disable SIN Intpt at Frame Begin
      RT_STCR_Image |= STCR_ST0_MASK;   /* Enable SIN Intpt at Frame Middle
      outp(STCR,RT_STCR_Image);

      enableInterrupts();
      return (OKAY);
      }   /* END inserting data */

}   /* END Request_Sicofi_Status */

/* ************************************************************************
 *                    getRTSicofiStatus  Procedure
 **************************************************************************
*/
BYTE getRTSicofiStatus( Originator, Read_Buffer)
```

```
WORD Originator;
BYTE Read_Buffer[];
{
/*
ON ENTRY:
   Originator    Is the module name which requested the status
                 using RequestRTSicofiStatus().
   Read_Buffer   a user provided buffer for Sicofi Status to be
                                 copied to.

ON OUTPUT:
   Read_Buffer   will contain the status data as obtained from the
                 the Sicofi_Read_Buffer i.e. Buf[1]=CR3, [2]=CR1...
                 It is assumed that the original requestor should
                 know the length.

On RETURN:
      OKAY = data has been placed in the buffer and is ready for reading.
      BUSY = SICOFI drivers are still busy, keep trying.

PROCEDURE:
   If Procedure is not GET_STATUS_STATE
   return BUSY
   else Move data from Sicofi_Read_Buffer to requestor's Read_Buffer
        Set Sicofi_State to IDLE
        return OKAY
*/

int count;

   if ((Sicofi_State != GET_STATUS_STATE)
        || (Sicofi_Read_Originator != Originator))
      return BUSY;
   else /* MOVE THE DATA */
      {
      Sicofi_State = PENDING_STATE;

      for (count = 0; count <= (Sicofi_Read_Buffer[9]) ; count++)
         Read_Buffer[count] = Sicofi_Read_Buffer[count];

      Sicofi_State = IDLE_STATE;
      return OKAY;
      }   /* END inserting data */

}   /* END Get_Sicofi_Status */

/* ********************************************************************
 *                  CIC UTILITIES ROUTINES
 **********************************************************************
*/

/* ********************************************************************
 *                  sendRT_IECQ
 **********************************************************************
*/
writeRT_IECQ(code)
 BYTE code;
{
/*
   Utility to output the given IECQ code to the ICC.
*/

   RT_CIX0_Reg_Image = (RT_CIX0_Reg_Image & ~CODX0_mask)
                       | getCOX0Code(code);
   outp(CIX0,RT_CIX0_Reg_Image);

}
```

```
/* ***********************************************************************
 *                    readRT_IECQ
 ***********************************************************************
*/
BYTE readRT_IECQ ()
{
   /* ICC C/I READ REGISTER */
   return ((inp(CIR0) & CODR0_mask) >> 2);
}


/* ***********************************************************************
 *                    RTSicofiSignallingOutput ROUTINE
 ***********************************************************************
*/

struct SicofiOutNameToPos {    /* Sicofi OUTPUT NAME TO BIT POSITION */
              BYTE name;             /* CONVERSION TABLE */
              BYTE pos;          /* BIT POSITION */
              } RT_SicofiSignalOut [MAX_RT_SICOFI_SIGNAL_OUT_PORTS] = {
                            _5mA_LOAD                ,0   /* SO1A */
                           ,_45mA_LOAD                       ,1   /* SO2A */
                           ,OUTPUT_RELAY                     ,4   /* SO1B */
                           ,DSL_RELAY                        ,5   /* SO2B */
                      };

RTSicofiSignallingOutput( PortName, value)
BYTE PortName;
BYTE value;
{
   /*
   Activates/Deactivate the given Sicofi signalling port

   This procedure assumes that the Ports are single bits.
   */

static BYTE Sicofi_Signal_Output_Image = 0;

int flag;
int i;

   if (PortName > MAX_RT_SICOFI_SIGNAL_OUT_PORTS )
      setError(E_ILLEGAL_SICOFI_SIGNAL_OUT, PortName);
   else
      {
      flag=NOT_FOUND;
      i=0;
      while ((i<= MAX_RT_SICOFI_SIGNAL_OUT_PORTS ) && (flag == NOT_FOUND))
        {
        if (RT_SicofiSignalOut[i].name == PortName)
           flag = FOUND;
        else i++;
        }   /* END WHILE */

      if (flag == FOUND)
         {
         /* OUTPUT VALUE TO SICOFI */
         if (value == 0)
            {
                   Sicofi_Signal_Output_Image &= ~(0x01<< RT_SicofiSignalOu
            }
         else
            {
                   Sicofi_Signal_Output_Image |= 0x01 << RT_SicofiSignalOut
            }
         /* NOW WRITE THE VALUE TO THE SICOFI */
         outp(CIX1, Sicofi_Signal_Output_Image);
```

```
        } /* END ELSE FOUND */
     } /* END ELSE NO SYSTEM ERROR */

}   /* END SICOFI SIGNALLIN OUTPUT */

/*

$Workfile:   rtepriv.h  $
$Revision:   1.1  $
$Date:   06 Sep 1990 12:11:54  $

$Log:   E:/USR/DAML/APPC/RTE/VCS/RTEPRIV.H_V  $
 *
 *    Rev 1.1   06 Sep 1990 12:11:54   bChen
 * Add extern for MODE_Reg_Image
 *
 *    Rev 1.0   31 Aug 1990 18:18:32   bChen
 * Initial revision.

*/


/*
-----------------------------------------------------------------------
                  LITERAL DEFINITIONS  FOR RT EMULATOR
-----------------------------------------------------------------------
*/

/*   The following is a alphabetically sorted list of all ICC registers
     next to the register name is the address location base+offset.

              ADF1 0x0038
              ADF2 0x0039
              B1CR  0x0037
              B2CR  0x0038
              C1R  0x0035
              C2R  0x0036
              CIR0 0x0031
              CIR1 0x0033
              CIX0 0x0031
              CIX1 0x0033
              CMDR 0x0021
              EXIR 0x0024
              ISTA 0x0020
              MASK 0x0020
              MOCR 0x003A
              MODE 0x0022
              MOR0 0x0032
              MOR1  0x0034
              MOSR 0x003A
              MOX0 0x0032
              MOX1 0x0034
              RBCH 0x002A
              RFBC 0x0025
              RFIFO        0x0000
              RHCR 0x0029
              RSTA 0x0027
              SAP1 0x0026
              SAP2 0x0027
              SAPR 0x0026
              SPCR 0x0030
              STAR 0x0021
              STCR  0x0037
              TEI1 0x0028
              TEI2 0x0029
              TIMR 0x0023
              XAD1 0x0024
```

```
XAD2 0x0025
XFIFO       0x0000

*/
#define ICC_Base_Addr   0x0a00

#define ISTA        0x0a20
                /* interrupt status reg read, at reset = 00h */
#define MASK        0x0a20
                /* interrupt mask reg write, at reset = 00h */
                /*  The ISTA and MASK bits have the following
                    meaning:
                   *---------RME receive message end
                   |*--------RPF receive pool full
                   ||*-------RSC receive status change
                   |||*------XPR transmit pool ready
                   ||||*-----TIM timer interrupt
                   |||||*----CIC C/I code change
                   ||||||*---SIN synchronous transfer
                   |||||||*--EXI extended interrupt
                   ||||||||
                   00000000b
                   */

#define EXIR        0x0a24   /* extended interrupt reg read, at reset = 00h
                /* The EXIR has the following meaning
                   *---------XMR transmit message repeat
                   |*--------XUD transmit data underrun
                   ||*-------PCE protocol error
                   |||*------RFO receive frame oveflow
                   ||||*-----SOV synchronous transfer overflow
                   |||||*----MOS monitor status
                   ||||||*---SAW subscriber awake
                   |||||||*--WOV watchdog timer overflow
                   ||||||||
                   XXXXXXXXb
                   */

#define STAR        0x0a21   /* status reg read, reset = 48h */
                /* the STAR has the following meaning
                   *---------XDOV transmit data overflow
                   |*--------XFW transmit FIFO write enable
                   ||*-------XRNR transmit RNR
                   |||*------RRNR receive RNR
                   ||||*-----MBR message buffer ready
                   |||||*----MAC1 monitor ch 1 active
                   ||||||*---BVS B ch valid on sip
                   |||||||*--MAC0 monitor ch 0 active
                   ||||||||
                   XXXXXXXXb
                   */

#define CMDR        0x0a21   /* command reg write, reset = 00h */
                /*  ;the CMDR has the following meaning
                   *---------RMC receive message complete
                   |*--------RRES recevier reset
                   ||*-------RNR receive not ready
                   |||*------STI start timer
                   ||||*-----XTF transmit transparent frame
                   |||||*----XIF transmit I-frame
                   ||||||*---XME transmit message end
                   |||||||*--XRES transmit reset
                   ||||||||
                   00000000b
                   */
```

```
#define MODE        0x0a22   /* mode reg read/write, reset 00h */
                          /* the MODE has the following meaning
                             ***------MDS HDLC mode select,
                             |||          110=Transparent Mode 2
                             |||*-----TMD timer mode
                             ||||*----RAC receiver active
                             |||||***-DIM digital interface mode
                             ||||||||
                             00000000b
                             */

#define TIMR        0x0a23   /* timer reg read/write, reset undefined */
                          /* the TIMR has the following meaning
                             ***------cnt timer count
                             |||*****-value setting of timer
                             ||||||||
                             00000000b
                             */

#define RFBC        0x0a25   /* receive frame buffer count read. */
                                                 /* at reset is 00h */
                          /* the RFBC has the length of the */
                          /* receive message */

#define RBCH        0x0a2A   /* receive frame count high read, reset 00h */
                          /* the RBCH has the following meaning
                             ***------VN2-0 version number of chip
                             |||*-----OV overflow
                             ||||****-RBCH high part of receive count
                             ||||||||
                             00000000b
                             */

#define RSTA        0x0a27   /* receive status reg read, reset undefined */
                          /* the RSTA has the following meaning
                             *--------RDA receive data
                             |*-------RDO recevie data overflow
                             ||*------CRC crc check
                             |||*-----RAB receive message aborted
                             ||||**---SA1-0 SAPI address id
                             ||||||*--C/R command/response
                             |||||||*-TA TEI address id
                             ||||||||
                             00000000b
                             */

/* HDLC address variables */

#define XAD1        0x0a24   /* transmit address 1 reg write */
#define XAD2        0x0a25   /* transmit address 2 reg write */
#define SAP1        0x0a26   /* sapi reg write */
                          /*  used in auto mode has the following meaning
                              ******---SAPI1 first service access
                              ||||||      point identifier
                              ||||||*--CRI command/response ind
                              |||||||*-0
                              ||||||||
                              00000000b
                              */

#define SAP2        0x0a27          /* sapi reg write */
                          /*  used in auto mode has the following meaning
                              ******---SAPI2 second service access
                              ||||||      point identifier
                              ||||||*--MCS modulo count selsct
                              |||||||*-0
                              ||||||||
                              00000000b
                              */
```

```
#define TEI1        0x0a28    /* tei reg write */
                            /*  ;used in auto mode has the following meaning
                              ********--TEI1
                              |||||||*-EA adress field extension
                              ||||||||
                              00000000b
                              */

#define TEI2        0x0a29    /* tei reg write */
                            /*  ;used in auto mode has the following meaning
                              ********--TEI2
                              |||||||*-EA adress field extension
                              ||||||||
                              00000000b
                              */

#define SAPR        0x0a26            /* SAPI reg read */

/*  HDLC control data */
#define RHCR        0x0a29    /* receive HDLC control read */
/*   HDLC information data */
#define RFIFO       0x0a00            /* receive  data 32 bytes read */
#define XFIFO       0x0a00            /* transmit data 32 byte write */

#define SPCR        0x0a30    /* serial port control reg read/write, */
                            /* reset = 0 */
                            /*  ;the SPCR has the following meaning
                              *---------SPU software power up
                              |*--------SAC SIP port active
                              ||*-------SPM serial port timing
                              |||*------TLP test loop
                              ||||**---C1C1-0 channel 2 connect
                              ||||||**-C2C1-0 channel 2 connect
                              ||||||||
                              00000000b
                              */

#define CIR0        0x0a31    /* command/indication receive 0 reg */
                                      /* read, reset 7Ch */
                            /*  ;the CIR0 has the following meaning
                              *---------0
                              |*--------BAS bus access status
                              ||****---CODR0 receive C/I channel 0
                              ||||||*--CIC0 C/I code change channel 0
                              |||||||*-CIC1 C/I code change channel 1
                              ||||||||
                              00000000b
                              */

#define CIX0        0x0a31    /* command/indication transmit 0 reg */
                                      /* write, reset 10111111h */
                            /*  ;the CIX0 has the following meaning
                              *---------RSS reset source select
                              |*--------BAC bus access control
                              ||****---CODX0 C/I transmit channel 0
                              ||||||*--TCX T channel output
                              |||||||*-ECX E channel output
                              ||||||||
                              00000000b
                              */

#define MOR0        0x0a32    /* monitor receive channel 0 read */
#define MOX0        0x0a32    /* monitor transmit channel 0 write */
#define CIR1        0x0a33    /* command/indication receive 1 reg */
                                      /* read register, at reset = FFh */
        /* The CIR1 gets information on
```

```
      SICOFI peripherals (e.g. the SLIC)
     Meaning at LC end
     *---------      Line B, Not Used, always set to 0
     |*-------- SI3 Line B, TA from Rack Controller Serial link
     ||*------- SI2 Line B Pair Gain Test: 0=Test requested
     |||*------ SI1 Line B Ring Detect: 0=Ring request detected
     ||||*-----     Line A, Not Used, always set to 0
     |||||*---- SI3 Line A, Not Used, always set to 1
     ||||||*--- SI2 Line A Pair Gain Test: 0=Test requested
     |||||||*-- SI1 Line A Ring Detect: 0=Ring request detected
     ||||||||
     XXXXXXXXb
   */

#define CIX1      0x0a33   /* command/indication transmit 1 reg */
                                  /* write register, at reset = F
   /* The CIX1 puts commands for
      SICOFI peripherals (e.g. the SLIC)
     Meaning at LC end
     *--------- SBB 1=Test Relay, Reroute U link I/O to RC
     |*-------- SO3 Line B, Get Central Office line input from RC
     ||*------- SO2 Alarm relay, house Alarm 2: 1=Sound alarm
     |||*------ SO1 Line B Hold: 0=Release Line, 1=Seize Line
     ||||*----- SBA 1=TA for Rack Controller Serial link
     |||||*---- SO3 Line A, Get Central Office line input from RC
     ||||||*--- SO2 Alarm relay, house Alarm 1: 1=Sound alarm
     |||||||*-- SO1 Line A Hold: 0=Release Line, 1=Seize Line
     ||||||||
     00000000b   ; Initial value
   */

#define MOR1    0x0a34   /* monitor receive channel 1 read */

#define MOX1      0x0a34   /* monitor transmit channel 1 write */
                  /*  The MOX1 puts Coefficient and Status Of
                      for the SICOFI
                       *--------- 0=Line A, 1=Line B
                       ||*------- 0=Power Down (Standby),
                       |||        1=Power up selected line
                       ||||||||
                       X0X00100b    ; When used to write powe
                                      control SOPs
                  */

#define C1R          0x0a35   /* channel 1 reg read/write */
#define C2R          0x0a36   /* channel 2 reg read/write */
#define B1CR  0x0a37   /* channel B1 reg read */
#define B2CR  0x0a38   /* channel B2 reg read */
#define STCR  0x0a37   /* synchronous transfer control reg write */
                 /*   the STCR has the following use
                   *---------TSF terminal specific function
                   |***------SBA2-0 tic bus address
                   ||||*-----ST1 synchronous transfer 1
                   |||||*----ST0 synchronous transfer 0
                   ||||||*---SC1 synch  transfer 1 completed
                   |||||||*--SC0 synch  transfer 0 completed
                   ||||||||
                   00000000b
                   */
```

```
#define ADF1        0x0a38    /* additional feature req write, reset 00H */
                           /*  ;the ADF1 has the following use
                              **---------WTC2-1 watchdog timer control
                              ||*--------CI1E C/I channel intprt enable
                              |||*-------IDC iom direction control
                              ||||***---CSEL2-0 channel select
                              |||||||*--ITF inter-frame time fill
                              ||||||||
                              00000000b
                              */

#define ADF2        0x0a39    /* additional feature reg read/write, reset 00h
                           /*  ;the ADF2 has the following use
                              *----------IMS IOM mode selection
                              |***-------D2C0-2 data strobe polarity
                              ||||*-----ODS output drive selection
                              |||||***--D1C0-2 data strobe polarity
                              ||||||||
                              00000000b
                              */

#define MOSR        0x0a3A    /* monitor status reg read, reset 00h */
                           /*  ;the MOSR has the following use
                              ********--this reg for IOM rev2 only
                              ||||||||
                              00000000b
                              */

#define MOCR        0x0a3A    /* monitor status reg wite, reset 00h */
                           /*  ;the MOCR has the following use
                              ********--this reg for IOM rev2 only
                              ||||||||
                              00000000b
                              */

extern BYTE RT_MODE_Reg_Image;


/*

$Workfile:   rtetst.c  $
$Revision:   1.0  $
$Date:   31 Aug 1990 18:18:24   $

$Log:   E:/USR/DAML/APPC/RTE/VCS/RTETST.C_V  $
 *
 *    Rev 1.0   31 Aug 1990 18:18:24   bChen
 * Initial revision.

*/


static char *vscId="$Header:   E:/USR/DAML/APPC/RTE/VCS/RTETST.C_V   1.0

#define TEST 1

#include "DAMLlit.h"
#include "rte.h"
/*
------------------------------------------------------------------------
                      MESSAGE DEFINITIONS
------------------------------------------------------------------------
*/
```

```
/* *********************************************************************
 *                          MAIN PROCEDURE
 **********************************************************************
*/
void main()
{

extern void interrupt far RT_SICOFI_Interrupts ();

BYTE SicofiCommand;
BYTE result;
static BYTE WriteBuf[10];    /* TO CONTAIN CR1,...,CR3 and COP's COEFF's. */
static BYTE readBuf[10];
BYTE cr1Value;
BYTE cr2Value;
BYTE cr3Value;
int i;
long int j=0;
long int k=0;
int count;

   disableInterrupts();

   init_RT_ICC();
   interruptsInit();
   setHandler(0x06,RT_SICOFI_Interrupts);  /* CHANGED FROM IRQ1 TO IRQ6 */
   interruptsStart();

   setRTInterrupts(SIN_INTERRUPT_MASK);

 /* RESET & POWER UP SICOFI - CHANNEL A */
 /* ****************************************************************** */
   SicofiCommand = setSOP(SICOFI_CHANNEL_A,
                          SICOFI_WRITE,
                          POWER_UP,
                          RESET_SICOFI,0);

    sendRTSicofiCommand(1 /* ORIGINATOR */
                              ,SicofiCommand
                              ,WriteBuf);

   for (i=0;i<1000;i++) if (getRTSicofiStat() == OKAY) break;


 /* RESET & POWER UP SICOFI - CHANNEL B */
 /* ****************************************************************** */
   SicofiCommand = setSOP(SICOFI_CHANNEL_B,
                          SICOFI_WRITE,
                          POWER_UP,RESET_SICOFI,0);

    sendRTSicofiCommand(1 /* ORIGINATOR */
                              ,SicofiCommand
                              ,WriteBuf);

   for (i=0;i<1000;i++) if (getRTSicofiStat() == OKAY) break;

 /* ****************************************************************** */
  /* WRITE A CR1 COMMAND - TO CHANNEL A*/
 /* ???? REMEMBER TO CONFIGURE SICOFI SBx to OUTPUT */

   SicofiCommand = setSOP(SICOFI_CHANNEL_A,
                          SICOFI_WRITE,
                          POWER_UP,NIL,CR1_Len);

   WriteBuf[0] = setCR1(DISABLE_FILTER,
                        DISABLE_FILTER,
```

```
                    DISABLE_FILTER,
                    DISABLE_FILTER,
                    DISABLE_FILTER,
                    DISABLE_FILTER,
                    SBX_OUTPUT_SEL, NIL);

  sendRTSicofiCommand(1 /* ORIGINATOR */
                         ,SicofiCommand
                         ,WriteBuf);

 for (i=0;i<1000;i++) if (getRTSicofiStat() == OKAY) break;

/* ******************************************************************** */
/* WRITE A CR1 COMMAND TO CHANNEL B */

 SicofiCommand = setSOP(SICOFI_CHANNEL_B,
                        SICOFI_WRITE,
                        POWER_UP,NIL,CR1_Len);

 WriteBuf[0] = setCR1(DISABLE_FILTER,
                      DISABLE_FILTER,
                      DISABLE_FILTER,
                      DISABLE_FILTER,
                      DISABLE_FILTER,
                      DISABLE_FILTER,
                      SBX_OUTPUT_SEL, NIL);

  sendRTSicofiCommand(1 /* ORIGINATOR */
                         ,SicofiCommand
                         ,WriteBuf);

 for (i=0;i<1000;i++) if (getRTSicofiStat() == OKAY) break;


/* WRITE SOME CR1 TO CR3 values */
/* ******************************************************************** */
 SicofiCommand = setSOP(SICOFI_CHANNEL_A,
                        SICOFI_WRITE,
                        POWER_UP,
                        NIL,CR3_Len);
 cr1Value = setCR1(ENABLE_FILTER,
                   ENABLE_FILTER,
                   ENABLE_FILTER,
                   DISABLE_FILTER,
                   ENABLE_FILTER,
                   DISABLE_FILTER,
                   SBX_OUTPUT_SEL, uLAW);

 cr2Value = setCR2(0x02,
                   0x03,
                   ENABLE_FILTER,
                   DISABLE_FILTER);

 cr3Value = setCR3(CHANNEL_STRAIGHT,
                   DISABLE_FILTER,
                   ENABLE_FILTER,
                   DISABLE_FILTER,
                   0x01, 0x02);

 WriteBuf[0] = cr1Value;
 WriteBuf[1] = cr2Value;
 WriteBuf[2] = cr3Value;

  sendRTSicofiCommand(1 /* ORIGINATOR */
                         ,SicofiCommand
                         ,WriteBuf);
```

```
   for (i=0;i<1000;i++) if (getRTSicofiStat() == OKAY) break;


/* READ BACK THE SICOFI STATUS BY READING SOP */
/* ******************************************************************* */
   SicofiCommand = setSOP(SICOFI_CHANNEL_A,
                          SICOFI_READ,
                          POWER_UP,NIL,CR3_Len);

   while (requestRTSicofiStatus(1, /* ORIGINATOR */
                                   SicofiCommand) == BUSY)
        ;

   for(i=0;i<100;i++) if ( getRTSicofiStatus(1, /* ORIGINATOR */
                                   readBuf) == OKAY) break;



/* WRITE SOME COP values */
/* ******************************************************************* */

   SicofiCommand = setCOP(SICOFI_CHANNEL_A,
                          SICOFI_WRITE,
                          getCOP_code(Z_FILTER) );
   WriteBuf[0] = 0x88;
   WriteBuf[1] = 0x77;
   WriteBuf[2] = 0x66;
   WriteBuf[3] = 0x55;
   WriteBuf[4] = 0x44;
   WriteBuf[5] = 0x33;
   WriteBuf[6] = 0x22;
   WriteBuf[7] = 0x11;


while(0==0)
   {
    sendRTSicofiCommand(1 /* ORIGINATOR */
                              ,SicofiCommand
                              ,WriteBuf);

   for (i=0;i<1000;i++) if (getRTSicofiStat() == OKAY) break;



/* READ BACK THE SICOFI STATUS BY READING COP */
/* ******************************************************************* */
   SicofiCommand = setCOP(SICOFI_CHANNEL_A, SICOFI_READ,
                          getCOP_code(Z_FILTER) );

   while (requestRTSicofiStatus(1, /* ORIGINATOR */
                                   SicofiCommand) == BUSY)
        ;
   for(i=0;i<100;i++) if ( getRTSicofiStatus(1, /* ORIGINATOR */
                                   readBuf) == OKAY) break;


    k++;
    for(i=0;i<8;i++)
       if (readBuf[i+1] != WriteBuf[i])
          {
           j++;
           break; }

} /* END WHILE 0==0 */

   /* NOW - TEST SIGNALLING PORTS */
```

```
/* ******************************************************************** */
   RTSicofiSignallingOutput(DSL_RELAY,HIGH);
   RTSicofiSignallingOutput(DSL_RELAY,LOW);

   RTSicofiSignallingOutput(OUTPUT_RELAY,HIGH);
   RTSicofiSignallingOutput(OUTPUT_RELAY,LOW);

   RTSicofiSignallingOutput(_5mA_LOAD,HIGH);
   RTSicofiSignallingOutput(_5mA_LOAD,LOW);

   RTSicofiSignallingOutput(_45mA_LOAD,HIGH);
   RTSicofiSignallingOutput(_45mA_LOAD,LOW);

}   /* END MAIN */

/*

$Workfile:   rteutil.c  $
$Revision:   1.0  $
$Date:   06 Sep 1990 12:13:50  $

$Log:   E:/USR/DAML/APPC/RTE/VCS/RTEUTIL.C_V  $
 *
 *    Rev 1.0   06 Sep 1990 12:13:50   bChen
 * Initial revision.

*/

static char *vscId="$Header:   E:/USR/DAML/APPC/RTE/VCS/RTEUTIL.C_V   1.0

/****-------------------------------------------------------------------------
 *
 *   File: rteutil.c
 *
 ****-------------------------------------------------------------------------

#include "rts.h"
#ifndef HD_TYPES
#       include <sys/types.h>
#endif
#ifndef HD_TIME
#       include <sys/timeb.h>
#endif

#include "DAMLlit.h"
#include "DAMLcnf.h"
#include "rte.h"


/*****************************************************************/
/*                    setupSICOFI                                */
/*****************************************************************/

static void initSICOFIchannelA()
{
/*
   Procedure to initialize the SICOFI to the proper filter COP
   values.
*/

int i;
BYTE SicofiCommand;
BYTE writeBuf[10];
```

```
  /* RESET & POWER UP SICOFI - CHANNEL A */
  SicofiCommand = setSOP(SICOFI_CHANNEL_A,
                         SICOFI_WRITE,
                         POWER_UP,
                         RESET_SICOFI,0);

   sendRTSicofiCommand(lceHandler   /* ORIGINATOR */
                      ,SicofiCommand
                      ,writeBuf);

  for (i=0;i<1000;i++) if (getRTSicofiStat() == OKAY) break;

#ifdef TEST_DEBUG
printf("initSICOFI Chan A - done\n");
#endif

}


/****************************************************************/
/****************************************************************/
static void initSICOFIchannelB()
{
int i;
BYTE SicofiCommand;
BYTE writeBuf[10];

   /* RESET & POWER UP SICOFI - CHANNEL B */
   SicofiCommand = setSOP(SICOFI_CHANNEL_B,
                          SICOFI_WRITE,
                          POWER_UP,NIL,0);

    sendRTSicofiCommand(lceHandler
                       ,SicofiCommand
                       ,writeBuf);

   for (i=0;i<1000;i++) if (getRTSicofiStat() == OKAY) break;

#ifdef TEST_DEBUG
printf("initSICOFI Chan B - done\n");
#endif
}

/****************************************************************/
/****************************************************************/
static BYTE enableSICOFI_FiltersChannelA()
{
int i;
BYTE SicofiCommand;
BYTE badLoadFlag;
BYTE readBuf[10];
BYTE writeBuf[10];

   /* WRITE A CR1 COMMAND - TO CHANNEL A*/
   SicofiCommand = setSOP(SICOFI_CHANNEL_A,
                          SICOFI_WRITE,
                          POWER_UP,NIL,CR1_Len);
   writeBuf[0] = setCR1(ENABLE_FILTER,
                        ENABLE_FILTER,
                        ENABLE_FILTER,
                        ENABLE_FILTER,
                        ENABLE_FILTER,
                        ENABLE_FILTER,
                        SBX_INPUT_SEL, uLAW);

     sendRTSicofiCommand(lceHandler /* ORIGINATOR */
                        ,SicofiCommand
                        ,writeBuf);
```

```
   for (i=0;i<1000;i++) if (getRTSicofiStat() == OKAY) break;

   /* VERIFY SICOFI CR1 */
   SicofiCommand = setSOP(SICOFI_CHANNEL_A,
                          SICOFI_READ,
                          POWER_UP,NIL,CR1_Len);

    for (i=0;i<1000;i++) if (requestRTSicofiStatus(lceHandler
                             ,SicofiCommand) != BUSY) break;

    for(i=0;i<100;i++) if ( getRTSicofiStatus(lceHandler, /* ORIGINATOR */
                                 readBuf) == OKAY) break;

#ifdef TEST_DEBUG
printf("Enable SICOFI Chan A - done\n");
#endif

    for(badLoadFlag=FALSE,i=0;i<1;i++)
       if (readBuf[i+1] != writeBuf[i])
      {
      badLoadFlag = TRUE;
      break;
      }

    if (badLoadFlag == FALSE)
       return OKAY;
    else return NOT_OKAY;

}

/*****************************************************************/
/*****************************************************************/
static BYTE enableSICOFI_FiltersChannelB()
{
int i;
BYTE SicofiCommand;
BYTE badLoadFlag;
BYTE readBuf[10];
BYTE writeBuf[10];

   /* WRITE A CR1 COMMAND - TO CHANNEL B*/
   SicofiCommand = setSOP(SICOFI_CHANNEL_B,
                          SICOFI_WRITE,
                          POWER_UP,NIL,CR1_Len);

   writeBuf[0] = setCR1(ENABLE_FILTER,
                        ENABLE_FILTER,
                        ENABLE_FILTER,
                        ENABLE_FILTER,
                        ENABLE_FILTER,
                        ENABLE_FILTER,
                        SBX_INPUT_SEL, uLAW);

    sendRTSicofiCommand(lceHandler /* ORIGINATOR */
                        ,SicofiCommand
                        ,writeBuf);

   for (i=0;i<1000;i++) if (getRTSicofiStat() == OKAY) break;

   /* VERIFY SICOFI CR1 */
   SicofiCommand = setSOP(SICOFI_CHANNEL_B,
                          SICOFI_READ,
                          POWER_UP,NIL,CR1_Len);

   for (i=0;i<1000;i++) if (requestRTSicofiStatus(lceHandler
                            ,SicofiCommand) != BUSY) break;
```

```
   for(i=0;i<100;i++) if ( getRTSicofiStatus(lceHandler, /* ORIGINATOR */
                                  readBuf) == OKAY) break;
#ifdef TEST_DEBUG
printf("Enable SICOFI Chan B - done\n");
#endif

    for(badLoadFlag=FALSE,i=0;i<1;i++)
       if (readBuf[i+1] != writeBuf[i])
     {
     badLoadFlag = TRUE;
     break;
     }

    if (badLoadFlag == FALSE)
       return OKAY;
    else return NOT_OKAY;
}

/****************************************************************/
/****************************************************************/
static BYTE loadSICOFI_CoefFilterB1ChannelA()
{
int i;
BYTE SicofiCommand;
BYTE badLoadFlag;
BYTE readBuf[10];
BYTE writeBuf[10];


   /* WRITE A CR1 COMMAND - TO CHANNEL A */
   SicofiCommand = setCOP(SICOFI_CHANNEL_A,
                          SICOFI_WRITE,
                          getCOP_code(B_FILTER_1));

    writeBuf[0] = 0x02;
    writeBuf[1] = 0xf4;
    writeBuf[2] = 0x22;
    writeBuf[3] = 0x82;
    writeBuf[4] = 0x12;
    writeBuf[5] = 0x30;
    writeBuf[6] = 0x91;
    writeBuf[7] = 0xbd;

    sendRTSicofiCommand(lceHandler /* ORIGINATOR */
                        ,SicofiCommand
                        ,writeBuf);

   for (i=0;i<1000;i++) if (getRTSicofiStat() == OKAY) break;

   /* VERIFY SICOFI COP */
   SicofiCommand = setCOP(SICOFI_CHANNEL_A,
                          SICOFI_READ,
                          getCOP_code(B_FILTER_1));

   for (i=0;i<1000;i++) if (requestRTSicofiStatus(lceHandler
                             ,SicofiCommand) != BUSY) break;

   for(i=0;i<100;i++) if ( getRTSicofiStatus(lceHandler, /* ORIGINATOR */
                                  readBuf) == OKAY) break;
#ifdef TEST_DEBUG
printf("load SICOFI coef Filter B1 Chan A - done\n");
#endif

    for(badLoadFlag=FALSE,i=0;i<8;i++)
       if (readBuf[i+1] != writeBuf[i])
     {
```

```
     badLoadFlag = TRUE;
     break;
     }

    if (badLoadFlag == FALSE)
       return OKAY;
    else return NOT_OKAY;

}

/*******************************************************************/
/*******************************************************************/
static BYTE loadSICOFI_CoefFilterB2ChannelA()
{
int i;
BYTE SicofiCommand;
BYTE badLoadFlag;
BYTE readBuf[10];
BYTE writeBuf[10];

   clearPendingRTInterrupts();

   /* WRITE A CR1 COMMAND - TO CHANNEL A */
   SicofiCommand = setCOP(SICOFI_CHANNEL_A,
                          SICOFI_WRITE,
                          getCOP_code(B_FILTER_2));

    writeBuf[0] = 0x00;
    writeBuf[1] = 0x11;
    writeBuf[2] = 0x8b;
    writeBuf[3] = 0x11;
    writeBuf[4] = 0x00;
    writeBuf[5] = 0x84;
    writeBuf[6] = 0xba;
    writeBuf[7] = 0xb8;

    sendRTSicofiCommand(lceHandler /* ORIGINATOR */
                       ,SicofiCommand
                       ,writeBuf);

   for (i=0;i<1000;i++) if (getRTSicofiStat() == OKAY) break;

   /* VERIFY SICOFI COP */
   SicofiCommand = setCOP(SICOFI_CHANNEL_A,
                          SICOFI_READ,
                          getCOP_code(B_FILTER_2));

   for (i=0;i<1000;i++) if (requestRTSicofiStatus(lceHandler
                            ,SicofiCommand) != BUSY) break;

   for(i=0;i<100;i++) if ( getRTSicofiStatus(lceHandler, /* ORIGINATOR */
                              readBuf) == OKAY) break;

#ifdef TEST_DEBUG
printf("load SICOFI coef Filter B2 Chan A - done\n");
#endif

    for(badLoadFlag=FALSE,i=0;i<8;i++)
       if (readBuf[i+1] != writeBuf[i])
     {
     badLoadFlag = TRUE;
     break;
     }

    if (badLoadFlag == FALSE)
       return OKAY;
    else return NOT_OKAY;
}
```

```
/****************************************************************/
/****************************************************************/
static BYTE loadSICOFI_CoefFilterZchannelA()
{
int i;
BYTE SicofiCommand;
BYTE badLoadFlag;
BYTE readBuf[10];
BYTE writeBuf[10];

   clearPendingRTInterrupts();

   /* WRITE A CR1 COMMAND - TO CHANNEL A */
   SicofiCommand = setCOP(SICOFI_CHANNEL_A,
                          SICOFI_WRITE,
                          getCOP_code(Z_FILTER));

    writeBuf[0] = 0xf0;
    writeBuf[1] = 0x24;
    writeBuf[2] = 0x27;
    writeBuf[3] = 0x62;
    writeBuf[4] = 0x3b;
    writeBuf[5] = 0x97;
    writeBuf[6] = 0xd1;
    writeBuf[7] = 0x26;

    sendRTSicofiCommand(lceHandler /* ORIGINATOR */
                       ,SicofiCommand
                       ,writeBuf);

   for (i=0;i<1000;i++) if (getRTSicofiStat() == OKAY) break;

   /* VERIFY SICOFI COP */
   SicofiCommand = setCOP(SICOFI_CHANNEL_A,
                          SICOFI_READ,
                          getCOP_code(Z_FILTER));

   for (i=0;i<1000;i++) if (requestRTSicofiStatus(lceHandler
                             ,SicofiCommand) != BUSY) break;

   for(i=0;i<100;i++) if ( getRTSicofiStatus(lceHandler, /* ORIGINATOR */
                                  readBuf) == OKAY) break;
#ifdef TEST_DEBUG
printf("load SICOFI coef Filter Z Chan A - done\n");
#endif

    for(badLoadFlag=FALSE,i=0;i<8;i++)
       if (readBuf[i+1] != writeBuf[i])
     {
     badLoadFlag = TRUE;
     break;
     }

    if (badLoadFlag == FALSE)
       return OKAY;
    else return NOT_OKAY;
}

/****************************************************************/
/****************************************************************/
static BYTE loadSICOFI_CoefFilterBdelayChA()
{
int i;
BYTE SicofiCommand;
BYTE badLoadFlag;
BYTE readBuf[10];
BYTE writeBuf[10];
```

```
   clearPendingRTInterrupts();

   /* WRITE A CR1 COMMAND - TO CHANNEL A */
   SicofiCommand = setCOP(SICOFI_CHANNEL_A,
                          SICOFI_WRITE,
                          getCOP_code(B_FILTER_DELAY ));

    writeBuf[0] = 0x19;
    writeBuf[1] = 0x19;
    writeBuf[2] = 0x11;
    writeBuf[3] = 0x19;

    sendRTSicofiCommand(lceHandler /* ORIGINATOR */
                       ,SicofiCommand
                       ,writeBuf);

   for (i=0;i<1000;i++) if (getRTSicofiStat() == OKAY) break;

   /* VERIFY SICOFI COP */
   SicofiCommand = setCOP(SICOFI_CHANNEL_A,
                          SICOFI_READ,
                          getCOP_code(B_FILTER_DELAY));
   for (i=0;i<1000;i++) if (requestRTSicofiStatus(lceHandler
                           ,SicofiCommand) != BUSY) break;

   for(i=0;i<100;i++) if ( getRTSicofiStatus(lceHandler, /* ORIGINATOR */
                                readBuf) == OKAY) break;
#ifdef TEST_DEBUG
printf("load SICOFI coef Filter B delay Chan A - done\n");
#endif

    for(badLoadFlag=FALSE,i=0;i<4;i++)
       if (readBuf[i+1] != writeBuf[i])
     {
     badLoadFlag = TRUE;
     break;
     }

    if (badLoadFlag == FALSE)
       return OKAY;
    else return NOT_OKAY;
}
/*****************************************************************/
/*                 loadSICOFI_CoefFilterXchannelA()             */
/*****************************************************************/
static BYTE loadSICOFI_CoefFilterXchannelA()
{
int i;
BYTE SicofiCommand;
BYTE badLoadFlag;
BYTE readBuf[10];
BYTE writeBuf[10];

   clearPendingRTInterrupts();

   /* WRITE A CR1 COMMAND - TO CHANNEL A */
   SicofiCommand = setCOP(SICOFI_CHANNEL_A,
                          SICOFI_WRITE,
                          getCOP_code(X_FILTER));

    writeBuf[0] = 0x40;
    writeBuf[1] = 0x1c;
    writeBuf[2] = 0xa7;
    writeBuf[3] = 0x42;
    writeBuf[4] = 0x1e;
    writeBuf[5] = 0xc5;
```

```
   writeBuf[6] = 0x04;
   writeBuf[7] = 0x24;

   sendRTSicofiCommand(lceHandler /* ORIGINATOR */
                       ,SicofiCommand
                       ,writeBuf);

   for (i=0;i<1000;i++) if (getRTSicofiStat() == OKAY) break;

   /* VERIFY SICOFI COP */
   SicofiCommand = setCOP(SICOFI_CHANNEL_A,
                          SICOFI_READ,
                          getCOP_code(X_FILTER));

   for (i=0;i<1000;i++) if (requestRTSicofiStatus(lceHandler
                          ,SicofiCommand) != BUSY) break;

   for(i=0;i<100;i++) if ( getRTSicofiStatus(lceHandler, /* ORIGINATOR */
                              readBuf) == OKAY) break;
#ifdef TEST_DEBUG
printf("load SICOFI coef Filter X delay Chan A - done\n");
#endif

    for(badLoadFlag=FALSE,i=0;i<8;i++)
       if (readBuf[i+1] != writeBuf[i])
     {
     badLoadFlag = TRUE;
     break;
     }

    if (badLoadFlag == FALSE)

        return OKAY;
     else return NOT_OKAY;
 }

/*****************************************************************/
/*****************************************************************/
static BYTE loadSICOFI_CoefFilterRchannelA()
{
int i;
BYTE SicofiCommand;
BYTE badLoadFlag;
BYTE readBuf[10];
BYTE writeBuf[10];

   /* WRITE A CR1 COMMAND - TO CHANNEL A */
   SicofiCommand = setCOP(SICOFI_CHANNEL_A,
                          SICOFI_WRITE,
                          getCOP_code(R_FILTER));

    writeBuf[0] = 0x40;
    writeBuf[1] = 0x1b;
    writeBuf[2] = 0x97;
    writeBuf[3] = 0x42;
    writeBuf[4] = 0x7b;
    writeBuf[5] = 0xd6;
    writeBuf[6] = 0x04;
    writeBuf[7] = 0xbb;

    sendRTSicofiCommand(lceHandler /* ORIGINATOR */
                        ,SicofiCommand
                        ,writeBuf);

    for (i=0;i<1000;i++) if (getRTSicofiStat() == OKAY) break;
```

```
   /* VERIFY SICOFI COP */
   SicofiCommand = setCOP(SICOFI_CHANNEL_A,
                          SICOFI_READ,
                          getCOP_code(R_FILTER));

   for (i=0;i<1000;i++) if (requestRTSicofiStatus(lceHandler
                            ,SicofiCommand) != BUSY) break;

   for(i=0;i<100;i++) if ( getRTSicofiStatus(lceHandler, /* ORIGINATOR */
                                  readBuf) == OKAY) break;
#ifdef TEST_DEBUG
printf("load SICOFI coef Filter R  Chan A - done\n");
#endif

    for(badLoadFlag=FALSE,i=0;i<8;i++)
       if (readBuf[i+1] != writeBuf[i])
      {
      badLoadFlag = TRUE;
      break;
      }

    if (badLoadFlag == FALSE)
       return OKAY;
    else return NOT_OKAY;
}

/******************************************************************/
/******************************************************************/
static BYTE loadSICOFI_CoefFilterGXchannelA()
{
int i;
BYTE SicofiCommand;
BYTE badLoadFlag;
BYTE readBuf[10];
BYTE writeBuf[10];

   /* WRITE A CR1 COMMAND - TO CHANNEL A */
   SicofiCommand = setCOP(SICOFI_CHANNEL_A,
                          SICOFI_WRITE,
                          getCOP_code(GX_FILTER));

    writeBuf[0] = 0xc0;
    writeBuf[1] = 0x2b;
    writeBuf[2] = 0x20;
    writeBuf[3] = 0x23;

    sendRTSicofiCommand(lceHandler /* ORIGINATOR */
                       ,SicofiCommand
                       ,writeBuf);

   for (i=0;i<1000;i++) if (getRTSicofiStat() == OKAY) break;

   /* VERIFY SICOFI COP */
   SicofiCommand = setCOP(SICOFI_CHANNEL_A,
                          SICOFI_READ,
                          getCOP_code(GX_FILTER));

   for (i=0;i<1000;i++) if (requestRTSicofiStatus(lceHandler
                            ,SicofiCommand) != BUSY) break;

   for(i=0;i<100;i++) if ( getRTSicofiStatus(lceHandler, /* ORIGINATOR */
                                  readBuf) == OKAY) break;
#ifdef TEST_DEBUG
printf("load SICOFI coef Filter GX Chan A - done\n");
#endif
```

```
    for(badLoadFlag=FALSE,i=0;i<4;i++)
       if (readBuf[i+1] != writeBuf[i])
      {
      badLoadFlag = TRUE;
      break;
      }

    if (badLoadFlag == FALSE)
       return OKAY;
    else return NOT_OKAY;
}

/*****************************************************************/
/*                  init RT Emulator                               */
/*****************************************************************/
BYTE initRTemulator()
{
BYTE badLoadFlag;
int badCount;
int i;

   setRTInterrupts(ALL_ICC_INTERRUPTS_OFF);
   clearPendingRTInterrupts();

   setRTInterrupts(SIN_INTERRUPT_MASK);

   badCount=0;
   initSICOFIchannelA();
   initSICOFIchannelB();

   for (i=0,badLoadFlag=TRUE;i<1000;i++) {
      if (enableSICOFI_FiltersChannelA() == OKAY)
     {
     badLoadFlag = FALSE;
     break;
     }
      }
   for (i=0,badLoadFlag=TRUE;i<1000;i++) {
      if (enableSICOFI_FiltersChannelB() == OKAY)
     {
     badLoadFlag = FALSE;
     break;
     }
      }
   for (i=0,badLoadFlag=TRUE;i<1000;i++) {
      if (loadSICOFI_CoefFilterB1ChannelA() == OKAY)
     {
     badLoadFlag = FALSE;
     break;
     }
      }
   for (i=0,badLoadFlag=TRUE;i<1000;i++) {
      if (loadSICOFI_CoefFilterB2ChannelA() == OKAY)
     {
     badLoadFlag = FALSE;
     break;
     }
      }
   for (i=0,badLoadFlag=TRUE;i<1000;i++) {
      if (loadSICOFI_CoefFilterZchannelA() == OKAY)
     {
     badLoadFlag = FALSE;
     break;
```

```
  }
    }
 for (i=0,badLoadFlag=TRUE;i<1000;i++) {
    if (loadSICOFI_CoefFilterBdelayChA() == OKAY)

   {
   badLoadFlag = FALSE;
   break;
   }
     }
  for (i=0,badLoadFlag=TRUE;i<1000;i++) {
    if (loadSICOFI_CoefFilterXchannelA() == OKAY)
   {
   badLoadFlag = FALSE;
   break;
   }
     }
  for (i=0,badLoadFlag=TRUE;i<1000;i++) {
    if (loadSICOFI_CoefFilterRchannelA() == OKAY)
   {
   badLoadFlag = FALSE;
   break;
   }
     }
  for (i=0,badLoadFlag=TRUE;i<1000;i++) {
    if (loadSICOFI_CoefFilterGXchannelA() == OKAY)
   {
   badLoadFlag = FALSE;
   break;
   }
     }

   setRTInterrupts(ALL_ICC_INTERRUPTS_OFF);
   clearPendingRTInterrupts();

   if (badLoadFlag == FALSE)
      return OKAY;
   else return NOT_OKAY;
}

### rth\rteutil.c ###

/*

$Workfile:   rteutil.c  $
$Revision:   1.0  $
$Date:   06 Sep 1990 12:13:50  $

$Log:   E:/USR/DAML/APPC/RTE/VCS/RTEUTIL.C_V  $
 *
 *     Rev 1.0   06 Sep 1990 12:13:50   bChen
 * Initial revision.

*/

static char *vscId="$Header:   E:/USR/DAML/APPC/RTE/VCS/RTEUTIL.C_V   1.0

/****---------------------------------------------------------------------
 *
 *   File: rteutil.c
 *
 ****---------------------------------------------------------------------
```

```
#include "rts.h"
#ifndef HD_TYPES
#       include <sys/types.h>
#endif
#ifndef HD_TIME
#       include <sys/timeb.h>
#endif

#include "DAMLlit.h"
#include "DAMLcnf.h"
#include "rte.h"

/*****************************************************************/
/*                    setupSICOFI                              */
/*****************************************************************/

static void initSICOFIchannelA()
{
/*
   Procedure to initialize the SICOFI to the proper filter COP
   values.
*/

int i;
BYTE SicofiCommand;
BYTE writeBuf[10];

   /* RESET & POWER UP SICOFI - CHANNEL A */
   SicofiCommand = setSOP(SICOFI_CHANNEL_A,
                          SICOFI_WRITE,

                         POWER_UP,
                         RESET_SICOFI,0);

    sendRTSicofiCommand(lceHandler    /* ORIGINATOR */
                       ,SicofiCommand
                       ,writeBuf);

   for (i=0;i<1000;i++) if (getRTSicofiStat() == OKAY) break;

#ifdef TEST_DEBUG
printf("initSICOFI Chan A - done\n");
#endif

}


/*****************************************************************/
/*****************************************************************/
static void initSICOFIchannelB()
{
int i;
BYTE SicofiCommand;
BYTE writeBuf[10];

   /* RESET & POWER UP SICOFI - CHANNEL B */
   SicofiCommand = setSOP(SICOFI_CHANNEL_B,
                          SICOFI_WRITE,
                          POWER_UP,NIL,0);

    sendRTSicofiCommand(lceHandler
                       ,SicofiCommand
                       ,writeBuf);

   for (i=0;i<1000;i++) if (getRTSicofiStat() == OKAY) break;
```

```
#ifdef TEST_DEBUG
printf("initSICOFI Chan B - done\n");
#endif
}

/*****************************************************************/
/*****************************************************************/
static BYTE enableSICOFI_FiltersChannelA()
{
int i;
BYTE SicofiCommand;
BYTE badLoadFlag;
BYTE readBuf[10];
BYTE writeBuf[10];

    /* WRITE A CR1 COMMAND - TO CHANNEL A*/
    SicofiCommand = setSOP(SICOFI_CHANNEL_A,
                           SICOFI_WRITE,
                           POWER_UP,NIL,CR1_Len);

   writeBuf[0] = setCR1(ENABLE_FILTER,
                        ENABLE_FILTER,
                        ENABLE_FILTER,
                        ENABLE_FILTER,
                        ENABLE_FILTER,
                        ENABLE_FILTER,
                        SBX_INPUT_SEL, uLAW);

    sendRTSicofiCommand(lceHandler /* ORIGINATOR */
                        ,SicofiCommand
                        ,writeBuf);

   for (i=0;i<1000;i++) if (getRTSicofiStat() == OKAY) break;

   /* VERIFY SICOFI CR1 */
   SicofiCommand = setSOP(SICOFI_CHANNEL_A,
                          SICOFI_READ,
                          POWER_UP,NIL,CR1_Len);

    for (i=0;i<1000;i++) if (requestRTSicofiStatus(lceHandler
                            ,SicofiCommand) != BUSY) break;

    for(i=0;i<100;i++) if ( getRTSicofiStatus(lceHandler, /* ORIGINATOR */
                               readBuf) == OKAY) break;

#ifdef TEST_DEBUG
printf("Enable SICOFI Chan A - done\n");
#endif

     for(badLoadFlag=FALSE,i=0;i<1;i++)
        if (readBuf[i+1] != writeBuf[i])
      {
      badLoadFlag = TRUE;
      break;
      }

     if (badLoadFlag == FALSE)
        return OKAY;
     else return NOT_OKAY;

}

/*****************************************************************/
/*****************************************************************/
static BYTE enableSICOFI_FiltersChannelB()
{
```

```
int i;
BYTE SicofiCommand;
BYTE badLoadFlag;
BYTE readBuf[10];
BYTE writeBuf[10];

   /* WRITE A CR1 COMMAND - TO CHANNEL B*/
   SicofiCommand = setSOP(SICOFI_CHANNEL_B,
                          SICOFI_WRITE,

                          POWER_UP,NIL,CR1_Len);

  writeBuf[0] = setCR1(ENABLE_FILTER,
                       ENABLE_FILTER,
                       ENABLE_FILTER,
                       ENABLE_FILTER,
                       ENABLE_FILTER,
                       ENABLE_FILTER,
                       SBX_INPUT_SEL, uLAW);

   sendRTSicofiCommand(lceHandler /* ORIGINATOR */
                       ,SicofiCommand
                       ,writeBuf);

   for (i=0;i<1000;i++) if (getRTSicofiStat() == OKAY) break;

   /* VERIFY SICOFI CR1 */
   SicofiCommand = setSOP(SICOFI_CHANNEL_B,
                          SICOFI_READ,
                          POWER_UP,NIL,CR1_Len);

   for (i=0;i<1000;i++) if (requestRTSicofiStatus(lceHandler
                           ,SicofiCommand) != BUSY) break;

   for(i=0;i<100;i++) if ( getRTSicofiStatus(lceHandler, /* ORIGINATOR */
                              readBuf) == OKAY) break;
#ifdef TEST_DEBUG
printf("Enable SICOFI Chan B - done\n");
#endif

    for(badLoadFlag=FALSE,i=0;i<1;i++)
       if (readBuf[i+1] != writeBuf[i])
      {
      badLoadFlag = TRUE;
      break;
      }

    if (badLoadFlag == FALSE)
       return OKAY;
    else return NOT_OKAY;
}

/******************************************************************/
/******************************************************************/
static BYTE loadSICOFI_CoefFilterB1ChannelA()
{
int i;
BYTE SicofiCommand;
BYTE badLoadFlag;
BYTE readBuf[10];
BYTE writeBuf[10];

    /* WRITE A CR1 COMMAND - TO CHANNEL A */
    SicofiCommand = setCOP(SICOFI_CHANNEL_A,
```

```
                         SICOFI_WRITE,
                         getCOP_code(B_FILTER_1));

   writeBuf[0] = 0x02;
   writeBuf[1] = 0xf4;
   writeBuf[2] = 0x22;
   writeBuf[3] = 0x82;
   writeBuf[4] = 0x12;
   writeBuf[5] = 0x30;
   writeBuf[6] = 0x91;
   writeBuf[7] = 0xbd;

   sendRTSicofiCommand(lceHandler /* ORIGINATOR */
                      ,SicofiCommand
                      ,writeBuf);

   for (i=0;i<1000;i++) if (getRTSicofiStat() == OKAY) break;

   /* VERIFY SICOFI COP */
   SicofiCommand = setCOP(SICOFI_CHANNEL_A,
                         SICOFI_READ,
                         getCOP_code(B_FILTER_1));

   for (i=0;i<1000;i++) if (requestRTSicofiStatus(lceHandler
                          ,SicofiCommand) != BUSY) break;

   for(i=0;i<100;i++) if ( getRTSicofiStatus(lceHandler, /* ORIGINATOR */
                             readBuf) == OKAY) break;
#ifdef TEST_DEBUG
printf("load SICOFI coef Filter B1 Chan A - done\n");
#endif

    for(badLoadFlag=FALSE,i=0;i<8;i++)
       if (readBuf[i+1] != writeBuf[i])
      {
      badLoadFlag = TRUE;
      break;
      }

    if (badLoadFlag == FALSE)
       return OKAY;
    else return NOT_OKAY;

}

/*****************************************************************/
/*****************************************************************/
static BYTE loadSICOFI_CoefFilterB2ChannelA()
{
int i;
BYTE SicofiCommand;
BYTE badLoadFlag;
BYTE readBuf[10];
BYTE writeBuf[10];

   clearPendingRTInterrupts();

   /* WRITE A CR1 COMMAND - TO CHANNEL A */
   SicofiCommand = setCOP(SICOFI_CHANNEL_A,
                         SICOFI_WRITE,
                         getCOP_code(B_FILTER_2));

   writeBuf[0] = 0x00;
   writeBuf[1] = 0x11;
   writeBuf[2] = 0x8b;
   writeBuf[3] = 0x11;
```

```
   writeBuf[4] = 0x00;
   writeBuf[5] = 0x84;
   writeBuf[6] = 0xba;
   writeBuf[7] = 0xb8;

   sendRTSicofiCommand(lceHandler /* ORIGINATOR */
                       ,SicofiCommand
                       ,writeBuf);

   for (i=0;i<1000;i++) if (getRTSicofiStat() == OKAY) break;

   /* VERIFY SICOFI COP */
   SicofiCommand = setCOP(SICOFI_CHANNEL_A,
                          SICOFI_READ,
                          getCOP_code(B_FILTER_2));

   for (i=0;i<1000;i++) if (requestRTSicofiStatus(lceHandler
                          ,SicofiCommand) != BUSY) break;

   for(i=0;i<100;i++) if ( getRTSicofiStatus(lceHandler, /* ORIGINATOR */
                              readBuf) == OKAY) break;

#ifdef TEST_DEBUG
printf("load SICOFI coef Filter B2 Chan A - done\n");
#endif

    for(badLoadFlag=FALSE,i=0;i<8;i++)
       if (readBuf[i+1] != writeBuf[i])
     {
     badLoadFlag = TRUE;
     break;
     }

    if (badLoadFlag == FALSE)

       return OKAY;
    else return NOT_OKAY;
}

/*****************************************************************/
/*****************************************************************/
static BYTE loadSICOFI_CoefFilterZchannelA()
{
int i;
BYTE SicofiCommand;
BYTE badLoadFlag;
BYTE readBuf[10];
BYTE writeBuf[10];

   clearPendingRTInterrupts();

   /* WRITE A CR1 COMMAND - TO CHANNEL A */
   SicofiCommand = setCOP(SICOFI_CHANNEL_A,
                          SICOFI_WRITE,
                          getCOP_code(Z_FILTER));

    writeBuf[0] = 0xf0;
    writeBuf[1] = 0x24;
    writeBuf[2] = 0x27;
    writeBuf[3] = 0x62;
    writeBuf[4] = 0x3b;
    writeBuf[5] = 0x97;
    writeBuf[6] = 0xd1;
    writeBuf[7] = 0x26;
```

```
 sendRTSicofiCommand(lceHandler /* ORIGINATOR */
                    ,SicofiCommand
                    ,writeBuf);

   for (i=0;i<1000;i++) if (getRTSicofiStat() == OKAY) break;

   /* VERIFY SICOFI COP */
   SicofiCommand = setCOP(SICOFI_CHANNEL_A,
                          SICOFI_READ,
                          getCOP_code(Z_FILTER));

   for (i=0;i<1000;i++) if (requestRTSicofiStatus(lceHandler
                          ,SicofiCommand) != BUSY) break;

   for(i=0;i<100;i++) if ( getRTSicofiStatus(lceHandler, /* ORIGINATOR */
                              readBuf) == OKAY) break;
#ifdef TEST_DEBUG
printf("load SICOFI coef Filter Z Chan A - done\n");
#endif

    for(badLoadFlag=FALSE,i=0;i<8;i++)
       if (readBuf[i+1] != writeBuf[i])
      {
      badLoadFlag = TRUE;
      break;
      }

    if (badLoadFlag == FALSE)
       return OKAY;

         else return NOT_OKAY;
      }


/*****************************************************************/
/*****************************************************************/
static BYTE loadSICOFI_CoefFilterBdelayChA()
{
int i;
BYTE SicofiCommand;
BYTE badLoadFlag;
BYTE readBuf[10];
BYTE writeBuf[10];

   clearPendingRTInterrupts();

   /* WRITE A CR1 COMMAND - TO CHANNEL A */
   SicofiCommand = setCOP(SICOFI_CHANNEL_A,
                          SICOFI_WRITE,
                          getCOP_code(B_FILTER_DELAY ));

    writeBuf[0] = 0x19;
    writeBuf[1] = 0x19;
    writeBuf[2] = 0x11;
    writeBuf[3] = 0x19;

    sendRTSicofiCommand(lceHandler /* ORIGINATOR */
                       ,SicofiCommand
                       ,writeBuf);

   for (i=0;i<1000;i++) if (getRTSicofiStat() == OKAY) break;

   /* VERIFY SICOFI COP */
   SicofiCommand = setCOP(SICOFI_CHANNEL_A,
                          SICOFI_READ,
                          getCOP_code(B_FILTER_DELAY));
```

```
   for (i=0;i<1000;i++) if (requestRTSicofiStatus(lceHandler
                            ,SicofiCommand) != BUSY) break;

   for(i=0;i<100;i++) if ( getRTSicofiStatus(lceHandler, /* ORIGINATOR */
                                 readBuf) == OKAY) break;
#ifdef TEST_DEBUG
printf("load SICOFI coef Filter B delay Chan A - done\n");
#endif

    for(badLoadFlag=FALSE,i=0;i<4;i++)
       if (readBuf[i+1] != writeBuf[i])
     {
     badLoadFlag = TRUE;
     break;
     }

    if (badLoadFlag == FALSE)
       return OKAY;
    else return NOT_OKAY;
}

/*****************************************************************/
/*                 loadSICOFI_CoefFilterXchannelA()              */
/*****************************************************************/
static BYTE loadSICOFI_CoefFilterXchannelA()
{
int i;
BYTE SicofiCommand;
BYTE badLoadFlag;
BYTE readBuf[10];
BYTE writeBuf[10];

   clearPendingRTInterrupts();

   /* WRITE A CR1 COMMAND - TO CHANNEL A */
   SicofiCommand = setCOP(SICOFI_CHANNEL_A,
                          SICOFI_WRITE,
                          getCOP_code(X_FILTER));

    writeBuf[0] = 0x40;
    writeBuf[1] = 0x1c;
    writeBuf[2] = 0xa7;
    writeBuf[3] = 0x42;
    writeBuf[4] = 0x1e;
    writeBuf[5] = 0xc5;
    writeBuf[6] = 0x04;
    writeBuf[7] = 0x24;

    sendRTSicofiCommand(lceHandler /* ORIGINATOR */
                        ,SicofiCommand
                        ,writeBuf);

   for (i=0;i<1000;i++) if (getRTSicofiStat() == OKAY) break;

   /* VERIFY SICOFI COP */
   SicofiCommand = setCOP(SICOFI_CHANNEL_A,
                          SICOFI_READ,
                          getCOP_code(X_FILTER));

   for (i=0;i<1000;i++) if (requestRTSicofiStatus(lceHandler
                            ,SicofiCommand) != BUSY) break;

   for(i=0;i<100;i++) if ( getRTSicofiStatus(lceHandler, /* ORIGINATOR */
                                 readBuf) == OKAY) break;
#ifdef TEST_DEBUG
printf("load SICOFI coef Filter X delay Chan A - done\n");
#endif
```

```
for(badLoadFlag=FALSE,i=0;i<8;i++)
   if (readBuf[i+1] != writeBuf[i])
 {
 badLoadFlag = TRUE;
 break;
 }

 if (badLoadFlag == FALSE)

       return OKAY;
    else return NOT_OKAY;
}
/*****************************************************************/
/*****************************************************************/
static BYTE loadSICOFI_CoefFilterRchannelA()
{
int i;
BYTE SicofiCommand;
BYTE badLoadFlag;
BYTE readBuf[10];
BYTE writeBuf[10];

   /* WRITE A CR1 COMMAND - TO CHANNEL A */
   SicofiCommand = setCOP(SICOFI_CHANNEL_A,
                          SICOFI_WRITE,
                          getCOP_code(R_FILTER));

    writeBuf[0] = 0x40;
    writeBuf[1] = 0x1b;
    writeBuf[2] = 0x97;
    writeBuf[3] = 0x42;
    writeBuf[4] = 0x7b;
    writeBuf[5] = 0xd6;
    writeBuf[6] = 0x04;
    writeBuf[7] = 0xbb;

    sendRTSicofiCommand(lceHandler /* ORIGINATOR */
                       ,SicofiCommand
                       ,writeBuf);

   for (i=0;i<1000;i++) if (getRTSicofiStat() == OKAY) break;

   /* VERIFY SICOFI COP */
   SicofiCommand = setCOP(SICOFI_CHANNEL_A,
                          SICOFI_READ,
                          getCOP_code(R_FILTER));

   for (i=0;i<1000;i++) if (requestRTSicofiStatus(lceHandler
                           ,SicofiCommand) != BUSY) break;

   for(i=0;i<100;i++) if ( getRTSicofiStatus(lceHandler, /* ORIGINATOR */
                                readBuf) == OKAY) break;
#ifdef TEST_DEBUG
printf("load SICOFI coef Filter R  Chan A - done\n");
#endif

    for(badLoadFlag=FALSE,i=0;i<8;i++)
       if (readBuf[i+1] != writeBuf[i])
     {
     badLoadFlag = TRUE;
     break;
     }

    if (badLoadFlag == FALSE)
       return OKAY;
    else return NOT_OKAY;
 }
```

```
/****************************************************************/
/****************************************************************/
static BYTE loadSICOFI_CoefFilterGXchannelA()
{
int i;
BYTE SicofiCommand;
BYTE badLoadFlag;
BYTE readBuf[10];
BYTE writeBuf[10];

   /* WRITE A CR1 COMMAND - TO CHANNEL A */
   SicofiCommand = setCOP(SICOFI_CHANNEL_A,
                          SICOFI_WRITE,
                          getCOP_code(GX_FILTER));

    writeBuf[0] = 0xc0;
    writeBuf[1] = 0x2b;
    writeBuf[2] = 0x20;
    writeBuf[3] = 0x23;

    sendRTSicofiCommand(lceHandler /* ORIGINATOR */
                       ,SicofiCommand
                       ,writeBuf);

   for (i=0;i<1000;i++) if (getRTSicofiStat() == OKAY) break;

   /* VERIFY SICOFI COP */
   SicofiCommand = setCOP(SICOFI_CHANNEL_A,
                          SICOFI_READ,
                          getCOP_code(GX_FILTER));

   for (i=0;i<1000;i++) if (requestRTSicofiStatus(lceHandler
                            ,SicofiCommand) != BUSY) break;

   for(i=0;i<100;i++) if ( getRTSicofiStatus(lceHandler, /* ORIGINATOR */
                                    readBuf) == OKAY) break;
#ifdef TEST_DEBUG
printf("load SICOFI coef Filter GX Chan A - done\n");
#endif

    for(badLoadFlag=FALSE,i=0;i<4;i++)
       if (readBuf[i+1] != writeBuf[i])
     {
     badLoadFlag = TRUE;
     break;
     }

    if (badLoadFlag == FALSE)
       return OKAY;
    else return NOT_OKAY;
}

/****************************************************************/
/*                 init RT Emulator                              */
/****************************************************************/
BYTE initRTemulator()
{
BYTE badLoadFlag;
int badCount;
int i;

   setRTInterrupts(ALL_ICC_INTERRUPTS_OFF);
   clearPendingRTInterrupts();

   setRTInterrupts(SIN_INTERRUPT_MASK);
```

```
badCount=0;
initSICOFIchannelA();
initSICOFIchannelB();

for (i=0,badLoadFlag=TRUE;i<1000;i++) {
   if (enableSICOFI_FiltersChannelA() == OKAY)
  {
  badLoadFlag = FALSE;
  break;
  }
   }
for (i=0,badLoadFlag=TRUE;i<1000;i++) {
   if (enableSICOFI_FiltersChannelB() == OKAY)
  {
  badLoadFlag = FALSE;
  break;
  }
   }
for (i=0,badLoadFlag=TRUE;i<1000;i++) {
   if (loadSICOFI_CoefFilterB1ChannelA() == OKAY)
  {
  badLoadFlag = FALSE;
  break;
  }
   }
for (i=0,badLoadFlag=TRUE;i<1000;i++) {
   if (loadSICOFI_CoefFilterB2ChannelA() == OKAY)
  {
  badLoadFlag = FALSE;
  break;
  }
   }
for (i=0,badLoadFlag=TRUE;i<1000;i++) {
   if (loadSICOFI_CoefFilterZchannelA() == OKAY)
  {
  badLoadFlag = FALSE;
  break;
  }
   }
for (i=0,badLoadFlag=TRUE;i<1000;i++) {
   if (loadSICOFI_CoefFilterBdelayChA() == OKAY)
{
badLoadFlag = FALSE;
break;
}
   }
for (i=0,badLoadFlag=TRUE;i<1000;i++) {
   if (loadSICOFI_CoefFilterXchannelA() == OKAY)
{
badLoadFlag = FALSE;
break;
}
   }
for (i=0,badLoadFlag=TRUE;i<1000;i++) {
   if (loadSICOFI_CoefFilterRchannelA() == OKAY)
{
badLoadFlag = FALSE;
break;
}
   }
for (i=0,badLoadFlag=TRUE;i<1000;i++) {
   if (loadSICOFI_CoefFilterGXchannelA() == OKAY)
{
badLoadFlag = FALSE;
break;
}
   }
```

```
   setRTInterrupts(ALL_ICC_INTERRUPTS_OFF);
   clearPendingRTInterrupts();

   if (badLoadFlag == FALSE)
      return OKAY;
   else return NOT_OKAY;
}

### rth\rthand.sm ###


%[
#define TEST_DEBUG 1

/*

$Workfile$
$Revision$
$Date$

$Log$

*/

static char *vscId="$Header$ (c) 1990, Raychem Corp";

/*----------------------------------------------------------------------*
 *                    RAYCHEM Corp. / Telecommunications                  *
 *                                                                        *
 *        File: RThandler.sm                                              *
 *     Created: September 5, 1990                                         *
 * Tools used: Microsoft C compiler v. 5.00                              *
 *             Turbo Debugger versions 2.0                               *
 *                                                                        *
 * Description:                                                           *
 *                                                                        *
 *                                                                        *
 * Compilation procedure:                                                 *
 *   sysMgr.SM  is the control source for sysMgr.c                        *
 *   The SMC (State Machine Compiler) takes .SM and creates .C            *
 *   example:  smc < PollHnd.SM > PollHnd.C                               *
 *                                                                        *
 * Modification History:                                                  *
 *  8/15/90 BCH: First Version                                            *
 *  8/27/90 BCH: Added link check during LINKED state.                    *
 -----------------------------------------------------------------------*/

#       include "rts.h"
#       include "DAMLlit.h"
#       include "DAMLmsg.h"
#       include "DAMLcnf.h"
#       include "rte.h"

extern QUEUE_T *SaveQueue;

]%

stateMachines = { rteHandler };

smDataTypeDef %[
                  unsigned someData;
                  unsigned moreData;
]%                                        SMX_DATA_T;

states = {        IDLE_STATE,
             WAIT_DR_STATE,
```

```
            WAIT_AR_STATE,
                 WAIT_AI_STATE,
                 LINKED_STATE
        };


messages = {SM_INITIALIZE,
            connect_emulator_m,
            disconnect_emulator_m,
       delay_over_m,
       test_delay_m
       };

transProcs = {powerOn,
              functionA,
              functionB,
              functionC,
              functionD,
              functionE,
              functionF,
         ignoreMsg
              };

transitions = {  IDLE_STATE { SM_INITIALIZE  , powerOn
                             ,connect_emulator_m, functionA
                             ,disconnect_emulator_m, functionF
                             ,delay_over_m, ignoreMsg
                        ,test_delay_m, ignoreMsg
                        }
             WAIT_DR_STATE {  SM_INITIALIZE , powerOn
                             ,connect_emulator_m, ignoreMsg
                        ,disconnect_emulator_m, functionF
                             ,delay_over_m, functionB
                        ,test_delay_m, ignoreMsg
                            }
             WAIT_AR_STATE {  SM_INITIALIZE , powerOn
                             ,connect_emulator_m, ignoreMsg
                        ,disconnect_emulator_m, functionF
                        ,delay_over_m, functionC
                        ,test_delay_m, ignoreMsg
                            }
                  WAIT_AI_STATE {  SM_INITIALIZE , powerOn
                             ,connect_emulator_m, ignoreMsg
                        ,disconnect_emulator_m, functionF
                        ,delay_over_m, functionD
                        ,test_delay_m, ignoreMsg
                            }
                  LINKED_STATE {  SM_INITIALIZE , powerOn
                             ,connect_emulator_m, ignoreMsg
                        ,disconnect_emulator_m, functionF
                        ,delay_over_m, functionE
                        ,test_delay_m, ignoreMsg
                            }
                   } ;

%[

/*****************************************************************/
/*                   External Declarations                       */
/*****************************************************************/

/*****************************************************************/
/*                   CONSTANT Declarations                       */
/*****************************************************************/
```

```
/*****************************************************************/
/*                      Local Variables                          */
/*****************************************************************/

SM_NAME_T actionRequestor;
int retryCounter;
TIMER_MSG_T *rtTimerMsg;
TIMER_MSG_T *rtTimerMsg2;

/*****************************************************************/
/*                      Local Procedures                         */
/*****************************************************************/
static void beginTimer(time)
unsigned time;
{
   rtTimerMsg = startTimer(delay_over_m, time);

}   /* END beginPollTimer */


static void beginTimer2(time)
unsigned long time;
{
   rtTimerMsg2 = startTimer(test_delay_m, time);

}   /* END beginTestTimer */


/*****************************************************************/
/*                      replyWithMsg                             */
/*****************************************************************/
static void replyWithMsg(result)
unsigned result;
{
RESPONSE_MSG_T *out_msg;

   out_msg = (RESPONSE_MSG_T *) msgAlloc (sizeof(RESPONSE_MSG_T)
                                         - sizeof(MSG_T));

   out_msg->msgHdr.fields.name = done_m;
   out_msg->msgHdr.fields.dest = actionRequestor;
   out_msg->msgHdr.fields.origin = rteHandler;
   out_msg->msgHdr.fields.priority = HARDWARE_PRIORITY;
   out_msg->response = result;

   sendMsg ((MSG_T *) out_msg);
}

/*****************************************************************/
/*                      giveUpConnection                         */
/*****************************************************************/
static void giveUpConnection()
{
   RTSicofiSignallingOutput(DSL_RELAY,LOW);   /* CONNECT to DSL */
   replyWithMsg(NOT_OKAY);
}
```

```
/************************************************************************/
/*                    Transition procedures                             */
/************************************************************************/

static SM_STATE_T powerOn  (msg, self)
MSG_T *msg;
SM_DESCRIPTOR_T *self;
{

#ifdef TEST_DEBUG
   printf("RT Handler Executed Power On\n");
#endif

   return(IDLE_STATE);
};

/************************************************************************/
/*                    Function A                                        */
/************************************************************************/

static SM_STATE_T functionA(msg, self)  /* connect_emulator_m */
MSG_T *msg;
SM_DESCRIPTOR_T *self;
{
#ifdef TEST_DEBUG
   printf("RTH:Function A - connect emulator received\n");
#endif

   actionRequestor = msg->fields.origin;   /* RECORD REQUESTOR */

   RTSicofiSignallingOutput(DSL_RELAY,HIGH);   /* CONNECT to DSL */

   if (initRTemulator() == OKAY)
     {
      /* begin IECQ linking */
      writeRT_IECQ(IECQ_RES);
      beginTimer(10000);   /* 10 SECONDS */
      retryCounter = 0;   /* KEEP COUNT OF UNSUCCESSFULL RETRIES */
      return( WAIT_DR_STATE );
      }
   else
      {
      giveUpConnection();
      return(IDLE_STATE);
      }
};

/************************************************************************/
/*                    Function B                                        */
/************************************************************************/

static SM_STATE_T functionB(msg, self)  /* delay_over_m_m */
MSG_T *msg;
SM_DESCRIPTOR_T *self;
{
BYTE IECQ_value;
/*
   delay over waiting for DR code. Check if arrived,
*/
#ifdef TEST_DEBUG
   printf("RTH:Fnt B - delay over received\n");
#endif

   IECQ_value = readRT_IECQ();
```

```
  if (IECQ_value == IECQ_DR)
     {
     writeRT_IECQ(IECQ_DI);
     beginTimer(500);
     return( WAIT_AR_STATE);
     }
  else
     {
     /* DR DID NOT RESPOND WITHIN ALLOWED TIME */
     retryCounter++;
     if (retryCounter > MAX_RT_CONNECTION_RETRIES)
         {
         /* GIVE UP */
    giveUpConnection();
    return( IDLE_STATE );
         }
       else
         {
         /* KEEP TRYING */
    writeRT_IECQ(IECQ_RES);
    beginTimer(500);
    return( WAIT_DR_STATE );
         }   /* END ELSE */
      }   /* END ERROR PROCESSING */


};

/******************************************************************/
/*                    Function C                                  */
/******************************************************************/

static SM_STATE_T functionC(msg, self)  /* delay_over_m */
MSG_T *msg;
SM_DESCRIPTOR_T *self;
{
BYTE IECQ_value;
/*
   delay over waiting for AR code. Check if arrived,
*/
#ifdef TEST_DEBUG
   printf("RTH:Fnt C - delay over received\n");
#endif

   IECQ_value = readRT_IECQ();

   if (IECQ_value == IECQ_AR)
      {
      writeRT_IECQ(IECQ_AI);
      beginTimer(500);
      return( WAIT_AI_STATE);
      }
   else
      {
      /* DR DID NOT RESPOND WITHIN ALLOWED TIME */
      retryCounter++;
      if (retryCounter > MAX_RT_CONNECTION_RETRIES)
         {
         /* GIVE UP */
    giveUpConnection();
         return( IDLE_STATE );
         }
       else
         {
         /* KEEP TRYING */
```

```
   writeRT_IECQ(IECQ_RES);
   beginTimer(500);
   return( WAIT_DR_STATE );
        }   /* END ELSE */
     }   /* END ERROR PROCESSING */

};   /* END FunctionC */

/*********************************************************************/
/*                     Function D                                    */
/*********************************************************************/

static SM_STATE_T functionD(msg, self)  /* delay_over_m */
MSG_T *msg;
SM_DESCRIPTOR_T *self;
{
BYTE IECQ_value;
/*
   delay over waiting for AI code. Check if arrived,
*/
#ifdef TEST_DEBUG
   printf("RTH:Fnt D - delay over received\n");
#endif

   IECQ_value = readRT_IECQ();

   if (IECQ_value == IECQ_AR)
      {
      writeRT_IECQ(IECQ_AI);
      beginTimer(500);
      return( LINKED_STATE);
      }
   else
      {
      /* DR DID NOT RESPOND WITHIN ALLOWED TIME */
      retryCounter++;
      if (retryCounter > MAX_RT_CONNECTION_RETRIES)
         {
         /* GIVE UP */
    giveUpConnection();
         return( IDLE_STATE );
         }
       else
         {
         /* KEEP TRYING */
    writeRT_IECQ(IECQ_RES);
    beginTimer(500);
    return( WAIT_DR_STATE );
         }   /* END ELSE */
      }   /* END ERROR PROCESSING */

};

/*********************************************************************/
/*                     Function E                                    */
/*********************************************************************/

static SM_STATE_T functionE(msg, self)  /* delay_over_m */
MSG_T *msg;
SM_DESCRIPTOR_T *self;
{
/*
   check that link is still good.
*/
```

```
BASIC_MSG_T *outMsg;
BYTE IECQ_value;

#ifdef TEST_DEBUG
   printf("RTH:Fnt E - delay over checking link \n");
#endif

   IECQ_value = readRT_IECQ();

   if (IECQ_value == IECQ_AI)
      {
      beginTimer(500);   /* keep checking link every 500 mSec. */
      return( LINKED_STATE);
      }
   else
      {
      /* Link lost acknowledge and quit */
      RTSicofiSignallingOutput(DSL_RELAY,LOW);   /* DESELECT DSL */
      outMsg = (BASIC_MSG_T *) msgAlloc (sizeof(BASIC_MSG_T)
                                         - sizeof(MSG_T));
      outMsg->msgHdr.fields.name = rte_lost_link_m;
      outMsg->msgHdr.fields.dest = actionRequestor;
      outMsg->msgHdr.fields.origin = rteHandler;
      outMsg->msgHdr.fields.priority = HARDWARE_PRIORITY;

      sendMsg ((MSG_T *) outMsg);
      return(IDLE_STATE);
      }
};


/*****************************************************************/
/*                    Function F                                 */
/*****************************************************************/

static SM_STATE_T functionF(msg, self)  /* delay_over_m */
MSG_T *msg;
SM_DESCRIPTOR_T *self;
{
/*
   disconnect the link by powering down the unit.
*/
#ifdef TEST_DEBUG
   printf("RTH:Fnt F - disconnect emulator \n");
#endif

   RTSicofiSignallingOutput(DSL_RELAY,LOW);   /* DESELECT DSL */
   cancelTimer(rtTimerMsg);

   return(IDLE_STATE);

};


]%

### rth\rthtst.c ###

#define TEST 1

#include "DAMLlit.h"
#include "LCe.h"
```

```
/* ***********************************************************************
 *                           MAIN PROCEDURE
 ***********************************************************************
*/
void main()
{

extern void interrupt far LC_SICOFI_Interrupts ();

BYTE SicofiCommand;
BYTE result;
static BYTE WriteBuf[10];   /* TO CONTAIN CR1,...,CR3 and COP's COEFF's. */
static BYTE readBuf[10];
BYTE cr1Value;
BYTE cr2Value;
BYTE cr3Value;
int i;
long int j=0;
long int k=0;
int count;

   disableInterrupts();

   init_LC_ICC();
   interruptsInit();
   setHandler(0x01,LC_SICOFI_Interrupts);
   interruptsStart();

   setLCInterrupts(SIN_INTERRUPT_MASK);

/* RESET & POWER UP SICOFI - CHANNEL A */
/* *********************************************************************** */
   SicofiCommand = setSOP(SICOFI_CHANNEL_A,
                          SICOFI_WRITE,
                          POWER_UP,
                          RESET_SICOFI,0);

    sendLCSicofiCommand(1 /* ORIGINATOR */
                             ,SicofiCommand
                             ,WriteBuf);

   for (i=0;i<1000;i++) if (getLCSicofiStat() == OKAY) break;


/* RESET & POWER UP SICOFI - CHANNEL B */
/* *********************************************************************** */
   SicofiCommand = setSOP(SICOFI_CHANNEL_B,
                          SICOFI_WRITE,

                         POWER_UP,RESET_SICOFI,0);

    sendLCSicofiCommand(1 /* ORIGINATOR */
                             ,SicofiCommand
                             ,WriteBuf);

   for (i=0;i<1000;i++) if (getLCSicofiStat() == OKAY) break;

/* *********************************************************************** */
 /* WRITE A CR1 COMMAND - TO CHANNEL A*/
/* ???? REMEMBER TO CONFIGURE SICOFI SBx to OUTPUT */

   SicofiCommand = setSOP(SICOFI_CHANNEL_A,
                          SICOFI_WRITE,
                          POWER_UP,NIL,CR1_Len);
```

```
  WriteBuf[0] = setCR1(DISABLE_FILTER,
                       DISABLE_FILTER,
                       DISABLE_FILTER,
                       DISABLE_FILTER,
                       DISABLE_FILTER,
                       DISABLE_FILTER,
                       SBX_OUTPUT_SEL, NIL);

   sendLCSicofiCommand(1 /* ORIGINATOR */
                             ,SicofiCommand
                             ,WriteBuf);

  for (i=0;i<1000;i++) if (getLCSicofiStat() == OKAY) break;

/* ****************************************************************** */
 /* WRITE A CR1 COMMAND TO CHANNEL B */

  SicofiCommand = setSOP(SICOFI_CHANNEL_B,
                         SICOFI_WRITE,
                         POWER_UP,NIL,CR1_Len);

  WriteBuf[0] = setCR1(DISABLE_FILTER,
                       DISABLE_FILTER,
                       DISABLE_FILTER,
                       DISABLE_FILTER,
                       DISABLE_FILTER,
                       DISABLE_FILTER,
                       SBX_OUTPUT_SEL, NIL);

   sendLCSicofiCommand(1 /* ORIGINATOR */
                             ,SicofiCommand
                             ,WriteBuf);

  for (i=0;i<1000;i++) if (getLCSicofiStat() == OKAY) break;


  /* NOW - TEST SIGNALLING PORTS */
/* ****************************************************************** */

/*    LCSicofiSignallingOutput(VOICE_CHANNEL_SELECT,HIGH);
  LCSicofiSignallingOutput(VOICE_CHANNEL_SELECT,LOW);

  LCSicofiSignallingOutput(LC_OUTPUT_SELECT,HIGH);
  LCSicofiSignallingOutput(LC_OUTPUT_SELECT,LOW);

/*
  LCSicofiSignallingOutput(_5mA_GENERATOR,HIGH);

/* LCSicofiSignallingOutput(_5mA_GENERATOR,LOW);
*/

  LCSicofiSignallingOutput(_45mA_GENERATOR,HIGH);
  LCSicofiSignallingOutput(_45mA_GENERATOR,LOW);

  LCSicofiSignallingOutput(AUTO_CUTOFF_OVRD,HIGH);
  LcSicofiSignallingOutput(AUTO_CUTOFF_OVRD,LOW);

 }   /* END MAIN */
```

```
### sys\sysmgr.sm ###

%[

/*-----------------------------------------------------------------------*
 *                    RAYCHEM Corp. / Telecommunications                  *
 *                                                                        *
 *       File: sysMgr.sm / sysMgr.c                                       *
 *    Created: July 19, 1990                                              *
 * Tools used: Microsoft C compiler v. 5.00                               *
 *             Turbo Debugger versions 1.01 and 2.0                       *
 *                                                                        *
 * Description:                                                           *
 *                                                                        *
 *                                                                        *
 * Compilation procedure:                                                 *
 *   sysMgr.SM  is the control source for sysMgr.c                        *
 *   The SMC (State Machine Compiler) takes .SM and creates .C            *
 *   example:  smc < PollHnd.SM > PollHnd.C                               *
 *                                                                        *
 * Modification History:                                                  *
 *   7/19/90  BCH: First Version                                          *
 -------------------------------------------------------------------------*/

#       include "rts.h"
#       include "DAMLlit.h"
#       include "DAMLmsg.h"
#       include "DAMLcnf.h"


extern QUEUE_T *SaveQueue;

]%

stateMachines = { systemMgr};

smDataTypeDef %[
                    unsigned someData;
                    unsigned moreData;
]%                                            SMX_DATA_T;

states = {          IDLE_STATE,
                    POLLING_STATE};


messages = {        SM_INITIALIZE
                   };

transProcs = {     powerOn
                   };

transitions = {   IDLE_STATE {  SM_INITIALIZE  , powerOn
                             }

                  POLLING_STATE {  SM_INITIALIZE , powerOn
                                }
 } ;
%[
#define TEST_DEBUG   1

/***********************************************************************/
/*                      External Declarations                          */
/***********************************************************************/
extern void sendNormalMessage(SM_NAME_T origin,
                              SM_NAME_T destin,
                              MSG_NAME_T msgName,
```

```
                          WORD info1,
                          WORD info2,
                          WORD info3,
                          WORD info4, QUEUE_PRIORITY_T priority);

extern void sendBasicMessage(SM_NAME_T origin,
                          SM_NAME_T destin,
                          MSG_NAME_T msgName, WORD info1);

/****************************************************************/
/*                  Local Variables                             */
/****************************************************************/


WORD pollingTimeValue;
BYTE nextSCtoPoll;
TIMER_MSG_T *pollTimerMsg;

/****************************************************************/
/*                  Local Procedures                            */
/****************************************************************/

/****************************************************************/
/*                  Transition procedures                       */
/****************************************************************/

static SM_STATE_T powerOn  (msg, self)
MSG_T *msg;
SM_DESCRIPTOR_T *self;
{

#ifdef TEST_DEBUG
   printf("Poll Handler Executed Power On\n");
#endif

   sendBasicMessage( systemMgr,
                     statusPollHandler,
                     go_m, NULL);

   return(IDLE_STATE);
};


/****************************************************************/
/*                  Function B                                  */
/****************************************************************/

static SM_STATE_T functionB(msg, self)  /* go_m */
MSG_T *msg;
SM_DESCRIPTOR_T *self;
{

#ifdef TEST_DEBUG
   printf("go message received\n");
   showMsg(msg);
#endif

   nextSCtoPoll = 1;   /* SC numbers are from 1 to MAX_NUMBER_OF_SC */
   requestStatusSC(nextSCtoPoll);
   beginPollTimer();

   return( POLLING_STATE );
};

]%
```

```
### utl\damlutil.c ###

/*

$Workfile:   damlutil.c  $
$Revision:   1.0  $
$Date:   31 Aug 1990 18:19:26  $

$Log:   E:/USR/DAML/APPC/UTL/VCS/DAMLUTIL.C_V  $
 *
 *    Rev 1.0   31 Aug 1990 18:19:26   bChen
 * Initial revision.

*/


static char *vscId="$Header:   E:/USR/DAML/APPC/UTL/VCS/DAMLUTIL.C_V   1.0

/*--------------------------------------------------------------------*
 *                  RAYCHEM Corp. / Telecommunications                *
 *                                                                    *
 *       File: DAMLutil.c                                             *
 *    Created: July 19, 1990                                          *
 * Tools used: Microsoft C compiler v. 5.00                           *
 *                                                                    *
 * Description:                                                       *
 *                                                                    *
 *                                                                    *
 * Compilation procedure:                                             *
 *   PollHnd.SM is the control source for PollHnd.C                   *
 *   The SMC (State Machine Compiler) takes .SM and creates .C        *
 *   example:  smc < PollHnd.SM > PollHnd.C                           *
 *                                                                    *
 * Modification History:                                              *
 *   7/19/90  BCH: First Version                                      *
 *   8/30/90  BCH: deleted references to infoSize.                    *
 ---------------------------------------------------------------------*/
#       include "rts.h"
#       include "DAMLlit.h"
#       include "DAMLmsg.h"
#       include "DAMLcnf.h"

void sendNormalMessage(origin, destin, msgName,
                       info1, info2, info3, info4, priority)
SM_NAME_T   origin;
SM_NAME_T   destin;
MSG_NAME_T  msgName;
WORD info1;
WORD info2;
WORD info3;
WORD info4;
QUEUE_PRIORITY_T priority;
{
NORMAL_MSG_T *outMsg;

outMsg = (NORMAL_MSG_T *) msgAlloc (sizeof(NORMAL_MSG_T) - sizeof(MSG_T)

outMsg->msgHdr.fields.name = msgName;
outMsg->msgHdr.fields.dest = destin;
outMsg->msgHdr.fields.origin = origin;
outMsg->msgHdr.fields.priority = priority;
outMsg->info1 = info1;
outMsg->info2 = info2;
outMsg->info3 = info3;
outMsg->info4 = info4;
```

```
   sendMsg ((MSG_T *) outMsg);

}   /* END sendNormalMessage*/


void sendBasicMessage(origin, destin, msgName, info1)
SM_NAME_T   origin;
SM_NAME_T   destin;
MSG_NAME_T  msgName;
WORD info1;
{
BASIC_MSG_T *outMsg;

   outMsg = (BASIC_MSG_T *) msgAlloc (sizeof(BASIC_MSG_T) - sizeof(MSG_T));

   outMsg->msgHdr.fields.name = msgName;
   outMsg->msgHdr.fields.dest = destin;
   outMsg->msgHdr.fields.origin = origin;
   outMsg->msgHdr.fields.priority = NORMAL_PRIORITY;
   outMsg->info1 = info1;

   sendMsg ((MSG_T *) outMsg);

}   /* END sendBasicMessage */


### xfd\xfd.h ###

#define HD_XFRMDIS     1


### xfd\xfdtst.c ###

#define DO_ApplProc
#include "DAMLcnf.h"

#define DO_msgTypes
#include "DAMLmsg.h"
main()
{
   rtssRun();
}
### xfd\xfrdis.sm ###
%[
/*-----------------------------------------------------------------------*
 *                   RAYCHEM Corp. / Telecommunications                  *
 *                                                                       *
 *        File: XfrmDis.sm / XfrmDis.c                                   *
 *     Created: July 19, 1990                                            *
 * Tools used: Microsoft C compiler v. 5.00                              *
 *             Turbo Debugger versions 1.01 and 2.0                      *
 *                                                                       *
 * Description:                                                          *
 *                                                                       *
 *                                                                       *
 * Compilation procedure:                                                *
 *   xFrmDis.SM is the control source for xFrmDis.C                      *
 *   The SMC (State Machine Compiler) takes .SM and creates .C           *
 *   example:  smc < PollHnd.SM > PollHnd.C                              *
 *                                                                       *
 * Modification History:                                                 *
 *   7/23/90  BCH: First Version                                         *
 ------------------------------------------------------------------------*/
```

```
#       include "rts.h"
#       include "DAMLlit.h"
#       include "DAMLmsg.h"
#       include "DAMLcnf.h"

extern QUEUE_T *SaveQueue;


]%

stateMachines = { extFrameDistributor};

smDataTypeDef %[
                     unsigned someData;
                     unsigned moreData;
                                                SMX_DATA_T;
]%

states = {           STATE_A,
                     STATE_B };


messages = {         SM_INITIALIZE,
                test_req_m,
                status_req_m,
                coef_rep_m,
                     coef_req_m,
                tty_frame_m,
                ext_frame_rcvd_m};

transProcs = {     powerOn,
                   functionA,
                  functionB,
                  functionC,
                  functionD,
                  functionE,
              functionH,
                  stateError,
                  ignoreMsg };

transitions = {  STATE_A {  SM_INITIALIZE , powerOn
                           ,test_req_m     , functionA
                           ,status_req_m   , functionB
                           ,coef_rep_m     , functionC
                           ,coef_req_m     , functionD
                       ,tty_frame_m    , functionH
                           ,ext_frame_rcvd_m, functionE }

                 STATE_B {  SM_INITIALIZE , powerOn
                           ,test_req_m     , stateError
                           ,status_req_m   , ignoreMsg
                           ,coef_rep_m     , functionC
                           ,coef_req_m     , functionD
                       ,tty_frame_m    , functionH
                           ,ext_frame_rcvd_m, functionE }
 } ;


 %[



 static void showFrameHdr(frHdr)
 FRAME_HDR_T *frHdr;
 {
```

```
unsigned char *dataPtr;
int i;

   i=i;
}


/*****************************************************************/
/*                    Transition procedures                      */
/*****************************************************************/


static SM_STATE_T powerOn  (msg, self)
MSG_T *msg;
SM_DESCRIPTOR_T *self;
{
extern void sim_putinRcvMbox();
extern void xmitMail();
   printf("Executed Power On\n");

/* Not use for test with 8830
      sim_putinRcvMbox();
*/

   return(STATE_A);
};



static SM_STATE_T functionA(msg, self) /* test_req_m */
MSG_T *msg;
SM_DESCRIPTOR_T *self;
{
   printf("test_request_m received\n");
   showFrameHdr(&((FRAME_T *)msg)->frHdr);
   showMsg(msg);

   return( STATE_A);
};


static SM_STATE_T functionB(msg, self)  /* status_req_m */
MSG_T *msg;
SM_DESCRIPTOR_T *self;
{
   printf("status_req_m received\n");
   showMsg(msg);

   return( STATE_A);
};



static SM_STATE_T functionC(msg, self) /* coef_rep_m */
MSG_T *msg;
SM_DESCRIPTOR_T *self;
{
   printf("coef_rep_m received\n");
   showFrameHdr(&((FRAME_T *)msg)->frHdr);
   showMsg(msg);

   return( STATE_A);
};
```

```
static SM_STATE_T functionD(msg, self) /* coef_req_m */
MSG_T *msg;
SM_DESCRIPTOR_T *self;
{
   printf("coef_req_m received\n");


   showFrameHdr(&((FRAME_T *)msg)->frHdr);
   showMsg(msg);

   return( STATE_A);
};




static SM_STATE_T functionE(msg, self) /* ext_frame_rcvd */
FRAME_T *msg;
SM_DESCRIPTOR_T *self;
{

BYTE typeORAddr ;

#ifdef DEBUG
   printf("ext_frame_rcvd received \n");
   showFrameHdr(&((FRAME_T *)msg)->frHdr);
   showMsg(msg);
#endif

   typeORAddr = msg->frHdr.typeOrLCAddr;

   if ( typeORAddr >= 0x80)
      /* FORMAT 7 MSG  */
      {
      switch (typeORAddr)
         {
         case SC_STAT_MSG:
            {
            msg->msgHdr.fields.name = sc_status_report_m;
            msg->msgHdr.fields.dest = statusPollHandler;
            msg->msgHdr.fields.origin = extFrameDistributor;
            msg->msgHdr.fields.priority = NORMAL_PRIORITY;
            sendMsg ((MSG_T *) msg);
            break;
            }
         case SC_MODEL_MSG:
            break;
         }   /* END switch */
      }   /* END else */
/*    else
      FORMAT 8 MSG
      {
      switch (msg->frHdr.data)
         {
         case LC_STAT_MSG:
            break;
         case LC_POWER_UP:
            break;
         case LC_MODEL_MSG:
            break;
         case LC_ERROR_MSG:
            break;

         case LC_COEF_MSG:
            break;
         case LC_TEST_MSG:
            break;
```

```
          case RT_MESSAGE:
             break;
          case RT_MODEL_MSG:
             break;
          case RT_COEF_MSG:
             break;
          }  /* END switch
      }   /* END else
*/
   return( STATE_A);
};


static SM_STATE_T functionH(msg, self)
TTY_FRAME_M *msg;
SM_DESCRIPTOR_T *self;
{
   msg->msgHdr.fields.dest=shellController;
        sendMsg ((MSG_T *) msg);
   return( STATE_A);
};




]%

### b:ctl.sm ###

%[

/*---------------------------------------------------------------------*
 *                    RAYCHEM Corp. / Telecommunications               *
 *                                                                     *
 *       File: PollHnd.sm / PollHnd.c                                  *
 *    Created: July 19, 1990                                           *
 * Tools used: Microsoft C compiler v. 5.00                            *
 *             Turbo Debugger versions 1.01 and 2.0                    *
 *                                                                     *
 * Description:                                                        *
 *    DAML Poll Handler state machine task.  Responsible for issuing   *
 *  status request messages to the Shell Controllers at a programable  *
 *  interval given by pollingTimeValue.                                *
 *    Polls that are not answered are tracked by struct variable,      *
 *  numNoAnswerPoll for each SC and are tagged as LATE_POLL's or       *
 *  INACTIVE.  A poll that is answered arrives as a status report msg  *
 *  this response will reset any LATE_POLL's or INACTIVE status to     *
 *  ACTIVE.                                                            *
 *    Query SC and LC status messages are available to gather various *
 *  SC and LC statuses.  However, at the time of this release, these   *
 *  definitions are not available.                                     *
 *                                                                     *
 * Compilation procedure:                                              *
 *   PollHnd.SM is the control source for PollHnd.C                    *
 *   The SMC (State Machine Compiler) takes .SM and creates .C         *
 *   example:  smc < PollHnd.SM > PollHnd.C                            *
 *                                                                     *
 * Modification History:                                               *
 *   7/19/90  BCH: First Version                                       *
 ---------------------------------------------------------------------*/

#include "rts.h"
#include "DAMLlit.h"
#include "DAMLmsg.h"
#include "syscnf.h"
#include "inp.h"
#include "out.h"
```

```
]%

stateMachines = {channelTesterForLC};

smDataTypeDef %[
                    unsigned someData;
                    unsigned moreData;
                                          SMX_DATA_T;
]%

states = {           IDLE_STATE
                    ,SELECT_LINE_STATE
                    ,TEST_REQUEST_STATE
                    ,ABSORBANT_STATE
                    ,ON_HOOK_STATE
                    ,RINGER_TEST_STATE
                    ,REFLECTIVE_STATE
};

messages = {         SM_INITIALIZE
                    ,start_channel_test_m
                    ,line_connected_m
                    ,test_request_ack_m
                    ,absorbant_connected_m
                    ,absorbant_disconnected_m
                    ,ring_detected_m
                    ,reflective_connected_m
};

transProcs = {   powerOn
                ,functionA
                ,functionB
                ,functionC
                ,functionD
                ,functionE
                ,functionF
                ,functionG
                ,functionH
                ,ignoreMsg
};

transitions = {  IDLE_STATE {
                    SM_INITIALIZE                     ,powerOn
                   ,start_channel_test_m              ,functionA
                   ,line_connected_m                  ,ignoreMsg
                   ,test_requested_m                  ,ignoreMsg
                   ,absorbant_connected_m             ,ignoreMsg
                   ,absorbant_disconnected_m          ,ignoreMsg
                   ,ring_detected_m                   ,ignoreMsg
                   ,reflective_connected_m            ,ignoreMsg
                   ,timeout_m                         ,functionH
                 }

                 SELECT_LINE_STATE {
                    SM_INITIALIZE                     ,powerOn
                   ,start_channel_test_m              ,ignoreMsg
                   ,line_connected_m                  ,functionB
                   ,test_requested_m                  ,ignoreMsg
                   ,absorbant_connected_m             ,ignoreMsg
                   ,absorbant_disconnected_m          ,ignoreMsg
                   ,ring_detected_m                   ,ignoreMsg
                   ,reflective_connected_m            ,ignoreMsg
                   ,timeout_m                         ,functionH
                 }
```

```
TEST_REQUEST_STATE {
   SM_INITIALIZE                      ,powerOn
  ,start_channel_test_m               ,ignoreMsg

  ,line_connected_m                   ,ignoreMsg
  ,test_requested_m                   ,functionC
  ,absorbant_connected_m              ,ignoreMsg
  ,absorbant_disconnected_m           ,ignoreMsg
  ,ring_detected_m                    ,ignoreMsg
  ,reflective_connected_m             ,ignoreMsg
  ,timeout_m                          ,functionH
}

ABSORBANT_STATE {
   SM_INITIALIZE                      ,powerOn
  ,start_channel_test_m               ,ignoreMsg
  ,line_connected_m                   ,ignoreMsg
  ,test_requested_m                   ,ignoreMsg
  ,absorbant_connected_m              ,functionD
  ,absorbant_disconnected_m           ,ignoreMsg
  ,ring_detected_m                    ,ignoreMsg
  ,reflective_connected_m             ,ignoreMsg
  ,timeout_m                          ,functionH
}

ON_HOOK_STATE {
   SM_INITIALIZE                      ,powerOn
  ,start_channel_test_m               ,ignoreMsg
  ,line_connected_m                   ,ignoreMsg
  ,test_requested_m                   ,ignoreMsg
  ,absorbant_connected_m              ,ignoreMsg
  ,absorbant_disconnected_m           ,functionE
  ,ring_detected_m                    ,ignoreMsg
  ,line_connected_m                   ,ignoreMsg
  ,timeout_m                          ,functionH
}

RINGER_TEST_STATE {
   SM_INITIALIZE                      ,powerOn
  ,start_channel_test_m               ,ignoreMsg
  ,line_connected_m                   ,ignoreMsg
  ,test_requested_m                   ,ignoreMsg
  ,absorbant_connected_m              ,ignoreMsg
  ,absorbant_disconnected_m           ,ignoreMsg
  ,ring_detected_m                    ,functionF
  ,reflective_connected_m             ,ignoreMsg
  ,timeout_m                          ,functionH
}

REFLECTIVE_STATE {
   SM_INITIALIZE                      ,powerOn
  ,start_channel_test_m               ,ignoreMsg
  ,line_connected_m                   ,ignoreMsg
  ,test_requested_m                   ,ignoreMsg
  ,absorbant_connected_m              ,ignoreMsg
  ,absorbant_disconnected_m           ,ignoreMsg
  ,ring_detected_m                    ,ignoreMsg
  ,reflective_connected_m             ,functionG
  ,timeout_m                          ,functionH
```

```
        }

} ;

%[

#define TEST_DEBUG 1
#define TIMEOUT_VALUE      300

/*********************************************************************/
/*                    External Declarations                          */
/*********************************************************************/

/*********************************************************************/
/*                    Local Variables                                */
/*********************************************************************/

SM_NAME_T requester;
BYTE shelfAddress;
BYTE lineAddress;
BYTE channel;
WORD test_result;
TIMER_MSG_T *timeout;

/*********************************************************************/
/*                    Local Procedures                               */
/*********************************************************************/


static void R_Delay (t)
int t;
{
int i;

   for (i = 0;  i < t*500;  i++);
}


static void setupRequestTest ()
{
   aOutput (RING_VOLTAGE_D2A, 0);            /* reset VI voltages */
   aOutput (TIP_VOLTAGE_D2A, 0);
   R_Delay (20);

   dOutput (VI_TEST_BUS_TIP, CONNECT);       /* connect VI to Test Bus */
   dOutput (VI_TEST_BUS_RING, DISCONNECT);
   dOutput (VI_LC_INPUT_TEST, CONNECT);
   R_Delay (20);

   aOutput (TIP_VOLTAGE_D2A, 113);           /* apply 113 volts */
}  /* setupRequestTest */


static void cleanRequestTest ()
{
   aOutput (RING_VOLTAGE_D2A, 0);            /* reset VI voltages */
   aOutput (TIP_VOLTAGE_D2A, 0);
   R_Delay (20);
```

```
    dOutput (VI_LC_INPUT_TEST, DISCONNECT);
    dOutput (VI_TEST_BUS_TIP, DISCONNECT);
    dOutput (VI_TEST_BUS_RING, DISCONNECT);    /* disconnect VI from Test Bu
}   /* cleanRequestTest */


static void setupRingerTest ()
{
    aOutput (RING_VOLTAGE_D2A, 0);             /* reset VI voltages */
    aOutput (TIP_VOLTAGE_D2A, 0);
    R_Delay (20);

    dOutput (VF_OSC_SELECT, CONNECT);          /* select 20Hz on VF */
    R_Delay (20);


    dOutput (VI_TEST_BUS_TIP, CONNECT);        /* connect VI to Test Bus */
    dOutput (VI_TEST_BUS_RING, CONNECT);
    dOutput (VI_LC_INPUT_TEST, CONNECT);
    R_Delay (20);

    dOutput (VI_20HZ_TIP_SIGNAL, DISCONNECT);
    dOutput (VI_20HZ_RING_SIGNAL, CONNECT);
}   /* setupRingerTest */


static void cleanRingerTest ()
{
    dOutput (VI_20HZ_TIP_SIGNAL, DISCONNECT);
    dOutput (VI_20HZ_RING_SIGNAL, DISCONNECT);

    dOutput (VI_LC_INPUT_TEST, DISCONNECT);
    dOutput (VI_TEST_BUS_TIP, DISCONNECT);
    dOutput (VI_TEST_BUS_RING, DISCONNECT);    /* disconnect VI from Test Bu
    R_Delay (20);

    dOutput (VF_OSC_SELECT, DISCONNECT);       /* select sweep on VF */
    R_Delay (20);
}   /* cleanRingerTest */


static void reflectiveTest ()
{
int reflected;

    dOutput (VF_COTLC_CONNECT, CONNECT);     /* connect VF to Test Bus */
    R_Delay (20);

/* reflection connection message from the RT */

    reflected = getInput (REFLECTED_VOLTAGE_IN);

/* delay ? */
/* compare the reflected voltage with reference value */
/* log result */

    dOutput (VF_COTLC_CONNECT, DISCONNECT);    /* disconnect VF from Test Bu
    R_Delay (20);
}   /* reflectiveTest */
```

```
void sendMessgageToLC (scNumber, lcNumber, message)
BYTE scNumber;
BYTE lcNumber;
BYTE message;
{

MC_TO_LC_FORMAT_T *out_msg;

        outMsg = (MC_TO_SC_FORMAT_T *) msgAlloc (sizeof(MC_TO_LC_FORMAT_T)
                                                 - sizeof(MSG_T));

        outMsg->msgHdr.fields.name = ext_frame_xmt_m;

        outMsg->msgHdr.fields.dest = shellController;
        outMsg->msgHdr.fields.origin = channelTesterForLC;
        outMsg->msgHdr.fields.priority = HARDWARE_PRIORITY;
        outMsg->msgHdr.fields.infoSize = sizeof(MC_TO_LC_FORMAT_T)
                                         - sizeof(MSG_T);
        outMsg->scAddr = scNumber;
        outMsg->lcAddr = lcNumber;
        outMsg->len = 1;
        outMsg->frameMsgType = message;
        sendMsg ((MSG_T *) outMsg);

}   /* sendMessageToLC */

/*********************************************************************/
/*                    Transition procedures                          */
/*********************************************************************/

static SM_STATE_T powerOn (msg, self)
MSG_T *msg;
SM_DESCRIPTOR_T *self;
{

#ifdef TEST_DEBUG
   printf("Channel Tester for LC Executed Power On\n");
#endif


   return (IDLE_STATE);
};  /* powerOn */

/*********************************************************************/
/*                    Function A                                     */
/*********************************************************************/

static SM_STATE_T functionA (msg, self)     /* start_channel_test_m */
MSG_T *msg;
SM_DESCRIPTOR_T *self;
{

#ifdef TEST_DEBUG
   printf("CTL A:  start_channel_test_m\n");
   showMsg(msg);
#endif


   requester = msg->fields.origin;
   shelfAddress = msg->scAddr;
   lineAddress  = msg->lcAddr;
   channel = msg->channel;

   sendMessgageToLC (shelfAddress, lineAddress, LC_TEST_INPUT_ON);
   timeout = startTimer (timeout_m, TIMEOUT_VALUE);
   return (SELECT_LINE_STATE);

};  /* functionA */
```

```
/**************************************************************/
/*                    Function B                              */
/**************************************************************/

static SM_STATE_T functionB (msg, self)     /* line_connected_m */
MSG_T *msg;
SM_DESCRIPTOR_T *self;
{

#ifdef TEST_DEBUG
   printf("CTL B:  line_connected_m\n");
   showMsg(msg);
#endif

   cancelTimer (timeout);
   setupRequestTest ();
   timeout = startTimer (timeout_m, TIMEOUT_VALUE);
   return (TEST_REQUEST_STATE);

};  /* functionB */

/**************************************************************/
/*                    Function C                              */
/**************************************************************/

static SM_STATE_T functionC (msg, self)     /* test_request_ack_m */
MSG_T *msg;
SM_DESCRIPTOR_T *self;
{

#ifdef TEST_DEBUG
   printf("CTL C:  test_request_ack_m\n");
   /* showMsg(msg); */
#endif

   cancelTimer (timeout);
   cleanRequestTest ();
   sendMessageToLC (shelfAddress, lineAddress, RT_ABSORBANT_ON);
   dOutput (VF_OSC_SELECT, DISCONNECT);     /* select frequency sweep on VF
   dOutput (VF_COTLC_CONNECT, CONNECT);     /* connect VF to Test Bus */
   timeout = startTimer (timeout_m, TIMEOUT_VALUE);
   return (ABSORBANT_STATE);

};  /* functionC */

/**************************************************************/
/*                    Function D                              */
/**************************************************************/

static SM_STATE_T functionD (msg, self)     /* absorbant_connected_m */
BASIC_MSG_T *msg;
SM_DESCRIPTOR_T *self;
{
int reflected;

#ifdef TEST_DEBUG
   printf("CTL D:  absorbant_connected_m \n");
   showMsg(msg);
#endif

   cancelTimer (timeout);
   reflected = getInput (REFLECTED_VOLTAGE_IN);
   sendMessageToLC (shelfAddress, lineAddress, RT_ABSORBANT_OFF);
/* compare reflected value with reference value */
   timeout = startTimer (timeout_m, TIMEOUT_VALUE);
   return (ON_HOOK_STATE);

};  /* functionD */
```

```
/*****************************************************************/
/*                     Function E                                */
/*****************************************************************/

static SM_STATE_T functionE (msg, self)     /* absorbant_disconnect_m */
SC_STAT_T *msg;
SM_DESCRIPTOR_T *self;
{
int reflected;

#ifdef DEBUG
   printf("CTL E:  absorbant_disconnect_m \n");
   showMsg(msg);
#endif

   cancelTimer (timeout);
   reflected = getInput (REFLECTED_VOLTAGE_IN);
   sendMessageToLC (shelfAddress, lineAddress, RT_DISCONNECT_ABSORBANT);
   dOutput (VF_COTLC_CONNECT, DISCONNECT);    /* disconnect VF from Test Bu
/* compare reflected value with reference value */
   setupRingerTest ();
   timeout = startTimer (timeout_m, TIMEOUT_VALUE);
   return (RINGER_TEST_STATE);

};  /* functionE */

/*****************************************************************/
/*                     Function F                                */
/*****************************************************************/

static SM_STATE_T functionF (msg, self)     /* ring_detected_m */
BASIC_MSG_T *msg;
SM_DESCRIPTOR_T *self;
{
#ifdef TEST_DEBUG
   printf("CTL G:  ring_detected_m \n");
   showMsg(msg);
#endif

   cancelTimer (timeout);
   cleanRingerTest ();
   dOutput (VF_COTLC_CONNECT, CONNECT);     /* connect VF to Test Bus */
   timeout = startTimer (timeout_m, TIMEOUT_VALUE);
   return (REFLECTIVE_STATE);
};  /* functionF */

/*****************************************************************/
/*                     Function G                                */
/*****************************************************************/

static SM_STATE_T functionG (msg, self)     /* reflective_connected_m */
BASIC_MSG_T *msg;
SM_DESCRIPTOR_T *self;
{

NORMAL_MSG_T *outMsg;
WORD request;

#ifdef TEST_DEBUG
   printf("CTL G:  reflective_connected_m\n");
   showMsg(msg);
#endif

   cancelTimer (timeout);
   reflected = getInput (REFLECTED_VOLTAGE_IN);
/* compare reflected value with reference value */
   dOutput (VF_COTLC_CONNECT, DISCONNECT);    /* disconnect VF from Test Bu
```

```
   sendMessageToLC (shelfAddress, lineAddress, RT_REFLECTIVE_OFF);
   sendMessageToLC (shelfAddress, lineAddress, LC_TEST_INPUT_OFF);

   return (IDLE_STATE);

};  /* functionG */

/**************************************************************/
/*                    Function H                              */
/**************************************************************/

static SM_STATE_T functionG (msg, self)     /* timeout_m */
BASIC_MSG_T *msg;
SM_DESCRIPTOR_T *self;
{

NORMAL_MSG_T *outMsg;
WORD request;

#ifdef TEST_DEBUG
   printf("CTL G:  reflective_connected_m\n");
   showMsg(msg);
#endif

   dOutput (VF_COTLC_CONNECT, DISCONNECT);    /* disconnect VF from Test Bu
   dOutput (VF_COTLC_CONNECT, DISCONNECT);    /* disconnect VF from Test Bu
   dOutput (VF_COTLC_CONNECT, DISCONNECT);    /* disconnect VF from Test Bu
   dOutput (VF_COTLC_CONNECT, DISCONNECT);    /* disconnect VF from Test Bu
   sendMessageToLC (shelfAddress, lineAddress, RT_REFLECTIVE_OFF);
   sendMessageToLC (shelfAddress, lineAddress, LC_TEST_INPUT_OFF);

   return (IDLE_STATE);

};  /* functionG */

/**************************************************************/
/*                    Local Procedures                        */
/**************************************************************/


static void R_Delay (t)
int t;
{
int i;

   for (i = 0;  i < t*500;  i++);
}



static void setupRequestTest ()
{
   aOutput (RING_VOLTAGE_D2A, 0);             /* reset VI voltages */
   aOutput (TIP_VOLTAGE_D2A, 0);
   R_Delay (20);

   dOutput (VI_TEST_BUS_TIP, CONNECT);        /* connect VI to Test Bus */
   dOutput (VI_TEST_BUS_RING, DISCONNECT);
   dOutput (VI_LC_INPUT_TEST, CONNECT);
   R_Delay (20);

   aOutput (TIP_VOLTAGE_D2A, 113);            /* apply 113 volts */
}  /* setupRequestTest */
```

```
static void cleanRequestTest ()
{
   aOutput (RING_VOLTAGE_D2A, 0);                /* reset VI voltages */
   aOutput (TIP_VOLTAGE_D2A, 0);
   R_Delay (20);

   dOutput (VI_LC_INPUT_TEST, DISCONNECT);
   dOutput (VI_TEST_BUS_TIP, DISCONNECT);
   dOutput (VI_TEST_BUS_RING, DISCONNECT);       /* disconnect VI from Test Bu
}  /* cleanRequestTest */



static void setupRingerTest ()
{
   aOutput (RING_VOLTAGE_D2A, 0);                /* reset VI voltages */
   aOutput (TIP_VOLTAGE_D2A, 0);
   R_Delay (20);
   dOutput (VF_OSC_SELECT, CONNECT);             /* select 20Hz on VF */
   R_Delay (20);

   dOutput (VI_TEST_BUS_TIP, CONNECT);           /* connect VI to Test Bus */
   dOutput (VI_TEST_BUS_RING, CONNECT);
   dOutput (VI_LC_INPUT_TEST, CONNECT);
   R_Delay (20);

   dOutput (VI_20HZ_TIP_SIGNAL, DISCONNECT);
   dOutput (VI_20HZ_RING_SIGNAL, CONNECT);
}  /* setupRingerTest */



static void cleanRingerTest ()
{
   dOutput (VI_20HZ_TIP_SIGNAL, DISCONNECT);
   dOutput (VI_20HZ_RING_SIGNAL, DISCONNECT);

   dOutput (VI_LC_INPUT_TEST, DISCONNECT);
   dOutput (VI_TEST_BUS_TIP, DISCONNECT);
   dOutput (VI_TEST_BUS_RING, DISCONNECT);       /* disconnect VI from Test Bu
   R_Delay (20);

   dOutput (VF_OSC_SELECT, DISCONNECT);          /* select sweep on VF */
   R_Delay (20);
}  /* cleanRingerTest */



static void sendChannelResult (outcome)
WORD outcome;
{
BASIC_MSG_T *outMsg;

        outMsg = (BASIC_MSG_T *) msgAlloc (sizeof(BASIC_MSG_T)
                                           - sizeof(MSG_T));

        outMsg->msgHdr.fields.name = channel_test_done_m;

        outMsg->msgHdr.fields.dest = requester;
        outMsg->msgHdr.fields.origin = channelTesterForLC;
        outMsg->msgHdr.fields.priority = HARDWARE_PRIORITY;
        outMsg->info1 = outcome;
        sendMsg ((MSG_T *) outMsg);

}   /* sendChannelResult */
```

```
/****************************************************************/
/*                  Transition procedures                       */
/****************************************************************/

static SM_STATE_T powerOn (msg, self)
MSG_T *msg;
SM_DESCRIPTOR_T *self;
{

#ifdef TEST_DEBUG
   printf("CTL:  Channel Tester for LC Executed Power On\n");
#endif


   return (IDLE_STATE);
};  /* powerOn */

/****************************************************************/
/*                  Function A                                  */
/****************************************************************/

static SM_STATE_T functionA (msg, self)     /* start_channel_test_m */
START_TEST_MSG_T *msg;
SM_DESCRIPTOR_T *self;
{

#ifdef TEST_DEBUG
   printf("CTL A:  start_channel_test_m\n");
   showMsg((MSG_T *) msg);
#endif


   requester = msg->msgHdr.fields.origin;
   shelfAddress = msg->scAddr;
   lineAddress  = msg->lcAddr;
   channel = msg->channel;

   testRequestResult = NOT_TESTED;
   absorbantResult   = NOT_TESTED;
   onHookResult      = NOT_TESTED;
   ringResult        = NOT_TESTED;
   reflectiveResult  = NOT_TESTED;

   sendTestMessageToLC (channelTesterForLC, shelfAddress, lineAddress, chan
   timeout = startTimer (timeout_m, TIMEOUT_VALUE);
   return (SELECT_LINE_STATE);

};  /* functionA */

/****************************************************************/
/*                  Function B                                  */
/****************************************************************/

static SM_STATE_T functionB (msg, self)     /* lc_line_connected_m */
LC_TO_MC_FORMAT_T *msg;
SM_DESCRIPTOR_T *self;
{

#ifdef TEST_DEBUG
   printf("CTL B:  lc_line_connected_m\n");
   showMsg((MSG_T *) msg);
#endif

   cancelTimer (timeout);
   setupRequestTest ();
   testRequestResult = IN_TEST;
```

```
   timeout = startTimer (timeout_m, TIMEOUT_VALUE);
   return (TEST_REQUEST_STATE);

};  /* functionB */

/*******************************************************************/
/*                      Function C                                 */
/*******************************************************************/

static SM_STATE_T functionC (msg, self)      /* pgtc_test_request_m */
LC_TO_MC_FORMAT_T *msg;
SM_DESCRIPTOR_T *self;
{

#ifdef TEST_DEBUG
   printf("CTL C:  pgtc_test_request_m\n");
   showMsg((MSG_T *) msg);
#endif

   cancelTimer (timeout);
   testRequestResult = PASSED;
   cleanRequestTest ();
   sendTestMessageToLC (channelTesterForLC, shelfAddress, lineAddress,
                        channel + RT_ABSORBANT);
   dOutput (VF_OSC_SELECT, DISCONNECT);      /* select frequency sweep on VF
   dOutput (VF_COTLC_CONNECT, CONNECT);      /* connect VF to Test Bus */
   timeout = startTimer (timeout_m, TIMEOUT_VALUE);
   return (ABSORBANT_STATE);

};  /* functionC */

/*******************************************************************/
/*                      Function D                                 */
/*******************************************************************/

static SM_STATE_T functionD (msg, self)      /* lc_absorbant_connected_m */
LC_TO_MC_FORMAT_T *msg;
SM_DESCRIPTOR_T *self;
{
int reflected;

#ifdef TEST_DEBUG
   printf("CTL D:  lc_absorbant_connected_m \n");
   showMsg((MSG_T *) msg);
#endif

   cancelTimer (timeout);
   reflected = getInput (REFLECTED_VOLTAGE_IN);
   if (reflected < 20) {
      absorbantResult = PASSED;
   }
   else {
      absorbantResult = FAILED;
   }
   sendTestMessageToLC (channelTesterForLC, shelfAddress, lineAddress, chan
   timeout = startTimer (timeout_m, TIMEOUT_VALUE);
   return (ON_HOOK_STATE);

};  /* functionD */

/*******************************************************************/
/*                      Function E                                 */
/*******************************************************************/

static SM_STATE_T functionE (msg, self)      /* lc_absorbant_disconnect_m */
LC_TO_MC_FORMAT_T *msg;
SM_DESCRIPTOR_T *self;
{
```

```
int reflected;

#ifdef DEBUG
   printf("CTL E:  lc_absorbant_disconnect_m \n");
   showMsg((MSG_T *) msg);
#endif

   cancelTimer (timeout);
   reflected = getInput (REFLECTED_VOLTAGE_IN);
   if ((reflected > 80) && (reflected < 120)) {
      onHookResult = PASSED;
   }
   else {
      onHookResult = FAILED;
   }
   dOutput (VF_COTLC_CONNECT, DISCONNECT);    /* disconnect VF from Test Bu
   setupRingerTest ();
   timeout = startTimer (timeout_m, TIMEOUT_VALUE);
   return (RINGER_TEST_STATE);

};  /* functionE */

/*****************************************************************/
/*                     Function F                                */
/*****************************************************************/

static SM_STATE_T functionF (msg, self)     /* lc_ring_detected_m */
LC_TO_MC_FORMAT_T *msg;
SM_DESCRIPTOR_T *self;
{

#ifdef TEST_DEBUG
   printf("CTL F:  lc_ring_detected_m \n");
   showMsg((MSG_T *) msg);
#endif

   cancelTimer (timeout);
   cleanRingerTest ();
   ringResult = PASSED;
   dOutput (VF_COTLC_CONNECT, CONNECT);     /* connect VF to Test Bus */
   timeout = startTimer (timeout_m, TIMEOUT_VALUE);
   return (REFLECTIVE_STATE);
};  /* functionF */

/*****************************************************************/
/*                     Function G                                */
/*****************************************************************/

static SM_STATE_T functionG (msg, self)     /* lc_reflective_connected_m */
LC_TO_MC_FORMAT_T *msg;
SM_DESCRIPTOR_T *self;
{
WORD result;
int reflected;

#ifdef TEST_DEBUG
   printf("CTL G:  lc_reflective_connected_m\n");
   showMsg((MSG_T *) msg);
#endif

   cancelTimer (timeout);
   reflected = getInput (REFLECTED_VOLTAGE_IN);
   if ((reflected > 80) && (reflected < 120)) {
      reflectiveResult = PASSED;
   }
   else {
      reflectiveResult = FAILED;
   }
```

```
   dOutput (VF_COTLC_CONNECT, DISCONNECT);    /* disconnect VF from Test Bu

   sendTestMessageToLC (channelTesterForLC, shelfAddress, lineAddress,
                        CLEAR_ALL);

   if ((testRequestResult == PASSED) && (absorbantResult == PASSED) &&
       (onHookResult == PASSED) && (ringResult == PASSED) &&
       (reflectiveResult == PASSED)) {
      result = PASSED;
   }
   else if ((testRequestResult == FAIL) || (absorbantResult == FAIL) ||
            (onHookResult == FAIL) || (ringResult == FAIL) ||
            (reflectiveResult == FAIL)) {
      result = FAIL;
   }

   sendBasicMessage (channelTesterForLC, requester,
                     channel_test_done_m, result);

   return (IDLE_STATE);

}; /* functionG */

/*****************************************************************/
/*                    Function H                                 */
/*****************************************************************/

static SM_STATE_T functionH (msg, self)     /* timeout_m */
BASIC_MSG_T *msg;
SM_DESCRIPTOR_T *self;
{

#ifdef TEST_DEBUG
   printf("CTL H:  timeout_m\n");
   showMsg((MSG_T *) msg);
#endif


   aOutput (RING_VOLTAGE_D2A, 0);             /* reset VI voltages */
   aOutput (TIP_VOLTAGE_D2A, 0);

   dOutput (VI_20HZ_TIP_SIGNAL, DISCONNECT);
   dOutput (VI_20HZ_RING_SIGNAL, DISCONNECT);

   dOutput (VI_LC_INPUT_TEST, DISCONNECT);
   dOutput (VI_TEST_BUS_TIP, DISCONNECT);
   dOutput (VI_TEST_BUS_RING, DISCONNECT);    /* disconnect VI from Test Bu
   R_Delay (20);

   dOutput (VF_OSC_SELECT, DISCONNECT);       /* select sweep on VF */
   R_Delay (20);

   dOutput (VF_COTLC_CONNECT, DISCONNECT);    /* disconnect VF from Test Bu

   sendTestMessageToLC (channelTesterForLC, shelfAddress, lineAddress,
                        CLEAR_ALL);

   sendBasicMessage (channelTesterForLC, requester,
                     channel_test_done_m, TEST_TIMEOUT);

   return (IDLE_STATE);

}; /* functionH */

}%
```

```
### b:tssupv.sm ###

%[

/*------------------------------------------------------------------*
 *                RAYCHEM Corp. / Telecommunications                  *
 *                                                                    *
 *       File: PollHnd.sm / PollHnd.c                                 *
 *    Created: July 19, 1990                                          *
 * Tools used: Microsoft C compiler v. 5.00                           *
 *             Turbo Debugger versions 1.01 and 2.0                   *
 *                                                                    *
 * Description:                                                       *
 *    DAML Poll Handler state machine task.  Responsible for issuing  *
 *  status request messages to the Shell Controllers at a programable *
 *  interval given by pollingTimeValue.                               *
 *    Polls that are not answered are tracked by struct variable,     *
 *  numNoAnswerPoll for each SC and are tagged as LATE_POLL's or      *
 *  INACTIVE.  A poll that is answered arrives as a status report msg *
 *  this response will reset any LATE_POLL's or INACTIVE status to    *
 *  ACTIVE.                                                           *
 *    Query SC and LC status messages are available to gather various *
 *  SC and LC statuses.  However, at the time of this release, these  *
 *  definitions are not available.                                    *
 *                                                                    *
 * Compilation procedure:                                             *
 *   PollHnd.SM is the control source for PollHnd.C                   *
 *   The SMC (State Machine Compiler) takes .SM and creates .C        *
 *   example:  smc < PollHnd.SM > PollHnd.C                           *
 *                                                                    *
 * Modification History:                                              *
 *   7/19/90  BCH: First Version                                      *
 --------------------------------------------------------------------*/

#       include "rts.h"
#       include "DAMLlit.h"
#       include "DAMLmsg.h"
#       include "syscnf.h"


extern QUEUE_T *SaveQueue;

]%

stateMachines = { statusPollHandler};

smDataTypeDef %[
                    unsigned someData;
                    unsigned moreData;
]%                                          SMX_DATA_T;

states = {          IDLE_STATE,
                    POLLING_STATE};


messages = {        SM_INITIALIZE
                   ,go_m
                   ,stop_m
                   ,poll_delay_m
                   ,query_lc_status_m
                   ,query_sc_status_m
                   ,sc_status_report_m
                   ,set_poll_time_m
                   };

transProcs = {     powerOn,
                   functionB,
                   functionC,
```

```
                functionD,
                functionE,
                functionF,
                functionG,
                functionH,
                functionI,
                ignoreMsg };

rransitions = {  IDLE_STATE {  SM_INITIALIZE  , powerOn
                     ,go_m                    , functionB
                     ,stop_m                  , ignoreMsg
                     ,poll_delay_m            , ignoreMsg
                     ,query_lc_status_m ,       functionH
                     ,sc_status_report_m,       functionF
                     ,set_poll_time_m   ,       functionG
                     ,query_sc_status_m ,       functionH
                     }

                 POLLING_STATE {  SM_INITIALIZE , powerOn
                     ,go_m                    , ignoreMsg
                     ,stop_m                  , functionC
                     ,poll_delay_m            , functionD
                     ,query_lc_status_m ,       functionE
                     ,sc_status_report_m,       functionF
                     ,set_poll_time_m   ,       functionG
                     ,query_sc_status_m ,       functionI
                     }
} ;


%[
#define TEST_DEBUG   1


/* Polling state error thresholds */
#define LATE_POLL_THRESHOLD          5
#define INACTIVE_POLL_THRESHOLD     50
#define MAX_UNANSWERED_POLL        250


/*****************************************************************/
/*                  External Declarations                       */
/*****************************************************************/

/*****************************************************************/
/*                  Local Variables                             */
/*****************************************************************/

/* This is the status database */
struct {BYTE   lcStatus[MAX_NUMBER_OF_LC];
        BYTE   scStatus;
        BYTE   scPollStatus;   /* ACTIVE, LATE_POLL, INACTIVE, IN_POLL */
        BYTE   scCommStatus;   /* ACTIVE, LOST_COMM */
        BYTE   numNoAnswerPoll;
        } scPollStat [MAX_NUMBER_OF_SC];  /*INDEX TO ARRAY STRUCT IS SC ADD


WORD pollingTimeValue;
BYTE nextSCtoPoll;
TIMER_MSG_T *pollTimerMsg;

/*****************************************************************/
 *                  Local Procedures                            */
/*****************************************************************/
void initSCstat()
{
BYTE i;
```

```
   for(i=0;i<MAX_NUMBER_OF_SC;i++)
      scPollStat[i].scStatus = INACTIVE;

}   /* END init */


void requestStatusSC(SCnumber)
BYTE SCnumber;
{
MC_TO_SC_FORMAT_T *out_msg;

        out_msg = (MC_TO_SC_FORMAT_T *) msgAlloc (sizeof(MC_TO_SC_FORMAT_T)
                                                  - sizeof(MSG_T));

        out_msg->msgHdr.fields.name = ext_frame_xmt_m;
        out_msg->msgHdr.fields.dest = shellController;
        out_msg->msgHdr.fields.origin = statusPollHandler;
        out_msg->msgHdr.fields.priority = HARDWARE_PRIORITY;
        out_msg->msgHdr.fields.infoSize = sizeof(MC_TO_SC_FORMAT_T)
                                                - sizeof(MSG_T);

/*TEMP*/ out_msg->scAddr = SCnumber << 2;   /* ADJUST FOR SC ADDR SHIFT */

        out_msg->frameMsgType = SC_STAT_REQ;
        out_msg->len = 0;
        sendMsg ((MSG_T *) out_msg);

}   /* END requestStatus */

void beginPollTimer()
{
   pollTimerMsg = startTimer(poll_delay_m, pollingTimeValue);

}   /* END */

/***************************************************************/
/*                  Transition procedures                      */
/***************************************************************/

static SM_STATE_T powerOn  (msg, self)
MSG_T *msg;
SM_DESCRIPTOR_T *self;
{

#ifdef TEST_DEBUG
   printf("Poll Handler Executed Power On\n");
#endif

   initSCstat();
   pollingTimeValue = 100;   /* TIME IN MSECS */

   return(IDLE_STATE);
};


/***************************************************************/
/*                  Function B                                 */
/***************************************************************/

static SM_STATE_T functionB(msg, self)  /* go_m */
MSG_T *msg;
SM_DESCRIPTOR_T *self;
{

#ifdef TEST_DEBUG
   printf("go message received\n");
   showMsg(msg);
#endif
```

```
   nextSCtoPoll = 1;   /* SC numbers are from 1 to MAX_NUMBER_OF_SC */
   requestStatusSC(nextSCtoPoll);
   beginPollTimer();

   return( POLLING_STATE );
};


/**********************************************************************/
/*                      Function C                                    */
/**********************************************************************/

static SM_STATE_T functionC(msg, self) /* stop_m */
MSG_T *msg;
SM_DESCRIPTOR_T *self;
{
#ifdef TEST_DEBUG
   printf("stop message received\n");
   showMsg(msg);
#endif

   cancelTimer(pollTimerMsg);

   return( IDLE_STATE );
};

/**********************************************************************/
/*                      Function D                                    */
/**********************************************************************/


static SM_STATE_T functionD(msg, self) /* poll_delay_m */
MSG_T *msg;
SM_DESCRIPTOR_T *self;
{

BYTE noAnswerCnt;

#ifdef TEST_DEBUG
   printf("poll delay message received\n");
   /* showMsg(msg); */
#endif

   /* COMPUTE POLLING RESPONSES */
   noAnswerCnt = scPollStat[nextSCtoPoll].numNoAnswerPoll;
   if ( noAnswerCnt < MAX_UNANSWERED_POLL)
      scPollStat[nextSCtoPoll].numNoAnswerPoll++; /* CLAMP TO MAX CNT */

   if (noAnswerCnt > LATE_POLL_THRESHOLD)
      scPollStat[nextSCtoPoll].scPollStatus = LATE_POLL;
   else if (noAnswerCnt  > INACTIVE_POLL_THRESHOLD)
      scPollStat[nextSCtoPoll].scPollStatus = INACTIVE;

   /* INCREMENT POLL AND CLAMP TO MAX_NUM_OF_SC */
   nextSCtoPoll = (nextSCtoPoll % MAX_NUMBER_OF_SC) + 1 ;

   requestStatusSC(nextSCtoPoll);
   beginPollTimer();

   return( POLLING_STATE);
};

/**********************************************************************/
/*                      Function E                                    */
/**********************************************************************/

static SM_STATE_T functionE(msg, self) /* query_lc_status_m */
BASIC_MSG_T *msg;
```

```
SM_DESCRIPTOR_T *self;
{

#ifdef TEST_DEBUG
   printf("Function E: status query received \n");
   showMsg(msg);
#endif

/*
   query on LC status is requested.  Since data is fresh, provide it
*/
/*
   sendSCstat( scPollStat[msg->info1].scStatus);
  CANCULATE AND SEND SC & LC STATUS
*/

   return( POLLING_STATE );
};

/*****************************************************************/
/*                   Function F                                  */
/*****************************************************************/


static SM_STATE_T functionF(msg, self) /* sc_status_report_m */
SC_STAT_T *msg;
SM_DESCRIPTOR_T *self;
{

BYTE scIndex;
BYTE i;
SC_STAT_T *scDataPtr;

#ifdef DEBUG
   printf("status report message received\n");
   showMsg(msg);
#endif

   /* INSERT NEW SC-LC DATA INTO DATABASE */
   scIndex = msg->scAddr;    /* INDEX TO SC STATUS GROUP */
   for (i=1;i<=MAX_NUMBER_OF_LC;i++)    /* COPY STATUS DATA */
      scPollStat[scIndex].lcStatus[i] = msg->lcStat[i];

   scPollStat[scIndex].scStatus = msg->scStat;

   /* UPDATE POLLING STATUS INFORMATION FOR THIS SC */
   scPollStat[scIndex].scPollStatus = ACTIVE;
   scPollStat[scIndex].numNoAnswerPoll = 0;

   return(self->state );
};

/*****************************************************************/
/*                   Function G                                  */
/*****************************************************************/

static SM_STATE_T functionG(msg, self) /* set_poll_time */
BASIC_MSG_T *msg;
SM_DESCRIPTOR_T *self;
{
#ifdef TEST_DEBUG
   printf("set poll time received\n");
   showMsg(msg);
#endif

   pollingTimeValue = msg->info1;

   return( self->state );
};
```

```
/*****************************************************************/
/*                    Function H                                */
/*****************************************************************/
static SM_STATE_T functionH(msg, self) /* query_sc_status_m */
BASIC_MSG_T *msg;
SM_DESCRIPTOR_T *self;
{

NORMAL_MSG_T *outMsg;
WORD request;

#ifdef TEST_DEBUG
   printf("sc status query message received IN IDLE \n");
   showMsg(msg);
#endif
   request = msg->info1;

   outMsg = (NORMAL_MSG_T *) msgAlloc (sizeof(NORMAL_MSG_T)
                                 - sizeof(MSG_T));
   outMsg->msgHdr.fields.name = report_sc_stat_m;
   outMsg->msgHdr.fields.dest = msg->msgHdr.fields.origin;
   outMsg->msgHdr.fields.origin = msg->msgHdr.fields.dest;
   outMsg->msgHdr.fields.priority = NORMAL_PRIORITY;
   outMsg->msgHdr.fields.infoSize = 0;
   outMsg->info1 = NOT_OKAY ;
   outMsg->info2 = 0 ;

   sendMsg ((MSG_T *) outMsg);

   return( self->state  );
};
/*****************************************************************/
/*                    Function I                                */
/*****************************************************************/
static SM_STATE_T functionI(msg, self) /* query_sc_status_m */
BASIC_MSG_T *msg;
SM_DESCRIPTOR_T *self;
{
NORMAL_MSG_T *outMsg;
WORD request;

#ifdef TEST_DEBUG
   printf("sc status query message received IN IDLE \n");
   showMsg(msg);
#endif
   request = msg->info1;

   outMsg = (NORMAL_MSG_T  *) msgAlloc (sizeof(NORMAL_MSG_T )
                                 - sizeof(MSG_T));
   outMsg->msgHdr.fields.name = report_sc_stat_m;
   outMsg->msgHdr.fields.dest = msg->msgHdr.fields.origin;
   outMsg->msgHdr.fields.origin = msg->msgHdr.fields.origin;
   outMsg->msgHdr.fields.priority = NORMAL_PRIORITY;
   outMsg->msgHdr.fields.infoSize = 0;
   outMsg->info1 = OKAY ;
   outMsg->info2 = 0;   /* ????? TBD */

   sendMsg ((MSG_T *) outMsg);

   return( self->state  );
};

]%
```

```
### b:tstand.sm ###
%[

/*-------------------------------------------------------------------*
 *                   RAYCHEM Corp. / Telecommunications              *
 *                                                                   *
 *        File: PollHnd.sm / PollHnd.c                               *
 *     Created: July 19, 1990                                        *
 * Tools used: Microsoft C compiler v. 5.00                          *
 *              Turbo Debugger versions 1.01 and 2.0                 *
 *                                                                   *
 * Description:                                                      *
 *     DAML Poll Handler state machine task.  Responsible for issuing *
 *  status request messages to the Shell Controllers at a programable *
 *  interval given by pollingTimeValue.                              *
 *     Polls that are not answered are tracked by struct variable,   *
 *  numNoAnswerPoll for each SC and are tagged as LATE_POLL's or     *
 *  INACTIVE.  A poll that is answered arrives as a status report msg *
 *  this response will reset any LATE_POLL's or INACTIVE status to   *
 *  ACTIVE.                                                          *
 *     Query SC and LC status messages are available to gather various *
 *  SC and LC statuses.  However, at the time of this release, these *
 *  definitions are not available.                                   *
 *                                                                   *
 * Compilation procedure:                                            *
 *   PollHnd.SM is the control source for PollHnd.C                  *
 *   The SMC (State Machine Compiler) takes .SM and creates .C       *
 *   example:  smc < PollHnd.SM > PollHnd.C                          *
 *                                                                   *
 * Modification History:                                             *
 *   7/19/90  BCH: First Version                                     *
 --------------------------------------------------------------------*/

#       include "rts.h"
#       include "DAMLlit.h"
#       include "DAMLmsg.h"
#       include "syscnf.h"

extern QUEUE_T *SaveQueue;

]%

stateMachines = { statusPollHandler};

smDataTypeDef %[
                    unsigned someData;
                    unsigned moreData;
]%                                          SMX_DATA_T;

states = {          IDLE_STATE,
                    POLLING_STATE};

messages = {        SM_INITIALIZE
                   ,go_m
                   ,stop_m
                   ,poll_delay_m
                   ,query_lc_status_m
                   ,query_sc_status_m
                   ,sc_status_report_m
                   ,set_poll_time_m
                   };

transProcs = {     powerOn,
                   functionB,
                   functionC,
```

```
                  functionD,
                  functionE,
                  functionF,
                  functionG,
                  functionH,
                  functionI,
                  ignoreMsg };

transitions = {   IDLE_STATE {  SM_INITIALIZE   , powerOn
                             ,go_m              , functionB
                             ,stop_m            , ignoreMsg
                             ,poll_delay_m      , ignoreMsg
                             ,query_lc_status_m , functionH
                             ,sc_status_report_m, functionF
                             ,set_poll_time_m   , functionG
                             ,query_sc_status_m , functionH
                             }

                  POLLING_STATE {  SM_INITIALIZE , powerOn
                             ,go_m              , ignoreMsg
                             ,stop_m            , functionC
                             ,poll_delay_m      , functionD
                             ,query_lc_status_m , functionE
                             ,sc_status_report_m, functionF
                             ,set_poll_time_m   , functionG
                             ,query_sc_status_m , functionI
                             }
} ;


%[
#define TEST_DEBUG   1


/* Polling state error thresholds */
#define LATE_POLL_THRESHOLD         5
#define INACTIVE_POLL_THRESHOLD    50
#define MAX_UNANSWERED_POLL       250


/******************************************************************/
/*                   External Declarations                        */
/******************************************************************/

/******************************************************************/
/*                   Local Variables                              */
/******************************************************************/

/* This is the status database */
struct {BYTE   lcStatus[MAX_NUMBER_OF_LC];
        BYTE   scStatus;
        BYTE   scPollStatus;   /* ACTIVE, LATE_POLL, INACTIVE, IN_POLL */
        BYTE   scCommStatus;   /* ACTIVE, LOST_COMM */
        BYTE   numNoAnswerPoll;
        } scPollStat [MAX_NUMBER_OF_SC];  /*INDEX TO ARRAY STRUCT IS SC ADD


WORD pollingTimeValue;
BYTE nextSCtoPoll;
TIMER_MSG_T *pollTimerMsg;

/******************************************************************/
/*                   Local Procedures                             */
/******************************************************************/
void initSCstat()
{
BYTE i;
```

```
   for(i=0;i<MAX_NUMBER_OF_SC;i++)
      scPollStat[i].scStatus = INACTIVE;

}   /* END init */


void requestStatusSC(SCnumber)
BYTE SCnumber;
{
MC_TO_SC_FORMAT_T *out_msg;

        out_msg = (MC_TO_SC_FORMAT_T *) msgAlloc (sizeof(MC_TO_SC_FORMAT_T)
                                          - sizeof(MSG_T));

        out_msg->msgHdr.fields.name = ext_frame_xmt_m;
        out_msg->msgHdr.fields.dest = shellController;
        out_msg->msgHdr.fields.origin = statusPollHandler;
        out_msg->msgHdr.fields.priority = HARDWARE_PRIORITY;
        out_msg->msgHdr.fields.infoSize = sizeof(MC_TO_SC_FORMAT_T)
                                          - sizeof(MSG_T);

/*TEMP*/ out_msg->scAddr = SCnumber << 2;   /* ADJUST FOR SC ADDR SHIFT */

        out_msg->frameMsgType = SC_STAT_REQ;
        out_msg->len = 0;
        sendMsg ((MSG_T *) out_msg);

}   /* END requestStatus */

void beginPollTimer()
{
   pollTimerMsg = startTimer(poll_delay_m, pollingTimeValue);

}   /* END */

/*****************************************************************/
/*                    Transition procedures                      */
/*****************************************************************/

static SM_STATE_T powerOn  (msg, self)
MSG_T *msg;
SM_DESCRIPTOR_T *self;
{

#ifdef TEST_DEBUG
   printf("Poll Handler Executed Power On\n");
#endif

   initSCstat();
   pollingTimeValue = 100;   /* TIME IN MSECS */

   return(IDLE_STATE);
};


/*****************************************************************/
/*                    Function B                                 */
/*****************************************************************/

static SM_STATE_T functionB(msg, self)  /* go_m */
MSG_T *msg;
SM_DESCRIPTOR_T *self;
{

#ifdef TEST_DEBUG
   printf("go message received\n");
   showMsg(msg);
#endif
```

```
   nextSCtoPoll = 1;   /* SC numbers are from 1 to MAX_NUMBER_OF_SC */
   requestStatusSC(nextSCtoPoll);
   beginPollTimer();

   return( POLLING_STATE );
};


/*********************************************************************/
/*                     Function C                                    */
/*********************************************************************/

static SM_STATE_T functionC(msg, self) /* stop_m */
MSG_T *msg;
SM_DESCRIPTOR_T *self;
{
#ifdef TEST_DEBUG
   printf("stop message received\n");
   showMsg(msg);
#endif

   cancelTimer(pollTimerMsg);

   return( IDLE_STATE );
};

/*********************************************************************/
/*                     Function D                                    */
/*********************************************************************/


static SM_STATE_T functionD(msg, self) /* poll_delay_m */
MSG_T *msg;
SM_DESCRIPTOR_T *self;
{

BYTE noAnswerCnt;

#ifdef TEST_DEBUG
   printf("poll delay message received\n");
   /* showMsg(msg); */
#endif

   /* COMPUTE POLLING RESPONSES */
   noAnswerCnt = scPollStat[nextSCtoPoll].numNoAnswerPoll;
   if ( noAnswerCnt < MAX_UNANSWERED_POLL)
      scPollStat[nextSCtoPoll].numNoAnswerPoll++; /* CLAMP TO MAX CNT */

   if (noAnswerCnt > LATE_POLL_THRESHOLD)
      scPollStat[nextSCtoPoll].scPollStatus = LATE_POLL;
   else if (noAnswerCnt  > INACTIVE_POLL_THRESHOLD)
      scPollStat[nextSCtoPoll].scPollStatus = INACTIVE;

   /* INCREMENT POLL AND CLAMP TO MAX_NUM_OF_SC */
   nextSCtoPoll = (nextSCtoPoll % MAX_NUMBER_OF_SC) + 1 ;

   requestStatusSC(nextSCtoPoll);
   beginPollTimer();

   return( POLLING_STATE);
};


/*********************************************************************/
/*                     Function E                                    */
/*********************************************************************/
```

```
static SM_STATE_T functionE(msg, self) /* query_lc_status_m */
BASIC_MSG_T *msg;
SM_DESCRIPTOR_T *self;
{
#ifdef TEST_DEBUG
   printf("Function E: status query received \n");
   showMsg(msg);
#endif

/*
   query on LC status is requested.  Since data is fresh, provide it
*/
/*
   sendSCstat( scPollStat[msg->info1].scStatus);
  CANCULATE AND SEND SC & LC STATUS
*/

   return( POLLING_STATE );
};

/****************************************************************/
/*                    Function F                                */
/****************************************************************/


static SM_STATE_T functionF(msg, self) /* sc_status_report_m */
SC_STAT_T *msg;
SM_DESCRIPTOR_T *self;
{

BYTE scIndex;
BYTE i;
SC_STAT_T *scDataPtr;

#ifdef DEBUG
   printf("status report message received\n");
   showMsg(msg);
#endif

   /* INSERT NEW SC-LC DATA INTO DATABASE */
   scIndex = msg->scAddr;   /* INDEX TO SC STATUS GROUP */
   for (i=1;i<=MAX_NUMBER_OF_LC;i++)   /* COPY STATUS DATA */
      scPollStat[scIndex].lcStatus[i] = msg->lcStat[i];

   scPollStat[scIndex].scStatus = msg->scStat;

   /* UPDATE POLLING STATUS INFORMATION FOR THIS SC */
   scPollStat[scIndex].scPollStatus = ACTIVE;
   scPollStat[scIndex].numNoAnswerPoll = 0;

   return(self->state );
};

/****************************************************************/
/*                    Function G                                */
/****************************************************************/
static SM_STATE_T functionG(msg, self) /* set_poll_time */
BASIC_MSG_T *msg;
SM_DESCRIPTOR_T *self;
{
#ifdef TEST_DEBUG
   printf("set poll time received\n");
   showMsg(msg);
#endif
```

```
   pollingTimeValue = msg->info1;

   return( self->state );
};

/*******************************************************************/
/*                     Function H                                  */
/*******************************************************************/
static SM_STATE_T functionH(msg, self) /* query_sc_status_m */
BASIC_MSG_T *msg;
SM_DESCRIPTOR_T *self;
{

NORMAL_MSG_T *outMsg;
WORD request;

#ifdef TEST_DEBUG
   printf("sc status query message received IN IDLE \n");
   showMsg(msg);
#endif
   request = msg->info1;

   outMsg = (NORMAL_MSG_T *) msgAlloc (sizeof(NORMAL_MSG_T)
                                 - sizeof(MSG_T));
   outMsg->msgHdr.fields.name = report_sc_stat_m;
   outMsg->msgHdr.fields.dest = msg->msgHdr.fields.origin;
   outMsg->msgHdr.fields.origin = msg->msgHdr.fields.dest;
   outMsg->msgHdr.fields.priority = NORMAL_PRIORITY;
   outMsg->msgHdr.fields.infoSize = 0;
   outMsg->info1 = NOT_OKAY ;
   outMsg->info2 = 0 ;

   sendMsg ((MSG_T *) outMsg);

   return( self->state  );
};
/*******************************************************************/
/*                     Function I                                  */
/*******************************************************************/
static SM_STATE_T functionI(msg, self) /* query_sc_status_m */
BASIC_MSG_T *msg;
SM_DESCRIPTOR_T *self;
{
NORMAL_MSG_T *outMsg;
WORD request;
#ifdef TEST_DEBUG
   printf("sc status query message received IN IDLE \n");
   showMsg(msg);
#endif
   request = msg->info1;

   outMsg = (NORMAL_MSG_T  *) msgAlloc (sizeof(NORMAL_MSG_T )
                                 - sizeof(MSG_T));
   outMsg->msgHdr.fields.name = report_sc_stat_m;
   outMsg->msgHdr.fields.dest = msg->msgHdr.fields.origin;
   outMsg->msgHdr.fields.origin = msg->msgHdr.fields.origin;
   outMsg->msgHdr.fields.priority = NORMAL_PRIORITY;
   outMsg->msgHdr.fields.infoSize = 0;
   outMsg->info1 = OKAY ;
   outMsg->info2 = 0;   /* ????? TBD */

   sendMsg ((MSG_T *) outMsg);

   return( self->state  );
};

]%
```

```
%[

/*---------------------------------------------------------------------*
 *                   RAYCHEM Corp. / Telecommunications                *
 *                                                                     *
 *        File: CtllHnd.sm / ctlHnd.c                                  *
 *     Created: July 19, 1990                                          *
 * Tools used: Microsoft C compiler v. 5.00                            *
 *                                                                     *
 * Description:                                                        *
 *                                                                     *
 * Compilation procedure:                                              *
 *   The SMC (State Machine Compiler) takes .SM and creates .C         *
 *   example:  smc < PollHnd.SM > PollHnd.C                            *
 *                                                                     *
 * Modification History:                                               *
 *   7/19/90  BCH: First Version                                       *
 ----------------------------------------------------------------------*/

#include "rts.h"
#include "DAMLlit.h"
#include "DAMLmsg.h"
#include "syscnf.h"
#include "inp.h"
#include "out.h"


]%

stateMachines = {channelTesterForLC};

smDataTypeDef %[
                  unsigned someData;
                  unsigned moreData;
]%                                          SMX_DATA_T;


states = {         IDLE_STATE
                  ,SELECT_LINE_STATE
                  ,TEST_REQUEST_STATE
                  ,ABSORBANT_STATE
                  ,ON_HOOK_STATE
                  ,RINGER_TEST_STATE
                  ,REFLECTIVE_STATE
};


messages = {       SM_INITIALIZE
                  ,start_channel_test_m
                  ,line_connected_m
                  ,test_request_ack_m
                  ,absorbant_connected_m
                  ,absorbant_disconnected_m
                  ,ring_detected_m
                  ,reflective_connected_m

};


transProcs = {   powerOn
                ,functionA
                ,functionB
                ,functionC
                ,functionD
                ,functionE
                ,functionF
                ,functionG
                ,functionH
                ,ignoreMsg
```

```
};

transitions = {  IDLE_STATE {
                    SM_INITIALIZE                       ,powerOn
                   ,start_channel_test_m                ,functionA
                   ,line_connected_m                    ,ignoreMsg
                   ,test_requested_m                    ,ignoreMsg
                   ,absorbant_connected_m               ,ignoreMsg
                   ,absorbant_disconnected_m            ,ignoreMsg
                   ,ring_detected_m                     ,ignoreMsg
                   ,reflective_connected_m              ,ignoreMsg
                   ,timeout_m                           ,functionH
                 }

                 SELECT_LINE_STATE {
                    SM_INITIALIZE                       ,powerOn
                   ,start_channel_test_m                ,ignoreMsg
                   ,line_connected_m                    ,functionB
                   ,test_requested_m                    ,ignoreMsg
                   ,absorbant_connected_m               ,ignoreMsg
                   ,absorbant_disconnected_m            ,ignoreMsg
                   ,ring_detected_m                     ,ignoreMsg
                   ,reflective_connected_m              ,ignoreMsg
                   ,timeout_m                           ,functionH
                 }

                 TEST_REQUEST_STATE {
                    SM_INITIALIZE                       ,powerOn
                   ,start_channel_test_m                ,ignoreMsg
                   ,line_connected_m                    ,ignoreMsg
                   ,test_requested_m                    ,functionC
                   ,absorbant_connected_m               ,ignoreMsg
                   ,absorbant_disconnected_m            ,ignoreMsg
                   ,ring_detected_m                     ,ignoreMsg
                   ,reflective_connected_m              ,ignoreMsg
                   ,timeout_m                           ,functionH
                 }

                 ABSORBANT_STATE {
                    SM_INITIALIZE                       ,powerOn
                   ,start_channel_test_m                ,ignoreMsg
                   ,line_connected_m                    ,ignoreMsg
                   ,test_requested_m                    ,ignoreMsg
                   ,absorbant_connected_m               ,functionD
                   ,absorbant_disconnected_m            ,ignoreMsg
                   ,ring_detected_m                     ,ignoreMsg
                   ,reflective_connected_m              ,ignoreMsg
                   ,timeout_m                           ,functionH
                 }

                 ON_HOOK_STATE {
                    SM_INITIALIZE                       ,powerOn
                   ,start_channel_test_m                ,ignoreMsg
                   ,line_connected_m                    ,ignoreMsg
                   ,test_requested_m                    ,ignoreMsg
                   ,absorbant_connected_m               ,ignoreMsg
                   ,absorbant_disconnected_m            ,functionE
                   ,ring_detected_m                     ,ignoreMsg
                   ,line_connected_m                    ,ignoreMsg
                   ,timeout_m                           ,functionH
                 }

                 RINGER_TEST_STATE {
                    SM_INITIALIZE                       ,powerOn
                   ,start_channel_test_m                ,ignoreMsg
                   ,line_connected_m                    ,ignoreMsg
                   ,test_requested_m                    ,ignoreMsg
```

```
        ,absorbant_connected_m          ,ignoreMsg
        ,absorbant_disconnected_m       ,ignoreMsg
        ,ring_detected_m                ,functionF
        ,reflective_connected_m         ,ignoreMsg
        ,timeout_m                      ,functionH
      }

      REFLECTIVE_STATE {
         SM_INITIALIZE                  ,powerOn
        ,start_channel_test_m           ,ignoreMsg
        ,line_connected_m               ,ignoreMsg
        ,test_requested_m               ,ignoreMsg
        ,absorbant_connected_m          ,ignoreMsg
        ,absorbant_disconnected_m       ,ignoreMsg
        ,ring_detected_m                ,ignoreMsg
        ,reflective_connected_m         ,functionG
        ,timeout_m                      ,functionH
      }

} ;

%[

#define TEST_DEBUG 1
#define TIMEOUT_VALUE      300

/******************************************************************/
/*                    External Declarations                       */
/******************************************************************/

/******************************************************************/
/*                    Local Variables                             */
/******************************************************************/

SM_NAME_T requester;
BYTE shelfAddress;
BYTE lineAddress;
BYTE channel;
WORD test_result;
TIMER_MSG_T *timeout;

/******************************************************************/
/*                    Local Procedures                            */
/******************************************************************/


static void R_Delay (t)
int t;
{
int i;

   for (i = 0;  i < t*500;  i++);
}


static void setupRequestTest ()
{
   aOutput (RING_VOLTAGE_D2A, 0);             /* reset VI voltages */
   aOutput (TIP_VOLTAGE_D2A, 0);
   R_Delay (20);

   dOutput (VI_TEST_BUS_TIP, CONNECT);        /* connect VI to Test Bus */
   dOutput (VI_TEST_BUS_RING, DISCONNECT);
```

```
   dOutput (VI_LC_INPUT_TEST, CONNECT);
   R_Delay (20);

   aOutput (TIP_VOLTAGE_D2A, 113);              /* apply 113 volts */
}  /* setupRequestTest */



static void cleanRequestTest ()
{
   aOutput (RING_VOLTAGE_D2A, 0);               /* reset VI voltages */
   aOutput (TIP_VOLTAGE_D2A, 0);
   R_Delay (20);

   dOutput (VI_LC_INPUT_TEST, DISCONNECT);
   dOutput (VI_TEST_BUS_TIP, DISCONNECT);
   dOutput (VI_TEST_BUS_RING, DISCONNECT);      /* disconnect VI from Test Bu
}  /* cleanRequestTest */


static void setupRingerTest ()
{
   aOutput (RING_VOLTAGE_D2A, 0);               /* reset VI voltages */
   aOutput (TIP_VOLTAGE_D2A, 0);
   R_Delay (20);

   dOutput (VF_OSC_SELECT, CONNECT);            /* select 20Hz on VF */
   R_Delay (20);
   dOutput (VI_TEST_BUS_TIP, CONNECT);          /* connect VI to Test Bus */
   dOutput (VI_TEST_BUS_RING, CONNECT);
   dOutput (VI_LC_INPUT_TEST, CONNECT);
   R_Delay (20);

   dOutput (VI_20HZ_TIP_SIGNAL, DISCONNECT);
   dOutput (VI_20HZ_RING_SIGNAL, CONNECT);
}  /* setupRingerTest */



static void cleanRingerTest ()
{
   dOutput (VI_20HZ_TIP_SIGNAL, DISCONNECT);
   dOutput (VI_20HZ_RING_SIGNAL, DISCONNECT);

   dOutput (VI_LC_INPUT_TEST, DISCONNECT);
   dOutput (VI_TEST_BUS_TIP, DISCONNECT);
   dOutput (VI_TEST_BUS_RING, DISCONNECT);      /* disconnect VI from Test Bu
   R_Delay (20);

   dOutput (VF_OSC_SELECT, DISCONNECT);         /* select sweep on VF */
   R_Delay (20);
}  /* cleanRingerTest */


static void reflectiveTest ()
{
int reflected;

   dOutput (VF_COTLC_CONNECT, CONNECT);     /* connect VF to Test Bus */
   R_Delay (20);

/* reflection connection message from the RT */
```

```
   reflected = getInput (REFLECTED_VOLTAGE_IN);

/* delay ? */
/* compare the reflected voltage with reference value */
/* log result */

   dOutput (VF_COTLC_CONNECT, DISCONNECT);    /* disconnect VF from Test Bu
   R_Delay (20);
}  /* reflectiveTest */


void sendMessgageToLC (scNumber, lcNumber, message)
BYTE scNumber;
BYTE lcNumber;
BYTE message;
{
MC_TO_LC_FORMAT_T *out_msg;

        outMsg = (MC_TO_SC_FORMAT_T *) msgAlloc (sizeof(MC_TO_LC_FORMAT_T)
                                            - sizeof(MSG_T));

        outMsg->msgHdr.fields.name = ext_frame_xmt_m;

        outMsg->msgHdr.fields.dest = shellController;
        outMsg->msgHdr.fields.origin = channelTesterForLC;
        outMsg->msgHdr.fields.priority = HARDWARE_PRIORITY;
        outMsg->msgHdr.fields.infoSize = sizeof(MC_TO_LC_FORMAT_T)
                                            - sizeof(MSG_T);
        outMsg->scAddr = scNumber;
        outMsg->lcAddr = lcNumber;
        outMsg->len = 1;
        outMsg->frameMsgType = message;
        sendMsg ((MSG_T *) outMsg);

}   /* sendMessageToL? */

/*****************************************************************/
/*                    Transition procedures                      */
/*****************************************************************/

static SM_STATE_T powerOn (msg, self)
MSG_T *msg;
SM_DESCRIPTOR_T *self;
{

#ifdef TEST_DEBUG
   printf("Channel Tester for LC Executed Power On\n");
#endif


   return (IDLE_STATE);
};  /* powerOn */

/*****************************************************************/
/*                    Function A                                 */
/*****************************************************************/

static SM_STATE_T functionA (msg, self)     /* start_channel_test_m */
MSG_T *msg;
SM_DESCRIPTOR_T *self;
{

#ifdef TEST_DEBUG
   printf("CTL A:  start_channel_test_m\n");
   showMsg(msg);
#endif
```

```
   requester = msg->fields.origin;
   shelfAddress = msg->scAddr;
   lineAddress  = msg->lcAddr;
   channel = msg->channel;

   sendMessgageToLC (shelfAddress, lineAddress, LC_TEST_INPUT_ON);
   timeout = startTimer (timeout_m, TIMEOUT_VALUE);
   return (SELECT_LINE_STATE);

};  /* functionA */

/*******************************************************************/
/*                      Function B                                 */
/*******************************************************************/

static SM_STATE_T functionB (msg, self)     /* line_connected_m */
MSG_T *msg;
SM_DESCRIPTOR_T *self;
{

#ifdef TEST_DEBUG
   printf("CTL B:  line_connected_m\n");
   showMsg(msg);
#endif

   cancelTimer (timeout);
   setupRequestTest ();
   timeout = startTimer (timeout_m, TIMEOUT_VALUE);
   return (TEST_REQUEST_STATE);

};  /* functionB */

/*******************************************************************/
/*                      Function C                                 */
/*******************************************************************/

static SM_STATE_T functionC (msg, self)     /* test_request_ack_m */
MSG_T *msg;
SM_DESCRIPTOR_T *self;
{

#ifdef TEST_DEBUG
   printf("CTL C:  test_request_ack_m\n");
   /* showMsg(msg); */
#endif

   cancelTimer (timeout);
   cleanRequestTest ();
   sendMessageToLC (shelfAddress, lineAddress, RT_ABSORBANT_ON);
   dOutput (VF_OSC_SELECT, DISCONNECT);      /* select frequency sweep on \
   dOutput (VF_COTLC_CONNECT, CONNECT);      /* connect VF to Test Bus */
   timeout = startTimer (timeout_m, TIMEOUT_VALUE);
   return (ABSORBANT_STATE);

};  /* functionC */

/*******************************************************************/
/*                      Function D                                 */
/*******************************************************************/

static SM_STATE_T functionD (msg, self)     /* absorbant_connected_m */
BASIC_MSG_T *msg;
SM_DESCRIPTOR_T *self;
{
int reflected;

#ifdef TEST_DEBUG
   printf("CTL D:  absorbant_connected_m \n");
```

```
  showMsg(msg);
#endif

   cancelTimer (timeout);
   reflected = getInput (REFLECTED_VOLTAGE_IN);
   sendMessageToLC (shelfAddress, lineAddress, RT_ABSORBANT_OFF);
/* compare reflected value with reference value */
   timeout = startTimer (timeout_m, TIMEOUT_VALUE);
   return (ON_HOOK_STATE);

}; /* functionD */

/****************************************************************/
/*                    Function E                                */
/****************************************************************/

static SM_STATE_T functionE (msg, self)     /* absorbant_disconnect_m */
SC_STAT_T *msg;
SM_DESCRIPTOR_T *self;
{
int reflected;

#ifdef DEBUG
   printf("CTL E:  absorbant_disconnect_m \n");
   showMsg(msg);
#endif

   cancelTimer (timeout);
   reflected = getInput (REFLECTED_VOLTAGE_IN);
   sendMessageToLC (shelfAddress, lineAddress, RT_DISCONNECT_ABSORBANT);
   dOutput (VF_COTLC_CONNECT, DISCONNECT);    /* disconnect VF from Test E
/* compare reflected value with reference value */
   setupRingerTest ();
   timeout = startTimer (timeout_m, TIMEOUT_VALUE);
   return (RINGER_TEST_STATE);

}; /* functionE */

/****************************************************************/
/*                    Function F                                */
/****************************************************************/

static SM_STATE_T functionF (msg, self)     /* ring_detected_m */
BASIC_MSG_T *msg;
SM_DESCRIPTOR_T *self;
{
#ifdef TEST_DEBUG
   printf("CTL G:  ring_detected_m \n");
   showMsg(msg);
#endif

   cancelTimer (timeout);
   cleanRingerTest ();
   dOutput (VF_COTLC_CONNECT, CONNECT);     /* connect VF to Test Bus */
   timeout = startTimer (timeout_m, TIMEOUT_VALUE);
   return (REFLECTIVE_STATE);
}; /* functionF */

/****************************************************************/
/*                    Function G                                */
/****************************************************************/

static SM_STATE_T functionG (msg, self)     /* reflective_connected_m */
BASIC_MSG_T *msg;
SM_DESCRIPTOR_T *self;
{
```

```
NORMAL_MSG_T *outMsg;
WORD request;

#ifdef TEST_DEBUG
   printf("CTL G:  reflective_connected_m\n");
   showMsg(msg);
#endif

   cancelTimer (timeout);
   reflected = getInput (REFLECTED_VOLTAGE_IN);
/* compare reflected value with reference value */
   dOutput (VF_COTLC_CONNECT, DISCONNECT);    /* disconnect VF from Test I
   sendMessageToLC (shelfAddress, lineAddress, RT_REFLECTIVE_OFF);
   sendMessageToLC (shelfAddress, lineAddress, LC_TEST_INPUT_OFF);

   return (IDLE_STATE);

};  /* functionG */



/*********************************************************************/
/*                    Function H                                     */
/*********************************************************************/

static SM_STATE_T functionG (msg, self)     /* timeout_m */
BASIC_MSG_T *msg;
SM_DESCRIPTOR_T *self;
{

NORMAL_MSG_T *outMsg;
WORD request;

#ifdef TEST_DEBUG
   printf("CTL G:  reflective_connected_m\n");
   showMsg(msg);
#endif

   dOutput (VF_COTLC_CONNECT, DISCONNECT);    /* disconnect VF from Test E
   dOutput (VF_COTLC_CONNECT, DISCONNECT);    /* disconnect VF from Test E
   dOutput (VF_COTLC_CONNECT, DISCONNECT);    /* disconnect VF from Test E
   dOutput (VF_COTLC_CONNECT, DISCONNECT);    /* disconnect VF from Test E
   sendMessageToLC (shelfAddress, lineAddress, RT_REFLECTIVE_OFF);
   sendMessageToLC (shelfAddress, lineAddress, LC_TEST_INPUT_OFF);

   return (IDLE_STATE);

};  /* functionG */
```

```
%[

/****-----------------------------------------------------------------------
*                    RAYCHEM Corp. / Telecommunications
*
*          File:  tss.sm / tss.c
*       Project:  Miniplex
*       Created:  September 11, 1990
*    Tools used:  Microsoft C compiler v. 5.00
*                 Turbo Debugger 2.0
*
*    Description:
*
*       The initials TSS stand for Test System Supervisor.
*
*       This state machine is responsible for supervising test performed
*       by the Master Controller.   For the majority of the time, this state
*       machine will remain in the IDLE state, until a test_request_m
*       is received.
*
*       This state machine starts and collects results from the
*       lineTestHandler state machine.
*
*       This state receives messages from the frame bus.
*
*
*    Compilation procedure:
*       TSS.SM is the control source for TSS.C
*       The SMC (State Machine Compiler) takes .SM and creates .C
*       example:  smc < TSS.SM > TSS.C
*
*    Modification History:
*       9/13/90     First Version.  GL
*
*****-----------------------------------------------------------------------

#include "rts.h"
#include "DAMLlit.h"
#include "DAMLmsg.h"
#include "DAMLcnf.h"
#include "inp.h"
#include "out.h"
#include "pol.h"


]%

stateMachines = {testSystemSupervisor};

smDataTypeDef %[
                   unsigned someData;
                   unsigned moreData;
]% SMX_DATA_T;
states = {          IDLE_STATE
                   ,TEST_LINE_STATE
};


messages = {        SM_INITIALIZE
                   ,fp_test_request_m
                   ,pgtc_test_request_m
                   ,line_test_done_m
};


transProcs = {     powerOn
                  ,functionA
```

```
                ,functionB
                ,functionC
                ,functionD
                ,ignoreMsg
};

transitions = {  IDLE_STATE {
                    SM_INITIALIZE                  ,powerOn
                   ,fp_test_request_m              ,functionA
                   ,pgtc_test_request_m            ,ignoreMsg
                   ,line_test_done_m               ,ignoreMsg
                 }

                 TEST_LINE_STATE {
                    SM_INITIALIZE                  ,powerOn
                   ,fp_test_request_m              ,functionB
                   ,pgtc_test_request_m            ,functionC
                   ,line_test_done_m               ,functionD
                 }

} ;

%[

#define TEST_DEBUG 1
#define TIMEOUT_VALUE      300

/*****************************************************************/
/*                  External Declarations                        */
/*****************************************************************/

extern void getLCstatus (BYTE, BYTE, LC_STATUS_T *);

/*****************************************************************/
/*                  Local Variables                              */
/*****************************************************************/

typedef struct {
   WORD channel1;
   WORD channel2;
   WORD lc;
   WORD dsl;
   WORD rt;
} LINE_TEST_RESULT;

typedef LINE_TEST_RESULT LINE_TEST_TABLE [MAX_NUMBER_OF_SC+1][MAX_NUMBER_OF

LINE_TEST_TABLE lineTestTable;

SM_NAME_T requester;
BYTE shelfAddress;
BYTE lineAddress;

/*****************************************************************/
/*                  Local Procedures                             */
/*****************************************************************/

/*****************************************************************/
/*                  Transition procedures                        */
/*****************************************************************/

static SM_STATE_T powerOn (msg, self)
MSG_T *msg;
SM_DESCRIPTOR_T *self;
{
int i, j;
```

```
#ifdef TEST_DEBUG
   printf("TSS:  Test System Supervisor Executed Power On\n");
#endif


   for (i = 1;  i <= MAX_NUMBER_OF_SC;  i++) {
      for (j = 1;  j <= MAX_NUMBER_OF_LC;  j++) {
         lineTestTable[i][j].channel1 = NOT_TESTED;
         lineTestTable[i][j].channel2 = NOT_TESTED;
         lineTestTable[i][j].lc =       NOT_TESTED;
         lineTestTable[i][j].dsl =      NOT_TESTED;
         lineTestTable[i][j].rt =       NOT_TESTED;
      }
   }
   return (IDLE_STATE);
};  /* powerOn */

/****************************************************************/
/*                    Function A                                */
/****************************************************************/

static SM_STATE_T functionA (msg, self)     /* fp_test_request_m */
START_TEST_MSG_T *msg;
SM_DESCRIPTOR_T *self;
{
START_TEST_MSG_T *outMsg;
LC_STATUS_T * lcStatusPtr;

#ifdef TEST_DEBUG
   printf("TSS A:  fp_test_request_m\n");
   showMsg((MSG_T *) msg);
#endif


   requester    = msg->msgHdr.fields.origin;
   shelfAddress = msg->scAddr;
   lineAddress  = msg->lcAddr;

   getLCstatus (shelfAddress, lineAddress, lcStatusPtr);

   if ((lcStatusPtr->statusValidity == OKAY) &&
       (lcStatusPtr->LCpresent == YES) &&
       (lcStatusPtr->SC_LC_CommStat == UP) &&
       (lcStatusPtr->lineAstat == OFF) &&
       (lcStatusPtr->lineBstat == OFF)) {
      outMsg = (START_TEST_MSG_T *) msgAlloc (sizeof(START_TEST_MSG_T)
                                              - sizeof(MSG_T));
      outMsg->msgHdr.fields.name = start_line_test_m;
      outMsg->msgHdr.fields.dest = lineTestHandler;
      outMsg->msgHdr.fields.origin = testSystemSupervisor;
      outMsg->msgHdr.fields.priority = HARDWARE_PRIORITY;
      outMsg->scAddr = shelfAddress;
      outMsg->lcAddr = lineAddress;

      sendMsg ((MSG_T *) outMsg);
      return (TEST_LINE_STATE);
   }
   else {
      sendBasicMessage (testSystemSupervisor, requester, line_busy_m, 0);
      return (self->state);
   }

};  /* functionA */

/****************************************************************/
/*                    Function B                                */
/****************************************************************/
```

```
static SM_STATE_T functionB (msg, self)     /* fp_test_request_m */
LC_TO_MC_FORMAT_T *msg;
SM_DESCRIPTOR_T *self;
{

#ifdef TEST_DEBUG
   printf("TSS B:  fp_test_request_m\n");
   showMsg((MSG_T *) msg);
#endif

   sendBasicMessage (testSystemSupervisor, requester, test_system_busy_m, 0
   return (self->state);

};  /* functionB */


/******************************************************************/
/*                    Function C                                  */
/******************************************************************/

static SM_STATE_T functionC (msg, self)     /* pgtc_test_request_m */
LC_TO_MC_FORMAT_T *msg;
SM_DESCRIPTOR_T *self;
{

#ifdef TEST_DEBUG
   printf("TSS C:  pgtc_test_request_m\n");
   showMsg((MSG_T *) msg);
#endif

   if ((msg->scAddr == shelfAddress) && (msg->lcAddr == lineAddress)) {
      msg->msgHdr.fields.origin = testSystemSupervisor;
      msg->msgHdr.fields.dest = channelTesterForLC;
      sendMsg ((MSG_T *) msg);
   }
   return (self->state);

};  /* functionC */

/******************************************************************/
/*                    Function D                                  */
/******************************************************************/

static SM_STATE_T functionD (msg, self)     /* line_test_done_m */
TEST_RESULT_MSG_T *msg;
SM_DESCRIPTOR_T *self;
{
LINE_TEST_RESULT * tablePtr;

#ifdef TEST_DEBUG
   printf("TSS D:  line_test_done_m\n");
   /* showMsg((MSG_T *) msg); */
#endif

   tablePtr = &(lineTestTable[shelfAddress][lineAddress]);
   tablePtr->channel1 = msg->ch1Test;
   tablePtr->channel2 = msg->ch2Test;
   tablePtr->lc       = msg->lcTest;
   tablePtr->dsl      = msg->dslTest;
   tablePtr->rt       = msg->rtTest;
   msg->msgHdr.fields.origin = testSystemSupervisor;
   msg->msgHdr.fields.dest = requester;

   sendMsg ((MSG_T *) msg);
   return (IDLE_STATE);

};  /* functionD */

]%
```

```
%[

/****-----------------------------------------------------------------------
*                    RAYCHEM Corp. / Telecommunications
*
*          File:  ctl.sm / ctl.c
*       Project:  Miniplex
*       Created:  September 11, 1990
*    Tools used:  Microsoft C compiler v. 5.00
*                 Turbo Debugger 2.0
*
*    Description:
*
*       The initials CTL stand for Channel Test for LC.
*
*       This state machine is responsible for the channel test performed
*       through the line card.   For the majority of the time, this state
*       machine will remain in the IDLE state, until a start_channel_test_m
*       is received.  When the channel test is finished, this state machine
*       will send the result through the channel_test_done_m message to
*       whomever sent the start_channel_test_m message.
*
*       This state machine sends and receives messages to the frame bus.
*
*
*    Compilation procedure:
*       CTL.SM is the control source for CTL.C
*       The SMC (State Machine Compiler) takes .SM and creates .C
*       example:  smc < CTL.SM > CTL.C
*
*    Modification History:
*       9/13/90     First Version.  GL
*
*****----------------------------------------------------------------------

#include "rts.h"
#include "DAMLlit.h"
#include "DAMLmsg.h"
#include "DAMLcnf.h"
#include "inp.h"
#include "out.h"


]%

stateMachines = {channelTesterForLC};

smDataTypeDef %[
                  unsigned someData;
                  unsigned moreData;
]% SMX_DATA_T;


states = {          IDLE_STATE
                   ,SELECT_LINE_STATE
                   ,TEST_REQUEST_STATE
                   ,ABSORBANT_STATE
                   ,ON_HOOK_STATE
                   ,RINGER_TEST_STATE
                   ,REFLECTIVE_STATE
};


messages = {        SM_INITIALIZE
                   ,start_channel_test_m
                   ,lc_line_connected_m
                   ,pgtc_test_request_m
```

```
                  ,lc_absorbant_connected_m
                  ,lc_absorbant_disconnected_m
                  ,lc_ring_detected_m
                  ,lc_reflective_connected_m
                  ,timeout_m
};

transProcs = {    powerOn
                 ,functionA
                 ,functionB
                 ,functionC
                 ,functionD
                 ,functionE
                 ,functionF
                 ,functionG
                 ,functionH
                 ,ignoreMsg
};

transitions = {   IDLE_STATE {
                     SM_INITIALIZE                  ,powerOn
                    ,start_channel_test_m           ,functionA
                    ,lc_line_connected_m            ,ignoreMsg
                    ,pgtc_test_request_m            ,ignoreMsg
                    ,lc_absorbant_connected_m       ,ignoreMsg
                    ,lc_absorbant_disconnected_m    ,ignoreMsg
                    ,lc_ring_detected_m             ,ignoreMsg
                    ,lc_reflective_connected_m      ,ignoreMsg
                    ,timeout_m                      ,functionH
                  }

                  SELECT_LINE_STATE {
                     SM_INITIALIZE                  ,powerOn
                    ,start_channel_test_m           ,ignoreMsg
                    ,lc_line_connected_m            ,functionB
                    ,pgtc_test_request_m            ,ignoreMsg
                    ,lc_absorbant_connected_m       ,ignoreMsg
                    ,lc_absorbant_disconnected_m    ,ignoreMsg
                    ,lc_ring_detected_m             ,ignoreMsg
                    ,lc_reflective_connected_m      ,ignoreMsg
                    ,timeout_m                      ,functionH
                  }

                  TEST_REQUEST_STATE {
                     SM_INITIALIZE                  ,powerOn
                    ,start_channel_test_m           ,ignoreMsg
                    ,lc_line_connected_m            ,ignoreMsg
                    ,pgtc_test_request_m            ,functionC
                    ,lc_absorbant_connected_m       ,ignoreMsg
                    ,lc_absorbant_disconnected_m    ,ignoreMsg
                    ,lc_ring_detected_m             ,ignoreMsg
                    ,lc_reflective_connected_m      ,ignoreMsg
                    ,timeout_m                      ,functionH
                  }

                  ABSORBANT_STATE {
                     SM_INITIALIZE                  ,powerOn
                    ,start_channel_test_m           ,ignoreMsg
                    ,lc_line_connected_m            ,ignoreMsg
                    ,pgtc_test_request_m            ,ignoreMsg
                    ,lc_absorbant_connected_m       ,functionD
                    ,lc_absorbant_disconnected_m    ,ignoreMsg
                    ,lc_ring_detected_m             ,ignoreMsg
                    ,lc_reflective_connected_m      ,ignoreMsg
                    ,timeout_m                      ,functionH
                  }
```

```
ON_HOOK_STATE {
    SM_INITIALIZE                         ,powerOn
   ,start_channel_test_m                  ,ignoreMsg
   ,lc_line_connected_m                   ,ignoreMsg
   ,pgtc_test_request_m                   ,ignoreMsg
   ,lc_absorbant_connected_m              ,ignoreMsg
   ,lc_absorbant_disconnected_m           ,functionE
   ,lc_ring_detected_m                    ,ignoreMsg
   ,lc_reflective_connected_m             ,ignoreMsg
   ,timeout_m                             ,functionH
}

RINGER_TEST_STATE {
    SM_INITIALIZE                         ,powerOn
   ,start_channel_test_m                  ,ignoreMsg
   ,lc_line_connected_m                   ,ignoreMsg
   ,pgtc_test_request_m                   ,ignoreMsg
   ,lc_absorbant_connected_m              ,ignoreMsg
   ,lc_absorbant_disconnected_m           ,ignoreMsg
   ,lc_ring_detected_m                    ,functionF
   ,lc_reflective_connected_m             ,ignoreMsg
   ,timeout_m                             ,functionH
}

REFLECTIVE_STATE {
    SM_INITIALIZE                         ,powerOn
   ,start_channel_test_m                  ,ignoreMsg
   ,lc_line_connected_m                   ,ignoreMsg
   ,pgtc_test_request_m                   ,ignoreMsg
   ,lc_absorbant_connected_m              ,ignoreMsg
   ,lc_absorbant_disconnected_m           ,ignoreMsg
   ,lc_ring_detected_m                    ,ignoreMsg
   ,lc_reflective_connected_m             ,functionG
   ,timeout_m                             ,functionH
}

} ;

%[

#define TEST_DEBUG 1
#define TIMEOUT_VALUE      300L

/*****************************************************************/
/*                 External Declarations                         */
/*****************************************************************/

/*****************************************************************/
/*                 Local Variables                               */
/*****************************************************************/

SM_NAME_T requester;
BYTE shelfAddress;
BYTE lineAddress;
BYTE channel;

WORD testRequestResult;
WORD absorbantResult;
WORD onHookResult;
WORD ringResult;
WORD reflectiveResult;

TIMER_MSG_T *timeout;
```

```
/*********************************************************************/
/*                      Function A                                   */
/*********************************************************************/

static SM_STATE_T functionA (msg, self)      /* start_rt_test_m */
START_TEST_MSG_T *msg;
SM_DESCRIPTOR_T *self;
{

#ifdef TEST_DEBUG
   printf("RTT A:  start_rt_test_m\n");
   showMsg((MSG_T *) msg);
#endif


   channel1 = NOT_TESTED;
   channel2 = NOT_TESTED;

   requester    = msg->msgHdr.fields.origin;
   shelfAddress = msg->scAddr;
   lineAddress  = msg->lcAddr;

   sendTestMessageToLC (rtTester, shelfAddress, lineAddress, LC_DSL_RELAY);
   sendBasicMessage (rtTester, lceHandler, connect_emulator_m, 0);

   return (CONNECT_LCE_STATE);

};  /* functionA */

/*********************************************************************/
/*                      Function B                                   */
/*********************************************************************/

static SM_STATE_T functionB (msg, self)      /* done_m */
RESPONSE_MSG_T *msg;
SM_DESCRIPTOR_T *self;
{
START_TEST_MSG_T *outMsg;

#ifdef TEST_DEBUG
   printf("RTT B:  done_m\n");
   showMsg((MSG_T *) msg);
#endif


   if (msg->response == OKAY) {
      outMsg = (START_TEST_MSG_T *) msgAlloc (sizeof (START_TEST_MSG_T)
                                            - sizeof (MSG_T));
      outMsg->msgHdr.fields.name = start_channel_test_m;
      outMsg->msgHdr.fields.dest = channelTesterForRT;
      outMsg->msgHdr.fields.origin = rtTester;
      outMsg->msgHdr.fields.priority = HARDWARE_PRIORITY;
      outMsg->scAddr = shelfAddress;
      outMsg->lcAddr = lineAddress;
      outMsg->channel = 1;
      sendMsg ((MSG_T *) outMsg);

      return (TEST_CHANNEL_A_STATE);
   }
   else {
      sendTestMessageToLC (rtTester, shelfAddress, lineAddress, CLEAR_ALL);
      sendBasicMessage (rtTester, lceHandler, disconnect_emulator_m, 0);
      sendBasicMessage (rtTester, requester, rt_test_done_m, TEST_TIMEOUT);
      return (IDLE_STATE);
   }

};  /* functionB */
```

```
/****************************************************************/
/*                      Function C                              */
/****************************************************************/

static SM_STATE_T functionC (msg, self)     /* channel_test_done_m */
BASIC_MSG_T *msg;
SM_DESCRIPTOR_T *self;
{
START_TEST_MSG_T *outMsg;

#ifdef TEST_DEBUG
   printf("RTT C:  channel_test_done\n");
   showMsg((MSG_T *) msg);
#endif


   channel1 = msg->info1;
   outMsg = (START_TEST_MSG_T *) msgAlloc (sizeof (START_TEST_MSG_T)
                                        - sizeof (MSG_T));
   outMsg->msgHdr.fields.name = start_channel_test_m;
   outMsg->msgHdr.fields.dest = channelTesterForRT;
   outMsg->msgHdr.fields.origin = rtTester;
   outMsg->msgHdr.fields.priority = HARDWARE_PRIORITY;
   outMsg->scAddr = shelfAddress;
   outMsg->lcAddr = lineAddress;
   outMsg->channel = 2;
   sendMsg ((MSG_T *) outMsg);

   return (TEST_CHANNEL_B_STATE);

};  /* functionC */

/****************************************************************/
/*                      Function D                              */
/****************************************************************/

static SM_STATE_T functionD (msg, self)     /* channel_test_done_m */
BASIC_MSG_T *msg;
SM_DESCRIPTOR_T *self;
{
WORD result;

#ifdef DEBUG
   printf("RTT D:  channel_test_done_m \n");
   showMsg((MSG_T *) msg);
#endif


   channel2 = msg->info1;

   sendTestMessageToLC (rtTester, shelfAddress, lineAddress, CLEAR_ALL);
   sendBasicMessage (rtTester, lceHandler, disconnect_emulator_m, 0);

   if ((channel1 == PASSED) && (channel2 == PASSED)) {
      result = PASSED;
   }
   else {
      result = FAILED;
   }
   sendBasicMessage (rtTester, requester, rt_test_done_m, result);
   return (IDLE_STATE);

};  /* functionD */

]%
```

```
/**********************************************************************/
/*                      Local Variables                              */
/**********************************************************************/

SM_NAME_T requester;
BYTE shelfAddress;
BYTE lineAddress;
BYTE channel;

WORD absorbantResult;
WORD onHookResult;
WORD ringResult;
WORD reflectiveResult;

TIMER_MSG_T *timeout;

/**********************************************************************/
/*                      Function C                                   */
/**********************************************************************/

static SM_STATE_T functionC (msg, self)     /* timeout_m */
BASIC_MSG_T *msg;
SM_DESCRIPTOR_T *self;
{
int rcurrent;

#ifdef TEST_DEBUG
   printf("DST C:  timeout_m\n");
   showMsg((MSG_T *) msg);
#endif


   rcurrent = getInput (RING_CURRENT_IN);
   if ((rcurrent > -SHORT_CURRENT) && (rcurrent < SHORT_CURRENT)) {
      ringGroundShort = PASSED;
   }
   else {
      ringGroundShort = FAILED;
   }
   setupTipRingShortTest ();
   timeout = startTimer (timeout_m, TIMEOUT_VALUE);
   return (TIP_RING_SHORT_STATE);

};  /* functionC */

/**********************************************************************/
/*                      Function D                                   */
/**********************************************************************/

static SM_STATE_T functionD (msg, self)     /* timeout_m */
BASIC_MSG_T *msg;
SM_DESCRIPTOR_T *self;
{
int rcurrent;
int tcurrent;

#ifdef TEST_DEBUG
   printf("DST D:  timeout_m \n");
   showMsg((MSG_T *) msg);
#endif


   rcurrent = getInput (RING_CURRENT_IN);
   tcurrent = getInput (TIP_CURRENT_IN);
   if ((rcurrent > -SHORT_CURRENT) && (rcurrent < SHORT_CURRENT)) {
      tipRingShort = PASSED;
   }
```

```
   else {
      tipRingShort = FAILED;
   }

   setupRT_InPlaceTest ();
   timeout = startTimer (timeout_m, TIMEOUT_VALUE);
   return (RT_IN_PLACE_STATE);

};  /* functionD */

/******************************************************************/
/*                     Function E                                 */
/******************************************************************/

static SM_STATE_T functionE (msg, self)     /* timeout_m */
BASIC_MSG_T *msg;
SM_DESCRIPTOR_T *self;
{
int rcurrent;
int tcurrent;

#ifdef DEBUG
   printf("DST E:  timeout_m \n");
   showMsg((MSG_T *) msg);
#endif


   rcurrent = getInput (RING_CURRENT_IN);
   tcurrent = getInput (TIP_CURRENT_IN);
   if ((rcurrent > -SHORT_CURRENT) && (rcurrent < SHORT_CURRENT)) {
      rtInPlace = PASSED;
   }
   else {
      rtInPlace = FAILED;
   }

   setupRingReversalTest ();
   timeout = startTimer (timeout_m, TIMEOUT_VALUE);
   return (RING_REVERSAL_STATE);

};  /* functionE */

/******************************************************************/
/*                     Function F                                 */
/******************************************************************/

static SM_STATE_T functionF (msg, self)     /* timeout_m */
BASIC_MSG_T *msg;
SM_DESCRIPTOR_T *self;
{
#ifdef TEST_DEBUG
   printf("CTL G:  timeout_m \n");
   showMsg((MSG_T *) msg);
#endif


   ringCurrent1 = getInput (RING_CURRENT_IN);
   tipCurrent1 = getInput (TIP_CURRENT_IN);

   setupTipReversalTest ();
   timeout = startTimer (timeout_m, TIMEOUT_VALUE);
   return (TIP_REVERSAL_STATE);

};  /* functionF */
```

```
states = {         IDLE_STATE
                  ,SELECT_SHELF_STATE
                  ,TEST_CHANNEL_A_STATE
                  ,TEST_CHANNEL_B_STATE
                  ,TEST_LC_STATE
                  ,TEST_DSL_STATE
                  ,TEST_RT_STATE
};

messages = {       SM_INITIALIZE
                  ,start_line_test_m
                  ,channel_test_done_m
                  ,lc_test_done_m
                  ,dsl_test_done_m
                  ,rt_test_done_m
                  ,timeout_m
};

transProcs = {    powerOn
                 ,functionA
                 ,functionB
                 ,functionC
                 ,functionD
                 ,functionE
                 ,functionF
                 ,functionG
                 ,ignoreMsg
};

transitions = {   IDLE_STATE {
                     SM_INITIALIZE                   ,powerOn
                    ,start_line_test_m               ,functionA
                    ,timeout_m                       ,ignoreMsg
                    ,channel_test_done_m             ,ignoreMsg
                    ,lc_test_done_m                  ,ignoreMsg
                    ,dsl_test_done_m                 ,ignoreMsg
                    ,rt_test_done_m                  ,ignoreMsg
                  }

                  SELECT_SHELF_STATE {
                     SM_INITIALIZE                   ,powerOn
                    ,start_line_test_m               ,ignoreMsg
                    ,timeout_m                       ,functionB
                    ,channel_test_done_m             ,ignoreMsg
                    ,lc_test_done_m                  ,ignoreMsg
                    ,dsl_test_done_m                 ,ignoreMsg
                    ,rt_test_done_m                  ,ignoreMsg
                  }

                  TEST_CHANNEL_A_STATE {
                     SM_INITIALIZE                   ,powerOn
                    ,start_line_test_m               ,ignoreMsg
```

```
%[

/****-----------------------------------------------------------------------
*                   RAYCHEM Corp. / Telecommunications
*
*          File:  lth.sm / lth.c
*       Project:  Miniplex
*       Created:  September 11, 1990
*    Tools used:  Microsoft C compiler v. 5.00
*                 Turbo Debugger 2.0
*
*    Description:
*
*       The initials LTH stand for Line Test Handler.
*
*       This state machine is responsible for coordinating the test
*       performed to the line set.   For the majority of the time, this stat
*       machine will remain in the IDLE state, until a start_line_test_m
*       is received.  When the line test is finished, this state machine
*       will send the result through the line_test_done_m message to
*       whomever sent the start_line_test_m message.
*
*       This state machine starts and collects results from the
*       channelTestForLC, lcTester, dslTester, and rtTester state machines.
*
*       This state machine sends and receives messages to the frame bus.
*
*
*    Compilation procedure:
*       LTH.SM is the control source for LTH.C
*       The SMC (State Machine Compiler) takes .SM and creates .C
*       example:  smc < LTH.SM > LTH.C
*
*    Modification History:
*       9/13/90     First Version.  GL
*
*****------------------------------------------------------------------------

#include "rts.h"
#include "DAMLlit.h"
#include "DAMLmsg.h"
#include "DAMLcnf.h"
#include "inp.h"
#include "out.h"


]%

stateMachines = {lineTestHandler};

smDataTypeDef %[
                  unsigned someData;
                  unsigned moreData;
]% SMX_DATA_T;

                 ,timeout_m                     ,ignoreMsg
                 ,channel_test_done_m           ,functionC
                 ,lc_test_done_m                ,ignoreMsg
                 ,dsl_test_done_m               ,ignoreMsg
                 ,rt_test_done_m                ,ignoreMsg
               }

               TEST_CHANNEL_B_STATE {
                  SM_INITIALIZE                 ,powerOn
                 ,start_line_test_m             ,ignoreMsg
                 ,timeout_m                     ,ignoreMsg
                 ,channel_test_done_m           ,functionD
                 ,lc_test_done_m                ,ignoreMsg
```

```
      ,dsl_test_done_m                  ,ignoreMsg
      ,rt_test_done_m                   ,ignoreMsg
    }

    TEST_LC_STATE {
       SM_INITIALIZE                    ,powerOn
      ,start_line_test_m                ,ignoreMsg
      ,timeout_m                        ,ignoreMsg
      ,channel_test_done_m              ,ignoreMsg
      ,lc_test_done_m                   ,functionE
      ,dsl_test_done_m                  ,ignoreMsg
      ,rt_test_done_m                   ,ignoreMsg
    }

    TEST_DSL_STATE {
       SM_INITIALIZE                    ,powerOn
      ,start_line_test_m                ,ignoreMsg
      ,timeout_m                        ,ignoreMsg
      ,channel_test_done_m              ,ignoreMsg
      ,lc_test_done_m                   ,ignoreMsg
      ,dsl_test_done_m                  ,functionF
      ,rt_test_done_m                   ,ignoreMsg
    }

    TEST_RT_STATE {
       SM_INITIALIZE                    ,powerOn
      ,start_line_test_m                ,ignoreMsg
      ,timeout_m                        ,ignoreMsg
      ,channel_test_done_m              ,ignoreMsg
      ,lc_test_done_m                   ,ignoreMsg
      ,dsl_test_done_m                  ,ignoreMsg
      ,rt_test_done_m                   ,functionG
    }

} ;

%[

#define TEST_DEBUG 1
#define TIMEOUT_VALUE      300L

/*****************************************************************/
/*                  External Declarations                        */
/*****************************************************************/

/*****************************************************************/
/*                  Local Variables                              */
/*****************************************************************/

SM_NAME_T requester;
BYTE shelfAddress;
BYTE lineAddress;

WORD channel1Test;
WORD channel2Test;
WORD lcTest;
WORD dslTest;
WORD rtTest;

TIMER_MSG_T *timeout;
```

```
/*******************************************************************/
/*                    Local Procedures                             */
/*******************************************************************/


static void R_Delay (t)
int t;
{
int i;

   for (i = 0;  i < t*500;  i++);
}


static void sendTestMessageToSC (origin, scNumber, pattern)
SM_NAME_T origin;
BYTE scNumber;
BYTE pattern;
{
MC_TO_SC_FORMAT_T *outMsg;

   outMsg = (MC_TO_SC_FORMAT_T *) msgAlloc (sizeof(MC_TO_SC_FORMAT_T)
                                            - sizeof(MSG_T));
   outMsg->msgHdr.fields.name = sc_test_setup_m;
   outMsg->msgHdr.fields.dest = shellController;
   outMsg->msgHdr.fields.origin = origin;
   outMsg->msgHdr.fields.priority = HARDWARE_PRIORITY;
   outMsg->scAddr = scNumber;
   outMsg->frameMsgType = SC_TEST_REQ;
   outMsg->len = 1;
   outMsg->data = pattern;
   sendMsg ((MSG_T *) outMsg);

}   /* sendTestMessageToSC */


static void sendLineTestResults ()
{
TEST_RESULT_MSG_T * outMsg;

   outMsg = (TEST_RESULT_MSG_T *) msgAlloc (sizeof(TEST_RESULT_MSG_T)
                                          - sizeof(MSG_T));
   outMsg->msgHdr.fields.name = line_test_done_m;
   outMsg->msgHdr.fields.dest = requester;
   outMsg->msgHdr.fields.origin = lineTestHandler;
   outMsg->msgHdr.fields.priority = HARDWARE_PRIORITY;
   outMsg->scAddr = shelfAddress;
   outMsg->lcAddr = lineAddress;
   outMsg->ch1Test = channel1Test;
   outMsg->ch2Test = channel2Test;
   outMsg->lcTest = lcTest;
   outMsg->dslTest = dslTest;
   outMsg->rtTest = rtTest;

   sendMsg ((MSG_T *) outMsg);

}  /* sendLineTestResults */
```

```
/*****************************************************************/
/*                    Transition procedures                      */
/*****************************************************************/

static SM_STATE_T powerOn (msg, self)
MSG_T *msg;
SM_DESCRIPTOR_T *self;
{

#ifdef TEST_DEBUG
   printf("LTH:  Line Test Handler Executed Power On\n");
#endif


   return (IDLE_STATE);
};  /* powerOn */

/*****************************************************************/
/*                    Transition procedures                      */
/*****************************************************************/

static SM_STATE_T powerOn (msg, self)
MSG_T *msg;
SM_DESCRIPTOR_T *self;
{

#ifdef TEST_DEBUG
   printf("CTR:  Channel Tester for RT Executed Power On\n");
#endif


   return (IDLE_STATE);
};  /* powerOn */


/*****************************************************************/
/*                       Function A                              */
/*****************************************************************/

static SM_STATE_T functionA (msg, self)     /* start_channel_test_m */
START_TEST_MSG_T *msg;
SM_DESCRIPTOR_T *self;
{

#ifdef TEST_DEBUG
   printf("CTR A:  start_channel_test_m\n");
   showMsg((MSG_T *) msg);
#endif


   requester = msg->msgHdr.fields.origin;
   shelfAddress = msg->scAddr;
   lineAddress  = msg->lcAddr;
   channel = msg->channel;

   absorbantResult   = NOT_TESTED;
   onHookResult      = NOT_TESTED;
   ringResult        = NOT_TESTED;
   reflectiveResult  = NOT_TESTED;

   sendBasicMessage (channelTesterForRT, lceHandler, connect_line_m, channe
   return (SELECT_LINE_STATE);

};  /* functionA */
```

```
/*****************************************************************/
/*                     Function C                                */
/*****************************************************************/

static SM_STATE_T functionC (msg, self)     /* absorbant_connected_m */
BASIC_MSG_T *msg;
SM_DESCRIPTOR_T *self;
{
int reflected;

#ifdef TEST_DEBUG
   printf("CTR C:  absorbant_connected_m \n");
   showMsg((MSG_T *) msg);
#endif


   reflected = getInput (REFLECTED_VOLTAGE_IN);
   if (reflected < 20) {
      absorbantResult = PASSED;
   }
   else {
      absorbantResult = FAILED;
   }
   sendBasicMessage (channelTesterForRT, lceHandler,
                     disconnect_absorbant_m, channel);
   return (ON_HOOK_STATE);

};  /* functionC */

/*****************************************************************/
/*                     Function B                                */
/*****************************************************************/

static SM_STATE_T functionB (msg, self)     /* line_connected_m */
BASIC_MSG_T *msg;
SM_DESCRIPTOR_T *self;
{

#ifdef TEST_DEBUG
   printf("CTR B:  line_connected_m\n");
   showMsg((MSG_T *) msg);
#endif


   sendBasicMessage (channelTesterForRT, lceHandler,
                     connect_absorbant_m, channel);
   dOutput (VF_OSC_SELECT, DISCONNECT);            /* select sweep on VF */
   dOutput (VF_LCEM_CONNECT, CONNECT);             /* connect VF from Test
   return (ABSORBANT_STATE);

};  /* functionB */

/*****************************************************************/
/*                     Function D                                */
/*****************************************************************/

static SM_STATE_T functionD (msg, self)     /* absorbant_disconnect_m */
BASIC_MSG_T *msg;
SM_DESCRIPTOR_T *self;
{
int reflected;

#ifdef DEBUG
   printf("CTR D:  absorbant_disconnect_m \n");
   showMsg((MSG_T *) msg);
#endif
```

```
   reflected = getInput (REFLECTED_VOLTAGE_IN);
   if ((reflected > 80) && (reflected < 120)) {
      onHookResult = PASSED;
   }
   else {
      onHookResult = FAILED;
   }
   dOutput (VF_LCEM_CONNECT, DISCONNECT);  /* disconnect VF from LCE */
   sendBasicMessage (channelTesterForRT, lceHandler, request_ring_m, channe
   return (RINGER_TEST_STATE);

};  /* functionD */

/*********************************************************************/
/*                     Function E                                    */
/*********************************************************************/

static SM_STATE_T functionE (msg, self)     /* ring_detected_m */
BASIC_MSG_T *msg;
SM_DESCRIPTOR_T *self;
{

#ifdef TEST_DEBUG
   printf("CTR E:  ring_detected_m \n");
   showMsg((MSG_T *) msg);
#endif


   ringResult = PASSED;
   dOutput (VF_LCEM_CONNECT, CONNECT);             /* connect VF to LCE */
   return (REFLECTIVE_STATE);
};  /* functionE */

/*********************************************************************/
/*                     Function F                                    */
/*********************************************************************/

static SM_STATE_T functionF (msg, self)     /* reflective_connected_m */
BASIC_MSG_T *msg;
SM_DESCRIPTOR_T *self;
{
WORD result;
int  reflected;

#ifdef TEST_DEBUG
   printf("CTR F:  reflective_connected_m\n");
   showMsg((MSG_T *) msg);
#endif


   reflected = getInput (REFLECTED_VOLTAGE_IN);
   if ((reflected > 80) && (reflected < 120)) {
      reflectiveResult = PASSED;
   }
   else {
      reflectiveResult = FAILED;
   }
   dOutput (VF_LCEM_CONNECT, DISCONNECT);  /* disconnect VF from LCE */

   sendBasicMessage (channelTesterForRT, lceHandler,
                     disconnect_reflective_m, channel);
   sendBasicMessage (channelTesterForRT, lceHandler,
                     disconnect_line_m, channel);

   if ((absorbantResult == PASSED) && (onHookResult == PASSED) &&
       (ringResult == PASSED) && (reflectiveResult == PASSED)) {
      result = PASSED;
   }
```

```
   else if ((absorbantResult == FAILED) || (onHookResult == FAILED) ||
            (ringResult == FAILED) || (reflectiveResult == FAILED)) {
      result = FAILED;
   }

   sendBasicMessage (channelTesterForRT, requester,
                     channel_test_done_m, result);

   return (IDLE_STATE);

};  /* functionF */


/*****************************************************************/
/*                       Function G                              */
/*****************************************************************/

static SM_STATE_T functionG (msg, self)     /* timeout_m */
BASIC_MSG_T *msg;
SM_DESCRIPTOR_T *self;
{
WORD request;

#ifdef TEST_DEBUG
   printf("CTR G:  timeout_m\n");
   showMsg((MSG_T *) msg);
#endif


   dOutput (VF_OSC_SELECT, DISCONNECT);            /* select sweep on VF */
   dOutput (VF_LCEM_CONNECT, DISCONNECT);  /* disconnect VF from LCE */

   sendBasicMessage (channelTesterForRT, lceHandler,
                     disconnect_reflective_m, channel);
   sendBasicMessage (channelTesterForRT, lceHandler,
                     disconnect_line_m, channel);
   sendBasicMessage (channelTesterForRT, requester,
                     channel_test_done_m, TEST_TIMEOUT);

   return (IDLE_STATE);

};  /* functionG */

]%
```

```
%[

/****--------------------------------------------------------------------------
*                     RAYCHEM Corp. / Telecommunications
*
*          File:  lct.sm / lct.c
*       Project:  Miniplex
*       Created:  September 11, 1990
*    Tools used:  Microsoft C compiler v. 5.00
*                 Turbo Debugger 2.0
*
*    Description:
*
*       The initials LCT stand for Line Card Tester.
*
*       This state machine is responsible for the Line Card test.
*       For the majority of the time, this state machine will remain in the
*       IDLE state, until a start_lc_test_m is received.  When the Line Card
*       test is finished, this state machine will send the result through th
*       lc_test_done_m message to whomever sent the start_lc_test_m
*       message.
*
*       This state machine sends and receives messages to the frame bus.
*
*
*    Compilation procedure:
*       LCT.SM is the control source for LCT.C
*       The SMC (State Machine Compiler) takes .SM and creates .C
*       example:  smc < LCT.SM > LCT.C
*
*    Modification History:
*       9/13/90     First Version.  GL
*
*****-------------------------------------------------------------------------

#include "rts.h"
#include "DAMLlit.h"
#include "DAMLmsg.h"
#include "DAMLcnf.h"
#include "inp.h"
#include "out.h"


]%

stateMachines = {lcTester};

smDataTypeDef %[
                  unsigned someData;
                  unsigned moreData;
]% SMX_DATA_T;


states = {         IDLE_STATE
                  ,CONNECT_RTE_STATE

                  ,TEST_CHANNEL_A_STATE
                  ,TEST_CHANNEL_B_STATE
};


messages = {       SM_INITIALIZE
                  ,start_lc_test_m
                  ,done_m
                  ,channel_test_done_m
};
```

```
transProcs = {    powerOn
                 ,functionA
                 ,functionB
                 ,functionC
                 ,functionD
                 ,ignoreMsg
};

transitions = {  IDLE_STATE {
                    SM_INITIALIZE                  ,powerOn
                  ,start_lc_test_m                 ,functionA
                  ,done_m                          ,ignoreMsg
                  ,channel_test_done_m             ,ignoreMsg
                 }

                 CONNECT_RTE_STATE {
                    SM_INITIALIZE                  ,powerOn
                  ,start_lc_test_m                 ,ignoreMsg
                  ,done_m                          ,functionB
                  ,channel_test_done_m             ,ignoreMsg
                 }

                 TEST_CHANNEL_A_STATE {
                    SM_INITIALIZE                  ,powerOn
                  ,start_lc_test_m                 ,ignoreMsg
                  ,done_m                          ,ignoreMsg
                  ,channel_test_done_m             ,functionC
                 }

                 TEST_CHANNEL_B_STATE {
                    SM_INITIALIZE                  ,powerOn
                  ,start_lc_test_m                 ,ignoreMsg
                  ,done_m                          ,ignoreMsg
                  ,channel_test_done_m             ,functionD
                 }

} ;

%[

#define TEST_DEBUG          1
#define TIMEOUT_VALUE               300L


/*****************************************************************/
/*                   External Declarations                      */
/*****************************************************************/

/*****************************************************************/
/*                   Local Variables                            */
/*****************************************************************/

SM_NAME_T requester;
BYTE shelfAddress;
BYTE lineAddress;

WORD channel1;
WORD channel2;

TIMER_MSG_T *timeout;

/*****************************************************************/
/*                   Function A                                 */
/*****************************************************************/

static SM_STATE_T functionA (msg, self)      /* start_rt_test_m */
START_TEST_MSG_T *msg;
```

```
SM_DESCRIPTOR_T *self;
{

#ifdef TEST_DEBUG
   printf("RTT A:  start_rt_test_m\n");
   showMsg((MSG_T *) msg);
#endif


   channel1 = NOT_TESTED;
   channel2 = NOT_TESTED;

   requester    = msg->msgHdr.fields.origin;
   shelfAddress = msg->scAddr;
   lineAddress  = msg->lcAddr;

   sendTestMessageToLC (rtTester, shelfAddress, lineAddress, LC_DSL_REL
   sendBasicMessage (rtTester, lceHandler, connect_emulator_m, 0);

   return (CONNECT_LCE_STATE);

}; /* functionA */

 /***************************************************************/
 /*                     Function B                              */
 /***************************************************************/

 static SM_STATE_T functionB (msg, self)     /* done_m */
 RESPONSE_MSG_T *msg;
 SM_DESCRIPTOR_T *self;
 {
 START_TEST_MSG_T *outMsg;

 #ifdef TEST_DEBUG
    printf("RTT B:  done_m\n");
    showMsg((MSG_T *) msg);
 #endif


    if (msg->response == OKAY) {
       outMsg = (START_TEST_MSG_T *) msgAlloc (sizeof (START_TEST_MSG_T)
                                        - sizeof (MSG_T));
       outMsg->msgHdr.fields.name = start_channel_test_m;
       outMsg->msgHdr.fields.dest = channelTesterForRT;
       outMsg->msgHdr.fields.origin = rtTester;
       outMsg->msgHdr.fields.priority = HARDWARE_PRIORITY;
       outMsg->scAddr = shelfAddress;
       outMsg->lcAddr = lineAddress;
       outMsg->channel = 1;
       sendMsg ((MSG_T *) outMsg);

       return (TEST_CHANNEL_A_STATE);
    }
    else {
       sendTestMessageToLC (rtTester, shelfAddress, lineAddress, CLEAR_ALI
       sendBasicMessage (rtTester, lceHandler, disconnect_emulator_m, 0);
       sendBasicMessage (rtTester, requester, rt_test_done_m, TEST_TIMEOUT
       return (IDLE_STATE);
    }

  }; /* functionB */
```

```
/*****************************************************************/
/*                    Function C                                 */
/*****************************************************************/

static SM_STATE_T functionC (msg, self)     /* channel_test_done_m */
BASIC_MSG_T *msg;
SM_DESCRIPTOR_T *self;
{
START_TEST_MSG_T *outMsg;

#ifdef TEST_DEBUG
   printf("RTT C:  channel_test_done\n");
   showMsg((MSG_T *) msg);
#endif


   channel1 = msg->info1;
   outMsg = (START_TEST_MSG_T *) msgAlloc (sizeof (START_TEST_MSG_T)
                                        - sizeof (MSG_T));
   outMsg->msgHdr.fields.name = start_channel_test_m;
   outMsg->msgHdr.fields.dest = channelTesterForRT;
   outMsg->msgHdr.fields.origin = rtTester;
   outMsg->msgHdr.fields.priority = HARDWARE_PRIORITY;
   outMsg->scAddr = shelfAddress;
   outMsg->lcAddr = lineAddress;
   outMsg->channel = 2;
   sendMsg ((MSG_T *) outMsg);

   return (TEST_CHANNEL_B_STATE);

};  /* functionC */

/*****************************************************************/
/*                    Function D                                 */
/*****************************************************************/

static SM_STATE_T functionD (msg, self)     /* channel_test_done_m */
BASIC_MSG_T *msg;
SM_DESCRIPTOR_T *self;
{
WORD result;

#ifdef DEBUG
   printf("RTT D:  channel_test_done_m \n");
   showMsg((MSG_T *) msg);
#endif


   channel2 = msg->info1;

   sendTestMessageToLC (rtTester, shelfAddress, lineAddress, CLEAR_ALL);
   sendBasicMessage (rtTester, lceHandler, disconnect_emulator_m, 0);

   if ((channel1 == PASSED) && (channel2 == PASSED)) {
      result = PASSED;
   }
   else {
      result = FAILED;
   }
   sendBasicMessage (rtTester, requester, rt_test_done_m, result);
   return (IDLE_STATE);

};  /* functionD */

]%
```

```
/*******************************************************************/
/*                    Local Variables                              */
/*******************************************************************/

SM_NAME_T requester;
BYTE shelfAddress;
BYTE lineAddress;
BYTE channel;

WORD absorbantResult;
WORD onHookResult;
WORD ringResult;
WORD reflectiveResult;

TIMER_MSG_T *timeout;

/*******************************************************************/
/*                    Local Procedures                             */
/*******************************************************************/

/*******************************************************************/
/*                    Transition procedures                        */
/*******************************************************************/

static SM_STATE_T powerOn (msg, self)
MSG_T *msg;
SM_DESCRIPTOR_T *self;
{

#ifdef TEST_DEBUG
   printf("LCT:  LC Tester Executed Power On\n");
#endif


   return (IDLE_STATE);
};  /* powerOn */

/*******************************************************************/
/*                    Function A                                   */
/*******************************************************************/

static SM_STATE_T functionA (msg, self)     /* start_lc_test_m */
START_TEST_MSG_T *msg;
SM_DESCRIPTOR_T *self;
{

#ifdef TEST_DEBUG
   printf("LCT A:  start_lc_test_m\n");
   showMsg((MSG_T *) msg);
#endif


   channel1 = NOT_TESTED;
   channel2 = NOT_TESTED;

   requester    = msg->msgHdr.fields.origin;
   shelfAddress = msg->scAddr;
   lineAddress  = msg->lcAddr;

   sendTestMessageToLC (lcTester, shelfAddress, lineAddress, LC_DSL_RELAY);
   sendBasicMessage (lcTester, rteHandler, connect_emulator_m, 0);

   return (CONNECT_RTE_STATE);

};  /* functionA */
```

```
/*****************************************************************/
/*                      Function B                               */
/*****************************************************************/

static SM_STATE_T functionB (msg, self)     /* done_m */
RESPONSE_MSG_T *msg;
SM_DESCRIPTOR_T *self;
{
START_TEST_MSG_T *outMsg;

#ifdef TEST_DEBUG
   printf("LCT B:  done_m\n");
   showMsg((MSG_T *) msg);
#endif


   if (msg->response == OKAY) {
      outMsg = (START_TEST_MSG_T *) msgAlloc (sizeof (START_TEST_MSG_T)
                                             - sizeof (MSG_T));
      outMsg->msgHdr.fields.name = start_channel_test_m;
      outMsg->msgHdr.fields.dest = channelTesterForLC;
      outMsg->msgHdr.fields.origin = lcTester;
      outMsg->msgHdr.fields.priority = HARDWARE_PRIORITY;
      outMsg->scAddr = shelfAddress;
      outMsg->lcAddr = lineAddress;
      outMsg->channel = LC_DSL_RELAY + LC_LINE_A_RELAY + RT_LINE_A_RELAY;
      sendMsg ((MSG_T *) outMsg);

      return (TEST_CHANNEL_A_STATE);
   }
   else {
      sendTestMessageToLC (lcTester, shelfAddress, lineAddress, CLEAR_ALL);
      sendBasicMessage (lcTester, rteHandler, disconnect_emulator_m, 0);
      sendBasicMessage (lcTester, requester, lc_test_done_m, TEST_TIMEOUT);
      return (IDLE_STATE);
   }

};  /* functionB */
/*****************************************************************/
/*                      Function C                               */
/*****************************************************************/

static SM_STATE_T functionC (msg, self)     /* channel_test_done_m */
BASIC_MSG_T *msg;
SM_DESCRIPTOR_T *self;
{
START_TEST_MSG_T *outMsg;

#ifdef TEST_DEBUG
   printf("LCT C:  channel_test_done\n");
   showMsg((MSG_T *) msg);
#endif


   channel1 = msg->info1;
   outMsg = (START_TEST_MSG_T *) msgAlloc (sizeof (START_TEST_MSG_T)
                                          - sizeof (MSG_T));
   outMsg->msgHdr.fields.name = start_channel_test_m;
   outMsg->msgHdr.fields.dest = channelTesterForLC;
   outMsg->msgHdr.fields.origin = lcTester;
   outMsg->msgHdr.fields.priority = HARDWARE_PRIORITY;
   outMsg->scAddr = shelfAddress;
   outMsg->lcAddr = lineAddress;
   outMsg->channel = LC_DSL_RELAY + LC_LINE_B_RELAY + RT_LINE_B_RELAY;
   sendMsg ((MSG_T *) outMsg);

   return (TEST_CHANNEL_B_STATE);

};  /* functionC */
```

```
/*****************************************************************/
/*                     Function D                                */
/*****************************************************************/

static SM_STATE_T functionD (msg, self)     /* channel_test_done_m */
BASIC_MSG_T *msg;
SM_DESCRIPTOR_T *self;
{
WORD result;

#ifdef DEBUG
   printf("LCT D:  channel_test_done_m \n");
   showMsg((MSG_T *) msg);
#endif


   channel2 = msg->info1;

   sendBasicMessage (lcTester, rteHandler, disconnect_emulator_m, 0);

   if ((channel1 == PASSED) && (channel2 == PASSED)) {
      result = PASSED;
   }
   else {
      result = FAILED;
   }
   sendBasicMessage (lcTester, requester, lc_test_done_m, result);
   return (IDLE_STATE);

};  /* functionD */


]%

%[

/****-----------------------------------------------------------------
*                    RAYCHEM Corp. / Telecommunications
*
*          File:  dst.sm / dst.c
*       Project:  Miniplex
*       Created:  September 11, 1990
*    Tools used:  Microsoft C compiler v. 5.00
*                 Turbo Debugger 2.0
*
*   Description:
*
*       The initials DST stand for DSL Tester.
*
*       This state machine is responsible for the DSL test.
*       For the majority of the time, this state machine will remain in the
*       IDLE state, until a start_dsl_test_m is received.  When the DSL test
*       is finished, this state machine will send the result through the
*       dsl_test_done_m message to whomever sent the start_dsl_test_m
*       message.
*
*       This state machine sends and receives messages to the frame bus.
*
*
*   Compilation procedure:
*      DST.SM is the control source for DST.C
*      The SMC (State Machine Compiler) takes .SM and creates .C
*      example:  smc < DST.SM > DST.C
*
*   Modification History:
*      9/13/90     First Version.  GL
*
*****-----------------------------------------------------------------
```

```
#include "rts.h"
#include "DAMLlit.h"
#include "DAMLmsg.h"
#include "DAMLcnf.h"
#include "inp.h"
#include "out.h"


]%

stateMachines = {dslTester};

smDataTypeDef %[
                    unsigned someData;
                    unsigned moreData;
]% SMX_DATA_T;


states = {           IDLE_STATE
                    ,TIP_GND_SHORT_STATE

                    ,RING_GND_SHORT_STATE
                    ,TIP_RING_SHORT_STATE
                    ,RT_IN_PLACE_STATE
                    ,RING_REVERSAL_STATE
                    ,TIP_REVERSAL_STATE
};


messages = {         SM_INITIALIZE
                    ,start_dsl_test_m
                    ,line_connected_m
                    ,timeout_m
};


transProcs = {   powerOn
                ,functionA
                ,functionB
                ,functionC
                ,functionD
                ,functionE
                ,functionF
                ,functionG
                ,ignoreMsg
};

transitions = {  IDLE_STATE {
                     SM_INITIALIZE                    ,powerOn
                    ,start_dsl_test_m                 ,functionA
                    ,line_connected_m                 ,ignoreMsg
                    ,timeout_m                        ,ignoreMsg
                 }

                 TIP_GND_SHORT_STATE {
                     SM_INITIALIZE                    ,powerOn
                    ,start_dsl_test_m                 ,ignoreMsg
                    ,line_connected_m                 ,functionB
                    ,timeout_m                        ,ignoreMsg
                 }

                 RING_GND_SHORT_STATE {
                     SM_INITIALIZE                    ,powerOn
                    ,start_dsl_test_m                 ,ignoreMsg
                    ,line_connected_m                 ,ignoreMsg
                    ,timeout_m                        ,functionC
                 }
```

```
    TIP_RING_SHORT_STATE {
        SM_INITIALIZE                       ,powerOn
       ,start_dsl_test_m                    ,ignoreMsg
       ,line_connected_m                    ,ignoreMsg
       ,timeout_m                           ,functionD
    }

    RT_IN_PLACE_STATE {
     SM_INITIALIZE                      ,powerOn
    ,start_dsl_test_m                   ,ignoreMsg
    ,line_connected_m                   ,ignoreMsg
    ,timeout_m                          ,functionE
   }

   RING_REVERSAL_STATE {
     SM_INITIALIZE                      ,powerOn
    ,start_dsl_test_m                   ,ignoreMsg
    ,line_connected_m                   ,ignoreMsg
    ,timeout_m                          ,functionF
   }

   TIP_REVERSAL_STATE {
     SM_INITIALIZE                      ,powerOn
    ,start_dsl_test_m                   ,ignoreMsg
    ,line_connected_m                   ,ignoreMsg
    ,timeout_m                          ,functionG
   }

} ;

%[

#define TEST_DEBUG              1
#define DSL_TEST_VOLTAGE        2000    /* 20 volts = 2000 centi volts */
#define RT_TEST_VOLTAGE                 10000   /* 100 volts = 10000 centi volts
#define REVERSAL_TEST_VOLTAGE           13500   /* 135 volts = 13500 centi volts
#define SHORT_CURRENT                   0
#define TIMEOUT_VALUE                   50L

/*************************************************************************/
/*                      External Declarations                            */
/*************************************************************************/

/*************************************************************************/
/*                      Local Variables                                  */
/*************************************************************************/

SM_NAME_T requester;
BYTE shelfAddress;
BYTE lineAddress;

WORD tipGroundShort;
WORD ringGroundShort;
WORD tipRingShort;
WORD rtInPlace;
WORD tipRingReversal;
WORD tipCurrent1;
WORD tipCurrent2;
WORD ringCurrent1;
WORD ringCurrent2;

TIMER_MSG_T *timeout;
```

```
/*****************************************************************/
/*                     Local Procedures                           */
/*****************************************************************/


static void R_Delay (t)
int t;
{
int i;

   for (i = 0;  i < t*500;  i++);
}  /* R_Delay */



static void setupTipGroundShortTest ()
{
   aOutput (RING_VOLTAGE_D2A, 0);
   aOutput (TIP_VOLTAGE_D2A, 0);
   R_Delay (20);

   dOutput (VI_TEST_BUS_TIP, CONNECT);
   dOutput (VI_TEST_BUS_RING, DISCONNECT);
   dOutput (VI_TIP_RING_DSL_TEST, CONNECT);
   R_Delay (20);

   aOutput (TIP_VOLTAGE_D2A, DSL_TEST_VOLTAGE);

}  /* setupTipGroundShortTest */



static void setupRingGroundShortTest ()
{
   aOutput (RING_VOLTAGE_D2A, 0);
   aOutput (TIP_VOLTAGE_D2A, 0);
   R_Delay (20);

   dOutput (VI_TEST_BUS_TIP, DISCONNECT);
   dOutput (VI_TEST_BUS_RING, CONNECT);
   R_Delay (20);

   aOutput (RING_VOLTAGE_D2A, DSL_TEST_VOLTAGE);

}  /* setupRingGroundShortTest */



static void setupTipRingShortTest ()
{
   aOutput (RING_VOLTAGE_D2A, 0);
   aOutput (TIP_VOLTAGE_D2A, 0);
   R_Delay (20);

   dOutput (VI_TEST_BUS_TIP, CONNECT);
   R_Delay (20);

   aOutput (RING_VOLTAGE_D2A, DSL_TEST_VOLTAGE);

}  /* setupTipRingShortTest */
```

```
static void setupRT_InPlaceTest ()
{
   aOutput (RING_VOLTAGE_D2A, RT_TEST_VOLTAGE);
   aOutput (TIP_VOLTAGE_D2A, 0);

}  /* setupRT_InPlaceTest */



static void setupRingReversalTest ()
{
   aOutput (RING_VOLTAGE_D2A, REVERSAL_TEST_VOLTAGE);
   aOutput (TIP_VOLTAGE_D2A, 0);

}  /* setupRingReversalTest */



static void setupTipReversalTest ()
{
   aOutput (RING_VOLTAGE_D2A, 0);
   aOutput (TIP_VOLTAGE_D2A, REVERSAL_TEST_VOLTAGE);

}  /* setupTipReversalTest */



static void cleanTestSetup ()
{
   aOutput (RING_VOLTAGE_D2A, 0);
   aOutput (TIP_VOLTAGE_D2A, 0);
   R_Delay (20);

   dOutput (VI_TEST_BUS_TIP, DISCONNECT);
   dOutput (VI_TEST_BUS_RING, DISCONNECT);
   dOutput (VI_TIP_RING_DSL_TEST, DISCONNECT);
   R_Delay (20);

}  /* cleanTestSetup */
/*****************************************************************/
/*                    Transition procedures                     */
/*****************************************************************/

static SM_STATE_T powerOn (msg, self)
MSG_T *msg;
SM_DESCRIPTOR_T *self;
{

#ifdef TEST_DEBUG
   printf("DST:  DSL Tester Executed Power On\n");
#endif


   return (IDLE_STATE);
};  /* powerOn */

/*****************************************************************/
/*                    Function A                                */
/*****************************************************************/

static SM_STATE_T functionA (msg, self)     /* start_dsl_test_m */
START_TEST_MSG_T *msg;
SM_DESCRIPTOR_T *self;
{
```

```
#ifdef TEST_DEBUG
   printf("DST A:  start_dsl_test_m\n");
   showMsg((MSG_T *) msg);
#endif


   tipGroundShort  = NOT_TESTED;
   ringGroundShort = NOT_TESTED;
   tipRingShort    = NOT_TESTED;
   rtInPlace       = NOT_TESTED;
   tipRingReversal = NOT_TESTED;

   requester = msg->msgHdr.fields.origin;
   shelfAddress = msg->scAddr;
   lineAddress  = msg->lcAddr;

   sendTestMessageToLC (dslTester, shelfAddress, lineAddress, LC_DSL_RELAY)
   setupTipGroundShortTest ();
   timeout = startTimer (timeout_m, TIMEOUT_VALUE);
   return (TIP_GND_SHORT_STATE);

};  /* functionA */

/*****************************************************************/
/*                    Function B                                 */
/*****************************************************************/

static SM_STATE_T functionB (msg, self)     /* line_connected_m */
BASIC_MSG_T *msg;
SM_DESCRIPTOR_T *self;
{
int tcurrent;

#ifdef TEST_DEBUG
   printf("DST B:  line_connected_m\n");
   showMsg((MSG_T *) msg);
#endif


   cancelTimer (timeout);
   tcurrent = getInput (TIP_CURRENT_IN);
   if ((tcurrent > -SHORT_CURRENT) && (tcurrent < SHORT_CURRENT)) {
      tipGroundShort = PASSED;
   }
   else {
      tipGroundShort = FAILED;
   }
   setupRingGroundShortTest ();
   timeout = startTimer (timeout_m, TIMEOUT_VALUE);
   return (RING_GND_SHORT_STATE);

};  /* functionB */

/*****************************************************************/
/*                    Function A                                 */
/*****************************************************************/

static SM_STATE_T functionA (msg, self)     /* start_line_test_m */
START_TEST_MSG_T *msg;
SM_DESCRIPTOR_T *self;
{

#ifdef TEST_DEBUG
   printf("LTH A:  start_line_test_m\n");
   showMsg((MSG_T *) msg);
#endif
```

```
   requester = msg->msgHdr.fields.origin;
   shelfAddress = msg->scAddr;
   lineAddress  = msg->lcAddr;

   channel1Test = NOT_TESTED;
   channel2Test = NOT_TESTED;
   lcTest       = NOT_TESTED;
   dslTest      = NOT_TESTED;
   rtTest       = NOT_TESTED;

   sendTestMessageToSC (lineTestHandler, SC_BROADCAST, CLEAR_ALL);
   sendTestMessageToSC (lineTestHandler, shelfAddress, SC_TEST_LAMP +
                        SC_OUT_RELAY + SC_IN_RELAY + SC_DSL_RELAY);
   timeout = startTimer (timeout_m, TIMEOUT_VALUE);
   return (SELECT_SHELF_STATE);

};  /* functionA */

/*****************************************************************/
/*                   Function B                                  */
/*****************************************************************/

static SM_STATE_T functionB (msg, self)     /* timeout_m */
BASIC_MSG_T *msg;
SM_DESCRIPTOR_T *self;
{
START_TEST_MSG_T *outMsg;

#ifdef TEST_DEBUG
   printf("LTH B:  timeout_m\n");
   showMsg((MSG_T *) msg);
#endif


   outMsg = (START_TEST_MSG_T *) msgAlloc (sizeof(START_TEST_MSG_T)
                                         - sizeof(MSG_T));
   outMsg->msgHdr.fields.name = start_channel_test_m;
   outMsg->msgHdr.fields.dest = channelTesterForLC;
   outMsg->msgHdr.fields.origin = lineTestHandler;
   outMsg->msgHdr.fields.priority = HARDWARE_PRIORITY;
   outMsg->scAddr = shelfAddress;
   outMsg->lcAddr = lineAddress;
   outMsg->channel = LC_LINE_A_RELAY + RT_LINE_A_RELAY;

   sendMsg ((MSG_T *) outMsg);
   return (TEST_CHANNEL_A_STATE);

};  /* functionB */

/*****************************************************************/
/*                   Function C                                  */
/*****************************************************************/

static SM_STATE_T functionC (msg, self)     /* channel_test_done_m */
BASIC_MSG_T *msg;
SM_DESCRIPTOR_T *self;
{
START_TEST_MSG_T *outMsg;

#ifdef TEST_DEBUG
   printf("LTH C:  channel_test_done_m\n");
   showMsg((MSG_T *) msg);
#endif

   channel1Test = msg->info1;
   outMsg = (START_TEST_MSG_T *) msgAlloc (sizeof(START_TEST_MSG_T)
                                         - sizeof(MSG_T));
```

```
      outMsg->msgHdr.fields.name = start_channel_test_m;
      outMsg->msgHdr.fields.dest = channelTesterForLC;
      outMsg->msgHdr.fields.origin = lineTestHandler;
      outMsg->msgHdr.fields.priority = HARDWARE_PRIORITY;
      outMsg->scAddr = shelfAddress;
      outMsg->lcAddr = lineAddress;
      outMsg->channel = LC_LINE_B_RELAY + RT_LINE_B_RELAY;

      sendMsg ((MSG_T *) outMsg);
      return (TEST_CHANNEL_B_STATE);

   };  /* functionC */

/*****************************************************************/
/*                    Function D                                 */
/*****************************************************************/

static SM_STATE_T functionD (msg, self)     /* channel_test_done_m */
BASIC_MSG_T *msg;
SM_DESCRIPTOR_T *self;
{
START_TEST_MSG_T *outMsg;

#ifdef TEST_DEBUG
   printf("LTH D:  channel_test_done_m \n");
   showMsg((MSG_T *) msg);
#endif


   channel2Test = msg->info1;
   if ((channel1Test == PASSED) && (channel2Test == PASSED)) {
      sendTestMessageToSC (lineTestHandler, shelfAddress, CLEAR_ALL);
      sendLineTestResults ();
      return (IDLE_STATE);
   }
   else {
      outMsg = (START_TEST_MSG_T *) msgAlloc (sizeof(START_TEST_MSG_T)
                                          - sizeof(MSG_T));
      outMsg->msgHdr.fields.name = start_lc_test_m;
      outMsg->msgHdr.fields.dest = lcTester;
      outMsg->msgHdr.fields.origin = lineTestHandler;
      outMsg->msgHdr.fields.priority = HARDWARE_PRIORITY;
      outMsg->scAddr = shelfAddress;
      outMsg->lcAddr = lineAddress;

      sendMsg ((MSG_T *) outMsg);
      return (TEST_LC_STATE);
   }

};  /* functionD */

/*****************************************************************/
/*                    Function E                                 */
/*****************************************************************/

static SM_STATE_T functionE (msg, self)     /* lc_test_done_m */
BASIC_MSG_T *msg;
SM_DESCRIPTOR_T *self;
{
START_TEST_MSG_T *outMsg;

#ifdef DEBUG
   printf("LTH E:  lc_test_done_m \n");
   showMsg((MSG_T *) msg);
#endif


   lcTest = msg->info1;
   outMsg = (START_TEST_MSG_T *) msgAlloc (sizeof(START_TEST_MSG_T)
                                       - sizeof(MSG_T));
```

```
   outMsg->msgHdr.fields.name = start_dsl_test_m;
   outMsg->msgHdr.fields.dest = dslTester;
   outMsg->msgHdr.fields.origin = lineTestHandler;
   outMsg->msgHdr.fields.priority = HARDWARE_PRIORITY;
   outMsg->scAddr = shelfAddress;
   outMsg->lcAddr = lineAddress;

   sendMsg ((MSG_T *) outMsg);
   return (TEST_DSL_STATE);

};  /* functionE */

/*******************************************************************/
/*                    Function F                                   */
/*******************************************************************/

static SM_STATE_T functionF (msg, self)     /* dsl_test_done_m */
BASIC_MSG_T *msg;
SM_DESCRIPTOR_T *self;
{
START_TEST_MSG_T *outMsg;

#ifdef TEST_DEBUG
   printf("LTH G:  dsl_test_done_m \n");
   showMsg((MSG_T *) msg);
#endif


   dslTest = msg->info1;
   if (dslTest == PASSED) {
      outMsg = (START_TEST_MSG_T *) msgAlloc (sizeof(START_TEST_MSG_T)
                                          - sizeof(MSG_T));
      outMsg->msgHdr.fields.name = start_rt_test_m;
      outMsg->msgHdr.fields.dest = rtTester;
      outMsg->msgHdr.fields.origin = lineTestHandler;
      outMsg->msgHdr.fields.priority = HARDWARE_PRIORITY;
      outMsg->scAddr = shelfAddress;
      outMsg->lcAddr = lineAddress;

      sendMsg ((MSG_T *) outMsg);
      return (TEST_RT_STATE);
   }
   else {
      sendTestMessageToSC (lineTestHandler, shelfAddress, CLEAR_ALL);
      sendLineTestResults ();
      return (IDLE_STATE);
   }

};  /* functionF */

/*******************************************************************/
/*                    Function G                                   */
/*******************************************************************/

static SM_STATE_T functionG (msg, self)     /* rt_test_done_m */
BASIC_MSG_T *msg;
SM_DESCRIPTOR_T *self;
{

#ifdef TEST_DEBUG
   printf("LTH G:  rt_test_done_m\n");
   showMsg((MSG_T *) msg);
#endif


   rtTest = msg->info1;
   sendTestMessageToSC (lineTestHandler, shelfAddress, CLEAR_ALL);
   sendLineTestResults ();
   return (IDLE_STATE);
```

```
}; /* functionG */


]%
%[

/****----------------------------------------------------------------------
*                    RAYCHEM Corp. / Telecommunications
*
*         File:  ctr.sm / ctr.c
*      Project:  Miniplex
*      Created:  September 11, 1990
*   Tools used:  Microsoft C compiler v. 5.00
*                Turbo Debugger 2.0
*
*   Description:
*
*      The initials CTR stand for Channel Test for RT.
*
*      This state machine is responsible for the channel test performed
*      through the line card emulator.  This state machine remains in
*      the IDLE state, until a start_channel_test_m is received.
*      When the channel test is finished, this state machine sends
*      the result through the channel_test_done_m message to
*      whomever sent the start_channel_test_m message.
*
*      This state machine sends and receives messages to the line card
*      emulator.
*
*
*   Compilation procedure:
*      CTR.SM is the control source for CTR.C
*      The SMC (State Machine Compiler) takes .SM and creates .C
*      example:  smc < CTR.SM > CTR.C
*
*   Modification History:
*      9/11/90     First Version.  GL
*
*****----------------------------------------------------------------------

#include "rts.h"
#include "DAMLlit.h"
#include "DAMLmsg.h"
#include "DAMLcnf.h"
#include "inp.h"
#include "out.h"


]%

stateMachines = {channelTesterForRT};

smDataTypeDef %[
                  unsigned someData;
                  unsigned moreData;
]% SMX_DATA_T;


states = {        IDLE_STATE

                 ,SELECT_LINE_STATE
                 ,ABSORBANT_STATE
                 ,ON_HOOK_STATE
                 ,RINGER_TEST_STATE
                 ,REFLECTIVE_STATE
};
```

```
messages = {        SM_INITIALIZE
                   ,start_channel_test_m
                   ,line_connected_m
                   ,absorbant_connected_m
                   ,absorbant_disconnected_m
                   ,ring_detected_m
                   ,reflective_connected_m
                   ,timeout_m
};

transProcs = {    powerOn
                 ,functionA
                 ,functionB
                 ,functionC
                 ,functionD
                 ,functionE
                 ,functionF
                 ,functionG
                 ,ignoreMsg
};

transitions = {  IDLE_STATE {
                    SM_INITIALIZE                    ,powerOn
                   ,start_channel_test_m             ,functionA
                   ,line_connected_m                 ,ignoreMsg
                   ,absorbant_connected_m            ,ignoreMsg
                   ,absorbant_disconnected_m         ,ignoreMsg
                   ,ring_detected_m                  ,ignoreMsg
                   ,reflective_connected_m           ,ignoreMsg
                   ,timeout_m                        ,functionG
                 }

                 SELECT_LINE_STATE {
                    SM_INITIALIZE                    ,powerOn
                   ,start_channel_test_m             ,ignoreMsg
                   ,line_connected_m                 ,functionB
                   ,absorbant_connected_m            ,ignoreMsg
                   ,absorbant_disconnected_m         ,ignoreMsg
                   ,ring_detected_m                  ,ignoreMsg
                   ,reflective_connected_m           ,ignoreMsg
                   ,timeout_m                        ,functionG
                 }

                 ABSORBANT_STATE {
                    SM_INITIALIZE                    ,powerOn
                   ,start_channel_test_m             ,ignoreMsg

                   ,line_connected_m                 ,ignoreMsg
                   ,absorbant_connected_m            ,functionC
                   ,absorbant_disconnected_m         ,ignoreMsg
                   ,ring_detected_m                  ,ignoreMsg
                   ,reflective_connected_m           ,ignoreMsg
                   ,timeout_m                        ,functionG
                 }

                 ON_HOOK_STATE {
                    SM_INITIALIZE                    ,powerOn
                   ,start_channel_test_m             ,ignoreMsg
                   ,line_connected_m                 ,ignoreMsg
                   ,absorbant_connected_m            ,ignoreMsg
                   ,absorbant_disconnected_m         ,functionD
                   ,ring_detected_m                  ,ignoreMsg
                   ,reflective_connected_m           ,ignoreMsg
                   ,timeout_m                        ,functionG
                 }
```

```
RINGER_TEST_STATE {
   SM_INITIALIZE                        ,powerOn
  ,start_channel_test_m                 ,ignoreMsg
  ,line_connected_m                     ,ignoreMsg
  ,absorbant_connected_m                ,ignoreMsg
  ,absorbant_disconnected_m             ,ignoreMsg
  ,ring_detected_m                      ,functionE
  ,reflective_connected_m               ,ignoreMsg
  ,timeout_m                            ,functionG
}

REFLECTIVE_STATE {
   SM_INITIALIZE                        ,powerOn
  ,start_channel_test_m                 ,ignoreMsg
  ,line_connected_m                     ,ignoreMsg
  ,absorbant_connected_m                ,ignoreMsg
  ,absorbant_disconnected_m             ,ignoreMsg
  ,ring_detected_m                      ,ignoreMsg
  ,reflective_connected_m               ,functionF
  ,timeout_m                            ,functionG
}

} ;

%[

#define TEST_DEBUG 1
#define TIMEOUT_VALUE      300L

/*****************************************************************/
/*                  External Declarations                        */
/*****************************************************************/

/*****************************************************************/
/*                  Local Procedures                             */
/*****************************************************************/

/*****************************************************************/
/*                  Function G                                   */
/*****************************************************************/

static SM_STATE_T functionG (msg, self)     /* timeout_m */
BASIC_MSG_T *msg;
SM_DESCRIPTOR_T *self;
{
WORD result;

#ifdef TEST_DEBUG
   printf("CTL G:  timeout_m\n");
   showMsg((MSG_T *) msg);
#endif


   ringCurrent2 = getInput (RING_CURRENT_IN);
   tipCurrent2 = getInput (TIP_CURRENT_IN);

   if ((ringCurrent2 - ringCurrent1 > -SHORT_CURRENT) &&
       (tipCurrent2 - tipCurrent1 < SHORT_CURRENT)) {
      tipRingReversal = PASSED;
   }
   else {
      tipRingReversal = FAILED;
   }

   sendTestMessageToLC (dslTester, shelfAddress, lineAddress, CLEAR_ALL);
```

```
   if ((tipGroundShort == PASSED) && (ringGroundShort == PASSED) &&
       (tipRingShort == PASSED) && (rtInPlace == PASSED) &&
       (tipRingReversal == PASSED)) {
      result = PASSED;
   }
   else {
      result = FAILED;
   }

   sendBasicMessage (dslTester, requester, dsl_test_done_m, result);
   cleanTestSetup ();
   return (IDLE_STATE);

}; /* functionG */


]%
%[

/****-------------------------------------------------------------------
*                    RAYCHEM Corp. / Telecommunications
*
*         File:  rtt.sm / rtt.c
*      Project:  Miniplex
*      Created:  September 11, 1990
*   Tools used:  Microsoft C compiler v. 5.00
*                Turbo Debugger 2.0
*
*   Description:
*
*      The initials RTT stand for Remote Terminal Tester.
*
*      This state machine is responsible for the Remote Terminal test.
*      For the majority of the time, this state machine will remain in the
*      IDLE state, until a start_rt_test_m is received.  When the Remote
*      Termianl test is finished, this state machine will send the result
*      through the rt_test_done_m message to whomever sent the
*      start_rt_test_m message.
*
*      This state machine sends and receives messages to the frame bus.
*
*
*   Compilation procedure:
*      RTT.SM is the control source for RTT.C
*      The SMC (State Machine Compiler) takes .SM and creates .C
*      example:  smc < RTT.SM > RTT.C
*
*   Modification History:
*      9/13/90     First Version.  GL
*
*****-------------------------------------------------------------------

#include "rts.h"
#include "DAMLlit.h"
#include "DAMLmsg.h"
#include "DAMLcnf.h"
#include "inp.h"
#include "out.h"


]%

stateMachines = {rtTester};

smDataTypeDef %[
                  unsigned someData;
                  unsigned moreData;
```

```
]% SMX_DATA_T;

states = {         IDLE_STATE
                  ,CONNECT_LCE_STATE
                  ,TEST_CHANNEL_A_STATE
                  ,TEST_CHANNEL_B_STATE
};

messages = {       SM_INITIALIZE
                  ,start_rt_test_m
                  ,done_m
                  ,channel_test_done_m
};

transProcs = {     powerOn
                  ,functionA
                  ,functionB
                  ,functionC
                  ,functionD
                  ,ignoreMsg
};

transitions = {  IDLE_STATE {
                    SM_INITIALIZE                ,powerOn
                   ,start_rt_test_m              ,functionA
                   ,done_m                       ,ignoreMsg
                   ,channel_test_done_m          ,ignoreMsg
                 }

                 CONNECT_LCE_STATE {
                    SM_INITIALIZE                ,powerOn
                   ,start_rt_test_m              ,ignoreMsg
                   ,done_m                       ,functionB
                   ,channel_test_done_m          ,ignoreMsg
                 }

                 TEST_CHANNEL_A_STATE {
                    SM_INITIALIZE                ,powerOn
                   ,start_rt_test_m              ,ignoreMsg
                   ,done_m                       ,ignoreMsg
                   ,channel_test_done_m          ,functionC
                 }

                 TEST_CHANNEL_B_STATE {
                    SM_INITIALIZE                ,powerOn
                   ,start_rt_test_m              ,ignoreMsg
                   ,done_m                       ,ignoreMsg
                   ,channel_test_done_m          ,functionD
                 }

} ;

%[

#define TEST_DEBUG          1
#define TIMEOUT_VALUE              300L

/*****************************************************************/
/*                  External Declarations                        */
/*****************************************************************/
```

```
/*******************************************************************/
/*                    Local Variables                              */
/*******************************************************************/

SM_NAME_T requester;
BYTE shelfAddress;
BYTE lineAddress;

WORD channel1;
WORD channel2;

TIMER_MSG_T *timeout;

/*******************************************************************/
/*                    Local Procedures                             */
/*******************************************************************/

/*******************************************************************/
/*                    Transition procedures                        */
/*******************************************************************/

static SM_STATE_T powerOn (msg, self)
MSG_T *msg;
SM_DESCRIPTOR_T *self;
{

#ifdef TEST_DEBUG
   printf("RTT:  RT Tester Executed Power On\n");
#endif


   return (IDLE_STATE);
};  /* powerOn */
/*

$Workfile:   cnsact.c  $
$Revision:   1.0  $
$Date:   05 Jul 1990 20:44:14  $

$Log:   D:/USR/KERN/CNS/VCS/CNSACT.C_V  $
 *
 *    Rev 1.0   05 Jul 1990 20:44:14   JLastra
 * Initial revision.

*/


static char *vscId="$Header:   D:/USR/KERN/CNS/VCS/CNSACT.C_V   1.0   05 Ju




#include "cnspriv.h"

static char  ebuf[100];


static unsigned getRefTypeDecl(declIndex)
unsigned declIndex;
{

   if ( typeSpecs[declIndex].type == REF )
           return(getRefTypeDecl(typeSpecs[declIndex].x.refType));
   else
           return(declIndex);
}
```

```
static STR typeName(t)
BASE_TYPE t;
{
  char *s;

  switch (t) {
  case CHAR     : s="CHAR"; break;
  case SHORT    : s="SHORT"; break;
  case INT      : s="INT";  break;
  case LONG     : s="LONG";  break;
  case UNSIGNED : s="UNSIGNED";  break;
  case FLOAT    : s="FLOAT";  break;
  case DOUBLE   : s="DOUBLE";  break;
  case ENUM     : s="ENUM";  break;
  case STRUCT   : s="STRUCT"; break;
  case REF      : s="REF";  break;
  case EVAL     : s="EVAL"; break;
  case MSG_TYPE : s="MSG_TYPE"; break;
  default       : s="?????";
  }
  return(s);
}

static void badFieldName(got,expected)
STR got,expected;
{
    sprintf(ebuf,"Bad field name, got: %s, expected %s ",got,expected);
    yyerror(ebuf);
    resetConsole();
}


static void badFieldType(got,expected)
BASE_TYPE got,expected;
{
    sprintf(ebuf,"Bad field type, got: %s, expected %s "
       ,typeName(got),typeName(expected));
    yyerror(ebuf);
    resetConsole();
}


static int checkType(type)
BASE_TYPE type;
{
  BASE_TYPE t;
  t=typeSpecs[getRefTypeDecl(topDecl->specCntr)].type;

  if (( type == INT ) && (     ( t == SHORT )
                          || ( t == INT )
                          || ( t == UNSIGNED )
                          || ( t == LONG )      ) ) return(0);

  if (( type == FLOAT ) && (    ( t == DOUBLE )
                          || ( t == FLOAT ) ) )     return(0);

  if ( type == t ) /* CHAR, ENUM, STRUCT */
                                                    return(0);

  /* if none of the above, then it is a btype mismatch */
  badFieldType(type,t);
  return(1);
}


static int checkField(name,type)
STR name;
BASE_TYPE type;
{
```

```
if ( topDecl == NULL ){
     yyerror("Field Declaration on an empty stack\n");
     return(1);
  }

  if ( strcmp(typeSpecs[topDecl->specCntr].name, name ) != 0 ){
     badFieldName(name,typeSpecs[topDecl->specCntr].name);
     return(1);
  }

  return(checkType(type));

}


int startMessage(msgName)
STR msgName;
{

  int i, found;
/*
#ifdef DEBUG_CNS
   printf("Message to send:   %s\n", msgName);
#endif
*/
  found=0;
  for(i=0; i<numOfMessages; i++)
    if (strcmp(msgName, typeSpecs[sysMsgs[i].tIndex].name) == 0){
   newMsg(i);
   found=1;
   break;
   }

  if ( found == 0 ){
          sprintf(ebuf,"Unknown message %s."
            , msgName);
          yyerror(ebuf);
          resetConsole();
          return(1);
  }

  startDecl(sysMsgs[i].tIndex);

/*
#ifdef DEBUG_CNS
  dumpDeclStack();
#endif
*/
  memoryFree(msgName);

  return(0);
}


int saveDest(destName)
STR destName;
{

   int i, found;
/*
#ifdef DEBUG_CNS
   printf("To destination SM: %s \n", destName);
#endif
*/
   found =0;
```

```
   for(i = 0; i< numOfStateMachines; i++)
        if (strcmp(destName,stateMachineNames[i])==0){
         setMsgDest(i);
         found=1;
         break;
      }

   if ( found == 0 ){
           sprintf(ebuf,"Unknown destination %s."
             ,destName);
           yyerror(ebuf);
           resetConsole();
           return(1);
  }

   memoryFree(destName);
   return(0);
}

int saveOrigin(originName)
STR originName;
{

   int i, found;
/*
#ifdef DEBUG_CNS
   printf("From origin SM: %s \n", originName);
#endif
*/
   found = 0 ;
   for(i = 0; i< numOfStateMachines; i++)
        if (strcmp(originName,stateMachineNames[i])==0) {
         setMsgOrigin(i);
         found =1 ;
         break;
   }

   if ( found==0 ){
           sprintf(ebuf,"Unknown origin %s."
             ,originName);
           yyerror(ebuf);
           resetConsole();
           return(1);
  }
   memoryFree(originName);
   return(0);
}


int startStructField(name)
STR name;
{

  if ( checkField(name,(BASE_TYPE)STRUCT) != 0 )
     return(1);

  pushDecl();
  prepareForNewBlock();

/*
#ifdef DEBUG_CNS
  dumpDeclStack();
#endif
*/

  memoryFree(name);
  return(0);
}
```

```
int finishStructField()
{

   if ( topDecl->membersToGo != 0){
           sprintf(ebuf,"Premature end of structure %s."
             ,typeSpecs[topDecl->declSpec].name);
           yyerror(ebuf);
           resetConsole();
           return(1);

   }


   popDecl();

   if ( topDecl == NULL ){
           sendMsg(cnsMsg);
           cnsMsg=NULL;
   }

/*
#ifdef DEBUG_CNS
       dumpDeclStack();
#endif
*/
   return(0);

}
int startArrayField(name)
STR name;
{
  int baseType;

  if ( topDecl == NULL ){
     yyerror("Field Declaration on an empty stack\n");
     return(1);
  }

  baseType=getRefTypeDecl(topDecl->specCntr);

  if ( typeSpecs[baseType].aSize == 0 ){
     yyerror("Unexpected arrray field\n");
     return(1);
  }
 if ( strcmp(typeSpecs[topDecl->specCntr].name, name ) != 0 ){
     badFieldName(name,typeSpecs[topDecl->specCntr].name);
     return(1);
  }

  topDecl->arrayCount = typeSpecs[baseType].aSize;


 if ( typeSpecs[baseType].type != CHAR )
    prepareForNewBlock();

/*
#ifdef DEBUG_CNS
  dumpDeclStack();
#endif
*/

  memoryFree(name);
  return(0);
}
```

```
int finishArrayField()
{
   if ( topDecl->arrayCount != 0){
           sprintf(ebuf,"Too few array elements for %s."
             ,typeSpecs[topDecl->declSpec].name);
           yyerror(ebuf);
           resetConsole();
           return(1);
   }

   topDecl->membersToGo--;
   topDecl->specCntr++;

/*
#ifdef DEBUG_CNS
       dumpDeclStack();
#endif
*/
   return(0);

}
int saveArrayInt(value)
STR value;
{

  if ( checkType((BASE_TYPE)INT) != 0 )
           return(1);

  if ( topDecl->arrayCount-- < 0 ){
           sprintf(ebuf,"Too many array elements for %s."
             ,typeSpecs[topDecl->declSpec].name);
           yyerror(ebuf);
           resetConsole();
           return(1);
  }

  if ( typeSpecs[topDecl->specCntr].type == INT )
     setIntField(atoi(value));
  else if ( typeSpecs[topDecl->specCntr].type == SHORT )
     setShortField((short)atoi(value));
  else if ( typeSpecs[topDecl->specCntr].type == LONG )
     setLongField((long)atol(value));
  else setUnsignedField((unsigned)atol(value));


  memoryFree(value);
  return(0);

}



int saveIntegerField(name,value)
STR name;
STR value;
{

/*
#ifdef DEBUG_CNS
  printf("data field received: %s = %s\n",name,value);
#endif
*/

  if ( checkField(name,(BASE_TYPE)INT) != 0 )
     return(1);
```

```
  if ( typeSpecs[topDecl->specCntr].type == INT )
     setIntField(atoi(value));
  else if ( typeSpecs[topDecl->specCntr].type == SHORT )
     setShortField((short)atoi(value));
  else if ( typeSpecs[topDecl->specCntr].type == LONG )
     setLongField((long)atol(value));
  else setUnsignedField((unsigned)atol(value));


  topDecl->membersToGo--;
  topDecl->specCntr++;

#ifdef DEBUG_CNS
/*
  printf("data field accepted: %s = %s\n",name,value);
  dumpDeclStack();
*/
#endif

  memoryFree(name);
  memoryFree(value);
  return(0);

}

int saveArrayChar(value)
STR value;
{

  if ( checkType((BASE_TYPE)CHAR) != 0 )
           return(1);

  if ( topDecl->arrayCount-- < 0 ){
           sprintf(ebuf,"Too many array elements for %s."
             ,typeSpecs[topDecl->declSpec].name);
           yyerror(ebuf);
           resetConsole();
           return(1);
  }

  setCharField(value[1]);

#ifdef DEBUG_CNS
/*
  printf("Array char accepted: %s\n",value);
  dumpDeclStack();
*/
#endif

  memoryFree(value);
  return(0);

}
int saveCharField(name,value)
STR name;
STR value;
{

/*
#ifdef DEBUG_CNS
  printf("data field received: %s = %s\n",name,value);
#endif
*/

  if ( checkField(name,(BASE_TYPE)CHAR) != 0 )
     return(1);
```

```
  setCharField(value[1]);
  topDecl->membersToGo--;
  topDecl->specCntr++;

#ifdef DEBUG_CNS
/*
  printf("data field accepted: %s = %s\n",name,value);
  dumpDeclStack();
*/
#endif

  memoryFree(name);
  memoryFree(value);
  return(0);

}



int saveArrayReal(value)
STR value;
{

  if ( checkType((BASE_TYPE)FLOAT) != 0 )
          return(1);

  if ( topDecl->arrayCount-- < 0 ){
          sprintf(ebuf,"Too many array elements for %s."
            ,typeSpecs[topDecl->declSpec].name);
          yyerror(ebuf);
          resetConsole();
          return(1);
  }

  if ( typeSpecs[topDecl->specCntr].type == FLOAT )
     setFloatField((float)atof(value));
  else if ( typeSpecs[topDecl->specCntr].type == DOUBLE)
     setDoubleField((double)atof(value));


  memoryFree(value);
  return(0);

}


int saveRealField(name,value)
STR name;
STR value;
{

/*
#ifdef DEBUG_CNS
  printf("data field received: %s = %s\n",name,value);
#endif
*/

  if ( checkField(name,(BASE_TYPE)FLOAT) != 0 )
     return(1);


  if ( typeSpecs[topDecl->specCntr].type == FLOAT )
     setFloatField((float)atof(value));
  else if ( typeSpecs[topDecl->specCntr].type == DOUBLE)
     setDoubleField((double)atof(value));

  topDecl->membersToGo--;
  topDecl->specCntr++;
```

```
#ifdef DEBUG_CNS
/*
  printf("data field accepted: %s = %s\n",name,value);
  dumpDeclStack();
*/
#endif

  memoryFree(name);
  memoryFree(value);
  return(0);

}



int saveArrayEnum(value)
STR value;
{
  int found,i;

  if ( checkType((BASE_TYPE)ENUM) != 0 )
          return(1);

  if ( topDecl->arrayCount-- < 0 ){
          sprintf(ebuf,"Too many array elements for %s."
            ,typeSpecs[topDecl->declSpec].name);
          yyerror(ebuf);
          resetConsole();
          return(1);
  }


  found=0;
  for (i = getRefTypeDecl(topDecl->specCntr)+1; typeSpecs[i].type == EVAL;
     if ( strcmp(typeSpecs[i].name, value) == 0){
            found=1;
            break;
     }

  if ( found == 0 ) {
     sprintf(ebuf,"Ilegal value %s."
            ,value);
     yyerror(ebuf);
     resetConsole();
     return(1);
  }

  i = i - getRefTypeDecl(topDecl->specCntr) - 1 ;

  setEnumField(i);

  memoryFree(value);
  return(0);

}

int saveEnumField(name,value)
STR name;
STR value;
{
  int found,i;

/*
#ifdef DEBUG_CNS
  printf("data field received: %s = %s\n",name,value);
#endif
*/
```

```
if ( checkField(name,(BASE_TYPE)ENUM) != 0 )
   return(1);

found=0;
for (i = getRefTypeDecl(topDecl->specCntr)+1; typeSpecs[i].type == EVAL;
   if ( strcmp(typeSpecs[i].name, value) == 0){
           found=1;
           break;
   }

if ( found == 0 ) {
   sprintf(ebuf,"Ilegal value %s."
              ,value);
     yyerror(ebuf);
     resetConsole();
     return(1);
  }

  i = i - getRefTypeDecl(topDecl->specCntr) - 1 ;

  topDecl->membersToGo--;
  for (  topDecl->specCntr++
     ; typeSpecs[topDecl->specCntr].type == EVAL
             ; topDecl->specCntr++);

  setEnumField(i);

#ifdef DEBUG_CNS
/*
  printf("data field accepted: %s = %s(%d)\n",name,value,i);
  dumpDeclStack();
*/
#endif

  memoryFree(name);
  memoryFree(value);
  return(0);

}


int saveStringField(name,value)
STR name;
STR value;
{
  int l;
  char *s;

/*
#ifdef DEBUG_CNS
  printf("data field received: %s = %s\n",name,value);
#endif
*/

  if ( checkField(name,(BASE_TYPE)CHAR) != 0 )
     return(1);

  l=strlen(value);
  if ( l >= typeSpecs[topDecl->specCntr].aSize+2) {
     sprintf(ebuf,"String %s too long for field (%d max)."
             ,value, typeSpecs[topDecl->specCntr].aSize);
     yyerror(ebuf);
     resetConsole();
     return(1);
  }

  /* get rid of double qoutes around the string */
```

```
  s=memoryAlloc(strlen(value)-1);
  value[strlen(value)-1]='\0';
  strcpy(s,&value[1]);

  setStringField(s,typeSpecs[topDecl->specCntr].aSize);

  topDecl->membersToGo--;
  topDecl->specCntr++;


#ifdef DEBUG_CNS
/*
  printf("data field accepted: %s = %s\n",name,s);
  dumpDeclStack();
*/
#endif

  memoryFree(name);
  memoryFree(value);
  return(0);

}
/*

$Workfile:   rtsrun.c  $
$Revision:   1.2  $
$Date:   29 Jun 1990 14:06:14   $

$Log:   D:/USR/KERN/RTS/VCS/RTSRUN.C_V  $
 *
 *    Rev 1.2   29 Jun 1990 14:06:14   JLastra
 * Sign on after initialization is completed.
 *
 *
 *    Rev 1.1   19 Jun 1990 23:27:50   JLastra
 * Call to doSynchs added in between messages.
 *
 *    Rev 1.0   18 Jun 1990 23:08:16   JLastra
 * Initial revision.

*/


static char *vscId="$Header:   D:/USR/KERN/RTS/VCS/RTSRUN.C_V   1.2   29 Ju


#include "rtspriv.h"

void rtssRun()

{
  int jmpval;

  /* Warm start entry point */

  if ( (jmpval=setjmp(warmStartEnv)) == 0 )
    startCondition = E_NORMAL_START ;   /* system cold statrt */
  else
    startCondition = jmpval;

  interruptsInit      (startCondition);
  errorHandlerInit    (startCondition, warmStartEnv);
  memoryManagerInit   (startCondition);
  networkInit         (startCondition);
  schedulerInit       (startCondition );
  rtcInit             (startCondition);
```

```
  timersInit          (startCondition );
  environmentInit     (startCondition);
  doSynchTasks();
  interruptsStart     (startCondition);


  /* Sign On */
  rtsVer();

  /* Do forever */
  while(1){
     deliverMsg();
     doAsynchs();
  }
}
/*

$Workfile:   rtstst.c  $
$Revision:   1.0  $
$Date:   18 Jun 1990 23:08:18  $

$Log:   D:/USR/KERN/RTS/VCS/RTSTST.C_V  $
 *
 *    Rev 1.0   18 Jun 1990 23:08:18   JLastra
 * Initial revision.

*/


static char *vscId="$Header:   D:/USR/KERN/RTS/VCS/RTSTST.C_V   1.0   18 Ju

#include "rts.h"

main()
{
   rtssRun();
/*

$Workfile:   cnsact.c  $
$Revision:   1.0  $
$Date:   05 Jul 1990 20:44:14  $

$Log:   D:/USR/KERN/CNS/VCS/CNSACT.C_V  $
 *
 *    Rev 1.0   05 Jul 1990 20:44:14   JLastra
 * Initial revision.

*/


static char *vscId="$Header:   D:/USR/KERN/CNS/VCS/CNSACT.C_V   1.0   05 Ju



#include "cnspriv.h"

static char  ebuf[100];


static unsigned getRefTypeDecl(declIndex)
unsigned declIndex;
{

   if ( typeSpecs[declIndex].type == REF )
           return(getRefTypeDecl(typeSpecs[declIndex].x.refType));
   else
           return(declIndex);
```

```
}


static STR typeName(t)
BASE_TYPE t;
{
  char *s;

  switch (t) {
  case CHAR     : s="CHAR"; break;
  case SHORT    : s="SHORT"; break;
  case INT      : s="INT";  break;
  case LONG     : s="LONG";  break;
  case UNSIGNED : s="UNSIGNED";  break;
  case FLOAT    : s="FLOAT";  break;
  case DOUBLE   : s="DOUBLE";  break;
  case ENUM     : s="ENUM";  break;
  case STRUCT   : s="STRUCT"; break;
  case REF      : s="REF";  break;
  case EVAL     : s="EVAL"; break;
  case MSG_TYPE : s="MSG_TYPE"; break;
  default       : s="?????";
  }
  return(s);
}

static void badFieldName(got,expected)
STR got,expected;
{
    sprintf(ebuf,"Bad field name, got: %s, expected %s ",got,expected);
    yyerror(ebuf);
    resetConsole();
}


static void badFieldType(got,expected)
BASE_TYPE got,expected;
{
    sprintf(ebuf,"Bad field type, got: %s, expected %s "
       ,typeName(got),typeName(expected));
    yyerror(ebuf);
    resetConsole();
}


static int checkType(type)
BASE_TYPE type;
{
  BASE_TYPE t;
  t=typeSpecs[getRefTypeDecl(topDecl->specCntr)].type;

  if (( type == INT ) && (     ( t == SHORT )
                           || ( t == INT )
                           || ( t == UNSIGNED )
                           || ( t == LONG )     ) ) return(0);

  if (( type == FLOAT ) && (    ( t == DOUBLE )
                           || ( t == FLOAT ) ) )    return(0);

  if ( type == t ) /* CHAR, ENUM, STRUCT */
                                                    return(0);

  /* if none of the above, then it is a btype mismatch */
  badFieldType(type,t);
  return(1);
}
```

```
static int checkField(name,type)
STR name;
BASE_TYPE type;
{

  if ( topDecl == NULL ){

     yyerror("Field Declaration on an empty stack\n");
     return(1);
  }

  if ( strcmp(typeSpecs[topDecl->specCntr].name, name ) != 0 ){
     badFieldName(name,typeSpecs[topDecl->specCntr].name);
     return(1);
  }

  return(checkType(type));

}


int startMessage(msgName)
STR msgName;
{

  int i, found;
/*
#ifdef DEBUG_CNS
   printf("Message to send:   %s\n", msgName);
#endif
*/
  found=0;
  for(i=0; i<numOfMessages; i++)
    if (strcmp(msgName, typeSpecs[sysMsgs[i].tIndex].name) == 0){
   newMsg(i);
   found=1;
   break;
   }

  if ( found == 0 ){
           sprintf(ebuf,"Unknown message %s."
              , msgName);
           yyerror(ebuf);
           resetConsole();
           return(1);
  }

  startDecl(sysMsgs[i].tIndex);

/*
#ifdef DEBUG_CNS
  dumpDeclStack();
#endif
*/
  memoryFree(msgName);

  return(0);
}


int saveDest(destName)
STR destName;
```

```
{

   int i, found;
/*
#ifdef DEBUG_CNS
   printf("To destination SM: %s \n", destName);
#endif
*/
   found =0;
   for(i = 0; i< numOfStateMachines; i++)
        if (strcmp(destName,stateMachineNames[i])==0){
         setMsgDest(i);
         found=1;
         break;
      }

   if ( found == 0 ){
             sprintf(ebuf,"Unknown destination %s."
               ,destName);
             yyerror(ebuf);
             resetConsole();
             return(1);
  }

   memoryFree(destName);
   return(0);
}

int saveOrigin(originName)
STR originName;
{

   int i, found;
/*
#ifdef DEBUG_CNS
   printf("From origin SM: %s \n", originName);
#endif
*/
   found = 0 ;
   for(i = 0; i< numOfStateMachines; i++)
        if (strcmp(originName,stateMachineNames[i])==0) {
         setMsgOrigin(i);
         found =1 ;
         break;
   }

   if ( found==0 ){
             sprintf(ebuf,"Unknown origin %s."
               ,originName);
             yyerror(ebuf);
             resetConsole();
             return(1);
  }
   memoryFree(originName);
   return(0);
}


int startStructField(name)
STR name;
{

  if ( checkField(name,(BASE_TYPE)STRUCT) != 0 )
     return(1);

  pushDecl();
  prepareForNewBlock();
```

```
/*
#ifdef DEBUG_CNS
  dumpDeclStack();
#endif
*/

  memoryFree(name);
  return(0);
}


int finishStructField()
{

   if ( topDecl->membersToGo != 0){
           sprintf(ebuf,"Premature end of structure %s."
             ,typeSpecs[topDecl->declSpec].name);
           yyerror(ebuf);
           resetConsole();
           return(1);

   }


   popDecl();

   if ( topDecl == NULL ){
           sendMsg(cnsMsg);
           cnsMsg=NULL;
   }

/*
#ifdef DEBUG_CNS
        dumpDeclStack();
#endif
*/
   return(0);

}

int startArrayField(name)
STR name;
{
  int baseType;

  if ( topDecl == NULL ){
     yyerror("Field Declaration on an empty stack\n");
     return(1);
  }

  baseType=getRefTypeDecl(topDecl->specCntr);

  if ( typeSpecs[baseType].aSize == 0 ){
     yyerror("Unexpected arrray field\n");
     return(1);
  }

 if ( strcmp(typeSpecs[topDecl->specCntr].name, name ) != 0 ){
     badFieldName(name,typeSpecs[topDecl->specCntr].name);
     return(1);
  }

  topDecl->arrayCount = typeSpecs[baseType].aSize;


 if ( typeSpecs[baseType].type != CHAR )
    prepareForNewBlock();
```

```
/*
#ifdef DEBUG_CNS
  dumpDeclStack();
#endif
*/

  memoryFree(name);
  return(0);
}


int finishArrayField()
{
   if ( topDecl->arrayCount != 0){
           sprintf(ebuf,"Too few array elements for %s."
             ,typeSpecs[topDecl->declSpec].name);
           yyerror(ebuf);
           resetConsole();
           return(1);
   }

   topDecl->membersToGo--;
   topDecl->specCntr++;

/*
#ifdef DEBUG_CNS

       dumpDeclStack();
#endif
*/
   return(0);

}
 int saveArrayInt(value)
 STR value;
 {

   if ( checkType((BASE_TYPE)INT) != 0 )
           return(1);

   if ( topDecl->arrayCount-- < 0 ){
           sprintf(ebuf,"Too many array elements for %s."
             ,typeSpecs[topDecl->declSpec].name);
           yyerror(ebuf);
           resetConsole();
           return(1);
   }

   if ( typeSpecs[topDecl->specCntr].type == INT )
      setIntField(atoi(value));
   else if ( typeSpecs[topDecl->specCntr].type == SHORT )
      setShortField((short)atoi(value));
   else if ( typeSpecs[topDecl->specCntr].type == LONG )
      setLongField((long)atol(value));
   else setUnsignedField((unsigned)atol(value));


   memoryFree(value);
   return(0);

 }



 int saveIntegerField(name,value)
 STR name;
 STR value;
 {
```

```
/*
#ifdef DEBUG_CNS
  printf("data field received: %s = %s\n",name,value);
#endif
*/

  if ( checkField(name,(BASE_TYPE)INT) != 0 )
     return(1);
  if ( typeSpecs[topDecl->specCntr].type == INT )
     setIntField(atoi(value));
  else if ( typeSpecs[topDecl->specCntr].type == SHORT )
     setShortField((short)atoi(value));
  else if ( typeSpecs[topDecl->specCntr].type == LONG )
     setLongField((long)atol(value));
  else setUnsignedField((unsigned)atol(value));


  topDecl->membersToGo--;
  topDecl->specCntr++;

#ifdef DEBUG_CNS
/*
  printf("data field accepted: %s = %s\n",name,value);
  dumpDeclStack();
*/
#endif

  memoryFree(name);
  memoryFree(value);
  return(0);

}

int saveArrayChar(value)
STR value;
{

  if ( checkType((BASE_TYPE)CHAR) != 0 )
        return(1);

  if ( topDecl->arrayCount-- < 0 ){
        sprintf(ebuf,"Too many array elements for %s."
          ,typeSpecs[topDecl->declSpec].name);
        yyerror(ebuf);
        resetConsole();
        return(1);
  }

  setCharField(value[1]);

#ifdef DEBUG_CNS
/*
  printf("Array char accepted: %s\n",value);
  dumpDeclStack();
*/
#endif

  memoryFree(value);
  return(0);
int saveCharField(name,value)
STR name;
STR value;
{

/*
#ifdef DEBUG_CNS
  printf("data field received: %s = %s\n",name,value);
#endif
*/
```

```
  if ( checkField(name,(BASE_TYPE)CHAR) != 0 )
     return(1);

  setCharField(value[1]);
  topDecl->membersToGo--;
  topDecl->specCntr++;

#ifdef DEBUG_CNS
/*
  printf("data field accepted: %s = %s\n",name,value);
  dumpDeclStack();
*/
#endif

  memoryFree(name);
  memoryFree(value);
  return(0);

}


int saveArrayReal(value)
STR value;
{

  if ( checkType((BASE_TYPE)FLOAT) != 0 )
          return(1);

  if ( topDecl->arrayCount-- < 0 ){
          sprintf(ebuf,"Too many array elements for %s."
            ,typeSpecs[topDecl->declSpec].name);
          yyerror(ebuf);
          resetConsole();
          return(1);
  }

  if ( typeSpecs[topDecl->specCntr].type == FLOAT )
     setFloatField((float)atof(value));
  else if ( typeSpecs[topDecl->specCntr].type == DOUBLE)
     setDoubleField((double)atof(value));


  memoryFree(value);
  return(0);

}


int saveRealField(name,value)
STR name;
STR value;
{

/*
#ifdef DEBUG_CNS
  printf("data field received: %s = %s\n",name,value);
#endif
*/

  if ( checkField(name,(BASE_TYPE)FLOAT) != 0 )
     return(1);


  if ( typeSpecs[topDecl->specCntr].type == FLOAT )
     setFloatField((float)atof(value));
  else if ( typeSpecs[topDecl->specCntr].type == DOUBLE)
     setDoubleField((double)atof(value));
```

```
  topDecl->membersToGo--;
  topDecl->specCntr++;


#ifdef DEBUG_CNS
/*
  printf("data field accepted: %s = %s\n",name,value);
  dumpDeclStack();
*/
#endif

  memoryFree(name);
  memoryFree(value);
  return(0);

}



int saveArrayEnum(value)
STR value;
{
  int found,i;

  if ( checkType((BASE_TYPE)ENUM) != 0 )
          return(1);

  if ( topDecl->arrayCount-- < 0 ){
          sprintf(ebuf,"Too many array elements for %s."
            ,typeSpecs[topDecl->declSpec].name);

           yyerror(ebuf);
           resetConsole();
           return(1);
   }


   found=0;
   for (i = getRefTypeDecl(topDecl->specCntr)+1; typeSpecs[i].type == EVAL;
      if ( strcmp(typeSpecs[i].name, value) == 0){
              found=1;
              break;
      }

   if ( found == 0 ) {
      sprintf(ebuf,"Ilegal value %s."
              ,value);
      yyerror(ebuf);
      resetConsole();
      return(1);
   }

   i = i - getRefTypeDecl(topDecl->specCntr) - 1 ;

   setEnumField(i);

   memoryFree(value);
   return(0);

 }


 int saveEnumField(name,value)
 STR name;
 STR value;
 {
   int found,i;
```

```
/*
#ifdef DEBUG_CNS
  printf("data field received: %s = %s\n",name,value);
#endif
*/

  if ( checkField(name,(BASE_TYPE)ENUM) != 0 )
     return(1);

  found=0;
  for (i = getRefTypeDecl(topDecl->specCntr)+1; typeSpecs[i].type == EVAL;
     if ( strcmp(typeSpecs[i].name, value) == 0){
             found=1;
             break;
     }

  if ( found == 0 ) {
     sprintf(ebuf,"Ilegal value %s."
             ,value);
     yyerror(ebuf);
     resetConsole();
     return(1);
  }

  i = i - getRefTypeDecl(topDecl->specCntr) - 1 ;

  topDecl->membersToGo--;
  for (  topDecl->specCntr++
     ; typeSpecs[topDecl->specCntr].type == EVAL
             ; topDecl->specCntr++);

  setEnumField(i);

#ifdef DEBUG_CNS
/*
  printf("data field accepted: %s = %s(%d)\n",name,value,i);
  dumpDeclStack();
*/
#endif

  memoryFree(name);
  memoryFree(value);
  return(0);

}


int saveStringField(name,value)
STR name;
STR value;
{
  int l;
  char *s;

/*
#ifdef DEBUG_CNS
  printf("data field received: %s = %s\n",name,value);
#endif
*/

  if ( checkField(name,(BASE_TYPE)CHAR) != 0 )
     return(1);

  l=strlen(value);
  if ( l >= typeSpecs[topDecl->specCntr].aSize+2) {
     sprintf(ebuf,"String %s too long for field (%d max)."
             ,value, typeSpecs[topDecl->specCntr].aSize);
```

```
   yyerror(ebuf);
   resetConsole();
   return(1);
}

/* get rid of double qoutes around the string */
  s=memoryAlloc(strlen(value)-1);
  value[strlen(value)-1]='\0';
  strcpy(s,&value[1]);

  setStringField(s,typeSpecs[topDecl->specCntr].aSize);

  topDecl->membersToGo--;
  topDecl->specCntr++;


#ifdef DEBUG_CNS
/*
  printf("data field accepted: %s = %s\n",name,s);
  dumpDeclStack();
*/
#endif

  memoryFree(name);
  memoryFree(value);
  return(0);

}
/*

$Workfile:   cnsglob.c  $
$Revision:   1.0  $
$Date:   05 Jul 1990 20:44:18  $

$Log:   D:/USR/KERN/CNS/VCS/CNSGLOB.C_V  $
 *
 *    Rev 1.0   05 Jul 1990 20:44:18   JLastra
 * Initial revision.

*/


static char *vscId="$Header:   D:/USR/KERN/CNS/VCS/CNSGLOB.C_V   1.0   05 J


#define DO_cns
#include "cnspriv.h"
/*

$Workfile:   cnsinit.c  $
$Revision:   1.0  $
$Date:   05 Jul 1990 20:44:22  $

$Log:   D:/USR/KERN/CNS/VCS/CNSINIT.C_V  $
 *
 *    Rev 1.0   05 Jul 1990 20:44:22   JLastra
 * Initial revision.

*/


static char *vscId="$Header:   D:/USR/KERN/CNS/VCS/CNSINIT.C_V   1.0   05 J


#include "cnspriv.h"
```

```
static void initInputFile(fName)
char *fName;
{
   if ( fName == NULL ){
          fprintf(stderr, "Must specify input script file\n");
          exit(1);
   }

   if ( (yyin = fopen(fName,"r")) == NULL ) {
          fprintf(stderr, "sysConsole: Cannot open file %s\n", fName);
          exit(1);
   }

}


static void initOutputFile(fName)
char *fName;
{
   char  f[20];
   int   i;
   char *p;

   if ( fName == NULL )
          return;

/* if ( freopen(fName,"w",stdout) == NULL ) {
          fprintf(stderr, "sysConsole: Cannot open file %s\n", f);
          exit(1);
   }
*/
}
   void initCons(scriptFile, outputFile)
   char *scriptFile, *outputFile;
   {
      cnsMsg = NULL;
      initInputFile(scriptFile);
      initOutputFile(outputFile);
      declStackInit();
           lineNo = 1;
      cnsState = SYS_GO;

   }

   void resetConsole()
   {
      declStackPurge();
      if ( cnsMsg != NULL ){
             memoryFree((char *)cnsMsg);
             cnsMsg=NULL;
             };


#define YYNEWLINE 012
#define    INITIAL 0
#define YY_LA_SIZE 8

static unsigned short yy_la_act [] = {
 15|0<<9, 0|0<<9, 15|0<<9, 15|0<<9, 15|0<<9, 15|0<<9, 9|0<<9, 15|0<<9, 9|0<
 14|0<<9, 15|0<<9, 15|0<<9, 9|0<<9, 8|0<<9, 9|0<<9, 9|0<<9, 7|0<<9, 9|0<<9,
 2|0<<9, 0|0<<9, 1|0<<9, 3|0<<9, 1|0<<9, 2|0<<9, 1|0<<9, 1|0<<9, 2|0<<9,
};

static unsigned char yy_look [] = {
 0
};
```

```
static short yy_final [] = {
 0, 0, 1, 3, 4, 5, 6, 8, 10, 11, 13, 15, 16, 18, 19, 20,
 20, 20, 21, 22, 23, 25, 27, 27, 27, 27, 27, 27, 27, 27, 28, 28,
 28, 28, 28, 29, 29, 29, 30, 30, 31, 32, 32, 32, 33, 34, 35, 35,
 35, 36, 38, 38, 38, 39, 39, 39, 41, 41,
};
typedef unsigned char yy_state_t;
#define    yy_endst 57
#define    yy_nxtmax 612

static yy_state_t yy_begin [] = {
 0, 0,
};

static yy_state_t yy_next [] = {
 13, 13, 13, 13, 13, 13, 13, 13, 13, 10, 11, 13, 13, 12, 13, 13,
 13, 13, 13, 13, 13, 13, 13, 13, 13, 13, 13, 13, 13, 13, 13, 13,
 10, 13, 8, 13, 13, 5, 13, 4, 13, 13, 13, 1, 13, 1, 3, 13,
 2, 2, 2, 2, 2, 2, 2, 2, 2, 2, 13, 13, 13, 13, 13, 13,
 13, 9, 9, 9, 9, 9, 9, 9, 9, 9, 9, 9, 9, 9, 9, 9,
 9, 9, 9, 9, 9, 9, 9, 9, 9, 9, 9, 13, 13, 13, 13, 13,
 13, 9, 9, 9, 9, 9, 7, 9, 9, 9, 9, 9, 9, 9, 9, 9,
 9, 9, 9, 9, 6, 9, 9, 9, 9, 9, 9, 13, 13, 13, 13, 13,
 14, 14, 14, 14, 14, 14, 14, 14, 14, 14, 18, 19, 20, 21, 22, 27,
 30, 14, 14, 14, 14, 14, 14, 14, 14, 14, 14, 14, 14, 14, 14, 14,
 14, 14, 14, 14, 14, 14, 14, 14, 14, 14, 14, 31, 32, 35, 36, 14,
 37, 14, 14, 14, 14, 14, 14, 14, 14, 14, 14, 14, 14, 14, 14, 14,
 14, 14, 14, 14, 14, 14, 14, 14, 14, 14, 14, 15, 15, 15, 15, 15,
 15, 15, 15, 15, 15, 15, 15, 15, 15, 15, 15, 15, 15, 15, 15, 15,
 15, 15, 15, 15, 15, 39, 57, 57, 57, 57, 57, 15, 15, 15, 15, 15,
 15, 15, 15, 15, 15, 15, 15, 15, 15, 15, 15, 15, 15, 15, 15, 15,
 15, 15, 15, 15, 15, 17, 23, 28, 29, 33, 34, 29, 57, 34, 57, 57,
 57, 57, 57, 16, 16, 16, 16, 16, 16, 16, 16, 16, 16, 23, 28, 57,
 33, 57, 57, 57, 16, 16, 16, 16, 16, 16, 16, 16, 16, 16, 16, 16,
 16, 16, 16, 16, 16, 16, 16, 16, 16, 16, 16, 16, 16, 16, 41, 41,
 53, 53, 16, 57, 16, 16, 16, 16, 16, 16, 16, 16, 16, 16, 16, 16,
 16, 16, 16, 16, 16, 16, 16, 16, 16, 16, 16, 16, 16, 16, 41, 41,
 53, 53, 57, 57, 26, 25, 38, 38, 38, 38, 38, 38, 38, 38, 38, 38,
 24, 38, 38, 38, 38, 38, 38, 38, 38, 38, 38, 38, 38, 38, 38, 38,
 38, 38, 38, 38, 38, 38, 38, 38, 38, 38, 38, 38, 38, 38, 38, 38,
 38, 38, 38, 38, 38, 38, 38, 38, 38, 38, 38, 38, 38, 38, 38, 38,
 38, 38, 38, 38, 38, 38, 38, 38, 38, 38, 38, 38, 38, 38, 38, 38,
 38, 38, 38, 38, 38, 38, 38, 38, 38, 38, 38, 38, 38, 38, 38, 38,
 38, 38, 38, 38, 38, 38, 38, 38, 38, 38, 38, 38, 38, 38, 38, 38,
 38, 38, 38, 38, 38, 38, 38, 38, 38, 38, 38, 38, 38, 38, 38, 38,
 38, 38, 38, 38, 38, 38, 40, 40, 40, 40, 40, 40, 40, 40, 40, 40,
 42, 57, 42, 57, 57, 43, 43, 43, 43, 43, 43, 43, 43, 43, 43, 45,
 57, 44, 44, 44, 44, 44, 44, 44, 44, 44, 44, 57, 57, 57, 57, 57,
 57, 57, 47, 57, 47, 46, 46, 48, 48, 48, 48, 48, 48, 48, 48, 48,
 48, 57, 57, 49, 49, 49, 49, 49, 49, 49, 49, 49, 49, 57, 57, 57,
 57, 57, 57, 57, 57, 46, 46, 50, 50, 51, 57, 51, 57, 57, 52, 52,
 52, 52, 52, 52, 52, 52, 52, 52, 54, 57, 54, 57, 57, 55, 55, 55,
 55, 55, 55, 55, 55, 55, 55, 50, 50, 56, 57, 44, 44, 44, 44, 44,
 44, 44, 44, 44, 44,
};

static yy_state_t yy_check [] = {
 0, 0, 0, 0, 0, 0, 0, 0, 0, 0, 0, 0, 0, 0, 0, 0,
 0, 0, 0, 0, 0, 0, 0, 0, 0, 0, 0, 0, 0, 0, 0, 0,
 0, 0, 0, 0, 0, 0, 0, 0, 0, 0, 0, 0, 0, 0, 0, 0,
 0, 0, 0, 0, 0, 0, 0, 0, 0, 0, 0, 0, 0, 0, 0, 0,
 0, 0, 0, 0, 0, 0, 0, 0, 0, 0, 0, 0, 0, 0, 0, 0,
 0, 0, 0, 0, 0, 0, 0, 0, 0, 0, 0, 0, 0, 0, 0, 0,
 0, 0, 0, 0, 0, 0, 0, 0, 0, 0, 0, 0, 0, 0, 0, 0,
 0, 0, 0, 0, 0, 0, 0, 0, 0, 0, 0, 0, 0, 0, 0, 0,
 9, 9, 9, 9, 9, 9, 9, 9, 9, 9, 7, 18, 19, 6, 5, 26,
```

```
25, 9, 9, 9, 9, 9, 9, 9, 9, 9, 9, 9, 9, 9, 9, 9,
9, 9, 9, 9, 9, 9, 9, 9, 9, 9, 9, 30, 31, 24, 35, 9,
36, 9, 9, 9, 9, 9, 9, 9, 9, 9, 9, 9, 9, 9, 9, 9,
9, 9, 9, 9, 9, 9, 9, 9, 9, 9, 9, 8, 8, 8, 8, 8,
8, 8, 8, 8, 8, 8, 8, 8, 8, 8, 8, 8, 8, 8, 8, 8,
8, 8, 8, 8, 8, 38, 43, 42, 43, 42, -1, 8, 8, 8, 8, 8,
8, 8, 8, 8, 8, 8, 8, 8, 8, 8, 8, 8, 8, 8, 8, 8,
8, 8, 8, 8, 8, 15, 22, 27, 27, 32, 32, 27, 48, 32, 48, 47,
52, 47, 52, 15, 15, 15, 15, 15, 15, 15, 15, 15, 15, 22, 27, 51,
32, 51, -1, -1, 15, 15, 15, 15, 15, 15, 15, 15, 15, 15, 15, 15,
15, 15, 15, 15, 15, 15, 15, 15, 15, 15, 15, 15, 15, 15, 40, 40,
49, 49, 15, -1, 15, 15, 15, 15, 15, 15, 15, 15, 15, 15, 15, 15,
15, 15, 15, 15, 15, 15, 15, 15, 15, 15, 15, 15, 15, 15, 40, 40,
49, 49, -1, -1, 22, 22, 4, 4, 4, 4, 4, 4, 4, 4, 4, 4,
22, 4, 4, 4, 4, 4, 4, 4, 4, 4, 4, 4, 4, 4, 4, 4,
4, 4, 4, 4, 4, 4, 4, 4, 4, 4, 4, 4, 4, 4, 4, 4,
4, 4, 4, 4, 4, 4, 4, 4, 4, 4, 4, 4, 4, 4, 4, 4,
4, 4, 4, 4, 4, 4, 4, 4, 4, 4, 4, 4, 4, 4, 4, 4,
4, 4, 4, 4, 4, 4, 4, 4, 4, 4, 4, 4, 4, 4, 4, 4,
4, 4, 4, 4, 4, 4, 4, 4, 4, 4, 4, 4, 4, 4, 4, 4,
4, 4, 4, 4, 4, 4, 4, 4, 4, 4, 4, 4, 4, 4, 4, 4,
4, 4, 4, 4, 4, 4, 3, 3, 3, 3, 3, 3, 3, 3, 3, 3,
41, 55, 41, 55, -1, 41, 41, 41, 41, 41, 41, 41, 41, 41, 41, 2,
-1, 2, 2, 2, 2, 2, 2, 2, 2, 2, 54, -1, 54, -1, -1,
-1, -1, 46, -1, 46, 2, 2, 46, 46, 46, 46, 46, 46, 46, 46, 46,
46, -1, -1, 45, 45, 45, 45, 45, 45, 45, 45, 45, 45, -1, -1, -1,
-1, -1, -1, -1, -1, 2, 2, 45, 45, 50, -1, 50, -1, -1, 50, 50,
50, 50, 50, 50, 50, 50, 50, 50, 53, -1, 53, -1, -1, 53, 53, 53,
53, 53, 53, 53, 53, 53, 53, 45, 45, 1, -1, 1, 1, 1, 1, 1,
1, 1, 1, 1, 1,
};

static yy_state_t yy_default [] = {
 57, 57, 57, 57, 57, 57, 9, 9, 57, 57, 57, 57, 57, 57, 9, 57,
 15, 57, 9, 9, 9, 9, 57, 22, 57, 57, 57, 57, 27, 57, 57, 57,
 57, 32, 57, 57, 57, 57, 57, 57, 3, 57, 41, 41, 2, 57, 57, 46,
 46, 45, 57, 50, 50, 57, 53, 53, 3,
};

static short yy_base [] = {
 0, 555, 465, 438, 358, 105, 30, 24, 138, 80, 613, 613, 613, 613, 613, 227,
 613, 613, 28, 31, 613, 613, 253, 613, 72, 33, 32, 254, 613, 613, 63, 72,
 256, 613, 613, 64, 76, 613, 190, 613, 250, 453, 188, 187, 613, 499, 487, 2
 225, 252, 526, 244, 229, 541, 480, 454, 613, 613,
};


#line 1 "/etc/yylex.c"
/*
 * Copyright 1988 Mortice Kern Systems Inc.
 * All rights reserved.
 */
#include <stdio.h>
/*
 * Include string.h to get definition of memmove() and size_t.
 * If you do not have string.h or it does not declare memmove
 * or size_t, you will have to declare them here.
 */
#include <string.h>
/* Uncomment next line if memmove() is not declared in string.h */
/*extern char * memmove();*/
/* Uncomment next line if size_t is not available in stdio.h or string.h */
/*typedef unsigned size_t;*/
/* Drop this when LATTICE provides memmove */
#ifdef LATTICE
#define memmove    memcopy
#endif
```

```
/*
 * YY_STATIC determines the scope of variables and functions
 * declared by the lex scanner. It must be set with a -DYY_STATIC
 * option to the compiler (it cannot be defined in the lex program).
 */
#ifdef     YY_STATIC
/* define all variables as static to allow more than one lex scanner */
#define    YY_DECL static
#else
/* define all variables as global to allow other modules to access them */
#define    YY_DECL
#endif

#ifdef __STDC__
#define    YY_ARGS(_args_) _args_
#else
#define    YY_ARGS(_args_) ()
#endif

/*
 * the following can be redefined by the user.
 */
#define    ECHO               fputs(yytext, yyout)
#define    yygetc()           getc(yyin)       /* yylex input source */
#define    output(c)          putc((c), yyout) /* yylex sink for unmatched cha
#define    YY_FATAL(msg)      { fprintf(stderr, "yylex: %s\n", msg); exit(1);
#define    YY_INTERACTIVE     1                /* save micro-seconds if 0 */
#define    YYLMAX             100              /* token and pushback buffer siz

/*
 * the following must not be redefined.
 */
#define    yytext  yy_tbuf          /* token string */

#define    BEGIN              yy_start =
#define    REJECT             goto yy_reject
#define    NLSTATE            (yy_lastc = YYNEWLINE)
#define    YY_INIT            (yy_start = 0, yyleng = yy_end = 0, yy_lastc = Y
#define    yymore()           goto yy_more
#define    yyless(n)          if ((n) < 0 || (n) > yy_end) ; \
                   else { YY_SCANNER; yyleng = (n); YY_USER; }

YY_DECL    int     input   YY_ARGS((void));
YY_DECL    int     unput   YY_ARGS((int c));

/* functions defined in libl.lib */
extern     int     yywrap  YY_ARGS((void));
extern     void    yyerror YY_ARGS((char *fmt, ...));
extern     void    yycomment        YY_ARGS((char *term));
extern     int     yymapch YY_ARGS((int delim, int escape));

#line 2 "cnslex.l"
/*

$Workfile:   cnslex.l  $
$Revision:   1.0  $
$Date:   05 Jul 1990 20:44:26  $

$Log:   D:/USR/KERN/CNS/VCS/CNSLEX.L_V  $

      Rev 1.0   05 Jul 1990 20:44:26   JLastra
   Initial revision.

*/


static char *vscId="$Header:   D:/USR/KERN/CNS/VCS/CNSLEX.L_V   1.0   05 Ju
```

```
#include "cnspriv.h"
#include "cnsparse.h"

#ifdef yygetc
#undef yygetc
#endif
#define yygetc()   _getch()


#line 72 "/etc/yylex.c"


#ifdef     YY_DEBUG
#undef     YY_DEBUG
#define    YY_DEBUG(fmt, a1, a2)   fprintf(stderr, fmt, a1, a2)
#else
#define    YY_DEBUG(fmt, a1, a2)
#endif

/*
 * The declaration for the lex scanner can be changed by
 * redefining YYLEX or YYDECL. This must be done if you have
 * more than one scanner in a program.
 */
#ifndef    YYLEX
#define    YYLEX yylex                        /* name of lex scanner */
#endif

#ifndef YYDECL
#define    YYDECL  int YYLEX YY_ARGS((void))       /* declaration for lex :
#endif

/* stdin and stdout may not neccessarily be constants */
YY_DECL    FILE   *yyin = stdin;
YY_DECL    FILE   *yyout = stdout;
YY_DECL    int     yylineno = 1;             /* line number */
YY_DECL    int     yyleng = 0;               /* yytext token length */

/*
 * yytext is defined to be yy_tbuf.
 * yy_sbuf[0:yyleng-1] contains the states corresponding to yy_tbuf.
 * yy_tbuf[0:yyleng-1] contains the current token.
 * yy_tbuf[yyleng:yy_end-1] contains pushed-back characters.
 * When the user action routine is active,
 * yy_save contains yy_tbuf[yyleng], which is set to '\0'.
 * Things are different when YY_PRESERVE is defined.
 */

YY_DECL    unsigned char yy_tbuf [YYLMAX+1]; /* text buffer */
static     yy_state_t yy_sbuf [YYLMAX+1];  /* state buffer */

static     int     yy_end = 0;               /* end of pushback */
static     int     yy_start = 0;             /* start state */
static     int     yy_lastc = YYNEWLINE;     /* previous char */

#ifndef YY_PRESERVE        /* the efficient default push-back scheme */

static     unsigned char yy_save;  /* saved yytext[yyleng] */

#define    YY_USER { /* set up yytext for user */ \
           yy_save = yytext[yyleng]; \
           yytext[yyleng] = 0; \
   }
#define    YY_SCANNER { /* set up yytext for scanner */ \
           yytext[yyleng] = yy_save; \
   }

#else               /* not-so efficient push-back for yytext mungers */
```

```
static      unsigned char yy_save [YYLMAX];
static      unsigned char *yy_push = yy_save+YYLMAX;

#define     YY_USER { \
            size_t n = yy_end - yyleng; \
            yy_push = yy_save+YYLMAX - n; \
            if (n > 0) \
                    memmove(yy_push, yytext+yyleng, n); \
            yytext[yyleng] = 0; \
   }
#define     YY_SCANNER { \
            size_t n = yy_save+YYLMAX - yy_push; \
            if (n > 0) \
                    memmove(yytext+yyleng, yy_push, n); \
            yy_end = yyleng + n; \
   }

#endif

/*
 * The actual lex scanner (usually yylex(void)).
 */
YYDECL {

#line 154 "/etc/yylex.c"

   register int c, i, yyst, yybase;
   int yyfmin, yyfmax;              /* yy_la_act indices of final states */
   int yyoldi, yyoleng;             /* base i, yyleng before look-ahead */

   i = yyleng;
   YY_SCANNER;

  yy_again:
   yyleng = i;
   /* determine previous char.. */
   if (i > 0)
           yy_lastc = yytext[i-1];
   /* scan previously accepted token adjusting yylineno */
 while (i > 0)
         if (yytext[--i] == YYNEWLINE)
                 yylineno++;
 /* adjust pushback */
 yy_end -= yyleng;
 memmove(yytext, yytext+yyleng, (size_t) yy_end);
 i = 0;

yy_contin:
 yyoldi = i;

 /* run the state machine until it jams */
 for (yy_sbuf[i] = yyst = yy_begin[yy_start + (yy_lastc == YYNEWLINE)];
     !(yyst == yy_endst || YY_INTERACTIVE && yy_base[yyst] > yy_nxtmax &
     yy_sbuf[++i] = yyst) {
         YY_DEBUG("<state %d, i = %d>\n", yyst, i);
         if (i >= YYLMAX)
                 YY_FATAL("Token buffer overflow");

         /* get input char */
         if (i < yy_end)
                 c = yy_tbuf[i];         /* get pushback char */
         else if ((c = yygetc()) != EOF) {
                 yy_end = i+1;
                 yy_tbuf[i] = c = (unsigned char) c;
         } else /* c == EOF */ {
                 if (i == yyoldi)        /* no token */
                         if (yywrap())
                                 return 0;
```

```
                        else
                                goto yy_again;
                else
                        break;
        }
        YY_DEBUG("<input %d = 0x%02x>\n", c, c);

        /* look up next state */
        while ((yybase = yy_base[yyst]+c) > yy_nxtmax || yy_check[yybase
                if (yyst == yy_endst)
                        goto yy_jammed;
                yyst = yy_default[yyst];
        }
        yyst = yy_next[yybase];
  yy_jammed: ;
 }
 YY_DEBUG("<stopped %d, i = %d>\n", yyst, i);
 if (yyst != yy_endst)
        ++i;

yy_search:
 /* search backward for a final state */
 while (--i > yyoldi) {
        yyst = yy_sbuf[i];
        if ((yyfmin = yy_final[yyst]) < (yyfmax = yy_final[yyst+1]))
                goto yy_found;  /* found final state(s) */
  }
  /* no match, default action */
  i = yyoldi + 1;
  output(yy_tbuf[yyoldi]);
  goto yy_again;

 yy_found:
  YY_DEBUG("<final state %d, i = %d>\n", yyst, i);
  yyoleng = i;            /* save length for REJECT */

  /* pushback look-ahead RHS */
  if ((c = (int)(yy_la_act[yyfmin]>>9) - 1) >= 0) { /* trailing context? *
        unsigned char *bv = yy_look + c*YY_LA_SIZE;
        static unsigned char bits [8] = {
                1<<0, 1<<1, 1<<2, 1<<3, 1<<4, 1<<5, 1<<6, 1<<7
        };
        while (1) {
                if (--i < yyoldi) {     /* no / */
                        i = yyoleng;
                        break;
                }
                yyst = yy_sbuf[i];
                if (bv[(unsigned)yyst/8] & bits[(unsigned)yyst%8])
                        break;
        }
  }

  /* perform action */
  yyleng = i;
  YY_USER;
  switch (yy_la_act[yyfmin] & 0777) {
  case 0:
#line 36 "cnslex.l"
  {  setyylval(); return(INTEGER) ; } ;
  break;
  case 1:
#line 37 "cnslex.l"
  {  setyylval(); return(REAL) ; } ;
  break;
  case 2:
```

```
#line 38 "cnslex.l"
   {  setyylval(); return(REAL) ; } ;
   break;
   case 3:
#line 39 "cnslex.l"
   {  setyylval(); return(REAL) ; } ;
   break;
   case 4:
#line 40 "cnslex.l"
   {  setyylval(); return(CHAR) ; } ;
   break;
   case 5:
#line 41 "cnslex.l"
   {  return(SEND) ; };
   break;
   case 6:
#line 42 "cnslex.l"
   {  return(TO) ; };
   break;
   case 7:
#line 43 "cnslex.l"
   {  return(FROM) ; };
   break;
   case 8:
#line 45 "cnslex.l"

                         {  setyylval(); return(QUOTED_STRING) ; };
   break;
   case 9:
#line 46 "cnslex.l"
   {  setyylval(); return(STRING) ; };
   break;
   case 10:
#line 47 "cnslex.l"
   { } ;
   break;
   case 11:
#line 48 "cnslex.l"
   { lineNo++ ; return(HOLD_CMD) ; } ;
   break;
   case 12:
#line 49 "cnslex.l"
   {  lineNo++; return(GO_CMD) ; } ;
   break;
   case 13:
#line 50 "cnslex.l"
   {  lineNo++;};
   break;
   case 14:
#line 51 "cnslex.l"
   { lineNo++;};
   break;
   case 15:
#line 52 "cnslex.l"
   {  return(yytext[0]); } ;
   break;
#line 254 "/etc/yylex.c"
  }
  YY_SCANNER;
  i = yyleng;
  goto yy_again;                  /* action fell though */

 yy_reject:
  YY_SCANNER;
  i = yyoleng;                    /* restore original yytext */
  if (++yyfmin < yyfmax)
          goto yy_found;          /* another final state, same length */
  else
```

```
            goto yy_search;          /* try shorter yytext */

  yy_more:
    YY_SCANNER;
    i = yyleng;
    if (i > 0)
            yy_lastc = yytext[i-1];
    goto yy_contin;
}

/*
 * user callable input/unput functions.
 */

/* get input char with pushback */
YY_DECL int
input()
{
   int c;
#ifndef YY_PRESERVE
   if (yy_end > yyleng) {
            yy_end--;
            memmove(yytext+yyleng, yytext+yyleng+1,
                     (size_t) (yy_end-yyleng));
            c = yy_save;
            YY_USER;
#else
   if (yy_push < yy_save+YYLMAX) {
            c = *yy_push++;
#endif
   } else
            c = yygetc();
   yy_lastc = c;
   if (c == YYNEWLINE)
            yylineno++;
   return c;
}

/* pushback char */
YY_DECL int
unput(c)
   int c;
{
#ifndef YY_PRESERVE
   if (yy_end >= YYLMAX)
            YY_FATAL("Push-back buffer overflow");
   if (yy_end > yyleng) {
            yytext[yyleng] = yy_save;
            memmove(yytext+yyleng+1, yytext+yyleng,
                     (size_t) (yy_end-yyleng));
            yytext[yyleng] = 0;
   }
   yy_end++;
   yy_save = c;
#else
   if (yy_push <= yy_save)
            YY_FATAL("Push-back buffer overflow");
   *--yy_push = c;
#endif
   if (c == YYNEWLINE)
            yylineno--;
   return c;
}

#line 54 "cnslex.l"


int setyylval()
{
```

```
   yylval = memoryAlloc(yyleng+1);
   strcpy(yylval,&yytext[0]);
   return;
}
yywrap(){
   return(1);

   rkfile:   cnsmain.c  $
   :vision:  1.0  $
   ate:   05 Jul 1990 20:44:32  $

  .og:   D:/USR/KERN/CNS/VCS/CNSMAIN.C_V  $

  *    Rev 1.0   05 Jul 1990 20:44:32   JLastra
  * Initial revision.

 */


static char *vscId="$Header:   D:/USR/KERN/CNS/VCS/CNSMAIN.C_V   1.0   05 J

#include "cnspriv.h"


void sysConsole()

{
   if ( consolePeek() != 0 )
           do {
                   yyparse();
           } while( cnsState == SYS_HOLD ) ;
/*
   if ( (yyin->_flag & _IOEOF )!= 0 ) {
      fprintf(stderr,"End of input script.\n\n");
      exit(0);
   }

   yyparse();
   fprintf(stderr,"Hit any key to continue\n");
   _getch();
*/
}


void yyerror(s)
char *s;

{
  fprintf(stderr, "sysConsole: %s near line %d \n", s, lineNo);
}



void sysGo()
{
   cnsState = SYS_GO;
}
void sysHold()
{
   cnsState = SYS_HOLD;
}

/*

$Workfile:   cnsmsg.c  $
$Revision:   1.0  $
$Date:   05 Jul 1990 20:44:36  $
```

```
$Log:   D:/USR/KERN/CNS/VCS/CNSMSG.C_V  $
 *
 *    Rev 1.0   05 Jul 1990 20:44:36   JLastra
 * Initial revision.

*/


static char *vscId="$Header:   D:/USR/KERN/CNS/VCS/CNSMSG.C_V   1.0   05 Ju


#include "cnspriv.h"


static unsigned *alignToEven(p)
unsigned *p;
{
   char *c;
   c=(char *)p;
   if (( (unsigned)c % 2 ) != 0 ).
           c++;
   return((unsigned *)c);
}


newMsg(msgName)
unsigned msgName;
{


 if (cnsMsg != NULL ){
     yyerror("Previous message not complete.");
     resetConsole();
     return(1);
  }


  if ( (cnsMsg = msgAlloc(sysMsgs[msgName].tSize-sizeof(MSG_T))) == NULL){
     yyerror("Out of memory!!!");
     resetConsole();
     return(1);
  }
  cnsMsg->fields.name = msgName;
  infoPtr = &(((CNS_MSG_T *)cnsMsg)->msgInfo);
}
void setMsgDest(smDest)
unsigned smDest;
{

   cnsMsg->fields.dest=smDest;
}


void setMsgOrigin(smOrigin)
unsigned smOrigin;
{
   cnsMsg->fields.origin=smOrigin;

}

void prepareForNewBlock()
{
   infoPtr=alignToEven(infoPtr);
}

void setIntField(val)
int val;
{
```

```
   int *p;
   infoPtr=alignToEven(infoPtr);
   p=(int *)infoPtr;
   *p=val;
/*
   printf("Int value set      %d\n",val);
*/
   infoPtr++;

}


void setLongField(val)
long val;
{
   long *p;
   infoPtr=alignToEven(infoPtr);
   p=(long *)infoPtr;
   *p=val;
/*
   printf("Long value set      %ld\n",val);
*/
   infoPtr=infoPtr+2;

}


void setUnsignedField(val)
unsigned val;
{
   unsigned *p;
   infoPtr=alignToEven(infoPtr);
   p=(unsigned *)infoPtr;
   *p=val;
/*
   printf("Unsigned value set  %d\n",val);
*/
   infoPtr++;

}


void setShortField(val)
short val;
{
   short *p;
   infoPtr=alignToEven(infoPtr);
   p=(short *)infoPtr;
   *p=val;
/*
   printf("Short value set     %d\n",val);
*/
   infoPtr++;


}


void setCharField(c)
char unsigned c;
{

   char *p;
   p=(char *)infoPtr;
   *p=c;
/*
   printf("Char value set      %c\n",c);
```

```
*/
   p++;
   infoPtr=(unsigned *)p;
}


void setFloatField(flt)
float flt;
{

   float *p;
   infoPtr=alignToEven(infoPtr);
   p=(float *)infoPtr;
   *p=flt;
/*
   printf("Float value set     %e\n",flt);
*/
   infoPtr=infoPtr+2;

}

void setDoubleField(dbl)
double dbl;
{

   double *p;
   infoPtr=alignToEven(infoPtr);
   p=(double *)infoPtr;
   *p=dbl;
/*
   printf("Double value set    %e\n",dbl);
*/
   infoPtr=infoPtr+4;

}

void setEnumField(i)
int i;
{

   setIntField(i);

}


void setStringField(s,bufLen)
char *s;
{

   int i;

   strcpy((char *)infoPtr, s);
/*
   printf("String value set    %s\n",s);
*/
   infoPtr=(unsigned *)(((char *)infoPtr)+bufLen);

   memoryFree(s);
}
/* d:\usr\bin\yacc.exe -d cnsparse.y */
#line 2 "cnsparse.y"
/*

$Workfile:   cnsparse.y  $
$Revision:   1.0  $
$Date:   05 Jul 1990 20:44:40  $

$Log:   D:/USR/KERN/CNS/VCS/CNSPARSE.Y_V  $
```

```
    Rev 1.0   05 Jul 1990 20:44:40   JLastra
  Initial revision.

*/

static char *vscId="$Header:   D:/USR/KERN/CNS/VCS/CNSPARSE.Y_V   1.0   05

#include <stdio.h>
typedef char * CHAR_PTR;
#define YYSTYPE CHAR_PTR
#define err(x) if (x ==1) YYERROR ;
#define SEND        257
#define TO 258
#define FROM        259
#define STRING      260
#define INTEGER     261
#define REAL        262
#define CHAR        263
#define QUOTED_STRING       264
#define HOLD_CMD    265
#define GO_CMD      266
extern int yychar, yyerrflag;
#ifndef YYSTYPE
#define YYSTYPE int
#endif
extern YYSTYPE yyval, yylval;
static short yydef[] = {
     -1,   -5,   -9,  -13,  -17
};
static short yyex[] = {
      0,    3,   -1,    1,    0,    0,   -1,    1,  123,   43,
     -1,    1,  123,    4,   -1,    1,  260,    8,  261,    6,
    262,    7,  263,    5,   -1,    1
};
static short yyact[] = {
    -47,  -27,  -45,  -46,  266,  265,  257,  256,  -44,  260,
    -25,  258,  -43,  260,  -24,  259,  -42,  260,  -22,  123,
    -21,  260,   -4,   61,  -19,  -41,  125,   59,   -5,  -37,
    -39,  -38,  -40,  -36,  264,  263,  262,  261,  260,   91,
    -28,  260,  -29,  262,  -30,  261,  -31,  263,   -9,  -32,
     93,   44,   -8,  -33,   93,   44,   -7,  -34,   93,   44,
     -6,  -35,   93,   44,   -1
};
static short yypact[] = {
      4,   10,   15,   34,   40,   47,   45,   43,   41,   62,
     58,   54,   50,   47,   45,   43,   41,   19,   21,   26,
     23,   21,   19,   17,   13,   11,    9
};
static short yygo[] = {
     -2,  -48,  -49,  -26,   -3,  -23,  -53,  -50,   17,  -20,
    -52,  -51,   18,  -18,  -14,  -10,  -15,  -11,  -16,  -12,
    -17,  -13,  -55,  -54,    5,  -57,  -56,    6,  -59,  -58,
      7,  -61,  -60,    8,   -1
};
static short yypgo[] = {
      0,    0,    0,    1,   13,   14,   16,   18,   20,   32,
     29,   26,   23,   11,   11,   11,   11,   11,   11,   11,
     11,   11,    7,    5,    4,    3,    1,    1,    0,    0,
      1,    2,    9,    9,   11,   15,   15,   17,   17,   19,
     19,   21,   21,    5,    0
};
static short yyrlen[] = {
      0,    0,    0,    0,    0,    0,    0,    0,    0,    1,
      1,    1,    1,    6,    6,    6,    6,    3,    3,    3,
      3,    3,    3,    2,    0,    0,    1,    1,    1,    1,
      1,    8,    1,    3,    4,    1,    3,    1,    3,    1,
      3,    1,    3,    0,    2
```

```
};
#define YYS0        0
#define YYDELTA     18
#define YYNPACT     27
#define YYNDEF      5

#define YYr42       0
#define YYr43       1
#define YYr44       2
#define YYr3        3
#define YYr19       4
#define YYr22       5
#define YYr24       6
#define YYr26       7
#define YYr28       8
#define YYr41       9
#define YYr38       10
#define YYr35       11
#define YYr32       12
#define YYr29       13
#define YYr27       14
#define YYr25       15
#define YYr23       16
#define YYr21       17
#define YYr18       18
#define YYr17       19
#define YYr16       20
#define YYr15       21
#define YYr12       22
#define YYr11       23
#define YYr8        24
#define YYr7        25
#define YYr6        26
#define YYr5        27
#define YYr2        28
#define YYrACCEPT   YYr42
#define YYrERROR    YYr43
#define YYrLR2      YYr44
#line 2 "/etc/yyparse.c"

/*
 * Automaton to interpret LALR(1) tables.
 *
 * Macros:
 *         yyclearin - clear the lookahead token.
 *         yyerrok - forgive a pending error
 *         YYERROR - simulate an error
 *         YYACCEPT - halt and return 0
 *         YYABORT - halt and return 1
 *         YYRETURN(value) - halt and return value.  You should use this
 *                 instead of return(value).
 *         YYREAD - ensure yychar contains a lookahead token by reading
 *                 one if it does not.  See also YYSYNC.
 *
 * Preprocessor flags:
 *         YYDEBUG - includes debug code.  The parser will print
 *                  a travelogue of the parse if this is defined
 *                  and yydebug is non-zero.
 *         YYSSIZE - size of state and value stacks (default 150).
 *         YYSTATIC - By default, the state stack is an automatic array.
 *                 If this is defined, the stack will be static.
 *                 In either case, the value stack is static.
 *         YYALLOC - Dynamically allocate both the state and value stacks
 *                 by calling malloc() and free().
 *         YYLR2 - defined if lookahead is needed to resolve R/R or S/R con
 *         YYSYNC - if defined, yacc guarantees to fetch a lookahead token
 *                 before any action, even if it doesnt need it for a decis
 *                 If YYSYNC is defined, YYREAD will never be necessary unl
 *                 the user explicitly sets yychar = -1
```

```
 *
 * Copyright (c) 1983, by the University of Waterloo
 */

#ifndef YYSSIZE
# define YYSSIZE   150
#endif
#ifndef    YYDEBUG
#define    YYDEBUG 0
#endif
#define YYERROR              goto yyerrlabel
#define yyerrok              yyerrflag = 0
#define yyclearin  yychar = -1
#define YYACCEPT   YYRETURN(0)
#define YYABORT              YYRETURN(1)
#ifdef YYALLOC
# define YYRETURN(val)     { retval = (val); goto yyReturn; }
#else
# define YYRETURN(val)     return(val)
#endif
#if YYDEBUG
/* The if..else makes this macro behave exactly like a statement */
# define YYREAD    if (yychar < 0) {
                   if ((yychar = yylex()) < 0)                         \
                           yychar = 0;                                 \
                   if (yydebug)                                        \
                           printf("read %s (%d)\n", yyptok(yychar),\
                           yychar);                                    \
           } else
#else
# define YYREAD    if (yychar < 0) {
                   if ((yychar = yylex()) < 0)                         \
                           yychar = 0;                                 \
           } else
#endif
#define YYERRCODE  256              /* value of 'error' */
#if defined(__TURBOC__)&&__SMALL__
#define    YYQYYP  *(int *)((int)yyq + ((int)yyq-(int)yyp))
#else
#define    YYQYYP  yyq[yyq-yyp]
#endif

YYSTYPE    yyval,                          /* $$ */
   *yypvt,                         /* $n */
   yylval;                         /* yylex() sets this */

int        yychar,                         /* current token */
   yyerrflag,                      /* error flag */
   yynerrs;                        /* error count */

#if YYDEBUG
int yydebug = YYDEBUG-0;           /* debug flag & tables */
extern char        *yysvar[], *yystoken[], *yyptok();
extern short       yyrmap[], yysmap[];
extern int yynstate, yynvar, yyntoken, yynrule;
# define yyassert(condition, msg, arg) \
   if (!(condition)) { printf("\nyacc bug: "); printf(msg, arg); YYABORT; }
#else /* !YYDEBUG */
# define yyassert(condition, msg, arg)
#endif
yyparse()
{
   register short          yyi, *yyp;      /* for table lookup */
   register short          *yyps;          /* top of state stack */
   register short          yystate;        /* current state */
   register YYSTYPE        *yypv;          /* top of value stack */
   register short          *yyq;
   register int            yyj;
```

```
#ifdef YYSTATIC
   static short    yys[YYSSIZE + 1];
   static YYSTYPE  yyv[YYSSIZE + 1];
#else
#ifdef YYALLOC
   YYSTYPE *yyv;
   short   *yys;
   YYSTYPE save_yylval, save_yyval, *save_yypvt;
   int save_yychar, save_yyerrflag, save_yynerrs;
   int retval;
#if 0      /* defined in <stdlib.h>*/
   extern char      *malloc();
#endif
#else
   short            yys[YYSSIZE + 1];
   static YYSTYPE   yyv[YYSSIZE + 1];        /* historically static */
#endif
#endif

#ifdef YYALLOC
   yys = (short *) malloc((YYSSIZE + 1) * sizeof(short));
   yyv = (YYSTYPE *) malloc((YYSSIZE + 1) * sizeof(YYSTYPE));
   if (yys == (short *)0 || yyv == (YYSTYPE *)0) {
           yyerror("Not enough space for parser stacks");
           return 1;
   }
   save_yylval = yylval;
   save_yyval = yyval;
   save_yypvt = yypvt;
   save_yychar = yychar;
   save_yyerrflag = yyerrflag;
   save_yynerrs = yynerrs;
#endif

   yynerrs = 0;
   yyerrflag = 0;
   yychar = -1;
   yyps = yys;
   yypv = yyv;
   yystate = YYS0;          /* start state */

yyStack:
   yyassert((unsigned)yystate < yynstate, "state %d\n", yystate);
   if (++yyps > &yys[YYSSIZE]) {
           yyerror("Parser stack overflow");
           YYABORT;
   }
   *yyps = yystate;         /* stack current state */
   *++yypv = yyval;         /* ... and value */

#if YYDEBUG
   if (yydebug)
           printf("state %d (%d), char %s (%d)\n", yysmap[yystate],
                   yystate, yyptok(yychar), yychar);
#endif

   /*
    *      Look up next action in action table.
    */
yyEncore:
#ifdef YYSYNC
   YYREAD;
#endif
   if (yystate >= sizeof yypact/sizeof yypact[0])  /* simple state */
           yyi = yystate - YYDELTA;        /* reduce in any case */
   else {
           if(*(yyp = &yyact[yypact[yystate]]) >= 0) {
                   /* Look for a shift on yychar */
#ifndef YYSYNC
```

```
                        YYREAD;
#endif
                        yyq = yyp;
                        yyi = yychar;
#if 0&&defined(__TURBOC__)&&__SMALL__
   /* THIS ONLY WORKS ON TURBO C 1.5 !!! */
                        /* yyi is in di, yyp is in si */
                L01:
                        asm lodsw       /* ax = *yyp++; */
                        asm cmp yyi, ax
                        asm jl L01
#else
                        while (yyi < *yyp++)
                                ;
#endif
                        if (yyi == yyp[-1]) {
                                yystate = ~YYQYYP;
#if YYDEBUG
                                if (yydebug)
                                        printf("shift %d (%d)\n", yysmap[yystate
#endif
                                yyval = yylval;         /* stack what yylex() se
                                yychar = -1;            /* clear token */
                                if (yyerrflag)
                                        yyerrflag--;    /* successful shift */
                                goto yyStack;
                        }
                }

                /*
                 *      Fell through - take default action
                 */

                if (yystate >= sizeof yydef /sizeof yydef[0])
                        goto yyError;
                if ((yyi = yydef[yystate]) < 0)  { /* default == reduce? */

                        yyassert((unsigned)~yyi < sizeof yyex/sizeof yyex[0],
                                "exception %d\n", yystate);
                        yyp = &yyex[~yyi];
#ifndef YYSYNC
                        YYREAD;
#endif
                        while((yyi = *yyp) >= 0 && yyi != yychar)
                                yyp += 2;
                        yyi = yyp[1];
                        yyassert(yyi >= 0,"Ex table not reduce %d\n", yyi);
                }
   }

#ifdef YYLR2
yyReduce:  /* reduce yyi */
#endif
   yyassert((unsigned)yyi < yynrule, "reduce %d\n", yyi);
   yyj = yyrlen[yyi];
#if YYDEBUG
   if (yydebug) printf("reduce %d (%d), pops %d (%d)\n", yyrmap[yyi],
                yyi, yysmap[yyps[-yyj]], yyps[-yyj]);
#endif
   yyps -= yyj;                 /* pop stacks */
   yypvt = yypv;                /* save top */
   yypv -= yyj;
   yyval = yypv[1];             /* default action $$ = $1 */
   switch (yyi) {               /* perform semantic action */

case YYr2: {            /* commands :  error */
#line 21
return ;
} break;
```

```
case YYr3: {        /* command :  */
#line 25
 return;
} break;

case YYr5: {        /* command :  GO_CMD */
#line 27
sysGo(); return;
} break;

case YYr6: {        /* command :  HOLD_CMD */
#line 28
sysHold();return;
} break;

case YYr7: {        /* sendMessage :  SEND STRING */
#line 33
err(startMessage(yypvt[0]));
} break;

case YYr8: {        /* sendMessage :  SEND STRING $7 TO STRING */
#line 34
err(saveDest(yypvt[0]));
} break;
case YYr11: {       /* originSpec :  FROM STRING */
#line 41
err(saveOrigin(yypvt[0]));
} break;

case YYr12: {       /* msgStruct :  '{' msgFields '}' */
#line 45
err(finishStructField());
} break;

case YYr15: {       /* msgField :  STRING '=' CHAR */
#line 53
err(saveCharField(yypvt[-2],yypvt[0]));
} break;

case YYr16: {       /* msgField :  STRING '=' INTEGER */
#line 54
err(saveIntegerField(yypvt[-2],yypvt[0]));
} break;

case YYr17: {       /* msgField :  STRING '=' REAL */
#line 55
err(saveRealField(yypvt[-2],yypvt[0]));
} break;

case YYr18: {       /* msgField :  STRING '=' STRING */
#line 56
err(saveEnumField(yypvt[-2],yypvt[0]));
} break;

case YYr19: {       /* msgField :  STRING '=' */
#line 57
err(startStructField(yypvt[-1]));
} break;

case YYr21: {       /* msgField :  STRING '=' QUOTED_STRING */
#line 58
err(saveStringField(yypvt[-2],yypvt[0]));
} break;

case YYr22: {       /* msgField :  STRING '=' '[' */
#line 59
err(startArrayField(yypvt[-2]));
} break;
```

```
case YYr23: {       /* msgField :  STRING '=' '[' $22 charArray ']' */
#line 60
err(finishArrayField());
} break;

case YYr24: {       /* msgField :  STRING '=' '[' */
#line 61
err(startArrayField(yypvt[-2]));
} break;
case YYr25: {       /* msgField :  STRING '=' '[' $24 integerArray ']' */
#line 62
err(finishArrayField());
} break;

case YYr26: {       /* msgField :  STRING '=' '[' */
#line 63
err(startArrayField(yypvt[-2]));
} break;

case YYr27: {       /* msgField :  STRING '=' '[' $26 realArray ']' */
#line 64
err(finishArrayField());
} break;

case YYr28: {       /* msgField :  STRING '=' '[' */
#line 65
err(startArrayField(yypvt[-2]));
} break;

case YYr29: {       /* msgField :  STRING '=' '[' $28 stringArray ']' */
#line 66
err(finishArrayField());
} break;

case YYr32: {       /* aChar :  CHAR */
#line 74
err(saveArrayChar(yypvt[0]));
} break;

case YYr35: {       /* aInteger :  INTEGER */
#line 82
err(saveArrayInt(yypvt[0]));
} break;

case YYr38: {       /* aReal :  REAL */
#line 91
err(saveArrayReal(yypvt[0]));
} break;

case YYr41: {       /* aString :  STRING */
#line 100
err(saveArrayEnum(yypvt[0]));
} break;
#line 238 "/etc/yyparse.c"
   case YYrACCEPT:
          YYACCEPT;
   case YYrERROR:
          goto yyError;
#ifdef YYLR2
   case YYrLR2:
#ifndef YYSYNC
          YYREAD;
#endif
          yyj = 0;
```

```
        while(yylr2[yyj] >= 0) {
                if(yylr2[yyj] == yystate && yylr2[yyj+1] == yychar
                && yylook(yys+1,yyps,yystate,yychar,yy2lex(),yylr2[yyj+2
                                        break;
                yyj += 3;
        }
        if(yylr2[yyj] < 0)
                goto yyError;
        if(yylr2[yyj+2] < 0) {
                yystate = ~ yylr2[yyj+2];
                goto yyStack;
        }
        yyi = yylr2[yyj+2];
        goto yyReduce;
#endif
   }

   /*
    *       Look up next state in goto table.
    */

   yyp = &yygo[yypgo[yyi]];
   yyq = yyp++;
   yyi = *yyps;
#if         0&&defined(__TURBOC__) && __SMALL__
   /* THIS ONLY WORKS ON TURBO C 1.5 !!! */
   /* yyi is in di, yyp is in si */
L02:
   asm lodsw                  /* ax = *yyp++; */
   asm cmp yyi, ax
   asm jl L02
#else
   while (yyi < *yyp++)
           ;
#endif
   yystate = ~(yyi == *--yyp? YYQYYP: *yyq);
   goto yyStack;

yyerrlabel:         ;                /* come here from YYERROR       */
/*
#pragma used yyerrlabel
 */
   yyerrflag = 1;
   yyps--, yypv--;

yyError:
   switch (yyerrflag) {

   case 0:          /* new error */
          yynerrs++;
          yyi = yychar;
          yyerror("Syntax error");
          if (yyi != yychar) {
                 /* user has changed the current token */
                 /* try again */
             yyerrflag++;     /* avoid loops */
             goto yyEncore;
        }

case 1:          /* partially recovered */
case 2:
        yyerrflag = 3;  /* need 3 valid shifts to recover */

        /*
         *      Pop states, looking for a
         *      shift on 'error'.
         */
```

```
          for ( ; yyps > yys; yyps--, yypv--) {
                  if (*yyps >= sizeof yypact/sizeof yypact[0])
                          continue;
                  yyp = &yyact[yypact[*yyps]];
                  yyq = yyp;
                  do
                          ;
                  while (YYERRCODE < *yyp++);
                  if (YYERRCODE == yyp[-1]) {
                          yystate = ~YYQYYP;
                          goto yyStack;
                  }

                  /* no shift in this state */
#if YYDEBUG
                  if (yydebug && yyps > yys+1)
                          printf("Error recovery pops state %d (%d), uncov
                                  yysmap[yyps[0]], yyps[0],
                                  yysmap[yyps[-1]], yyps[-1]);
#endif
                  /* pop stacks; try again */
          }
          /* no shift on error - abort */
          break;

   case 3:
          /*
           *      Erroneous token after
           *      an error - discard it.
           */

          if (yychar == 0)  /* but not EOF */
                  break;
#if YYDEBUG
          if (yydebug)
                  printf("Error recovery discards %s (%d), ",
                          yyptok(yychar), yychar);
#endif
          yyclearin;
          goto yyEncore;  /* try again in same state */
   }
   YYABORT;
#ifdef YYALLOC
yyReturn:
   yylval = save_yylval;
   yyval = save_yyval;
   yypvt = save_yypvt;
   yychar = save_yychar;
   yyerrflag = save_yyerrflag;
   yynerrs = save_yynerrs;
   free((char *)yys);
   free((char *)yyv);
   return(retval);
#endif
}

#ifdef YYLR2
yylook(s,rsp,state,c1,c2,i)
short *s;           /* stack                */
short *rsp;                 /* real top of stack    */
int state;          /* current state        */
int c1;                     /* current char         */
int c2;                     /* next char            */
int i;                      /* action S < 0, R >= 0 */
{
   int j;
   short *p,*q;
   short *sb,*st;
```

```
#if YYDEBUG
   if(yydebug) {
           printf("LR2 state %d (%d) char %s (%d) lookahead %s (%d)",
                   yysmap[state],state,yyptok(c1),c1,yyptok(c2),c2);
           if(i > 0)
                   printf("reduce %d (%d)\n", yyrmap[i], i);
           else
                   printf("shift %d (%d)\n", yysmap[i], i);
   }
#endif
   st = sb = rsp+1;
   if(i >= 0)
           goto reduce;
  shift:
   state = -i;
   c1 = c2;
   if(c1 < 0)
           return 1;
   c2 = -1;

  stack:
   if(++st >= &s[YYSSIZE]) {
           yyerror("Parser Stack Overflow");
           return 0;
   }
   *st = state;
   if(state >= sizeof yypact/sizeof yypact[0])
           i = state- YYDELTA;
 else {
         p = &yyact[yypact[state]];
         q = p;
         i = c1;
         while(i < *p++)
                 ;
         if(i == p[-1]) {
                 state = ~q[q-p];
                 c1 = c2;
                 if(c1 < 0)
                         return 1;
                 c2 = -1;
                 goto stack;
         }
         if(state >= sizeof yydef/sizeof yydef[0])
                 return 0;
         if((i = yydef[state]) < 0) {
                 p = &yyex[~i];
                 while((i = *p) >= 0 && i != c1)
                         p += 2;
                 i = p[1];
         }
 }
reduce:
 j = yyrlen[i];
 if(st-sb >= j)
         st -= j;
 else {
         rsp -= j+st-sb;
         st = sb;
 }
 switch(i) {
 case YYrERROR:
         return 0;
 case YYrACCEPT:
         return 1;
 case YYrLR2:
         j = 0;
         while(yylr2[j] >= 0) {
```

```
                if(yylr2[j] == state && yylr2[j+1] == c1)
                        if((i = yylr2[j+2]) < 0)
                                goto shift;
                        else
                                goto reduce;
        }
        return 0;
    }
    p = &yygo[yypgo[i]];
    q = p++;
    i = st==sb ? *rsp : *st;
    while(i < *p++);
    state = ~(i == *--p? q[q-p]: *q);
    goto stack;
}
#endif
#if YYDEBUG

/*
 * Print a token legibly.
 * This won't work if you roll your own token numbers,
 * but I've found it useful.
 */
char *
yyptok(i)
{
    static char     buf[10];

    if (i >= YYERRCODE)
            return yystoken[i-YYERRCODE];
    if (i < 0)
            return "";
    if (i == 0)
            return "$end";
    if (i < ' ')
            sprintf(buf, "'^%c'", i+'@');
    else
            sprintf(buf, "'%c'", i);
    return buf;
}
#endif

#if YYDEBUG
    if (yydebug) prin#if YYDEBUG
char * yystoken[] = {
    "error",
    "SEND",
    "TO",
    "FROM",
    "STRING",
    "INTEGER",
    "REAL",
    "CHAR",
    "QUOTED_STRING",
    "HOLD_CMD",
    "GO_CMD",
    0
};
char * yysvar[] = {
    "$accept",
    "commands",
    "command",
    "sendMessage",
    "$7",
    "$8",
    "originSpec",
    "msgStruct",
```

```
   "msgFields",
   "msgField",
   "$19",
   "$22",
   "charArray",
   "$24",
   "integerArray",
   "$26",
   "realArray",
   "$28",
   "stringArray",
   "aChar",
   "aInteger",
   "aReal",
   "aString",
   0
};
short yyrmap[] = {
     42,   43,   44,    3,   19,   22,   24,   26,   28,   41,
     38,   35,   32,   29,   27,   25,   23,   21,   18,   17,
     16,   15,   12,   11,    8,    7,    6,    5,    2,    1,
      4,    9,   13,   14,   20,   30,   31,   33,   34,   36,
     37,   39,   40,   10,    0
};
short yysmap[] = {
      0,    7,   12,   21,   24,   55,   53,   51,   49,   48,
     45,   42,   39,   35,   34,   33,   32,   26,   22,   20,
     18,   16,   14,   13,   10,    9,    1,   37,   40,   43,
     46,   50,   52,   54,   56,   25,   27,   28,   29,   30,
     23,   15,   11,    8,    2,    3,    5,    6,    4,   17,
     19,   31,   36,   47,   60,   44,   59,   41,   58,   38,   57
};
int yyntoken = 19, yynvar = 23, yynstate = 61, yynrule = 45;
#endif
/*

$Workfile:   cnsread.c  $
$Revision:   1.0  $
$Date:   05 Jul 1990 20:44:48   $

$Log:   D:/USR/KERN/CNS/VCS/CNSREAD.C_V  $
 *
 *    Rev 1.0   05 Jul 1990 20:44:48   JLastra
 * Initial revision.

*/


static char *vscId="$Header:   D:/USR/KERN/CNS/VCS/CNSREAD.C_V   1.0   05 J
#include "cnspriv.h"


MSG_T *readMsg()
{
   unsigned *mPtr;

   msgType=readMsgName();
   destSm =readDestinatio();
   originSm=readOrigin();

   if ( (msg=msgAlloc(msgType->tSize)) == NULL )
           return(NULL);

   mPtr=(unsigned *)msg;
   readType(msgType->index,&mPtr);

   return(msg);
}
```

```
/*

$Workfile:   cnsstack.c  $
$Revision:   1.0  $
$Date:   05 Jul 1990 20:44:52  $

$Log:   D:/USR/KERN/CNS/VCS/CNSSTACK.C_V  $
 *
 *    Rev 1.0   05 Jul 1990 20:44:52   JLastra
 * Initial revision.

*/


static char *vscId="$Header:   D:/USR/KERN/CNS/VCS/CNSSTACK.C_V   1.0   05


#include "cnspriv.h"



static void skipNestedRef()
{

   if ( typeSpecs[topDecl->declSpec].type == REF ){
           topDecl->specCntr =  typeSpecs[topDecl->declSpec].x.refType;
           topDecl->declSpec = typeSpecs[topDecl->declSpec].x.refType;
           skipNestedRef();
   }
   else
           topDecl->membersToGo= typeSpecs[topDecl->declSpec].x.nMembers;

}


void startDecl(declSpec)
unsigned declSpec;
{

   topDecl=(DECL_RECORD_T *)memoryAlloc(sizeof(DECL_RECORD_T));
   clearQueueItem((QUEUE_ITEM_T *)topDecl);

   if ( findFirstQueue( &declStack ) != NULL ) {
             yyerror("Starting a Declaration with the declStack not empty\n
     resetConsole();
     }

   topDecl->declSpec = declSpec;
   topDecl->specCntr = declSpec;
   appendQueue(&declStack, (QUEUE_ITEM_T *)topDecl);

   skipNestedRef();

   if ( typeSpecs[topDecl->specCntr].type == STRUCT ) {
           topDecl->membersToGo=typeSpecs[topDecl->specCntr].x.nMembers;
           topDecl->arrayCount=typeSpecs[topDecl->specCntr].aSize;
           topDecl->specCntr++;
   }

   if ( typeSpecs[topDecl->specCntr].type == MSG_TYPE ){
           topDecl->specCntr++;
           topDecl->membersToGo--;
   }

}
```

```
void pushDecl()
{
   DECL_RECORD_T  *newDecl;

   newDecl=(DECL_RECORD_T *)memoryAlloc(sizeof(DECL_RECORD_T));
   clearQueueItem((QUEUE_ITEM_T *)newDecl);

   if ( topDecl == NULL ){
             yyerror("Can not push into an empty Decl Stack");
     resetConsole();
     }

   if ( typeSpecs[topDecl->specCntr].type == REF ) {
           newDecl->specCntr =  typeSpecs[topDecl->specCntr].x.refType+1;
           newDecl->declSpec = typeSpecs[topDecl->specCntr].x.refType;
           newDecl->arrayCount = typeSpecs[topDecl->specCntr].aSize;
           topDecl->specCntr ++;
   }
   else if ( typeSpecs[topDecl->specCntr].type == STRUCT ) {
           newDecl->membersToGo=typeSpecs[topDecl->specCntr].x.nMembers;
           newDecl->specCntr=topDecl->specCntr+1;
           newDecl->declSpec=topDecl->specCntr;
           newDecl->arrayCount=typeSpecs[topDecl->specCntr].aSize;
           topDecl->specCntr = ~0;
   }

   insertBeforeQueue( &declStack
                    , (QUEUE_ITEM_T *)topDecl
                    , (QUEUE_ITEM_T *)newDecl);

   topDecl = newDecl;

   skipNestedRef();

}

void popDecl()
{
   DECL_RECORD_T *oldDecl;

   removeQueue(&declStack, (QUEUE_ITEM_T *)topDecl );
   oldDecl = topDecl;

   topDecl=(DECL_RECORD_T *)findFirstQueue( &declStack );

   if ( topDecl != NULL ) {
           if ( topDecl->specCntr == ~0 )
                   topDecl->specCntr = oldDecl->specCntr;
           topDecl->membersToGo --;
           }

   memoryFree((char *)oldDecl);
}


void declStackInit()
{

   initQueue(&declStack);

   topDecl = NULL ;
}


void declStackPurge()
{
```

```
QUEUE_ITEM_T *i;
for (i=getFirstQueue(&declStack)
     ; i != NULL
     ; i=getFirstQueue(&declStack))
             memoryFree((char *) i);
/*

$Workfile:   cnsstubs.c  $
$Revision:   1.0  $
$Date:   05 Jul 1990 20:44:56  $

$Log:   D:/USR/KERN/CNS/VCS/CNSSTUBS.C_V  $
 *
 *    Rev 1.0   05 Jul 1990 20:44:56   JLastra
 * Initial revision.

*/


static char *vscId="$Header:   D:/USR/KERN/CNS/VCS/CNSSTUBS.C_V   1.0   05

#include "cnspriv.h"
#include <malloc.h>
#include "tstmsg.h"

void dumpDeclStack()
{
#ifdef DEBUG_CNS

   DECL_RECORD_T *d;

   printf("Declarations stack:\n");
   for ( d=(DECL_RECORD_T *)findFirstQueue ( &declStack )
       ; d != NULL
       ; d = (DECL_RECORD_T *)findNextQueue( &declStack
                                          , (QUEUE_ITEM_T *)d) )

       printf("field: %s, members to go: %d, cntr %d\n"
         ,typeSpecs[d->declSpec].name, d->membersToGo, d->specCntr);

   printf("\n");
#endif
}


void memoryFree(b)
char *b;
{

   free(b);

}

char *memoryAlloc(size)
unsigned(size);
{
   char  *n;
   int    i;
   n = malloc(size);

   if ( n == NULL ) {
     yyerror("out of memory");
     exit(1);
   }
   for(i=0;i<size;i++)
      n[i]='\0';
```

```
    return(n);
}

MSG_T *msgAlloc( infoSize )

unsigned   infoSize;
{
   MSG_T            *newMsg;
   unsigned         bytesToAlloc;
   MSG_HEADER_T     *header;

   bytesToAlloc = infoSize + sizeof(MSG_T);
   newMsg = (MSG_T *) memoryAlloc( bytesToAlloc );

   clearQueueItem((QUEUE_ITEM_T*)newMsg);
   header = &newMsg->header;
   header->status = CREATED;
   newMsg->fields.infoSize = infoSize;
#ifdef DEBUG_CNS
{

/* getTimeOfDay( &header->creationTime ); */
   header->schedulingTime.tv_sec = 0L;
   header->schedulingTime.tv_usec = 0L;
   header->deliveryTime.tv_sec = 0L;
   header->deliveryTime.tv_usec = 0L;
   header->disposalTime.tv_sec = 0L;
   header->disposalTime.tv_usec = 0L;
}
#endif
   return( newMsg );
}

SM_STATE_T ignoreMsg  (msg,d)
MSG_T *msg;
SM_DESCRIPTOR_T * d;
{
   return(0);
}

SM_STATE_T stateError (msg,d)
MSG_T *msg;
SM_DESCRIPTOR_T * d;
{
   return(0);
}

void enableInterrupts()
{
}

void disableInterrupts()
{
}

void setError()
{
   printf("ERROR: Someone called setError!!!\n\n");
   exit(1);
}


void sendMsg(msg)
MSG_T *msg;
{
   MSG_A *m;
```

```
  m=(MSG_A *)msg;

  printf("Message name: %d\n",m->msgData.fields.name);
  printf("Message dest: %d\n",m->msgData.fields.dest);
  printf("Message orig: %d\n",m->msgData.fields.origin);

  printf("Messages Data1 %d\n",m->data1);
  printf("Messages Data2 %c\n",m->data2);
  printf("Messages Data3 %ld\n",m->data3);
  printf("Messages md    %d\n",m->cmd);
  free((char *)msg);
}
/*

$Workfile:   cnstst.c  $
$Revision:   1.0  $
$Date:   05 Jul 1990 20:45:00  $

$Log:   D:/USR/KERN/CNS/VCS/CNSTST.C_V  $
 *
 *    Rev 1.0   05 Jul 1990 20:45:00   JLastra
 * Initial revision.

*/


static char *vscId="$Header:   D:/USR/KERN/CNS/VCS/CNSTST.C_V   1.0   05 Ju


#include "cnspriv.h"

#define DO_msgTypes
#include "tstmsg.h"

#define DO_tst1
#include "syscnf.h"

char *progName;
char *inputFname;
int errorFlag;

int yydebug;

main( argc, argv )
char * argv[];

{
   int c;
   char buf[10];

   progName = argv[0];
   errorFlag = 0;

   initCons(argv[1], argv[2]);
   yydebug=0;

   while (1){
      sysConsole();
      }

   exit(0);
 }
 /*

 $Workfile:   memalloc.c  $
 $Revision:   1.0  $
 $Date:   18 Jun 1990 22:11:14  $
```

```
$Log:   D:/USR/KERN/MEM/VCS/MEMALLOC.C_V  $
 *
 *    Rev 1.0   18 Jun 1990 22:11:14   JLastra
 * Initial revision.

*/

static char *vscId="$Header:   D:/USR/KERN/MEM/VCS/MEMALLOC.C_V   1.0   18

#include "mempriv.h"

#ifndef USE_HOST_MEMORY
/*
   allocate a memory manager object

   there are two routines here.

   memoryAlloc fetches the actual memory
   objectAlloc adds certain header information


   memoryAlloc has the following strategy for allocating items
   1. use a block from the arena with blocks just large enough
      for the requested size
   2. use memory from the "memory pool"
   3. use memory from an arena with larger block size
*/
static OBJECT_T     *allocFromArena(arena)

OBJECT_ARENA_T      *arena;
{
   OBJECT_T *newObject;

   newObject = arena->freelist;
   arena->freelist = newObject->next;
   newObject->next = (OBJECT_T *) arena;

   return(newObject);
}

static OBJECT_T *allocFromPool( pool, size )

MEMORY_POOL_T       *pool;
unsigned   size;
{
   int              newIndex;
   newIndex = pool->index - size/sizeof(OBJECT_T);
   if ( newIndex < 0 )
           return( (OBJECT_T *) NULL );
   pool->index = newIndex;
   return( &pool->data[pool->index] );
}

static OBJECT_T *objectAlloc( arena )

OBJECT_ARENA_T      *arena;
{
   OBJECT_T         *newObject;

   if ( arena->freelist != NULL )
           return( allocFromArena(arena) );

   newObject = allocFromPool( &MemoryPool, arena->size );
   if ( newObject != NULL )
   {
```

```
            newObject->next = (OBJECT_T *) arena;
            return( newObject );
   }

   for ( arena++ ; arena->size != 0; arena++ )
            if (    arena->freelist != (OBJECT_T *) NULL )
                    return( allocFromArena(arena) );

   return( (OBJECT_T *) NULL );
}

#endif /* USE_HOST_MEMORY */

char        *memoryAlloc( size )

unsigned    size;

{
#ifdef USE_HOST_MEMORY
   char             *malloc();
   return( malloc(size) );
#else
   OBJECT_T         *newObject;
   OBJECT_ARENA_T   *arena;

   size += sizeof(OBJECT_T);
   arena = findArena(ObjectArenas, size);
   if ( arena == (OBJECT_ARENA_T *) NULL )
     setError(E_REQUESTED_BLOCK_TOO_BIG,size,__FILE__,__LINE__);

   disableInterrupts();
   newObject = objectAlloc(arena);
   enableInterrupts();

   if ( newObject == (OBJECT_T *) NULL )
            setError( E_MEMORY_EXHAUSTED, __LINE__, __FILE__ );
#ifdef DEBUG_MEM
   getTimeOfDay( &newObject->allocTime );
   newObject->freeTime.tv_usec = 0L;
   newObject->freeTime.tv_sec = 0L;
   newObject->crc = crc(   newObject,
                           sizeof(OBJECT_T) - sizeof(newObject->crc) );
#endif
   return( (char *) (newObject + 1) );
#endif /* USE_HOST_MEMORY */
}
/*

$Workfile:   memcrc.c  $
$Revision:   1.0  $
$Date:   18 Jun 1990 22:11:16  $

$Log:   D:/USR/KERN/MEM/VCS/MEMCRC.C_V  $
 *
 *     Rev 1.0   18 Jun 1990 22:11:16   JLastra
 * Initial revision.

*/


static char *vscId="$Header:   D:/USR/KERN/MEM/VCS/MEMCRC.C_V   1.0   18 Ju


#include "mempriv.h"
#include <sys/types.h>
```

```
#ifndef USE_HOST_MEMORY
static int crc_16_table[256] =
    {
    0x0000,0xC0C1,0xC181,0x0140,0xC301,0x03C0,0x0280,0xC241,
    0xC601,0x06C0,0x0780,0xC741,0x0500,0xC5C1,0xC481,0x0440,
    0xCC01,0x0CC0,0x0D80,0xCD41,0x0F00,0xCFC1,0xCE81,0x0E40,
    0x0A00,0xCAC1,0xCB81,0x0B40,0xC901,0x09C0,0x0880,0xC841,
    0xD801,0x18C0,0x1980,0xD941,0x1B00,0xDBC1,0xDA81,0x1A40,
    0x1E00,0xDEC1,0xDF81,0x1F40,0xDD01,0x1DC0,0x1C80,0xDC41,
    0x1400,0xD4C1,0xD581,0x1540,0xD701,0x17C0,0x1680,0xD641,
    0xD201,0x12C0,0x1380,0xD341,0x1100,0xD1C1,0xD081,0x1040,
    0xF001,0x30C0,0x3180,0xF141,0x3300,0xF3C1,0xF281,0x3240,
    0x3600,0xF6C1,0xF781,0x3740,0xF501,0x35C0,0x3480,0xF441,
    0x3C00,0xFCC1,0xFD81,0x3D40,0xFF01,0x3FC0,0x3E80,0xFE41,
    0xFA01,0x3AC0,0x3B80,0xFB41,0x3900,0xF9C1,0xF881,0x3840,
    0x2800,0xE8C1,0xE981,0x2940,0xEB01,0x2BC0,0x2A80,0xEA41,
    0xEE01,0x2EC0,0x2F80,0xEF41,0x2D00,0xEDC1,0xEC81,0x2C40,
    0xE401,0x24C0,0x2580,0xE541,0x2700,0xE7C1,0xE681,0x2640,
    0x2200,0xE2C1,0xE381,0x2340,0xE101,0x21C0,0x2080,0xE041,
    0xA001,0x60C0,0x6180,0xA141,0x6300,0xA3C1,0xA281,0x6240,
    0x6600,0xA6C1,0xA781,0x6740,0xA501,0x65C0,0x6480,0xA441,
    0x6C00,0xACC1,0xAD81,0x6D40,0xAF01,0x6FC0,0x6E80,0xAE41,
    0xAA01,0x6AC0,0x6B80,0xAB41,0x6900,0xA9C1,0xA881,0x6840,
    0x7800,0xB8C1,0xB981,0x7940,0xBB01,0x7BC0,0x7A80,0xBA41,
    0xBE01,0x7EC0,0x7F80,0xBF41,0x7D00,0xBDC1,0xBC81,0x7C40,
    0xB401,0x74C0,0x7580,0xB541,0x7700,0xB7C1,0xB681,0x7640,
    0x7200,0xB2C1,0xB381,0x7340,0xB101,0x71C0,0x7080,0xB041,
    0x5000,0x90C1,0x9181,0x5140,0x9301,0x53C0,0x5280,0x9241,
    0x9601,0x56C0,0x5780,0x9741,0x5500,0x95C1,0x9481,0x5440,
    0x9C01,0x5CC0,0x5D80,0x9D41,0x5F00,0x9FC1,0x9E81,0x5E40,
    0x5A00,0x9AC1,0x9B81,0x5B40,0x9901,0x59C0,0x5880,0x9841,
    0x8801,0x48C0,0x4980,0x8941,0x4B00,0x8BC1,0x8A81,0x4A40,
    0x4E00,0x8EC1,0x8F81,0x4F40,0x8D01,0x4DC0,0x4C80,0x8C41,
    0x4400,0x84C1,0x8581,0x4540,0x8701,0x47C0,0x4680,0x8641,
    0x8201,0x42C0,0x4380,0x8341,0x4100,0x81C1,0x8081,0x4040
};

CRC_T      crc( data, count )

unsigned char       *data;
int                 count;
{
/*****************************************************************************
* Calculate the CRC for a hexadecimal string.
*****************************************************************************

/*****************************************************************************
* This algorithm taken from "BYTE-wise CRC calculations"
* IEEE MICRO magazine, 1983, author Aram Perez
*****************************************************************************

    extern int crc_16_table[256];
    unsigned char *pd,*pdmax;          /* Data pointer and maximum. */
    unsigned result;

    if ( data == NULL)                   /* If NULL pointer, return 0 */
      return(0);

    pd = data;
    pdmax = pd + count;
    result = 0;
    for ( ; pd < pdmax; ++pd)
        result = (result >> 8) ^ crc_16_table[(unsigned) *pd ^ result & 0xf
    return (result);
}
#endif
```

```
/*

$Workfile:   memdebug.c  $
$Revision:   1.0  $
$Date:   18 Jun 1990 22:11:20  $

$Log:   D:/USR/KERN/MEM/VCS/MEMDEBUG.C_V  $
 *
 *    Rev 1.0   18 Jun 1990 22:11:20   JLastra
 * Initial revision.

*/


static char *vscId="$Header:   D:/USR/KERN/MEM/VCS/MEMDEBUG.C_V   1.0   18


#include "mempriv.h"

#ifndef USE_HOST_MEMORY

#ifdef DEBUG_MEM

static int calculateOffset( object )

OBJECT_T   *object;
{
   long            offset;

   offset = (long)&MemoryPool.data[sizeof(MemoryPool.data)/sizeof(OBJECT_T)
                - (long)object;
   return((int) offset );
}

static showObject( object )

OBJECT_T   *object;
{
   char    *ctime();

   printf( "Object : address %x, position %d\n",
           object,
           calculateOffset(object) );
   printf( "Alloc Time %.24s [%06ld usec]:\n",
           ctime(&object->allocTime.tv_sec),
           object->allocTime.tv_usec );
   printf( "Free Time %.24s [%06ld usec]:\n",
           ctime(&object->freeTime.tv_sec),
           object->freeTime.tv_usec );
}

static void showArena( arena )

OBJECT_ARENA_T     *arena;
{
   OBJECT_T        *object;

   disableInterrupts();
   printf( "Arena : size %d, Freelist :\n", arena->size );
   for ( object = arena->freelist; object != NULL; object = object->next )
           showObject( object );
   enableInterrupts();
}

#endif /* DEBUG_MEM */
#endif /* USE_HOST_MEMORY */

void showPool()
```

```
{
#ifndef USE_HOST_MEMORY
#ifdef DEBUG_MEM
   OBJECT_T         *object;
   char             *p;
   unsigned         index;

   disableInterrupts();
   printf( "Memory Pool of %d bytes, %d items, index %d : \n",
           sizeof(MemoryPool.data),
           sizeof(MemoryPool.data)/sizeof(OBJECT_T),
           MemoryPool.index );
   enableInterrupts();
#endif
#endif
}

void showAllArenas()
{
#ifndef USE_HOST_MEMORY
#ifdef DEBUG_MEM

   OBJECT_ARENA_T  *arena;

   for ( arena = ObjectArenas; arena->size; arena++ )
           showArena( arena );
#endif
#endif
}
/*

$Workfile:   memfind.c  $
$Revision:   1.0   $
$Date:   18 Jun 1990 22:11:24   $

$Log:   D:/USR/KERN/MEM/VCS/MEMFIND.C_V  $
 *
 *    Rev 1.0   18 Jun 1990 22:11:24   JLastra
 * Initial revision.

*/


static char *vscId="$Header:   D:/USR/KERN/MEM/VCS/MEMFIND.C_V   1.0   18 J

#include "mempriv.h"

#ifndef USE_HOST_MEMORY

OBJECT_ARENA_T *findArena( arenas, size )

OBJECT_ARENA_T     *arenas;
unsigned   size;
{
   for ( ; arenas->size != 0; arenas++ )
           if ( size <= arenas->size )
                   return( arenas );
   return( (OBJECT_ARENA_T* ) NULL );
}

#endif

/*

$Workfile:   memfree.c  $
$Revision:   1.0   $
$Date:   18 Jun 1990 22:11:26   $
```

```
$Log:   D:/USR/KERN/MEM/VCS/MEMFREE.C_V  $
 *
 *    Rev 1.0   18 Jun 1990 22:11:26   JLastra
 * Initial revision.

*/


static char *vscId="$Header:   D:/USR/KERN/MEM/VCS/MEMFREE.C_V   1.0   18 J


#include "mempriv.h"

void memoryFree( oldPtr )

char       *oldPtr;

{
#ifdef USE_HOST_MEMORY
   free( oldPtr );
#else
   OBJECT_ARENA_T  *arena;
   CRC_T           currentCrc;
   OBJECT_T        *oldObject;

/*
   oldObject is decremented here because it is assumed
   to point to the first character after the object
   header.
*/

   if (    (oldPtr < (char *) &MemoryPool.data[1])
        || (oldPtr > (char *) &MemoryPool.
              data[sizeof(MemoryPool.data)/sizeof(OBJECT_T)]) )
           setError( E_BLOCK_TO_FREE_NOT_FROM_POOL, __FILE__, __LINE__ );



   oldObject = (OBJECT_T *) oldPtr;
   oldObject--;

#ifdef DEBUG_MEM
   currentCrc = crc(       oldObject,
                           sizeof(OBJECT_T) - sizeof(oldObject->crc) );
   if ( currentCrc != oldObject->crc )
           setError( E_CORRUPTED_MEMORY_BLOCK_HEADER,__LINE__, __FILE__ );

   getTimeOfDay( &oldObject->freeTime );
#endif

   disableInterrupts();
   arena = (OBJECT_ARENA_T *) oldObject->next;
   oldObject->next = arena->freelist;
   arena->freelist = oldObject;
   enableInterrupts();
#endif /* USE_HOST_MEMORY */
   return;
}
/*

$Workfile:   memglob.c  $
$Revision:   1.0  $
$Date:   18 Jun 1990 22:11:28   $

$Log:   D:/USR/KERN/MEM/VCS/MEMGLOB.C_V  $
 *
 *    Rev 1.0   18 Jun 1990 22:11:28   JLastra
 * Initial revision.
```

```
*/

static char *vscId="$Header:   D:/USR/KERN/MEM/VCS/MEMGLOB.C_V   1.0   18 J

#define DO_mem
#include "mempriv.h"
#include "que.h"
/*

$Workfile:   meminit.c  $
$Revision:   1.0  $
$Date:   18 Jun 1990 22:11:30  $

$Log:   D:/USR/KERN/MEM/VCS/MEMINIT.C_V  $
 *
 *    Rev 1.0   18 Jun 1990 22:11:30   JLastra
 * Initial revision.

*/

static char *vscId="$Header:   D:/USR/KERN/MEM/VCS/MEMINIT.C_V   1.0   18 J

#include "mempriv.h"

void memoryManagerInit(startCondition)
int startCondition;
{

#ifndef USE_HOST_MEMORY

  int i;

  for (i=0; ObjectArenas[i].size != 0; i++)
     ObjectArenas[i].freelist = NULL;

  MemoryPool.index = sizeof(MemoryPool.data)/sizeof(OBJECT_T);

#endif /* USE_HOST_MEMORY */
  return;
}
/*

$Workfile:   memtst.c  $
$Revision:   1.0  $
$Date:   18 Jun 1990 22:11:22  $

$Log:   D:/USR/KERN/MEM/VCS/MEMTST.C_V  $
 *
 *    Rev 1.0   18 Jun 1990 22:11:22   JLastra
 * Initial revision.

*/

static char *vscId="$Header:   D:/USR/KERN/MEM/VCS/MEMTST.C_V   1.0   18 Ju

#include "mem.h"
#include "rtc.h"

#define NUM_LOOPS  10
#define NUM_CHUNKS 100
#define CHUNKS_MIN_SIZE 20
```

```
main ()

{
   char *chunk[100];
   int i,j,k;

   memoryManagerInit(0);

   for(k=0;k<NUM_LOOPS;k++){
           for(j=0;j<NUM_CHUNKS;j++)
                   chunk[j]=memoryAlloc(CHUNKS_MIN_SIZE);

/*         for (i=0;i<CHUNKS_MIN_SIZE;i++)
           chunk[j][i]='A';
*/
           for(j=0;j<NUM_CHUNKS;j++)
                   memoryFree(chunk[j]);

   }
   printf("memtst: %d chunks allocated & dealloc %d times\n",NUM_CHUNKS, NU

   showAllArenas();
   showPool();

}


/******* Some Stubs *********/
void disableInterrupts()
{
}

void enableInterrupts()
{
}

void setError(code)
int code;
{
printf("ERROR ERROR %d\n",code);
exit(1);
}

void getTimeOfDay( timeVar )
TIME_T *timeVar;
{
}
/*

$Workfile:   netglob.c  $
$Revision:   1.0  $
$Date:   18 Jun 1990 22:53:32   $

$Log:   D:/USR/KERN/NET/VCS/NETGLOB.C_V   $
 *
 *    Rev 1.0   18 Jun 1990 22:53:32   JLastra
 * Initial revision.

*/


static char *vscId="$Header:   D:/USR/KERN/NET/VCS/NETGLOB.C_V   1.0   18 J


#define DO_net
#include "netpriv.h"
```

```
/*

$Workfile:   netinit.c  $
$Revision:   1.0  $
$Date:   18 Jun 1990 22:53:36  $

$Log:   D:/USR/KERN/NET/VCS/NETINIT.C_V  $
 *
 *    Rev 1.0   18 Jun 1990 22:53:36   JLastra
 * Initial revision.

*/


static char *vscId="$Header:   D:/USR/KERN/NET/VCS/NETINIT.C_V   1.0   18 J

#include "netpriv.h"


void networkInit(startCondition)
int startCondition;
{

  int i;

  for (i=0; i<numOfNodes; i++){
    if ( routingTable[i].gatewayNodeId == myNodeId ){
      routingTable[i].msgXmiter=scheduleLocalMsg;
      routingTable[i].linkId = 0;
    }
    else {
      routingTable[i].msgXmiter=NULL;
      routingTable[i].linkId = 0;
    }
  }
}

void defineLink(nodeId,msgXmiter,linkId)
NODE_T   nodeId;
void     (*msgXmiter)();
unsigned linkId;
{

  unsigned   i;
  unsigned   foundOne=0;

  for (i=0; i<numOfNodes; i++){

    if ( routingTable[i].gatewayNodeId == nodeId) {
      if ( routingTable[i].msgXmiter != NULL)
   setError(E_MULTIPLE_LINK,i,__FILE__,__LINE__);
      else {
   foundOne = 1;
   routingTable[i].msgXmiter = msgXmiter;
   routingTable[i].linkId = linkId;
      }
    }
  }

  if ( foundOne != 1 )
    setError(E_LINK_NOT_USED,nodeId,__FILE__,__LINE__);
}
/*

$Workfile:   netroute.c  $
$Revision:   1.0  $
$Date:   18 Jun 1990 22:53:44  $
```

```
$Log:   D:/USR/KERN/NET/VCS/NETROUTE.C_V  $
 *
 *    Rev 1.0   18 Jun 1990 22:53:44   JLastra
 * Initial revision.

 */


static char *vscId="$Header:   D:/USR/KERN/NET/VCS/NETROUTE.C_V   1.0   18

#include "netpriv.h"

/*
  routeMsg

  Determines the message destination node using the smAllocationTable
  configuration structure.

  The message is passed to the msgXmiter for the destination node using
  the routingTable configuration structure.
*/

void routeMsg(msg)
MSG_T   *msg;
{

  NODE_T destNode;

  if ( msg->fields.dest >= numOfStateMachines )
    setError( E_BAD_MSG_DESTINATION,msg->fields.dest, __FILE__, __LINE__ );

  destNode=smAllocationTable[msg->fields.dest];

  if ( routingTable[destNode].msgXmiter == NULL )
    setError( E_LINK_NOT_FOUND,destNode,__FILE__,__LINE__);

  (*routingTable[destNode].msgXmiter)( routingTable[destNode].linkId, msg);

}


/*

$Workfile:   nettst.c  $
$Revision:   1.0  $
$Date:   18 Jun 1990 22:53:50   $

$Log:   D:/USR/KERN/NET/VCS/NETTST.C_V  $
 *
 *    Rev 1.0   18 Jun 1990 22:53:50   JLastra
 * Initial revision.

*/


static char *vscId="$Header:   D:/USR/KERN/NET/VCS/NETTST.C_V   1.0   18 Ju

#include "net.h"
#include "ser.h"
#include <stdio.h>

/* NETWORK CONFIGURATION DATA */


NODE_T          myNodeId=3;
unsigned        numOfNodes=5;
```

```
ROUTING_RULE_T  routingTable[]={
   /* to node    gateway node         xmit func    linkId */
   /*  0 */        1,                 NULL,           0,
        /*  1 */   1,                 NULL,           0,
        /*  2 */   2,                 NULL,           0,
        /*  3 */   3,                 NULL,           0,
        /*  4 */   2,                 NULL,           0
   };

unsigned          numOfStateMachines=10 ;
NODE_T            smAllocationTable[]= {
   /* SM ID          NODE ID */
   /* 0 */           0,
   /* 1 */           2,
   /* 2 */           1,
   /* 3 */           1,
   /* 4 */           1,
   /* 5 */           0,
   /* 6 */           3,
   /* 7 */           2,
   /* 8 */           3,
   /* 9 */           4
   };


/* NETWORK LINK XMIT FUNCTIONS  */
static void xmit1( linkId, msg )
unsigned linkId;
MSG_T *msg;
{
   printf("nettst: xmit1 function used to send msg %d to sm %d through link
}


static void xmit2( linkId, msg )
unsigned linkId;
MSG_T *msg;
{
   printf("nettst: xmit2 function used to send msg %d to sm %d through link
}

void scheduleLocalMsg( linkId, msg )
unsigned linkId;
MSG_T *msg;
{
   printf("nettst: ScheduleLocalMsg function used to send msg %d to sm %d t
}

MSG_T msg;
jmp_buf warmStartEnv;
unsigned startCondition;

main()
{

   int jmpval;

   /* Warm start entry point */

   if ( (jmpval=setjmp(warmStartEnv)) == 0 ) {
           startCondition = E_NORMAL_START ;   /* system cold statrt */
   }
   else {
           startCondition = jmpval;
           exit(1);
   }
```

```
    errorHandlerInit   (startCondition, warmStartEnv);

    networkInit(0);

    defineLink(1, xmit1, 0);
    defineLink(2, xmit2, 1);


    msg.fields.name=10;

    msg.fields.dest=0;
    routeMsg(&msg);
    msg.fields.dest=1;
    routeMsg(&msg);
    msg.fields.dest=2;
    routeMsg(&msg);
    msg.fields.dest=3;
    routeMsg(&msg);
    msg.fields.dest=4;
    routeMsg(&msg);
    msg.fields.dest=5;
    routeMsg(&msg);
    msg.fields.dest=6;
    routeMsg(&msg);
    msg.fields.dest=7;
    routeMsg(&msg);
    msg.fields.dest=8;
    routeMsg(&msg);
    msg.fields.dest=9;
    routeMsg(&msg);

    /*
    extern void defineLink(NODE_T, void (*)(), unsigned);
    extern void routeMsg(MSG_T *);
    */
}


/******* Some Stubs *********/

void disableInterrupts()
{
}

void enableInterrupts()
{
}


### queappen.c ###


/*

$Workfile:   queappen.c  $
$Revision:   1.1  $
$Date:   05 Jul 1990 19:53:04   $

$Log:   D:/USR/KERN/QUE/VCS/QUEAPPEN.C_V  $
 *
 *    Rev 1.1   05 Jul 1990 19:53:04   JLastra
 * Queue count added and PVCS headers added to c source files.

*/
```

```
static char *vscId="$Header:   D:/USR/KERN/QUE/VCS/QUEAPPEN.C_V   1.1   05


#include "quepriv.h"


void appendQueue( queue, item )

QUEUE_T             *queue;
QUEUE_ITEM_T        *item;
{

     if ( item == NULL ) {
     setError(E_NULL_QUEUE_ITEM_PTR, __FILE__, __LINE__);
     return;
     }

     if ( item->next != NULL || item->prev != NULL || item->memberOf != NUL
       setError(E_QUEUE_APPEND_ITEM_BUSY,__FILE__,__LINE__);

     disableInterrupts();

     if ( checkQueue( queue ) == QUEUE_OK ) {

     if ( queue->head == (QUEUE_ITEM_T *) queue ) {
          queue->head = item;
          queue->tail = item;
          item->prev =  (QUEUE_ITEM_T *) queue ;
          item->next =  (QUEUE_ITEM_T *) queue ;
     }
     else {
          queue->tail->next = item;
          item->prev = queue->tail;
          queue->tail = item;
          item->next = (QUEUE_ITEM_T *) queue ;
     }
     item->memberOf = queue ;
     queue->count++;
     }

          enableInterrupts();
     }


     void appendPQ ( pq, newItem, newPriority )
     PRIORITY_QUEUE_T  *pq;
     QUEUE_ITEM_T      *newItem;
     QUEUE_PRIORITY_T  newPriority;

     {
          QUEUE_T  *q;

          if (checkPQ( pq ) == QUEUE_OK ) {
          if ( newPriority >= pq->numberOfPriorities) {
               setError ( E_BAD_QUEUE_PRIORITY,
                          newPriority,
                          pq->numberOfPriorities,
                          pq,
                          __FILE__,
                          __LINE__);
               return;
          }

          appendQueue( &pq->priorityQueues[ newPriority ], newItem );
```

```
    newItem->memberOf = &pq->priorityQueues[newPriority];

    }
}
```

quecheck.c ###

```
/*

$Workfile:   quecheck.c  $
$Revision:   1.1  $
$Date:   05 Jul 1990 19:53:08  $

$Log:   D:/USR/KERN/QUE/VCS/QUECHECK.C_V  $
 *
 *    Rev 1.1   05 Jul 1990 19:53:08   JLastra
 * Queue count added and PVCS headers added to c source files.

*/

static char *vscId="$Header:   D:/USR/KERN/QUE/VCS/QUECHECK.C_V   1.1   05

#include "quepriv.h"

#ifdef DEBUG_QUE

static QUEUE_STATE_T checkLink (queue,item)

QUEUE_T    *queue;
QUEUE_ITEM_T       *item;
{
     if ( (item != (QUEUE_ITEM_T *) queue) && (item->memberOf != queue )){
     setError (E_CORRUPT_ITEM_IN_QUEUE,item, queue, __FILE__, __LINE__);
     return(QUEUE_CORRUPTED);
     }

     if ( item->next != (QUEUE_ITEM_T *) queue ) {
     if (item->next->prev != item ) {
          setError (E_CORRUPT_LINK_IN_QUEUE,
                    item, queue, __FILE__, __LINE__);
          return(QUEUE_CORRUPTED);
     }
     else return (checkLink(queue,item->next));
     }
     else {
     if ( queue->tail != item ) {
          setError (E_CORRUPT_QUEUE_TAIL, queue,__FILE__, __LINE__);
          return(QUEUE_CORRUPTED);
     }
     else return (QUEUE_OK);
     }
}

#endif /* DEBUG_QUE */

QUEUE_STATE_T checkQueue (queue)

QUEUE_T            *queue;
{
```

```
    QUEUE_STATE_T       queueState;

    queueState = QUEUE_OK;

    disableInterrupts();

    if ( queue == (QUEUE_T *) NULL ) {
    queueState = NULL_QUEUE_PTR ;
    setError(E_NULL_QUEUE_PTR,__FILE__, __LINE__);
    }

#ifdef DEBUG_QUE

    else queueState =  checkLink ( queue, (QUEUE_ITEM_T *) queue );

#endif

    enableInterrupts();
    return (queueState);
}


QUEUE_STATE_T checkPQ( pq )
PRIORITY_QUEUE_T *pq ;

{
    QUEUE_PRIORITY_T    i;

    if ( pq == (PRIORITY_QUEUE_T *)NULL) {
    setError(E_NULL_QUEUE_PTR,__FILE__,__LINE__);
    return(QUEUE_CORRUPTED );
    }

#ifdef DEBUG_QUE

    for ( i=0 ; i<pq->numberOfPriorities ; i++)
    if (checkQueue( &pq->priorityQueues[i]) != QUEUE_OK )
         return(QUEUE_CORRUPTED);
#endif

    return(QUEUE_OK);
}


BOOLEAN itemInQueue( queue, item )
QUEUE_T       *queue;
QUEUE_ITEM_T *item;

{
      if ( checkQueue(queue) != QUEUE_OK )
     return(BFALSE);

      if ( item == NULL )
    setError(E_NULL_QUEUE_ITEM_PTR,__FILE__,__LINE__);


#ifndef DEBUG_QUE

      if ( item->memberOf != queue )
     return(BFALSE);
      return(BTRUE);
#else
      {
   QUEUE_ITEM_T    *anItem;
   BOOLEAN            found;
```

```
    found=BFALSE;
    disableInterrupts();
    if ( item->memberOf == queue ) {
      for (anItem = findFirstQueue(queue);
           anItem != NULL;
           anItem = findNextQueue(queue,anItem)) {

        if ( anItem == item ) {
          found=BTRUE;
          break;
        }
      }
    }
    enableInterrupts();

    return(found);
        }
#endif
}

### quecount.c ###

/*

$Workfile:   quecount.c  $
$Revision:   1.0  $
$Date:   05 Jul 1990 19:54:32   $

$Log:   D:/USR/KERN/QUE/VCS/QUECOUNT.C_V  $
 *
 *    Rev 1.0   05 Jul 1990 19:54:32   JLastra
 * Queue count added and PVCS headers added to c source files.

*/


static char *vscId="$Header:   D:/USR/KERN/QUE/VCS/QUECOUNT.C_V   1.0   05


#include "quepriv.h"

unsigned getQueueCount( queue )

QUEUE_T    *queue;
{

     if ( checkQueue( queue ) == QUEUE_OK )
        return(queue->count);

     return(0);
}

### quefind.c ###

/*

$Workfile:   quefind.c  $
$Revision:   1.1  $
$Date:   05 Jul 1990 19:53:12   $

$Log:   D:/USR/KERN/QUE/VCS/QUEFIND.C_V  $
 *
 *    Rev 1.1   05 Jul 1990 19:53:12   JLastra
 * Queue count added and PVCS headers added to c source files.

*/
```

```
static char *vscId="$Header:   D:/USR/KERN/QUE/VCS/QUEFIND.C_V   1.1   05 J

#include "queptiv.h"

QUEUE_ITEM_T *findFirstQueue( queue )

QUEUE_T     *queue;
{
     QUEUE_ITEM_T    *item;

     disableInterrupts();

     if (checkQueue( queue ) != QUEUE_OK )
     item = (QUEUE_ITEM_T *)NULL;
     else if (queue->head == (QUEUE_ITEM_T *) queue )
     item = (QUEUE_ITEM_T *)NULL;
     else item = queue->head;

     enableInterrupts();
     return(item);

}


QUEUE_ITEM_T  *findFirstPQ (pq )
PRIORITY_QUEUE_T      *pq;

{
     QUEUE_ITEM_T    *item;
     QUEUE_PRIORITY_T  i;

     item = NULL;

     disableInterrupts();
     if ( checkPQ( pq ) == QUEUE_OK )

       for (i = 0 ; i < pq->numberOfPriorities ; i++)
    if ( (item=findFirstQueue(&pq->priorityQueues[i])) != NULL ) {
      enableInterrupts();

      return( item );
    }

      enableInterrupts();
      return( item );
}


### queget.c ###

/*

$Workfile:   queget.c  $
$Revision:   1.1  $
$Date:   05 Jul 1990 19:53:16  $

$Log:   D:/USR/KERN/QUE/VCS/QUEGET.C_V  $
 *
 *    Rev 1.1   05 Jul 1990 19:53:16   JLastra
 * Queue count added and PVCS headers added to c source files.

*/
```

```
static char *vscId="$Header:   D:/USR/KERN/QUE/VCS/QUEGET.C_V   1.1   05 Ju

#include "quepriv.h"

QUEUE_ITEM_T *getFirstQueue( queue )

QUEUE_T     *queue;
{

     QUEUE_ITEM_T  *item;

     item= (QUEUE_ITEM_T *)NULL;

     disableInterrupts();

     if ( checkQueue( queue ) == QUEUE_OK ) {

     if (queue->head != (QUEUE_ITEM_T *)queue) {
          queue->count--;
          item = queue->head ;
          queue->head = item->next ;
          item->memberOf= NULL;
          item->next = NULL;
          item->prev= NULL;
          if ( queue->head == (QUEUE_ITEM_T *)queue)
               queue->tail = (QUEUE_ITEM_T *) queue;
          else queue->head->prev = (QUEUE_ITEM_T *)queue;
     }
     }
     enableInterrupts();
     return(item);
}

QUEUE_ITEM_T *getFirstPQ( pq )
PRIORITY_QUEUE_T *pq;

{
     QUEUE_ITEM_T     *item;
     QUEUE_PRIORITY_T  i;

     item = NULL;

     disableInterrupts();
     if (checkPQ( pq ) == QUEUE_OK ) {

     for (i=0 ; i<pq->numberOfPriorities; i++)
          if (pq->priorityQueues[i].head
                    != (QUEUE_ITEM_T *) &pq->priorityQueues[i].head ) {
               item = getFirstQueue( &pq->priorityQueues[i] );
               enableInterrupts();
               return( item );
     }
     }
     enableInterrupts();
     return( item );
}

### queglob.c ###

/*

$Workfile:   queglob.c  $
$Revision:   1.1  $
$Date:   05 Jul 1990 19:53:20  $
```

```
$Log:   D:/USR/KERN/QUE/VCS/QUEGLOB.C_V  $
 *
 *    Rev 1.1   05 Jul 1990 19:53:20   JLastra
 * Queue count added and PVCS headers added to c source files.

*/

static char *vscId="$Header:   D:/USR/KERN/QUE/VCS/QUEGLOB.C_V   1.1   05 J


#define DO_que
#include "quepriv.h"


### queinit.c ###
/*

$Workfile:   queinit.c  $
$Revision:   1.1  $
$Date:   05 Jul 1990 19:53:22  $

$Log:   D:/USR/KERN/QUE/VCS/QUEINIT.C_V  $
 *
 *    Rev 1.1   05 Jul 1990 19:53:22   JLastra
 * Queue count added and PVCS headers added to c source files.

*/

static char *vscId="$Header:   D:/USR/KERN/QUE/VCS/QUEINIT.C_V   1.1   05 J


#include "quepriv.h"

void initQueue( queue )

QUEUE_T    *queue;
{
     if ( queue == NULL )
     setError ( E_NULL_QUEUE_PTR, __FILE__, __LINE__);
     else {
     queue->head = (QUEUE_ITEM_T *)queue;
     queue->tail = (QUEUE_ITEM_T *)queue;
     queue->count= 0;
     }
}


PRIORITY_QUEUE_T *initPQ( numberOfPriorities )

unsigned   numberOfPriorities;
{
   PRIORITY_QUEUE_T        *pq;
   unsigned                size;
   QUEUE_PRIORITY_T        i;

   if ( (pq = (PRIORITY_QUEUE_T *) memoryAlloc(sizeof(PRIORITY_QUEUE_T))) =
           return( NULL );

   pq->numberOfPriorities = numberOfPriorities;

   size = sizeof(QUEUE_T) * numberOfPriorities;
   if ( (pq->priorityQueues = (QUEUE_T *) memoryAlloc (size)) == NULL)
           return( NULL );
```

```
for ( i=0; i< pq->numberOfPriorities; i++)
     initQueue( &pq->priorityQueues[i]);

    return( pq );
 }


 void clearQueueItem(item)
 QUEUE_ITEM_T *item;
 {
   item->next = NULL;
   item->prev = NULL;
   item->memberOf = NULL;
 }

### queinsrt.c ###

/*

$Workfile:   queinsrt.c  $
$Revision:   1.2  $
$Date:   08 Aug 1990 15:33:32   $

$Log:   D:/USR/KERN/QUE/VCS/QUEINSRT.C_V  $
 *
 *    Rev 1.2   08 Aug 1990 15:33:32   JLastra
 * insertAfterQueue and insertAfterPQ added.
 *
 *    Rev 1.1   05 Jul 1990 19:53:26   JLastra
 * Queue count added and PVCS headers added to c source files.

 */


 static char *vscId="$Header:   D:/USR/KERN/QUE/VCS/QUEINSRT.C_V   1.2   08


 #include "quepriv.h"

 void insertBeforeQueue( queue, item, newItem )

 QUEUE_T              *queue;
 QUEUE_ITEM_T         *item;
 QUEUE_ITEM_T         *newItem;
 {
      if ( item == NULL ) {
      setError(E_NULL_QUEUE_ITEM_PTR, __FILE__, __LINE__);
      return;
      }

      if ( item->memberOf !=queue ) {
      setError(E_ITEM_NOT_IN_QUEUE, item, queue,__FILE__, __LINE__);
      return;
      }

      if ( newItem == NULL ) {
      setError(E_NULL_QUEUE_ITEM_PTR, __FILE__, __LINE__);
      return;
      }

      if (    newItem->next != NULL
      || newItem->prev != NULL
      || newItem->memberOf != NULL)
        setError(E_QUEUE_APPEND_ITEM_BUSY,__FILE__,__LINE__);
```

```
disableInterrupts();

if ( checkQueue( queue ) == QUEUE_OK ) {
queue->count++;

     newItem->prev = item->prev;
     newItem->next = item;
     if ( item->prev != (QUEUE_ITEM_T *)queue )
          item->prev->next = newItem;
     else
          queue->head = newItem;
     item->prev = newItem;

     newItem->memberOf = queue ;
     }

     enableInterrupts();
}


void insertBeforePQ( pq, item, newItem, priority )

PRIORITY_QUEUE_T            *pq;
QUEUE_ITEM_T                *item;
QUEUE_ITEM_T                *newItem;
QUEUE_PRIORITY_T   priority;
{

     if (checkPQ(pq) == QUEUE_OK ) {
     if ( priority >= pq->numberOfPriorities ) {
          setError (E_BAD_QUEUE_PRIORITY,
                    priority,
                    pq->numberOfPriorities,
                    pq,
                    __FILE__,
                    __LINE__ );
          return;
     }

     insertBeforeQueue( &pq->priorityQueues[priority], item, newItem);
     return;
     }

}


void insertAfterQueue( queue, item, newItem )

QUEUE_T              *queue;
QUEUE_ITEM_T         *item;
QUEUE_ITEM_T         *newItem;
{
     if ( item == NULL ) {
     setError(E_NULL_QUEUE_ITEM_PTR, __FILE__, __LINE__);
     return;
     }

     if ( item->memberOf !=queue ) {
     setError(E_ITEM_NOT_IN_QUEUE, item, queue,__FILE__, __LINE__);
return;
}

if ( newItem == NULL ) {
setError(E_NULL_QUEUE_ITEM_PTR, __FILE__, __LINE__);
return;
```

```
    }

    if (   newItem->next != NULL
    || newItem->prev != NULL
    || newItem->memberOf != NULL)
       setError(E_QUEUE_APPEND_ITEM_BUSY,__FILE__,__LINE__);


    disableInterrupts();

    if ( checkQueue( queue ) == QUEUE_OK ) {
    queue->count++;
    newItem->prev = item;
    newItem->next = item->next;

    if ( item->next != (QUEUE_ITEM_T *)queue )
         item->next->prev = newItem;
    else
         queue->tail= newItem;
    item->next= newItem;

    newItem->memberOf = queue ;
    }

    enableInterrupts();
}


void insertAfterPQ( pq, item, newItem, priority )

PRIORITY_QUEUE_T            *pq;
QUEUE_ITEM_T                *item;
QUEUE_ITEM_T                *newItem;
QUEUE_PRIORITY_T   priority;
{

     if (checkPQ(pq) == QUEUE_OK ) {
     if ( priority >= pq->numberOfPriorities ) {
          setError (E_BAD_QUEUE_PRIORITY,
                    priority,
                    pq->numberOfPriorities,
                    pq,
                    __FILE__,
                    __LINE__ );
          return;
      }

     insertAfterQueue( &pq->priorityQueues[priority], item, newItem);
     return;
     }

}


### quenext.c ###

/*

$Workfile:   quenext.c  $
$Revision:   1.1  $
$Date:   05 Jul 1990 19:53:30  $

$Log:   D:/USR/KERN/QUE/VCS/QUENEXT.C_V  $
 *
```

```
 *    Rev 1.1   05 Jul 1990 19:53:30   JLastra
 * Queue count added and PVCS headers added to c source files.

*/

static char *vscId="$Header:   D:/USR/KERN/QUE/VCS/QUENEXT.C_V   1.1   05 J

#include "quepriv.h"

QUEUE_ITEM_T *findNextQueue( queue, item )

QUEUE_T             *queue;
QUEUE_ITEM_T        *item;
{
     QUEUE_ITEM_T   *nextItem;

     if ( item == NULL ) {
     setError(E_NULL_QUEUE_ITEM_PTR, __FILE__, __LINE__);
     return;
     }

     if ( item->memberOf !=queue ) {
     setError(E_ITEM_NOT_IN_QUEUE, item, queue,__FILE__, __LINE__);
     return;
     }

     disableInterrupts();

     if (checkQueue( queue ) != QUEUE_OK )
     nextItem = (QUEUE_ITEM_T *)NULL;
     else if (item->next == (QUEUE_ITEM_T *) queue )
     nextItem = (QUEUE_ITEM_T *)NULL;
     else nextItem = item->next ;

     enableInterrupts();
     return(nextItem);
}


QUEUE_ITEM_T *findNextPQ( pq, item )
PRIORITY_QUEUE_T  *pq;
QUEUE_ITEM_T      *item;

{



QUEUE_PRIORITY_T  i;
QUEUE_ITEM_T      *nextItem;

nextItem = NULL;

disableInterrupts();

if ( checkPQ ( pq ) ==QUEUE_OK )

for (i = 0 ; i < pq->numberOfPriorities ; i++)   {
     if ( &pq->priorityQueues[i] == item->memberOf ) {
          if (( nextItem=findNextQueue(&pq->priorityQueues[i],item))
               != NULL ) {
                break;
          }
     }
```

```
          else if (&pq->priorityQueues[i] > item->memberOf ) {
               if (( nextItem=findFirstQueue(&pq->priorityQueues[i]))
                   != NULL ) {
                    break;
               }
     }
     }
     enableInterrupts();
     return(nextItem);
}

### queremov.c ###

/*

$Workfile:   queremov.c  $
$Revision:   1.1  $
$Date:   05 Jul 1990 19:53:34  $

$Log:   D:/USR/KERN/QUE/VCS/QUEREMOV.C_V  $
 *
 *    Rev 1.1   05 Jul 1990 19:53:34   JLastra
 * Queue count added and PVCS headers added to c source files.

*/


static char *vscId="$Header:   D:/USR/KERN/QUE/VCS/QUEREMOV.C_V   1.1   05


#include "quepriv.h"

void removeQueue( queue, item )

QUEUE_T             *queue;
QUEUE_ITEM_T        *item;
{

     if ( item == NULL ) {
     setError(E_NULL_QUEUE_ITEM_PTR, __FILE__, __LINE__);
     return;
     }

     if ( item->memberOf != queue )
       setError(E_ITEM_NOT_IN_QUEUE,__FILE__,__LINE__);

     disableInterrupts();

     if ( checkQueue( queue ) == QUEUE_OK ) {

     if ( item->prev != (QUEUE_ITEM_T *) queue )
          item->prev->next = item->next;
     else
          queue->head = item->next;
     if ( item->next !=  (QUEUE_ITEM_T *) queue )
          item->next->prev = item->prev;
     else
          queue->tail = item->prev;

     item->memberOf = NULL;
     item->next = NULL;
     item->prev = NULL;
     queue->count--;
     /* check queue integrity after item has been removed */
     checkQueue(queue);
     }
     enableInterrupts();
```

```
}


void        removePQ( pq, item )

PRIORITY_QUEUE_T            *pq;
QUEUE_ITEM_T                *item;
{
     QUEUE_PRIORITY_T    i;

     if (pq == (PRIORITY_QUEUE_T *) NULL ) {
     setError ( E_NULL_QUEUE_PTR, __FILE__, __LINE__ );
     return;
     }

     if ( item == (QUEUE_ITEM_T *)NULL) {
     setError ( E_NULL_QUEUE_ITEM_PTR, __FILE__, __LINE__ );
     return;
     }

     for (i=0 ; i < pq->numberOfPriorities; i++)
     if ( &pq->priorityQueues[i] == item->memberOf ) {
          removeQueue(&pq->priorityQueues[i], item );
          return ;
     }

     setError ( E_ITEM_NOT_IN_QUEUE, item, pq, __FILE__, __LINE__ );
     return;
}

### quetst.c ###

/*

$Workfile:   quetst.c  $
$Revision:   1.1  $
$Date:   05 Jul 1990 19:53:36   $

$Log:   D:/USR/KERN/QUE/VCS/QUETST.C_V   $
 *
 *    Rev 1.1   05 Jul 1990 19:53:36   JLastra
 * Queue count added and PVCS headers added to c source files.

*/


static char *vscId="$Header:   D:/USR/KERN/QUE/VCS/QUETST.C_V   1.1   05 Ju


#include "quepriv.h"

#define NUM_ITEMS 100
#define PERF_LOOPS 20000

QUEUE_T tstQ;
QUEUE_ITEM_T Qitem[NUM_ITEMS];


main()
{
   int i;
   QUEUE_ITEM_T *anItem;

   initQueue(&tstQ);
```

```
/* appendQueue test */
   for(i=0;i<NUM_ITEMS;i++)
          appendQueue (&tstQ, &Qitem[i]);
   printf("quetst: %d items appended\n",NUM_ITEMS);
   printf("quetst: %d items count   \n",getQueueCount(&tstQ));

/* itemInQueue Test */
   for(i=0;i<NUM_ITEMS;i++)
          if ( ItemInQueue(&tstQ, &Qitem[i])==BFALSE)
                 printf("ItemInQueue FAILED\n");
   printf("quetst: %d items tested in queue\n",NUM_ITEMS);
   printf("quetst: %d items count   \n",getQueueCount(&tstQ));

/* findFirstQueue and findNextQueue test */
   anItem = findFirstQueue(&tstQ);
   if ( anItem != &Qitem[0])
          printf("findFirstQueue failed\n");
   for(i=1;i<NUM_ITEMS;i++)
          if ( (anItem= findNextQueue(&tstQ, anItem)) != &Qitem[i])
                 printf("findNextQueue failed\n");
   printf("quetst: %d items found in queue\n",NUM_ITEMS);

   printf("quetst: %d items count   \n",getQueueCount(&tstQ));

/* getFirstQueue test */
   for(i=0;i<NUM_ITEMS;i++)
          if ( getFirstQueue(&tstQ) != &Qitem[i])
                 printf("getFirtsQueue failed\n");
   if ( getFirstQueue(&tstQ) != NULL)
          printf("queue not empty when it should\n");
   printf("quetst: %d items got from queue\n",NUM_ITEMS);
   printf("quetst: %d items count   \n",getQueueCount(&tstQ));

/* insertBeforeQueue test */
   appendQueue (&tstQ, &Qitem[NUM_ITEMS-1]);
   for(i=0;i<NUM_ITEMS-1;i++)
          insertBeforeQueue (&tstQ, &Qitem[NUM_ITEMS-1], &Qitem[i]);

   anItem = findFirstQueue(&tstQ);
   if ( anItem != &Qitem[0])
          printf("findFirstQueue after insertBeforeQueue failed\n");
   for(i=1;i<NUM_ITEMS;i++)
          if ( (anItem= findNextQueue(&tstQ, anItem)) != &Qitem[i])
                 printf("findNextQueue after insertBeforeQueue failed\n")
   printf("quetst: %d inserted and found in queue\n",NUM_ITEMS);
   printf("quetst: %d items count   \n",getQueueCount(&tstQ));

/* removeQueue test */
   for(i=0;i<NUM_ITEMS;i++)
          removeQueue(&tstQ, &Qitem[i]);

   if ( getFirstQueue(&tstQ) != NULL)
          printf("queue not empty when it should\n");
   printf("quetst: %d items removed from queue\n",NUM_ITEMS);
   printf("quetst: %d items count   \n",getQueueCount(&tstQ));

/* append & get performance test */
   for(i=0;i<NUM_ITEMS;i++)
          appendQueue (&tstQ, &Qitem[i]);
   printf("quetst: start perf test: %d appends and gets\n",PERF_LOOPS);
   for(i=0;i<PERF_LOOPS;i++){
          anItem = getFirstQueue(&tstQ);
          appendQueue(&tstQ, anItem);
   }
   printf("quetst: perf test done\n");
```

```
   printf("que test done\n");

}

/******* Some Stubs **********/

void disableInterrupts()
{
}

void enableInterrupts()
{
}

void setError(code)
int code;
{
printf("ERROR ERROR %d\n",code);
exit(1);
}

char *memoryAlloc(size)
int size;
{
   return (malloc(size));
}

### nodex.c ###

/*

$Workfile:   nodex.c  $
$Revision:   1.0  $
$Date:   18 Jun 1990 23:08:06  $

$Log:   D:/USR/KERN/RTS/VCS/NODEX.C_V  $
 *
 *    Rev 1.0   18 Jun 1990 23:08:06   JLastra
 * Initial revision.

*/


static char *vscId="$Header:   D:/USR/KERN/RTS/VCS/NODEX.C_V   1.0   18 Jun

#include "rts.h"


NODE_T          myNodeId=0;
unsigned        numOfNodes=5;

ROUTING_RULE_T  routingTable[]={
   /* to node    gateway node       xmit func   linkId */
   /*  0 */        0,               NULL,          0,
        /*  1 */   1,               NULL,          0,
        /*  2 */   2,               NULL,          0,
        /*  3 */   1,               NULL,          0,
        /*  4 */   2,               NULL,          0
   };

unsigned        numOfStateMachines=10 ;
NODE_T          smAllocationTable[]= {
   /* SM ID        NODE ID */
   /* 0 */         0,
   /* 1 */         0,
```

```
   /* 2 */         0,
   /* 3 */         1,
   /* 4 */         1,
   /* 5 */         2,
   /* 6 */         2,
   /* 7 */         7,
   /* 8 */         8,
   /* 9 */         9
   };


extern SM_DESCRIPTOR_T stateMachine0;
extern SM_DESCRIPTOR_T stateMachine1;
extern SM_DESCRIPTOR_T stateMachine2;

SM_DESCRIPTOR_T *StateMachines[]={
   &stateMachine0,
   &stateMachine1,

   &stateMachine2,
   NULL,
   NULL,
   NULL,
   NULL,
   NULL,
   NULL,
   NULL
   };

### rtsglob.c ###

/*

$Workfile:   rtsglob.c  $
$Revision:   1.0  $
$Date:   18 Jun 1990 23:08:10  $

$Log:   D:/USR/KERN/RTS/VCS/RTSGLOB.C_V  $
 *
 *    Rev 1.0   18 Jun 1990 23:08:10   JLastra
 * Initial revision.

*/


static char *vscId="$Header:   D:/USR/KERN/RTS/VCS/RTSGLOB.C_V   1.0   18 J


#define DO_rts
#include "rtspriv.h"

### rtsver.c ###

/*

$Workfile:   rtsver.c  $
$Revision:   1.3  $
$Date:   04 Aug 1990 13:33:36  $

$Log:   D:/USR/KERN/RTS/VCS/RTSVER.C_V  $
 *
 *    Rev 1.3   04 Aug 1990 13:33:36   JLastra
 * System release A.3.   Improved error handling capabilities.
 *
 *    Rev 1.2   25 Jul 1990 19:42:48   JLastra
```

```
* System Version A.2
*
*
*    Rev 1.1   30 Jun 1990 13:09:02   JLastra
* System version number A.1
*
*
*    Rev 1.0   19 Jun 1990 23:26:58   JLastra
* Initial revision.

*/

static char *vscId="$Header:   D:/USR/KERN/RTS/VCS/RTSVER.C_V   1.3   04 Au

void rtsVer()
{
   printf("\n\nDatagram Switched Operating System\n");
   printf("\n ver A.3   $Date:   04 Aug 1990 13:33:36  $\n\n");

### stubs.c ###

/*

$Workfile:   stubs.c  $
$Revision:   1.0  $
$Date:   18 Jun 1990 23:08:24   $

$Log:   D:/USR/KERN/RTS/VCS/STUBS.C_V  $
 *
 *    Rev 1.0   18 Jun 1990 23:08:24   JLastra
 * Initial revision.

*/

static char *vscId="$Header:   D:/USR/KERN/RTS/VCS/STUBS.C_V   1.0   18 Jun

#include "rts.h"
#ifndef HD_TYPES
#        include <sys/types.h>
#endif
#ifndef HD_TIME
#        include <sys/timeb.h>
#endif

unsigned rtcInterval=1000;

void getTimeOfDay( timeVar )
TIME_T *timeVar;
{
   struct timeb tod_msdos;

   ftime( &tod_msdos  );

   timeVar->tv_sec = tod_msdos.time;
   timeVar->tv_usec = tod_msdos.millitm;
}

void doSynchTasks()
{
}
```

```
void rtcInit(startCondition)
int startCondition;
{
}

void environmentInit(startCondition)
int startCondition;
{
}

void interruptsInit (startCondition)
int startCondition;

{
}

void interruptsStart (startCondition)
int startCondition;
{
}

void disableInterrupts()
{
}

void enableInterrupts()
{
}

### schcancl.c ###

/*

$Workfile:   schcancl.c  $
$Revision:   1.0  $
$Date:   18 Jun 1990 22:42:40  $

$Log:   D:/USR/KERN/SCH/VCS/SCHCANCL.C_V  $
 *
 *    Rev 1.0   18 Jun 1990 22:42:40   JLastra
 * Initial revision.

*/


static char *vscId="$Header:   D:/USR/KERN/SCH/VCS/SCHCANCL.C_V   1.0   18


#include "schpriv.h"

void cancelMsg( msg )

MSG_T              *msg;
{
     if ( msg->header.status == IN_SCHEDULER ) {
   removePQ(LocalMsgPQ, (QUEUE_ITEM_T *)msg);
   msg->header.status=CANCELED;
   msgFree(msg);
      }
}

### schdebug.c ###

/*

$Workfile:   schdebug.c  $
```

```
$Revision:   1.4  $
$Date:   02 Aug 1990 19:42:44  $

$Log:   D:/USR/KERN/SCH/VCS/SCHDEBUG.C_V  $
 *
 *    Rev 1.4   02 Aug 1990 19:42:44   JLastra
 * getSmLabel, getStateLabel & getMsgLabel added.
 *
 *    Rev 1.3   26 Jun 1990 10:05:54   JLastra
 * Fixed unbalanced disableInterrupts
 *
 *
 *    Rev 1.2   22 Jun 1990 23:00:16   JLastra
 * Fix getTimeInmsecs.
 *
 *
 *    Rev 1.1   22 Jun 1990 22:26:38   JLastra
 * Fixed printing of time values as unsigned longs.
 *
 *
 *    Rev 1.0   18 Jun 1990 22:42:42   JLastra
 * Initial revision.

*/


static char *vscId="$Header:   D:/USR/KERN/SCH/VCS/SCHDEBUG.C_V   1.4   02


#include "schpriv.h"

#ifdef DEBUG_SCH

static unsigned long getTimeInmSecs(tod)

TIME_T  *tod;
{
      return( ( tod->tv_sec % 1000) *1000 + tod->tv_usec/1000);
 }


static void dumpMsg( msg )
MSG_T *msg;
{

 printf( "%1d    %7lu %7lu %7lu %7lu %3u  %3d   %3u   %3u    %3d   %1u %4u
    msg->header.status,
    getTimeInmSecs(&msg->header.creationTime),
    getTimeInmSecs(&msg->header.schedulingTime),
    getTimeInmSecs(&msg->header.deliveryTime),
    getTimeInmSecs(&msg->header.disposalTime),

    msg->fields.dest,
    msg->fields.name,
    msg->fields.initialState,
    msg->fields.finalState,
    msg->fields.origin,
    msg->fields.priority,
    msg->fields.infoSize );
}

#endif

char *getMsgLabel( msgName )
unsigned msgName;
```

```
{
#ifdef DEBUG_SCH
   if ( msgName < numOfMessages )
           return( typeSpecs[sysMsgs[msgName].tIndex].name);
   else
#endif
           return("***MSG Label Not Defined***");
}

char *getSmLabel(smName)
unsigned smName;
{
#ifdef DEBUG_SCH
   if ( smName < numOfStateMachines )
           return( stateMachineNames[ smName]);
   else
#endif
           return("***SM Label Not Defined***");

}

char *getStateLabel(smName, stateName)
unsigned smName, stateName;
{
#ifdef DEBUG_SCH
   if ( smName < numOfStateMachines
   &&   stateName < StateMachines[smName]->numberOfStates )
           return(  StateMachines[smName]->statesNamesList[stateName] );
   else
#endif
           return("***STATE Label Not Defined***");

}

void showMsg(msg)
MSG_T   *msg;
{
#ifdef DEBUG_SCH

  if ( msg == NULL ) {
    printf("showMSG: NULL msg argument\n");
    return;

}

printf("\n");
printf( "Message Name             : %s\n", getMsgLabel(msg->fields.name));
printf( "Message Destination      : %s\n", getSmLabel(msg->fields.dest));
if ( msg->fields.origin > -0-50)
   printf( "Message Origin          : SYSTEM\n");
else
   printf( "Message Origin          : %s\n",getSmLabel(msg->fields.origin
printf( "Initial State            : %s\n", getStateLabel(msg->fields.dest,
printf( "Final State              : %s\n", getStateLabel(msg->fields.dest,
printf( "Message Priority         : %s\n", msgPrioritiesNames[msg->fields.
printf( "Info Size                : %d\n", msg->fields.infoSize );
printf( "Message status           : %s\n", msgStatusNames[msg->header.stat
printf( "Creation Time            : %lu\n", getTimeInmSecs(&msg->header.cr
printf( "Scheduling Time          : %lu\n", getTimeInmSecs(&msg->header.sc
printf( "Delivery Time            : %lu\n", getTimeInmSecs(&msg->header.de
printf( "Disposal Time            : %lu\n", getTimeInmSecs(&msg->header.di


#endif
}
```

```
void showMsgQueue( queue )

QUEUE_T          *queue;
{
#ifdef DEBUG_SCH

   MSG_T            *msg;

   disableInterrupts();

         if ( checkQueue(queue) != QUEUE_OK )
         {
                printf( "Corrupted queue\n" );
                return;
         }

         if ( (msg = (MSG_T *)findFirstQueue(queue)) == NULL )
         {
                printf( "Queue : EMPTY\n" );
            enableInterrupts();
                return;
         }


   for ( ; msg !=NULL  ; msg = (MSG_T *)findNextQueue(queue, (QUEUE_IT
showMsg(msg);

   enableInterrupts();
#endif
}


void showPastMsg()
{
#ifdef DEBUG_SCH
   showMsgQueue(SaveQueue);

#endif
}


void showMsgPQ( pq )
PRIORITY_QUEUE_T *pq;
{
#ifdef DEBUG_SCH

         MSG_T            *msg;

   disableInterrupts();

         if ( checkPQ(pq) != QUEUE_OK )
         {
                printf( "Corrupted queue\n" );
                return;
         }

         if ( (msg = (MSG_T *)findFirstPQ(pq)) == NULL )
         {
                printf( "Queue : EMPTY\n" );
            enableInterrupts();
                return;
         }
```

```
      for ( ; msg !=NULL ; msg = (MSG_T *)findNextPQ(pq, (QUEUE_ITEM_T *
   showMsg(msg);

  enableInterrupts();

#endif
}

### schdecod.c ###


/*

$Workfile:   schdecod.c  $
$Revision:   1.2  $
$Date:   02 Aug 1990 18:21:42  $

$Log:   D:/USR/KERN/SCH/VCS/SCHDECOD.C_V  $
 *
 *    Rev 1.2   02 Aug 1990 18:21:42   JLastra
 * Error codes fixed.
 *
 *
 *    Rev 1.1   25 Jul 1990 19:14:24   JLastra
 * Transition index computation fixed.
 *
 *
 *    Rev 1.0   18 Jun 1990 22:42:44   JLastra
 * Initial revision.

*/


static char *vscId="$Header:   D:/USR/KERN/SCH/VCS/SCHDECOD.C_V   1.2   02


#include "schpriv.h"

SM_STATE_T (*decodeMsg(msg))()

MSG_T                           *msg;
{
   SM_NAME_T                    dest;
   SM_DESCRIPTOR_T              *descriptor;
   SM_STATE_T                   state;
   unsigned                     msgIndex;

   dest = msg->fields.dest;
   if ( dest >= numOfStateMachines){
           setError(E_BAD_MSG_DESTINATION,
                   msg->fields.dest,
                   __FILE__,
                   __LINE__ );
           return(NULL);
   }

   descriptor = StateMachines[ dest ];
   if ( descriptor == NULL ){
           setError(E_BAD_MSG_DESTINATION,
                   msg->fields.dest,
                   __FILE__,
                   __LINE__ );
           return(NULL);
   }
```

```
   /* find msg name in state machine messages list */

   for (msgIndex=0; msgIndex < descriptor->numberOfMessages; msgIndex++)
           if ( msg->fields.name == descriptor->messages[msgIndex])
                   break;

   if (msgIndex >= descriptor->numberOfMessages){
           setError (E_UNKNOWN_MESSAGE,
                     msg->fields.name,
                     msg->fields.dest,
                     msg->fields.origin,
                     __FILE__,
                     __LINE__);
           return(NULL);
   }

   if (descriptor->state >= descriptor->numberOfStates){
           setError(E_BAD_MACHINE_STATE,
                   msg->fields.dest,
                   descriptor->state,
                   descriptor->numberOfStates);
           return(NULL);
   }

   return( descriptor->transitions[descriptor->state * descriptor->numberOf
}

### schdeliv.c ###

/*

$Workfile:   schdeliv.c  $
$Revision:   1.4  $
$Date:   04 Aug 1990 12:08:56  $

$Log:   D:/USR/KERN/SCH/VCS/SCHDELIV.C_V  $
 *
 *    Rev 1.4   04 Aug 1990 12:08:56   JLastra
 * Set the msg status to SERVICED before gettting rid of it.
 *
 *    Rev 1.3   02 Aug 1990 20:08:54   JLastra
 * Added currentMsg declaration.
 *
 *
 *    Rev 1.2   19 Jun 1990 23:15:30   JLastra
 * BUG....
 *
 *
 *    Rev 1.1   19 Jun 1990 23:10:24   JLastra
 * Deliver message delivers one message at a time and then returns to accom
 * doAsynch routine in RTSS main loop.
 *
 *    Rev 1.0   18 Jun 1990 22:42:46   JLastra
 * Initial revision.

*/

static char *vscId="$Header:   D:/USR/KERN/SCH/VCS/SCHDELIV.C_V   1.4   04

#include "schpriv.h"

/*
   deliver message
```

```
   delivers messages from local message queues to the local
   state machines.

   This routine never returns as it is the actual task dispatching
        function in RTSS. Only interrupt handlers are activated by other
   means than the scheduler (i.e. deliverMsg).

   The message deliver stops only when an error is encountered that
   causes a warm start of the system through the erro handler.
*/

void deliverMsg()
{
   MSG_HEADER_T      *header;
   MSG_FIELD_T       *fields;
   SM_DESCRIPTOR_T   *descriptor;
   SM_STATE_T        newState;


   SM_STATE_T        (*transitionFunction)();

/*
   Deliver one message, if any, and return.
*/

      currentMsg = (MSG_T *) getFirstPQ( LocalMsgPQ );
      if ( currentMsg != NULL ) {

     header = &currentMsg->header;
     fields = &currentMsg->fields;

     /*
          invoke an appropriate transition function
     */
     transitionFunction = decodeMsg(currentMsg);
     descriptor = StateMachines[currentMsg->fields.dest];

     if ( transitionFunction == NULL )
             return;

     #ifdef DEBUG_SCH
     getTimeOfDay( &header->deliveryTime );
#endif
     header->status=IN_SERVICE;
     currentMsg->fields.initialState = descriptor->state;
     currentSM = currentMsg->fields.dest;

     newState = (*transitionFunction)( currentMsg, descriptor );
     if ( newState != SAME_STATE )
             descriptor->state = newState;

     currentSM = SYSTEM_SCHEDULER;

     if ( header->status == IN_SERVICE) {
             currentMsg->fields.finalState=descriptor->state ;
             header->status = SERVICED ;
             msgFree(currentMsg);
             currentMsg=NULL;
     }
      }
      else /* currentMsg == NULL */
    {
        /* No messages in queue, system is idling.
           Here we can do some housekeeping
                work to kill time (e.g. a memory audit) as long as it
```

```
         is done in short bursts so that a new message in the queue
         is not significantly delayed.
      */
   }

}

### schglob.c ###

/*

$Workfile:   schglob.c  $
$Revision:   1.0  $
$Date:   18 Jun 1990 22:42:50  $

$Log:   D:/USR/KERN/SCH/VCS/SCHGLOB.C_V  $
 *
 *    Rev 1.0   18 Jun 1990 22:42:50   JLastra
 * Initial revision.

*/


static char *vscId="$Header: D:/USR/KERN/SCH/VCS/SCHGLOB.C_V   1.0   18 J


#define DO_sch
#include "schpriv.h"

### schinit.c ###

/*

$Workfile:   schinit.c  $
$Revision:   1.0  $
$Date:   18 Jun 1990 22:42:52  $

$Log:   D:/USR/KERN/SCH/VCS/SCHINIT.C_V  $
 *
 *    Rev 1.0   18 Jun 1990 22:42:52   JLastra
 * Initial revision.

*/


static char *vscId="$Header:   D:/USR/KERN/SCH/VCS/SCHINIT.C_V   1.0   18 J


#include "schpriv.h"

/*
   schedulerInit

   initializes the scheduler queues
*/


void schedulerInit( startCondition )
unsigned startCondition ;

{
        unsigned  SMNumber;

   LocalMsgPQ = initPQ( MAX_MSG_PRIORITY );
```

```
   for (SMNumber = 0;
        SMNumber < numOfStateMachines;
        SMNumber++ )
   {
       if ( smAllocationTable[SMNumber] == myNodeId ) {
#ifdef DEBUG_SCH
/*
            dumpStateMachine( StateMachines[SMNumber] );
*/
#endif
        }
   }
   smInit(  startCondition );

#ifdef DEBUG_SCH
   SaveQueue = &qs;
   initQueue( SaveQueue );
   SaveQueueCount = 0;
#endif


}


### schmsgal.c ###

/*

$Workfile:   schmsgal.c  $
$Revision:   1.1  $
$Date:   02 Aug 1990 19:39:52   $

$Log:   D:/USR/KERN/SCH/VCS/SCHMSGAL.C_V  $
 *
 *    Rev 1.1   02 Aug 1990 19:39:52   JLastra
 * Initial state and final state init to UNDEFINED.
 *
 *
 *    Rev 1.0   18 Jun 1990 22:42:54   JLastra
 * Initial revision.

*/


static char *vcsId="$Header:   D:/USR/KERN/SCH/VCS/SCHMSGAL.C_V   1.1   02


#include "schpriv.h"

MSG_T *msgAlloc( infoSize )

unsigned   infoSize;
{
   MSG_T            *newMsg;
   unsigned         bytesToAlloc;
   MSG_HEADER_T     *header;

   bytesToAlloc = infoSize + sizeof(MSG_T);
   newMsg = (MSG_T *) memoryAlloc( bytesToAlloc );

   clearQueueItem((QUEUE_ITEM_T*)newMsg);
   header = &newMsg->header;
   header->status = CREATED;
   newMsg->fields.infoSize = infoSize;
   newMsg->fields.initialState = UNDEFINED;
   newMsg->fields.finalState = UNDEFINED;
#ifdef DEBUG_SCH
```

```
{
   getTimeOfDay( &header->creationTime );
   header->schedulingTime.tv_sec = 0L;
   header->schedulingTime.tv_usec = 0L;
   header->deliveryTime.tv_sec = 0L;
   header->deliveryTime.tv_usec = 0L;
   header->disposalTime.tv_sec = 0L;
   header->disposalTime.tv_usec = 0L;
}
#endif
   return( newMsg );
}

### schmsgfr.c ###

/*

$Workfile:   schmsgfr.c  $
$Revision:   1.0  $
$Date:   18 Jun 1990 22:42:56  $

$Log:   D:/USR/KERN/SCH/VCS/SCHMSGFR.C_V  $
 *
 *    Rev 1.0   18 Jun 1990 22:42:56   JLastra
 * Initial revision.

*/

static char *vscId="$Header:   D:/USR/KERN/SCH/VCS/SCHMSGFR.C_V   1.0   18

#include "schpriv.h"

void msgFree( msg )

MSG_T              *msg;
{
       if (msg->header.status != CANCELED )
     msg->header.status = SERVICED ;
#ifdef DEBUG_SCH
   getTimeOfDay( &msg->header.disposalTime );

   if (SaveQueueCount < MsgsToSave-1)
   {
          appendQueue( SaveQueue, (QUEUE_ITEM_T *)msg);
          SaveQueueCount += 1;
   }
   else
   {
          memoryFree( (char *)getFirstQueue( SaveQueue ) );
          appendQueue( SaveQueue, (QUEUE_ITEM_T *)msg);
   }
#else
   memoryFree( (char *)msg );
#endif
}

### schsend.c ###

/*

$Workfile:   schsend.c  $
$Revision:   1.0  $
$Date:   18 Jun 1990 22:43:02  $
```

```
$Log:   D:/USR/KERN/SCH/VCS/SCHSEND.C_V  $
 *
 *    Rev 1.0   18 Jun 1990 22:43:02   JLastra
 * Initial revision.

*/


static char *vscId="$Header:   D:/USR/KERN/SCH/VCS/SCHSEND.C_V   1.0   18 J


#includ: "schpriv.h"

/*
   scheduleLocalMsg

   inserts a msg into the local message queue

   the following fields are assumed to be set by the calling rtn
           msg->fields,origin - origin state machine or system module
           msg->fields.dest - destination state machine
           msg->fields.priority
           msg->fields.name - message name
   (See sendMsg, sendPriorityMsg, and sendSystemMsg).
*/

void scheduleLocalMsg( linkId,msg )
unsigned linkId;
MSG_T      *msg;
{
#ifdef DEBUG_SCH

  getTimeOfDay( &msg->header.schedulingTime );

#endif

  msg->header.status = IN_SCHEDULER;
  appendPQ( LocalMsgPQ, (QUEUE_ITEM_T *)msg, msg->fields.priority );

  return;
}


/*
  sendMsg
  sendPriorityMsg
  sendSyetemMsg

These three routines are variations on the same "sbedMsg" concept. The th
of them will receive a msg and pass it to routeMsg to be routed and
delivered to its destination.

sendMsg sets the message priority to NORMAL and the message origin to the
current state machines. This should be the prefered routine to send messa
from state Machines.

 sendPriorityMessage allows to send a message with a priority other than
 NORMAL.

 send SystemMessage allows to send message with any priority, destination
 and origin. This routine can be used to "pass" messages from one state
 machine to another without altering the original origin field. Also
 this routine shall be used from the communication subsystem to send
 message without altering their priority or origin.
*/
```

```
void sendMsg( msg )

MSG_T       *msg;
{
  msg->fields.priority = NORMAL_PRIORITY;
  msg->fields.origin = currentSM;
  routeMsg(msg);
}

void sendPriorityMsg (msg)
MSG_T       *msg;
{
  msg->fields.origin = currentSM;
  routeMsg(msg);
}

void sendSystemMsg(msg)
MSG_T       *msg;
{
  routeMsg(msg);
}


### schsmint.c ###

/*

$Workfile:   schsmint.c  $
$Revision:   1.0  $
$Date:   18 Jun 1990 22:43:04   $

$Log:   D:/USR/KERN/SCH/VCS/SCHSMINT.C_V  $
 *
 *    Rev 1.0   18 Jun 1990 22:43:04   JLastra
 * Initial revision.

*/


static char *vscId="$Header:   D:/USR/KERN/SCH/VCS/SCHSMINT.C_V   1.0   18


#include "schpriv.h"

/*
   state machine initialization routines

   sm init sends an "INITIALIZE" message to each state machine
   on startup or reset
*/

void smInit( startCondition )
unsigned startCondition;

{
   SM_NAME_T        smNumber;


   for (    smNumber = (SM_NAME_T) 0;
            smNumber < numOfStateMachines;
            smNumber++ )
   {
            SM_INIT_MSG_T              *msg;
            MSG_FIELD_T                *fields;
            if ( smAllocationTable[smNumber] == myNodeId ) {
              if ( (msg = (SM_INIT_MSG_T *) msgAlloc(sizeof(startCondition))
                return;
```

```
StateMachines[smNumber]->state=0;
fields = &msg->msgData.fields;

fields->origin = SYSTEM_SCHEDULER;
fields->dest = smNumber;
fields->priority = HIGH_PRIORITY;
fields->name = SM_INITIALIZE;
fields->infoSize = sizeof(startCondition);
msg->startCondition = startCondition;

sendSystemMsg( (MSG_T *)msg );


            }
        }
}


### schsterr.c ###

/*

$Workfile:   schsterr.c  $
$Revision:   1.0  $
$Date:   18 Jun 1990 22:43:08   $

$Log:   D:/USR/KERN/SCH/VCS/SCHSTERR.C_V  $
 *
 *    Rev 1.0   18 Jun 1990 22:43:08   JLastra
 * Initial revision.

*/


static char *vscId="$Header:   D:/USR/KERN/SCH/VCS/SCHSTERR.C_V   1.0   18

#include "schpriv.h"


SM_STATE_T ignoreMsg (msg, self)
MSG_T *msg;
SM_DESCRIPTOR_T *self;
{
   return (SAME_STATE);
}


SM_STATE_T stateError (msg, self)
MSG_T *msg;
SM_DESCRIPTOR_T *self;
{

       setError(   E_UNKNOWN_TRANSITION,
                   msg->fields.dest,
                   self->state,
                   msg->fields.name );


   return(SAME_STATE);
};

### schtst.c ###

#include "rts.h"

main()
```

```
{
   rtssRun();
}

/******* Some Stubs **********/

void disableInterrupts()
{
}

void enableInterrupts()
{
}

void getTimeOfDay( timeVar )
TIME_T *timeVar;
{

### serglob.c ###

/*

$Workfile:   serglob.c  $
$Revision:   1.0  $
$Date:   18 Jun 1990 23:21:16  $

$Log:   D:/USR/KERN/SER/VCS/SERGLOB.C_V  $
 *
 *    Rev 1.0   18 Jun 1990 23:21:16   JLastra
 * Initial revision.

*/


static char *vscId="$Header:   D:/USR/KERN/SER/VCS/SERGLOB.C_V   1.0   18 J


#define DO_ser
#include "serpriv.h"

### serhand.c ###

/*

$Workfile:   serhand.c  $
$Revision:   1.5  $
$Date:   04 Aug 1990 13:02:06  $

$Log:   D:/USR/KERN/SER/VCS/SERHAND.C_V  $
 *
 *    Rev 1.5   04 Aug 1990 13:02:06   JLastra
 * Added support for application specific error codes and for warnings.
 *
 *
 *    Rev 1.4   02 Aug 1990 20:34:50   JLastra
 * Fix missnaming of getSmLabel.
 *
 *
 *    Rev 1.3   02 Aug 1990 20:20:12   JLastra
 * Added system state dump on error.
 *
 *
 *    Rev 1.2   19 Jun 1990 00:12:18   JLastra
 * DEBUG_SER Defined. Error messages are built into the system only in debu
 * i.e. with DEBUG_SER defined.
 *
```

```
 *    Rev 1.1   18 Jun 1990 23:35:02   JLastra
 * Fix proper declaration for longjmp.
 *
 *
 *    Rev 1.0   18 Jun 1990 23:21:18   JLastra
 * Initial revision.

*/


static char *vscId="$Header: D:/USR/KERN/SER/VCS/SERHAND.C_V   1.5   04 A


#include "serpriv.h"

printErrMsg(definition,args)
ERROR_DEFINITION *definition;
char                 *args[];
{
   printf( definition->errorString,
           args[0], args[1], args[2],
           args[3], args[4], args[5],
           args[6], args[7], args[8], args[9] );
   printf( "\n");
}


static int systemErrorHandler( errorNumber, args )

int                 errorNumber;

char                *args[];
{

   ERROR_DEFINITION         *definition;

   for ( definition = SystemErrorTable; definition->errorNumber != 0;
   definition++ )
           if ( definition->errorNumber == errorNumber ) {
                   printErrMsg(definition,args);
                   break;
           }

   if ( definition->errorNumber == 0 )
           for ( definition = ApplicationErrorTable; definition->errorNumbe
   definition++ )
           if ( definition->errorNumber == errorNumber ){
                   printErrMsg(definition,args);
                   break;
           }

   if ( definition->errorNumber == 0 )
           printf("Error %d. No error description available.\n",errorNumber

   if ( currentSM <= (unsigned)(~0-50)){
           printf("Current state machine: %s\n",getSmLabel(currentSM));
           printf("Current state        : %s\n",getStateLabel(currentSM,cur
           printf("Current message      : %s\n",getMsgLabel(currentMsg->fie
           printf("Current msg origin   : %s\n",getSmLabel(currentMsg->fiel
   }
}


void setError( va_alist )
va_dcl
{
```

```
        va_list         pvar;
        int             errorNumber;
        char            *argv[10];
        int             argc;

        disableInterrupts();

        va_start(pvar);
        errorNumber = va_arg(pvar,int);
        for ( argc = 0; argc < 10; argc++ )
                argv[argc] = va_arg(pvar,char *);
        va_end(pvar);

        systemErrorHandler(errorNumber,argv);

   printf("\n\n");
   printf("Saved messages:\n\n");
   showPastMsg();

#ifdef DEBUG_SER
   abort();
#else
/*
  Warm start with lngjmp does not work with TCP sockets, the task
  has to exit and then cold started by a parent task
*/
   longjmp(*warmStartVector,errorNumber);
#endif

}

void setWarning( va_alist )
va_dcl
{
        va_list         pvar;
        int             errorNumber;
        char            *argv[10];
        int             argc;

        disableInterrupts();

        va_start(pvar);
        errorNumber = va_arg(pvar,int);
        for ( argc = 0; argc < 10; argc++ )
                argv[argc] = va_arg(pvar,char *);
        va_end(pvar);

        systemErrorHandler(errorNumber,argv);
   enableInterrupts();
}


void errorHandlerInit(startCondition, warmStartEnv)
unsigned startCondition ;
jmp_buf warmStartEnv;

{
  warmStartVector= (jmp_buf *)warmStartEnv;
}

### sertst.c ###
/*

$Workfile:   sertst.c  $
$Revision:   1.0  $
$Date:   18 Jun 1990 23:21:24   $
```

```
$Log:   D:/USR/KERN/SER/VCS/SERTST.C_V  $
 *
 *    Rev 1.0   18 Jun 1990 23:21:24   JLastra
 * Initial revision.

 */


static char *vscId="$Header: D:/USR/KERN/SER/VCS/SERTST.C_V   1.0   18 Ju

#include "ser.h"

jmp_buf warmStartEnv;
unsigned startCondition;

main()
{

   int jmpval;

   /* Warm start entry point */

   if ( (jmpval=setjmp(warmStartEnv)) == 0 ) {
           startCondition = E_NORMAL_START ;    /* system cold statrt */
           printf("sertst: System normal cold start\n");
   }
   else {
           startCondition = jmpval;
           printf("sertst: System restart after error\n");
           if ( startCondition == E_TASK_QUEUE_OVERFLOW){
                   printf("sertst: Test completed\n");
                   exit(1);
           }
   }

   errorHandlerInit   (startCondition, warmStartEnv);

   if ( startCondition == E_NORMAL_START)
           setError (2);
   else
           setError (E_TASK_QUEUE_OVERFLOW, __FILE__, __LINE__);

}


/******* Some Stubs *********/

void disableInterrupts()
{
}

### opcnstp.c ###


/*****************************************************************/
/*                   Auxiliary  procedures                       */
/*****************************************************************/

void sendConsole(ttyAddr,str)
char *str;
{
   TTY_OUT_M *ttyMsg;
```

```
   if ( ttyAddr == LOCAL_TTY )
           printf(str);
   else {
           ttyMsg= (TTY_OUT_M *) msgAlloc ( sizeof(TTY_OUT_M)
                                          - sizeof (MSG_T)
                                          + strlen(str));
           ttyMsg->msgData.fields.dest = extFrameHandler;
           ttyMsg->msgData.fields.priority = NORMAL_PRIORITY;
           ttyMsg->msgData.fields.name = TTY_OUT_M;
           ttyMsg->ttyAddr = ttyAddr;
           strcpy(&(ttyMsg->ttyData),str);
           sendMsg((MSG_T *)ttyMsg);
           }
   }
}

static void newCmdMsg(self)
SM_DESCRIPTOR_T *self;
{
   self->data.opCmd = (OP_CMD_M *)msgAlloc( OP_CMD_BUFFER_SIZE);
   self->data.cmdIn = 0;
}

static void parse_line(self)
SM_DESCRIPTOR_T *self;
{

   OP_CMD_M *opCmd;
   char      *cmdBuf;

   opCmd = self->data.opCmd;

   opCmd->msgData.dest=extFrameHandler;
   opCmd->msgData.name=op_cmd_m;
   opCmd->msgData.origin=currentSM;
   opCmd->msgData.priority=NORMAL_PRIORITY;
   cmdBuf=&(opCmd->msgData.string);
   cmdBuf[self->data.cmdIn]='\0';
   sendMsg((MSG_T *)opCmd);

   newCmdMsg(self);

}

static void accCh(self,ch)
SM_DESCRIPTOR_T *self;
char ch;
{

  if ( self->data.cmdIn == OP_CMD_BUFFER_SIZE -1 ){
       sendConsole(self->data.ttyConsole,"Error: Command too long\n")
       self->data.cndIn=0;
  } else {
       char *cmdbuf;
       cmdBuf=&(self->data.opCmd->string);
       cmdBuf[self->data.cmdIn++]=ch;
  }

}

static void delCh(self)
SM_DESCRIPTOR_T *self;
{
```

```
  if ( self->data.cmdIn != 0 ) {
     sendConsole(self->data.ttyConsole,delSequence);
     self->data.cmdIn--;
  }
}


/*****************************************************************/
/*                    Transition procedures                      */
/*****************************************************************/


static SM_STATE_T powerOn  (msg, self)
MSG_T *msg;
SM_DESCRIPTOR_T *self;
{

   self->data.opCmd = NULL;
   self->data.ttyConsole = NO_CONSOLE;
   self->data.ttyConnect = NO_CONNECT;

   return( IDLE );
};


static SM_STATE_T cnsOpen(msg, self)
TTY_IN_M *msg;
SM_DESCRIPTOR_T *self;
{

   self->data.ttyConsole = msg->ttyAddr;

   self->data.ttyConnect = NO_CONNECT;
   self->data.timer=startTimer(tty_timeout_m, CONSOLE_TIMEOUT );

   newCmdMsg(self);

   sendConsole(self->data.ttyConsole, consoleSignOn);
   sendConsole(self->data.ttyConsole, consolePrompt);

   return(editIn(msg, self));
}


static SM_STATE_T editIn(msg, self)
TTY_IN_M *msg;
SM_DESCRIPTOR_T *self;
{
   char  ch, *str;
   unsigned cc;

   restartTimer(self->data.timer);

   str = &(msg->ttyString);

   for ( cc = 0 ; cc < strlen(str); cc++){
           ch = str[cc];

           switch( ( ch ) {
           case '\r' :
           case '\n' : putch(ch);
```

```
                    parse_line(self);
                    break;
            case DECL_CHAR :
                    delChar(self);
                    break;
            default:
                    accChar(self,ch);
            }
        }

   return(SAME_STATE);
}


static SM_STATE_T passTty(msg, self)
TTY_IN_M *msg;
SM_DESCRIPTOR_T *self;
{
   return(SAME_STATE);
}

static SM_STATE_T closeCns(msg, self)
TTY_IN_M *msg;

SM_DESCRIPTOR_T *self;
{
   return(SAME_STATE);
}

### opcons.c ###

/*****************************************************************/
/*        State machines configuration preamble.          */
/*****************************************************************/




#        include "rts.h"
#        include "damlmsg.h"
#        include "damlcnf.h"

extern QUEUE_T *SaveQueue;

#define NO_CONNECT ~0
#define NO_CONSOLE ~0
#define CONSOLE_TIMEOUT 15000
#define CONNEXT_TIMEOUT 15000

#define OP_CMD_BUFFER_SIZE 80
#define DEL_CHAR  (char)0x08      /* Use ctl-H as delete char. */


static char  *consoleSignOn= "\n\nDAML Operator Console\nRaychem Corp. 1990
static char *consolePrompt= ">> ";
static char delSequence[4]= { DEL_CHAR, ' ', DEL_CHAR, '\0' };


/*****************************************************************/
/*        State machines configuration.          */
/*****************************************************************/
```

```
/***************************************************************/
/*        State Machine data structure declaration        */
/***************************************************************/


typedef struct {

             OP_CMD_M                *opCmd;
             unsigned                cmdIn;
                  unsigned           ttyConsole;
                  unsigned           ttyConnect;
             TIMER_T                 *timer;


} OP_CONS_DATA_T ;


static OP_CONS_DATA_T op_console_smData ;




/***************************************************************/
/*        States declarations       */
/***************************************************************/


#define NUM_OF_STATES 3

#define             CMD_MODE 0
#define         CONNECT_MODE 1
#define                 IDLE 2


static char *stateNames[NUM_OF_STATES]={
                                          "CMD_MODE",
                                          "CONNECT_MODE",
                                          "IDLE"
                                         };



/***************************************************************/
/*        Input Messages declarations       */
/***************************************************************/


#define NUM_OF_MESSAGES 6

static MSG_NAME_T msgList[NUM_OF_MESSAGES] = {
                                          cns_disconnect_m,
                                          op_out_m,
                                          sm_initialize_m,
                                          tty_connect_m,
                                          tty_in_m,
                                          tty_timeout_m
                                         };



/***************************************************************/
/*        Transition Procedures declarations        */
/***************************************************************/
```

```
extern SM_STATE_T             cnsClose (MSG_T *, SM_DESCRIPTOR_T *);
extern SM_STATE_T              cnsOpen (MSG_T *, SM_DESCRIPTOR_T *);
extern SM_STATE_T              connect (MSG_T *, SM_DESCRIPTOR_T *);
extern SM_STATE_T               editIn (MSG_T *, SM_DESCRIPTOR_T *);
extern SM_STATE_T            ignoreMsg (MSG_T *, SM_DESCRIPTOR_T *);
extern SM_STATE_T              passTty (MSG_T *, SM_DESCRIPTOR_T *);
extern SM_STATE_T              powerOn (MSG_T *, SM_DESCRIPTOR_T *);
extern SM_STATE_T             putLocal (MSG_T *, SM_DESCRIPTOR_T *);
extern SM_STATE_T               putTty (MSG_T *, SM_DESCRIPTOR_T *);
extern SM_STATE_T           stateError (MSG_T *, SM_DESCRIPTOR_T *);


/*******************************************************************/
/*          States transition matrix declaration          */
/*******************************************************************/


static SM_STATE_T (*transMatrix[NUM_OF_STATES * NUM_OF_MESSAGES])()={


 /*                CMD_MODE     cns_disconnect_m */ cnsClose,
 /*                                     op_out_m */ putTty,
 /*                              sm_initialize_m */ powerOn,
 /*                                tty_connect_m */ connect,
 /*                                     tty_in_m */ editIn,
 /*                                tty_timeout_m */ cnsClose,

 /*            CONNECT_MODE     cns_disconnect_m */ cnsClose,
 /*                                     op_out_m */ putTty,
 /*                              sm_initialize_m */ powerOn,
 /*                                tty_connect_m */ stateError,
 /*                                     tty_in_m */ passTty,
 /*                                tty_timeout_m */ cnsClose,

 /*                    IDLE     cns_disconnect_m */ ignoreMsg,
 /*                                     op_out_m */ putLocal,
 /*                              sm_initialize_m */ powerOn,
 /*                                tty_connect_m */ stateError,
 /*                                     tty_in_m */ cnsOpen,
 /*                                tty_timeout_m */ ignoreMsg
                                                                  };


/*******************************************************************/
/*          State machine Descriptors Declarations          */
/*******************************************************************/


SM_DESCRIPTOR_T op_console_smDescr ={
/*   Name                */ "op_console_sm",
/*   Data                */ (char *) &op_console_smData,
/*   Current State       */ CMD_MODE,
/*   Number of States    */ NUM_OF_STATES,
/*   States Names List   */ stateNames,
/*   Number of Messages  */ NUM_OF_MESSAGES,
/*   Messages List       */ msgList,
/*   Transition Matrix   */ transMatrix
                            };


/*******************************************************************/
/*          State machines code.       */
/*******************************************************************/
```

```
/*****************************************************************/
/*                    Auxiliary  procedures                      */
/*****************************************************************/

void sendConsole(ttyAddr,str)
char *str;
{
   TTY_OUT_M *ttyMsg;

   if ( ttyAddr == LOCAL_TTY )
           printf(str);
   else {
           ttyMsg= (TTY_OUT_M *) msgAlloc ( sizeof(TTY_OUT_M)
                                          - sizeof (MSG_T)
                                          + strlen(str));
           ttyMsg->msgData.fields.dest = extFrameHandler;
           ttyMsg->msgData.fields.priority = NORMAL_PRIORITY;
           ttyMsg->msgData.fields.name = tty_out_m;
           ttyMsg->ttyAddress = ttyAddr;
           strcpy(&(ttyMsg->ttyString),str);
           sendMsg((MSG_T *)ttyMsg);
   }
}


static void newCmdMsg(self)
SM_DESCRIPTOR_T *self;
{
   OP_CONS_DATA_T *myData;

   myData= (OP_CONS_DATA_T *)self->data;
   myData->opCmd = (OP_CMD_M *)msgAlloc( OP_CMD_BUFFER_SIZE);
   myData->cmdIn = 0;
}


static void parse_line(self)
SM_DESCRIPTOR_T *self;
{

   OP_CMD_M *opCmd;
   char     *cmdBuf;
   OP_CONS_DATA_T *myData;
   myData= (OP_CONS_DATA_T *)self->data;

   opCmd = myData->opCmd;

   opCmd->msgData.fields.dest=extFrameHandler;
   opCmd->msgData.fields.name=op_cmd_m;
   opCmd->msgData.fields.origin=currentSM;
   opCmd->msgData.fields.priority=NORMAL_PRIORITY;
   cmdBuf=&(opCmd->string);
   cmdBuf[myData->cmdIn]='\0';
   sendMsg((MSG_T *)opCmd);

   newCmdMsg(self);

}

static void accCh(self,ch)
SM_DESCRIPTOR_T *self;
char ch;
{

  OP_CONS_DATA_T *myData;

  myData= (OP_CONS_DATA_T *)self->data;
```

```
  if ( myData->cmdIn == OP_CMD_BUFFER_SIZE -1 ){
      sendConsole(myData->ttyConsole,"Error: Command too long\n");
      myData->cmdIn=0;
  } else {
      char *cmdBuf;
      cmdBuf=&(myData->opCmd->string);
      cmdBuf[myData->cmdIn++]=ch;
  }

}

static void delCh(self)
SM_DESCRIPTOR_T *self;
{
  OP_CONS_DATA_T *myData;

  myData= (OP_CONS_DATA_T *)self->data;

  if ( myData->cmdIn != 0 ) {
     sendConsole(myData->ttyConsole,delSequence);
     myData->cmdIn--;
  }
}

/*********************************************************************/
/*                    Transition procedures                          */
/*********************************************************************/

static SM_STATE_T powerOn  (msg, self)
MSG_T *msg;
SM_DESCRIPTOR_T *self;
{
   OP_CONS_DATA_T *myData;

   myData= (OP_CONS_DATA_T *)self->data;

   myData->opCmd = NULL;
   myData->ttyConsole = NO_CONSOLE;
   myData->ttyConnect = NO_CONNECT;

   return( IDLE );
};


static SM_STATE_T editIn(msg, self)
TTY_IN_M *msg;
SM_DESCRIPTOR_T *self;
{
   char  ch, *str;
   unsigned cc;
   OP_CONS_DATA_T *myData;

   myData= (OP_CONS_DATA_T *)self->data;

   restartTimer(myData->timer);

   str = &(msg->ttyString);

   for ( cc = 0 ; cc < strlen(str); cc++){
           ch = str[cc];

           switch ( ch ) {
           case '\r' :
           case '\n' : putch(ch);
                       parse_line(self);
                       break;
```

```
          case DECL_CHAR :
                    delChar(self);
                    break;
          default:
                    accChar(self,ch);
          }
        }

   return(SAME_STATE);
}

static SM_STATE_T cnsOpen(msg, self)
TTY_IN_M *msg;
SM_DESCRIPTOR_T *self;
{
   OP_CONS_DATA_T *myData;

   myData= (OP_CONS_DATA_T *)self->data;

   myData->ttyConsole = msg->ttyAddress;
   myData->ttyConnect = NO_CONNECT;
   myData->timer=(TIMER_T *)startTimer(tty_timeout_m, CONSOLE_TIMEOUT );

   newCmdMsg(self);

   sendConsole(myData->ttyConsole, consoleSignOn);
   sendConsole(myData->ttyConsole, consolePrompt);

   return(editIn(msg, self));
}



static SM_STATE_T passTty(msg, self)
TTY_IN_M *msg;
SM_DESCRIPTOR_T *self;
{
   return(SAME_STATE);
}

static SM_STATE_T closeCns(msg, self)
TTY_IN_M *msg;
SM_DESCRIPTOR_T *self;
{
   return(SAME_STATE);
}
/*

$Workfile:   timcancl.c  $
$Revision:   1.0  $
$Date:   18 Jun 1990 23:42:44   $

$Log:   D:/USR/KERN/TIM/VCS/TIMCANCL.C_V  $
 *
 *    Rev 1.0   18 Jun 1990 23:42:44   JLastra
 * Initial revision.

*/


static char *vscId="$Header:   D:/USR/KERN/TIM/VCS/TIMCANCL.C_V   1.0   18

#include "timpriv.h"
```

```
void cancelTimer(timerMsg )

TIMER_MSG_T                    *timerMsg;
{

        if ( timerMsg == NULL )
      return;

        disableInterrupts();
   if ( timerMsg->msgData.header.status != IN_TIMER )
   {
           enableInterrupts();
           cancelMsg( (MSG_T *)timerMsg );
           return;
   }


   if ( itemInQueue( ThisCycleQueue, (QUEUE_ITEM_T *)timerMsg ) == BTRUE )
   {
           removeQueue( ThisCycleQueue, (QUEUE_ITEM_T *)timerMsg );
           timerMsg->msgData.header.status = CANCELED;
           msgFree( timerMsg );
   }
   else if ( itemInQueue( NextCycleQueue, (QUEUE_ITEM_T*) timerMsg ) == BTR
   {
           removeQueue( NextCycleQueue, (QUEUE_ITEM_T *)timerMsg );
           timerMsg->msgData.header.status = CANCELED;
           msgFree( timerMsg );
   }
   enableInterrupts();
   return;
}
/*

$Workfile:   timdotim.c  $
$Revision:   1.0  $
$Date:   18 Jun 1990 23:42:46  $

$Log:   D:/USR/KERN/TIM/VCS/TIMDOTIM.C_V  $
 *
 *    Rev 1.0   18 Jun 1990 23:42:46   JLastra
 * Initial revision.

*/


static char *vscId="$Header:   D:/USR/KERN/TIM/VCS/TIMDOTIM.C_V   1.0   18


#include "timpriv.h"


void doTimers()
{
   TIMER_MSG_T      *timerMsg, *nextMsg;

   if ( ClicksCount < MAX_TIMER_CLICKS )
           ClicksCount++;
   else
   {
           QUEUE_T          *hold;

           hold = ThisCycleQueue;
           ThisCycleQueue = NextCycleQueue;
           NextCycleQueue = hold;
           ClicksCount = 0;
   }
```

```
  for (   timerMsg = (TIMER_MSG_T *) findFirstQueue(ThisCycleQueue);
          timerMsg != NULL && timerMsg->timerData.expirationTime <= Clicks
          timerMsg = nextMsg )
  {
          nextMsg = (TIMER_MSG_T *) findNextQueue( ThisCycleQueue, (QUEUE_

          removeQueue( ThisCycleQueue, (QUEUE_ITEM_T *)timerMsg );
          sendSystemMsg( (MSG_T *)timerMsg );
  }
}

/*

$Workfile:   timglob.c  $
$Revision:   1.0  $
$Date:   18 Jun 1990 23:42:50   $

$Log:   D:/USR/KERN/TIM/VCS/TIMGLOB.C_V  $
 *
 *    Rev 1.0   18 Jun 1990 23:42:50   JLastra
 * Initial revision.

*/


static char *vscId="$Header:   D:/USR/KERN/TIM/VCS/TIMGLOB.C_V   1.0   18 J


#define DO_tim
#include "timpriv.h"

/*

$Workfile:   timinit.c  $
$Revision:   1.0  $
$Date:   18 Jun 1990 23:42:52   $

$Log:   D:/USR/KERN/TIM/VCS/TIMINIT.C_V  $
 *
 *    Rev 1.0   18 Jun 1990 23:42:52   JLastra
 * Initial revision.

*/


static char *vscId="$Header:   D:/USR/KERN/TIM/VCS/TIMINIT.C_V   1.0   18 J


#include "timpriv.h"

void timersInit(startCondition)
int startCondition;
{
        ThisCycleQueue = &q1;
   NextCycleQueue = &q2;

   initQueue( NextCycleQueue );
   initQueue( ThisCycleQueue );
   ClicksCount = 0;
}

/*

$Workfile:   timinsrt.c  $
$Revision:   1.1  $
$Date:   27 Jun 1990 11:45:46   $
```

```
$Log:   D:/USR/KERN/TIM/VCS/TIMINSRT.C_V   $
 *
 *    Rev 1.1   27 Jun 1990 11:45:46   JLastra
 * Change to unsigned long arithmetic.
 *
 *    Rev 1.0   18 Jun 1990 23:42:56   JLastra
 * Initial revision.

*/

static char *vscId="$Header:   D:/USR/KERN/TIM/VCS/TIMINSRT.C_V   1.1   27

#include "timpriv.h"

void insertTimer( timerQueue, timerMsg )

QUEUE_T             *timerQueue;
TIMER_MSG_T         *timerMsg;
{
   TIMER_MSG_T      *item;
   unsigned long    expirationTime;

   expirationTime = timerMsg->timerData.expirationTime;

   for (     item = (TIMER_MSG_T *) findFirstQueue( timerQueue );
             item != NULL;
             item = (TIMER_MSG_T *) findNextQueue(timerQueue, (QUEUE_ITEM_T *
             if ( expirationTime < item->timerData.expirationTime )
             {
                     insertBeforeQueue( timerQueue, (QUEUE_ITEM_T *)item, (QU
                     return;
             }

   appendQueue( timerQueue, (QUEUE_ITEM_T *)timerMsg );
}
/*

$Workfile:   timstart.c  $
$Revision:   1.2  $
$Date:   27 Jun 1990 11:46:06   $

$Log:   D:/USR/KERN/TIM/VCS/TIMSTART.C_V   $
 *
 *    Rev 1.2   27 Jun 1990 11:46:06   JLastra
 * Change to unsigned long arithmetic.
 *
 *
 *    Rev 1.1   26 Jun 1990 01:35:42   JLastra
 * Arithmetic fixed to prevent overflows.
 *
 *    Rev 1.0   18 Jun 1990 23:43:02   JLastra
 * Initial revision.

*/

static char *vscId="$Header:   D:/USR/KERN/TIM/VCS/TIMSTART.C_V   1.2   27

#include "timpriv.h"

TIMER_MSG_T *startTimer( timerName, duration )

MSG_NAME_T timerName;
unsigned long       duration;
{
```

```
TIMER_MSG_T      *timerMsg;
unsigned long    ticksRemaining;


timerMsg = (TIMER_MSG_T *) msgAlloc( sizeof(TIMER_T) );
timerMsg->msgData.header.status = IN_TIMER;
timerMsg->msgData.fields.dest = currentSM;
timerMsg->msgData.fields.name = timerName;
timerMsg->msgData.fields.origin= SYSTEM_TIMERS;
timerMsg->msgData.fields.priority= HARDWARE_PRIORITY;

/* scale the requested duration in msecs into RTC tick periods.*/
duration = (duration * 1000) / rtcInterval ;


disableInterrupts();

/*
        determine, modulo MAX_UNSIGNED, the
        expiration time
*/

ticksRemaining = MAX_TIMER_CLICKS - ClicksCount;

   if ( ticksRemaining >= duration )
   {
           timerMsg->timerData.expirationTime = ClicksCount + duration;
           insertTimer( ThisCycleQueue, timerMsg );
   }
   else
   {
           timerMsg->timerData.expirationTime = duration - ticksRemaining;
           insertTimer( NextCycleQueue, timerMsg );
   }
   enableInterrupts();

   return( timerMsg );
}

/*
//         Console I/O Interface Package, Version 2.00
//         Copyright (C) 1989 Ziatech Corp.  All rights reserved.
//
//         Function
//         ========
//         This module contains the device specific initializations and dev
//         driver functions.
//
//                 void            InitConsole(void) ;
//                 int             _getch(void) ;
//                 int             _putch(int) ;
*/

#include   <dos.h>                                              /* I/O p

#include   "typedefs.h"                                  /* General purpo
#include   "dosemu.h"                                           /* Int 2


/*
//         Function:  _getch
//
//         This function returns the next character received from a serial
//         device.  This function must be adapted to the target system hard
*/

int        _getch(void)
{
```

```
   return  0 ;
}


/*
//          Function:  _putch
//
//          This function must be written to copy the supplied character to
//          to a serial device.  This function must adapted to the target
//          system hardware.
//
//          This version simply writes the output to a circular buffer where
//          it can be examined by an in-circuit emulator.
*/

int         _putch(
                  int               ch
            )
{
   return  ch ;
}


/*
//          Function:       InitConsole
//
//          This function is responsible for initializing the console device
//          referenced by the Int 21h emulation package.
*/

void                InitConsole(void)
{
   return ;
}
/*
//          Microsoft C 5.10 MS-DOS Int 21h Emulation, Version 2.00
//          Copyright (C) 1989 Ziatech Corp.  All rights reserved.
//
//          Function
//          ========
//          This file contains the code for serving common MS-DOS requests f
//          the Microsoft C 5.10 run-time library.
*/

#include    <dos.h>                                                /* I/O p

#include    "typedefs.h"                                   /* General purpo
#include    "dosemu.h"                                             /* Int 2


/*
//          Function:       Int21Handler
//
//          This interrupt handler services any Int 21h calls from the appli
//          Since every application will have different requirements, the sc
//          handler will vary.  As implemented here, sufficient functionalit
//          for supporting floating point arithmetic and console I/O.
*/

void far    interrupt Int21Handler(
                        WORD            es,
                        WORD            ds,
                        WORD            di,
                        WORD            si,
                        WORD            bp,
                        WORD            sp,
                        WORD            bx,
```

```
                WORD            dx,
                WORD            cx,
                WORD            ax,
                WORD            ip,
                WORD            cs,
                WORD            psw
        )
{
   WORD            i ;
   WORD            j ;
   BYTE_PTR        pByte ;                                    /* Gener
   BYTE_PTR        cp ;
   WORD_PTR        wp ;
   int             c ;

   /* Permit interrupts while in the Int 21h emulation */
   _enable() ;

   /* Clear the carry to indicate success */
   psw &= 0xfffe ;

/* The contents of the AH register is used to determine the service */
switch (highbyte(ax))    {
        case DOS_CINPUT:
                ax = _getch() ;
                break ;

        case DOS_DIRECTIO:
                if (lowbyte(dx) == 0xff)
                        c = _getch() ;
                else
                        _putch(lowbyte(dx)) ;
                break ;

        case DOS_BUFINPUT:
                cp = (BYTE_PTR) MK_FP(ds, dx) ;
                j = *cp++ ;
                pByte = cp++ ;
                for (i = 0; i < j; )    {
                        c = _getch() ;
                        /* Check for and process backspace characters */
                        if (c == '\b' && i > 0)    {
                                _putch(c) ;
                                _putch(' ') ;
                                _putch(c) ;
                                cp-- ;
                                i-- ;
                                continue ;
                        }
                        /* Check for the end of the line */
                        if (c == '\r')    {
                                _putch(*cp++ = '\r') ;
                                _putch('\n') ;
                                *pByte = i ;
                                break ;
                        }
                        /* Put the character in the buffer and echo */
                        _putch(*cp++ = c) ;
                        i++ ;
                }
                break ;

        case DOS_SETVECTOR:
                wp = (WORD_PTR) MK_FP(0, lowbyte(ax) << 2) ;
                _disable() ;
                *wp++ = dx ;
```

```
                *wp = ds ;
                _enable() ;
                break ;

        case DOS_VERSION:
                ax = 0x0a02 ;                                   /* Simul
                break ;

        case DOS_GETVECTOR:
                wp = (WORD_PTR) MK_FP(0, lowbyte(ax) << 2) ;
                _disable() ;
                bx = *wp++ ;
                es = *wp ;
                _enable() ;
                break ;

        default:
                psw |= 1 ;
                break ;
    }

    /* Return with the carry flag indicating the state of the result */
    return ;
}


/*
//      Function:       Int07Handler
//
//      This handler needs to simply add the size of the ESC instruction
//      to the IP on the stack and return, effectively skipping the
//      instruction.  This is a necessary precaution since depending on
//      processor used, some 8087 instructions may be executed to test f
//      the presence of a coprocessor (typically a store status) and cau
//      an exception.
//
//      This support is needed by the 80C186/188 and NEC V25/V35
//      microprocessors.
*/

void    interrupt far   Int07Handler(
                        WORD            es,
                        WORD            ds,
                        WORD            di,
                        WORD            si,
                        WORD            bp,
                        WORD            sp,
                        WORD            bx,
                        WORD            dx,
                        WORD            cx,
                        WORD            ax,
                        WORD            ip,
                        WORD            cs,
                        WORD            psw
        )
{
    BYTE_PTR        pOpcode ;                                   /* Opcod

    /* Make a pointer to the opcode */
    pOpcode = (BYTE_PTR) MK_FP(cs, ip + 1) ;

    switch (*pOpcode & 0xc0)    {
        case 0x00:
                ip += ((*pOpcode & 7) == 6) ? 4 : 2 ;
                break ;
```

```
         case 0x40:
              ip += 3 ;
              break ;
         case 0x80:
              ip += 4 ;
              break ;
         case 0xc0:
              ip += 2 ;
              break ;
   }
   return ;
}


/*
//         Function:      InitInt21h
//
//         This function is responsible for initializing the Ziatech Corp
//         MS-DOS Int 21h emulation package.
//
//         Specific initializations include:
//                        DOS emulation interrupt handlers
//                        Serial console
//                        Other miscellaneous initializations
*/

void far InitInt21h(void)
{
   /* Install the interrupt handlers */
   setvect(0x21, Int21Handler) ;
   setvect(0x07, Int07Handler) ;

   /* Initialize the console hardware */
   InitConsole() ;

   /* Put any other initializations desired here */
   return ;
}
/*
//      ========== NCONIO.C ==========
//      User-customized Console I/O Interface Package, Version 2.00
//      Copyright (C) 1989 Ziatech Corporation.  All rights reserved.
//
//      Function
//      ========
//      This module contains the device specific initializations and device
//      driver functions for handling Turbo C 2.0 console I/O.
//
//              void            InitConsole(void) ;
//              int             _getch(void) ;
//              int             _putch(int) ;
//
//      These functions are called from the DOSEMU.C file for a 8250-type U
//      at base address 0x2f8 (J2 connector on the ZT 8808/09).
//
//      Note that error handling IS NOT provided in these routines!
*/

#include        <dos.h>                  /* I/O port definitions */
#include        "typedefs.h"             /* General purpose type declaration
#include        "dosemu.h"               /* Int 21h function/data prototypes

#define UARTBASE        0x02f8                   /* J2 connector on ZT 8808
#define PORT_DLABL      UARTBASE + 0             /* divisor latch */
#define PORT_DLABH      UARTBASE + 1             /* divisor latch */
#define PORT_INTEN      UARTBASE + 1             /* interrupts enable regist
#define PORT_LINEC      UARTBASE + 3             /* line control register */
#define PORT_LINST      UARTBASE + 5             /* line status register */
```

```
#define BD962           12                              /* 9600 baud */
#define BD192            6                                 /* 19200 baud */
#define WL8             0x03                            /* 8-bit word */
#define DLAB            0x80                            /* div latch access */
#define THRE            0x20                            /* transmitter hold empty *
#define DR              0x01                            /* data ready */


/*
//      Function:  _getch
//
//      This function returns the next character received from a serial
//      device.
*/

int     _getch(void)
{
        static  char    buf[] = "100\r";        /* a default return value *
        static  int     i;

        while((inp(PORT_LINST) & DR) != DR);
                for (i=0; i<4; i++)
                        {
                        disable();              /* no interrupts */
                        buf[i] = inp(UARTBASE);  /* receive the character *
                        enable();               /* interrupts back on */
                        }

        if (buf[i] == '\0')
                i = 0;
        return  buf[i++];
}


/*
//      Function:  _putch
//
//      This function must be written to copy the supplied character to
//      to a serial device.
*/

int     _putch(int      ch)                     /* ch is character to outpu
{
        while((inp(PORT_LINST) & THRE) != THRE);

   if (ch=='\n') ch='\r';
   disable();                           /* no interrupts */
   outp(UARTBASE, ch);          /* transmit the character */
   enable();                            /* interrupts back on */

        return;
}


/*
//      Function:       InitConsole
//
//      This function is responsible for initializing the console device
//      referenced by the Int 21h emulation package.  The routine initializ
//      an 8250-type UART for 9600 baud, 8 data bits, 1 stop bit, no parity
*/

void    InitConsole(void)
{
        outp(PORT_LINEC, WL8 | DLAB);
/*        outp(PORT_DLABL, (0x0ff & BD962 ));
        outp(PORT_DLABH, (0x0ff & (BD962 >> 8)));
*/
```

```
        outp(PORT_DLABL, (0x0ff & BD192 ));
        outp(PORT_DLABH, (0x0ff & (BD192 >> 8)));

   outp(PORT_LINEC, (0x7f & inp(PORT_LINEC)));
        outp(PORT_INTEN, 0);                    /* no interrupts enabled! */
        return;
}

#include <stdio.h>
#include <conio.h>
#include <stdarg.h>

extern void        far     InitInt21h(void);

int getch(){
   return(_getch());
   }

main()
{
   char c;
   long i;
   FILE *f;
   char buf[20];

#ifdef VTI
   InitInt21h();
#endif
   f=fopen("myFile","r");


   while(1){
           fprintf(f,"This comes from fprintf %d %d %d\r\n",1,2,3);
           printf("This comes rom printf %s %s\r\n","foo","faa");

           printf("\n\nType a line\n");
           cgets(buf);
           printf("This is your line from cgets : %s\n",buf);

           printf("\n\nType a character\n");
           cscanf("%c",&c);
           printf("This is your character from cscanf : %c\n",c);

           printf("\n\nType a character\n");
           c=getch();
           printf("This is your character from getch : %c\n",c);


#ifdef VTI
           outp(0x037A,inp(0x037A)^2);
           for(i=0; i < 50000; i++);
#endif
   }
}

#include <stdio.h>
#include <conio.h>
#include <stdarg.h>



FILE *fopen(s1,s2)
const char *s1;
const char *s2;
{
   static int dummy;
   return((FILE *)&dummy);
}
```

```
int printf(fmt,...)
const char *fmt;
{
   int c;
   char sbuf[200];
   va_list arg_ptr;

   va_start(arg_ptr, fmt );
   vsprintf(sbuf,fmt,arg_ptr);

   c=cprintf(sbuf);
   va_end(arg_ptr);
   return(c);
}


int sprintf(buf,fmt, ...)
char *buf;
const char *fmt;
{
   int c;
   va_list arg_ptr;

   va_start(arg_ptr, fmt );

   c=vsprintf(buf,fmt,arg_ptr);

   va_end(arg_ptr);
   return(c);
}


int fprintf(file,fmt,...)
FILE *file;
const char *fmt;
{
   int c;
   char sbuf[200];
   va_list arg_ptr;

   va_start(arg_ptr, fmt );
   vsprintf(sbuf,fmt,arg_ptr);

   c=cprintf(sbuf);

   va_end(arg_ptr);

   return(c);
}
```

APPENDIX IV

Communication Processor Code

```
#include <conio.h>
#include <stdio.h>
#include "damllit.h"
#include "zbx.h"
#include "mbx.h"
#include "zt8830.h"


/****-----------------------------------------------------------------------
*
*    Externals
*
*****----------------------------------------------------------------------*/



/****-----------------------------------------------------------------------
*
*    Globals
*
*****----------------------------------------------------------------------*/

#define MAX_FRAME_RCV_BUF_LEN    30
#define MAX_FRAME_TRN_BUF_LEN    30

#  define set_vector(inum, addr)  *((DWORD_PTR)((inum) * 4)) = ((DWORD) (addr))
#  define wrt_byte(addr, value)  *((BYTE_PTR)(addr)) = ((BYTE) (value))

typedef enum {RCV_IDLE = 0,
              RCV_BEGIN,
              RECEIVE,
              RCV_EOM,
              ABORT,
              THIRD
} RCV_STATES;

typedef enum {TRN_IDLE = 0,
              TRN_BEGIN,
              TRANSMIT,
              TRN_EOM,
              UNDERRUN
} TRN_STATES;

RCV_STATES  rcv_state, rcv_status;
TRN_STATES  trn_state;

BYTE chb_rr0_status;
WORD rcv_cnt = 0;
WORD rcv_abort = 0;
WORD rcv_bad_crc = 0;
WORD rcv_overrun = 0;
WORD trn_cnt = 0;
WORD trn_eom = 0;
WORD trn_underrun = 0;
WORD trn_underend = 0;

WORD cnt_int = 0;
WORD cnt_rcv = 0;
WORD cnt_rcv_int = 0;
WORD cnt_trn = 0;
WORD cnt_trn_end = 0;
WORD cnt_trn_int = 0;
WORD cnt_ext_int = 0;
WORD cnt_rcv_eom = 0;
WORD cnt_spc_none = 0;
WORD cnt_spc_int = 0;

FRAME_BUFF frameRcvBuffer[MAX_FRAME_RCV_BUF_LEN];
FRAME_BUFF frameTrnBuffer[MAX_FRAME_TRN_BUF_LEN];
```

```
FRAME_MSG_PTR   rcv_begin;
FRAME_MSG_PTR   trn_begin;

BYTE_PTR        rcv_ptr, rcv_end;
BYTE_PTR        trn_ptr, trn_end;

/****-----------------------------------------------------------------------
*
*    Functions
*
*****---------------------------------------------------------------------*/

/*-----------------------------------------------------------------------*/
void initFrameBuffers ()
{
int i;

   for (i = 0;  i < MAX_FRAME_RCV_BUF_LEN;  i++) {
      frameRcvBuffer[i].status = BUF_FREE;
   }

   for (i = 0;  i < MAX_FRAME_TRN_BUF_LEN;  i++) {
      frameTrnBuffer[i].status = BUF_FREE;
   }

}  /* initFrameBuffers */

/*-----------------------------------------------------------------------*/

FRAME_MSG_PTR getFreeRcvBuffer ()
{
static int index = 0;
FRAME_MSG_PTR buffer_pointer = NULL;

   if (frameRcvBuffer[index].status == BUF_FREE) {
      frameRcvBuffer[index].status = BUF_BUSY;
      buffer_pointer = (FRAME_MSG_PTR) &(frameRcvBuffer[index].buffer[0]);
      index = (index + 1) % MAX_FRAME_RCV_BUF_LEN;
   }
   return (buffer_pointer);

}  /* getFreeRcvBuffer */

/*-----------------------------------------------------------------------*/

FRAME_MSG_PTR getFreeTrnBuffer ()
{
static int index = 0;
FRAME_MSG_PTR buffer_pointer = NULL;

   if (frameTrnBuffer[index].status == BUF_FREE) {
      frameTrnBuffer[index].status = BUF_BUSY;
      buffer_pointer = (FRAME_MSG_PTR) &(frameTrnBuffer[index].buffer[0]);
      index = (index + 1) % MAX_FRAME_TRN_BUF_LEN;
   }
   return (buffer_pointer);

}  /* getFreeTrnBuffer */

/*-----------------------------------------------------------------------*/

void freeRcvBuffer (pointer)
FRAME_MSG_PTR pointer;
{
static int index = 0;

   if ((pointer == (FRAME_MSG_PTR) &(frameRcvBuffer[index].buffer[0])) &&
       (frameRcvBuffer[index].status == BUF_SEND)) {
      frameRcvBuffer[index].status = BUF_FREE;
      index = (index + 1) % MAX_FRAME_RCV_BUF_LEN;
   }
   else
      exit (120);

}  /* freeRcvBuffer */
```

```
/*------------------------------------------------------------------------*/

void freeTrnBuffer (pointer)
FRAME_MSG_PTR pointer;
{
static int index = 0;

   if ((pointer == (FRAME_MSG_PTR) &(frameTrnBuffer[index].buffer[0])) &&
       (frameTrnBuffer[index].status == BUF_SEND)) {
      frameTrnBuffer[index].status = BUF_FREE;
      index = (index + 1) % MAX_FRAME_TRN_BUF_LEN;
   }
   else
      exit (121);

}  /* freeTrnBuffer */

/*------------------------------------------------------------------------*/

FRAME_MSG_PTR getRcvFrameMsg ()
{
static int index = 0;
FRAME_MSG_PTR buffer_pointer = NULL;

   if (frameRcvBuffer[index].status == BUF_SEND) {
      buffer_pointer = (FRAME_MSG_PTR) &(frameRcvBuffer[index].buffer[0]);
      index = (index + 1) % MAX_FRAME_RCV_BUF_LEN;
   }
   return (buffer_pointer);

}  /* getRcvFrameMsg */

/*------------------------------------------------------------------------*/

FRAME_MSG_PTR getTrnFrameMsg ()
{
static int index = 0;
FRAME_MSG_PTR buffer_pointer = NULL;

   if (frameTrnBuffer[index].status == BUF_SEND) {
      buffer_pointer = (FRAME_MSG_PTR) &(frameTrnBuffer[index].buffer[0]);
      index = (index + 1) % MAX_FRAME_TRN_BUF_LEN;
   }
   return (buffer_pointer);

}  /* getTrnFrameMsg */

/*------------------------------------------------------------------------*/

void sendRcvFrameMsg (pointer)
FRAME_MSG_PTR pointer;
{
static int index = 0;

   if ((pointer == (FRAME_MSG_PTR) &(frameRcvBuffer[index].buffer[0])) &&
       (frameRcvBuffer[index].status == BUF_BUSY)) {
      frameRcvBuffer[index].status = BUF_SEND;
      index = (index + 1) % MAX_FRAME_RCV_BUF_LEN;
   }
   else
      exit (122);

} /* sendRcvFrameMsg () */

/*------------------------------------------------------------------------*/

void sendTrnFrameMsg (pointer)
FRAME_MSG_PTR pointer;
{
static int index = 0;

   if ((pointer == (FRAME_MSG_PTR) &(frameTrnBuffer[index].buffer[0])) &&
       (frameTrnBuffer[index].status == BUF_BUSY)) {
```

```
      frameTrnBuffer[index].status = BUF_SEND;
      index = (index + 1) % MAX_FRAME_TRN_BUF_LEN;
   }
   else
      exit (123);

/*
char *pointer;
{
int index;

   index = (pointer - &(frameTrnBuffer[0])) / sizeof (FRAME_BUFF);
   if (pointer == &(frameTrnBuffer[index].buffer[0])) {
      frameTrnBuffer[index].status = BUF_SEND;
   }
*/
} /* sendTrnFrameMsg () */

/*------------------------------------------------------------------------*/

void initControlRegisters ()
{

   wrt_byte (CTRL_LINT, 0x00);         /* Local Interrupts */
   wrt_byte (CTRL_LNMI, 0x00);         /* Local Non-maskable Interrupts */
   wrt_byte (CTRL_BINT, 0x00);         /* STD Bus Interrupts */
   wrt_byte (CTRL_BNMI, 0x00);         /* STD Bus Non-maskable Interrupts */
   wrt_byte (CTRL_TEST, 0x00);         /* Test */
   wrt_byte (CTRL_LLOK, 0x00);         /* Local Lock */
   wrt_byte (CTRL_TRIG, 0x00);         /* Trigger */
   wrt_byte (CTRL_LED,  0x00);         /* LED */

}  /* initControlRegisters */


/*------------------------------------------------------------------------*/

void init_MUART ()
{
#ifdef VTI
   outp (MUART_P1CRTL, 0xFF);
   outp (MUART_SIE, inp (MUART_SIE) | 0x04);  /* Set Interrupts -- EXTINT */

#else
   outp (MUART_CR1, M_CR1_MODE);          /* 8088/8086 Mode */
   outp (MUART_CR2, M_CR2_MODE);          /* System of 2.048 MHz */

   outp (MUART_CR3, M_CR3_RESET);         /* Reset all options */
   outp (MUART_CR3, M_CR3_ENABLE);        /* Nested Interrupt Enable,
                                          Interrupt Acknowledge Enable */
   outp (MUART_P1CRTL, 0xFF);             /* Set all ports for output */
   outp (MUART_SIE, M_SIE_ENABLE);        /* Set Interrupts -- EXTINT */

#endif

}  /*  init_MUART  */


/*------------------------------------------------------------------------*/

void Init_Z8530 ()
{
   outp (Z8530_AREG, ZR09);        /* Z8530 Software Reset */
   outp (Z8530_AREG, 0xC0);

   /* Channel A Initialization */
   /* modes */

/*   outp (Z8530_AREG, ZR04);
   outp (Z8530_AREG, ZAR04_MODE);

   outp (Z8530_AREG, ZR01);
   outp (Z8530_AREG, ZAR01_MODE);
```

```
   outp (Z8530_AREG, ZR02);
   outp (Z8530_AREG, ZAR02_MODE);

   outp (Z8530_AREG, ZR03);
   outp (Z8530_AREG, ZAR03_MODE);

   outp (Z8530_AREG, ZR05);
   outp (Z8530_AREG, ZAR05_MODE);

   outp (Z8530_AREG, ZR06);
   outp (Z8530_AREG, ZAR06_MODE);

   outp (Z8530_AREG, ZR07);
   outp (Z8530_AREG, ZAR07_MODE);
   outp (Z8530_AREG, ZR09);
   outp (Z8530_AREG, ZAR09_MODE);

   outp (Z8530_AREG, ZR10);
   outp (Z8530_AREG, ZAR10_MODE);

   outp (Z8530_AREG, ZR11);
   outp (Z8530_AREG, ZAR11_MODE);

   outp (Z8530_AREG, ZR12);
   outp (Z8530_AREG, ZAR12_MODE);

   outp (Z8530_AREG, ZR13);
   outp (Z8530_AREG, ZAR13_MODE);
*/
   /* enables */
/*
   outp (Z8530_AREG, ZR14);
   outp (Z8530_AREG, ZAR14_ENABLE);
*/

/*   outp (Z8530_AREG, ZR03); */       /* Receive Enable */
/*   outp (Z8530_AREG, ZAR03_ENABLE); */

/*   outp (Z8530_AREG, ZR05);  */      /* Transmit Enable */
/*   outp (Z8530_AREG, ZAR05_ENABLE); */

/*  outp (Z8530_AREG, CLR_TRN_CRC); */

   /* interrupts */

/*   outp (Z8530_AREG, ZR15); */     /* Abort & TX Underrun Interrupts */
/*   outp (Z8530_AREG, ZAR15_ENABLE); */

/*   outp (Z8530_AREG, CLR_EXT_IP); */

/*   outp (Z8530_AREG, ZR01); */
/*   outp (Z8530_AREG, ZAR01_ENABLE); */


   /* Channel B Initialization */
   /* modes */

   outp (Z8530_BREG, ZR04);
   outp (Z8530_BREG, ZBR04_MODE);

   outp (Z8530_BREG, ZR01);
   outp (Z8530_BREG, ZBR01_MODE);

   outp (Z8530_BREG, ZR02);
   outp (Z8530_BREG, ZBR02_MODE);

   outp (Z8530_BREG, ZR03);
   outp (Z8530_BREG, ZBR03_MODE);

   outp (Z8530_BREG, ZR05);
   outp (Z8530_BREG, ZBR05_MODE);

   outp (Z8530_BREG, ZR06);      /* Secondary SDLC address */
   outp (Z8530_BREG, ZBR06_MODE);
```

```
   outp (Z8530_BREG, ZR07);      /* SDLC Flag 01111110 */
   outp (Z8530_BREG, ZBR07_MODE);

   outp (Z8530_BREG, ZR09);      /* disable lower chain, no vector interrupt */
   outp (Z8530_BREG, ZBR09_MODE);

   outp (Z8530_BREG, ZR10);     /* NRZ encoding */
   outp (Z8530_BREG, ZBR10_MODE);

   outp (Z8530_BREG, ZR11);     /* RTxC output, TRxC output, */
   outp (Z8530_BREG, ZBR11_MODE);      /* TRxC = baud rate generator */

   outp (Z8530_BREG, ZR12);     /* Lower byte of baud rate constant */
   outp (Z8530_BREG, ZBR12_MODE);

   outp (Z8530_BREG, ZR13);     /* Upper byte of baud rate constant */
   outp (Z8530_BREG, ZBR13_MODE);

   /* enables */

   outp (Z8530_BREG, ZR14);
   outp (Z8530_BREG, ZBR14_ENABLE);     /* BR Generator Enable, PCLK */

   outp (Z8530_BREG, ZR03);      /* Receive Enable */
   outp (Z8530_BREG, ZBR03_ENABLE);

   outp (Z8530_BREG, ZR05);      /* Transmit Enable */
   outp (Z8530_BREG, ZBR05_ENABLE);

   outp (Z8530_BREG, CLR_TRN_CRC);      /* Reset Transmit CRC Checker */
/*   outp (Z8530_BREG, CLR_RCV_CRC); */     /* Reset Receive CRC Checker */

   /* interrupts */

   outp (Z8530_BREG, ZR15);     /* Abort & TX Underrun Interrupts */
   outp (Z8530_BREG, ZBR15_ENABLE);

   outp (Z8530_BREG, CLR_EXT_IP);      /* Reset External/Status Interrupt */
   outp (Z8530_BREG, CLR_EXT_IP);      /* Reset External/Status Interrupt */

   outp (Z8530_BREG, ZR01);
   outp (Z8530_BREG, ZBR01_ENABLE);

   outp (Z8530_BREG, ZR09);
   outp (Z8530_BREG, ZBR09_ENABLE);      /* Enable Master Interrupt */

   chb_rr0_status = (BYTE) inp (Z8530_BREG);
}


/*------------------------------------------------------------------------*/

void interrupt far Z8530_Interrupts ()
{
BYTE z8530_rr0, z8530_rr1, z8530_rr2;
static int rcv_length = 4;
static int rcv_dump;
BYTE new_status;

   _disable ();

   outp (Z8530_BREG, ZR02);
   z8530_rr2 = (BYTE) (inp (Z8530_BREG) & 0x0E);
cnt_int++;

/* Receive Data */
   if (z8530_rr2 == CHB_RCV_INT) {
      z8530_rr0 = (BYTE) inp (Z8530_BREG);

   if (z8530_rr0 & RC_READY) {
      if ((rcv_cnt < rcv_length) && (rcv_ptr != NULL)) {
         *(rcv_ptr++) = (BYTE) inp (Z8530_BDAT);
```

```
            rcv_cnt++;
            if (rcv_cnt == 3) {
               rcv_length = *(rcv_ptr-1) + 4;
               if (rcv_length > MAX_FRAME_MSG_LEN) {
                  rcv_ptr = NULL;
               }
            }
         }
         else {
            rcv_dump = (BYTE) inp (Z8530_BDAT);
         }
cnt_rcv++;
      }
cnt_rcv_int++;
   }


/* Transmit Data */
   if (z8530_rr2 == CHB_TRN_INT) {
      z8530_rr0 = (BYTE) inp (Z8530_BREG);
      if (z8530_rr0 & TX_READY) {      /* Transmitter Empty */
         if (trn_ptr < trn_end - 1) {
          outp (Z8530_BDAT, *trn_ptr);   /* Transmit Data */
          trn_ptr++;
trn_cnt++;
cnt_trn++;
         }
         else if (trn_ptr < trn_end ) {
            outp (Z8530_BDAT, *trn_ptr);   /* Transmit Data */
            trn_ptr++;
trn_cnt++;
            outp (Z8530_BREG, ZR10);
            outp (Z8530_BREG, ZBR10_CRC);          /* CRC on Underrun */
cnt_trn_end++;
         }
         else {
            outp (Z8530_BREG, CLR_TRN_IP);     /* Reset Tx Interrupt */
trn_eom++;
         }

      }
cnt_trn_int++;
   }


/* External/Status */
   if (z8530_rr2 == CHB_EXT_INT) {
      /* Check which bit change caused the interrupt */
      new_status = (BYTE) inp (Z8530_BREG);
      z8530_rr0  = new_status  ^ chb_rr0_status;

      if (z8530_rr0 & RC_ABORT) {     /* Received Abort Sequence */
        rcv_dump = (BYTE) inp (Z8530_BDAT);
        rcv_status = ABORT;
        rcv_abort++;
      }

      else if (z8530_rr0 & TX_UNDERRUN) {  /* Transmitter Underrun */
         if (trn_ptr < trn_end) {
            trn_underrun++;
            trn_ptr = (BYTE_PTR) trn_begin;   /* Transmit Again */
            outp (Z8530_BREG, ZR10);
            outp (Z8530_BREG, ZBR10_MODE);    /* Abort on Underrun */
         }
         else {
            trn_underend++;
            freeTrnBuffer (trn_begin);
            trn_state = TRN_BEGIN;
         }
         outp (Z8530_BREG, CLR_TRN_UNDERRUN);          /* Reset Tx Underrun */
         new_status &= 0xBF;                  /* Reset Tx Underrun copy */
      }

      if (z8530_rr0 & 0x3F) {
cnt_ext_int++;
      }
```

```
      outp (Z8530_BREG, CLR_EXT_IP);      /* Reset External/Status Interrupt */
      chb_rr0_status = new_status & 0xBD;  /* Reset Zero Count copy */
   }


/* Special Condition */
   if (z8530_rr2 == CHB_SPE_INT) {
      outp (Z8530_BREG, ZR01);
      z8530_rr1 = (BYTE) inp (Z8530_BREG);

      if (z8530_rr1 & RC_EOF) {            /* Received Closing Flag */
         if (z8530_rr1 & RC_BAD_CRC) {     /* Bad CRC */
            rcv_dump = (BYTE) inp (Z8530_BDAT);
            rcv_status = ABORT;
            rcv_bad_crc++;
         }
         else {
            if (rcv_ptr != NULL) {
               *(rcv_ptr++) = (BYTE) inp (Z8530_BDAT);
               sendRcvFrameMsg (rcv_begin);
               rcv_begin = getFreeRcvBuffer ();
               rcv_ptr = (BYTE_PTR) rcv_begin;
            }
            else {
               rcv_dump = (BYTE) inp (Z8530_BDAT);
               rcv_ptr  = (BYTE_PTR) rcv_begin;
            }
            rcv_length = 4;
         }
         rcv_cnt = 0;
cnt_rcv_eom++;
      }

      else if (z8530_rr1 & RC_OVERRUN) {   /* Receiver Overrun */
         rcv_dump = (BYTE) inp (Z8530_BDAT);
         rcv_ptr = NULL;
         rcv_overrun++;
      }

      else {
cnt_spc_none++;
      }

      outp (Z8530_BREG, CLR_ERROR);         /* Error Reset */
cnt_spc_int++;
   }

if (rcv_status == ABORT) {
    rcv_status = RCV_IDLE;
    rcv_cnt = 0;
    rcv_length = 4;
    rcv_ptr = (BYTE_PTR) rcv_begin;
}

    outp (Z8530_BREG, CLR_IUS);           /* Reset Highest IUS */

   _enable ();
   return;
}

/*-----------------------------------------------------------------------------*/

/*  Upon transmission of the first byte, the byte has to be transmitted
    before abort on underrun and clear idle state  is set.  */

void Transmit_Begin ()
{
   outp (Z8530_BREG, CLR_TRN_CRC);         /* Reset Tx CRC Generator */
   outp (Z8530_BDAT, *trn_ptr);    /* Transmit */
   trn_ptr++;

   _disable ();
   outp (Z8530_BREG, ZR10);
```

```
  outp (Z8530_BREG, ZBR10_MODE);              /* Abort on Underrun */
  outp (Z8530_BREG, CLR_TRN_UNDERRUN);        /* Reset Tx Underrun/EOM Latch */
  chb_rr0_status &= 0xBF;                     /* Reset Tx Underrun copy */
 _enable ();

trn_cnt++;   /* transmit counter */
}


/*---------------------------------------------------------------------------*/

void Transmit_End ()
{
  _disable ();
  outp (Z8530_BREG, ZR10);       /* Set Idle State & Flag on Underrun */
  outp (Z8530_BREG, 0x8C);
  outp (Z8530_BREG, 0xC0);        /* Reset Tx Underrun/EOM Latch */
  chb_rr0_status &= 0xBF;         /* Reset Tx Underrun copy */
  _enable ();
}


/*---------------------------------------------------------------------------*/

void Z8530_Transmitter ()
{
   switch (trn_state) {
      case TRN_BEGIN:                      /* Begin Transmission */
         trn_begin = getTrnFrameMsg ();
         if (trn_begin != NULL) {
            trn_begin->shelf_id <<= 2;
            trn_ptr = (BYTE_PTR) trn_begin;
            trn_end = trn_ptr + (trn_begin->length) + sizeof (FRAME_MSG);
            Transmit_Begin ();
            trn_state = TRANSMIT;
         }
         break;

      case TRANSMIT:                       /* Transmitting */
         break;

      default:
         break;
   }  /* end switch */

}  /* Z8530_Transmitter */



/****-----------------------------------------------------------------------
*
*    Main
*
*****---------------------------------------------------------------------*/


main ()
{
WORD i;

_disable ();

   set_vector(0x42, Z8530_Interrupts);

   initControlRegisters ();
   init_Z8530 ();
   init_MUART ();

   initFrameBuffers ();
   mboxInitialize ();

/***** Initialization for transmission *****/
```

```
   trn_begin = NULL;
   trn_ptr = (BYTE_PTR) trn_begin;
   trn_end = trn_ptr;
   trn_state = TRN_BEGIN;

/***** Initialization for reception *****/

   rcv_begin = getFreeRcvBuffer ();
   rcv_ptr   = (BYTE_PTR) rcv_begin;

_enable ();



/***** Main Loop *****/

   for ( ;  ; ) {
      Z8530_Transmitter ();
      mBoxXmit();
      mBoxRcv();
   };

}  /* main */

#define MAX_FRAME_MSG_LEN       32

   typedef struct {
      char               shelf_id;
      char               lc_id;
      char               length;
   }  FRAME_MSG;

   typedef struct {
      enum               {BUF_FREE = 0, BUF_BUSY, BUF_SEND} status;
      char               buffer [MAX_FRAME_MSG_LEN];
      unsigned           crc;
   }  FRAME_BUFF;

   typedef FRAME_MSG * FRAME_MSG_PTR;

   extern FRAME_MSG_PTR getFreeTrnBuffer ();
   extern void freeRcvBuffer (FRAME_MSG_PTR);
   extern FRAME_MSG_PTR getRcvFrameMsg ();
   extern void sendTrnFrameMsg (FRAME_MSG_PTR);


/****------------------------------------------------------------------------
*
*    Gustavo Lau
*    Evotech Microengineering Consultants, Inc.
*    Microsoft C
*    Turbo Debugger
*
*    Created:  June 16, 1990
*
*    This header contains specific data for the ZT8830 Control Registers,
*    the MUART (8256) in the ZT8830, and the Communications Board (ZBX-354)
*    connected to the SBX socket in the ZT8830.
*
*    The ZBX-354 uses the Z8530 SCC chip for the serial communications, and
*    the only function used in the MUART is its interrupt controller.
*
*
*    REVISION HISTORY
*
*    1.0      09/04/90        First Release
*
*****----------------------------------------------------------------------*/
```

```
/****----------------------------------------------------------------------
*
*    ZT8830 Control Registers
*    These Memory locations assume a RAM size of 8K
*
*****---------------------------------------------------------------------*/

#define CTRL_REGS       0x7FF8          /* Control Register Base Address */
#define CTRL_LINT       0x7FF8          /* Local Interrupts */
#define CTRL_LNMI       0x7FF8 + 1      /* Local Non-maskable Interrupts */
#define CTRL_BINT       0x7FF8 + 2      /* STD Bus Interrupts */
#define CTRL_BNMI       0x7FF8 + 3      /* STD Bus Non-maskable Interrupts */
#define CTRL_TEST       0x7FF8 + 4      /* Test */
#define CTRL_LLOK       0x7FF8 + 5      /* Local Lock */
#define CTRL_TRIG       0x7FF8 + 6      /* Trigger */
#define CTRL_LED        0x7FF8 + 7      /* LED */


/****----------------------------------------------------------------------
*
*    ZT8830 MUART -- 8256
*    These I/O locations assume 8086/8088 mode
*
*****---------------------------------------------------------------------*/

#define MUART_CR1       0x00    /* Command Register 1 */
#define MUART_CR2       0x02    /* Command Register 2 */
#define MUART_CR3       0x04    /* Command Register 3 */
#define MUART_MODE      0x06    /* Mode */
#define MUART_P1CRTL    0x08    /* Port 1 Control */
#define MUART_SIE       0x0A    /* Set Interrupt (W) - Interrupt Enable */
#define MUART_RI        0x0C    /* Interrupt Address Register (R) */
#define MUART_BUFFER    0x0E    /* Transmit Buffer (W) - Receive Buffer */
#define MUART_P1        0x10    /* Port 1 */
#define MUART_P2        0x12    /* Port 2 */
#define MUART_T1        0x14    /* Timer 1 */
#define MUART_T2        0x16    /* Timer 2 */
#define MUART_T3        0x18    /* Timer 3 */
#define MUART_T4        0x1A    /* Timer 4 */
#define MUART_T5        0x1C    /* Timer 5 */
#define MUART_STATUS    0x1E    /* Modification (W) - Status (R) */


/****----------------------------------------------------------------------
*
*    ZT8830 MUART -- 8256 Command Register 1
*
*       Bits 7-6:  Character Length for Serial Communication
*                     00:  8 bits
*                     01:  7 bits
*                     10:  6 bits
*                     11:  5 bits
*       Bits 5-4:  Stop Bit Length for Serial Communication
*                     00:  1    bit
*                     01:  1.5  bits
*                     10:  2    bits
*                     11:  0.75 bits
*       Bit 3:     Port 1 - P16 Usage
*                     0:  Regular I/O Port
*                     1:  Break Detect
*       Bit 2:     Interrupt Source for Priority Level 1
*                     0:  Timer/Counter 2 (negative edge)
*                     1:  Port 1, P17 (positive edge)
*       Bit 1:     8086-8088 Mode Enable
*                     0:  8085
*                     1:  8086-8088
*       Bit 0:     Timer Frequency Select (for the 5 timers)
*                     0:  16 kHz
*                     1:  1 kHz
*
*****---------------------------------------------------------------------*/
```

```
#define M_CR1_MODE      0x02


/****-----------------------------------------------------------------------
*
*    ZT8830 MUART -- 8256 Command Register 2
*
*       Bit 7:     Parity Enable for Serial Communication
*                     0:  Enable
*                     1:  Disable
*       Bit 6:     Even Parity for Serial Communication
*                     0:  Odd
*                     1:  Even
*       Bits 5-4:  System Clock Prescaler
*                     00:  5.120 MHz
*                     01:  3.072 MHz
*                     10:  2.048 MHz (for ZT8830)
*                     11:  1.024 MHz
*       Bit 3-0:   Baud Rate Select for Serial Communication
*                     0000:  TxC,RxC
*                     0001:  TxC/64
*                     0010:  TxC/32
*                     0011:  19.2K
*                     0100:  9600
*                     0101:  4800
*                     0110:  2400
*                     0111:  1200
*
*****----------------------------------------------------------------------*/

#define M_CR2_MODE      0x20


/****-----------------------------------------------------------------------
*
*    ZT8830 MUART -- 8256 Command Register 3
*
*       Bit 7:     Set/Reset
*                     0:  Reset
*                     1:  Set
*       Bit 6:     Receive Serial Communication Enable
*       Bit 5:     Interrupt Acknowledge Enable
*       Bit 4:     Nested Interrupt Enable
*       Bit 3:     End-Of-Interrupt
*       Bit 2:     Single Character Break
*       Bit 1:     Transmit Break
*       Bit 0:     Software Reset
*
*****----------------------------------------------------------------------*/

#define M_CR3_RESET     0x7F
#define M_CR3_ENABLE    0xA0


/****-----------------------------------------------------------------------
*
*    ZT8830 MUART -- 8256 Set Interrupts Enable
*
*       Bit 7:     Timer 5 or Port 2 Handshaking   (Lowest Priority)
*       Bit 6:     Timer 4 or Timers 2 & 4
*       Bit 5:     Transmitter Interrupt
*       Bit 4:     Receiver Interrupt
*       Bit 3:     Timer 3 or Timres 3 & 5
*       Bit 2:     External Interrupt (EXTINT)
*       Bit 1:     Timer 2 or Port 1 Interrupt
*       Bit 0:     Timer 1                         (Highest Priority)
*
*****----------------------------------------------------------------------*/

#define M_SIE_ENABLE    0x04    /* only External Interrupt is enabled */
```

```
/****-------------------------------------------------------------------------
*
*    ZT8830 SBX -- ZBX-354 -- Z8530
*    These I/O locations assume SBX mode 0
*
*****------------------------------------------------------------------------*/

#define Z8530_AREG      0x5A    /* Channel 0/A Command/Status Register */
#define Z8530_ADAT      0x5B    /* Channel 0/A Transmit/Receive Buffer */
#define Z8530_BREG      0x58    /* Channel 1/B Command/Status Register */
#define Z8530_BDAT      0x59    /* Channel 1/B Transmit/Receive Buffer */
#define Z8530_CB        0x60    /* Write to enable; Read to disable */


/****-------------------------------------------------------------------------
*
*    Z8530 Read Register 0, External/Status Interrupt
*
*****------------------------------------------------------------------------*/

#define RC_ABORT        0x80    /* Bit 7 */
#define TX_UNDERRUN     0x40    /* Bit 6 */
#define TX_READY        0x04    /* Bit 2 */
#define RC_READY        0x01    /* Bit 0 */


/****-------------------------------------------------------------------------
*
*    Z8530 Read Register 1, Special Condition Interrupt
*
*****------------------------------------------------------------------------*/

#define RC_EOF          0x80    /* Bit 7, Receive End of Frame */
#define RC_BAD_CRC      0x40    /* Bit 6, Receive Bad CRC */
#define RC_OVERRUN      0x20    /* Bit 5, Receive Overrun */


/****-------------------------------------------------------------------------
*
*    Z8530 Read Register 2, Interrupt Sources when Status High/Low = 0
*                           Should be read from Channel B only
*
*****------------------------------------------------------------------------*/

#define CHB_TRN_INT     0x00    /* Channel B Transmit Interrupt */
#define CHB_EXT_INT     0x02    /* Channel B External Interrupt */
#define CHB_RCV_INT     0x04    /* Channel B Receive Interrupt */
#define CHB_SPE_INT     0x06    /* Channel B Special Interrupt */
#define CHA_TRN_INT     0x08    /* Channel A Transmit Interrupt */
#define CHA_EXT_INT     0x0A    /* Channel A External Interrupt */
#define CHA_RCV_INT     0x0C    /* Channel A Receive Interrupt */
#define CHA_SPE_INT     0x0E    /* Channel A Special Interrupt */


/****-------------------------------------------------------------------------
*
*    Z8530 Read Register 3, Interrupt Pending
*                           Should be read from Channel A only
*
*****------------------------------------------------------------------------*/

#define CHB_TRN_IP      0x01    /* Bit 0, Channel B External/Status */
#define CHB_EXT_IP      0x02    /* Bit 1, Channel B Transmit */
#define CHB_RCV_IP      0x04    /* Bit 2, Channel B Receive */
#define CHA_TRN_IP      0x08    /* Bit 3, Channel A External/Status */
#define CHA_EXT_IP      0x10    /* Bit 4, Channel A Transmit */
#define CHA_RCV_IP      0x20    /* Bit 5, Channel A Receive */
```

```
/****-------------------------------------------------------------------
*
*    Z8530 Write Register 0, Command Register
*       Bits 7-6:  CRC Reset Codes
*                       00:  Null Code
*                       01:  Reset Receive CRC Checker
*                       10:  Reset Transmit CRC Generator
*                       11:  Reset Transmit Underrun/EOM Latch
*       Bits 5-3:  Command Codes
*                       000:  Null Command
*                       001:  Point High
*                       010:  Reset External/Status Interrupt
*                       011:  Send Abort
*                       100:  Enable Interrupt on Next Rx Char
*                       101:  Reset Tx Interrupt Pending
*                       110:  Reset Error
*                       111:  Reset Highest IUS
*       Bits 2-0:  Register Selection
*
*****-------------------------------------------------------------------*/

/* Bits 7 - 6, CRC Reset Codes */

#define CLR_RCV_CRC              0x40    /* Reset Receive CRC Checker */
#define CLR_TRN_CRC              0x80    /* Reset Transmit CRC Generator */
#define CLR_TRN_UNDERRUN         0xC0    /* Reset Transmit Underrun/EOM Latch */

/* Bits 5 - 3, Command Codes */

#define CLR_EXT_IP       0x10    /* Reset External/Status Interrupt */
#define SEND_ABORT       0x18    /* Send Abort */
#define CLR_TRN_IP       0x28    /* Reset Tx Interrupt Pending */
#define CLR_ERROR        0x30    /* Reset Error */
#define CLR_IUS          0x38    /* Reset Highest IUS */

/* Bits 3 - 0, Register Selection Code */

#define ZR00             0x00    /* Z8530 Register 0 */
#define ZR01             0x01    /* Z8530 Register 1 */
#define ZR02             0x02    /* Z8530 Register 2 */
#define ZR03             0x03    /* Z8530 Register 3 */
#define ZR04             0x04    /* Z8530 Register 4 */
#define ZR05             0x05    /* Z8530 Register 5 */
#define ZR06             0x06    /* Z8530 Register 6 */
#define ZR07             0x07    /* Z8530 Register 7 */
#define ZR08             0x08    /* Z8530 Register 8 */
#define ZR09             0x09    /* Z8530 Register 9 */
#define ZR10             0x0A    /* Z8530 Register 10 */
#define ZR11             0x0B    /* Z8530 Register 11 */
#define ZR12             0x0C    /* Z8530 Register 12 */
#define ZR13             0x0D    /* Z8530 Register 13 */
#define ZR14             0x0E    /* Z8530 Register 14 */
#define ZR15             0x0F    /* Z8530 Register 15 */


/****-------------------------------------------------------------------
*
*    Z8530 Write Register 1, Transmit/Receive Interrupt and Data
*
*       Bit 7:     WAIT/DMA Request Enable
*       Bit 6:     WAIT/DMA Request Function
*       Bit 5:     WAIT/DMA Request On Receive/Transmit Buffer
*       Bits 4-3:  Receive Interrupt Modes
*                     00:  Receive Interrupts Disabled
*                     01:  Receive Interrupts on First Char & Special Conditions
*                     10:  Receive Interrupts on all Char & Special Conditions
*                     11:  Receive Interrupts on Special Conditions
*       Bit 2:     Parity is Special Condition
*       Bit 1:     Transmitter Interrupt Enabled
*       Bit 0:     External/Status Master Interrupt Enable
*
*****-------------------------------------------------------------------*/

#define RCV_INT_ALL      0x10    /* Receive Interrupts on All Char */
```

```
#define ENABLE_TRN_INT  0x02    /* Transmitter Interrupt Enable */
#define ENABLE_EXT_INT  0x01    /* External/Status Interrupt Enable */

#define ZAR01_MODE      0x00    /* Channel A */
#define ZBR01_MODE      0x00    /* Channel B */

#define ZAR01_ENABLE    0x13    /* Channel A */
#define ZBR01_ENABLE    0x13    /* Channel B */


/****--------------------------------------------------------------------------
*
*    Z8530 Write Register 2, Interrupt Vector
*       Bits 7-0:  Interrupt Vector
*
*****-------------------------------------------------------------------------*/

#define ZAR02_MODE      0x00    /* Channel A */
#define ZBR02_MODE      0x00    /* Channel B */


/****--------------------------------------------------------------------------
*
*    Z8530 Write Register 3, Receive Parameter and Control
*       Bits 7-6:  Receiver Bits/Char
*                     00:  5 bits/char
*                     01:  6 bits/char
*                     10:  7 bits/char
*                     11:  8 bits/char
*       Bit 5:     Auto Enables
*       Bit 4:     Enter Hunt Mode
*       Bit 3:     Receiver CRC Enable
*       Bit 2:     Address Search Mode (SDLC)
*       Bit 1:     SYNC Character Load Inhibit
*       Bit 0:     Receiver Enable
*
*****-------------------------------------------------------------------------*/

#define ZAR03_MODE      0xDC    /* Channel A */
#define ZBR03_MODE      0xD8    /* Channel B */

#define ZAR03_ENABLE    0xDD    /* Channel A */
#define ZBR03_ENABLE    0xD9    /* Channel B */


/****--------------------------------------------------------------------------
*
*    Z8530 Write Register 4, Transmit/Receiver Miscellaneous Parameters & Modes
*
*       Bits 7-6:  CLock Rate
*                     00:  1x Mode
*                     01:  16x Mode
*                     10:  32x Mode
*                     11:  64x Mode
*       Bits 5-4:  SYNC Modes
*                     00:  8 bit sync char
*                     01:  16 bit sync char
*                     10:  SDLC mode (01111110 flag)
*                     11:  external sync mode
*       Bits 3-2:  Stop Bits
*                     00:  Sync modes enable
*                     01:  1 stop bit
*                     10:  1.5 stop bit
*                     11:  2 stop bit
*       Bit 1:     Parity Even/Odd
*                     1:  Even
*                     0:  Odd
*       Bit 0:     Parity Enable
*
*****-------------------------------------------------------------------------*/

#define ZAR04_MODE      0x20    /* Channel A */
#define ZBR04_MODE      0x20    /* Channel B */
```

```
/****---------------------------------------------------------------------------
*
*    Z8530 Write Register 5, Transmit Parameter and Controls
*       Bit 7:      Data Terminal Ready
*       Bits 6-5:   Transmitter Bits/Char
*                      00:  5 bits/char
*                      01:  6 bits/char
*                      10:  7 bits/char
*                      11:  8 bits/char
*       Bit 4:      Send Break
*       Bit 3:      Transmitter Enable
*       Bit 2:      SDLC/CRC-16
*                      0:  SDLC
*                      1:  CRC-16
*       Bit 1:      Request to Send
*       Bit 0:      Transmit CRC Enable
*
*****-------------------------------------------------------------------------*/

#define ZAR05_MODE       0x61    /* Channel A */
#define ZBR05_MODE       0x61    /* Channel B */

#define ZAR05_ENABLE     0x69    /* Channel A */
#define ZBR05_ENABLE     0x69    /* Channel B */


/****---------------------------------------------------------------------------
*
*    Z8530 Write Register 6, Sync Characters or SDLC Address Field
*       Bits 7-0:  SDLC Address Field
*
*****-------------------------------------------------------------------------*/

#define ZAR06_MODE       0x00    /* Channel A */
#define ZBR06_MODE       0x00    /* Channel B */


/****---------------------------------------------------------------------------
*
*    Z8530 Write Register 7, Sync Character or SDLC Flag
*       Bits 7-0:  SDLC Flag
*
*****-------------------------------------------------------------------------*/

#define ZAR07_MODE       0x7E    /* Channel A */
#define ZBR07_MODE       0x7E    /* Channel B */


/****---------------------------------------------------------------------------
*
*    Z8530 Write Register 9, Master Interrupt Control
*       Bits 7-6:  Reset Command Bits
*                     00:  No Reset
*                     01:  Reset Channel B
*                     10:  Reset Channel A
*                     11:  Hardware Reset
*       Bit 5:      0  (not used)
*       Bit 4:      Status High/Low
*       Bit 3:      Master Interrupt Enable
*       Bit 2:      Disable Lower Daisy Chain
*       Bit 1:      No Vector
*       Bit 0:      Vector Includes Status
*
*****-------------------------------------------------------------------------*/

#define ZAR09_MODE       0x06    /* Channel A */
#define ZBR09_MODE       0x06    /* Channel B */

#define ZAR09_ENABLE     0x0E    /* Channel A */
#define ZBR09_ENABLE     0x0E    /* Channel B */
```

```
/****-----------------------------------------------------------------------
*
*    Z8530 Write Register 10, Miscellaneous Transmitter/Receiver Control Bus
*       Bit 7:      CRC Presets
*                      0:  Presets to all 0's
*                      1:  Presets to all 1's
*       Bits 6-5:   Data Encoding
*                      00:  NRZ
*                      01:  NRZI
*                      10:  FM1
*                      11:  FM0
*       Bit 4:      Go Active On Poll
*       Bit 3:      Mark/Flag Idle
*       Bit 2:      Abort/Flag On Underrun
*       Bit 1:      Loop Mode
*       Bit 0:      6-Bit/8-Bit SYNC
*
*****----------------------------------------------------------------------*/

#define ZAR10_MODE      0x8C    /* Channel A */

#define ZBR10_MODE      0x84    /* Channel B */
#define ZBR10_CRC       0x80    /* Channel B */
#define ZBR10_FLAG      0x84    /* Channel B */


/****-----------------------------------------------------------------------
*
*    Z8530 Write Register 11, Clock Mode Control
*       Bit 7:      RTxC - XTAL/NO XTAL
*       Bits 6-5:   Receiver Clock Source
*                      00:  RTxC Pin
*                      01:  TRxC Pin
*                      10:  BR Generator Output
*                      11:  DPLL Output
*       Bits 4-3:   Transmit Clock Source
*                      00:  RTxC Pin
*                      01:  TRxC Pin
*                      10:  BR Generator Output
*                      11:  DPLL Output
*       Bit 2:      Transmit Clock Output/Input
*       Bits 1-0:   Transmit External Control Selection
*                      00:  XTAL Output
*                      01:  Transmit Clock
*                      10:  BR Generator Output
*                      11:  DPLL Output
*
*****----------------------------------------------------------------------*/

#define ZAR11_MODE      0x56    /* Channel A */
#define ZBR11_MODE      0x16    /* Channel B */


/****-----------------------------------------------------------------------
*
*    Z8530 Write Register 12 & 13, Baud Rate Generator Time Constant
*       Register 12:  Lower Byte of Baud Rate
*       Register 13:  Upper Byte of Baud Rate
*
*       Baud Rate    Synchronous (x1 clock)    Asynchronous (x1 clock)
*                    Time Constant             Time Constant
*         64K                36                       -
*         48K                49                       -
*         19.2K             126                       6
*         9600              254                      14
*         4800              510                      30
*         2400             1020                      62
*         1800             1363                      83
```

```
*        1200            2064                          126
*         300            8190                          510
*         110            ----                         1394
*
*****-----------------------------------------------------------------------*/

#define ZAR12_MODE      254     /* 9600 Baud Rate */
#define ZAR13_MODE      0

#define ZBR12_MODE      126     /* 19.2K Baud Rate */
#define ZBR13_MODE      0


/*****-----------------------------------------------------------------------
*
*    Z8530 Write Register 14, Miscellaneous Control Bits
*       Bits 7-5:  Digital Phase-Locked Loop Commands
*                     000:  Null Command
*                     001:  Enter Search Mode
*                     010:  Reset Clock Missing
*                     011:  Disable DPLL
*                     100:  Set Source = BR Generator
*                     101:  Set Source = RTxC
*                     110:  FM Mode
*                     111:  NRZI Mode
*       Bit 4:     Local Loopback
*       Bit 3:     Auto Enable
*       Bit 2:     DTR/Request Function
*       Bit 1:     Baud Rate Generator Source
*       Bit 0:     Baud Rate Generator Enable
*
*****-----------------------------------------------------------------------*/

#define ZAR14_ENABLE    0x03    /* Channel A */
#define ZBR14_ENABLE    0x03    /* Channel B */


/*****-----------------------------------------------------------------------
*
*    Z8530 Write Register 15, External/Status Interrupt Control
*       Bit 7:     Break/Abort Interrupt Enable
*       Bit 6:     Tx Underrun/EOM Interrupt Enable
*       Bit 5:     CTS Interrupt Enable
*       Bit 4:     SYNC/Hunt Interrupt Enable
*       Bit 3:     DCD Interrupt Enable
*       Bit 2:     0  (not used)
*       Bit 1:     Zero Count Interrupt Enable
*       Bit 0:     0  (not used)
*
*****-----------------------------------------------------------------------*/

#define ZAR15_ENABLE    0xC0    /* Channel A */
#define ZBR15_ENABLE    0xC0    /* Channel B */
```

What is claimed is:

1. Telephone line connection apparatus comprising:
a) an RJ11 socket comprising at least two conductors for transmitting telephone signals;
b) a connection means shaped in the form of an RJ11 plug; and
c) a sealing means for environmentally protecting said RJ11 socket, said sealing means comprising a gel disposed in said RJ11 socket, said gel at least partially filling said RJ11 socket.

2. Apparatus as recited in claim 1 wherein:
a) said RJ11 socket is coupled to telephone line conductors for providing telephone signals; and
b) said connection means contains no conductors extending out of a body of said connection means.

3. Apparatus as recited in claim 1 wherein said gel has a cone penetration value of 50 to $350\times10^{-1}$ mm and an ultimate elongation of at least 50%.

4. Apparatus as recited in claim 1 wherein said gel has a cone penetration value of 100 to $300\times10^{-1}$ mm and an ultimate elongation of at least 100%.

5. Apparatus as claimed in claim 1 wherein said gel has a cone penetration value of 100 to $250\times10^{-1}$ mm and an ultimate elongation of at least 200%.

6. Apparatus as recited in claim 1 wherein said gel comprises material selected from the group of urethanes, silicones, and styrene-ethylene-butylene-styrenes.

7. Subscriber location telephone line connection apparatus comprising:

an RJ11 socket comprising at least two conductors for transmitting telephone signals;

b) a sealing means for environmentally protecting said RJ11 socket, said sealing means comprising a gel having an ultimate elongation of at least 100% and at least partially filling said RJ11 socket.

8. Apparatus as recited in claim 7 wherein said gel has a cone penetration value of 150 to $350\times10^{-1}$ mm.

9. Apparatus as recited in claim 7 wherein said gel has a cone penetration value of 200 to $350\times10^{-1}$ mm and an ultimate elongation of at least 200%.

10. Apparatus as recited in claim 7 wherein said gel comprises material selected from the group of silicones and styrene-ethylene-butylene-styrenes.

11. Subscriber location telephone line connection apparatus for insertably receiving an RJ11 plug, said apparatus comprising;

a) an RJ11 socket comprising at least two conductors for transmitting telephone signals;

b) a sealing means for environmentally protecting said RJ11 socket, said sealing means comprising a gel sufficiently filling said RJ11 socket so as to environmentally seal both said RJ11 socket and an inserted RJ11 plug after repeated connections and disconnections of said RJ11 socket and RJ11 plug.

12. The apparatus of claim 11, wherein said gel has a cohesive strength greater than its adhesive strength and is disposed within said RJ11 socket so as to environmentally seal both said RJ11 socket and an inserted RJ11 plug such that upon disengagement of said RJ1 1plug from said RJ11 socket, said gel remains substantially within said RJ11 socket and is substantially removed from said RJ11 plug.

13. The apparatus of claim 12, wherein said gel comprises material selected from the group of silicones and styrene-ethylene-butylene-styrenes and has a cone penetration value of 150 to $350\times10^{-1}$ mm and an ultimate elongation of at least 200%.

* * * * *